United States Patent [19]

Semerau et al.

[11] Patent Number: 4,839,890

[45] Date of Patent: Jun. 13, 1989

[54] DATA BIT SYNCHRONIZER

[75] Inventors: Jon M. Semerau, Maplewood; Christopher D. Sonnek, St. Paul, both of Minn.

[73] Assignee: NCR Corporation, Dayton, Ohio

[21] Appl. No.: 926,489

[22] Filed: Oct. 31, 1986

[51] Int. Cl.⁴ .................................................. H04J 3/02

[52] U.S. Cl. ........................................ 370/84; 370/94; 370/110.1; 364/200

[58] Field of Search ................ 370/79, 84, 110.1, 112, 370/94, 94 U; 364/200, 300

[56] References Cited

U.S. PATENT DOCUMENTS

| | | | |
|---|---|---|---|
| 4,156,796 | 5/1979 | O'Neal et al. | 364/900 |
| 4,188,665 | 2/1980 | Nagel et al. | 364/200 |
| 4,354,261 | 10/1982 | Hagen et al. | 370/84 |
| 4,425,616 | 1/1984 | Woodell | 364/200 |
| 4,431,992 | 2/1984 | Boulard et al. | 370/84 |
| 4,460,993 | 7/1984 | Hampton et al. | 370/84 |
| 4,482,982 | 11/1984 | Yu et al. | 364/900 |
| 4,493,051 | 1/1985 | Brezzo et al. | 364/900 |
| 4,520,479 | 5/1985 | Grima et al. | 370/84 |
| 4,542,498 | 9/1985 | Bodros et al. | 370/79 |
| 4,597,074 | 6/1986 | Demichelis et al. | 370/79 |
| 4,654,860 | 3/1987 | Ouimer et al. | 370/84 |

*Primary Examiner*—Salvatore Cangialosi
*Attorney, Agent, or Firm*—Wilbert Hawk, Jr.; Edward Dugas; Jack R. Penrod

[57] ABSTRACT

A data bit synchronizer particularly adapted for use with a multiplexing character processor of the type that multiplexes data characters to and from a plurality of communication lines to a central processing unit. The data bit synchronizer is operable with communication lines carrying various protocols and data bit rates. A RAM memory stores the control and status information for each of the plurality of communication lines.

The RAM is accessed at a rate corresponding to the rate used to multiplex the communication lines to repeatedly output the information associated with each communication line. The data bit synchronizer also incorporates a bit rate clock generator for generating timing signals corresponding to selectable output data rates. A multiplexer is used to multiplex the timing signals with the control and status information.

10 Claims, 149 Drawing Sheets

40

66
74
76
LSIF0
LSIF9
D
Q
R
&
|

| | | | |
|---|---|---|---|
| FIG. 5A | FIG. 5B | FIG. 5C | FIG. 5D |
| FIG. 5E | FIG. 5F | FIG. 5G | FIG. 5H |

DATA BIT SYNCHRONIZER TIMING CHAIN

FIG. 9
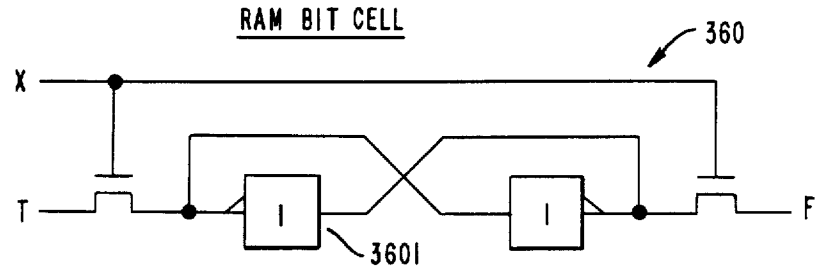
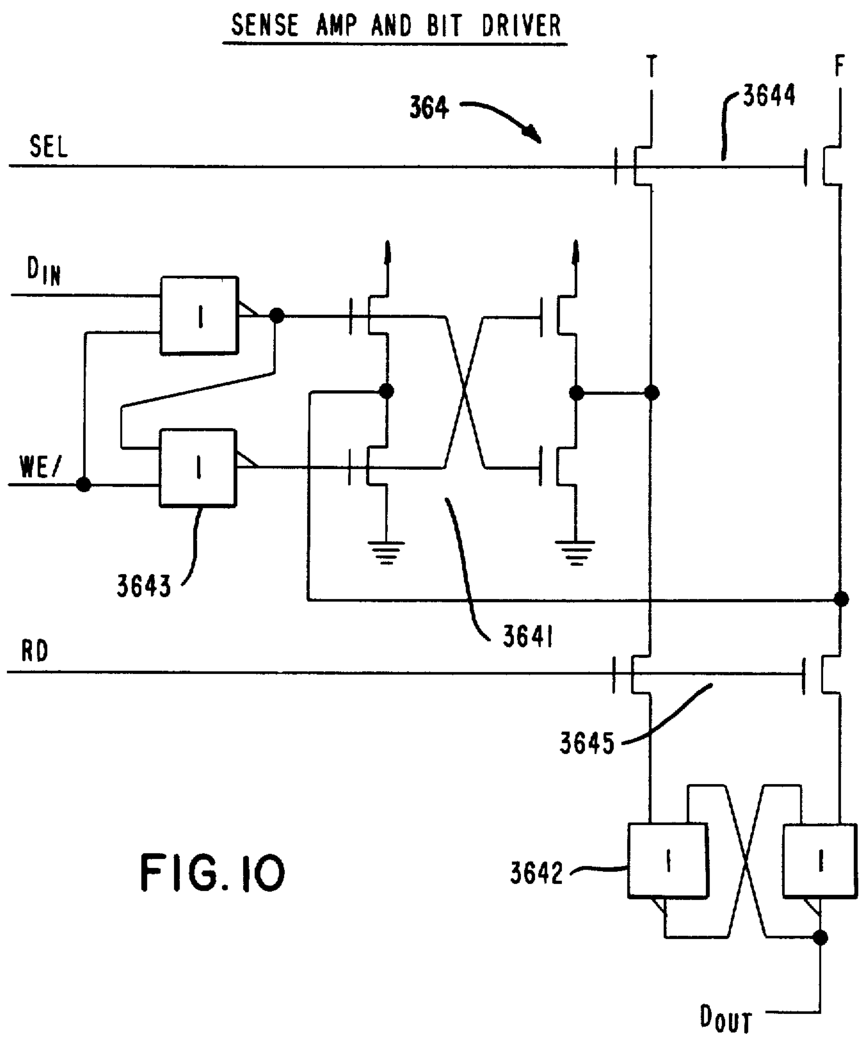
FIG. 10

FIG. 25
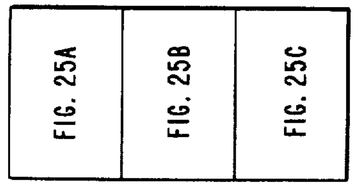
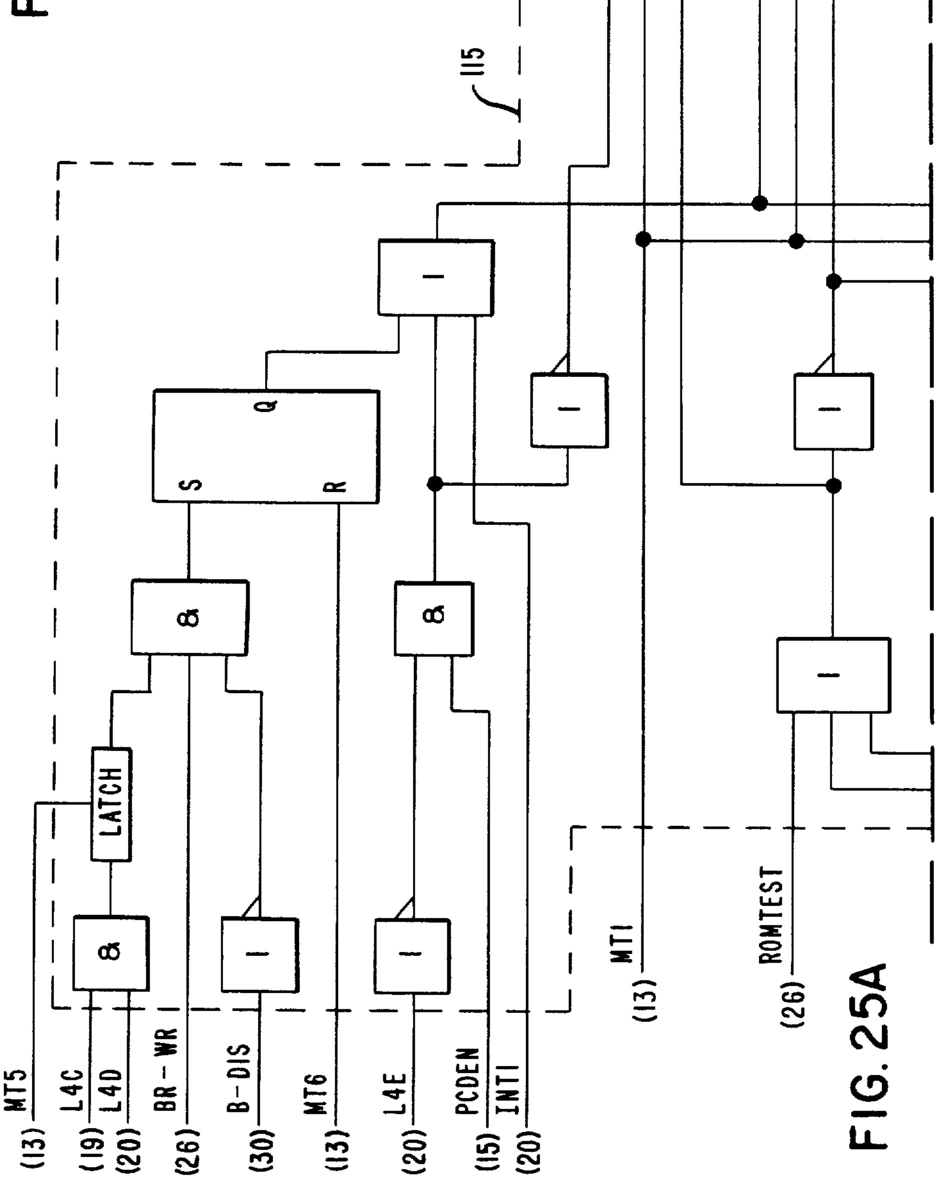
FIG. 25A

PHASE2
(13)
WE
85X8
RAM
ADDR
Q0-7
W/NONBINARY
DECODE
D0-7
1433
8
8 BIT
LATCH
1436
T
1439
T BUS 0-7
T
1438
1432
WE
85X8
RAM
ADDR
Q0-7
W/NONBINARY
DECODE
D0-7
8
8 BIT
LATCH
1437
1438
T
GR-RD
(26)

144

FIG. 37
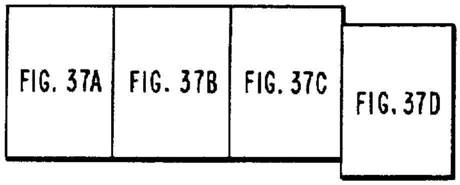
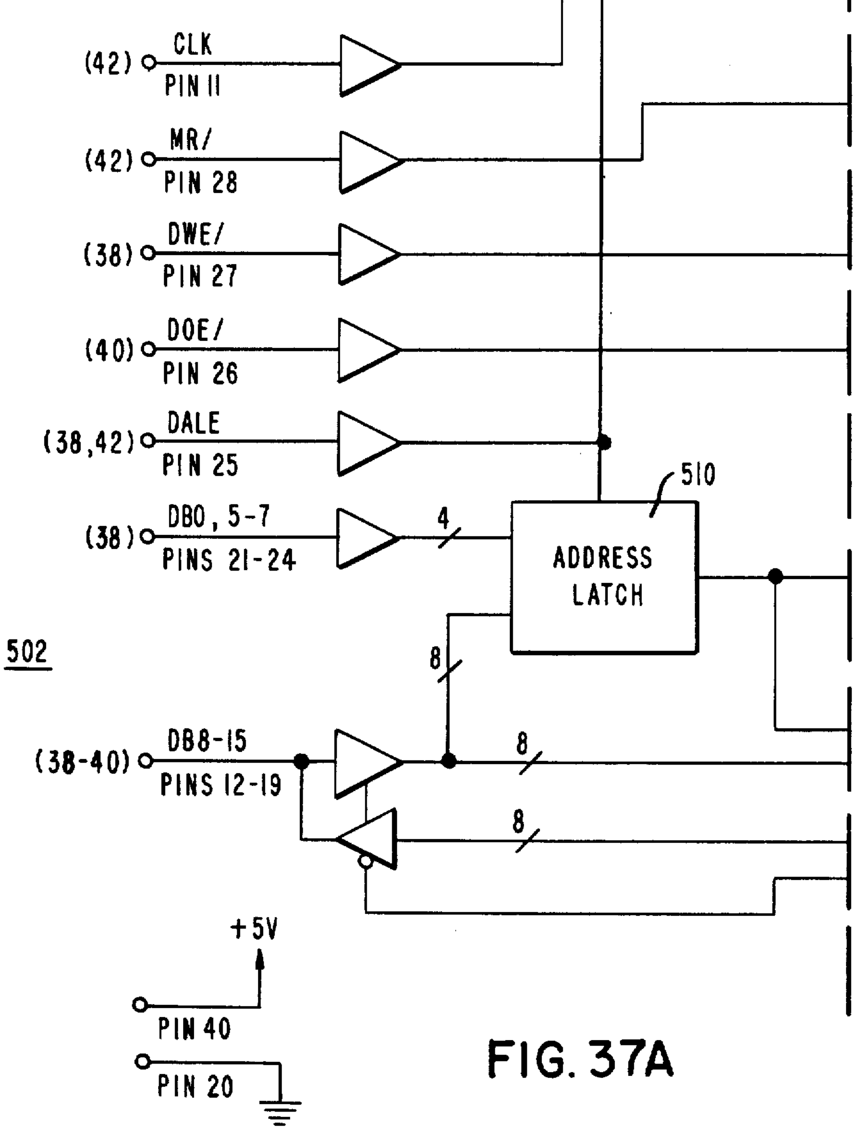
FIG. 37A

570A

COMMUNICATIONS PROCESSOR INTERFACE TIMING

FIG. 57A
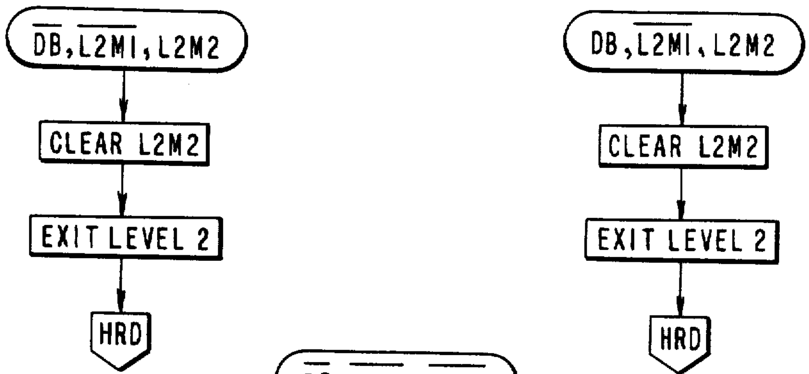
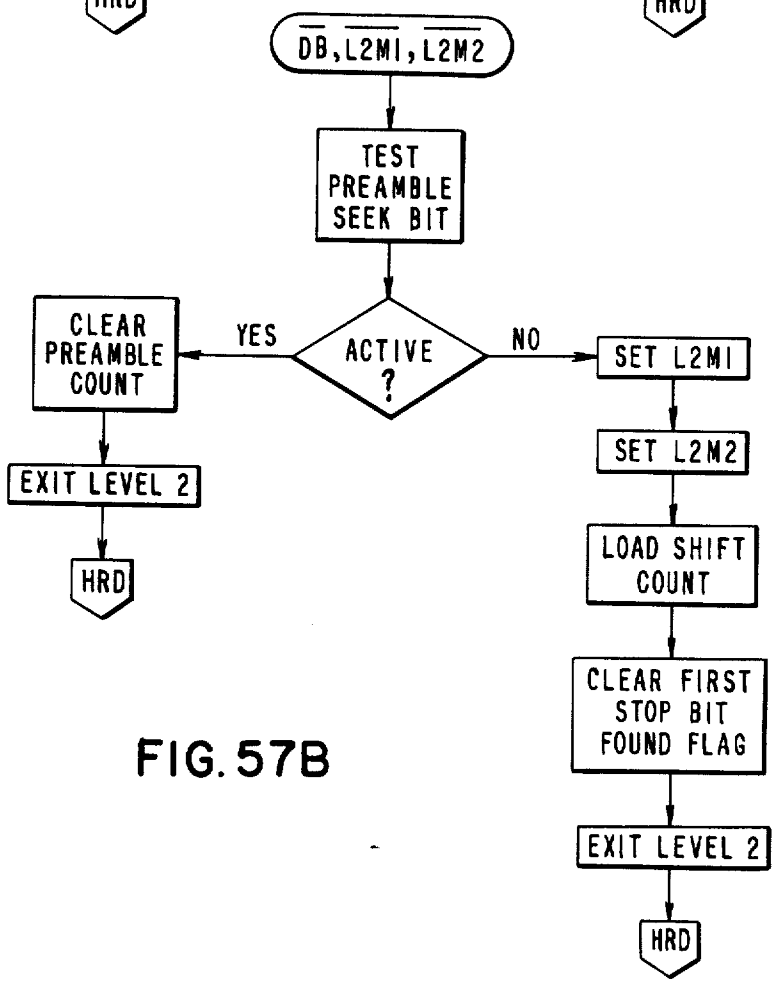
FIG. 57B

DATA BIT SYNCHRONIZER

CROSS-REFERENCE TO RELATED APPLICATIONS

The present patent application is related to U.S. patent application Ser. No. 926,149, entitled, "Multiplexing Character Processor". The present patent application is also related to U.S. patent application Ser. No. 926,946 entitled, "Communications Base Microcontroller".

BACKGROUND OF THE INVENTION

The present invention is directed to a system which is capable of interconnecting a multiplicity of peripheral devices, of various protocols, to a central processor. The peripheral devices such as terminals or other computers, transfer data in serial data streams. Several differing protocols have been established to initiate, control, verify, and terminate the data transfer between the peripheral devices and the central processor.

In prior art systems, peripheral devices are connected to communication lines and the communication lines are connected to a central processor bus (data channel or data storage). In these systems, a control function exists between a communication line and the central processor and between the communication line and a peripheral device. These controllers execute communication protocol between controllers and execute data exchange procedures between the controller and the central processor.

In prior art systems, when a communication line event occurs; such as series of bits being assembled into a byte, the beginning of the disassembly of a byte into a sequence of bits, or that a control signal has changed its binary state; a signal (request) is generated for the central processor. In systems where a multiplicity of peripheral devices are attempting to gain the attention of the central processor, various techniques such as polling (for requests) or hardware interrupting, enable the peripheral device to have access to the central processor based on the priority assigned to each peripheral device.

The present invention uses software to assemble and disassemble the protocol functions and uses hardware to do the multiplexing. The hardware directs indirect branching of software to permit the software to execute straight lines of software which branch back to hardware upon completion. The present multiplexing processor migrates traditional hardware functions into software routines.

Generally speaking, in prior art system the communication lines connected to the peripheral devices are scanned (multiplexed) for a line that is carrying a signal requiring (requesting) access to the central processor bus. Once a line has beenbeen found that is requesting bus access, if the priority of the peripheral device connected to that line has an assigned priority which is higher than any other peripheral device requesting access, it is granted exclusive access to the central processor bus until its communication task is completed. When the task is completed, the next highest priority peripheral device is granted access to the central processor bus and this procedure continues until all the requesting peripheral devices have been serviced. In some instances, a busy, high-priority peripheral device, once having gained access, will prevent the access of a lower-priority device thereby providing an unsatisfactory condition. The present invention eliminates the contention of peripheral devices for central processor software programs by synchronizing the central processor to the maximum total information rate of the connected peripheral devices. The basic machine cycle of the central processor is an integer factor of the bit time period of any of the connected communication lines.

SUMMARY OF THE INVENTION

The present invention eliminates priority, or contention problems by interleaving all incoming data, that is, every peripheral device requesting access to the communication processor is granted access and the signals from each of the peripheral devices are handled essentially simultaneously by a process called bit slicing.

In addition, the present invention is configured to accept a multiplicity of differing protocols from the peripheral devices. The present multiplexing character processor is designed to terminate a plurality of communication lines and to multiplex the data on the communication lines to a central processor bus.

In the present system, there is provided a program control, associated with each communication line, for disassembling the data received as a function of the protocol of the peripheral device connected to the communication line. A means is provided for multiplexing each program control in synchronism with the scanning of the communication lines.

In operation, the input data, having a particular bit width associated with a single transition of data, is bit sliced a multiplicity of times during its existence for each of the respective communication lines such that the signals applied to the central processor bus contain serial sequences each comprised of at least one slice of the signals on each of the communication lines. The corresponding program control functions are also sliced so that a multiplicity of program control functions, one associated with each peripheral device, are processed sequentially within each serial sequence to give the appearance of being handled simultaneously because the sequences repeat at a relatively high rate.

BRIEF DESCRIPTION OF THE DRAWINGS

FIG. 9 illustrates a circuit diagram of one bit cell from the RAM of FIGS. 8A and 8B.

FIG. 10 illustrates a circuit diagram of one sense amplifier and bit driver from the RAM of FIGS. 8A and 8B.

FIGS. 25A-25C, assembled in accordance with the map of FIG. 25, illustrate, in schematic form, the state RAM, MUX and pre-instruction register used in the CBuC of FIGS. 12A-12C.

FIGS. 37A-37D assembled in accordance with the map of FIG. 37, illustrate, in block diagram form, the communications processor interface (CPIF) shown as block 500 in FIG. 1.

FIGS. 50-75 are flow charts depicting the sequences of software operation for the system of FIG. 1.

DESCRIPTION OF THE PREFERRED EMBODIMENT

Figure 1:
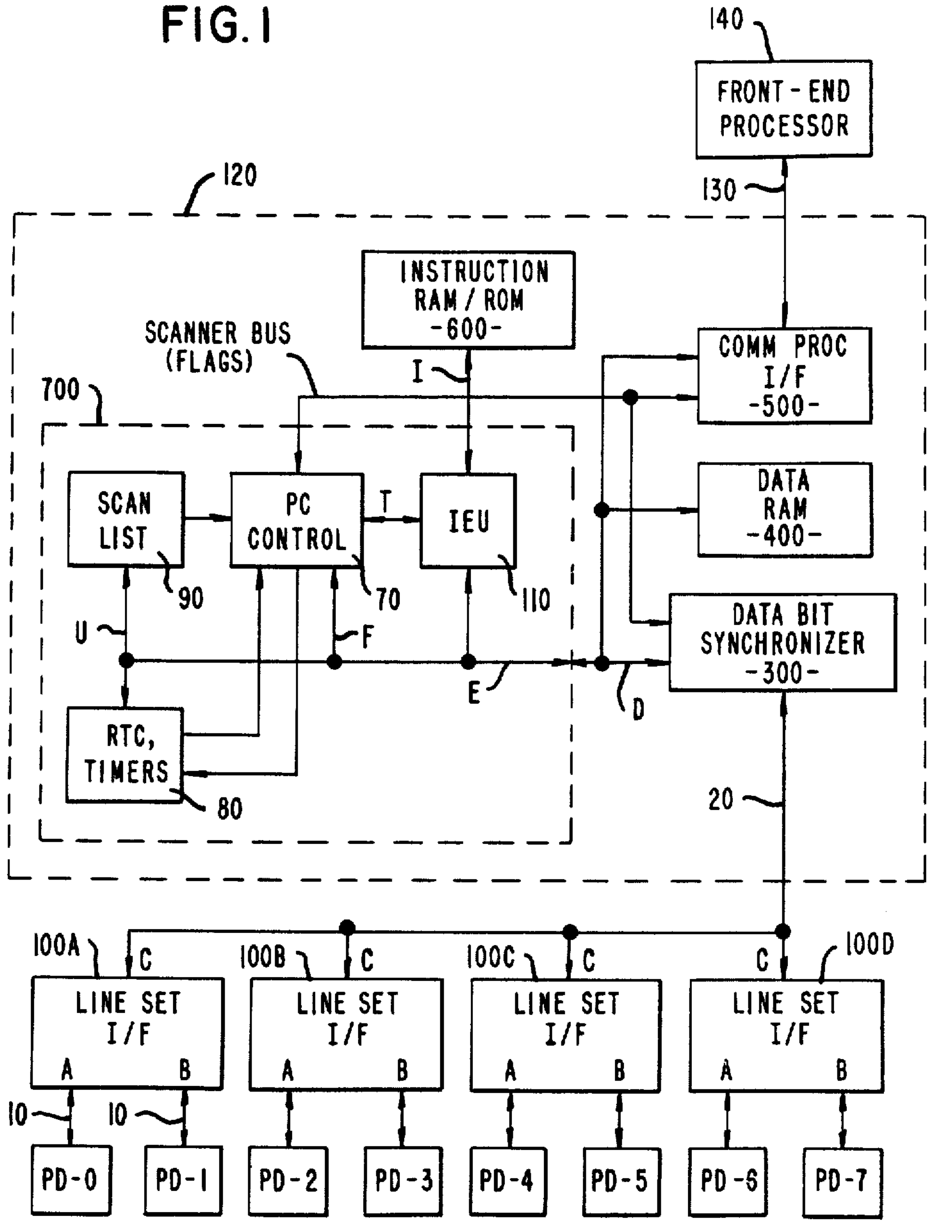
FIG. 1 illustrates the multiplexing character processor system interfacing a plurality of peripheral devices to a front end processor.

Referring to FIG. 1, a plurality of peripheral devices, PD0-PD7, are shown connected in pairs, by means of cables 10, to line set interface adapters 100A through 100D. Each line set interface adapter 100 is capable of supporting two peripheral devices, of differing protocols in a duplex mode. A line set interface bus 20 interconnects each of the line set interface adapters to a multiplexing character processor 120. A front-end (central) processor 140 is connected to the multiplexing character processor 120 via a central processor bus 130.

The multiplexing character processor 120 performs two primary functions, the first is to multiplex the data characters from the plurality of peripheral devices to the central processor bus 130, the second is to perform the assembly and the disassembly of data characters from and to the serial bit stream communicating with the peripheral devices.

The multiplexing character processor 120 is comprised of: a data bit synchronizer (DBS) 300, which performs input bit detection, output bit synchronization, interface signal monitoring, and baud rate clock generation for up to eight differing rate lines; a data RAM 400, which may be a 4K byte RAM for holding operand vectors (starting points); a communication processor interface (CPIF) 500, which contains transfer registers and command/data buffers for interfacing to the front-end processor 140; an instruction RAM/ROM 600 which is 16-bits wide, with an additional 2 parity bits (one for each 8-bit field or instruction byte); and a communications base microcontroller (CBuC ) 700 for multiplexing and using hardware dispatch software, via vectors, such that the protocol functions and character assembly/disassembly is performed under program control. The CBuC 700 also provides counter and timing outputs to other components of the processor 120. The CBuC 700 is comprised of a program control (PC) 70, real time clock and interval timers circuit (RTC) 80, a scan list and direction unit 90, and an instruction execution unit (IEU) 110.

The scan list and direction unit 90 determines the line address and the direction of the next line scan, that is, whether the next machine cycle is input processing or output processing. The scan list contains the order in which the line sets and the multiplexing character processor are time division multiplexed.

The PC control 70 contains thirty-three program counters (to be described later), which are multiplexed to the instruction RAM/ROM 600 under control of the scan list 90. Of the thirty-three counters, four are dedicated to each communication line to store the state of the input character assembly, the input protocol handler, the output character disassembly, and the output protocol handling routine. The PC control 70 operates from signals received from the IEU 110 to select a pointer (address to the vector) to the next program control.

In the present embodiment, the address of the vector is called a pointer and the vector determines the address of the instruction. The RTC timers 80, provide two interval timing signals for each line set and an RTC signal. One internal timing signal is for input timing and the other is for output timing. The RTC signals are used by the software to keep its time.

The IEU 110 is a pipeline processor which utilizes independent instructions and operand memory buses. The IEU 110 executes from a 16-bit instruction word which is fetched during the machine cycle preceding the execution cycle. A bi-directional bus, T, interconnects the IEU 110 to the PC control 70. The IEU 110 uses the T-bus to transfer operand end results between the IEU and the PC control 70. The IEU 110 is time sliced under scan list control to give the appearance of seventeen independent processors.

Multiple cycle instructions are suspended after each machine cycle until the next execution cycle for that same program counter. Each slot in the scan list corresponds to one execution cycle. Intermediate results are stored in an auxiliary register (to be described later). The instruction word and cycle count for multi-cycle instructions is stored in a state register (to be described later). One auxiliary and one state register exist for each general register set.

A data bus E, connects the IEU 110 to the PC control 70, scan list 90, the RTC timers 80, and the data bus D.

The signal flow, from the front-end processor 140 to the multiplexing character processor 120 and the peripheral devices, is defined as being the outbound signal flow. The signal flow, from the peripheral devices towards the multiplexing character processor 120 and the front-end processor 140 is defined as being the inbound signal flow.

The main function of the aforementioned system is to provide a non-prioritized communication capability between various types of peripheral devices, possibly having different protocol features, and the front-end processor. An additional function of the aforementioned system is to provide a pipeline operation which is not branch instruction sensitive.

Line Set Interface Adapter 100

Figure 2A:
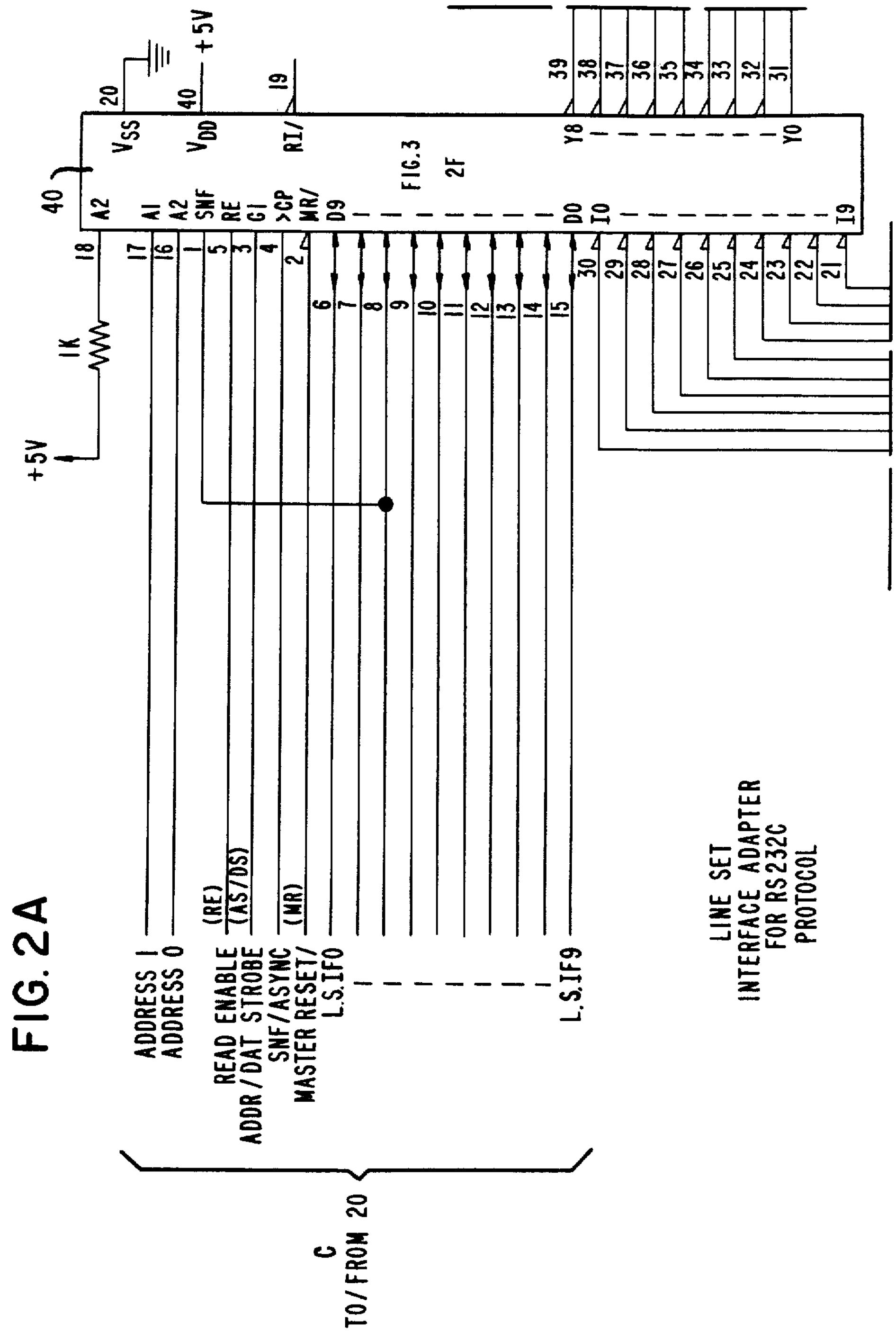
FIGS. 2A-2C, assembled in accordance with the map of FIG. 2, illustrates in schematic form, one-half of a line set interface adapter denoted generally as 100 in FIG. 1.
Figure 2B:
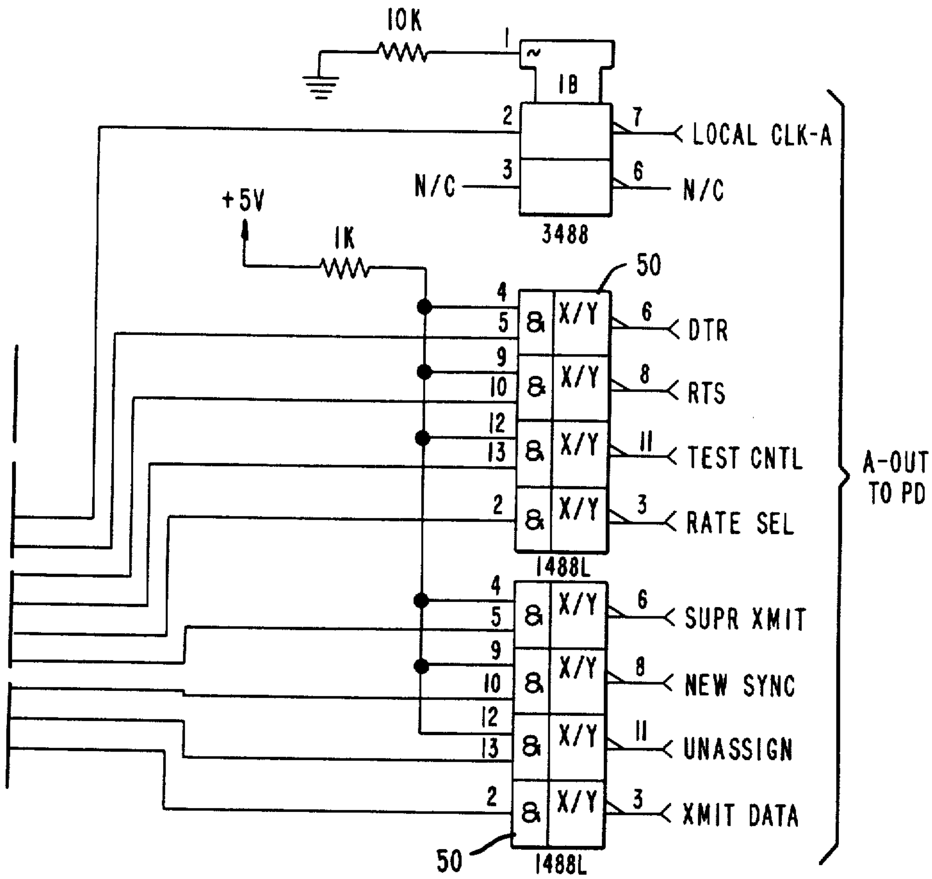
Figure 2:
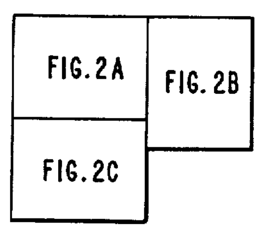
Figure 2C:
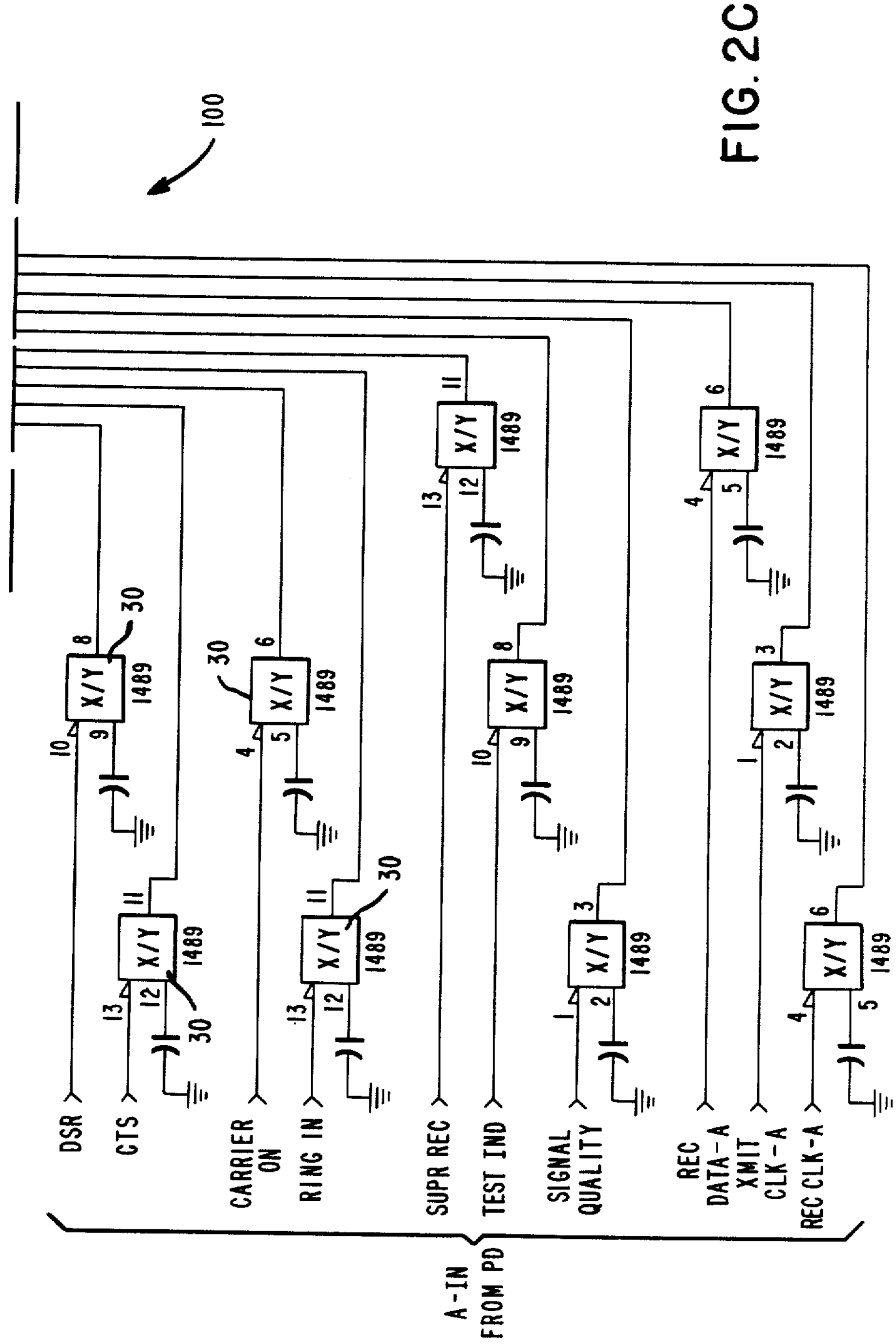

Referring to FIGS. 2A-2C, assembled in accordance with the map of FIG. 2, one-half of a line set interface adapter 100 is shown configured to support the physical layer defined by an RS232C protocol. Interface adapters responsive to different protocols may also be used as one or more of the line set interface adapters 100A-100D using the present teaching. The line set interface adapters are provided with three input/output terminals labeled generically, A-In, A-Out and C. Terminal C is connected to the bus 20 and terminals A-In and A-Out are connected to the respective peripheral device PD. The line set adapter consists of substantially two identical circuit portions, an A portion for handling the peripheral device attached to terminal A, and a B portion for handling the peripheral device attached to terminal B. In FIGS. 2A-2C, the A portion of the interface adapter needed to service the peripheral device connected to the A terminal is shown in detail. The bus 20, connected between the DBS 300 and the input labeled C on the line set interface adapter, is comprised of sixteen conductors. The terminal A-In is comprised of ten conductors for handling the signal flow from the peripheral device to the interface adapter and the terminal A-Out is comprised of nine conductors for handling the signal flow from the interface adapter to the peripheral device.

The protocol of the peripheral device dictates which conductors of the input and the output are to receive and/or transmit specific signals. A plurality of line receivers 30 are interposed in each of the ten conductors comprising the A-In terminal. The line receivers 30 may each be a FAIRCHILD 1489 chip. A latching and decoding circuit 40 (shown in detail in FIGS. 3A-3D) receives the signals from the line receivers 30 and directs those signals out the C terminals onto the bus 20. Signals received on the C terminals are processed through the latching and decoding circuit 40 and are directed to the peripheral device via a set of line drivers 50. Each line driver, in the preferred embodiment, is a Motorola 1488L chip specifically adapted for handling four lines with the RS232C protocol. As previously stated, each interface adapter has an A portion and a B portion. The B portion of the interface circuitry is identical to that shown in FIGS. 2A-2C, except that terminal 18 of the decoding circuit 40 is held at a logic level "0" by being held to ground instead of being held at a logic level "1" by being connected to a +5 volt source.

Figure 3A:
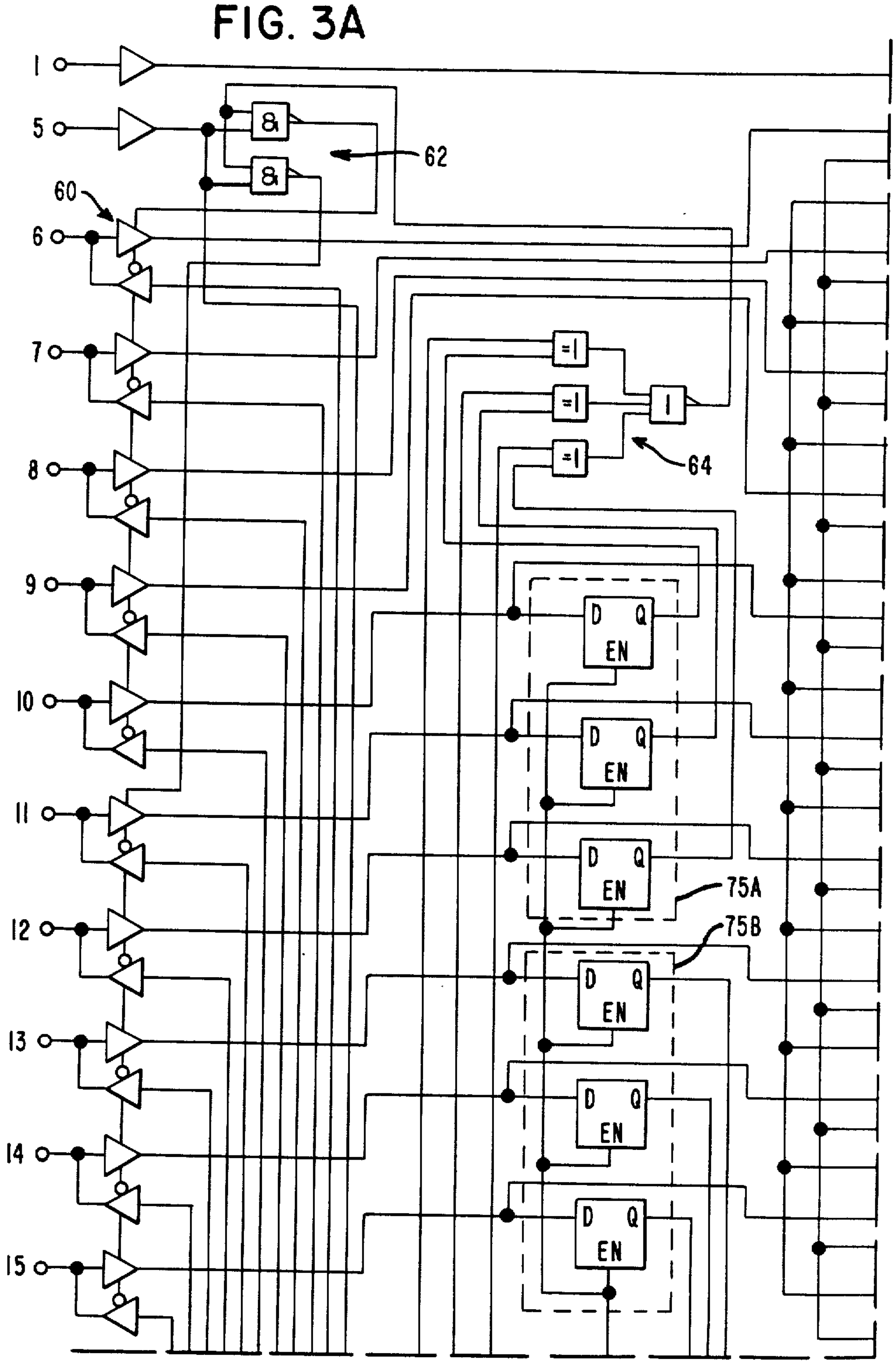
FIGS. 3A-3D, assembled in accordance with the map of FIG. 3, illustrate in schematic form, a latching and decoding circuit used in the line set interface adapter of FIGS. 2A-2C.
Figures 3, 3B:
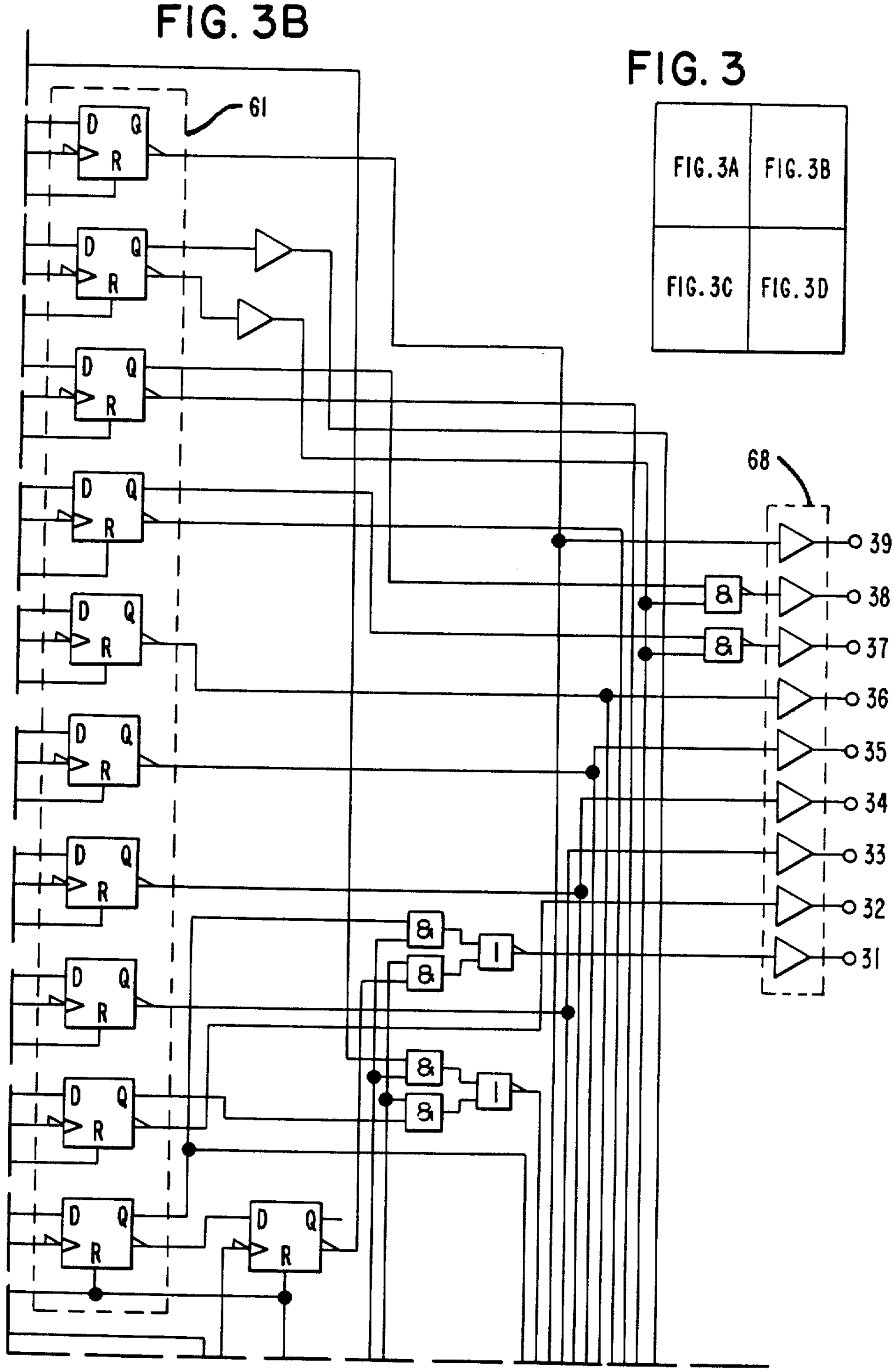
Figure 3C:
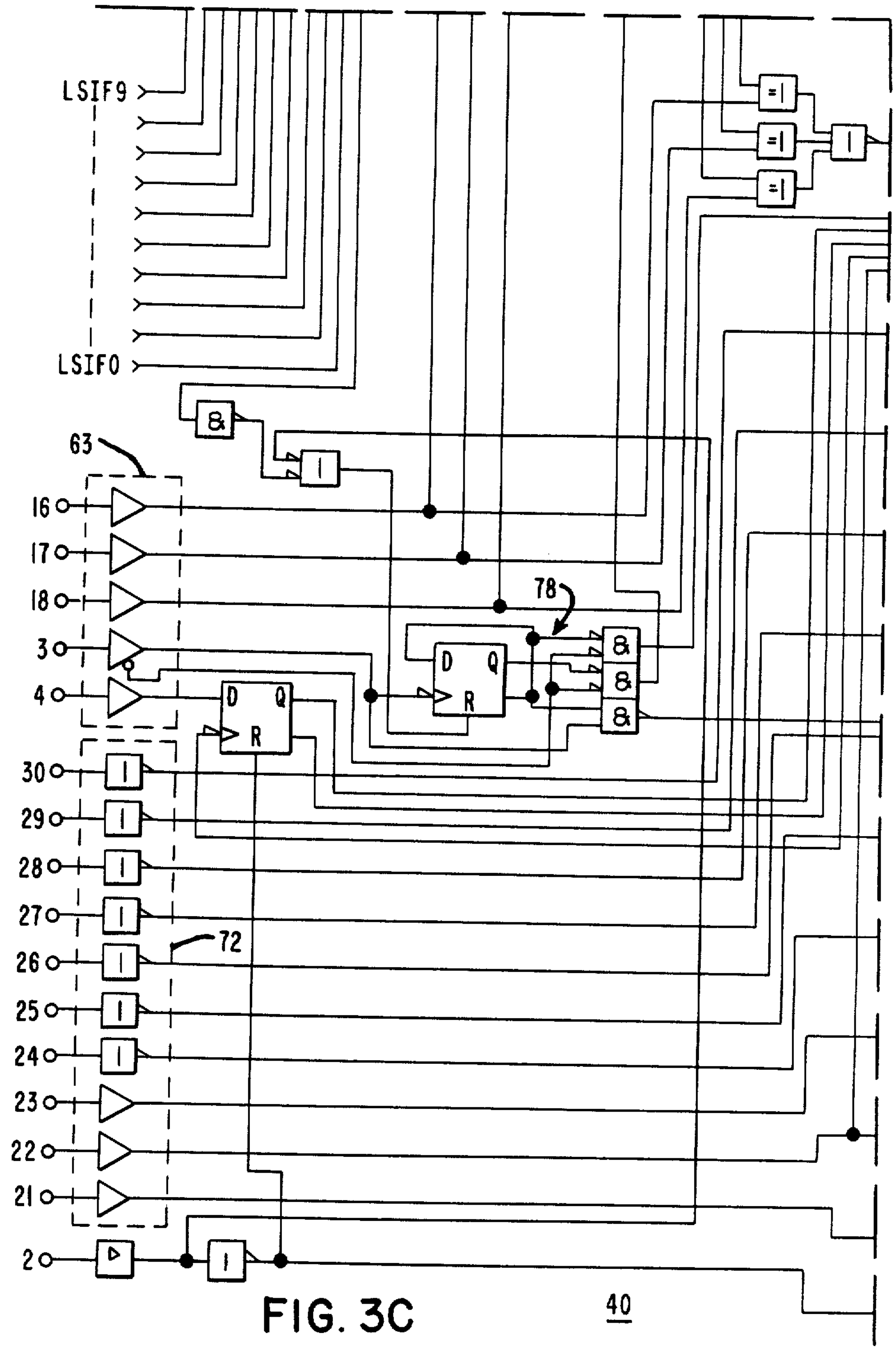
Figure 3D:
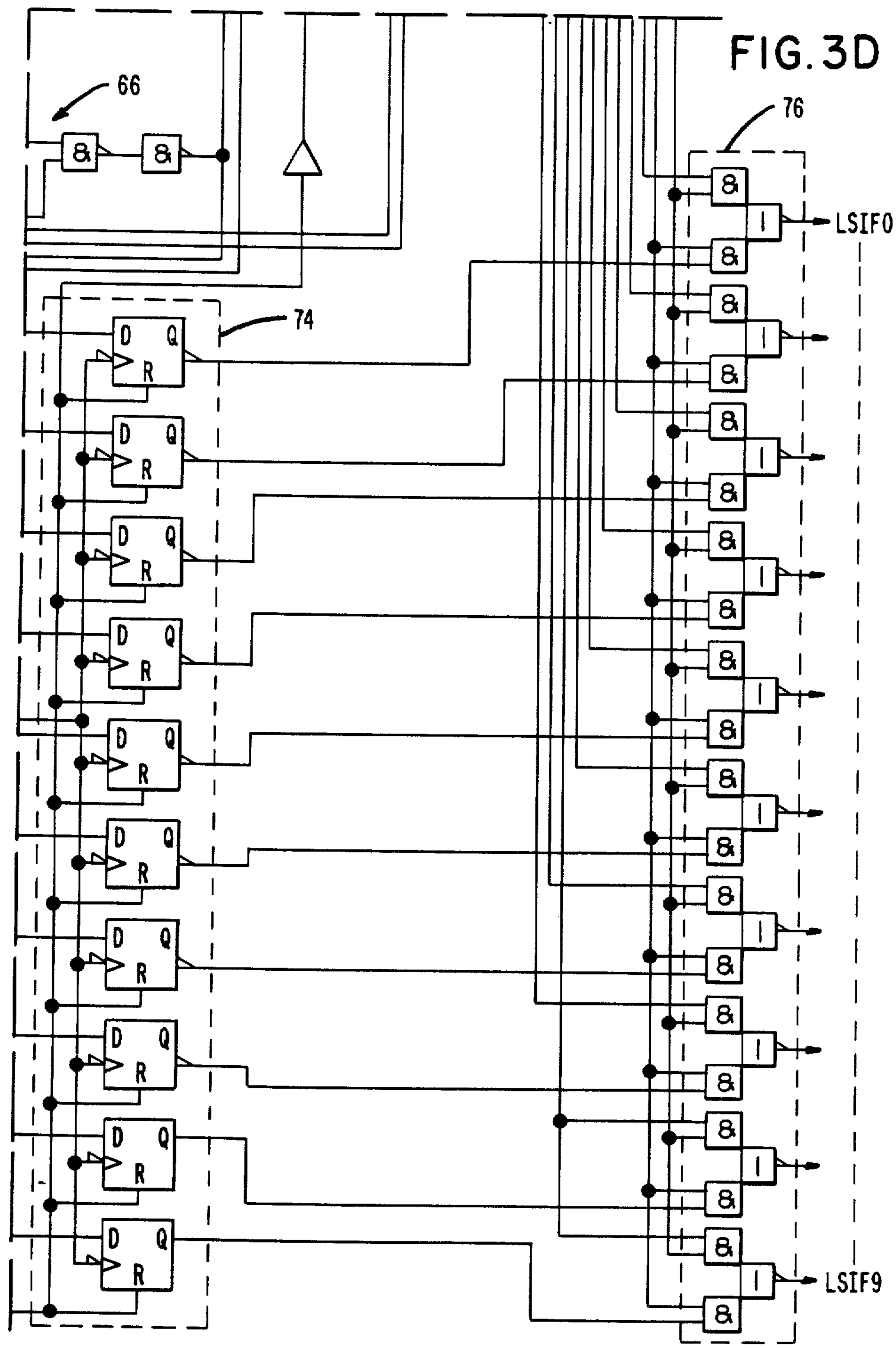

Referring to FIGS. 3A–3D, assembled in accordance with the map of FIG. 3, the latching and decoding circuit 40 is shown in logic circuit detail in FIGS. 3A–3D. The input pin numbers correspond to like numbers appearing in FIGS. 2A–2C. Pin numbers 6–15 are connected to a plurality of tri-state amplifiers 60, for amplifying their respective input signals and for providing at their outputs, signals which are directed to the D inputs of a plurality of D-type flip-flops 61. The peripheral device connected to the A terminal is selected by applying address signals to the address terminals numbered 16 and 17. The input address terminal 18, for the A portion, is held at a logic level "1", as previously explained. The address signals are directed to the inputs of amplifiers 63 and from there to two sets of gates 64 and 66. The group of gates 64 are further connected to receive at their inputs the Q output signals of a group of three D-type latches 75A. The D inputs of the latches are connected, via amplifiers 60, to the pins 10–12. The gates 64 compare the Line Address asserted by pins 16–18 to the Read Address stored in the latches 75A. If the Line Address and Read Address are equal, the gates 64 will enable gates 62. Pin 5 receives a READ ENABLE signal which is also directed to the inputs of the group of gates 62 to provide at the two outputs of the gate group 62 enabling signals. One enabling signal is applied to the tri-state enable input of the bi-directional amplifiers 60, connected to pins 6–10, and the other enabling signal is applied to the tri-state enable input of the bi-directional amplifiers 60, connected to pins 11–15. The group of gates 64 are further connected to receive at their inputs the output signals, at the Q outputs, of a first group of three D-type latches 75A. The D-inputs of the latches 75A are connected, via amplifiers 60, to pins 10–12. A second group of three D-type latches 75B have their D inputs connected, via amplifiers 60, to pins 13–15. The Q outputs of the second group of latches 75B are connected to the inputs of the group of gates 66. The gates 66 compare the Line Address asserted by pins 16–18 to the Write Address stored in latches 75B. If the Line Address and Write Address are equal, the gates 66 will enable the clock inputs of the bank of flip-flops 61 upon the occurrence of the Data Strobe signal generated by the gates 78. With proper gate selection, the signals present on the pins 6 and 8–15 are gated to the output pins 31–38.

Data coming from the peripheral device is received on pins 21–30. A bank of amplifiers 72 restore the received signals to binary signal levels sufficient to drive logic circuitry. The restored signals are directed to a bank of D-type flip-flops 74 which operate as a latch to hold the signals received from amplifiers 72 for one clock period. The flip-flops 74 provide resynchronization of the input signals from the peripheral devices. A sufficient time delay is provided from the clocking of the flip-flops 74 to the access by the Multiplexing Character Processor logic, such that the probability of failure due to a metastable condition is acceptably low. The clocking signal AS/DS for the flip-flops 74 is generated by the group of gates 78. The signals latched into the flip-flops 74, when read out, are directed to a bank of 2-to-1 multiplexers 76. The output signals, from the multiplexers 76, are labeled LSIF0 through LSIF9 and are directed to the like-labeled conductors connected to the inputs of a bank of bi-directional amplifiers 60. When properly enabled, signals present on pins 21–30 will be directed to pins 6–15 and in turn to the parallel bus 20.

Set forth below, is a listing of the pin numbers for latching and decoding circuit 40, the name of the signals appearing on the pins and a short description of the function of the signals.

Pin Descriptions

| Pin | Name | Description |
|---|---|---|
| 1 | SI | Sense Configuration Input provides a means of identifying the Line Set Interface Adapter type. |
| 2 | MR/ | Active Low Master Reset Input initializes all flip-flops. |
| 3 | AS/DS | Address Strobe and Data Strobe Input This signal is alternately decoded as address strobe or data strobe. After a master reset the first occurrence of AS/DS will be decoded as an address strobe. Read Enable will also reset the AS/DS logic. |
| 4 | SNF/ASYN | SNF/Asynchronous Select Input selects the synchronization mode. Synchronous on clock edge when in a logic "0" state or asynchronous when in a logic "1" state. |
| 5 | RE | Read Enable Input This signal enables the output on the tri-state bus pins 6 through 15 and resets the AS/DS decode logic. |
| 6–15 | LSIF0–9 | Line Set Interface bus bits 0–9, bi-directional output is controlled by RE. The read and write addresses are sent on LSIF bus bits 4–9 and latched on AS. The output data byte is latched on DS. |

| Pin | Name | Output to Line: Address | Output to Line: Data | Input from Line |
|---|---|---|---|---|
| 6 | LSIF0 | NA (Logic 0) | LC | I0 |
| 7 | LSIF1 | NA (Logic 0) | DW | I1 |
| 8 | LSIF2 | NA (Logic 0) | 00 | I2 |
| 9 | LSIF3 | NA (Logic 0) | 01 | I3 |
| 10 | LSIF4 | RA0 | 02 | I4 |
| 11 | LSIF5 | RA1 | 03 | I5 |
| 12 | LSIF6 | RA2 | 04 | I6 |
| 13 | LSIF7 | WA0 | 05 | RD |
| 14 | LSIF8 | WA1 | 06 | TC |
| 15 | LSIF9 | WA2 | OD | RC |

| Pin | Name | Description |
|---|---|---|
| 16–18 | LA0–2 | Line Address 0, Line Address 1, Line Address 2 Inputs (LA0, LA1, LA2) the physical address of the chip which is used to decode the read and write addresses from the LSIF bus. |
| 20 | GND | Circuit Ground |
| 21 | RC/ | Active Low Receive Clock Input The low-to-high transition of RC/ designates the center of the input data bit (RD). |
| 22 | TC/ | Active Low Transmit Clock Input The high-to-low transition of TC/ designates the beginning of the new output data bit (OD) when in synchronous mode. |
| 23 | RD | Receive Data Input Receive Data is the input serial data from the communications line. |
| 24 | I6/ | Active Low Input Interface 6 Communications line interface control signal generated by the peripheral device to initiate and control the data transfer as defined by the physical layer of the protocol. |
| 25 | I5/ | Active Low Input Interface 5 Communications line interface control signal generated by the peripheral device to initiate and control the data transfer as defined by the physical layer of the protocol. |
| 26 | I4/ | Active Low Input Interface 4 Communications line interface control |

-continued

| Pin Descriptions | | |
|---|---|---|
| | | signal generated by the peripheral device to initiate and control the data transfer as defined by the physical layer of the protocol. |
| 27 | I3/ | Active Low Input Interface 3 Communications line interface control signal generated by the peripheral device to initiate and control the data transfer as defined by the physical layer of the protocol. |
| 28 | I2/ | Active Low Input Interface 2 Communications line interface control signal generated by the peripheral device to initiate and control the data transfer as defined by the physical layer of the protocol. |
| 29 | I1/ | Active Low Input Interface 1 Communications line interface control signal generated by the peripheral device to initiate and control the data transfer as defined by the physical layer of the protocol. |
| 30 | I0/ | Active Low Input Interface 0 Communications line interface control signal generated by the peripheral device to initiate and control the data transfer as defined by the physical layer of the protocol. |
| 31 | OD | Output Data The output data bits are presented to the communications line on OD. |
| 32 | O6/ | Active Low Output Interface 6 Communications line interface control signal output to the peripheral device to control the data transfer as defined by physical layer of the protocol. |
| 33 | O5/ | Active Low Output Interface 5 Communications line interface control signal output to the peripheral device to control the data transfer as defined by physical layer of the protocol. |
| 34 | O4/ | Active Low Output Interface 4 Communications line interface control signal output to the peripheral device to control the data transfer as defined by physical layer of the protocol. |
| 35 | O3/ | Acitve Low Output Interface 3 Communications line interface control signal output to the peripheral device to control the data transfer as defined by physical layer of the protocol. |
| 36 | O2/ | Active Low Output Interface 2 Communications line interface control signal output to the peripheral device to control the data transfer as defined by physical layer of the protocol. |
| 37 | O1/ | Active Low Output Interface 1 Communications line interface control signal output to the peripheral device to control the data transfer as defined by physical layer of the protocol. |
| 38 | O0/ | Active Low Output Interface 0 Communications line interface control signal output to the peripheral device to control the data transfer as defined by physical layer of the protocol. |
| 39 | LC/ | Active Low Local Clock is the same frequency as the data rate. Bi-directional data valid after DS has |

-continued

| Pin Descriptions | | |
|---|---|---|
| | | latched data into flip-flop 61. |
| 40 | Vdd | +5 Volts. |

General Information

In operation, the lineset interface bus 20 is a time multiplexed bus operating in three cycles: an address cycle, an output cycle, and an input cycle (output is defined as a flow towards the communications line). During the address cycle, the read address is sent on pins 10–12 and the write address is sent on pins 13–15. The address data is latched on AS/DS. The address line set interface adapter is determined by the state of the signals on pins 16–18. During the output cycle, if the write address is equal to the line set interface adapter address, the data present on the lineset interface bus will be latched on AS/DS. The output data will be presented at the output interface if SNF/ASYN was a logic "1" during the output cycle. If SNF/ASYN was a logic "0" during the output cycle, then the new output data bit will not be presented to the output interface until the high-to-low transition of Transmit Clock (TC/). During the input cycle, if the read address is equal to the line set interface adapter address, the lineset interface bus will transmit to the multiplexing character processor while the RE signal is a logic "1".

Multiplexing Character Processor 120

Figure 4A:
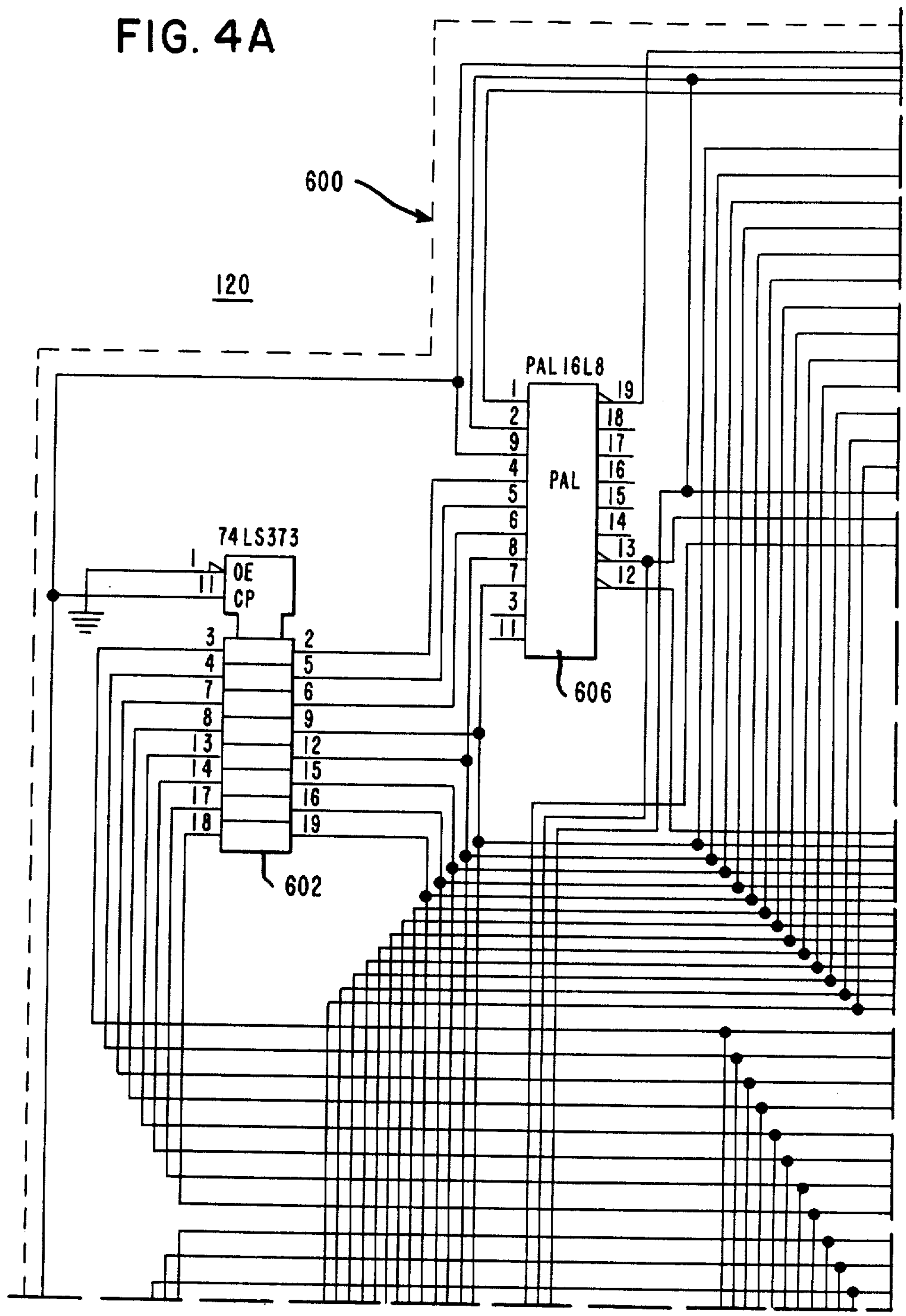
FIGS. 4A-4L, assembled in accordance with the map of FIG. 4, illustrate in schematic form the multiplexing character processor system of FIG. 1.
Figure 4B:
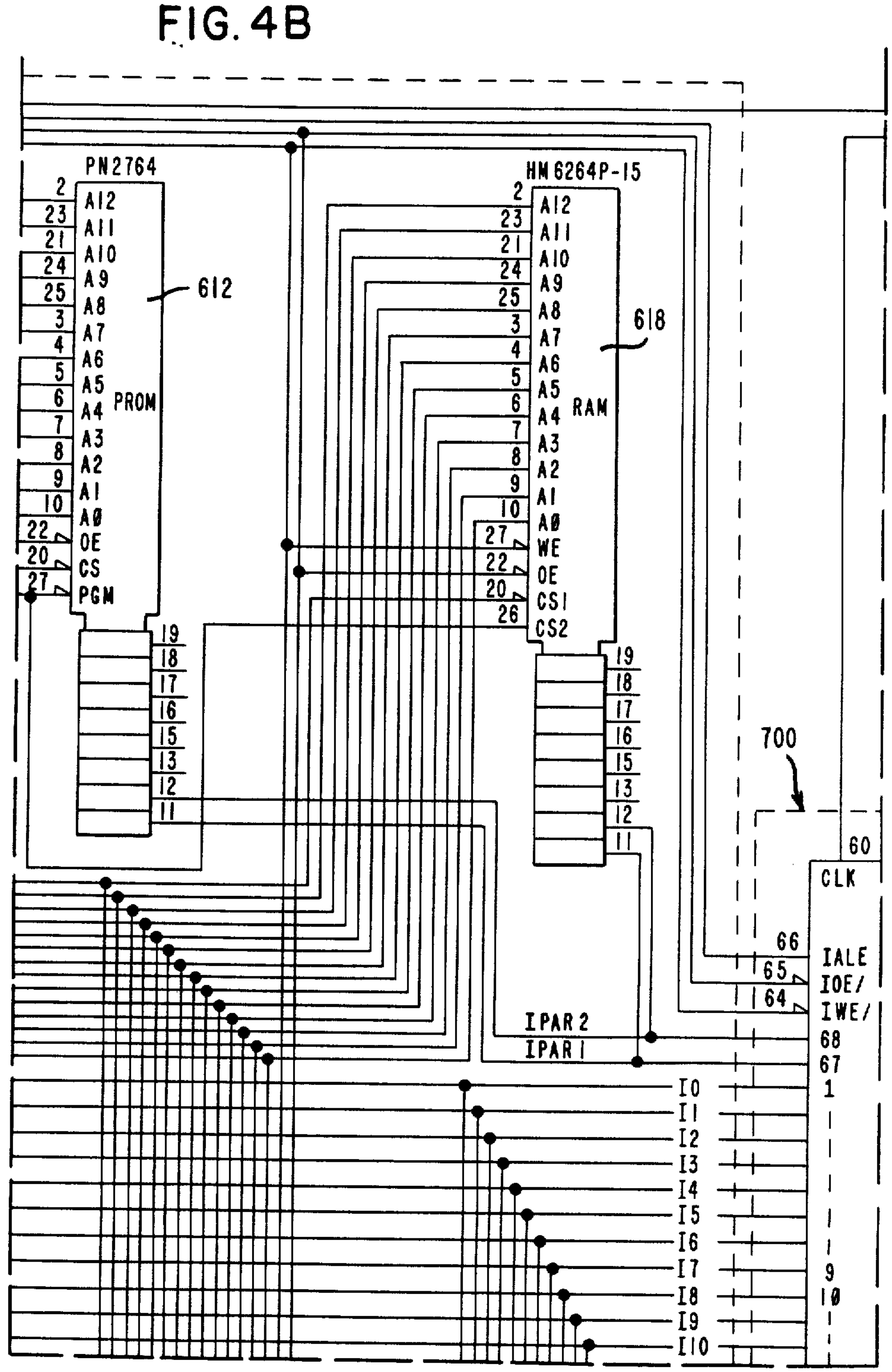
Figure 4C:
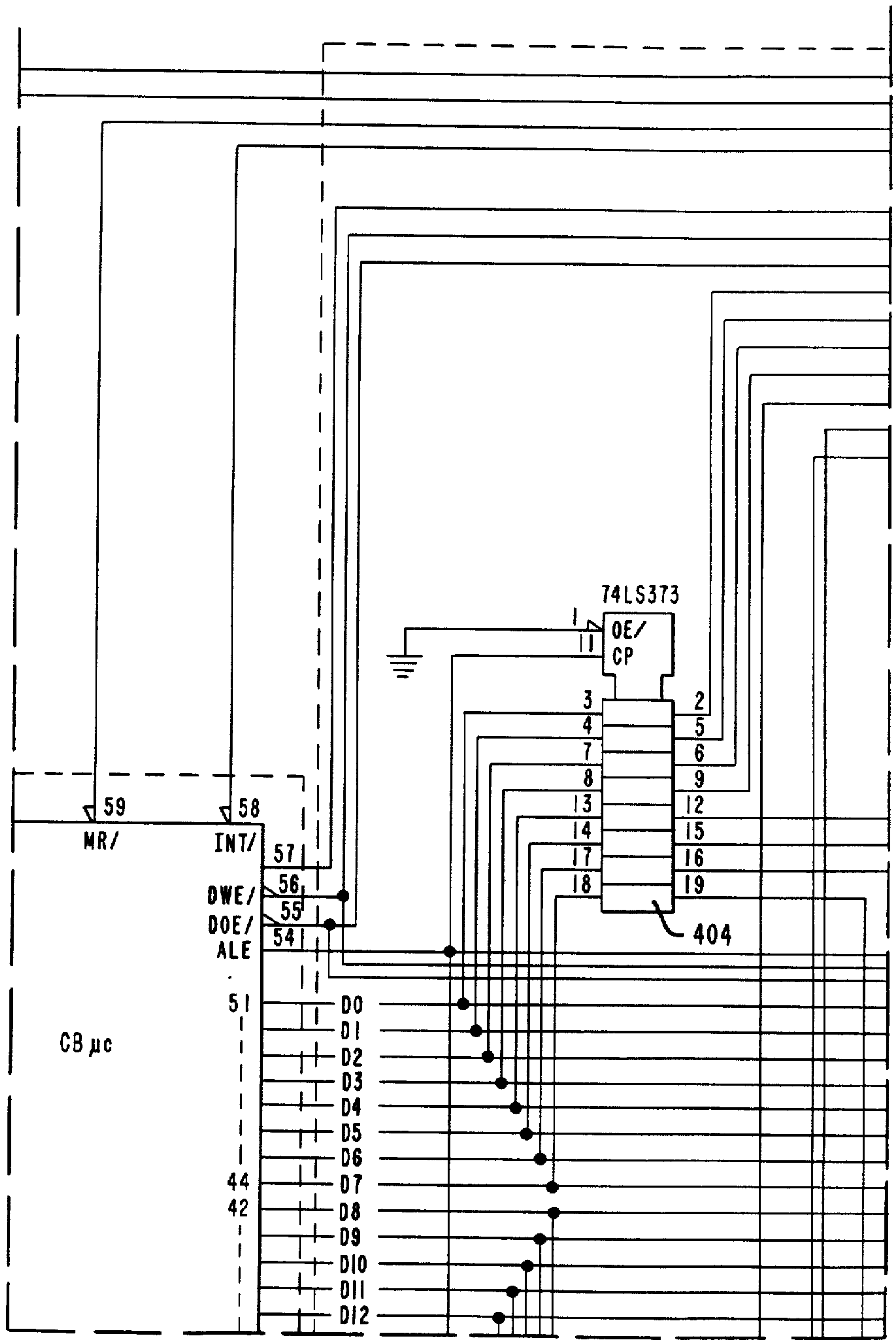
Figure 4D:
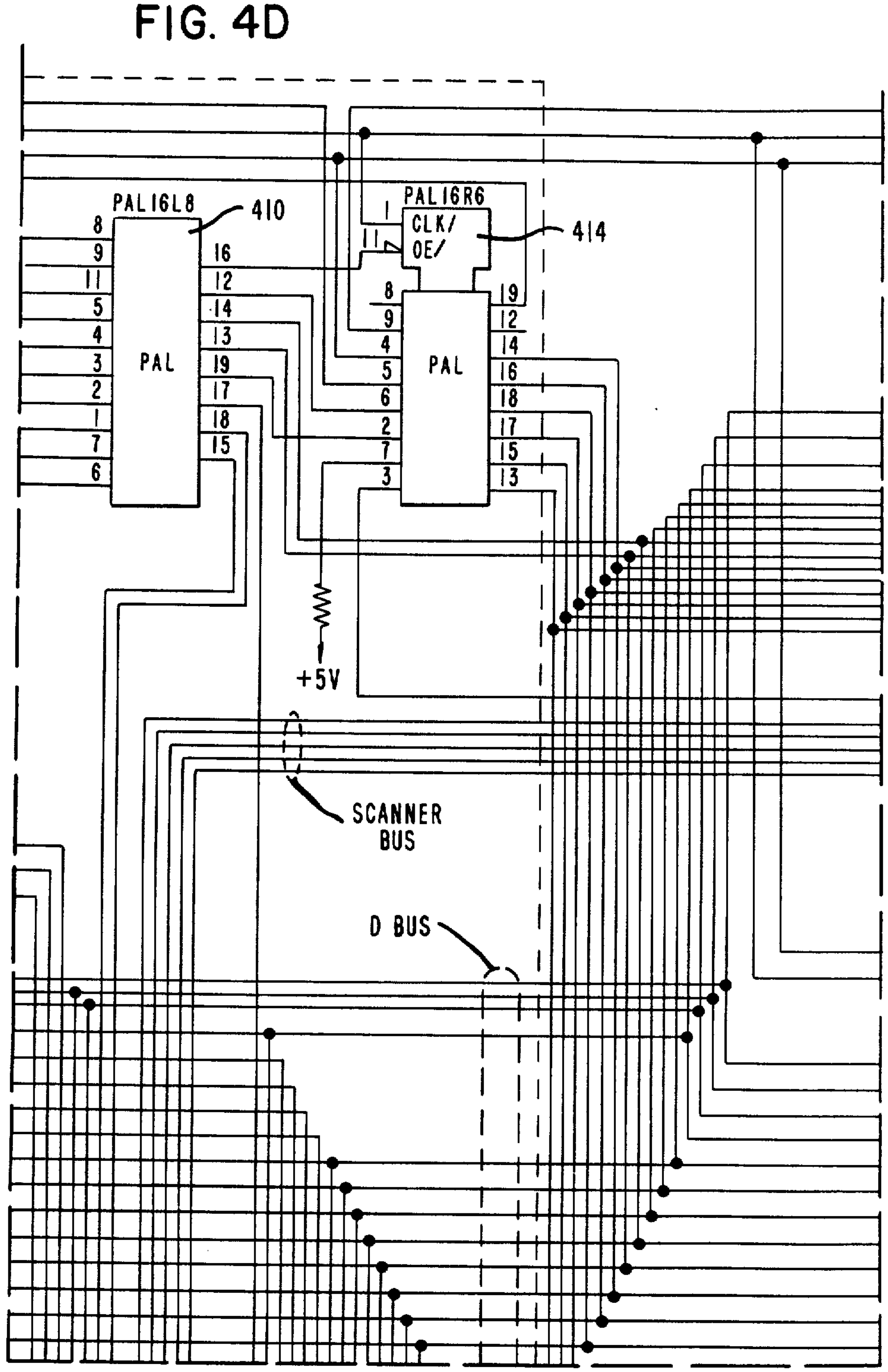
Figure 4E:
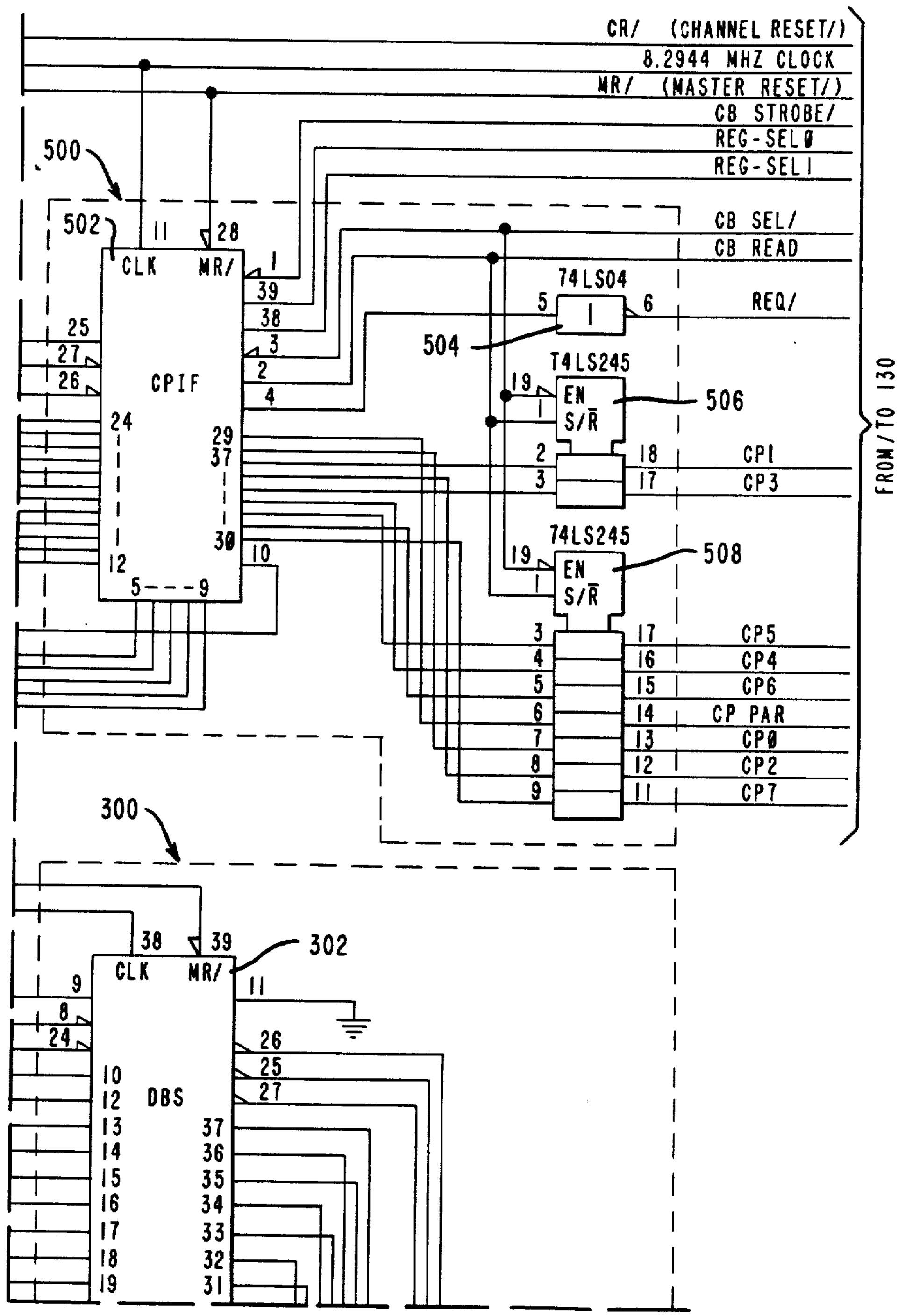
Figure 4F:
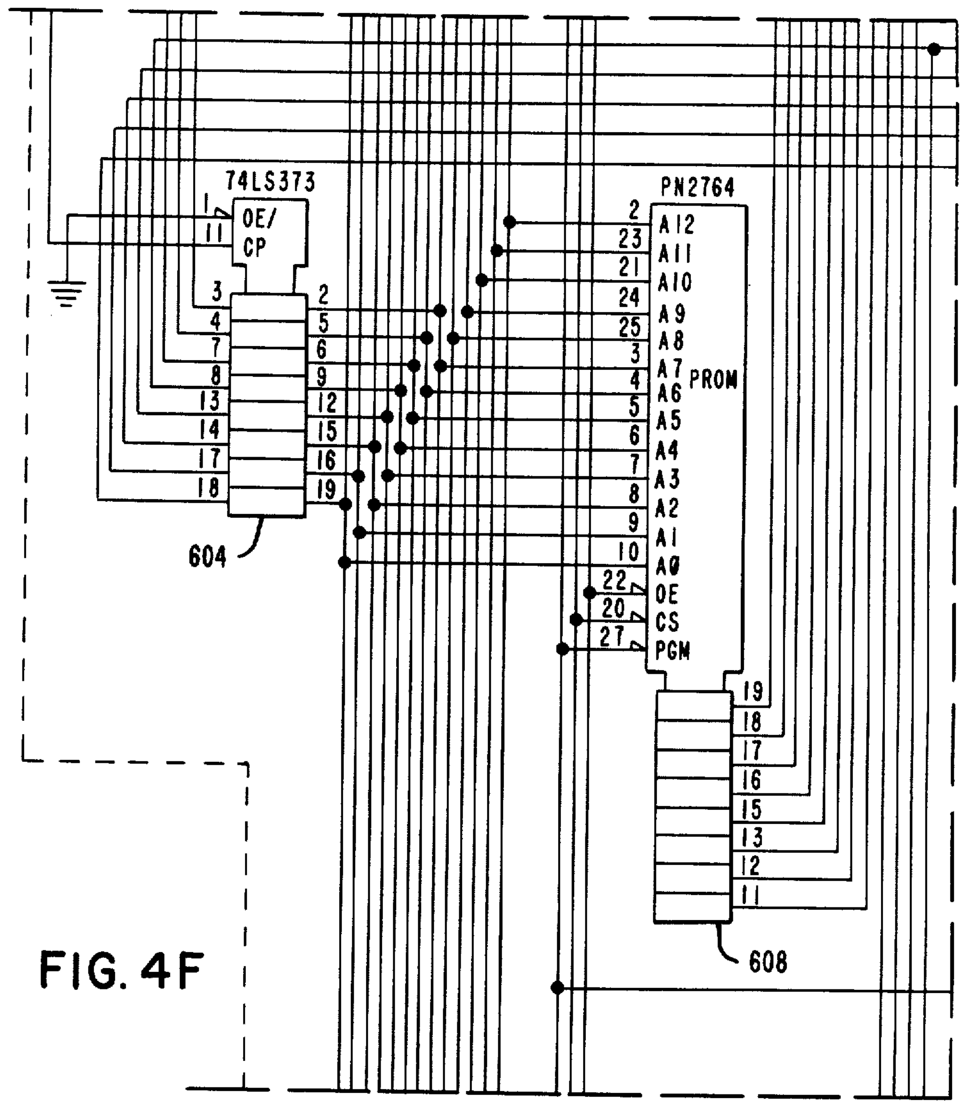
Figure 4G:
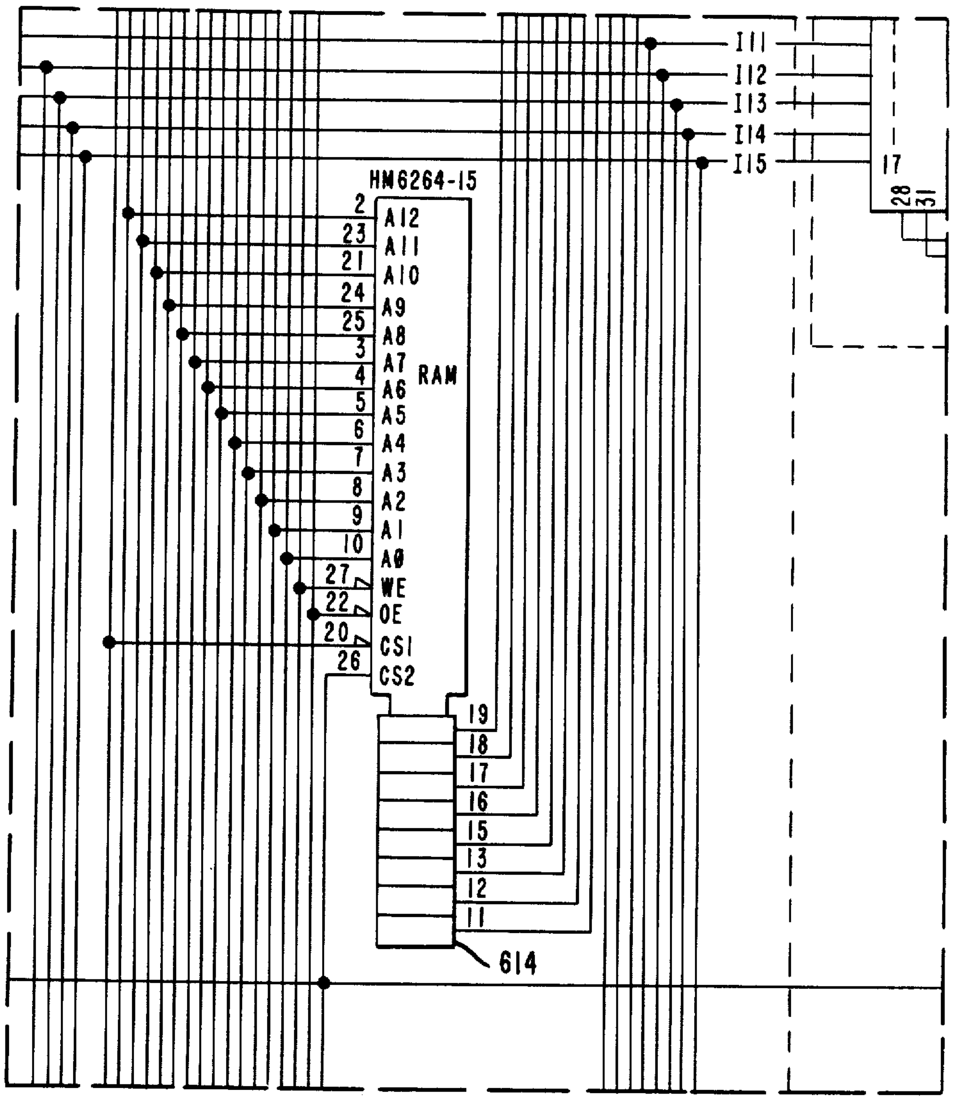
Figure 4H:
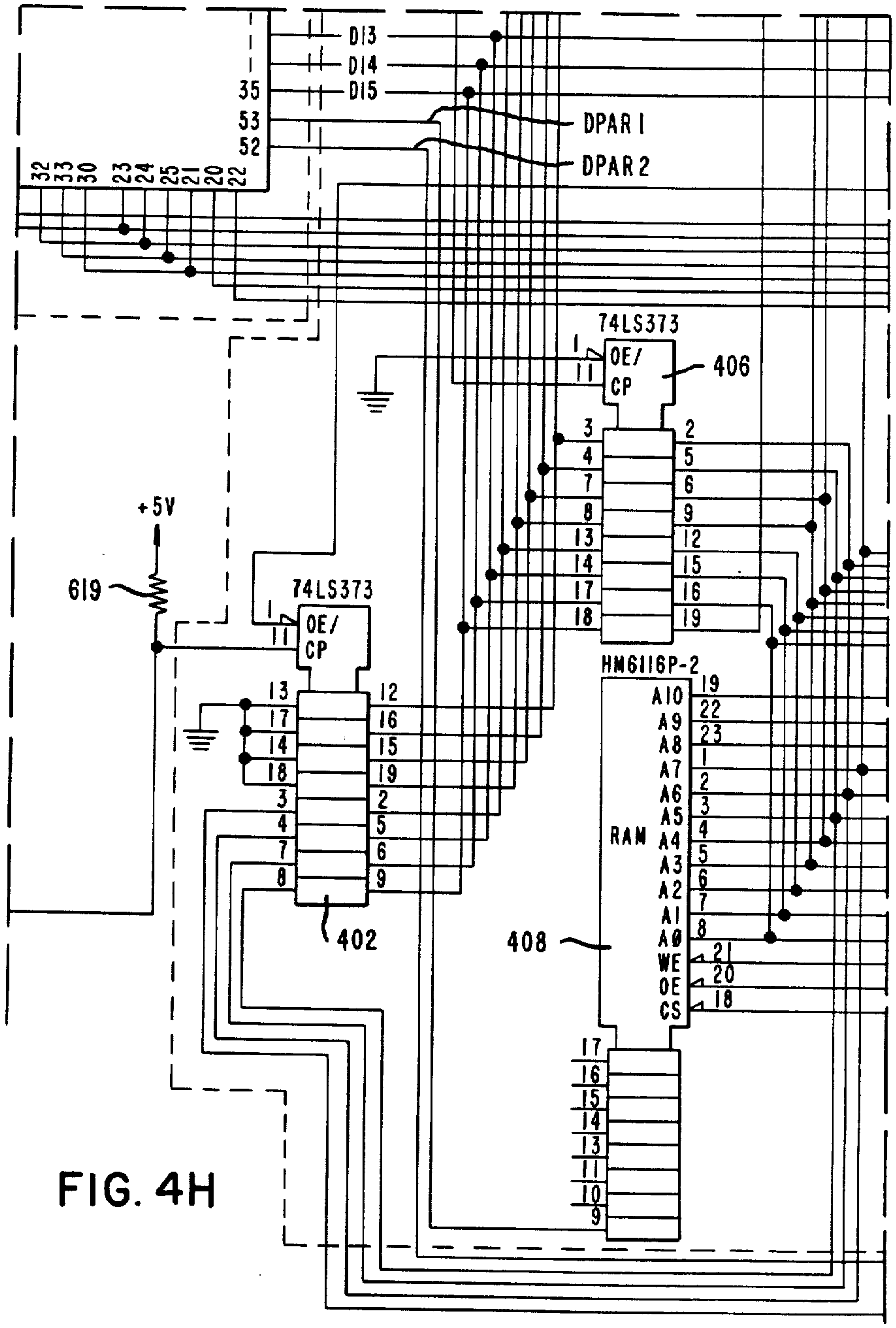
Figure 4I:
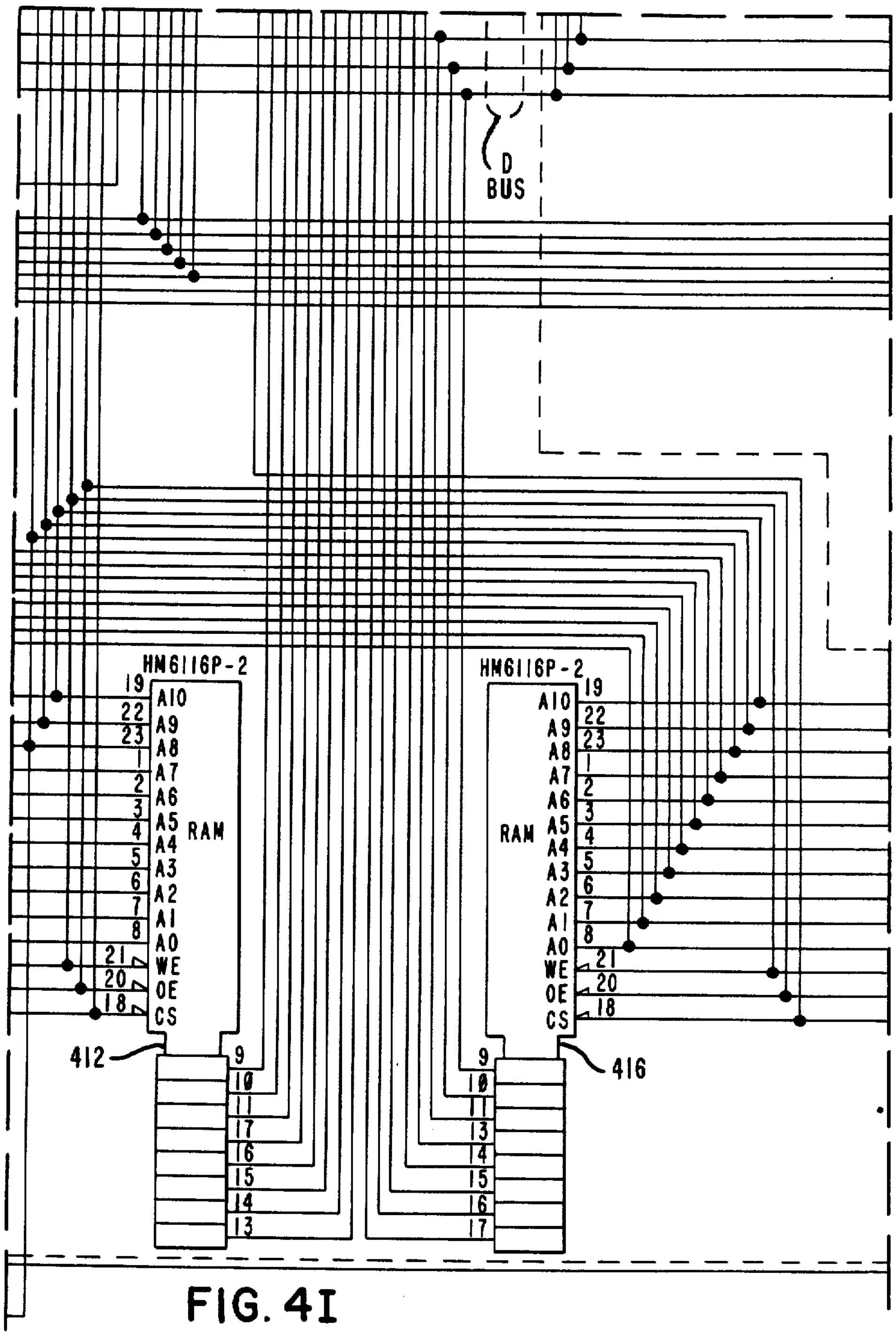
Figure 4J:
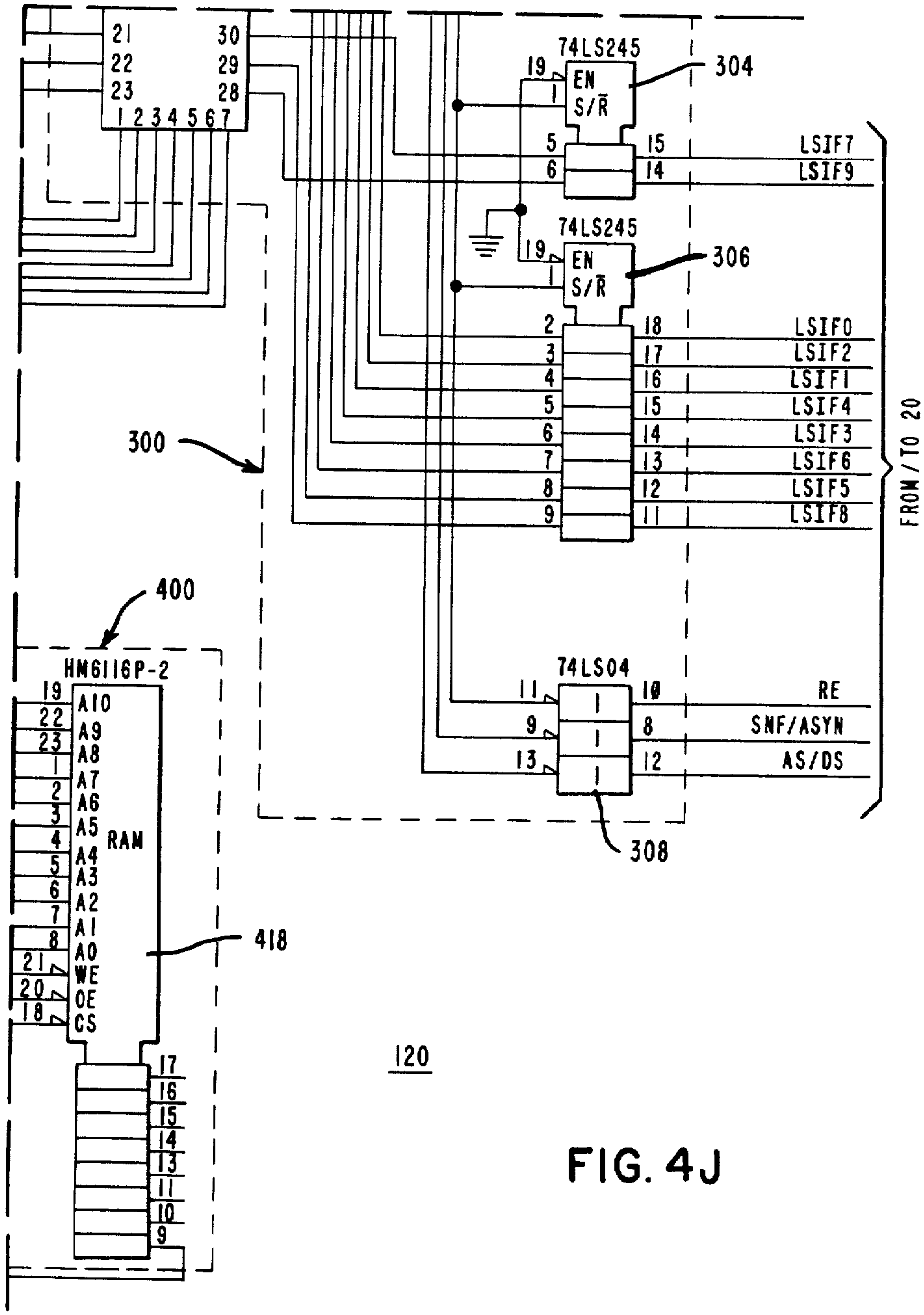
Figure 4K:
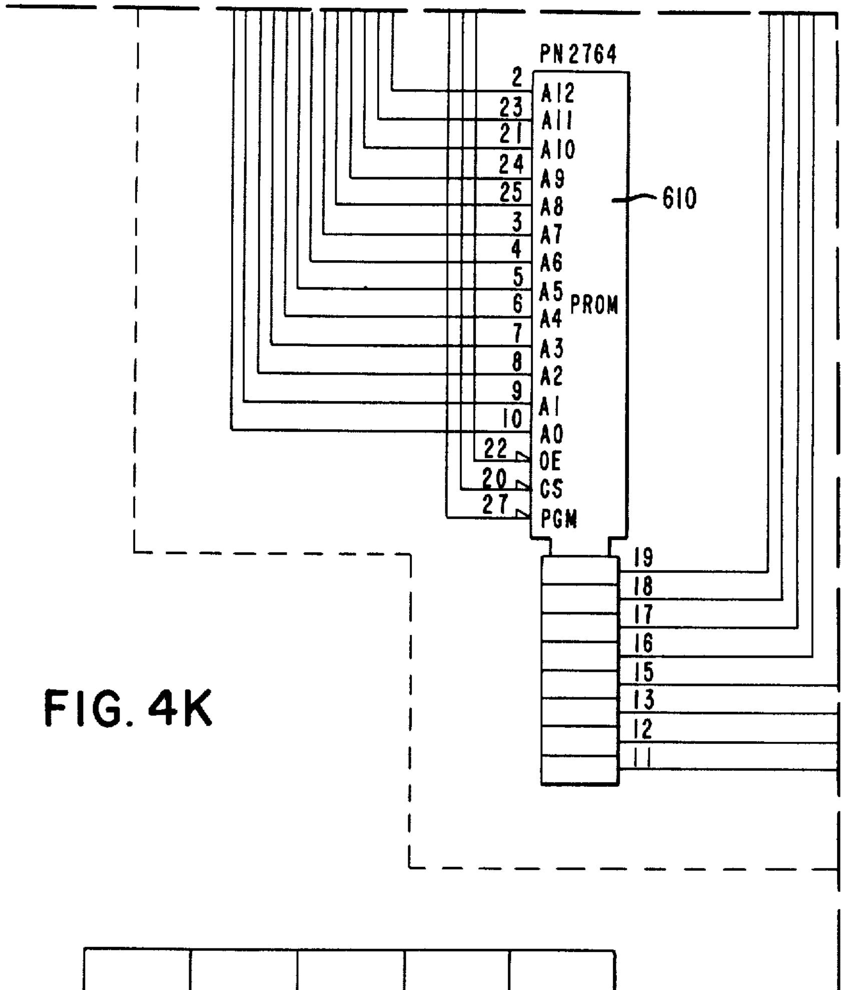
Figure 4:
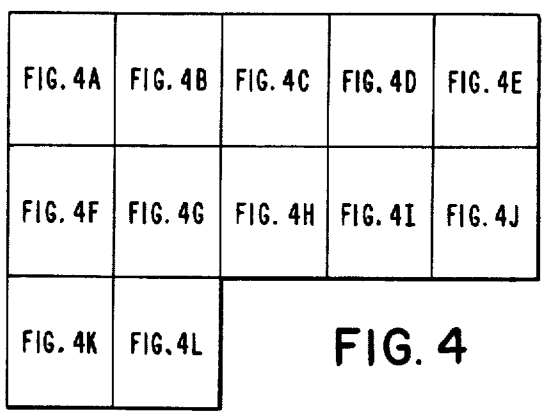
Figure 4L:
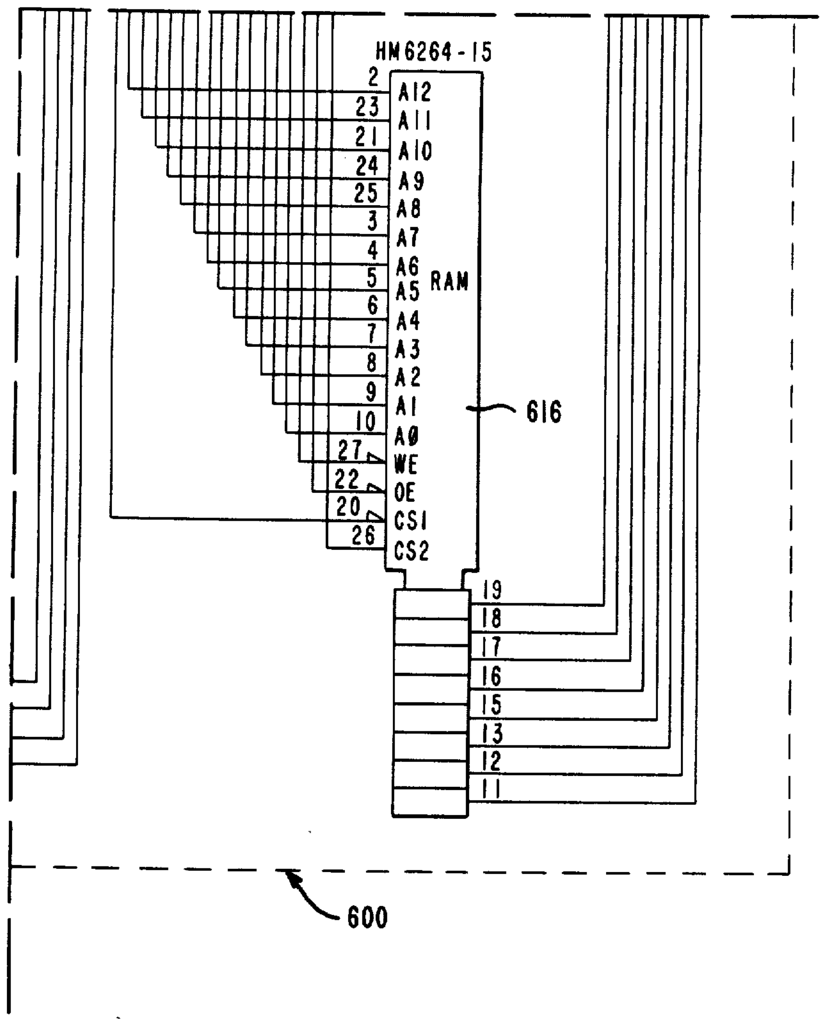

Referring to FIGS. 4A–4L, assembled in accordance with the map of FIG. 4, the multiplexing character processor 120 is shown in integrated circuit (IC) chip schematic form with each of the major numbered blocks, shown with dotted lines therearound, corresponding to the like numbered blocks of FIG. 1. The multiplexing character processor 120 is comprised of three custom IC chips, 502, 302 and 700, with the remaining IC chips being commercially available and identified with industry-standard part numbers.

The Instruction RAM/ROM 600 is a 16-bit wide memory consisting of three 8K words by 8-bits of ultra-violet erasable PROMs 608, 610 and 612. The programming of these PROMs is set forth in Appendix A. Additionally, there is provided three 8K words by 8-bits of static RAMs, 614, 616 and 618. The PROMs used in the preferred embodiment are type 2764 chips manufactured by INTEL, and the RAMs used are HM6264P-15 chips manufactured by HITACHI. The instruction memory 600 in addition to being 16-bits wide is provided with a parity bit for each instruction byte. A programmable array logic unit PAL 606 selects either the PROMs or RAMs as the source/destination of the instruction bus based on the instruction address stored in the latches 602 and 604. The PROM address range is 0000-1FFF in hexadecimal notation. The RAM address range is 2000-3FFF in hexadecimal notation. The PAL 606 and a PAL 410 are PAL 16L8 AND-OR-INVERT gate array chips, of the type manufactured by Monolithic Memories.

The Boolean expressions, using the operators: for the Boolean product, + for the Boolean sum, and / for the Boolean invert; for the PALS 410 and 606 are as follows:

Data Memory Select Logic PAL 410 Boolean Expressions

-continued

| | |
|---|---|
| Pinout: | (1) DA15 (2) DA3 (3) DA2 (4) DA1 (5) DA0 (6) DA11 (7) DA10 (8) 8/16B (9) DWE/ (10) GND (11) DOE/ (12) IDA (13) DB9 (14) DB8 (15) USEL/ (16) IREN/ (17) LSEL/ (18) LNEN/ (19) IRRST/ (20) +5V |
| LNEN = | DA0 · DA1/ · DA2/ · DA3/ · DA10 · DA11 · DOE |
| IREN = | DA0 · DA1 · DA2 · DA3 · DOE |
| IRRST = | DA0 · DA1 · DA2 · DA3 · DWE |
| | IF(DA0 · DA1 · DA2 · DA3 · DOE)1 · DB8 = +5V |
| | IF(DA0 · DA1 · DA2 · DA3 · DOE)1 · DB9 = +5V |
| IDA/ = | DA0/ · DA1/ · DA2/ · DA3/ + DA0 · DA1 · DA2 · DA3 + DA0 · DA1/ · DA2/ · DA3/ + DOE/ · DWE/ |
| USEL = | DA0/ · DA1/ · DA2/ · DA3/ · 8/16B · DA15 + DA0/ · DA1/ · DA2/ · DA3/ · 8/16B/ + DA0/ · DA1/ · DA2/ · DA3/ · DOE |
| LSEL = | DA0/ · DA1/ · DA2/ · DA3/ · 8/16B · DA15/ + DA0/ · DA1/ · DA2/ · DA3/ · 8/16B/ + DA0/ · DA1/ · DA2/ · DA3/ · DOE |

Instruction Memory Select Logic PAL 606 Boolean Expressions

| | |
|---|---|
| Pinout: | (1) IWE/ (2)IOE/ (3) N/C (4) IA0 (5) IA1 (6) IA2 (7) IA3 (8) IA4 (9) IALE (10) GND (11) N/C (12) RAMSEL/ (13) ROMSEL/ (14) N/C (15) N/C (16) N/C (17) N/C (18) N/C (19) IIA/ (20) +5V |
| ROMSEL = | IA0/ · IA1/ · IA2/ |
| RAMSEL = | IA0/ · IA1/ · IA2 |
| IIA = | IA0 · IWE + IA1 · IWE + IA0 · IOE + IA1 · IOE |

The RAM chips are selected by receiving a low signal at their chip select inputs CS (pin 20) which signal emanates at pin 12 of PAL 606. The PROMs are selected by receiving a low signal on their inputs CS (pin 20) which signal emanates at pin 13 of PAL 606. Additionally, PAL 606 will enable the Invalid Instruction Address signal (IIA) on pin 19 when the instruction address exceeds the hexadecimal value 3FFF. The Boolean expressions for PAL 414 are as follows:

Interrupt Register PAL 414 Boolean Expressions

| | |
|---|---|
| Pinout: | (1) CLK (2) IRRST/ (3) FL/ (4) MR/ (5) IIA/ (6) IDA (7) NU (8) N/C (9) CR/ (10) GND (11) IREN/ (12) N/C (13) DB15 (14) DB10 (15) DB14 (16) DBll (17) DB13 (18) DB12 (19) INT/ (20) +5V |
| INT = | DBll · DB10/ + DB12 · DB10/ + DB13 · DB10/ + DB14 · DB10/ + DB15 · DB10/ |
| DB10/ = | MR/ · DB10/ + IRRST |
| DB11/ = | MR + FL/ · DB11/ + IRRST |
| DB12/ = | MR + CR/ · DB12/ + IRRST |
| DB13/ = | +5V |
| DB14/ = | MR + IIA/ · DB14/ + IRRST |
| DB15/ = | MR + IDA/ · DB15/ + IRRST |

Figure 48A:
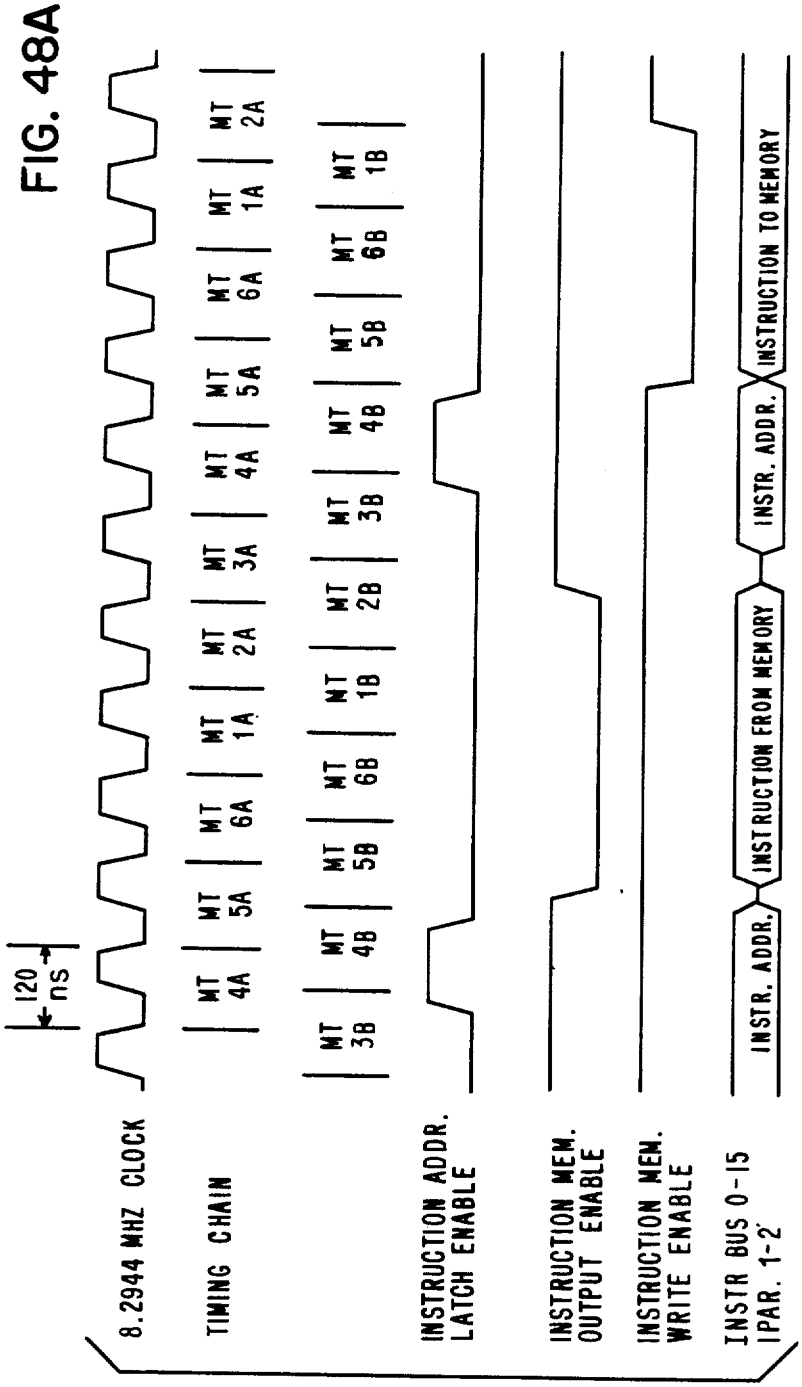
FIGS. 48A-48C illustrate waveforms associated with the operation of the system of FIG. 1 for timing, instruction memory, data bus, scanner bus and the line set interface bus, useful for an understanding of the operation of the invention.

Two 8-bit transparent latches 602 and 604 each receive 8-bits of instruction address from the I-bus and latch that address upon the occurrence of an enabling high signal on their CP inputs (pin 11). (Shown in the timing diagram in FIG. 48A). Upon being latched into the latches, the data is available at the output pins 2, 5, 6, 9, 12, 15, 16 and 19. The output of the latches are held non-tri-state because the OE inputs (pin 1) are strapped low. The high enabling signal, applied to the CP inputs, is generated by the CBuC chip 700 and is provided at the output labeled IALE (pin 66) which is an abbreviation for instruction address latch enable. The input pin 27 labeled PGM for PROMs 608, 610 and 612, and the input pin 26 labeled CS2 for RAMs 614, 616 and 618 are all maintained at a high level by a connection through a 1K ohm resistor, 619, to a +5 volt potential source. Two signals, Instruction Output Enable/ (IOE/) and Instruction Write Enable/ (IWE/) are generated by the CBuC to control reading and writing instructions to/-from the I-bus.

Figure 48B:
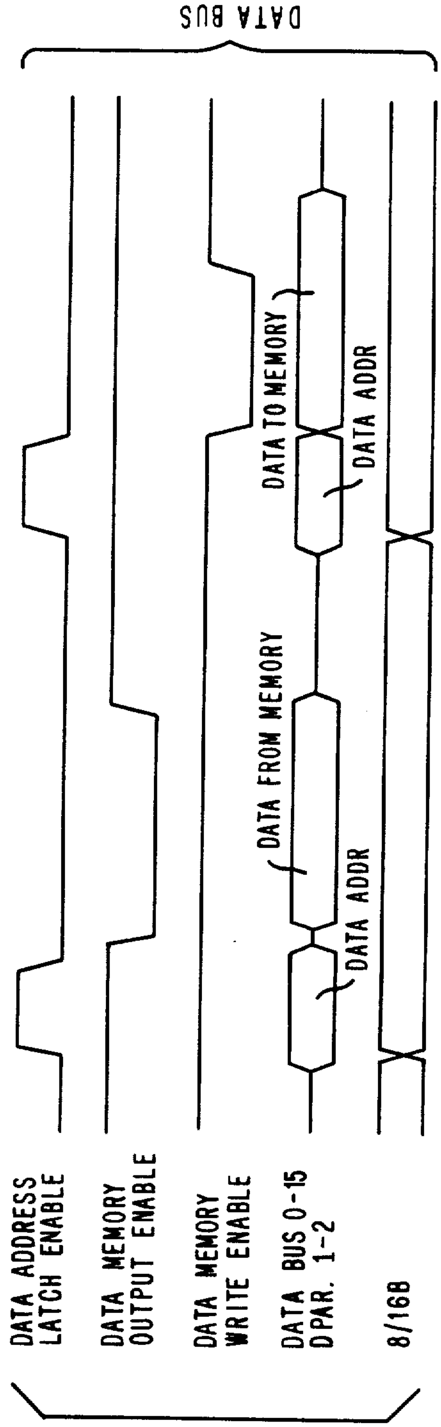

The Data RAM 400 is comprised of four interconnected RAM units 408, 412, 416 and 418. RAMs 408 and 412 provide 8-bits of a 16-bit output with RAMs 416 and 418 providing the remaining 8-bits. The RAMs are HM6116P-2 chips manufactured by HITACHI and are each organized as 2K words by 8-bits. The 16-bit output from these RAMs is directed to the D-bus which interconnects the CPIF 500, the DBS 300, and the CBuC 700. The data RAM 400 is further organized with an even parity bit for each data byte. The data RAM is byte (8-bit) or 16-bit addressable. The least significant byte will reside at an even memory address and the most significant byte of a 16-bit word will reside at an odd memory address. Latches 404 and 406 are each connected to receive 8-bits of address information from the D-bus and operate to latch that information to their respective outputs under control of the data address enable signal. The four high order bits, from the output of latch 404, and the least significant bit of latch 406 are directed to a PAL 410. The PAL 410 also receives three additional inputs from the CBuC 700 on the input pins numbered 8, 9 and 11. These signals, Data Output Enable (DOE/), Data Write Enable (DWE/) and 8/16B control the timing of data transfer to/from the D-bus (see the data bus timing diagram and FIG. 48B). The PAL 410 determines if the data address latched into the latches 404 and 406 is in the range allocated to the data RAMs 412 and 416; or the line number register 402; or the interrupt register PAL 414. The data RAMs are allocated data addresses 0000 through 0FFF in hexadecimal notation. If the data address is not in the range allocated to any of the devices connected to the D-bus, the signal Invalid Data Address (IDA) is made active on output pin 12 of PAL 410. PAL 410 enables the tri-state drivers on its output pins 13–14, and enables the tri-state drivers of PAL 414 when the four high order bits of the data address are all high and the control signal DOE/ is low. PAL 410 resets the register contained in PAL 414 when the four high order bits of the data address are all high and the control signal DWE/ is low. The PAL 414 generates an interrupt signal to the Instruction Execution Unit of the CBuC 700 when one or more of the error or initialization signals are active. The error signals consist of the invalid instruction address generated by the invalid data address generated by PAL 410. The initialization signals consist of Channel Reset (CR/) and Master Reset (MR/) inputted via connector 130, and Force Load (FL/) generated by the CPIF 502. There are 4-bits of addressing data sent to the transparent latch 402, 2-bits of the addressing data come from the latch 406 and the other 2-bits come from the latch 404. These four address bits comprise the line address field of the data address when an instruction utilizing the line space addressing mode (described later) is executed by the CBuC 700. The enablement of latch 402 onto the data bus D8–D15 is achieved under control of the signal emanating from PAL 410, output pin 18. Four inputs (pins 13, 14, 17 and 18) to the latch 402 are strapped to ground. PAL 414 is of the type PAL 16R6 manufactured by Monolithic Memories.

The Communication Processor Interface (CPIF) 500 includes the CPIF chip 502 which is connected to the scanner bus on pins numbered 5–9. The D-Bus is connected to the CPIF chip 502 at the pins numbered 12–24. The front-end processor 140 is connected to the CPIF chip 502 via nine conductors of bus 130. One conductor is dedicated as a parity bit line with the remaining eight conductors being used to transmit 8-bits of data in a bi-directional mode. Two octal bi-directional bus interfaces 506 and 508 control the transmission direction, either in bound or out bound, between the CPIF chip 502 and the front-end processor 140 in response to the signals CB SEL and CB READ applied to their EN and S/$\overline{R}$ inputs, respectively. The parity bit is supplied to the CPIF chip 502 at the pin numbered 29. The remaining 8-bits of data are supplied to the CPIF chip 502 at the pins numbered 30–37. The input of a hex inverter 504 is connected to pin 4 of the CPIF chip 502 and provides at its output the signal designated REQUEST/.

The Data Bit Synchronizer (DBS) 300 includes the DBS chip 302 which is connected to the scanner bus at the pins numbered 1–7. The bus 20 is interfaced to the DBS chip 302 by a pair of octal bi-directional bus interfaces 304 and 306. In the preferred embodiment of the invention interface chips 304, 306, 506 and 508 are 74LS245 chips.

A hex inverter 308 has its inputs connected to pins 25–27 of the DBS chip 302 to provide at its output the signals designated Read Enable (RE), SNF/ASYN and AS/DS which signals are directed over bus 20 to the line set interfaces 100 (See FIG. 2A).

Detailed Description of DBS Chip 302

Figure 5A:
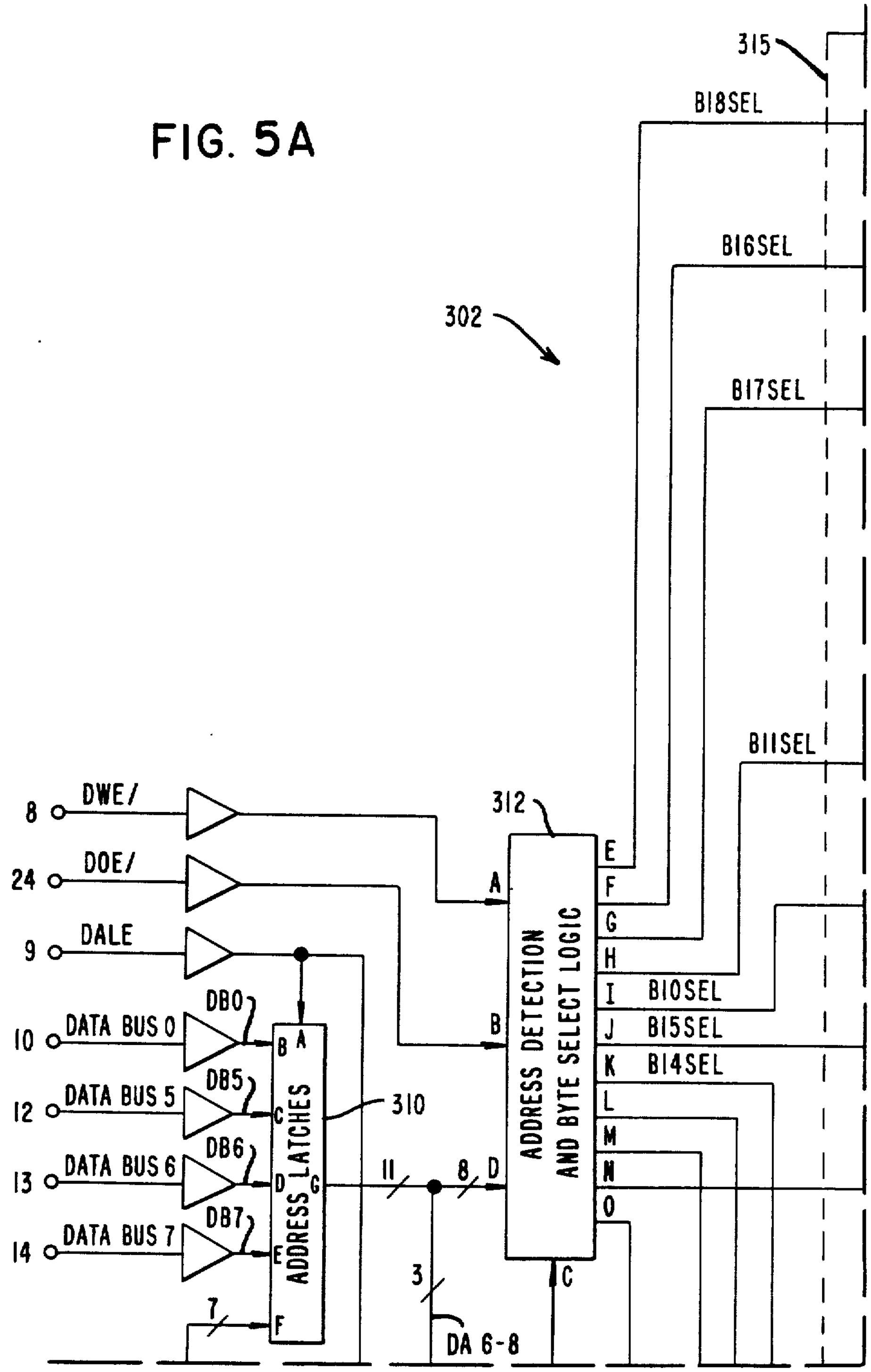
FIGS. 5A-5H, assembled in accordance with the map of FIG. 5, illustrate in schematic form, a data bit synchronizer (DBS) chip 302 which is the main part of block 300 in FIG. 1.
Figure 5B:
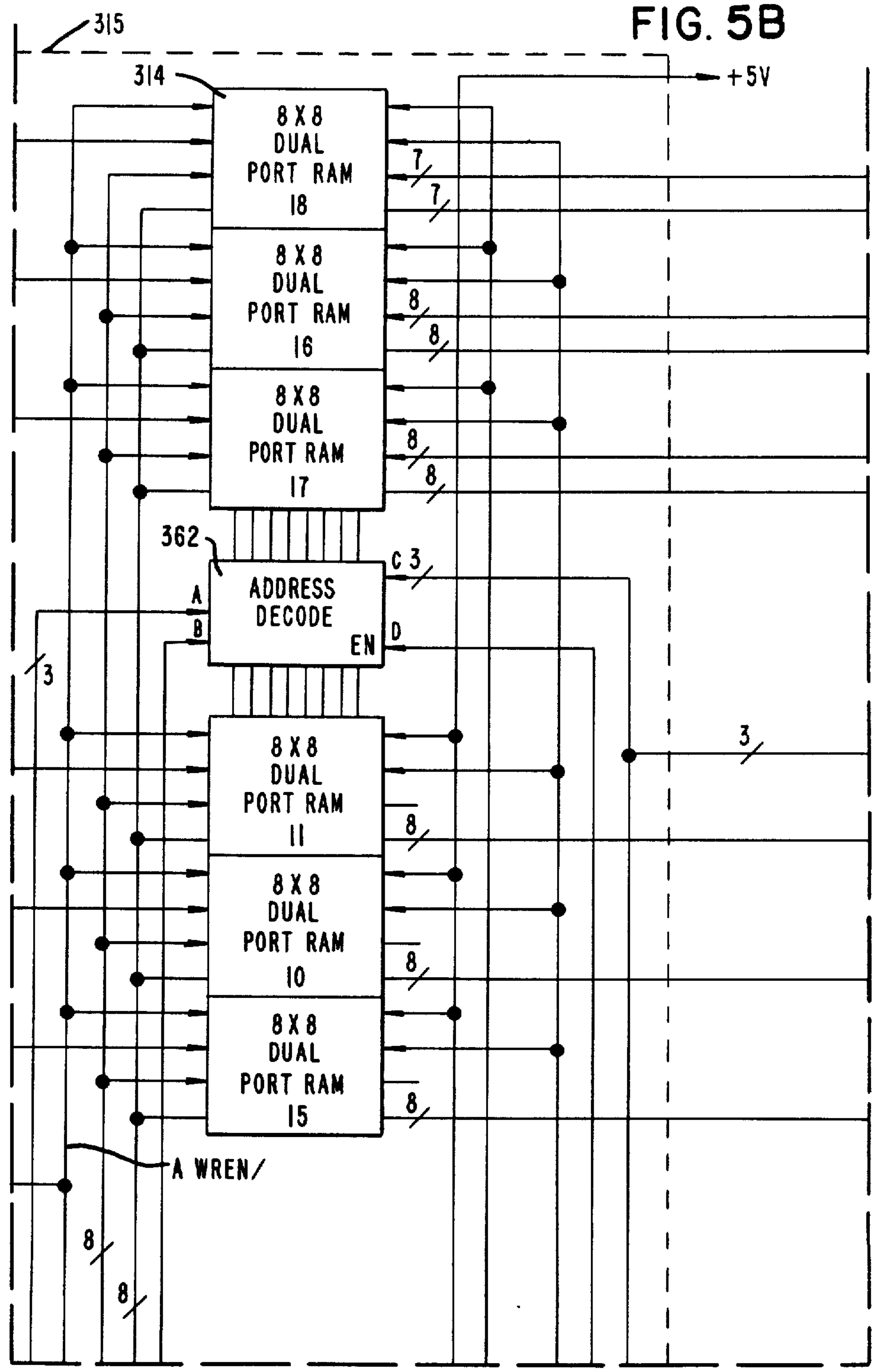
Figure 5C:
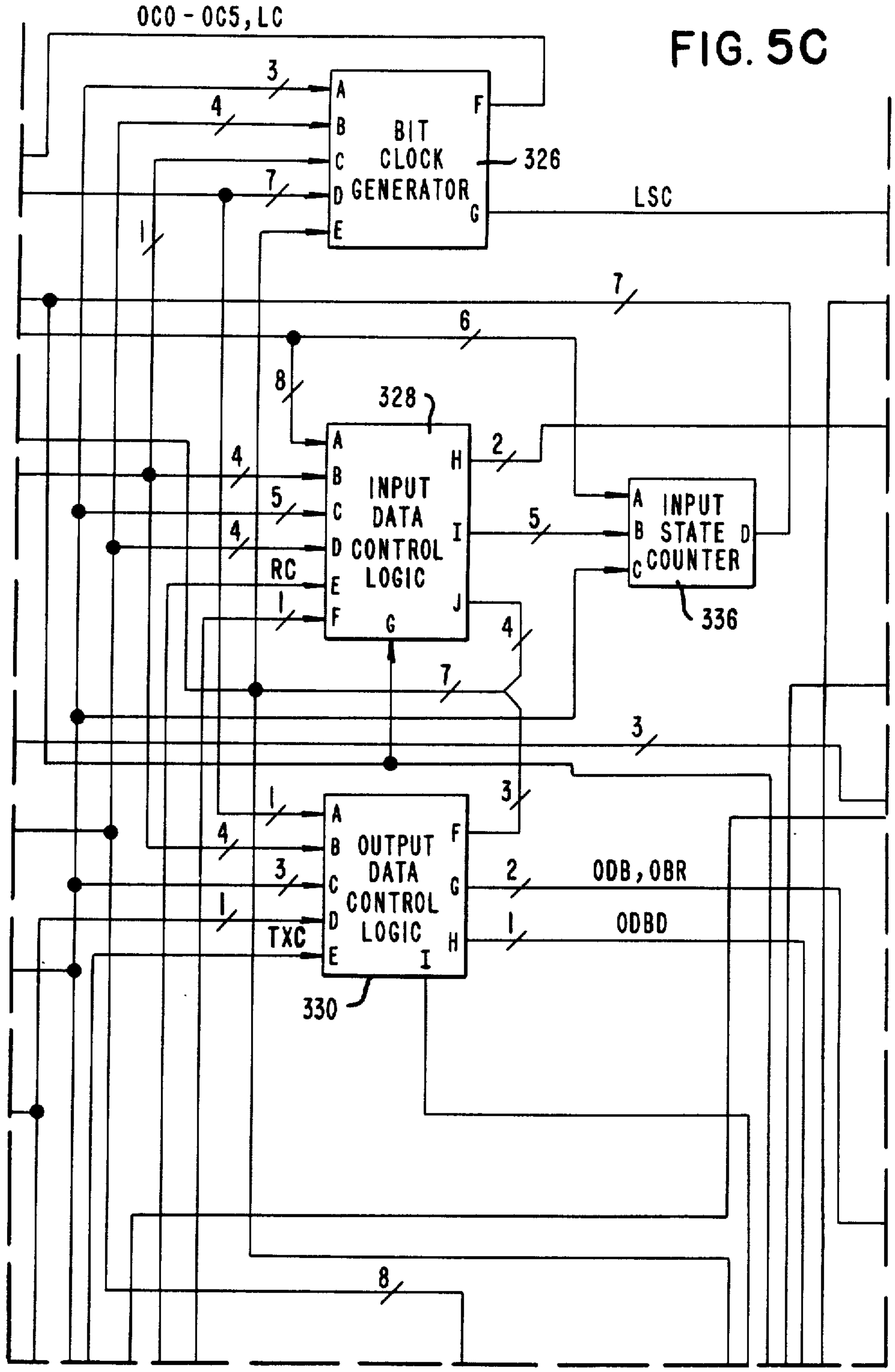
Figure 5D:
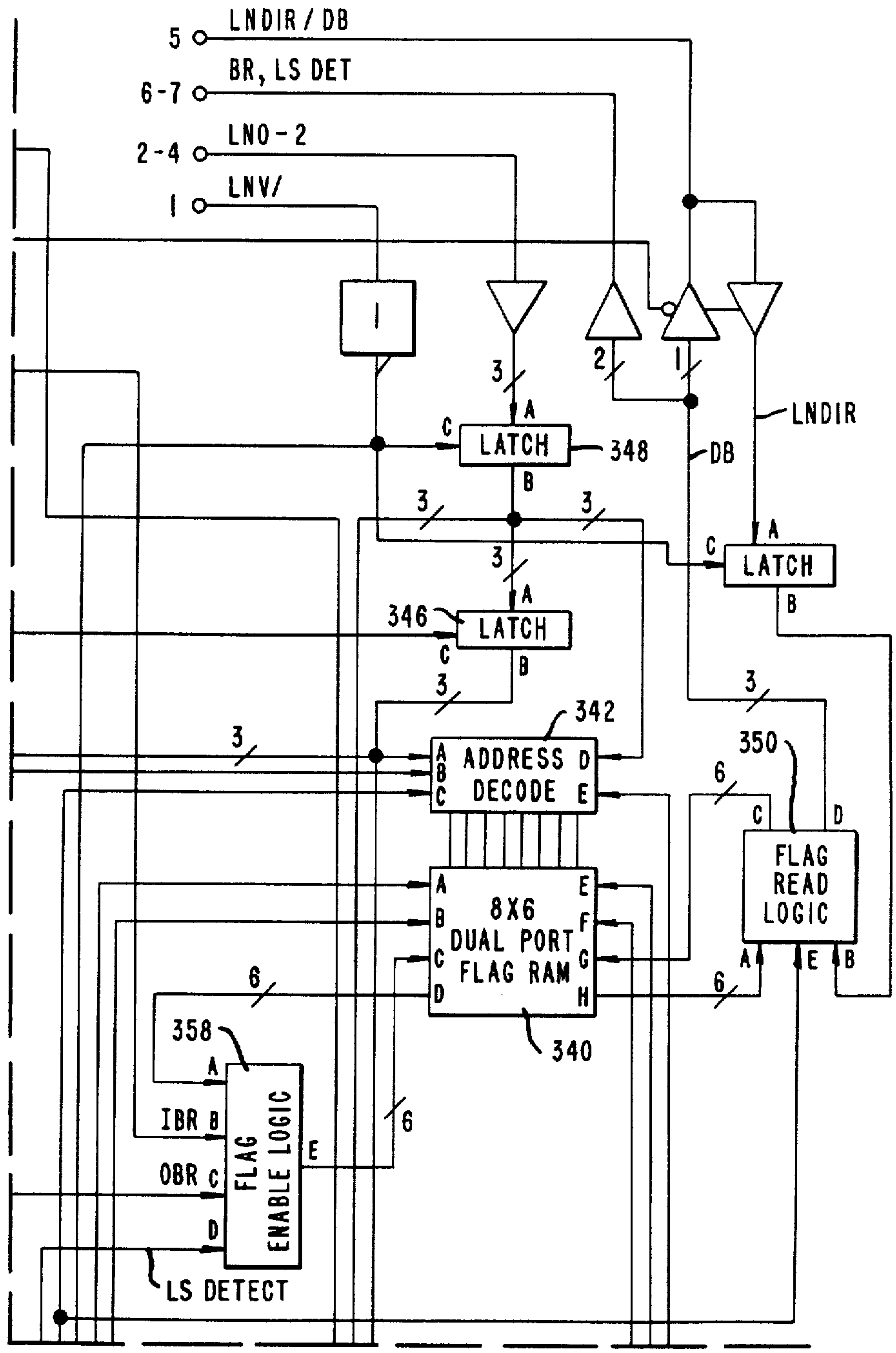
Figures 5, 5E:
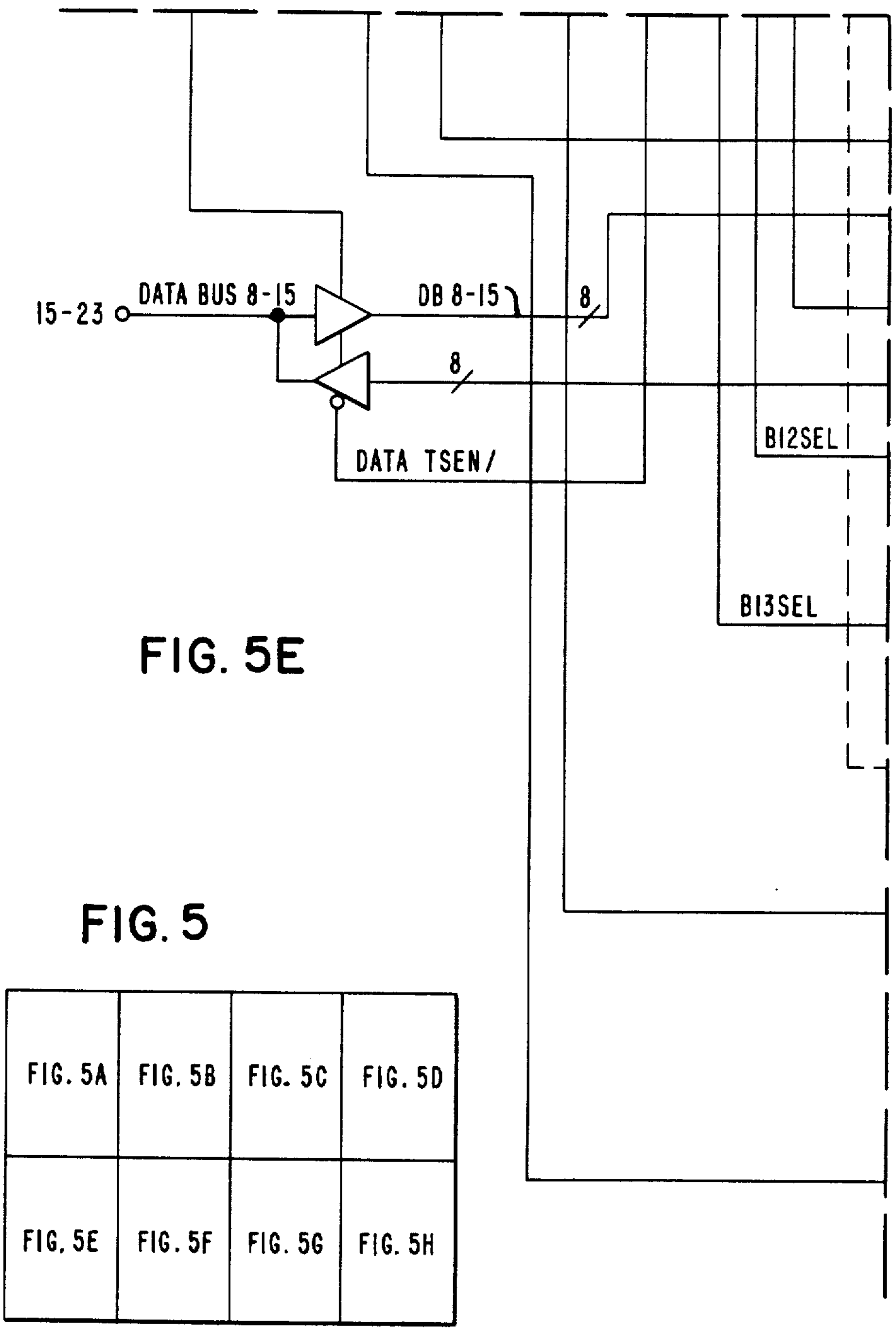
Figure 5F:
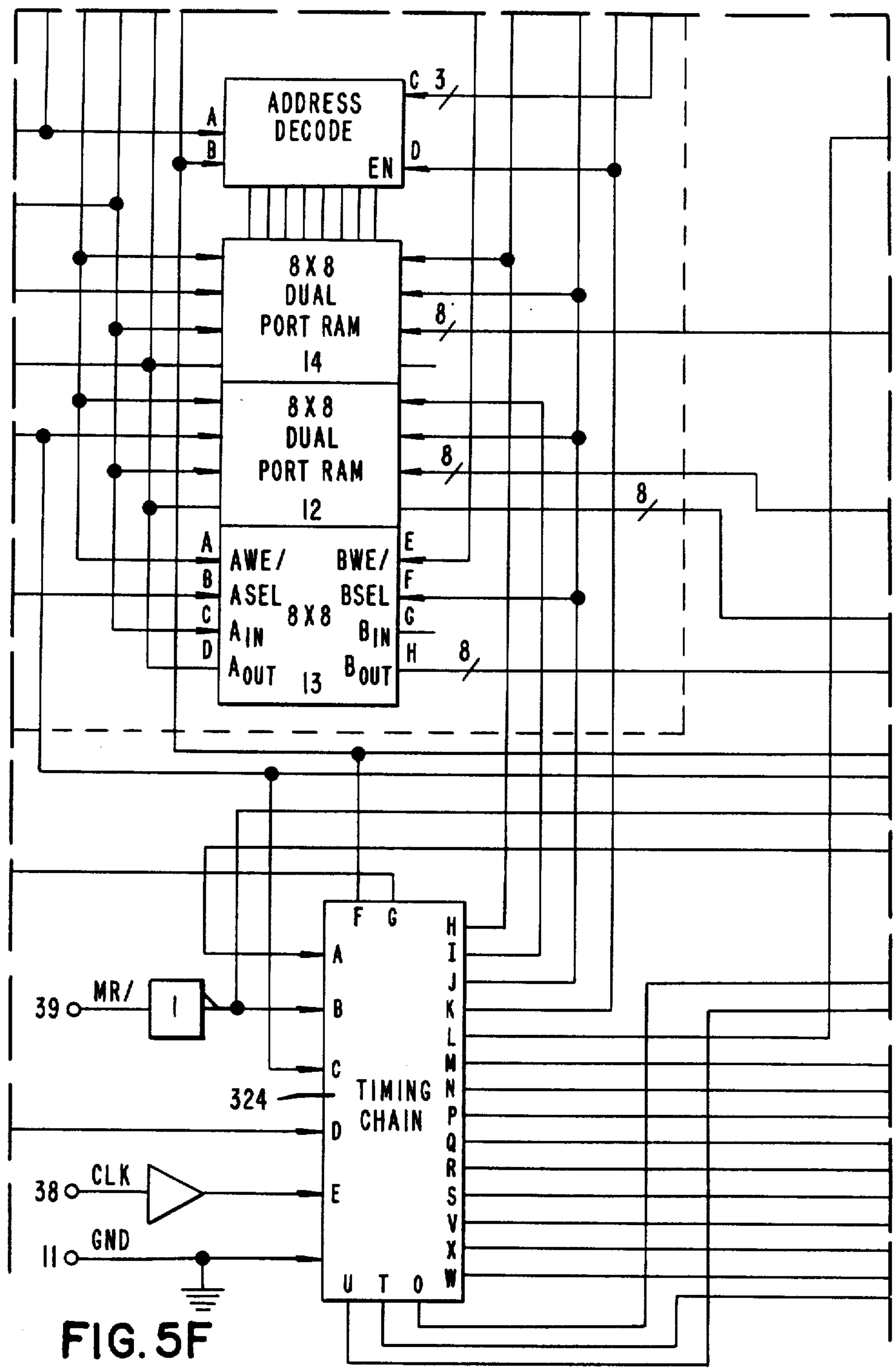
Figure 5G:
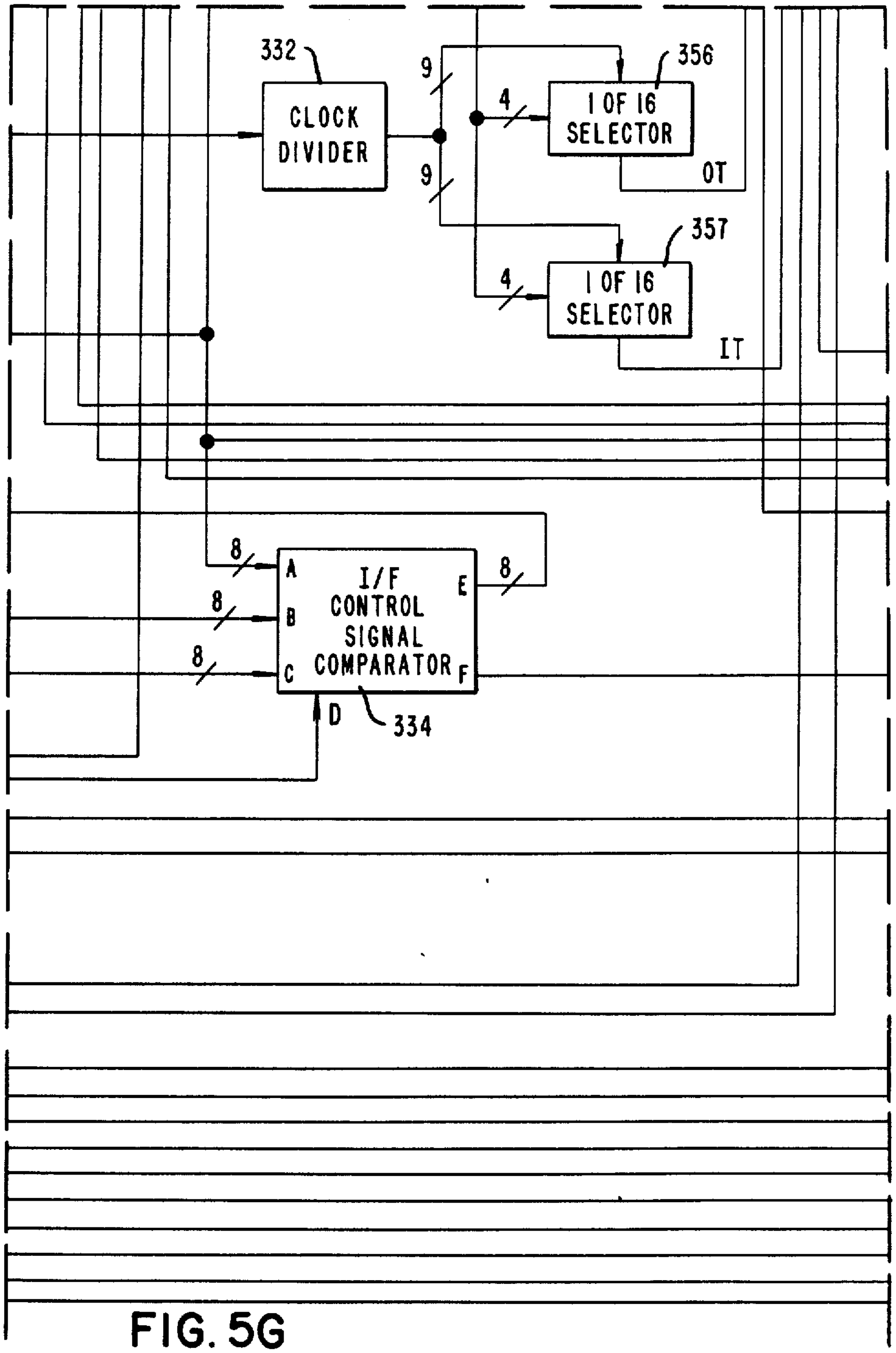
Figure 5H:
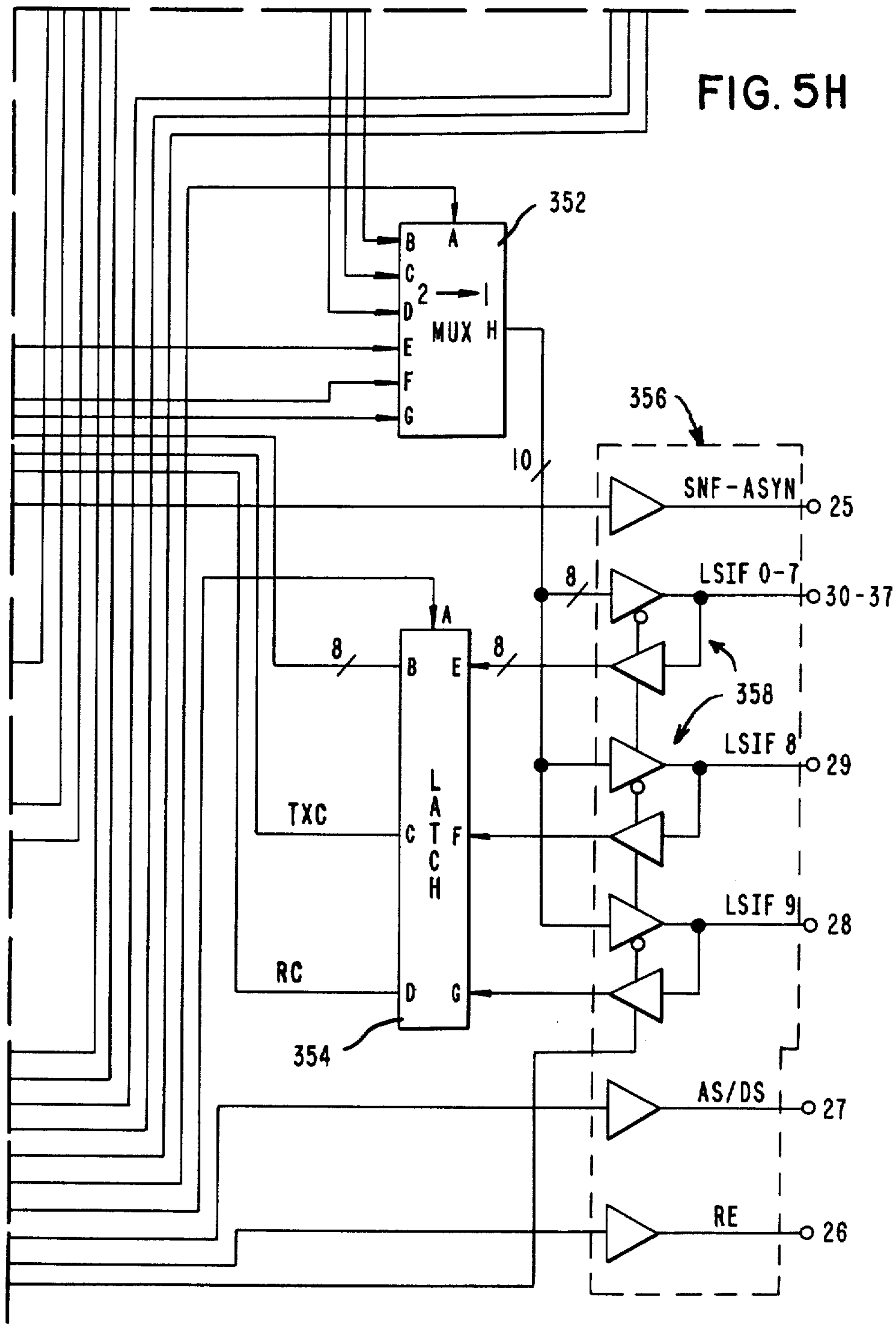

Referring now to FIGS. 5A–5M, assembled in accordance with the map of FIG. 5, the DBS chip 302 is shown in block diagram form with the pin numbering corresponding to like numbered pins shown in FIGS. 4E and 4J. The DBS chip performs input data detection, output data bit synchronization, interface control signal monitoring and baud rate clock generation for up to eight full duplex communication lines.

The major elements of the DBS are control/status dual port RAM 315, bit rate clock generator 326, input data control logic 328, output data control logic 330, interface signal comparator 334, flag RAM 340 and, timing chain 324.

The dual port RAM 315 consists of eight 72-bit words which contain the control and status information of each of the communications lines. The bit rate clock generator, input data control logic, output data control logic, and interface signal comparator are time multiplexed to control the eight communication lines. The flag RAM 340 is used to buffer flags to be presented on the scanner bus.

The DBS chip 302 interfaces to the communications base microcontroller chip 700 (CBuC) via the D-bus and the scanner bus. The D-bus accesses the control/status dual port RAM 315; allowing the CBuC to configure the protocol and line speed parameters, and access the input and output interface control signals. The scanner (flag) bus is used by the CBuC to solicit flags (i.e. Bit Request, Line Signal Detect) from the DBS chip 302. The sequence in which the CBuC scans lines on the scanner bus determines the sequence in which the DBS scans the communications lines on the line set interface bus 20. The DBS performs a full duplex scan; whereas the CBuC performs a half duplex scan. This feature allows the CBuC to be configured such that the scan rate of the line is twice the processing rate in the CBuC. The DBS connects up to eight line set interface circuits via the line set interface bus 20.

Figure 48C:
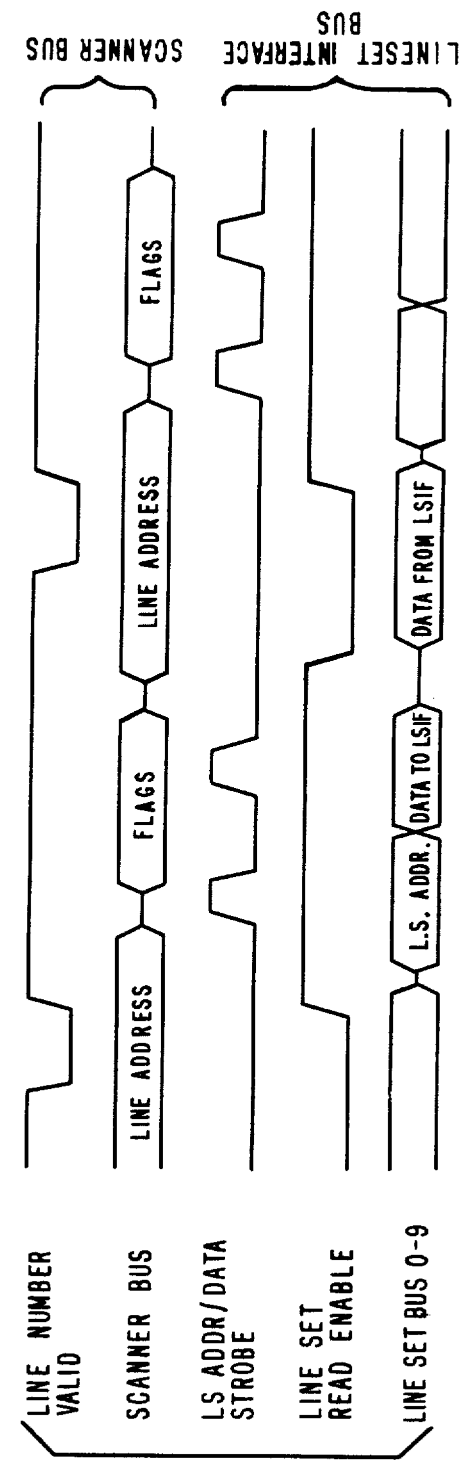

The system clock rate of 8.2944 megahertz is divided into a six-phase timing chain which yields a 723.4 nanosecond machine cycle. A scan may be performed during each cycle. The scanner bus is time sliced into two phases (see the timing diagram of FIG. 48C). The CBuC presents the line number to be scanned on the scanner bus and strobes it to the DBS with a Line Number Valid (LNV) signal. The DBS reads the pending flags for the specified line number from the flag RAM 340 and presents the flags on the scanner bus during the time slot allocated for flag access. The line number is used as a scan address on the line set interface bus and is used to address the 72-bit word from the control/status dual port RAM. The 72-bit word contains the control and previous state of the hardware sequencers for the communications line. The previous state (from the RAM) and current state (from the line set interface) is propagated through the sequencers. The result is the next state which is stored back in the RAM and the next flags which are stored in the flag RAM.

Timing Chain 324

Figure 6:
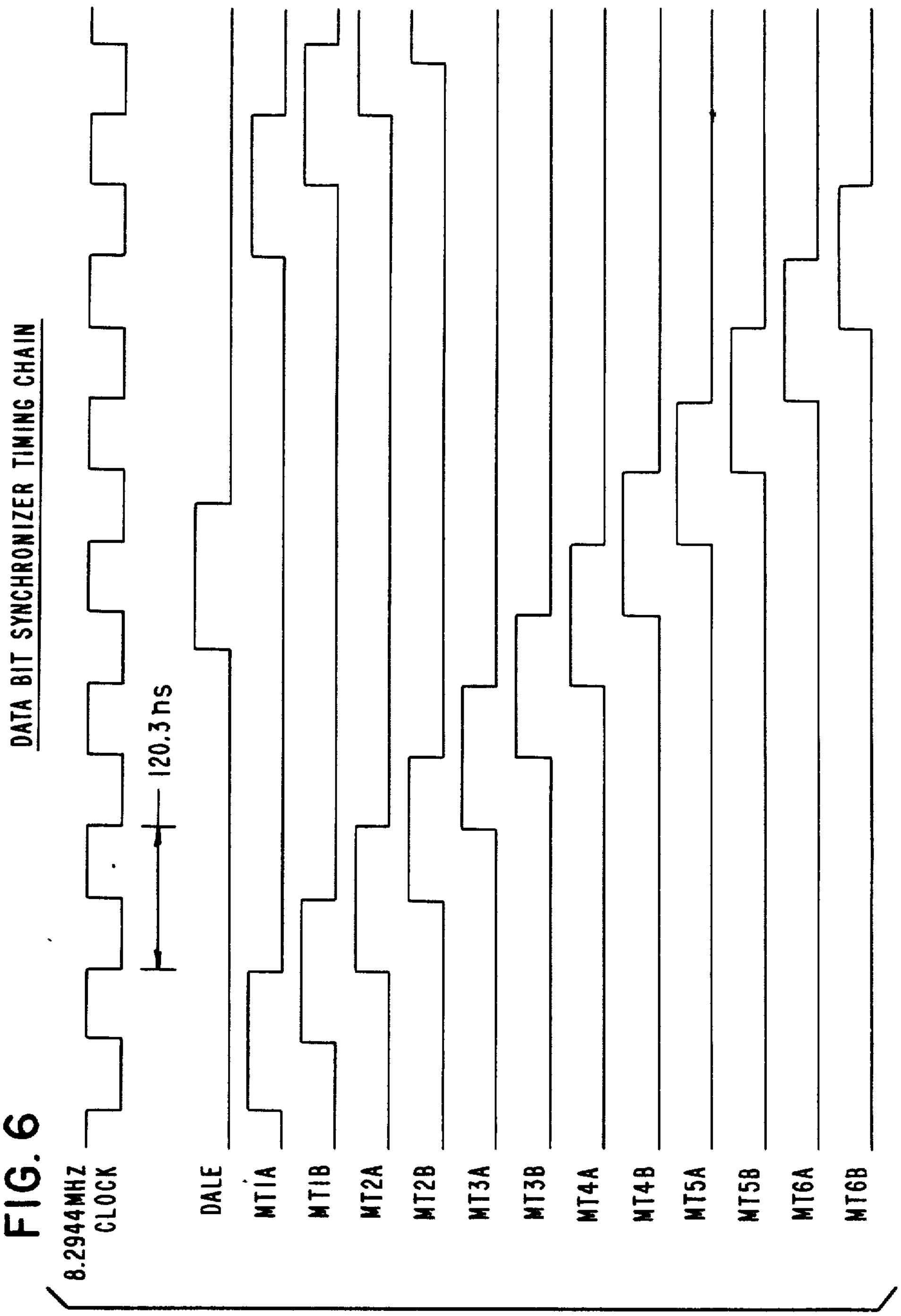
FIG. 6 illustrates a set of data bit synchronizer timing signals useful for an understanding of the operation of the present invention.

The timing chain internally generates twelve phases of the 8.2944 megahertz system clock. The clock phases, labeled MT1A–MT6B are shown in the timing diagram of FIG. 6. The MT1A, MT2A, . . . MT6A phases are the outputs of a shift register (not shown) which is clocked on the falling edge of the system clock. The MT1A, MT2A, . . . MT6A phases correspond to the MT1–MT6 timing chain contained in the CBuC. The MT1B, MT2B, . . . MT6B phases are the outputs of a shift register which is clocked on the rising edge of the system clock. The Data Address Latch Enable (DALE) signal is inputted to the DBS timing chain so that it is synchronized to the timing chain in the CBuC. The DALE signal nominally occurs at the MT4 phase of the CBuC. The DALE signal is latched by the DBS on the rising edge of the system clock to generate the MT4B phase. The MT4B signal is latched on the falling edge of the system clock to generate the MT5A phase, and so on. The DALE signal is generated by the CBuC every MT4 so that the timing chain runs continuously.

Figure 7A:
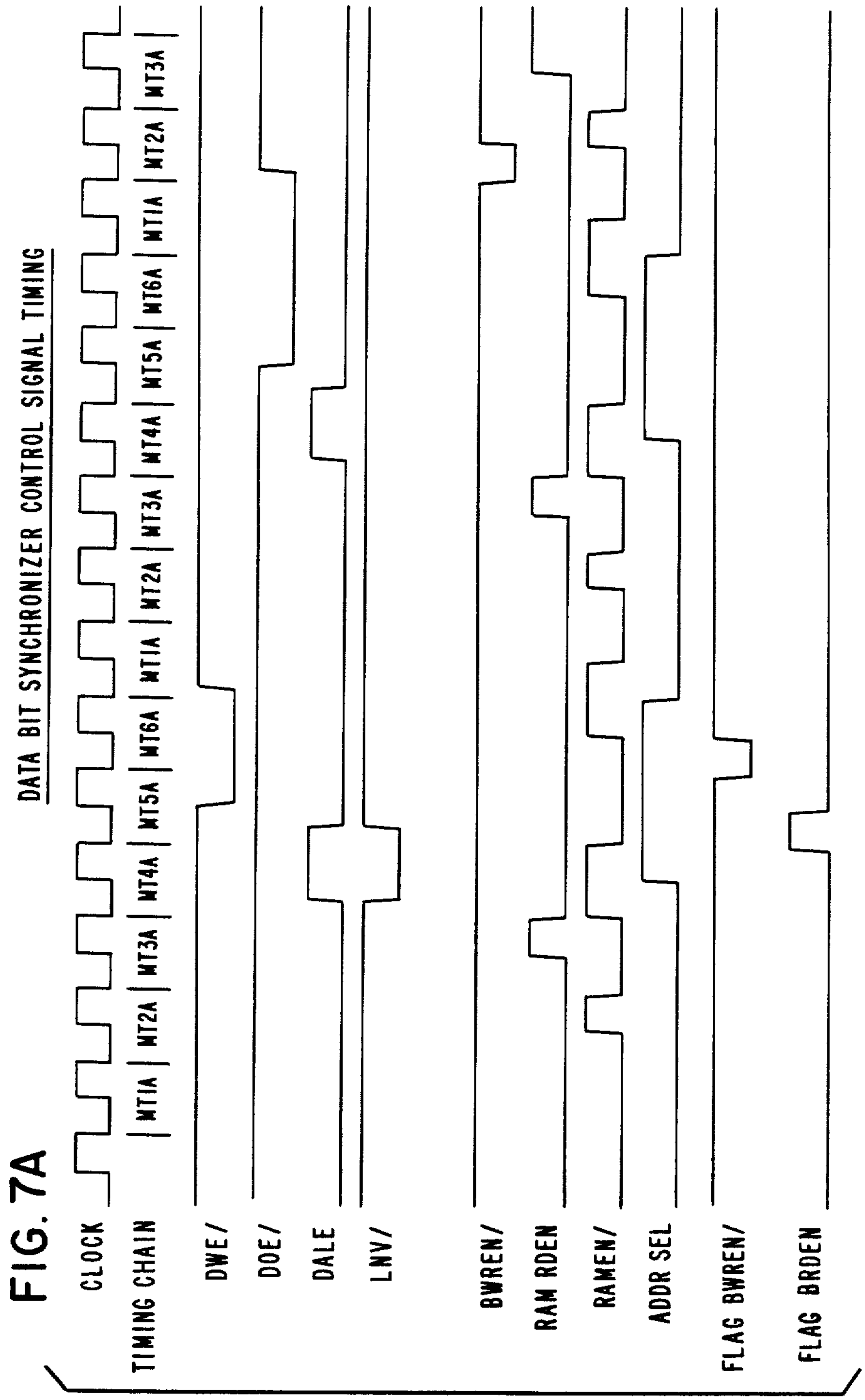
FIGS. 7A and 7B illustrate a set of data bit synchronizer control signals useful for an understanding of the operation of the present invention.
Figure 7B:
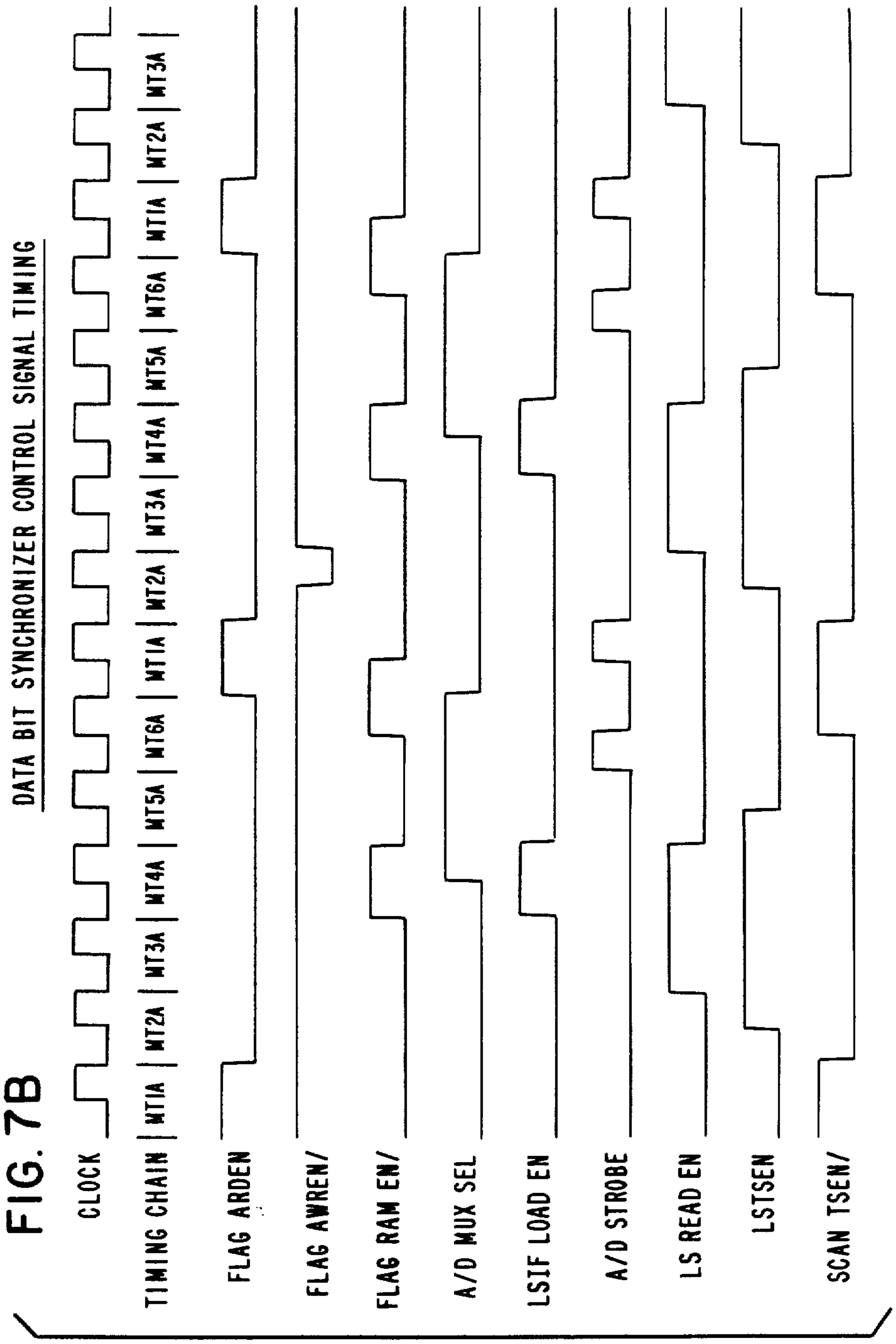

Logical combinations of the timing phases provide time elements for the control signals which are outputted from the timing chain 324. The control signals are defined by the following logic equations and are illustrated in the timing diagram of FIGS. 7A and 7B.

| Pin Letter | Name |
|---|---|
| | Inputs to 324: |
| A | LNV/ |
| B | MR/ |
| C | B12SEL |
| D | DALE |
| E | CLK |
| | Outputs from 324: |
| H | BRWEN/ = (LINE ACTIVE · MT1B · MT2A)/ BRWEN/ is the B port write enable signal to bytes 14, 16–18 of the control/status RAM. |
| I | BWREN 12/ = (LINE ACTIVE · MT2A · B12SEL/)/ BRWEN12/ is the B port write enable signal to byte 12 of the control/status RAM. |
| J | RAM RDEN = MT3A · MT3B RAM RDEN is the B port read enable signal to the control/status RAM. |
| K | RAMEN/ = MT2A · MT2B + MT4A + MT6B RAMEN/ is the address decode enable to the control/status RAM. |
| F | ADDR SEL = MT4B + MT5A + MT5B + MT6A ADDR SEL is the address MUX select to the control/status RAM and the flag RAM. A logical "1" selects the A port address. |
| Q | FLAG BWREN/ = (LINE VALID · MT5B · MT6A + MR)/ FLAG BWREN/ is B port write enable for the flag RAM. Where intermediate term LINE VALID = LNV + LINE VALID · MT3B/ · MR/ |
| P | FLAG BRDEN/ = LINE VALID · MT4B · MT5A FLAG BRDEN is the B port write enable for the flag RAM. |
| N | FLAG ARDEN = MT3A · MT3B FLAG ARDEN is the A port read enable for the flag RAM. |
| M | FLAG AWREN/ = LINE ACTIVE · MT1B FLAG AWREN/ is the A port write enable for the flag RAM. Where intermediate term, LINEACTIVE = LINE VALID LINEACTIVE · MR/ · (MT2A · MT2B)/ |
| R | FLAG RAM EN/ = MT4A + MT6B FLAG RAM EN/ is the address decode enable for the flag RAM. |
| S | A/D MUX SEL = MT4B + MT5A + MT5B + MT6A A/D MUX SEL is the select line to the multiplexer driving address and output data to the line set interface bus. A logic 1 seleets the address. |
| V | LSIF LOAD EN = MT4A LSIF LOAD EN is the load pulse to the latches containing input signals from the line set interface bus. |
| X | A/D STROBE = MT5B · MT6A + MT1A · MT1B A/D STROBE is a control signal for the LSI/F bus which designates valid address and data. The line set interface recognizes the first pulse of this signal following the LS READ EN signal as the strobe for the read and write address and the following pulse as the strobe for data. |
| W | LS READ EN = MT3A + MT3B + MT4A LS READ EN is a control signal for the LSI/F bus which enables the tri-state drivers of the LSIF which was selected by the read address. |
| T | LSTSEN = MT2B + MT3A + MT3B + MT4A + MT4B LSTEN is the tri-state enable to the bi-directional drivers for the LSI/F bus. |
| U | SCAN TSEN/ = MT6B + MT1A + MT1B SCAN TSEN/ is the tri-state enable to the bi-directional driver on the scanner bus. |
| G | MT5B Timing signal used to generate AWREN/ from 312. |
| L | MT1B Clock for the clock divider circuit 332. |
| O | MT2B Timing signal used to latch scan address. |

Control/Status RAM 315

Figure 8A:
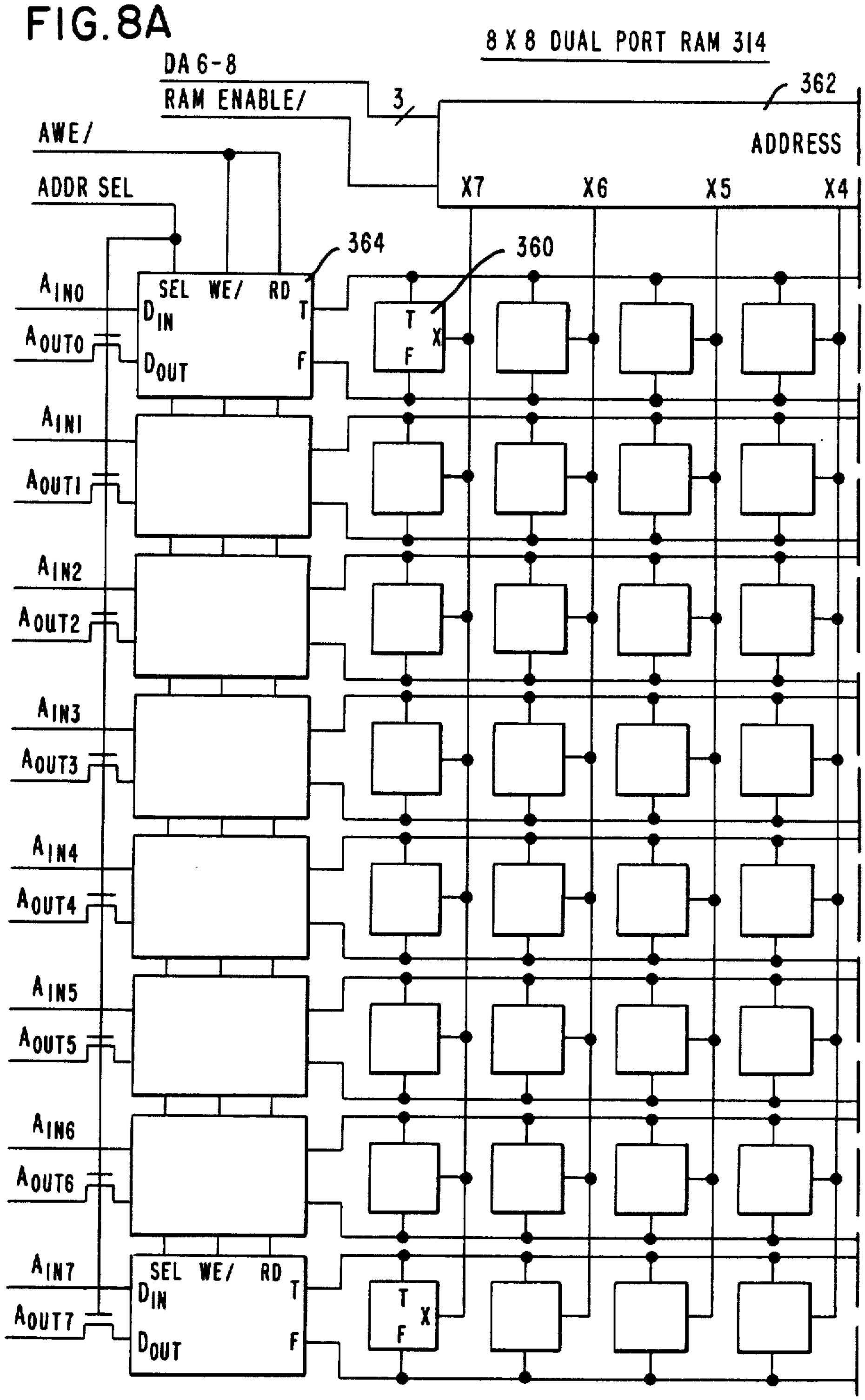
FIGS. 8A and 8B illustrate, in schematic form, one of nine control/status RAMs used in the DBS of FIGS. 5A-5H.
Figure 8B:
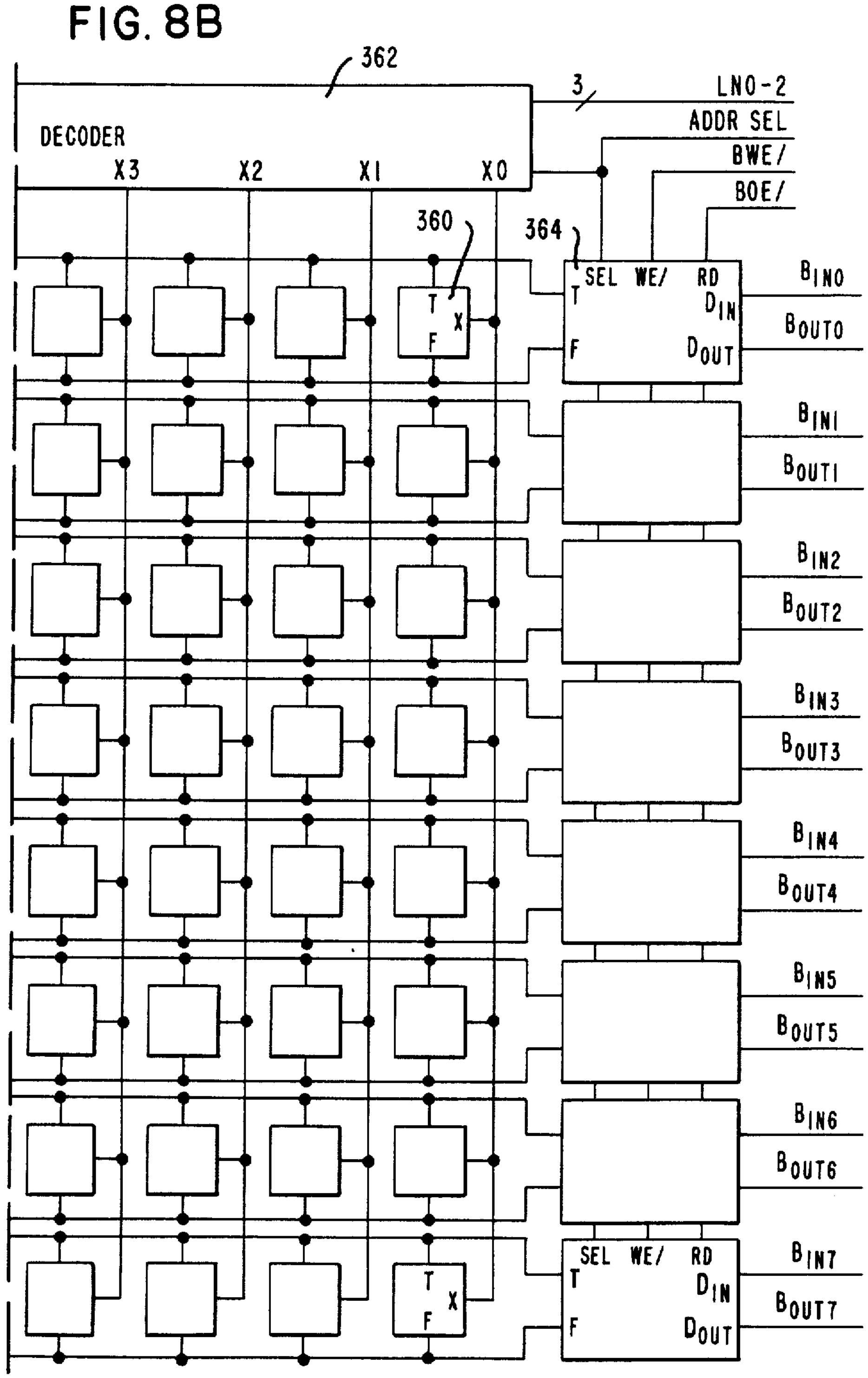

The control/status RAM consists of nine 8×8 pseudo dual port RAMs 314 and two address decode circuits 362. Write driver and sense amps are provided for both the A port and the B port. The address decode and bit lines are time shared between the A and B ports. A block schematic of the 8×8 RAM 314 with address decode 362 is shown in FIGS. 8A and 8B.

Figure 11:
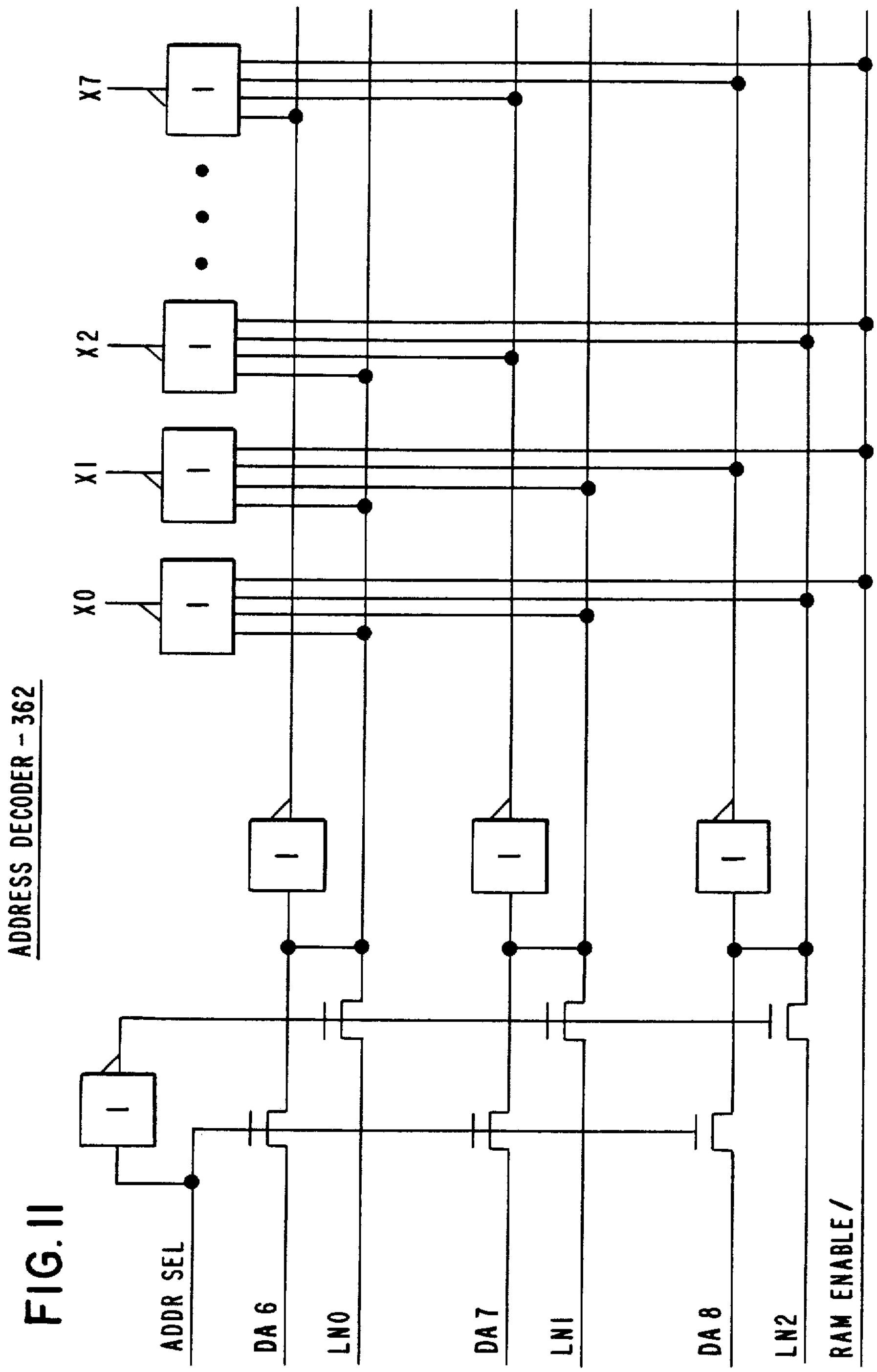
FIG. 11 illustrates, in schematic form, the address decoder used in the RAM of FIGS. 8A and 8B.

The RAM 314 is comprised of a matrix of 64-bit cells 360. One bit cell 360 is shown in detail in FIG. 9, comprised of cross-coupled inverter pairs 3601 with a field effect transistor connected to each inverter output. The gates of the field effect transistors are connected to receive an enable bit X from the address decode circuit 362 of FIGS. 8A and 8B and one electrode from each of the field effect transistors is connected to receive the signals on the conductors T and F, respectively, from a sense amplifier and bit driver circuit 364. The circuit 364 is shown in detail in FIG. 10 comprised of cross-coupled sense amplifiers 3641 for performing a latching function, drivers 3642, a pair of NOR gates 3643, and FET pairs 3644 and 3645. When the SEL and RD signals are active, the sense amplifier 3641 and the driver 3642 are connected to the RAM bit cells 360 by means of the conductors labeled T and F and data, D-OUT, is read out. When the SEL signal is active and when the signal WE/ is active, the signal D-IN is applied to the bit cell 360 over the conductors T and F. FIG. 11 illustrates, in logic diagram form, the address decoder 362. The decoder 362 functions to transform the DA signals 6, 7 and 8 to one of the row select signals $X_0$ through $X_7$.

The B port data input and output signal names are summarized in the following chart:

| Control/Status RAM B Port Signal Definitions | 0 | 1 | 2 | 3 | 4 | 5 | 6 | 7 |
|---|---|---|---|---|---|---|---|---|
| | | | Byte 10 - Control Byte 1 | | | | | |
| D-IN | — | — | — | — | — | — | — | — |
| D-OUT | IF1 | IF2 | IF3 | NRZI | DW | LCEN | IA | OA |
| | | | Byte 11 - Control Byte 2 | | | | | |
| D-IN | — | — | — | — | — | — | — | — |
| D-OUT | IBR0 | IBR1 | IBR2 | IBR3 | OBR0 | OBR1 | OBR2 | OBR3 |
| | | | Byte 12 - Input Interface Signal Mask | | | | | |
| D-IN | NSM0 | NSM1 | NSM2 | NSM3 | NSM4 | NSM5 | NSM6 | NSM7 |
| D-OUT | ISM0 | ISM1 | ISM2 | ISM3 | ISM4 | ISM5 | ISM6 | ISM7 |
| | | | Byte 13 - Input Interface Signal Condition | | | | | |
| D-IN | — | — | — | — | — | — | — | — |
| D-OUT | IIC0 | IIC1 | IIC2 | IIC3 | IIC4 | IIC5 | IIC6 | IIC7 |
| | | | Byte 14 - Input Interface Signal Byte | | | | | |
| D-IN | IIS0 | IIS1 | IIS2 | IIS3 | IIS4 | IIS5 | IIS6 | RD |
| D-OUT | — | — | — | — | — | — | — | — |
| | | | Byte 15 - Output Interface Signal Byte | | | | | |
| D-IN | — | — | — | — | — | — | — | — |
| D-OUT | OIS0 | OIS1 | OIS2 | OIS3 | OIS4 | OIS5 | OIS6 | OIS7 |
| | | | Byte 16 - Input Sequencer Status | | | | | |
| D-IN | N0 | N1 | N2 | N3 | N4 | PID | PCT | IT |
| D-OUT | N0D | N1D | N2D | N3D | N4D | PIDD | PCT | ITD |
| | | | Byte 17 - Miscellaneous Input/Output Status | | | | | |
| D-IN | C1 | C2 | D0 | RX | OT | TC1 | TC2 | ODB |
| D-OUT | C1D | C2D | D0D | RXD | OTD | TC1D | TC2D | ODBD |
| | | | Byte 18 - Output Clock | | | | | |
| D-IN | OC0 | OC1 | OC2 | OC3 | OC4 | OC5 | LC | — |
| D-OUT | OC0D | OC1D | OC2D | OC3D | OC4D | OC5D | LCD | — |

"—" designates a no connect

Address Detection and Byte Select Logic 312

The function of the address detection and byte select logic 312 is to map the addresses of the control/status RAM into the control linespace address space of the data bus at offsets 10–18. The actual data address is formed by concatenation 1XXXX0111Xdddddd, where 111 is the line number, dddddd is the linespace offset, and XXXX are indeterminate (don't care). The address detection logic determines if the address is in the range allocated to the DBS. The byte select logic enables the byte specified by the linespace offset.

Inputs to 312:

DA0 DA5, DA10, DA11, DA12, DA13, DA14, DA15 are the outputs of the address latches 310 which are clocked on the falling edge of DALE.

| Pin Letter | Name | |
|---|---|---|
| B | DOE/ | Is the tri-state enable control signal for the data bus. |
| A | DWE/ | The write enable control signal for the data bus. |
| C | MT5B | A phase of the timing chain. |
| D | DA0, DA5, DA10–DA15 | |

Outputs from 312:

| | | |
|---|---|---|
| O | DATA TSEN/ | The tri-state control to the bi-directional buffers on the data bus. |
| N | AWREN/ | The write control signal to the A port of the control/status RAM. |
| E | B18SEL | |
| F | B16SEL | |
| G | B17SEL | |
| H | B11SEL | |
| I | B10SEL | |
| J | B15SEL | |
| K | B14SEL | |
| L | B12SEL | |

-continued

| | |
|---|---|
| M | B13SEL |

B10SEL–B18SEL are the A port select lines to the 8×8 RAMs which comprise the control/status RAM. The numbers 10–18, within the RAM blocks correspond to the B numbered SELECT signal received by that RAM. To simplify the specification and to limit the number of detailed drawings, the Boolean logic expressions corresponding to the logic functions performed by various blocks of the DBS 302 will be set forth hereinafter. Any person skilled in this art will be able to replicate the logic circuitry for performing the given Boolean expressions.

Address Detection and Byte Select Logic 312
Boolean Logic Expressions

DATA TSEN/ = DA0 · DA5/ · DA10/ · DA11 · DOE
ARWEN/ = (DWE · MT5B)/
B10SEL = DA0 · DA5/ · DA10/ · DA11 · DA12/ · DA13/ · DA14/ · DA15/
B11SEL = DA0 · DA5/ · DA10/ · DA11 · DA12/ · DA13/ · DA14/ · DA15
B12SEL = DA0 · DA5/ · DA10/ · DA11 · DA12/ · DA13/ · DA14 · DA15/
B13SEL = DA0 · DA5/ · DA10/ · DA11 · DA12/ · DA13/ · DA14 · DA15
B14SEL = DA0 · DA5/ · DA10/ · DA11 · DA12/ · DA13 · DA14/ · DA15/
B15SEL = DA0 · DA5/ · DA10/ · DA11 · DA12/ · DA13 · DA14/ · DA15
B16SEL = DA0 · DA5/ · DA10/ · DA11 · DA12/ · DA13 · DA14 · DA15/
B17SEL = DA0 · DA5/ · DA10/ · DA11 · DA12/ · DA13 · DA14 · DA15
B18SEL = DA0 · DA5/ · DA10/ · DA11 · DA12 · DA13/ · DA14/ · DA15/

Bit Clock Generator 326

The bit clock generator 326 generates timing signals corresponding to the output data rate. Alternately, timing signals can be gated to the lineset interface bus 20 for locally clocked synchronous applications. The bit clock generator range varies by data rate due to the variable number of samples per bit time. The bit clock generator directs its outputs OC0–OC5 and LC to the byte 18 RAM 314 for storage at offset 18, bits 0–5. The bit clock count range, as a function of output data rate, is given in the following table.

Baud Rate Selects

| OBR0 | OBR1 | OBR2 | OBR3 | BAUD RATE (BPS) | COUNT RANGE | CLOCK SELECT |
|---|---|---|---|---|---|---|
| 0 | 0 | 0 | 0 | 110 | 8–56 | OC5 |
| 0 | 0 | 0 | 1 | 3200 | 5–58 | OC5 |
| 0 | 0 | 1 | 0 | 1800 | 4–27 | OC4 |
| 0 | 0 | 1 | 1 | 14.4K | 4–27 | OC4 |
| 0 | 1 | 0 | 0 | 50 | 5–58 | OC5 |
| 0 | 1 | 0 | 1 | 200 | 5–58 | OC5 |
| 0 | 1 | 1 | 0 | 134.5 | 6–25 | OC4 |
| 0 | 1 | 1 | 1 | 75 | 7–24 | OC4 |
| 1 | 0 | 0 | 0 | 150 | 7–24 | OC4 |
| 1 | 0 | 0 | 1 | 300 | 7–24 | OC4 |
| 1 | 0 | 1 | 0 | 600 | 7–24 | OC4 |
| 1 | 0 | 1 | 1 | 1200 | 7–24 | OC4 |
| 1 | 1 | 0 | 0 | 2400 | 7–24 | OC4 |
| 1 | 1 | 0 | 1 | 4800 | 7–24 | OC4 |
| 1 | 1 | 1 | 0 | 9600 | 7–24 | OC4 |
| 1 | 1 | 1 | 1 | 19.2K | 7–24 | OC4 |

The inputs, outputs and logic expression which define the bit clock generator 326 are as follows:

| Port Letter | Name | |
|---|---|---|
| **Inputs to 326:** | | |
| D | OC0D–OC5D: | Byte 18, bits 0–5 is the previous value of the bit rate clock counter. OC0D is the least significant bit of the count. |
| D | LCD: | Byte 18, bit 6 is the previous value of the local clock (LC) signal. |
| E | OT: | The Output Timing (OT) signal is generated by the one of sixteen selectors 356 as a function of the output data rate selects. |
| C | OTD: | Byte 17, bit 4 is the previous state of the OT signal. |
| A | IA: | Byte 10, bit 6 is the Input Active signal. Either Input Active high, or Output Active high will enable an increment of the bit rate clock counter on each transition of the Output Timing signal. |
| A | LCEN: | Byte 10, bit 5 enables generation of the local clock signal to the line set interface. |
| A | OA: | Byte 10, bit 7 is the Output Active signal. Either Input Active high, or Output Active high will enable an increment of the bit rate counter on each transition of the Output Timing signal. |
| B | OBR0–OBR3: | Byte 11, bits 4–7 are encoded bits which select the output data rate according to the preceding table. |
| **Outputs from 326:** | | |
| F | OC0–OC5: | The current state of the bit clock counter which is stored at byte 18, bits 0–5 of the RAM. |
| F | LC: | The current state of the output bit clock (local clock) which is nominally a square wave with period equal to the output data rate. |
| G | LSC: | The LSC signal is the local clock transferred to the line set interface. Generation of LSC is conditioned by the Local Clock Enable (LCEN). |

Bit Clock Generator 326 Boolean Logic Expressions

OC0 = OC0′ · RST/ + RD0 · RST
OC1 = OC1′ · RST/ + RD1 · RST
OC2 = OC2′ · RST/ + RD2 · RST
OC3 = OC3′ · RST/ + RD3 · RST
OC4 = OC4′ · RST/
OC5 = OC5′ · RST/
LC = OC4D · LCSEL + OC5D · LCSEL/
LCS = LCD · LCEN

The above were derived from the following expressions:

CLK = OT ⊕ OTD
OC0′ = OC0D ⊕ CLK
OC1′ = OC1D ⊕ (OC0D · (OT ⊕ OTD))
OC2′ = OC2D ⊕ (OC0D · OC1D · (OT ⊕ OTD))
OC3′ = OC3D ⊕ (OC0D · OC1D · OC2D · (OT ⊕ OTD))
OC4′ = OC4D ⊕ (OC0D · OC1D · OC2D · OC3D · (OT ⊕ OTD))
OC5′ = OC5D ⊕ (OC0D · OC1D · OC2D · OC3D · OC4D · (OT ⊕ OTD))
RST = CLK · OC3D · OC4D · OBR1 · OBR2 · OBR3 + CLK · OC3D · OC4D · OBR0 + CLK · OC0D · OC3D · OC4D · OBR1 · OBR2 · OBR3/ + CLK · OC0D · OC1D · OC3D · OC4D · OBR0/ · OBR1/ · OBR2 + CLK · OC3D · OC4D · OC5D · OBR0/ · OBR1/ · OBR2/ · OBR3/ + CLK · OC1D · OC3D · OC4D · OC5D · OBR0/ · OBR1 · OBR2/ + CLK · OC1D · OC3D · OC4D · OC5D · OBR0/ · OBR1/ · OBR2/ · ORB3 + IA/ · OA/
RD0 = OBR0 + OBR1 · OBR2/ + OBR0/ · OBR1/ · OBR2/ · OBR3 + OBR1 · OBR2 · OBR3
RD1 = OBR1 · OBR2 + OBR0
RD2 = (OBR0/ · OBR1/ · OBR2/ · OBR3/)/
RD3 = OBR0/ · OBR1/ · OBR2/ · OBR3/
LCSEL = OBR0/ · OBR2 + OBR0

Input Data Control Logic 328

The input data control logic 328 controls the input state counter 336 and generates the Input Bit Request and Input Data Bit signals which are transferred to the CBuC 700 via the flag RAM 340. The input data control logic is driven from the control and status information stored in the control/status RAM 315, and from the Receive Clock and Input Interface Signal 7 scanned on the line set interface bus 20. Definitions of the inputs and outputs of the input control logic are as follows:

| Port Letter | Name | |
|---|---|---|
| **Inputs to 328:** | | |
| C | IF1–IF3: | Byte 10, bits 0–2 are three encoded bits which specify the synchronization mode. |
| C | NRZI: | Byte 10, bit 3 selects Non-Return to Zero Inversion decoding of the input |

-continued

| | |
|---|---|
| | data and encoding of the output data. |
| C | IA: Byte 10, bit 6 enables Input Data Control logic. |
| D | IBR0-IBR3: Byte 11, bits 0-3 are four encoded bits which specify the input data rate. |
| A | N0D-N4D Byte 16, bits 0-4 is the previous state of the Input State Counter. |
| A | PIDD: Byte 16, bit 5 is the state of the previous input data bit. |
| A | PCTD: Byte 16, bit 6 is the previous state of the Preset Count signal. |
| B | C1D: Byte 17, bit 0 is the previous state of the C1 signal. The C1 signal toggles every bit time to provide timing for 110 bps communications lines. |
| A | ITD: Byte 16, bit 7 is the previous state of the Input Timing signal. |
| B | C2D: Byte 17, bit 1 is the previous state of the C2 signal. The C2 signal is a status bit which sets when an Input Bit Request is generated in order to inhibit any additional bit requests until the end of the bit time. |
| B | D0D: Byte 17, bit 2 is the previous state of the D0 signal. The D0D signal retains preamble detection status for the input synchronization modes. |
| B | RXD: Byte 17, bit 3 is the previous sample of the RX signal. The RXD signal is the previous state of the input data when in asynchronous mode, or the previous sample of the receive clock when in synchronous mode. |
| E | RC: Current sample of the Receive Clock signal scanned from the Line Set Interface bus. |
| F | RD: Current sample of the Receive Data signal scanned from the Line Set Interface bus. RD is Input Interface signal 7. |
| G | IT: The Input Timing signal (IT) is a timing element generated by Input Timing Mux which corresponds to the input data rate. |
| Outputs from 328: | |
| I | ECT: Enable Count (ECT) enables an increment to the input state counter 336 on the next transition of the Input Timing signal. |
| I | RCT: Reset Count (RCT) resets the input state counter on the next transition of the Input Timing signal. |
| I | PCT: Preset Count (PCT) presets the input state counter to a value of two. The preset occurs on the next transition of the Input Timing signal when the RCT signal is active. |
| H | IBR: Input Bit Request (IBR) is generated to the flag RAM 340 when an input data bit has been detected on the Receive Data signal in accordance with the selected synchronization mode. |

-continued

| | |
|---|---|
| H | IDB: Input Data Bit (IDB) is the state of the Receive Data signal (NRZI decoded, if selected) when a data bit is detected. |
| J | RX: RX is the cureent sample of the Receive Clock when in synchronous mode or the current sample of the Receive Data when in asynchronous mode. RX is stored in byte 17, bit 3 of the RAM 315. |
| J | D0: D0 is the present state of the preamble detection. D0 is stored in byte 17, bit 2 of the RAM 315. |
| J | C1: C1 toggles with each bit request to provide finer sample granularity for input bit detection at the data rate of 110 bps. C1 is stored in byte 17, bit 0. |
| J | C2: C2 is a status bit which sets on detection of an input data bit to prevent multiple bit requests to be generated for the same bit. C2 is stored in byte 17, bit 1 of the RAM 315. |
| I | PID: PID retains the state of the previous input data bit for use in NRZI decoding. |
| I | CLK: CLK is the clock signal to the input state counter 336. The CLK signal is high on each transition of the Input Timing signal. |

Input Data Control Logic 328 Boolean Logic Expressions

ECT = IF1/ · IF2/ · IF3/ · RD/ · D0D +
IF1/ · IF2/ · IF3 +
IF1/ · IF2/ · IF3/ · C2 +
IF1/ · IF2 · RD · RXD +
IF1/ · IF2 · RD/ · C2 · RXD +
IF1/ · IF2 · RD/ · RXD/ +
IF1/ · IF2 · RD · C2 · RXD/ +
IF1 · IF2 · IF3/ · N3/ · N4/ · RD/ · RXD +
IF1 · IF2 · IF3/ · N3/ · N4/ · RD · D0D · RXD/
RCT = IBR0 · N0 · N4 +
IBR1 · IBR2 · IBR3 · N0 · N4 +
IBR1 · IBR2 · IBR3/ · N0 · N1 · N4 +
IBR1/ · IBR2 · N0 · N1 · N2 · N4 +
IBR1/ · IBR2/ · IBR3/ · N0 · N1 · N2 · N4 · C1 +
IBR1/ · IBR2/ · IBR3/ · N3 · N4 +
IBR1 · IBR2/ · N1 · N3 · N4 +
IBR1/ · IBR2/ · IBR3 · N1 · N3 · N4 +
IF1/ · IF2/ · IF3/ · RD
PCT = IF1/ · IF2 · RD · C2 · RXD/ +
IF1/ · IF2 · RD/ · C2 · RXD +
PCTD/ · C2
IBR = IF1/ · IF2/ · IBR0 · N0 · N1/ · N2/ · N3 · N4/ · C2/ +
IF1/ · IF2/ · IBR1 · IBR2 · IBR3 · N0 · N1/ · N2/ · N3 · N4/ · C2/ +
IF1/ · IF2/ · IBR0/ · IBR1/ · IBR2/ · IBR3/ · N0/ · N1/ · N2 · N3 · N4/ · C2/ +
IF1/ · IF2/ · IBR0/ · IBR1/ · IBR2 · N0/ · N1/ · N2 · N3 · N4/ · C2/ +
IF1/ · IF2/ · IBR0/ · IBR1 · IBR2/ · N0 · N1/ · N2 · N3 · N4/ · C2/ +
IF1/ · IF2/ · IBR0/ · IBR1/ · IBR2/ · IBR3 · N0 · N1/ · N2 · N3 · N4/ · C2/ +
IF1/ · IF2/ · IBR0/ · IBR1 · IBR2 · IBR3/ · N0/ · N1 · N2/ · N3 · N4/ · C2/ +
IF1 · IF2/ · IF3/ · RC/ · RXD · D0D +
IF1 · IF2 · IF3/ · N3/ · N4/ · RD · D0D · RXD/ +
IF1 · IF2 · IF3/ · N3/ · N4/ · RD/ · RXD +
IF1/ · IF2 · IBR0 · N0 · N1/ · N2/ · N3 · N4/ · RD · C2/ · RXD +
IF1/ · IF2 · IBR0 · N0 · N1/ · N2/ · N3 · N4/ · RD/ · C2/ · RXD/ +

-continued

IF1/ · IF2 · IBR1 · IBR2 · IBR3 · N0 · N1/ · N2/ · N3 · N4/ · RD · C2/ · RXD +
IF1/ · IF2 · IBR1 · IBR2 · IBR3 · N0 · N1/ · N2/ · N3 · N4/ · RD/ · C2/ · RXD/ +
IF1/ · IF2 · IBR0/ · IBR1/ · IBR2/ · IBR3/ · N0/ · N1/ · N2 · N3 · N4/ · RD · C2/ · RXD/ +
IF1/ · IF2 · IBR0/ · IBR1/ · IBR2/ · IBR3/ · N0/ · N1/ · N2 · N3 · N4/ · RD/ · C2/ · RXD/ +
IF1/ · IF2 · IBR0/ · IBR1/ · IBR2 · N0/ · N1/ · N2 N3 · N4/ · RD · C2/ · RXD +
IF1/ · IF2 · IBR0/ · IBR1/ · IBR2 · N0/ · N1/ · N2 · N3 · N4/ · RD/ · C2/ · RXD/ +
IF1/ · IF2 · IBR0/ · IBR1 · IBR2/ · N0 · N1/ · N2 · N3 · N4/ · RD · C2/ · RXD +
IF1/ · IF2 · IBR0/ · IBR1 · IBR2/ · N0 · N1/ · N2 · N3 · N4/ · RD/ · C2/ · RXD/ +
IF1/ · IF2 · IBR0/ · IBR1/ · IBR2/ · IBR3 · N0 · N1/ · N2 · N3 · N4/ · RD · C2/ · RXD +
IF1/ · IF2 · IBR0/ · IBR1/ · IBR2/ · IBR3 · N0 · N1/ · N2 · N3 · N4/ · RD/ · C2/ · RXD/ +
IF1/ · IF2 · IBR0/ · IBR1 · IBR2 · IBR3/ · N0/ · N1 · N2/ · N3 · N4/ · RD · C2/ · RXD +
IF1/ · IF2 · IBR0/ · IBR1 · IBR2 · IBR3/ · N0/ · N1 · N2/ · N3 · N4/ · RD/ · C2/ · RXD/
IDB = (PIDD ⊕ RD) · NRZI + RD · NRZI/
RX = (IF1/ · IF2/ · RD) · (IT ⊕ ITD) +
(IF1/ · IF2/ · RXD) · (IT ⊕ ITD)/ +
IF1 · IF2/ · IF3/ · RC · D0D +
IF1 · IF2 · IF3/ · RD +
(IF1/ · IF2 · RD · N0) · (IT ⊕ ITD) +
(IF1/ · IF2 · RXD · N0) · (IT ⊕ ITD)/ +
IF1/ · IF2 · RXD · N0/
D0 = IF1/ · IF2/ · RD · IA +
IF1/ · IF2/ · D0D · IA +
IF1 · IF2 · IF3/ · RD · IA +
IF1 · IF2 · IF3/ · D0D · IA +
C1 = C1D ⊕ ((IT ⊕ ITD) · RCT)
C2 = IBR + C2D · (RCT · (IT ⊕ ITD)/
PID = IBR · RD + IBR/ · PIDD
CLK = IT ⊕ ITD

Input State Counter 336

The input state counter is a 5-bit synchronous counter. The counter can be synchronously reset or preset to a value of two. The counter increments on each occurrence of both the CLK signal high and the Enable Count signal high. The Reset Count signal overrides the Enable Count signal. The Preset Count signal has effect only when the Reset Count is active and acts to reset the counter to a value of two rather than zero. The Preset Count and Reset Count only have effect when the CLK signal is high. The input state counter has no storage elements since the input state count resides in the RAM 315 at offset 16, bits 0–4. The inputs, outputs and Boolean logic equations for the input state counter are as follows:

| Port Letter | Name |
|---|---|
| Inputs to 336: | |
| A | N0D–N4D: Byte 16, bits 0–4 is the previous value of the Input State Count. N0D is the lease significant bit of the count. |
| B | CLK: The clock signal (CLK) generated by the input data control logic 328 designates a transition in the Input Timing signal. |
| B | ECT: The Enable Count signal (ECT) generated by the input data control logic 328 enables an increment to the input state counter 336 on the condition that CLK is high, and RCT is low. |
| B | RCT: The Reset Count signal (RCT) generated by the input data control logic 328 resets the Input State Count to zero on the condition that CLK is high and PCT is low. |
| B | PCT: The Preset Count Signal (PCT) generated by the input data control logic 328 presets the Input State Count to a value of two on the condition that CLK is high and RCT is high. |
| C | IA: Byte 10, bit 6 is the Input Active signal (IA). The signal IA acts as an asynchronous reset. PID: passes through this block as input to Byte 16. |
| Outputs from 336: | |
| D | N0–N4: Present value of the input state count which is stored in Byte 16, bits 0–4 of the RAM. N0–N4 are derived as follows: N0 = N0D ⊕ (CLK · RCT · N0D + IA/ · N0D + CLK · RCT/ · ECT · IA) N1 = N1D ⊕ (CLK · RCT · PCT/ · N1 + IA/ · N1 + CLK · RCT/ · ECT · IA · N0D + CLK · RCT · PCT · N1D/) N2 = N2D ⊕ (CLK · RCT · N2D + IA/ · N2D + CLK · RCT/ · ECT · IA · N0D · N1D) N3 = N3D ⊕ (CLK · RCT · N3D + IA/ · N3D + CLK · RCT/ · ECT · IA · N0D · N1D · N2D) N4 = N4D ⊕ (CLK · RCT · N4D + IA/ · N4D + CLK · RCT/ · ECT · IA · N0D · N1D · N2D · N3D) |
| D | ECT: Goes to RAM Byte 16 along with N0–N4. |
| D | PID: Goes to RAM Byte 16 along with N0–N4. |

Output Data Control Logic 330

The output data control logic 330 synchronizes the output data bits to the TR CLK signal when in the synchronous mode or to the CLK signal when in the asynchronous mode. Edge noise is filtered from the TR CLK signal to prevent inadvertent transitions which will cause synchronization failure. The inputs, outputs, and Boolean logic expressions for the output data control logic 330 are as follows:

| Port Letter | Name |
|---|---|
| Inputs to 330: | |
| C | NRZI: Byte 10, bit 3 selects NRZI encoding of the output data. |
| C | OA: Byte 10, bit 7 enables the output data control logic. The Output Data Bit is held high (logic "1") and Output Bit Requests (OBR) are inhibited when OA is low. |
| D | OIS7: Byte 15, bit 7 is the logical value of the next data bit to be transferred to the line set interface as specified by the level 2 program executed by the CBuC. |
| B | TC1D: Byte 17, bit 5 is the previous sample of the TR CLK signal |

-continued

| | |
|---|---|
| | which is used for filtering. |
| B | TC2D: Byte 17, bit 6 is the previous state of the TC1D signal. |
| B | ODBD: Byte 17, bit 7 is the output data bit which is transferred to the line set interface. |
| A | LCD: Byte 18, bit 6 is the CLK signal which is used to synchronize output data when in asynchronous mode. |
| E | TXC: TXC is the current sample of the TR CLK signal from the line set interface bus. |
| C | IF1, IF2: Byte 10, bits 0-1 select the synchronization mode |
| | Outputs from 330: |
| F | TC1: Byte 17, bit 5 is the current sample of the TR CLK signal conditioned by OA. |
| F | TC2: Byte 17, bit 6 is the TC1D signal conditioned by OA. |
| F,G | ODB: Byte 17, bit 7 is the next state of the output data bit to be transferred to the line set interface. |
| G | OBR: Output Bit Request (OBR) is generated to the flag RAM on each rising transition of the TR CLK signal in synchronous mode or each rising transition of the CLK signal when in asynchronous mode; provided that OA is high. |
| H | TD/ |
| I | SNF/ASYNC/ |

Output Data Control Logic 330 Boolean Expressions

| | |
|---|---|
| TC' = | IF1 · IF2/ · TXC + (IF1 · IF2/)/ · LCD |
| TC1 = | TC' +OA/ |
| TC2 = | TC1D + OA/ |
| OBR = | TC' · TC1D/ · TC2D/ |
| ODB = | (OBR · OA · NRZI · (OIS7 ⊕ ODBD) + OBR · OA · NRZI/ · OIS7/ + OBR/ · ODBD/)/ |
| SNF/ASYNC = | (IF1 · IF21) |

Clock Divider 332 and Input/Output Timing Element Selectors 356/357

The clock divider 332 consists of an 11-bit ripple counter (not shown) which increments on the falling edge of MT1B. The outputs of the counter are inputted to the 16-to-1 multiplexer selectors 356 and 357 which generate the Input Timing (IT) and Output Timing (OT) signals. The outputs of the counter are labeled 2X, 4X, 8X, . . . 2048X; representative of the decimal multiplier of the machine cycle time period. The bit rate selects contained in Byte 11 of the RAM 315 are used to control the multiplexers. The clock divider output, selected as a function of bit rate clock selects, is given in the following table.

| I/O Bit Rate Selects 0-3 | | | | Bit Rate | Input Timing Source | Output Timing Source |
|---|---|---|---|---|---|---|
| 0 | 0 | 0 | 0 | 110 | 1024X | 512X |
| 0 | 0 | 0 | 1 | 3200 | 32X | 16X |
| 0 | 0 | 1 | 0 | 1800 | 64X | 64X |
| 0 | 0 | 1 | 1 | 14.4K | 8X | 8X |
| 0 | 1 | 0 | 0 | 50 | 2048X | 1024X |
| 0 | 1 | 0 | 1 | 200 | 512X | 256X |
| 0 | 1 | 1 | 0 | 134.5 | 1024X | 1024X |
| 0 | 1 | 1 | 1 | 75 | 2048X | 2048X |
| 1 | 0 | 0 | 0 | 150 | 1024X | 1024X |
| 1 | 0 | 0 | 1 | 300 | 512X | 512X |
| 1 | 0 | 1 | 0 | 600 | 256X | 256X |
| 1 | 0 | 1 | 1 | 1200 | 128X | 128X |
| 1 | 1 | 0 | 0 | 2400 | 64X | 64X |
| 1 | 1 | 0 | 1 | 4800 | 32X | 32X |
| 1 | 1 | 1 | 0 | 9600 | 16X | 16X |
| 1 | 1 | 1 | 1 | 19.2K | 8X | 8X |

The IT signal is one-half the frequency of the required scan rate for a given frequency. A scan is performed on both the rising and falling transition of the IT signal. This feature allows the CBuC to scan the DBS at the minimum rate required to reconstruct the input data from a serial data signal.

Interface Control Signal Comparator 334

The interface control signal comparator 334 monitors the input interface signals for coincidence with the Input Interface Condition specified in Byte 13 of the RAM 315. A bit-by-bit comparison is made between the input interface condition byte and the input interface signals. If any of the coincident bit pairs also have the corresponding bit set in the Interface Signal Mask byte (Byte 12), the Line Signal Detect signal will be made active to the flag RAM 340. The bit position(s) in the Interface Signal Mask byte which caused the Line Signal Detect are cleared by the interface control signal comparator 334. The inputs, outputs and the Boolean logic expressions are given in the following tables.

| Port Letter | Name |
|---|---|
| | Inputs to 334: |
| B | ISM0-ISM7: Byte 12, bits 0-7 are the Interface Signal Mask byte. |
| C | IIC0-IIC7: Byte 13, bits 0-7 are the Input Interface Condition byte. |
| A | IIS0-IIS7: Input Interface Signals 0-7 are the current state of the interface control signals sampled on the line set interface bus 20. |
| D | B12SEL |
| | Outputs from 334: |
| F | LS DETECT: Line Signal Detect is generated and provided to the flag RAM 340 when the monitored line signal condition is detected. |
| E | NSM0-NSM7: Byte 12, bits 0-7 are the new state of the Interface Signal Mask byte. |

Interface Control Signal Comparator 334 Boolean Logic Expressions

| | |
|---|---|
| NSM0 = | ISM0 · (IIC0 ⊕ IIS0) |
| NSM1 = | ISM1 · (IIC1 ⊕ IIS1) |
| NSM2 = | ISM2 · (IIC2 ⊕ IIS2) |
| NSM3 = | ISM3 · (IIC3 ⊕ IIS3) |
| NSM4 = | ISM4 · (IIC4 ⊕ IIS4) |
| NSM5 = | ISM5 · (IIC5 ⊕ IIS5) |
| NSM6 = | ISM6 · (IIC6 ⊕ IIS6) |
| NSM7 = | ISM7 · (IIC7 ⊕ IIS7) |

-continued

| | |
|---|---|
| LS DETECT = | (ISM0 · (IIC0 ⊕ IIS0)/ + |
| | ISM1 · (IIC1 ⊕ IIS1)/ + |
| | ISM2 · (IIC2 ⊕ IIS2)/ + |
| | ISM3 · (IIC3 ⊕ IIS3)/ + |
| | ISM4 · (IIC4 ⊕ IIS4)/ + |
| | ISM5 · (IIC5 ⊕ IIS5)/ + |
| | ISM6 · (IIC6 ⊕ IIS6)/ + |
| | ISM7 · (IIC7 ⊕ IIS7)/) · B12SEL/ |

Flag RAM 340 and Associated Logic

The flag RAM 340 is an 8×6 pseudo dual-port RAM used to buffer the Bit Request (BR), Data Bit (DB) and Line Signal Detect (LS DETECT) flags for access by the CBuC. The dual-port RAM is functionally equivalent to the 8×8 RAMs 314 which comprise the control/status RAM 315 with the addition of reset circuitry in the address decode logic 342. The flag enable logic 358 sets bits in the flag RAM 340 designating the occurrence of an Output Bit Request (OBR), Input Bit Request (IBR), or Line Signal Detect (LS DETECT) signal. The NRZI decoded state of the Input Data Bit (IDB) corresponding to the Input Bit Request is stored in the flag RAM 340. The previous state of the Output Data Bit (ODB) is stored in the flag RAM 340 upon occurrence of an Output Bit Request. The Line Signal Detect signal is stored in 2-bit positions within the flag RAM 340 so that it can be accessed on both the input and output scans by the CBuC. The flag read logic 350 clears the bits in the flag RAM 340 when they have been accessed by the CBuC via the scanner bus. The line address driven on the scanner bus (pins 2-4) is latched on the trailing edge of the LNV/strobe (pin 1). The outputs of the latch are used as the "B" port address for the read-modify-write operation performed by the flag read logic 350. The flag read logic 350 presents the state of the bit request, data bit, and line signal detent flags selected by the line address and scan direction. Any active flags presented to the scanner bus are cleared in the "B" port write operation. The "B" port address is latched and delayed until the completion of the line scan so that the next state of the flags, may be set by the flag enable logic 358. The flag enable logic 358 sets flags, while retaining pending flags, by performing a read-modify-write operation to the "A" port of the flag RAM 340.

Flag Enable Logic 358

| Port Letter | Name |
|---|---|
| | Inputs to 358: |
| A | FIBR, FIDB, FILSC, FOBR, FOLSC: The contents of the Flag RAM location addressed by the WA0-WA2 signals. |
| B | IBR, IDB: The Input Bit Request (IBR) designates an input data bit has been detected on the Receive Data (RD) signal from the Line Set Interface. The IDB signal is the logical state of the input data bit. |
| C | OBR, OIFS7: The Output Bit Request (OBR) signal designates the current output data bit has been transferred to the Line Set Interface and the DBS is ready for the next output bit. OIFS7 is the logical state of the output data bit. |
| D | LS DETECT: The Line Signal Detect (LS DETECT) signal is made active when the condition monitored for by the Interface Control Signal Comparator is detected. |
| | Outputs from 358: |
| E | NIBR, NIDB, NILSC, NOBR, NODB, NOLSC: The next state of the Flag RAM location addressed by the WA0-WA2 signals. |

Flag Enable Logic 358 Boolean Logic Expressions

| | |
|---|---|
| NIBR = | FIBR + IBR |
| NIDB = | FIDB · IBR/ + IDB · IBR |
| NILSC = | FILSC + LS DETECT |
| NOBR = | FOBR + OBR |
| NODB = | OIFS7 |
| NOLSC = | FOLSC + LS DETECT |

Flag Read Logic 350

| Port Letter | Name |
|---|---|
| | Inputs to 350: |
| A | PIBR, PIDB, PILSC, POBR, PODB, POLSC: The state of the flag RAM location addressed by the SA0-SA2 signals. |
| B | SDIR: The scan direction. A logical "1" on this signal designates an output scan |
| E | MR: Master Reset Signal |
| | Outputs from 350: |
| C | RIBR, RIDB, RILSC, ROBR, RODB, ROLSC: The next state of the flag RAM location addressed by the SA0-SA2 signals. |
| D | BR, LS DETECT DB The flags to be presented to the scanner bus. |

Flag Read Logic 350 Boolean Logic Expressions

| | |
|---|---|
| RIBR = | PIBR · SDIR · MR/ |
| RIDB = | PIDB · MR/ |
| RILSC = | PILSC · SDIR · MR/ |
| ROBR = | POBR · SDIR/ · MR/ |
| RODB = | PODB · MR/ |
| ROLSC = | POLSC · SDIR/ · MR/ |

Line Set Interface Bus Logic, 2 to 1 Mux 352, Latch 354 and Amplifier Group 356

The line set interface bus 20 is time sliced into three phases; line address, output data, and input data. During the line address phase, two 3-bit addresses are propagated onto the line set interface bus. One address (WA0-WA2) designates the line set interface which is the destination of the data during the output data phase. The other address (SA0-SA2) specifies the line set interface adapter which is the source of the data during the input data phase of the bus. The rising edge of the Address/Date Strobe (AS/DS) designates valid signals on the line set interface bus. The first low-to-high transition of AS/DS following the high-to-low transition of the Read Enable (RE) signal designates the line address is valid on the line set interface bus. The second rising transition of AS/DS following the falling of RE designates that the output data is valid on the line set interface bus.

| Port Letter | Name |
|---|---|
| | Inputs to 352 |

-continued

| | |
|---|---|
| A | A/D Mux SEL |
| B | WA0–WA2 |
| C | SA0–SA2 |
| D | LCS |
| E | TD |
| F | DW |
| G | OIS0–OIS6 |
| Output from 352: | |
| H | OLSIF0–OLSIF9 |
| Inputs to 354: | |
| A | LSIF LOADEN |
| E | ILSIF 0–7 |
| F | ILSIF 8 |
| G | ILSIF 9 |
| Outputs from 354: | |
| B | IIS0–6, RD |
| C | TXC |
| D | RC |

| LSIF BIT | A/D MUX SEL = 1 | A/D MUX SEL = 0 |
|---|---|---|
| 0 | X | LCS |
| 1 | X | DW |
| 2 | X | OIFS0 |
| 3 | X | OIFS1 |
| 4 | SA0 | OIFS2 |
| 5 | SA1 | OIFS3 |
| 6 | SA2 | OIFS4 |
| 7 | WA0 | OIFS5 |
| 8 | WA1 | OIFS6 |
| 9 | WA2 | ODBD |

Communications Base Microcontroller (CBuC) 700

Figure 12A:
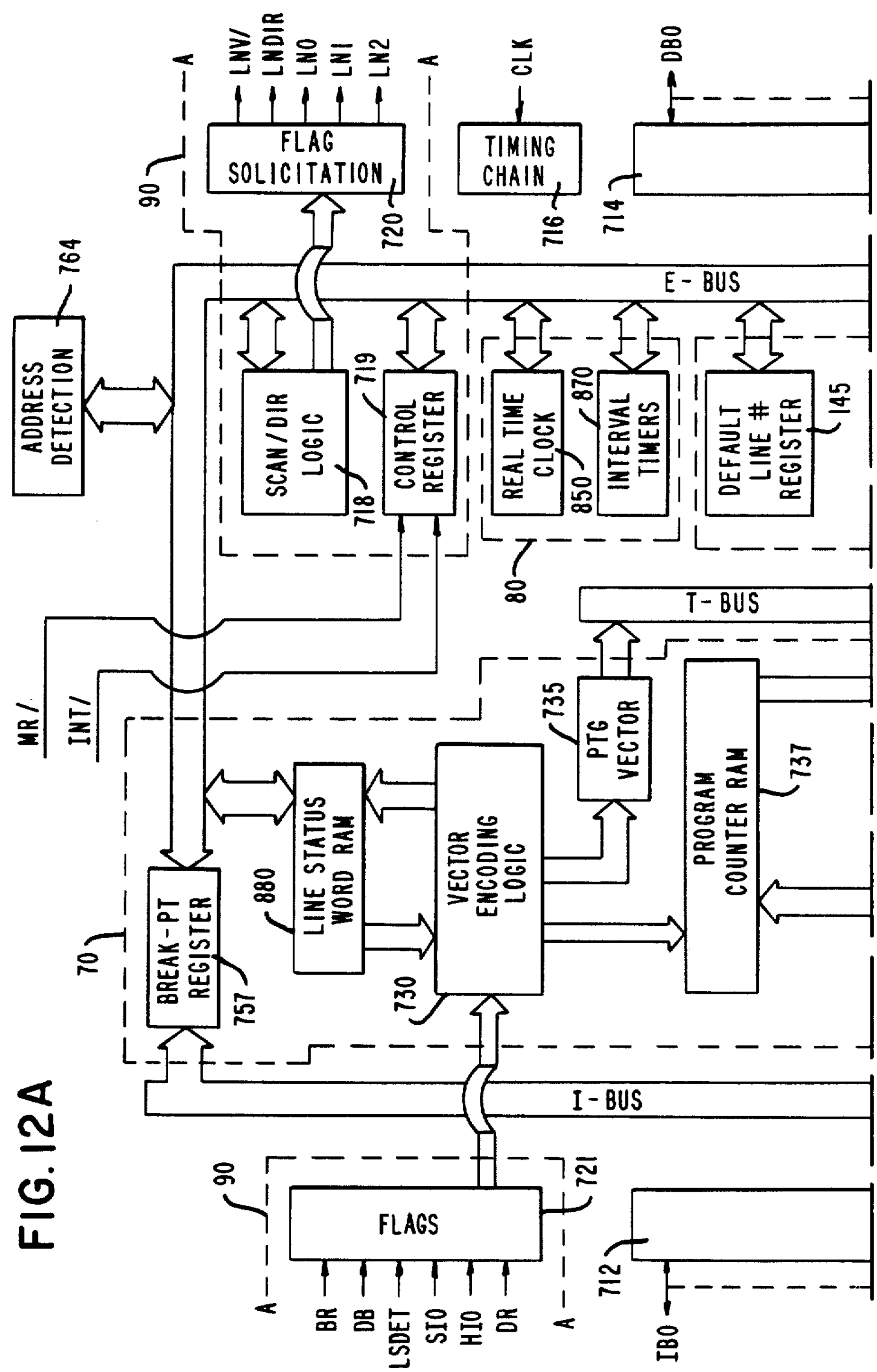
FIGS. 12A-12C, assembled in accordance with the map of FIG. 12, illustrate, in block diagram form, the communications base microcontroller (CBuC) shown as block 700 in FIG. 1.
Figure 12B:
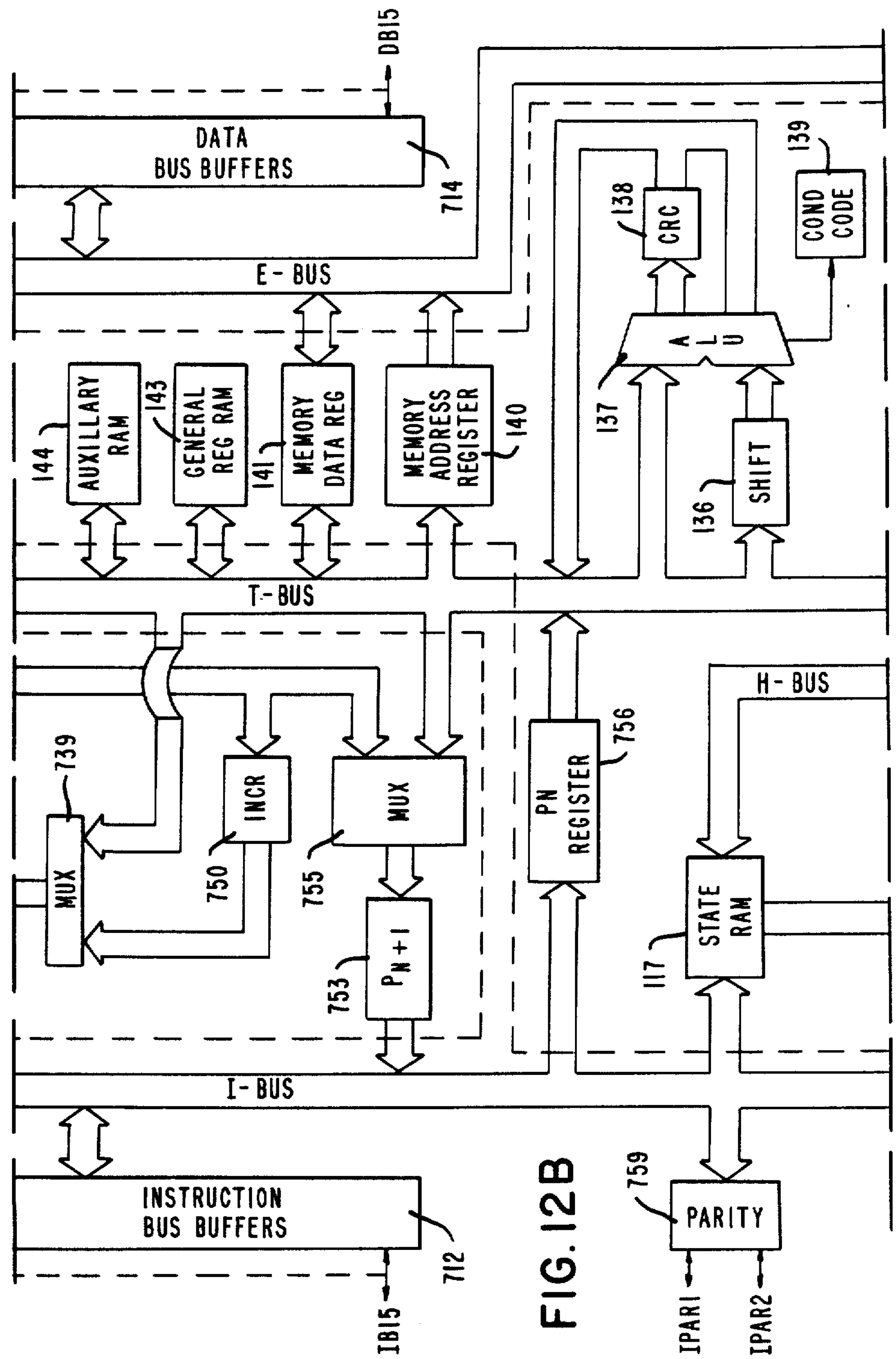
Figures 12, 12C:
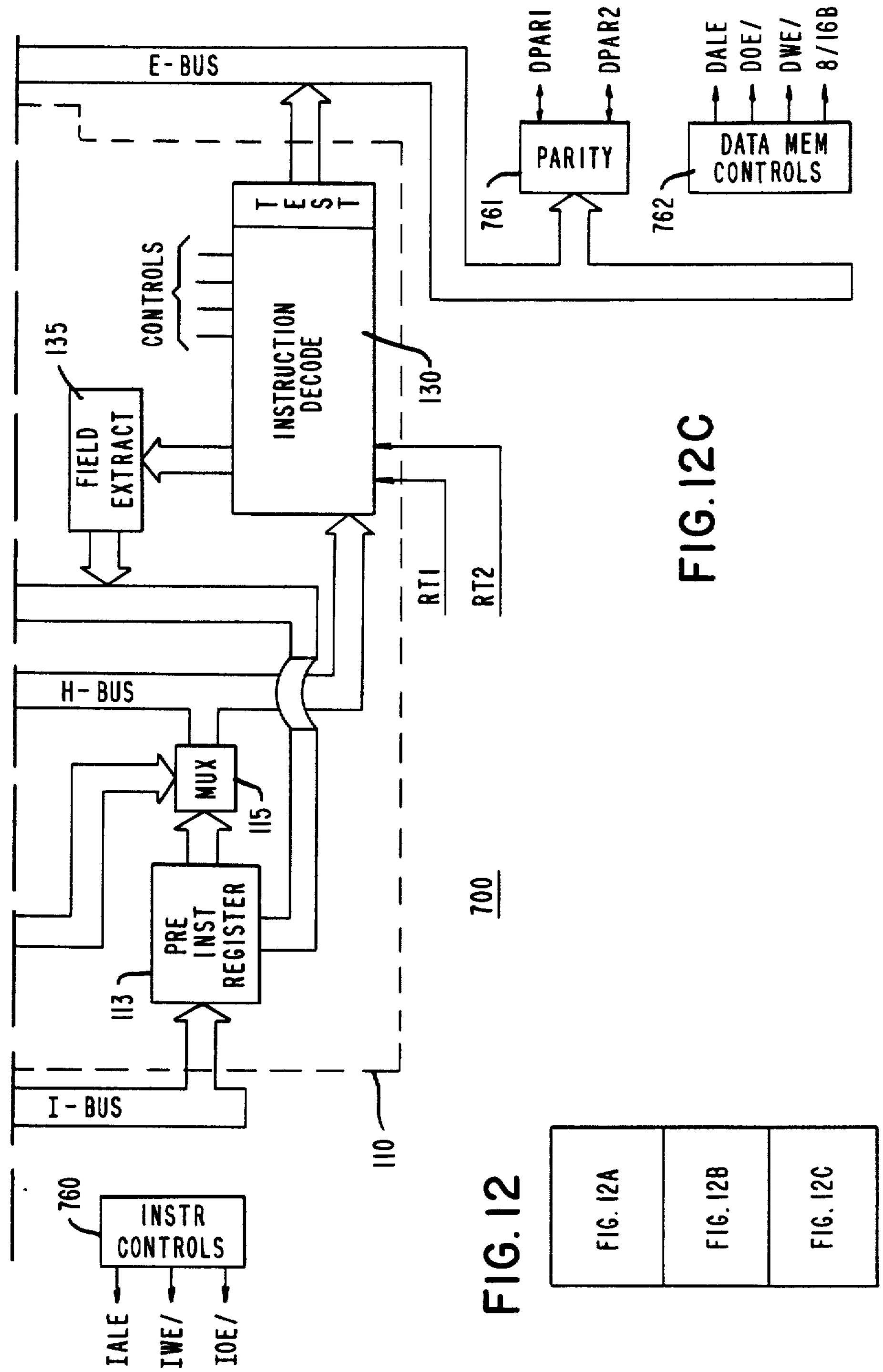
Figure 13:
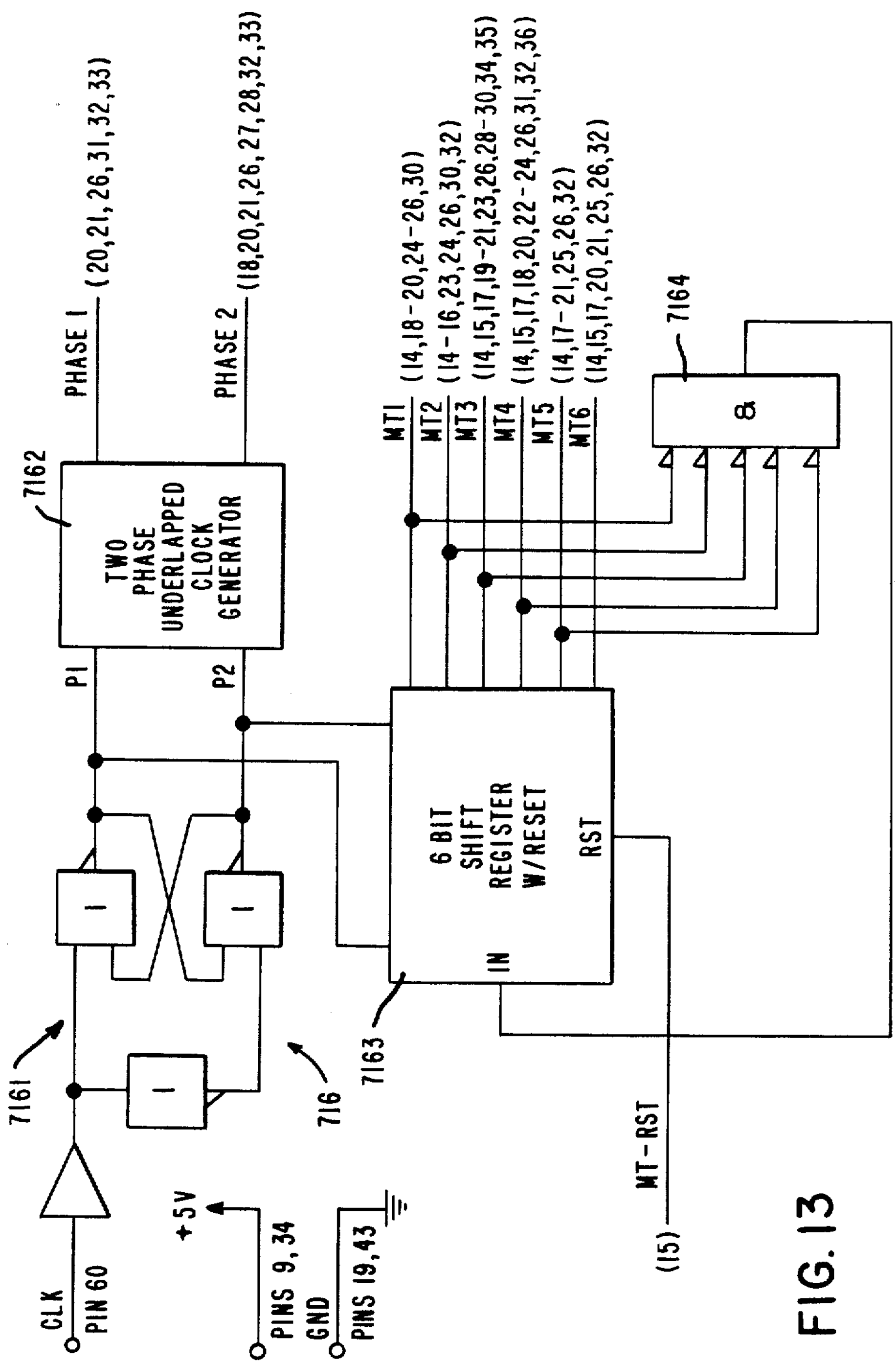
FIG. 13 illustrates, in schematic form, the timing chain used in the CBuC of FIGS. 12A-12C.

Referring to FIGS. 12A–12C, wherein is shown in block diagram form the CBuC 700 chip. The CBuC 700 is shown comprised of major blocks whose dotted outline corresponds to the blocks of FIG. 1. The I-Bus is coupled to the instruction RAM/ROM 600 by means of an instruction bus buffer 712. The E-bus is coupled to the data bit synchronizer 300, data RAM 400 and communication processor interface 500 by means of data bus buffer 714. Positioned on the microcontroller chip is a timing chain 716 which provides as outputs timing signals MT1-MT6, PHASE 1, and PHASE 2, all derived from the signal CLK. The timing chain 716 is shown in schematic block diagram form in FIG. 13. Each of the blocks associated with FIGS. 12A–12C will be described and shown with output ports and input ports labeled with the signals carried thereon and will have in parentheses the number of the drawing FIG. wherein the associated signals are connected. For example, in FIG. 13 the MT-RST signal applied to the RST input to the 6-bit shift register 7163 comes from a source which is shown in FIG. 15.

Referring now to the circuitry of 716, an input latching circuit 7161 receives on its input pin 60, the signal CLK and provides at its output two complimentary clock signals denoted P1 and P2. These signals are employed as inputs to a two-phase, underlapped, clock generator 7162 and to a 6-bit shift register 7163. The clock generator 7162 provides as its outputs two phase related signals denoted PHASE 1 and PHASE 2. The 6-bit output from shift register 7163 is denoted MT1–MT6. The signals MT1–MT6 are mutually exclusive phases of the timing chain. The signals MT1–MT5 are connected as inputs to a NOR gate 7164. The NOR gate enables the shift input of the 6-bit shift register 7163 when outputs MT1–MT5 are all low. In this manner, the timing chain will initiate with pulse MT1 and continuously cycle from MT1 through MT6 when the MT-RST is inactive.

Figure 14A:
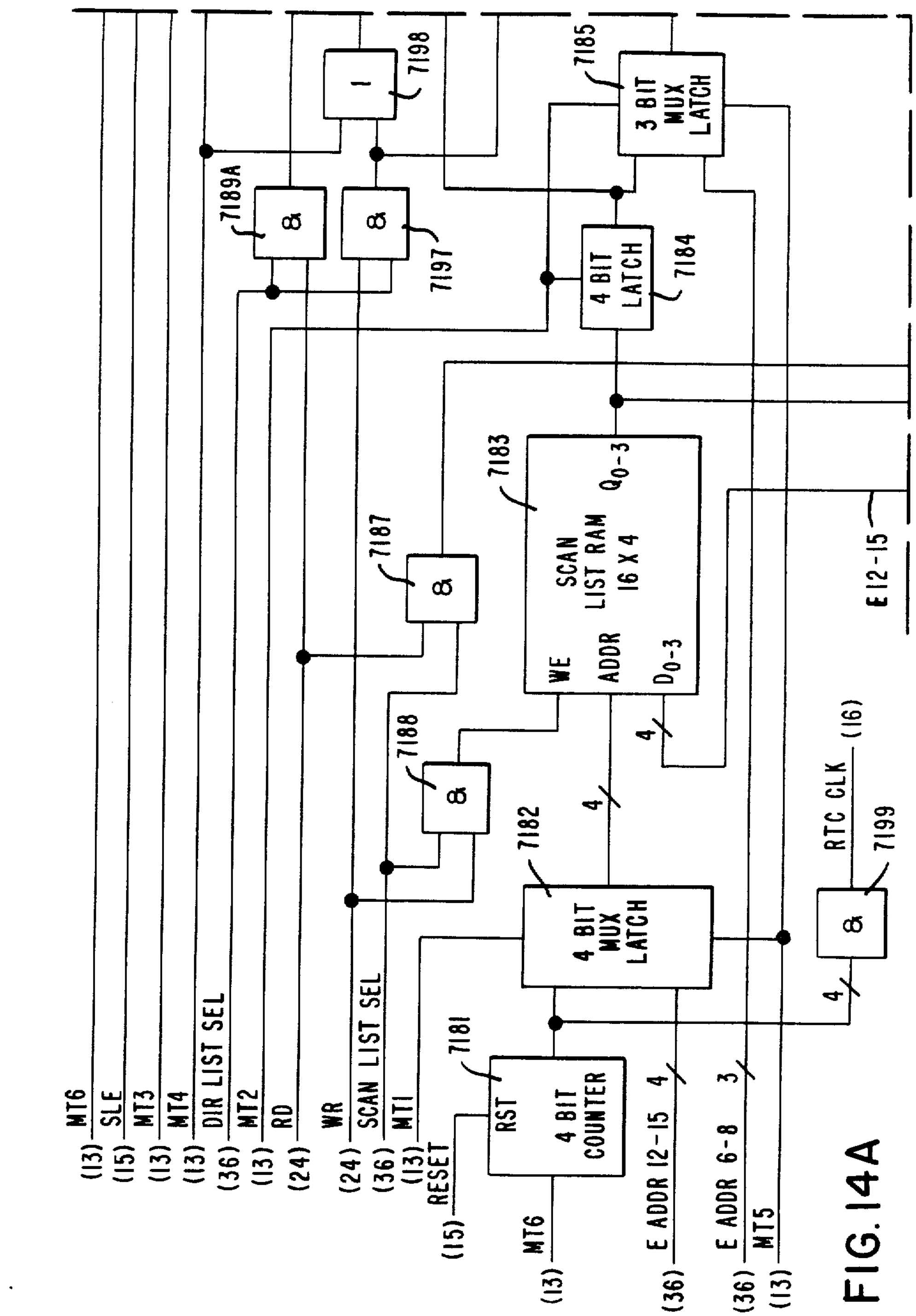
FIGS. 14A-14D, assembled in accordance with the map of FIG. 14, illustrate, in schematic form, the scan list and flags logic used in the CBuC of FIGS. 12A-12C.
Figure 14B:
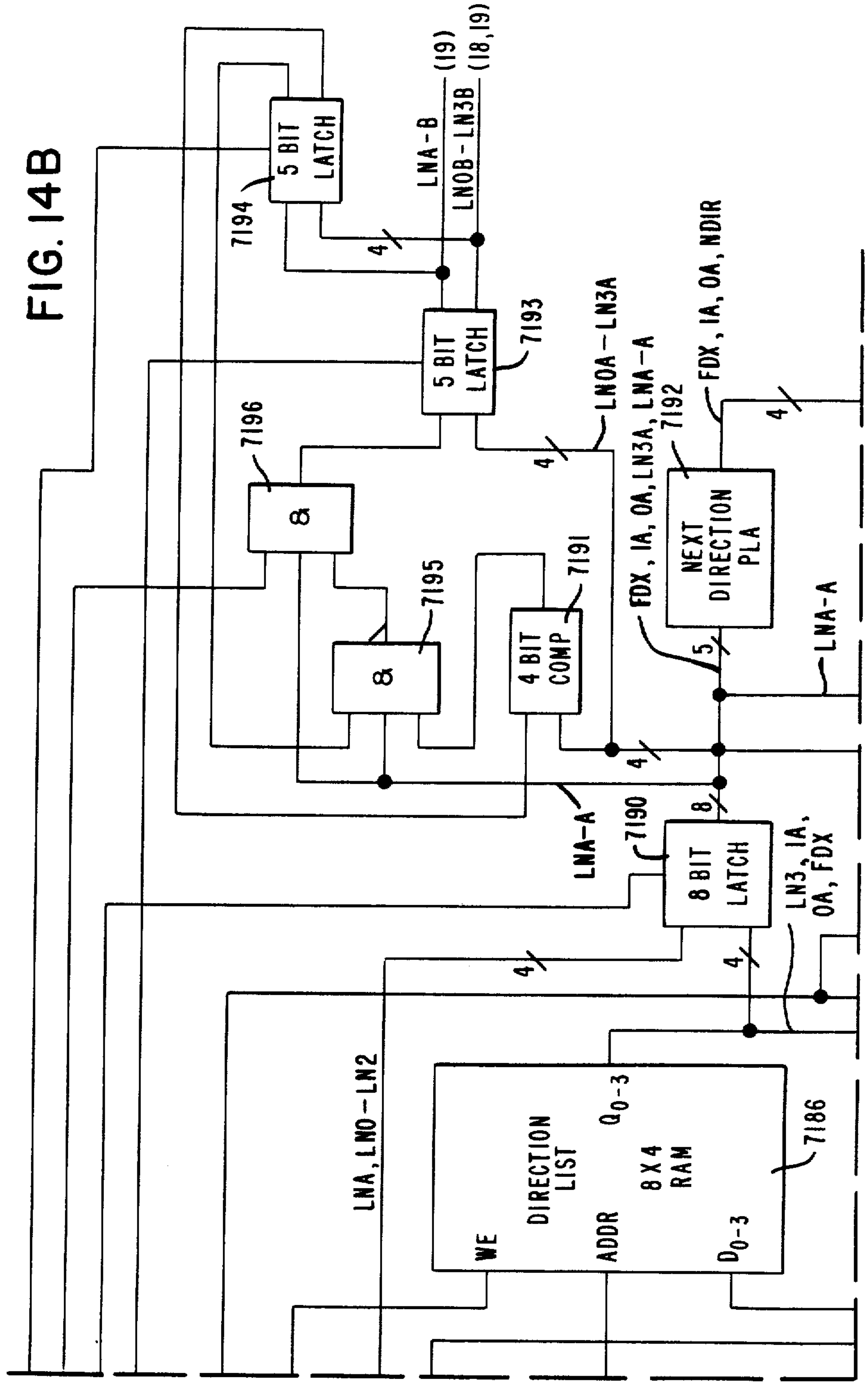
Figure 14C:
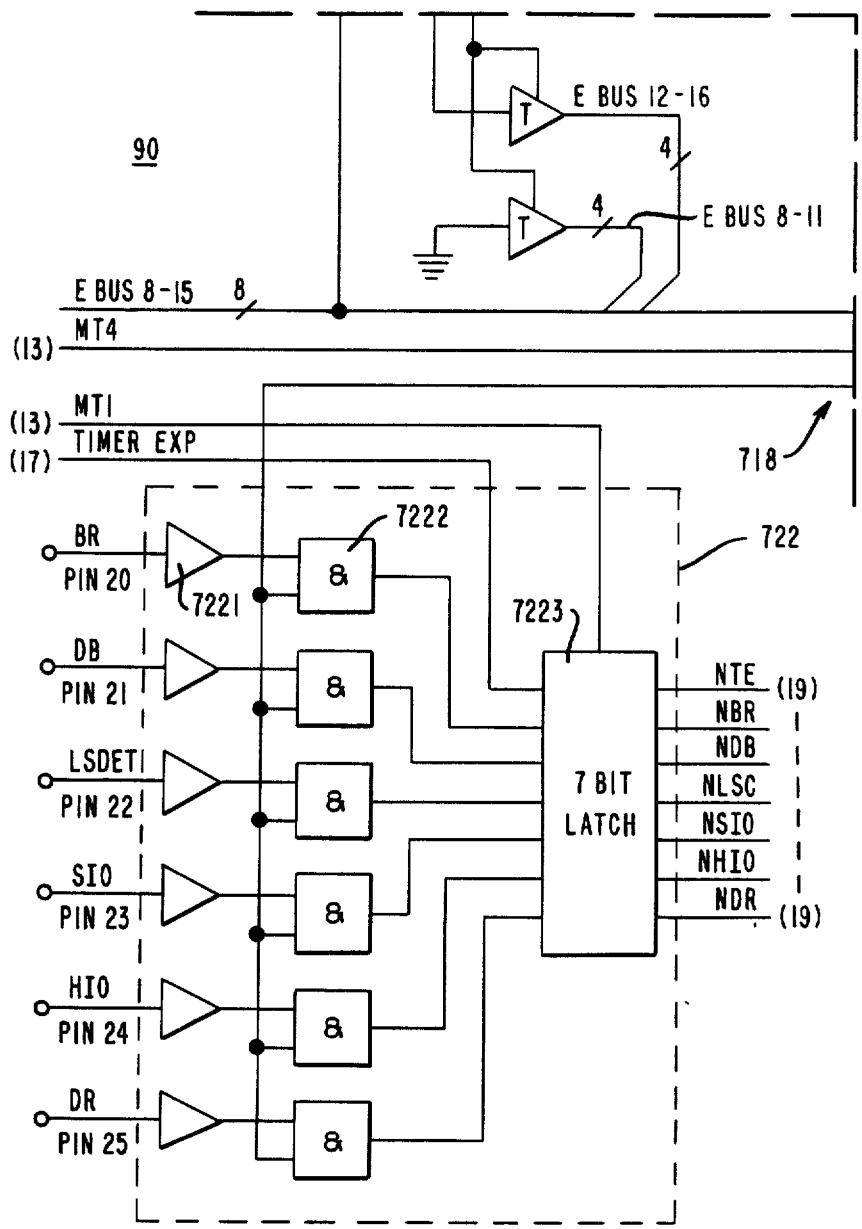
Figures 14, 14D:
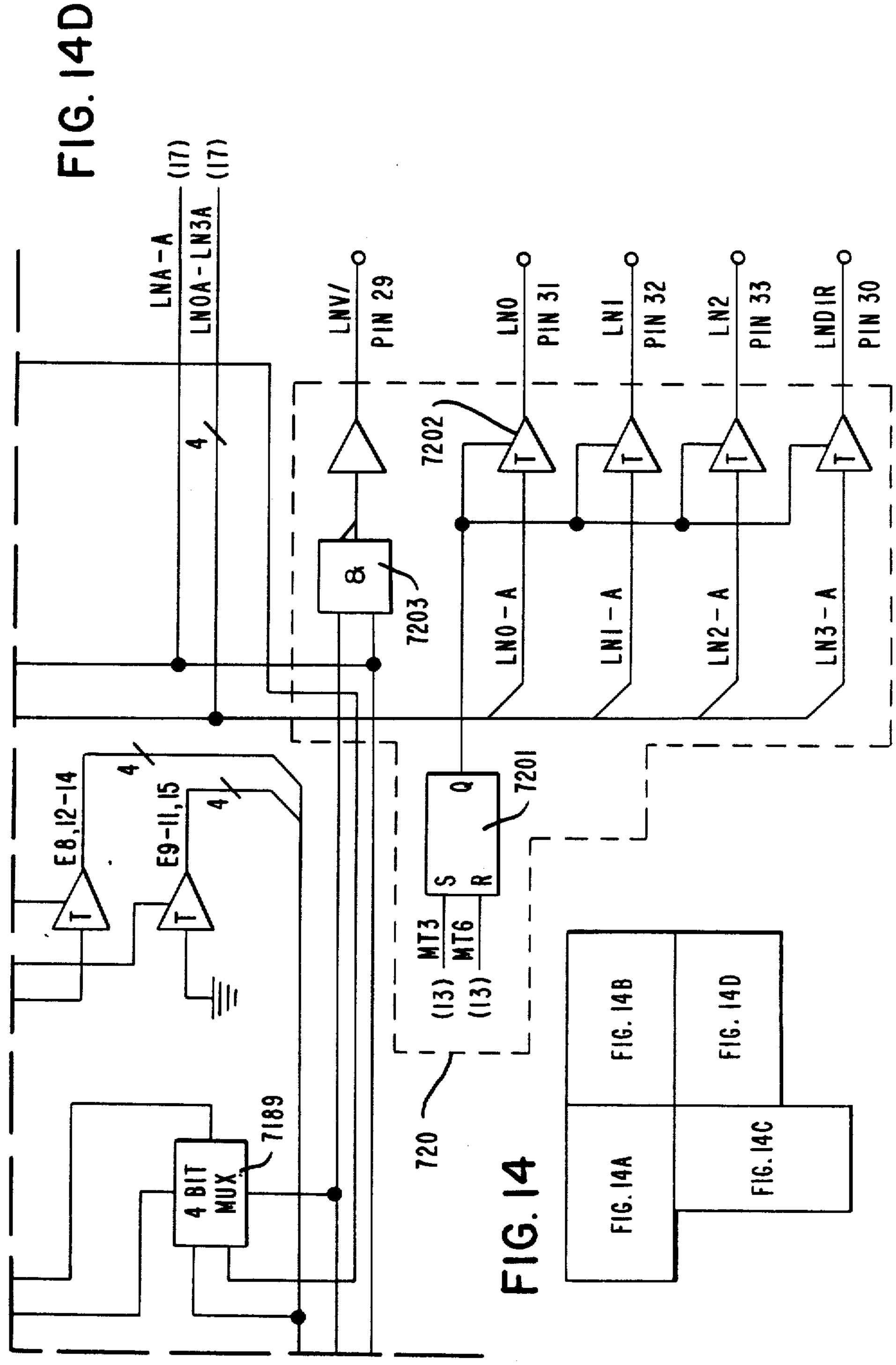
Figure 15A:
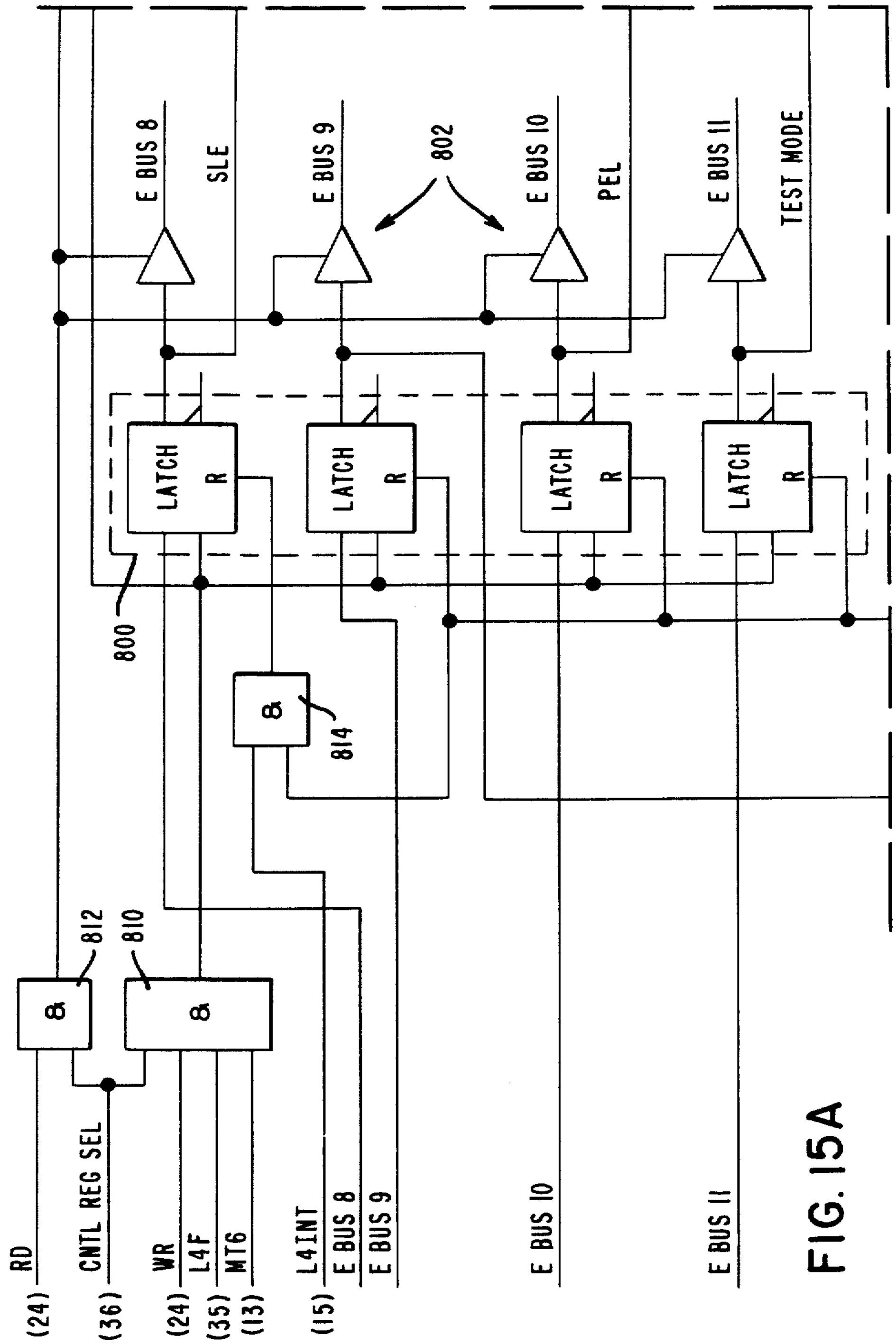
FIGS. 15A-15D, assembled in accordance with the map of FIG. 15, illustrate, in schematic form, the control register used in the CBuC of FIGS. 12A-12C.
Figure 15B:
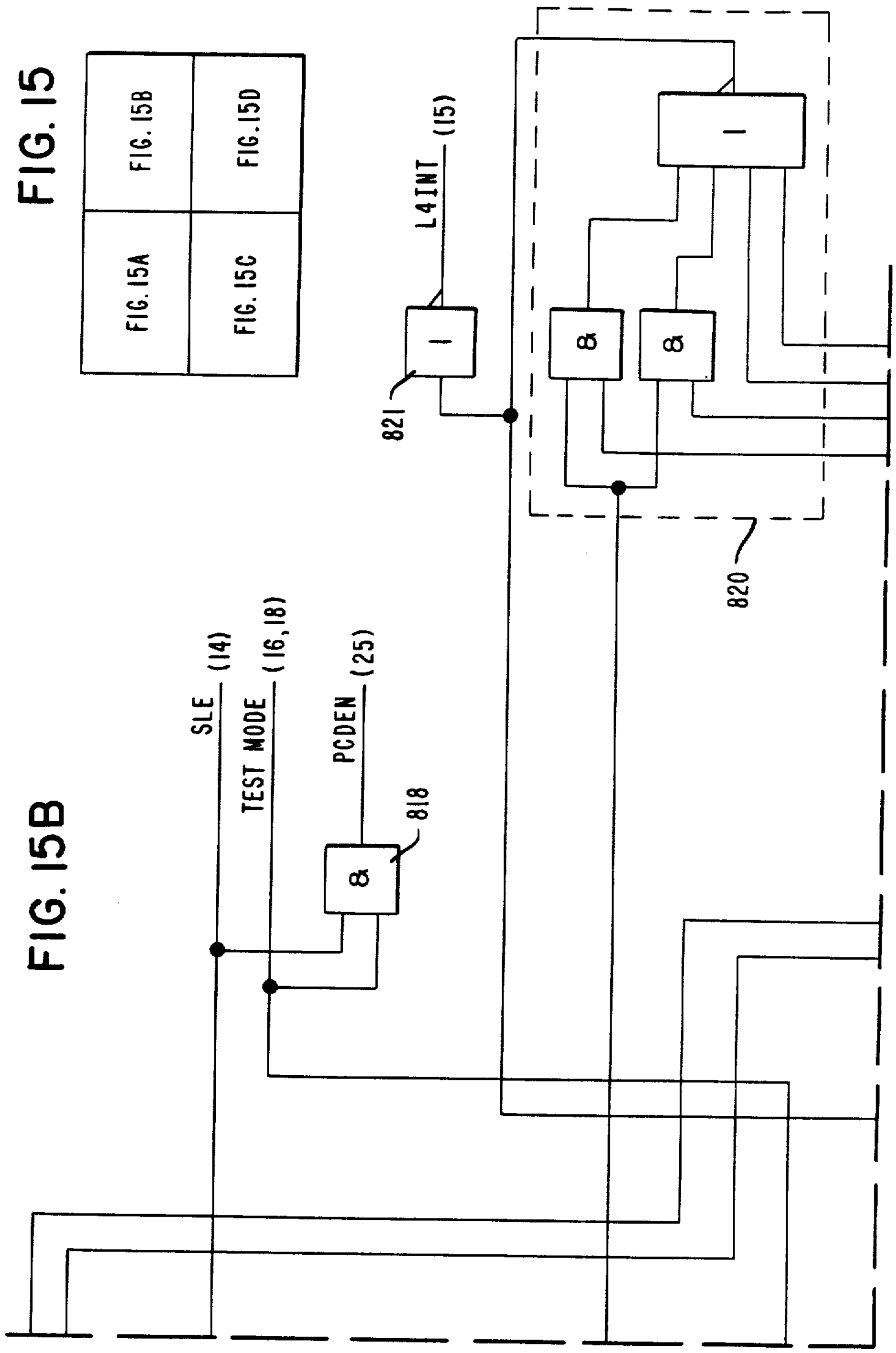
Figure 15C:
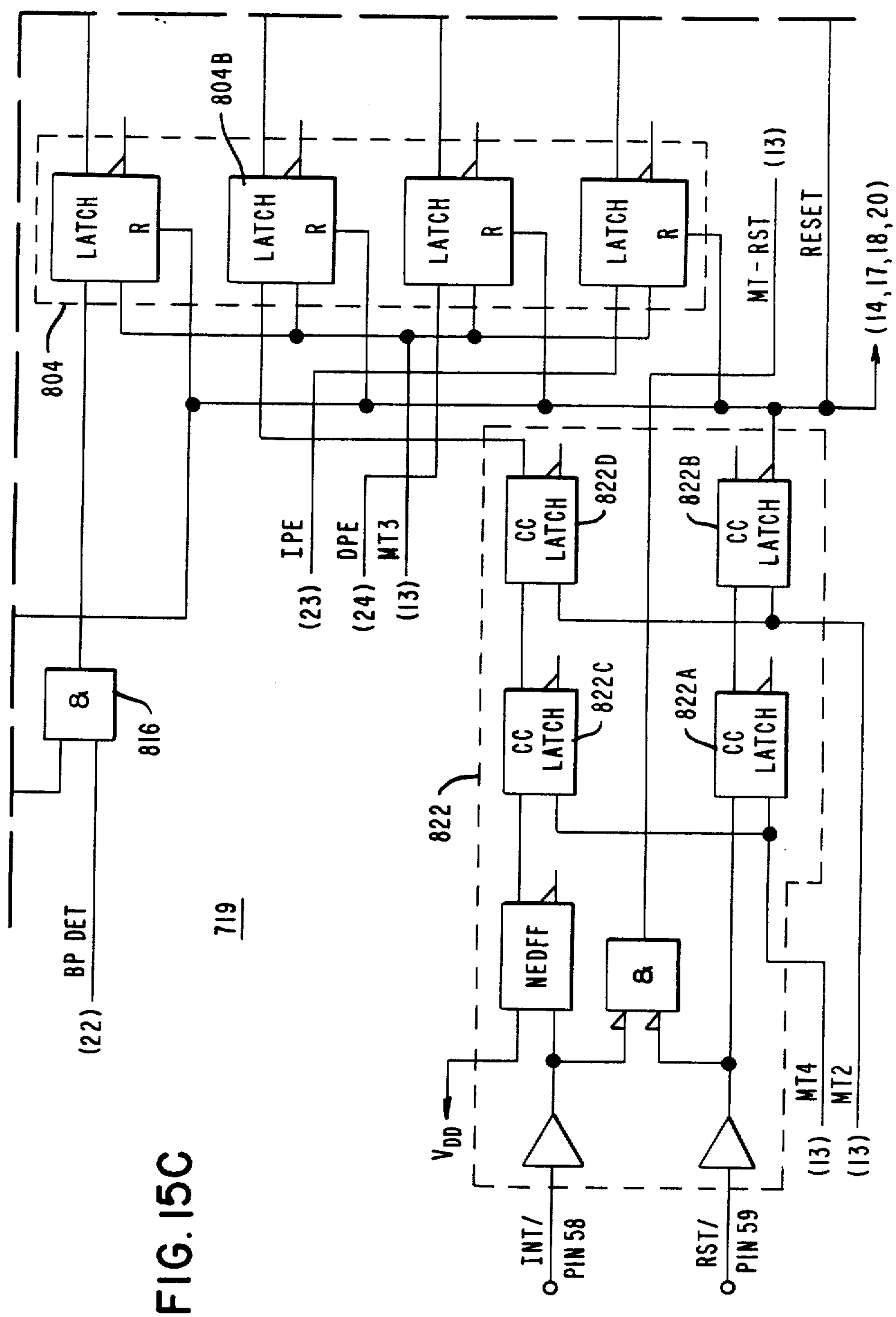
Figure 15D:
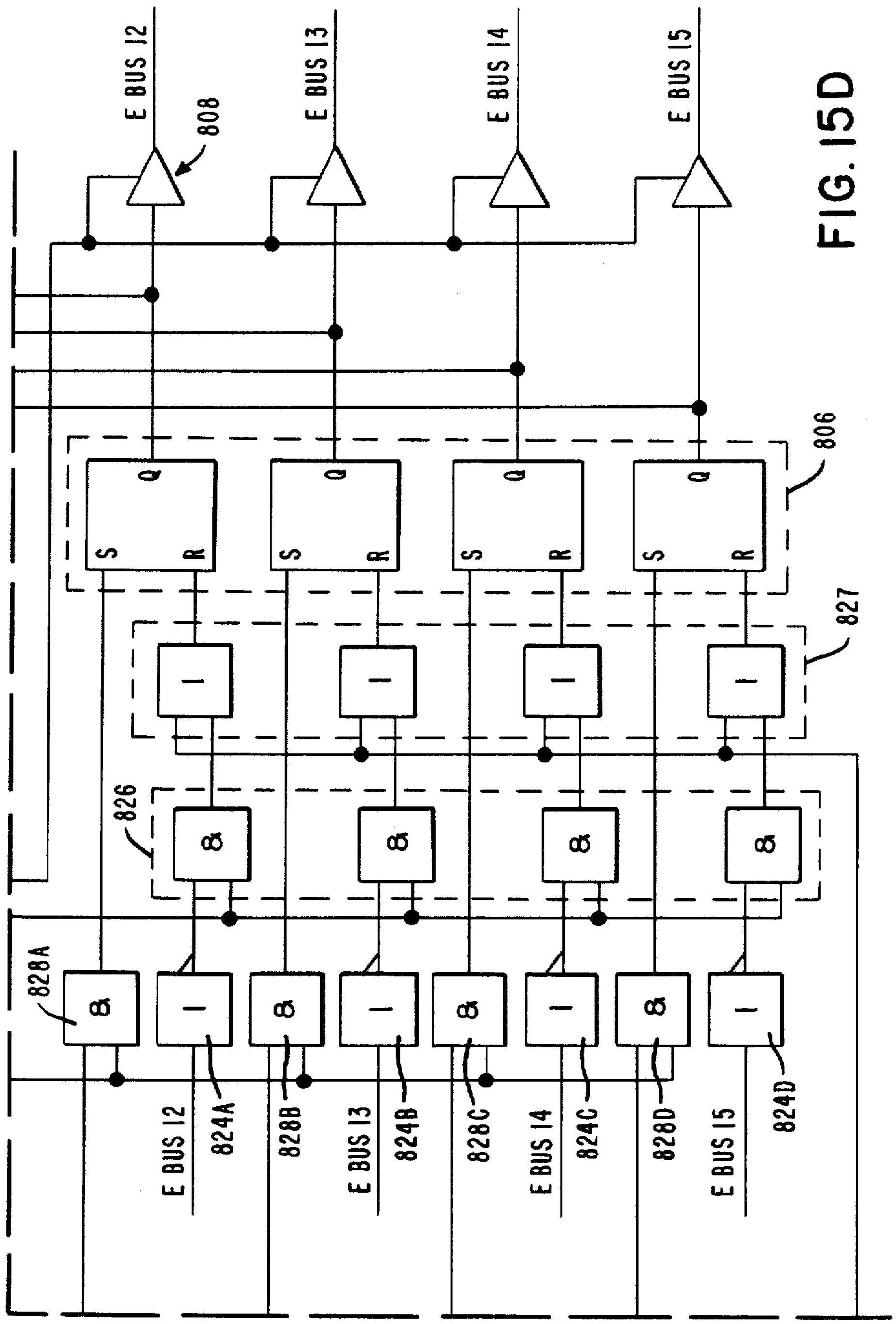
Figure 19A:
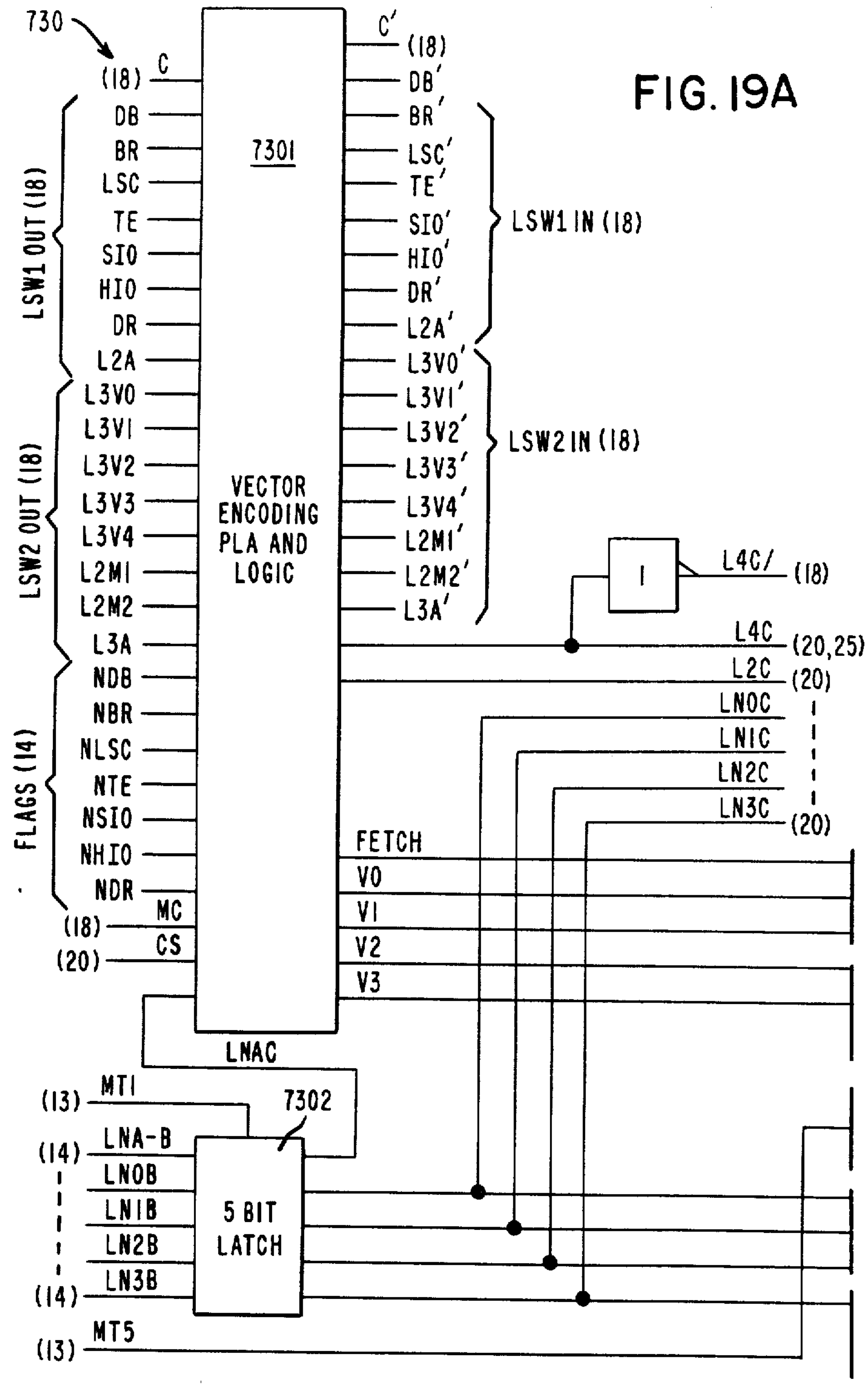
FIGS. 19A and 19B illustrate, in schematic form, the vector encoding logic used in the CBuC of FIGS. 12A-12C.

Referring now to FIGS. 14A–14D, assembled in accordance with the map of FIG. 14 wherein is disclosed the flags logic 722. The flags logic 722 is comprised of six amplifiers 7221, each connected respectively to pins 20–25 for receiving the designated signals and for providing those signals to a corresponding number of AND gates 7222. The outputs of the AND gates are directed to a 7-bit latch 7223. The 7-bit latch also receives as inputs the TIMER EXP signal and the MT1 signal. The AND gates 7222 each receives as an enabling input the signal LNA-B from a 5-bit latch 7190. The output signals from the 7-bit latch 7223 are directed to the inputs of a vector encoding logic block 730 (FIG. 19A).

Scan/Direction Logic 718

The scan/direction logic 718 is shown comprised of a 4-bit binary up counter 7181 for receiving on its inputs the signal MT6 and for providing at its output signals to a 4-bit multiplexer 7182 and an AND gate 7199. The AND gate outputs the signal RTC CLK. The 4-bit signal from the multiplexing latch 7182 is directed as the address signal to a scan list RAM 7183 such that the signals at the address input are cycled to scan the table stored in the RAM in a sequential cyclical order. The address of a corresponding peripheral device appears at the scan list RAM output labeled Q0–3. Those signals are directed to a 4-bit latch 7184 and to a tri-state device interposed between the scan list RAM and the E-bus. These tri-state gates along with multiplexer 7182 provide read and write access to the scan list RAM from the instruction execution unit 110. Software programs have the ability to inspect and change the contents of the scan list RAM via execution of load or store instructions to the hexadecimal data memory addresses 8400 through 840F. Data addresses within this range will cause activation of the signal SCAN LIST SEL to gates 7187 and 7188, from the address detection logic 764. The gates 7187 and 7188 will either enable tri-state gates or the write enable (WE) of the scan list RAM on occurrence of either the RD signal or WR signal, respectively. The definition of the bit positions of the scan list RAM as seen by the program registers, is as follows:

| 0 | 1 | 2 | 3 | 4 | 5 | 6 | 7 |
|---|---|---|---|---|---|---|---|
| 0 | 0 | 0 | 0 | LNA | LN0 | LN1 | LN2 |

LNA, when set, designates the 3-bit field LN0–LN2 is an active line address. LN0–LN2 is a 3-bit address selecting one of eight peripheral devices (PD0-PD7). The resetting of bits 0–3 of the scan list RAM is accomplished by the tri-state gates with their inputs tied to circuit ground.

A 3-bit multiplexer latch 7185 receives the three line address bits (LN0–LN2) from the 4-bit latch 7184 and three address bits, E ADDR 6–8; and, under control of the clocking signals MT2 and MT5, outputs one of the group of bits to the address inputs of direction list RAM 7186. The direction list RAM output bits are available at the output Q0–3 and are directed to the input of the 8-bit latch 7190. The direction list RAM outputs are also connected to tri-state gates which in turn are connected to the E-bus at bit positions 8 and 12–14. These tri-state gates along with multiplexer 7189 provide read and write access to the direction list RAM from the instruction execution unit 110. Software programs have the ability to inspect and change the contents of the direction list RAM via execution of load and store instructions to the data memory address 100000LLLX000010 in binary format. The three bit field, LLL, designates the line address of the peripheral devices PD0–PD7, while X designates a "don't care" condition. Data memory addresses within this address range will cause activation of the DIR LIST SEL by the address detection logic 764. The gates 7189, 7197, and 7198 will either enable the outputs of the tri-state gates to the E-bus, or enable the write enable input (WE) to the direction list RAM, dependent on the RD or WR signals, respectively. The definition of the bit positions of the direction list RAM, is as follows:

| 0 | 1 | 2 | 3 | 4 | 5 | 6 | 7 |
|---|---|---|---|---|---|---|---|
| LN3 | 0 | 0 | 0 | IA | OA | FDX | 0 |

LN3 is the direction of the next line scan. LN3, when set, designates the next scan will be output. IA enables scans in the input direction. OA enables scans of the output direction. FDX enables alternating scans in the input and output directions. The resetting of bits 1–3 and 7 of the scan list RAM is accomplished by the tri-state gates connected to E-bus bits 9–11 and 15.

Five bits from the output of the 8-bit latch 7190 are directed to a next direction PLA 7192 when latched by the signal MT3. The logical function of the next direction PLA is defined by the following logic expressions:

| | |
|---|---|
| Inputs: | LN3A, IA, OA, FDX comprise the current state of the direction list RAM location selected by signals LN0–LN2. LNA-A is the state of the LNA bit of the scan list RAM location selected during this scan cycle. |
| Outputs: | NDIR, IA', OA', FDX' is the next state to be stored at the direction list RAM location selected by signals LN0–LN2. |
| | NDIR = IA/ · OA · FDX/ + LN3A/ · FDX · LNA-A + LN3A/ · IA · OA · LNA-A + LN3A/ · IA/ · OA/ · LNA-A |
| | IA/ = IA' |
| | OA/ = OA' |
| | FDX' = FDX/ |

The next direction PLA 7192 provides a 4-bit output which is directed to one set of inputs to a 4-bit multiplexing latch 7189. The other set of inputs are the E-bus bits 12–15. The output of the 4-bit multiplexing latch 7189 is directed to the data input terminal labeled D0–3 of the direction list RAM 7186 under control of the clocking signal MT4 and the signals DIR LIST SEL and WR that are ANDed by an AND gate 7197. A 4-bit comparator 7191 compares the LN0A–LN3A bits present at the output of the 8-bit latch 7190 with four of the bits received from a 5-bit latch 7194 and upon achieving coincidence the comparator provides an output signal which is directed to the inputs of a NAND gate 7195, the output of which is connected to an input of an AND gate 7196. The gates 7191, and 7195 will disable gate 7196 when the signals LN0A–LN3A equal the same signals during the previous scan cycle. The signal SLE generated by the control register 719 enables gate 7196.

A 5-bit latch 7193 stores the one bit from the AND gate 7196 and the four bits LN0A–LN3A upon enablement by the clocking signal MT4. The outputs from the 5-bit latch 7193 are directed to the inputs of the 5-bit latch 7194 which is latched by the signal MT6. The output signals from the 5-bit latch 7194 are directed back to the input to the 4-bit comparator 7191 with 1-bit from the 5-bit latch being directed to the input of the NAND gate 7195.

An AND gate 7188, responsive to the signal WR and the signal SCAN LIST SEL, provides as its output a write enable signal to the WE terminal of the scan list RAM 7183. The AND gate 7187, responsive to the signal SCAN LIST SEL and the signal RD provides as its output the enabling signal to the tri-state amplifier pair connected to the Q0–3 output of 7183 and to ground. The AND gate 7189, responsive to the signals on its inputs provides the enabling signal to the tri-state amplifier pair connected to the Q0–3 output of the direction list RAM 7186. The WE signal applied to the direction list RAM 7186 is derived from the signal MT4 and the output from the AND gate 7197 by an OR circuit 7198.

Flag Solicitation Logic 720

The flag solicitation logic 720 is shown comprised of a latch 7201 which receives at its S and R inputs the clocking signals MT3 and MT6, respectively. The latch output signal acts as the enabling signal to the four tri-state amplifiers denoted generally as 7202. The signals LN0A–LN3A, are directed to the like labeled inputs to the tri-state devices and are passed, upon enablement, to the pins labeled 30–33, respectively.

Control Register 719

Referring to FIGS. 15A–15D assembled in accordance with the map of FIG. 15 wherein is illustrated the control register 719. The main function of the control register 719 is to resynchronize and store key interrupt and error conditions which disable normal program execution. The instruction execution unit 110 has access to the control register via the E-bus. Software programs have the ability to inspect and change the contents of the control register via execution of load or store instructions to the hexadecimal data memory address 84FF. The data address 84FF will activate the CNTL REG SEL by the address detection logic. The bit definition of the control register as seen by the program registers is as follows:

| 0 | 1 | 2 | 3 | 4 | 5 | 6 | 7 |
|---|---|---|---|---|---|---|---|
| SLE | BPE | PEL | TM | BPD | INT | DPE | IPE |

Where SLE, when set, enables vector dispatching by the program control logic. BPE enables interruption of the normal instruction execution when the BPDET signal is activated by the break point register 70. PEL, when clear, enables the interruption of the normal instruction execution upon activation of either DPE or IPE signals generated by the data parity logic 761 or the instruction parity logic 759. The BPD bit sets upon activation of the BPDET signal, conditioned with BPE signal. The INT signal sets upon activation of the INT/ signal on pin 58. The DPE and IPE bits set on detection of parity errors by the data parity logic and instruction parity logic, respectively. Clearing of the control register bits is accomplished by the appropriate instruction sequence executed by the instruction execution unit.

Four latches 800 receive E-bus bits 8–11 and latch the signals to their outputs when CNTL REG SEL, WR, L4F, and MT6 are all active. CNTL REG SEL, SR, L4F, and MT6 are ANDed together by the AND gate 810. The latches 800 are reset by activation of the R inputs by the RESET generated by the cross coupled latch 822B. The resetting signal RST/ is applied to a resynchronization circuit 822 which is comprised of cross-coupled (CC) latches 822A–822D. The latches 822A and 822B are latched with the RST/ signal by clock signals MT4 and MT2, respectively, to provide at the output of latch 822B the signal RESET. In a like manner, the INT/ signal is directed to a negative edge triggered D-type flip-flop, the output of which is connected to the cross-coupled latches 822C and 822D to provide an output signal to a latch 804B, which latch is part of a 4-bit latch group 804. The latch 804 are latched under control of the timing signal MT3. The outputs of the latch 804 are reset by the enabling of the R input by the RESET signal.

A group of tri-state amplifiers 802, enabled by the output signal from an AND gate 812, permits the signals stored in the latch group 800 to be directed onto the E-bus conductors 8–11. The output signals from the latch group 804 are directed individually to the inputs of the AND gate group 828A–828D. The other input to the AND gates is the signal from the logic gates 820 which signal is the logical combination of the signals present at the outputs of the SR flip-flop group 806 and the output of the latch connected to the E-bus 10 terminal.

A group of inverters 824A–824D are connected to the E-bus conductors 12–15 to couple the signals thereon to inputs of an AND gate group 826. The enabling input to the AND gate group 826 comes from the output of the AND gate 810. An OR gate group 827 receives the output from the AND gate group 826 along with the signal RESET and provides at its output the reset signal for the SR flip-flop group 806. The output signal from the AND gates 828A–828D are applied to the S inputs of corresponding flip-flops of the group 806. The output signals available on the Q terminals of the flip-flop group 806 are directed, as inputs, to the tri-state amplifiers group 808.

Real Time Clock 850

Figure 16:
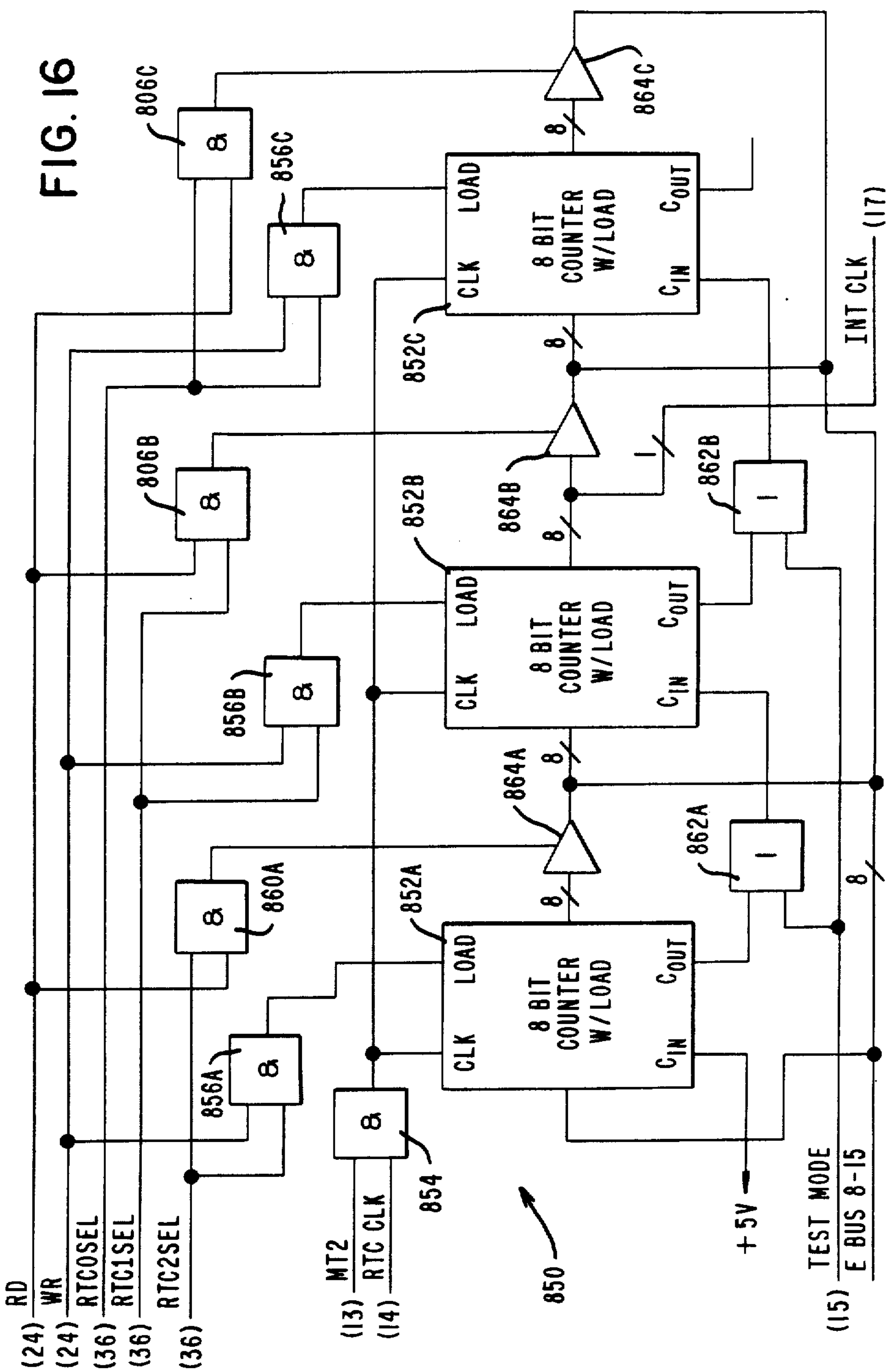
FIG. 16 illustrates, in schematic form, the real time clock used in the CBuC of FIGS. 12A-12C.

Referring to FIG. 16 wherein the real time clock 850 is shown in logic block form comprised of 8-bit counters 852A–C, AND gates 854, 856A–C, 860A–C and OR gates 862A and B. The 8-bit counters 852A–852C form a 24-bit counter which is utilized by the software programs for a time reference. The instruction execution unit is allowed read and write access to the real time clock counters at data memory addresses 8410–8412. Data addresses of 8410, 8411, 8412 will cause activation of the RTC0SEL, RTC1SEL, and RTC2SEL, respectively. The AND gates 856A–856C have their output terminals connected to the LOAD input of the 8-bit counters 852A–C, respectively, and their inputs connected to various labeled signals for controlling the loading operation of each of the counters. The AND gates 860A–860C provide the enabling signals for the tri-state amplifiers 864A–864C, respectively, so as to couple the output from the counters to the output of the tri-state amplifiers. The counters are clocked by the signals MT2 and RTC CLK directed to their CLK inputs by the AND gate 854. The carry signal from counter 852A is coupled to the CIN input of counter 862B by OR gate 862A and in a like manner, the carry signal from 862B is coupled to the CIN input of counter 852C by the OR gate 862B. One of the 8-bit counts, the next to least significant bits, from counter 852B is directed to an output as the signal INT CLK. The remaining outputs, dependent upon the activation of the tri-state gates, are directed onto the E-bus as bits 8–15.

Interval Timer 870

Figure 17A:
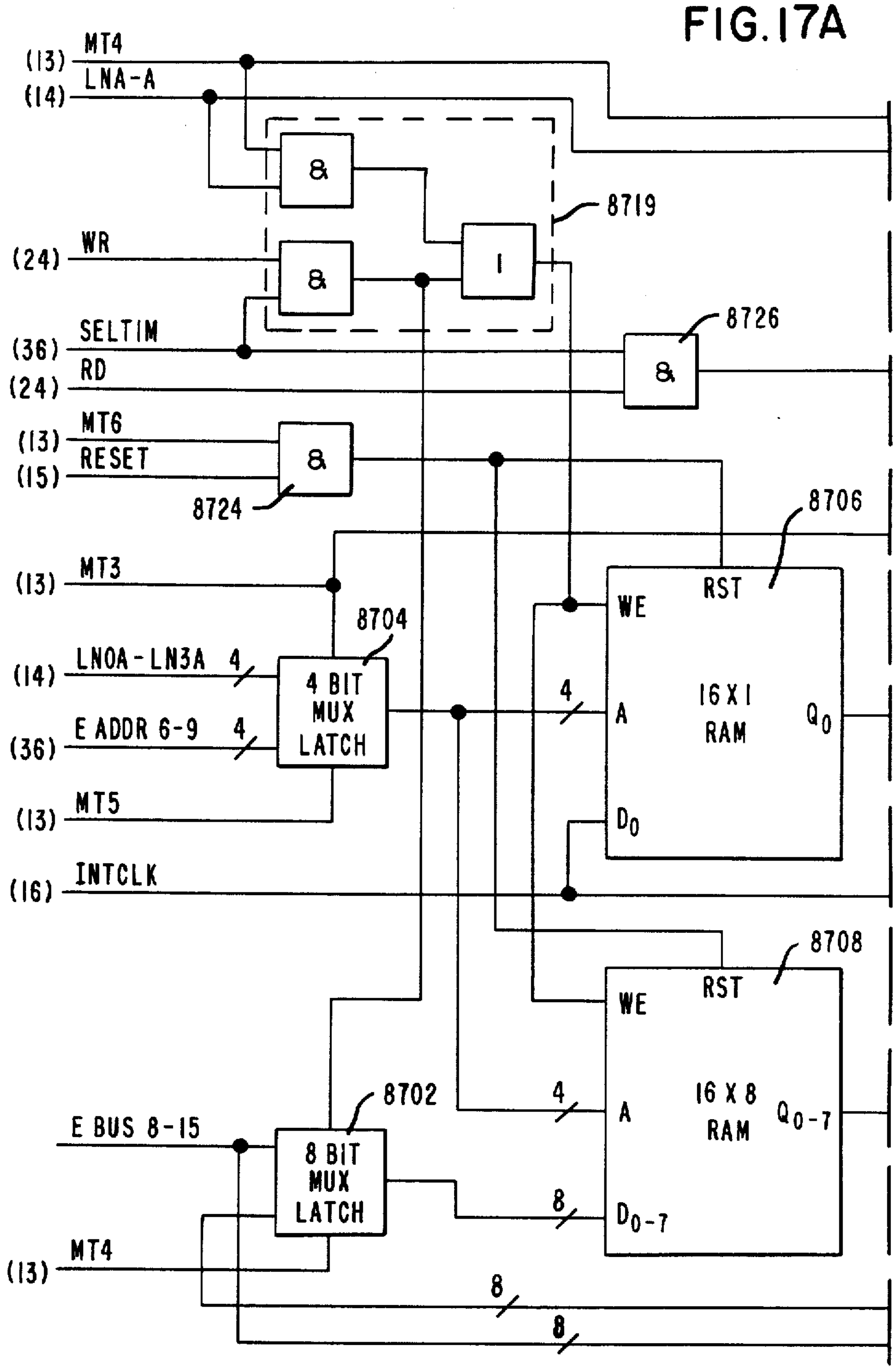
FIGS. 17A and 17B illustrate, in schematic form, the interval timer used in the CBuC of FIGS. 12A-12C.
Figure 17B:
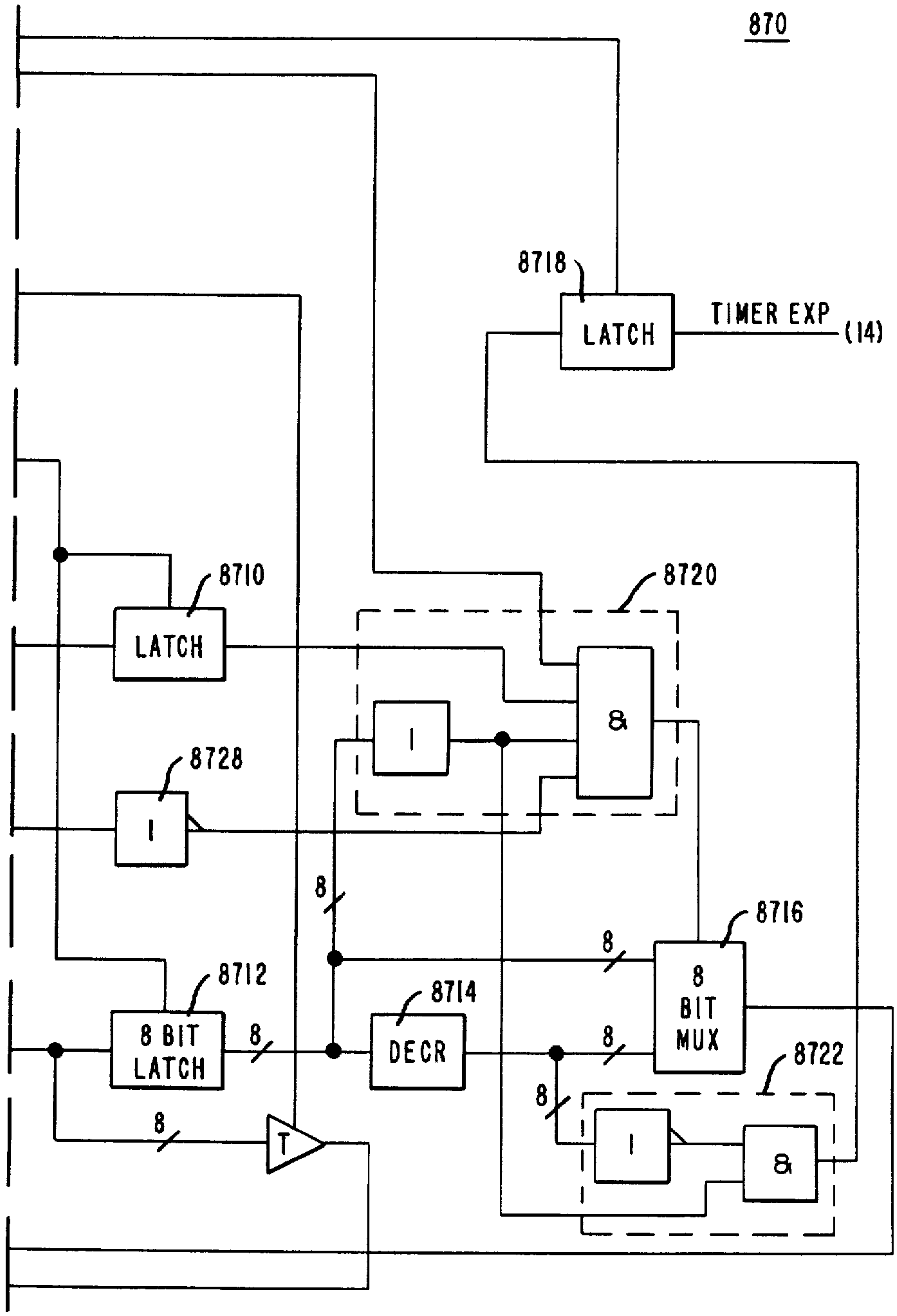

Referring to FIGS. 17A and 17B wherein is shown the interval timer 870. The interval timer functions to store the maximum time periods permitted for an action by a particular protocol such that if the actin is not performed within the permitted time period, a TIMER EXP signal ceases or modifies the activity of that protocol within the processor. With a multiplicity of protocols being handled by the processor, it can be appreciated that a multiplicity of timing intervals associated with each of the protocols must be accommodated by the interval timer 870.

A 16×8 RAM 8708 stores the count for up to sixteen different protocols. The 16×1 RAM 8706 retains the state of the interval clock signal from the last scan of the selected peripheral device. The Q0 output is latched into latch 8710 at the clock time MT3. A 4-bit multiplexing latch 8704 under latching control of the clocking signals MT3 and MT5, alternately provides four address bits to the four A labeled inputs of RAM 8706 and 8708 which alternating address bits are E ADDR 6–9 and LN0A–LN3A. The output count is available at the Q0–7 output of RAM 8708 which output is directed to an 8-bit latch 8712.

The 8-bit latch 8712 is latched with the timing signal MT3 and provides at its output the latched bits which are directed to a decrementer 8714. The decrementer decrements by one the count at its input. When the decrementer 8714 outputs a zero the logic circuitry 8722 provides the TIMER EXP signal to a latch 8718 which under enabling control of the clocking signal MT4 outputs the TIMER EXP signal.

Gating circuitry 8720 receives on its inputs the output from the latching circuit 8710 and the signal INTCLK inverted by inverter 8728, and the 8-bit output signal from the latch 8712, along with the signal LNA-A. Upon meeting the logic conditions illustrated by the logic circuitry of the logic gate group 8720 a signal is outputted to the control input of the 8-bit multiplexer 8716 to control which block of eight signals appear at its output. The multiplexer 8716 will pass the outputs of the decrementer 8714 when the output of gates 8720 are active. The 8-bits from the multiplexer 8716 are directed back as a group of 8-bits to the 8-bit multiplexing latch 8702 along with the 8-bits from the E-bus bits 8–15. The outputs of an interval timer RAM 8708 are enabled onto E-bus bits 8–15 when an AND gate 8726 becomes active. The AND gate ANDs the signals SELTIM and RD.

The clocking signal MT4, the LNA-A signal and the signals WR and SELTIM control the multiplexer 8702. The logic gate group 8719 provides the signal WE to the inputs of RAMs 8706 and 8708. The 8-bit output from the 8-bits multiplexing latch 8702 is directed to the data input D0–7 of RAM 8708. The data input D0 of RAM 8706 is the interval clock signal INTCLK.

Line Status Word RAM 880

Figure 18A:
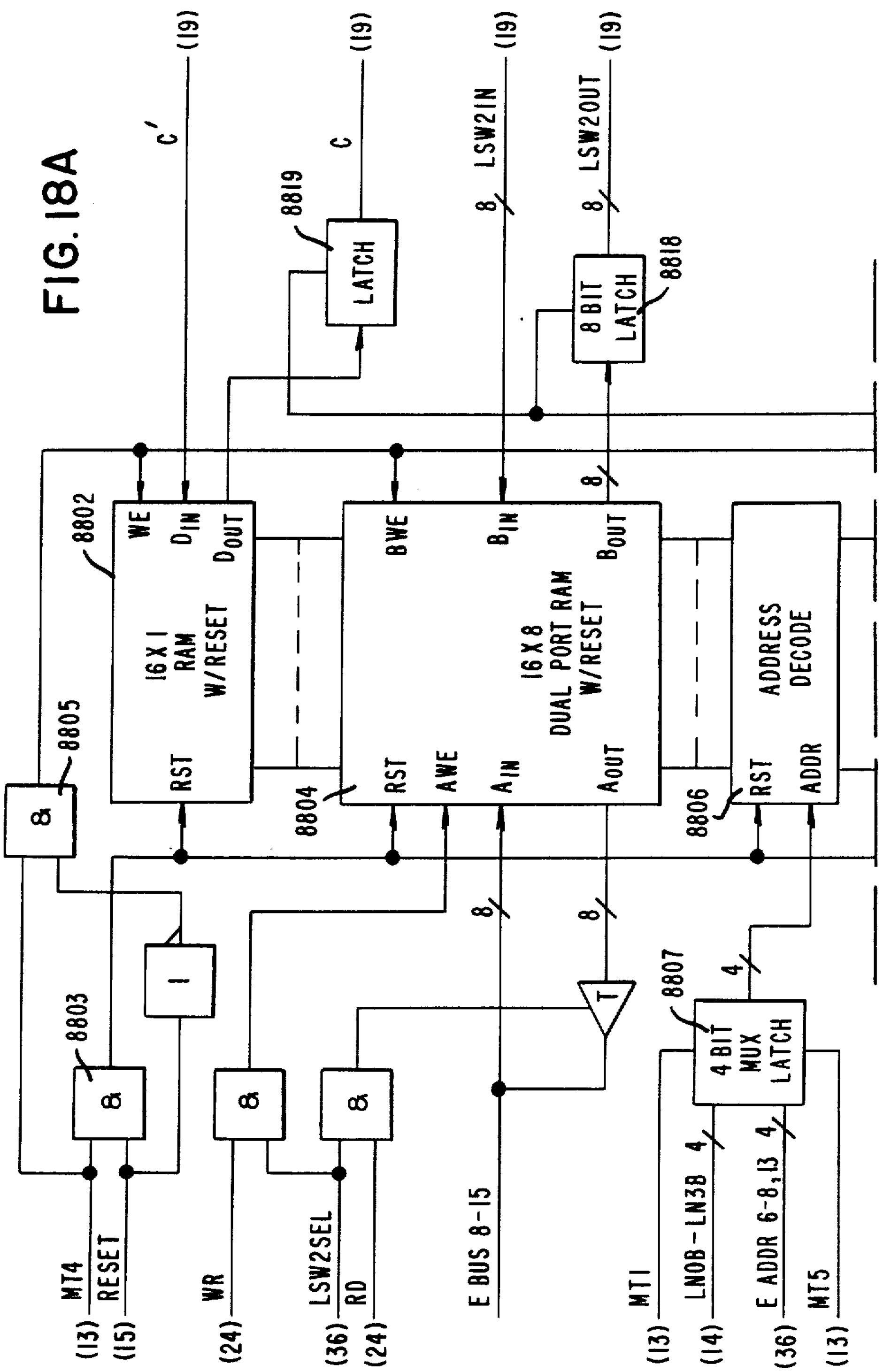
FIGS. 18A-18C, assembled in accordance with the map of FIG. 18, illustrate, in schematic form, the line status word RAM used in the CBuC of FIGS. 12A-12C.
Figure 18B:
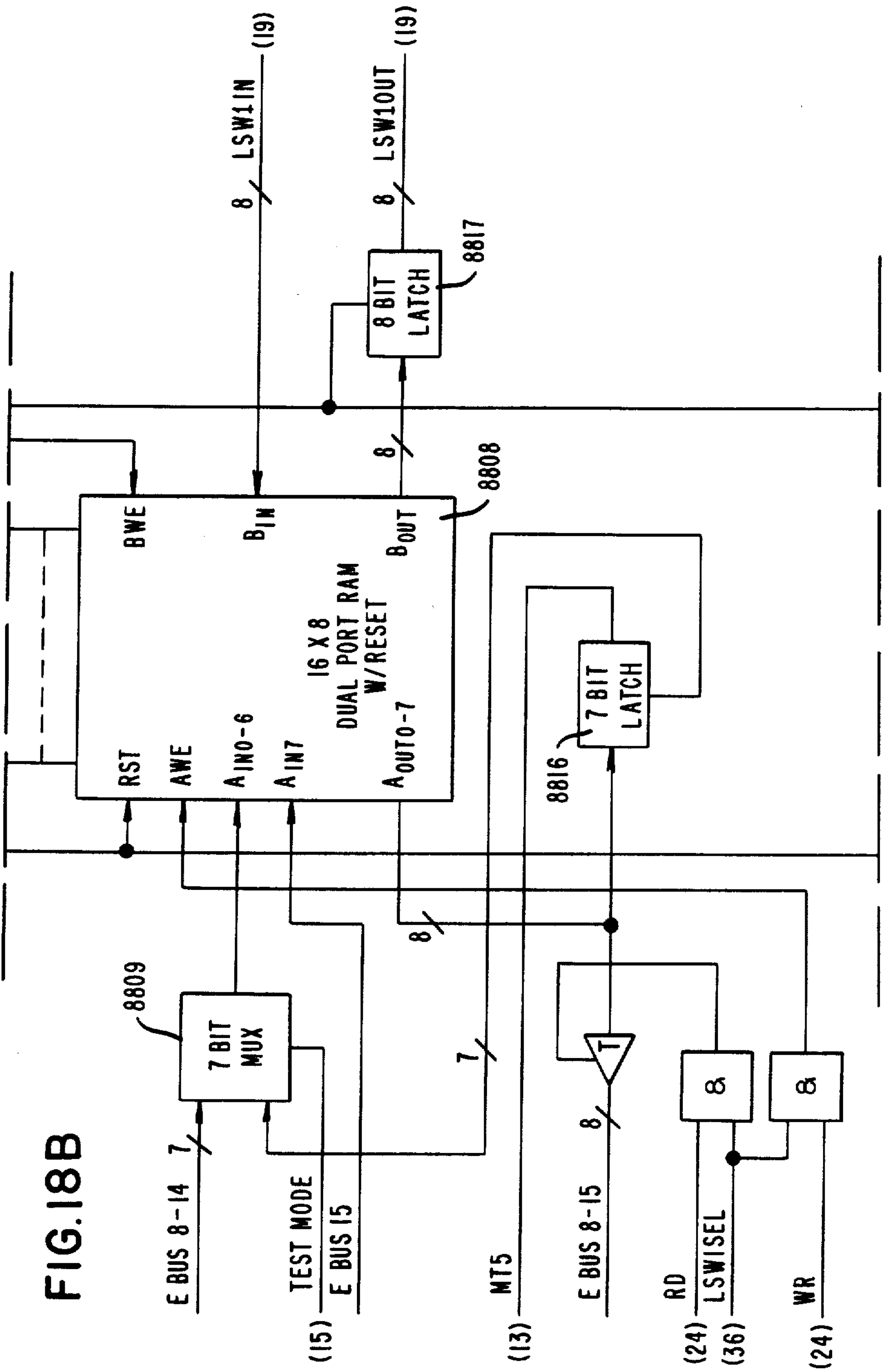
Figure 18C:
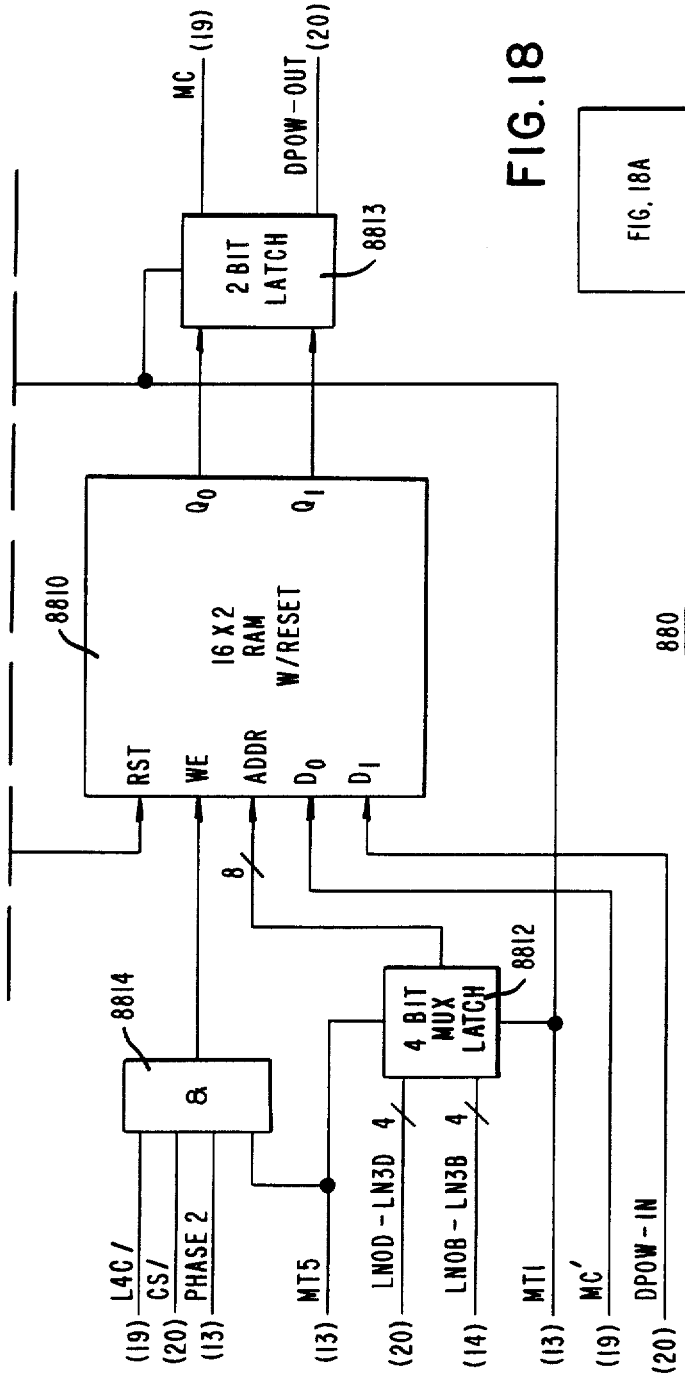
Figure 18:
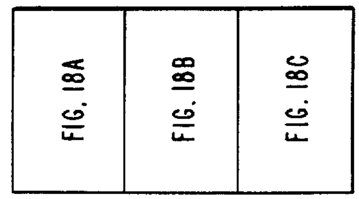

Referring to FIGS. 18A–18C assembled in accordance with the map of FIG. 18 wherein is illustrated the line status word RAM 880 which functions to store pending flags for designating events and for modifying the flow of control progress for each communication line.

The RAM 880 is comprised of a 16×1 RAM 8802, a 16×8 dual port RAM 8804, an address decode 8806, a 16×8 dual port RAM 8808 and a 16×2 RAM 8810. The address decode 8806 receives the 4-bit multiplexed input from lines LN0B–LN3B or from lines E ADDR 6–8, 13 under control of the clock signals MT1 and MT5. The address decode 8806 selects the output from RAM 8804 and 8808. These outputs are available at the A out and B out terminals simultaneously. The B out signals of RAMs 8804 and 8808 are directed to the 8-bit latches 8818 and 8817, respectively. The RAM 8810, likewise, has a latch 8813 connected to receive its 2-bit output on terminals Q0 and Q1 for latching the output upon receipt of the clocking signal MT1. The RAM 8802 has its output latched by a latch 8819. The WE signal for RAMs 8802, 8804, and 8808 is derived from the output of an AND gate 8805 and the logical combination of signals MT4 and RESET. A reset for all of the RAMs is derived from the output of AND gate 8803.

A 7-bit multiplexer 8809 directs the E-bus bits 8–14 to the address input AIN0–6 of RAM 8808 and in the test mode recirculates the data bits from the output labeled AOUT0–6 through a 7-bit latch 8816 back to the data inputs AIN0–6. The 7-bit latch 8816 is enabled by the clocking signal MT5. The RAM 8810 operates one machine cycle delayed from the RAMs 8802, 8804 and 8808.

The instruction execution unit 110 has access to the scan list RAMs 8804 and 8808 via the E-bus. The data memory address in binary, 100000LLLX000D00 selects the RAM 8808 by enablement of signal LSW1SEL. The data memory address 100000LLLX000D01 selects the RAM 8804 through enablement of signal LSW2SEL. The variable field, LLL, designates the line address of the peripheral device. Where the variable D specifies the direction, the bit definitions of RAMs 8802, 8804, and 8806 can be derived from the input labeling to the vector encoding PLA and logic 7301 of FIG. 19A.

Vector Encoding Logic 730 and PTG Vector Logic 735

Figure 19B:
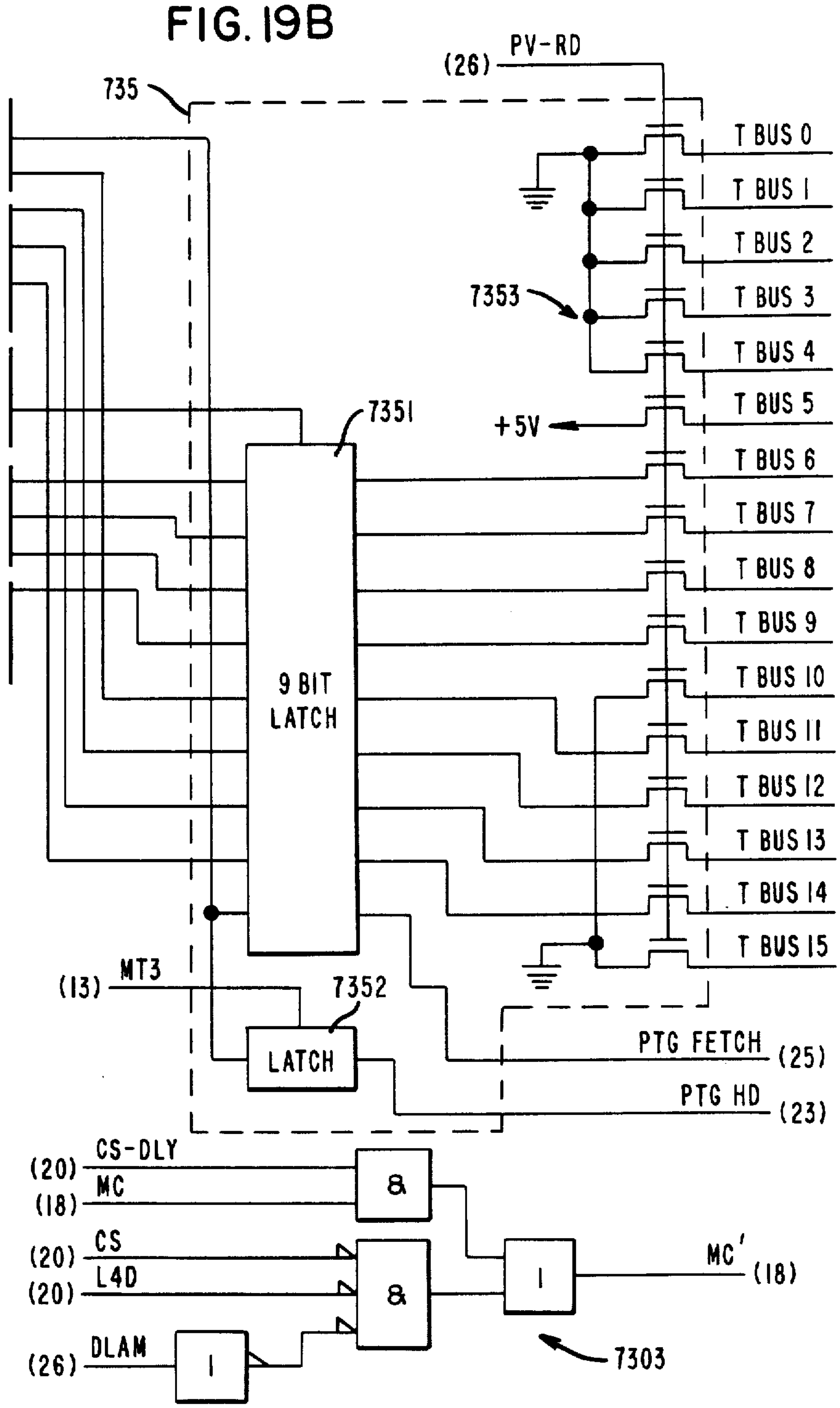

Referring now to FIGS. 19A and 19B wherein is shown the vector encoding logic 730 and the PTG vector logic 735. The vector encoding logic 730 is comprised of the vector encoding PLA and logic circuitry 7301 and a 5-bit latch 7302. The Boolean logic expressions for 7301 are as follows:

Vector Encoding PLA and Logic 7301 Boolean Logic Expressions

C' = NDR · SIO/ · NSIO/ · NHIO/ + C · PTGF/ · NHIO/ + DR · PTGD · NHIO/
DB' = NDB · NBR + DB · NBR/
BR' = NBR · P0–5/ + BR · P0–5/
LSC' = NLSC · PTG6/ + LSC · PTG6/
TE' = NTE · PTGC/ + TE · PTGC/
SIO' = NSIO · NHIO/ · PTGD/ + SIO · NHIO/ · PTGD/
HIO' = NHIO · PTGE/ + HIO · PTGE/
DR' = NDR · NHIO/ · PTGF/ + DR · NHIO/ · PTGF/
L2A' = L2A + P0–5 + PTG6
L3V0' = L3V0 · PTG7/
L3V1' = L3V1 · PTG8/
L3V2' = L3V2 · PTG9/
L3V3' = L3V3 · PTGA/
L3V4' = L3V4 · PTGB/
L2M1' = L2M1
L2M2' = L2M2
L3A' = L3A + P7-F
L4C = LNAC/ + L2A/ · L3A/ · P0–5/ · PTG6/ · P7–F/
L2C = LNAC · P0–5 + LNAC · PTG6 + LNAC · L2A
FETCH = P0–5 + PTG6 + P7-F
V0 = PTG8 + PTG9 + PTGA + PTGB + PTGC + PTGD + PTGE + PTGF
V1 = PTG4 + PTG5 + PTG6 + PTG7 + PTGC + PTGD + PTGE + PTGF
V2 = PTG2 + PTG3 + PTG6 + PTG7 + PTGA + PTGB + PTGE + PTGF
V3 = PTG1 + PTG3 + PTG5 + PTG7 + PTG9 + PTGB + PTGD + PTGF
Where the intermediate terms, PTG0–PTGF, P0–5, P7–F, [A], and [B] are defined as follows:
[A] = L2A/ · MC/ · CS/ · LNA
[B] = BR/ · LSC/ · NBR/ · NLSC/ · L3A/ · [A]
PTG0 = BR · DB/ · L2M1/ · L2M2/ · [A] + NBR · NDB/ · LSC/ · L2M1/ · L2M2/ · [A]
PTG1 = BR · DB · L2M1/ · L2M2/ · [A] + NBR · NDB · LSC/ · L2M1/ · L2M2/ · [A]
PTG2 = BR · DB/ · L2M1 · [A] + NBR · NDB/ · LSC/ · L2M1 · [A]
PTG3 = BR · DB · L2M1 · [A] + NBR · NDB · LSC/ · L2M1 · [A]
PTG4 = BR · DB/ · L2M1/ · L2M2 · [A] + NBR · NDB/ · LSC/ · L2M1/ · L2M2 · [A]
PTG5 = BR · DB · L2M1/ · L2M2 · [A] + NBR · NDB · LSC/ · L2M1/ · L2M2 · [A]
PTG6 = LSC · BR/ · [A]+ NLSC · BR/ · NBR/ · [A]
PTG7 = L3V0 · [B]
PTG8 = L3V1 · L3V0/ · [B]
PTG9 = L3V2 · L3V1/ · L3V0/ · [B]
PTGA = L3V3 · L3V2/ · L3V1/ · L3V0/ · [B]
PTGB = L3V4 · L3V3/ · L3V2/ · L3V1/ · L3V0/ · [B]
PTGC = TE · L3V4/ · L3V3/ · L3V2/ · L3V1/ · L3V0/ · [B]
PTGD = SIO · HIO/ · NHIO/ · C/ · TE/ · L3V4/ · L3V3/ · L3V2/ · L3V1/ · L3V0/ · [B] + NSIO · HIO/ · NHIO/ · DR/ · TE/ · L3V4/ · L3V3/ · L3V2/ · L3V1/ · L3V0/ · [B]
PTGE = HIO · TE/ · L3V4/ · L3V3/ · L3V2/ · L3V1/ · L3V0/ · [B] + NHIO · TE/ · L3V4/ · L3V3/ · L3V2/ · L3V1/ · L3V0/ · [B]
PTGF = DR · C · HIO/ · NHIO/ · TE/ · L3V4/ · L3V3/ · L3V2/ · L3V1/ · L3V0/ · [B]
P0–5 = PTG0 + PTG1 + PTG2 + PTG3 + PTG4 + PTG5
P7–F = PTG7 + PTG8 + PTG9 + PTGA + PTGB + PTGC + PTGD + PTGE + PTGF The PTG vector logic 735 is comprised of a 9-bit latch 7351, a latch 7352 and a bank of FET devices 7353. The 9-bit latch 7351 receives the outputs labeled V0–V3 from the vector encode logic 7301 and the latched bits, LN0B–LN3B from the latch 7302. The 9-bit latch 7351 is enabled by the clock signal MT5. Upon receipt of the signal PV-RD applied to the gates of FETs 7353, the signals at the outputs of latch 7331 are applied to the T-bus.

At the bottom of FIG. 19B, a logic circuit for deriving the signal MC' is disclosed.

The vector encoding logic selects either the level 2 or level 3 program counter of the peripheral device specified by the line address signals LN0C–LN3C by setting or clearing the L2C signal, respectively. Alternately, the vector encoding logic will initiate the vector dispatch sequence by enablement of the FETCH signal to latches 7351 and 7352. If neither the level 2 program nor the level 3 program is active and the vector dispatch sequence is disabled, the level 4 program will be selected for the next instruction fetch, and subsequent instruction execution cycle.

Program Counter RAM 737

Figure 20A:
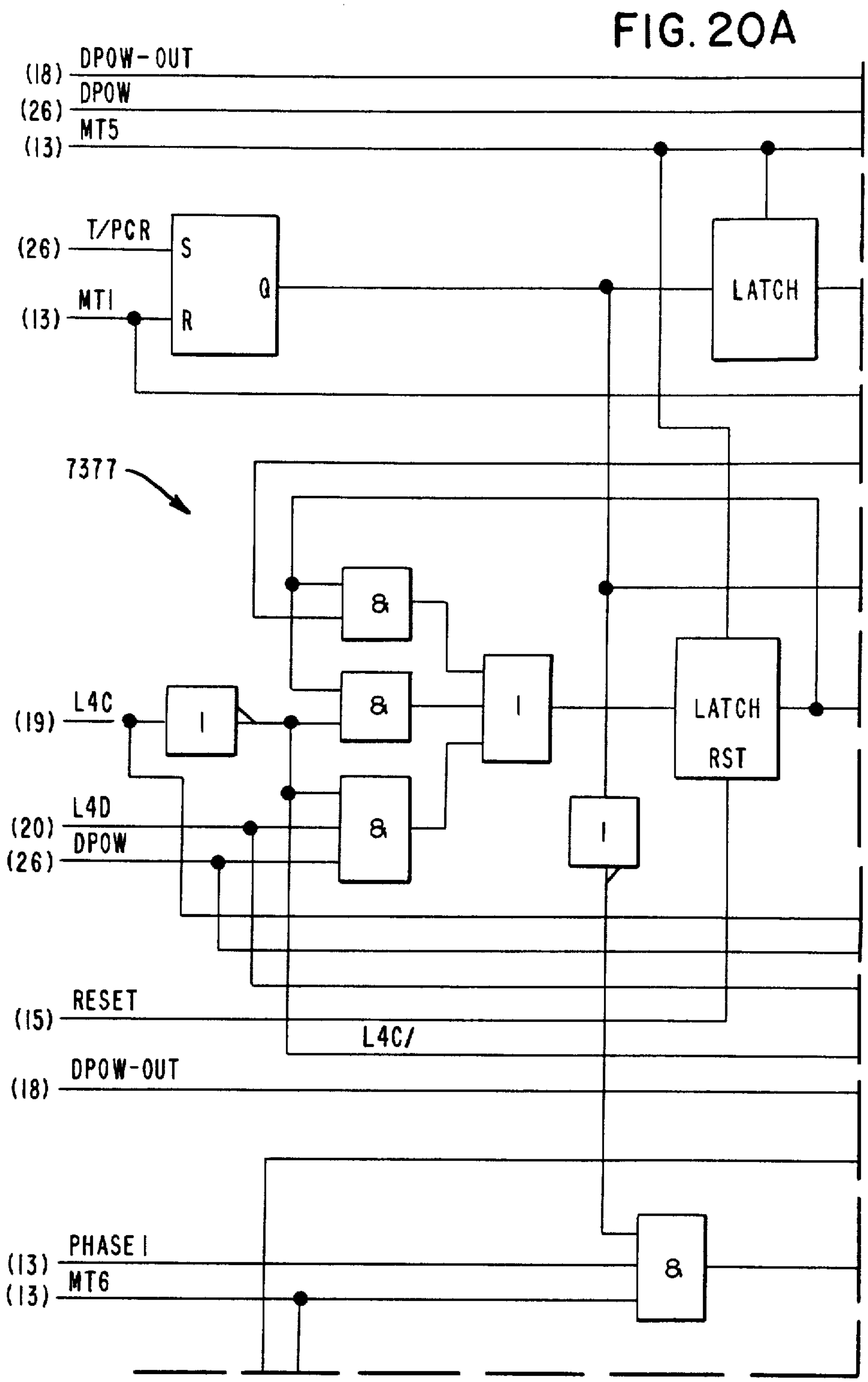
FIGS. 20A-20D, assembled in accordance with the map of FIG. 20, illustrate, in schematic form, the program counter RAM used in the CBuC of FIGS. 12A-12C.
Figure 20B:
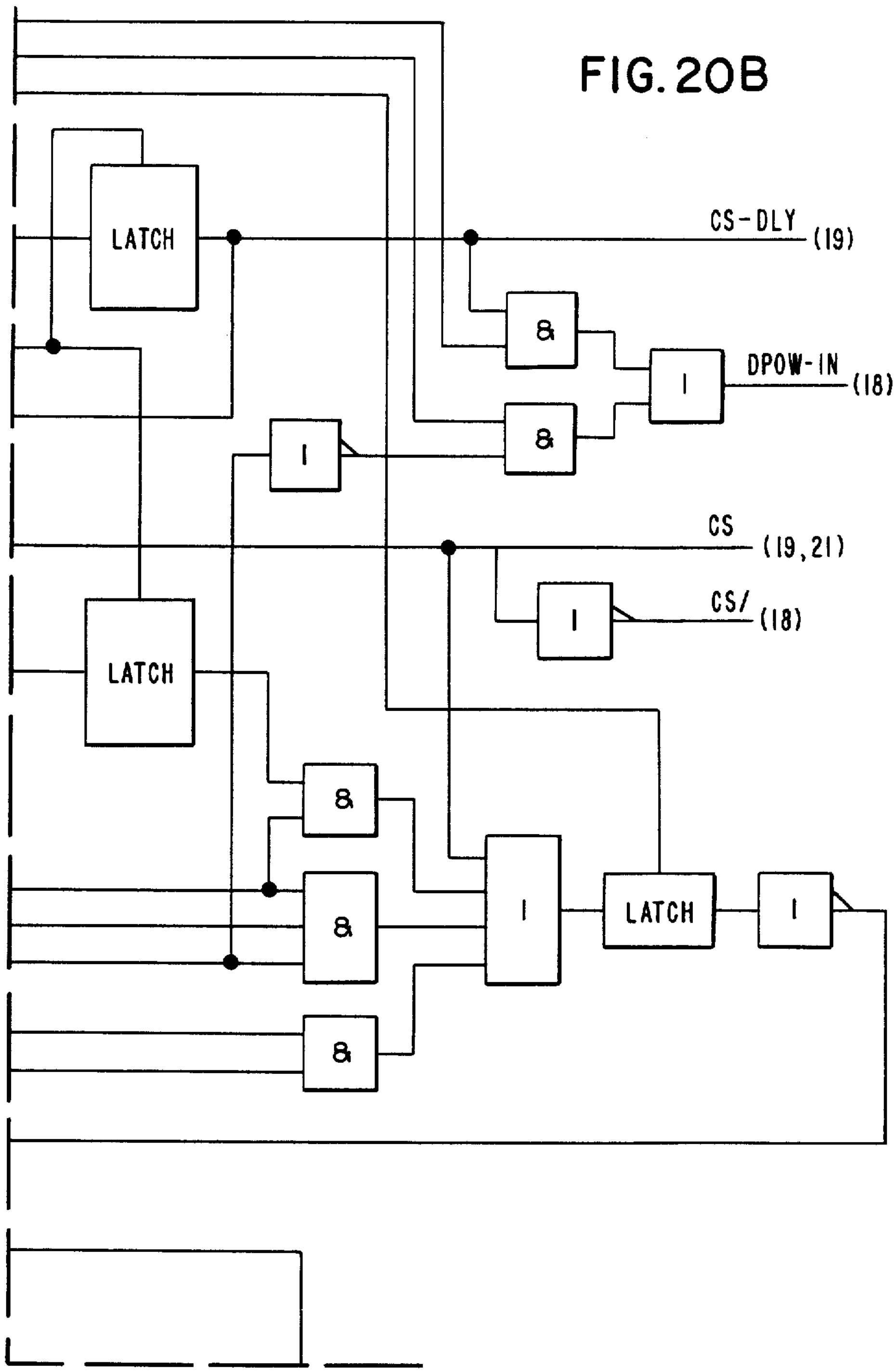
Figure 20C:
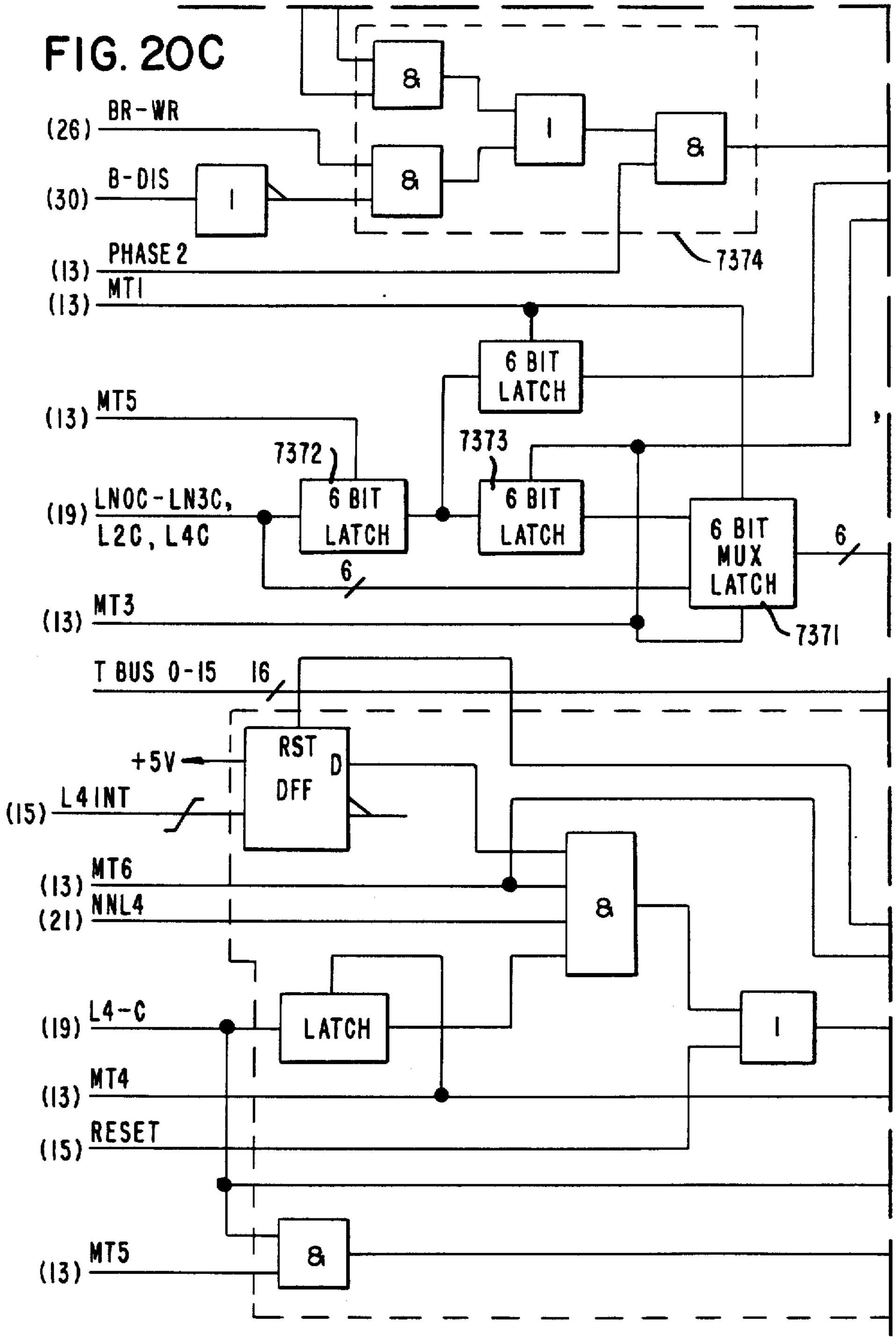
Figures 20, 20D:
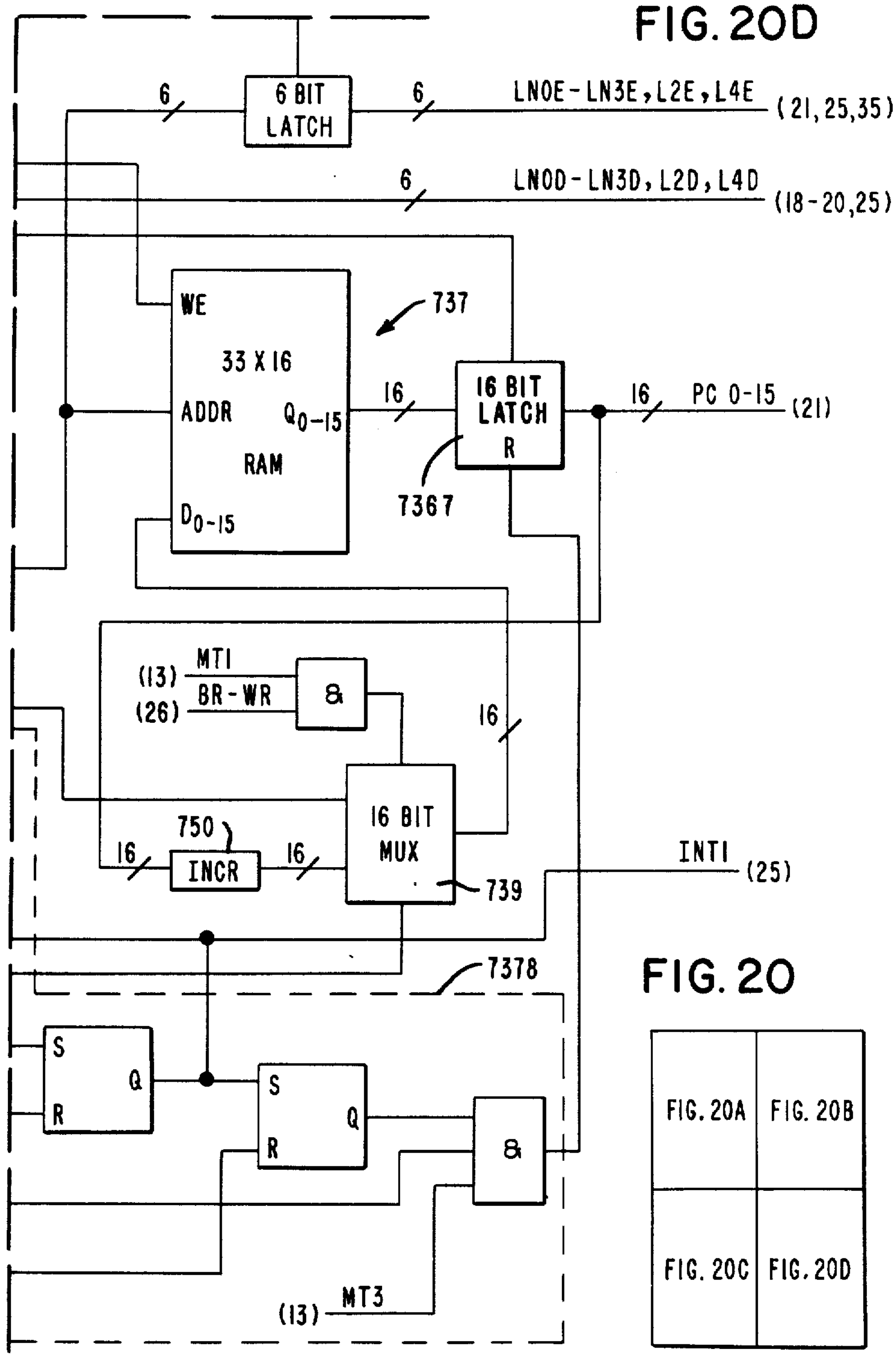

Referring now to FIGS. 20A–20D assembled in accordance with the map of FIG. 20 wherein is shown the program counter RAM 737 and associated logic circuitry. A 16-bit multiplexer 739, 16-bit incrementer 750, and 33×16 RAM 737 form the thirty-three counters previously referred to in the specification. Referring now specifically to FIG. 20C, the signals present at the output of a 6-bit multiplexing latch 7371 are latched and selected under the control of clocking signals MT1 and MT3. The signals are LN0C–LN3C, L2C and L4C which are either directly outputted or are delayed by latching through two 6-bit latches 7372 and 7373.

The WE enabling signal for the RAM 737 is derived by the logic gate group 7374 which logically combines the PHASE 2 signal and the BR-WR signal with the signal B-DIS. The RAM 737 receives at its ADDR input the 6 latched bits from latch 7371 and outputs at the terminals Q0–15, 16-bits of addressed data. The 16-bits, which correspond to the instruction address, are latched by a 16-bit latch 7376 to the line labeled PC0–15 under control of a reset signal from a logic circuit 7378. The outputted 16-bits are also directed to the input of the 16-bit incrementer INCR 750 which up counts, by one, the count represented by the 16-bits and provides this incremented count to one input of the 16-bit multiplexing latch 739. The other input to the multiplexing latch 739 is comprised of the bits present on the T-bus 0–15.

Under control of the ANDed clocking signal MT1 and the signal BR-WR, or alternately, MT6, the multiplexing latch 739 selects one of the two sets of sixteen signals on its inputs to provide those signals as the data inputs to the RAM 737.

The remaining logic circuitry of FIGS. 20A and 20B, denoted generally as 7377, provides a means for discontinuing the normal incrementing of the instruction RAM and for providing the signals, cycle steal delay CS-DLY, DPOW-IN and the signals CS and CS/. Shown at the bottom of the drawing is logic circuitry 7378 which provides the signal INT1 and a latching signal for the 16-bit latch 7367. These two signals are provided by the logical combination of the labeled signals on the input of the circuit.

PN Register 753, and PN+1 755

Figure 21:
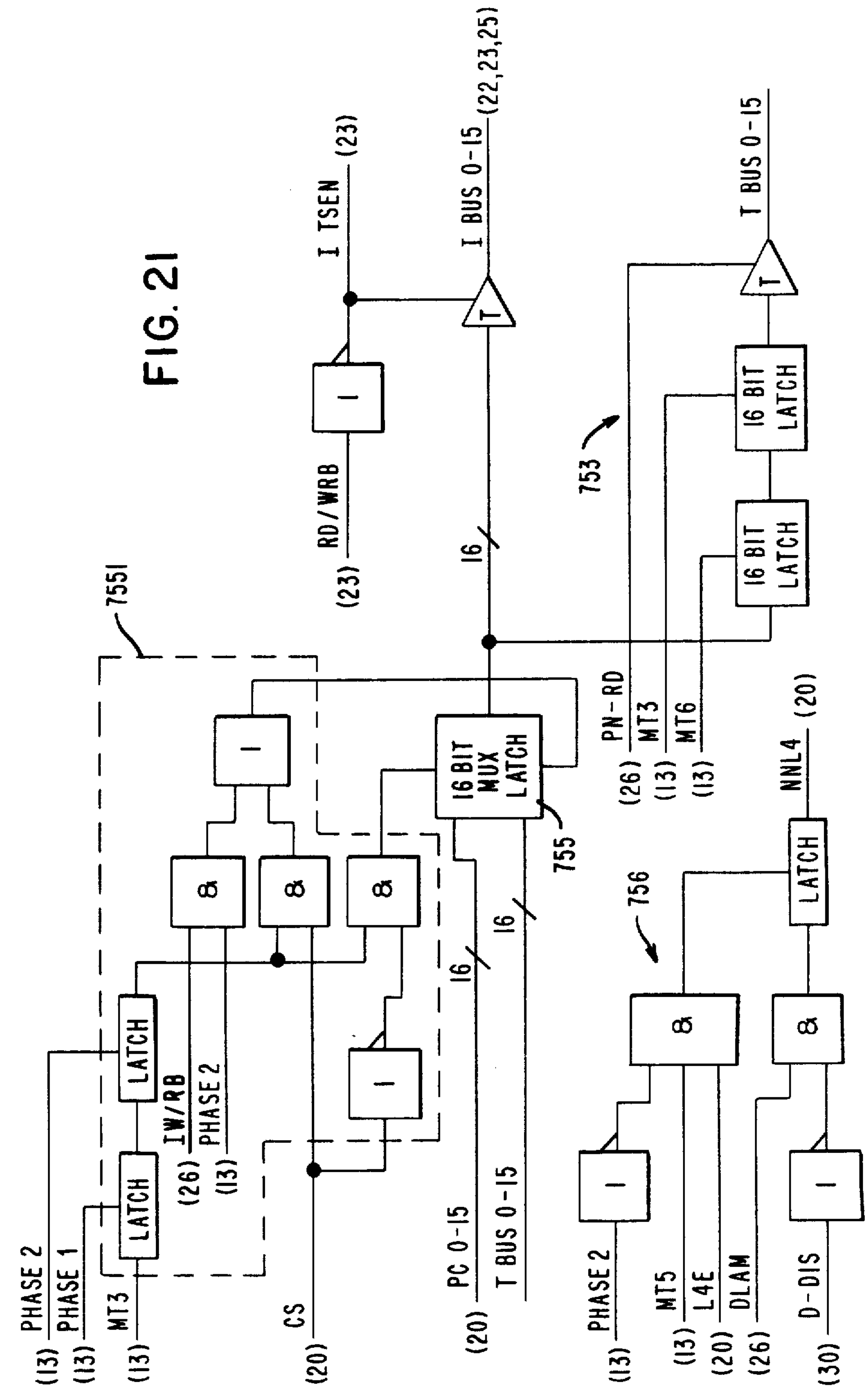
FIG. 21 illustrates, in schematic form, the PN+1, MUX and PN register used in the CBuC of FIGS. 12A-12C.

Referring to FIG. 21, a 16-bit multiplexing latch 755 receives on one bank to its 16-bit inputs the PC bits 0–15 and on its other bank of 16-bit inputs the T-bus bits 0–15. Under control of the logic circuitry 7551 the multiplexing latch 755 latches either PC 0–15 or T-bus 0–15. The PN+1 register is connected to the I-bus bits 0–15, by means of the tri-state devices. The tri-state devices are activated by the signal ITSEN. In a like manner, the 16-bits at the output of the multiplexer are directed to the PN+1 delaying circuit 753 which circuit is comprised of two 16-bit latches serially connected and clocked with the clocking signals MT3 and MT6. A tri-state amplifier outputs the 16-bits onto the T-bus under control of the signal PN-RD.

Latch 756, for deriving the signal NNL4, is shown in the lower left corner of FIG. 21 as a miscellaneous circuit. The signal NNL4 designates the next instruction fetch cycle which is allocated to the level 4 program.

Break-PT Register 757

Figure 22:
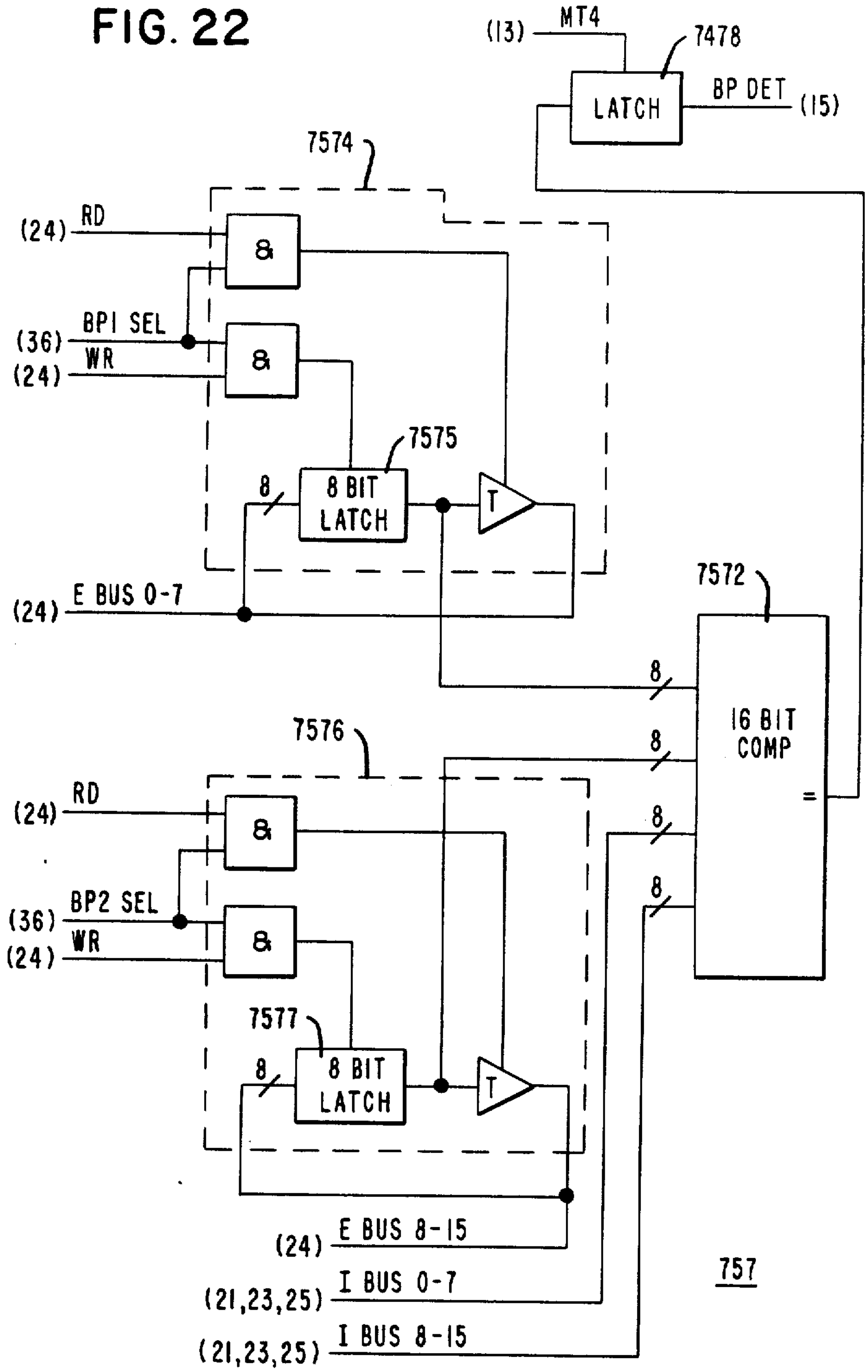
FIG. 22 illustrates, in schematic form, the break-pt register used in the CBuC of FIGS. 12A-12C.

Referring now to FIG. 22 wherein is shown the last portion of the logic circuitry for the PC control 70. The break-pt register 757 is comprised of a 16-bit comparator 7572 which comparator compares 8-bits from the E-bus bits, 8–15 from logic circuitry 7574 and the 8-bits from the E-bus, bits 8–15 from logic circuitry 7576 against the corresponding bits on the I-bus 0–7 and the I-bus 8–15. The latches 7575 and 7577 contain logic which allow them to be accessed by a software program via execution of the appropriate load and store instructions to data memory addresses 84FD and 84FE, respectively. Upon receiving a 1-to-1 bit comparison, the 16-bit comparator outputs a signal to a latch 7478 which latch upon being enabled by the clocking signal MT4 outputs the bit BP DET.

Instruction Bus Buffers 712

Figure 23A:
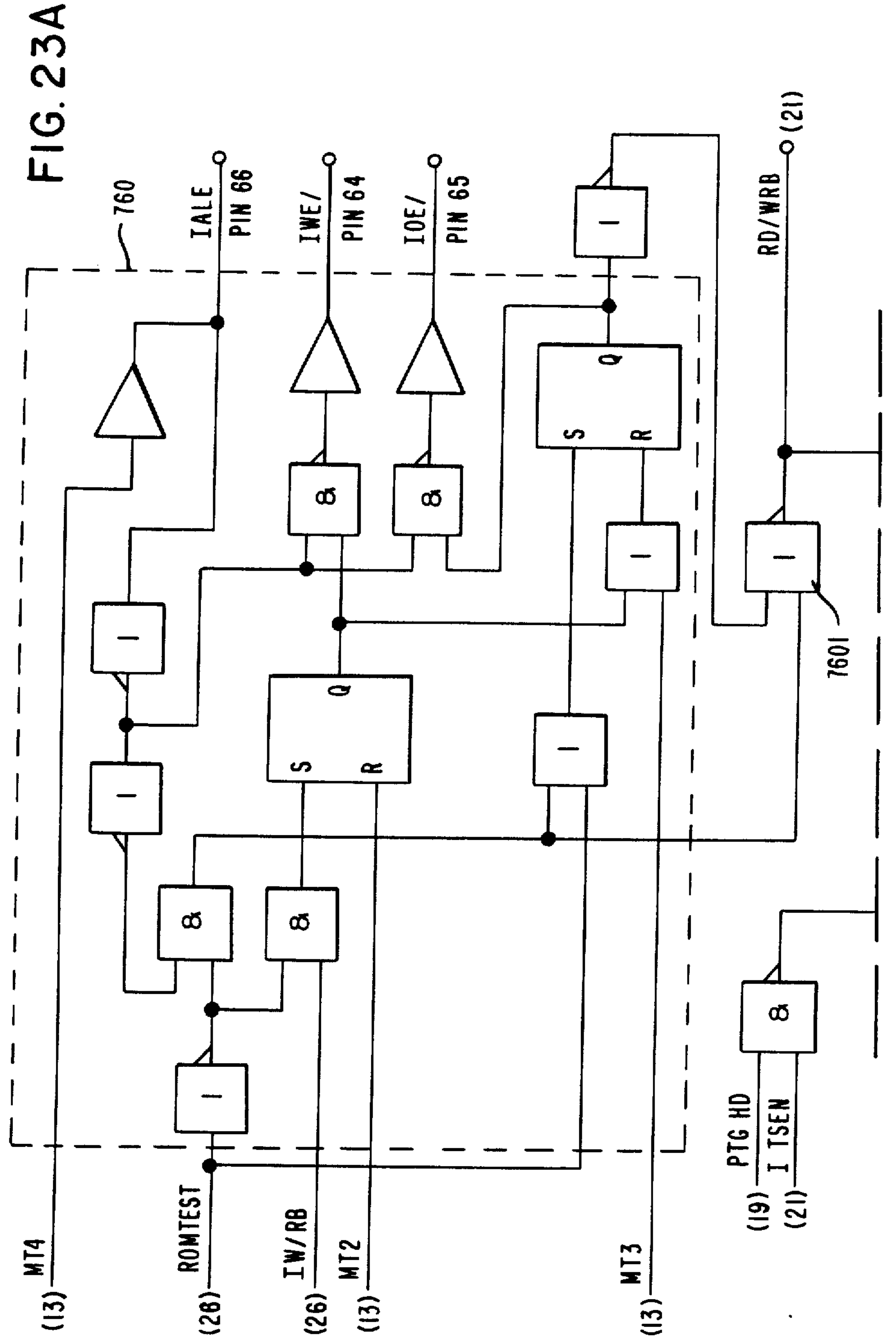
FIGS. 23A and 23B illustrate, in schematic form, the instruction bus buffers used in the CBuC of FIGS. 12A-12C.
Figure 23B:
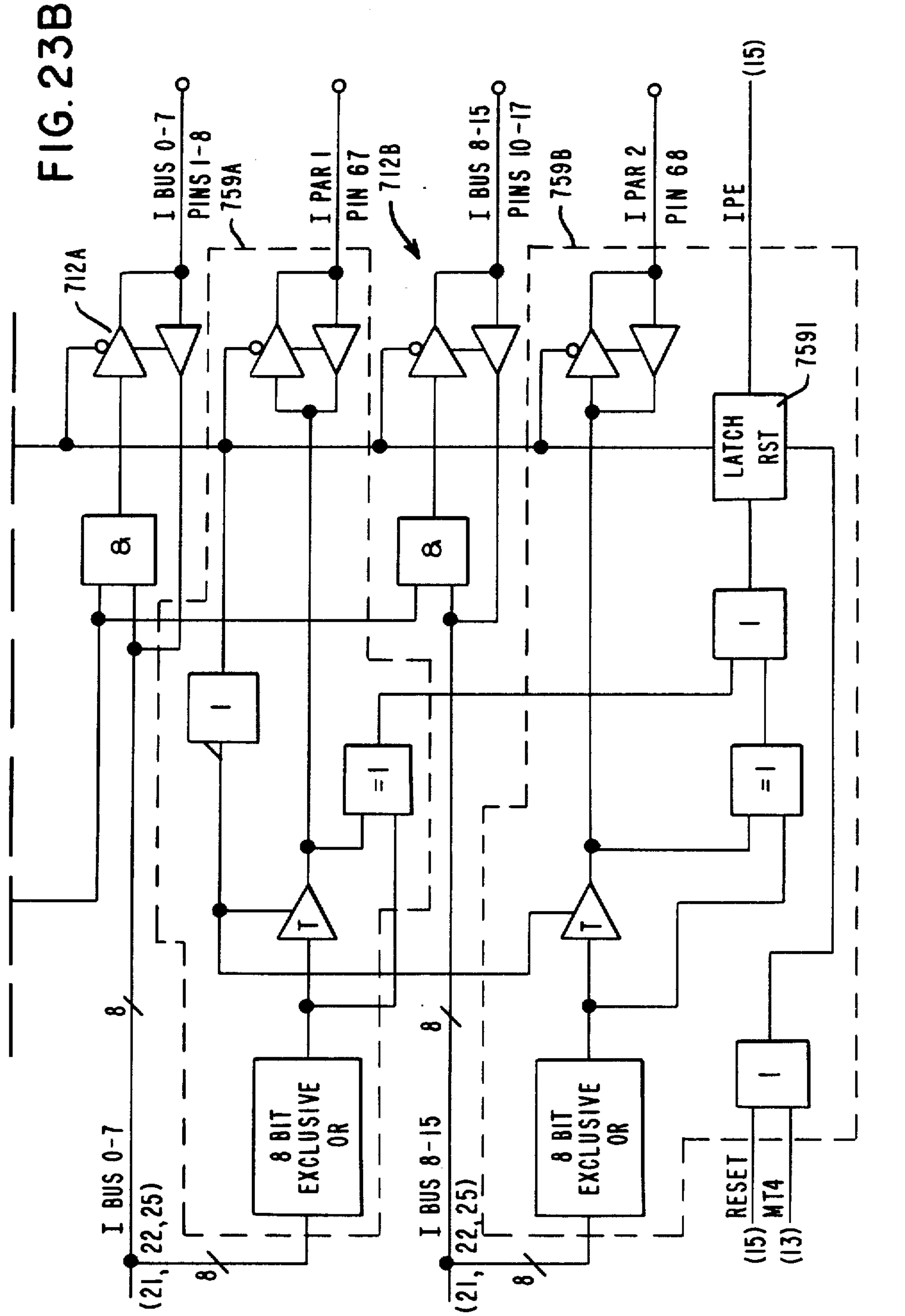

Referring to FIGS. 23A and 23B, the instruction bus buffers 712 contain a first group of bi-directional tri-state amplifiers 712A and 712B. The direction of transmission for the tri-state amplifiers is controlled by the enabling signal RD/WRB. The parity signals IPAR1, IPAR2, and IPE circuits 759A and B are formulated by the logic shown comprised of an 8-bit exclusive OR gate along with associated logic. Additionally, within the logic circuitry of 759B, there is provided a latch 7591 for latching to its output the signal denoted IPE. IPE sets upon detection of an instruction parity error on a read operation of instruction memory.

The instruction control logic 760 shown in FIG. 23A is comprised of a plurality of logic gates interconnected as shown for operating upon the input signals MT4, ROMTEST, IWR, MT2 and MT3 to provide at its outputs the signals IALE, IWE/ and IOE/ along with an input and an enabling logic signal to the NOR gate 7601 to generate the signal RD/WRB. For instruction bus time relationships refer to the timing diagram of FIG. 48A.

Data Bus Buffers 714, Parity 761 and Data Memory Controls 762

Figure 24A:
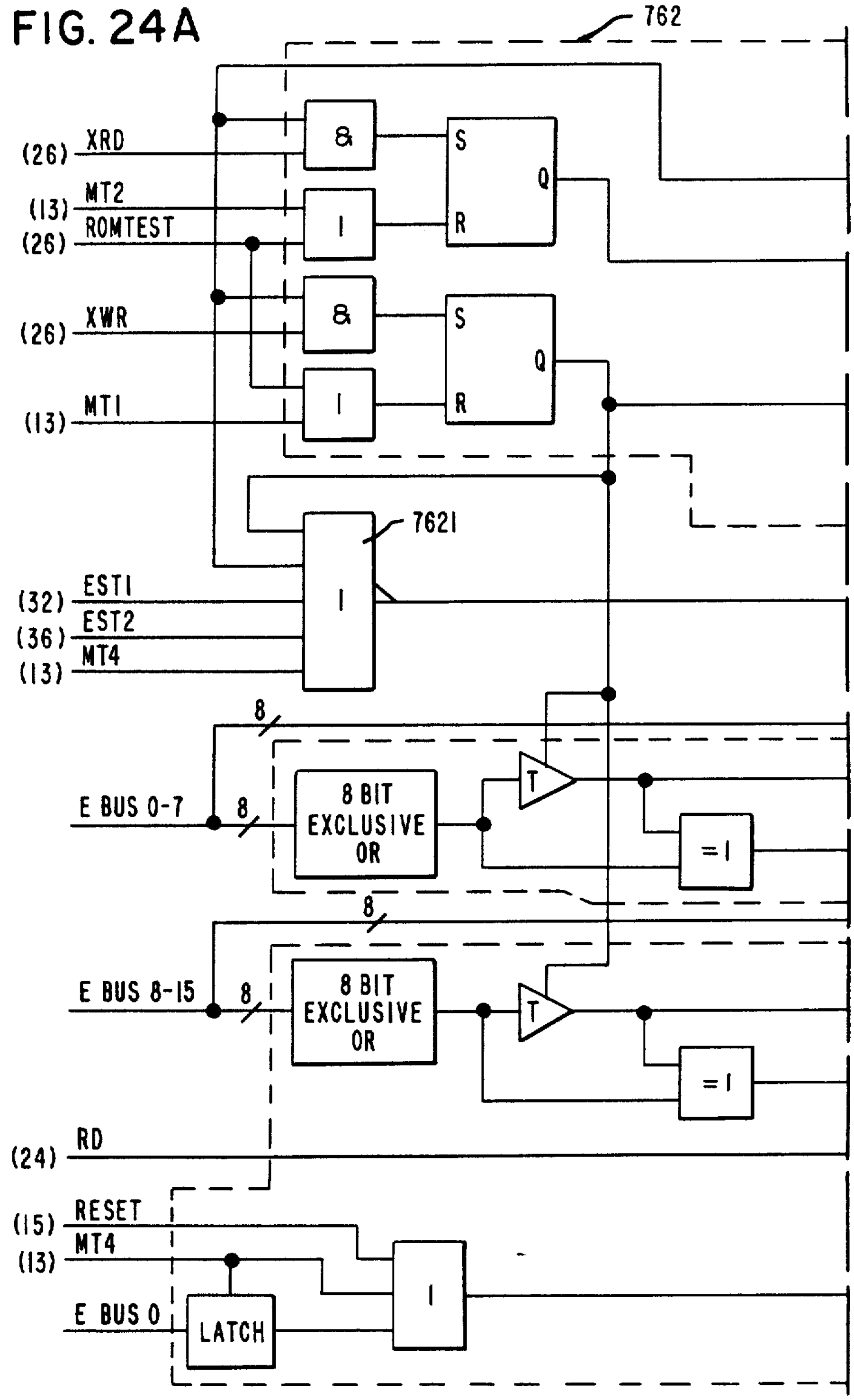
FIGS. 24A and 24B illustrate, in schematic form, the data bus buffers used in the CBuC of FIGS. 12A-12C.
Figure 24B:
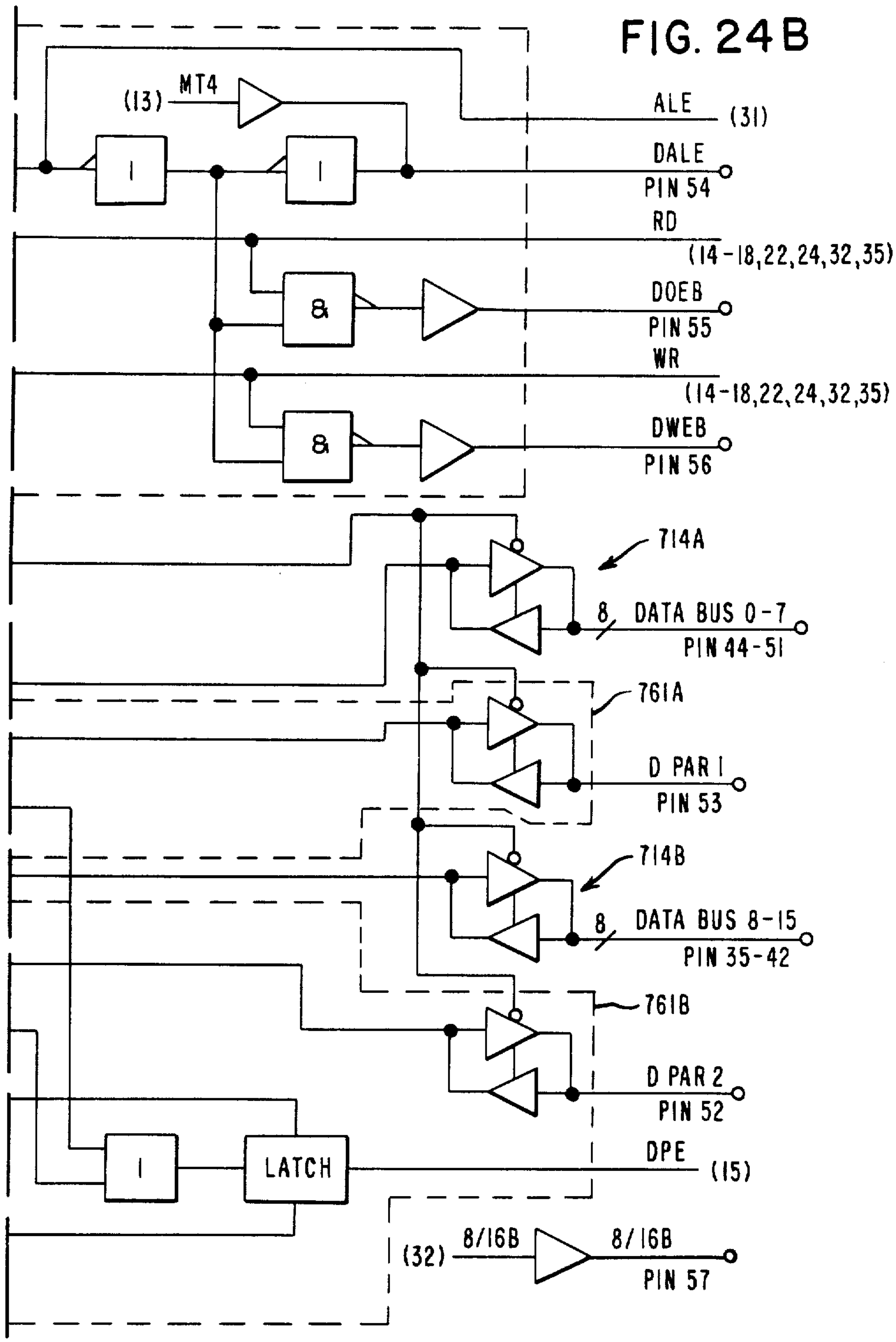

Referring now to FIGS. 24A and 24B wherein the data bus buffers 714, parity circuit 761 and the data memory controls logic circuitry 762 are illustrated. The data bus buffers 714 are bi-directional tri-state amplifiers 714A and 714B and are shown interconnecting the E-bus conductors 0–15, respectively, to the data bus outputs 0–15 under directional control of an enabling signal from a NOR gate 7621. The parity 761 logic is shown comprised of logic circuitry 761A and logic circuitry 761B, each comprised generally of an 8-bit exclusive OR gate, for receiving the E-bus and Data bus bits and for logically combining the same to formulate the parity signals.

The data memory control circuit 762 is comprised of a plurality of logic gates interconnected as shown to provide the output signals ALE, DALE, RD, DOEB, WR and DWEB. For data bus timing relationhips refer to the timing diagram in FIG. 48B.

State RAM 117

Figure 25B:
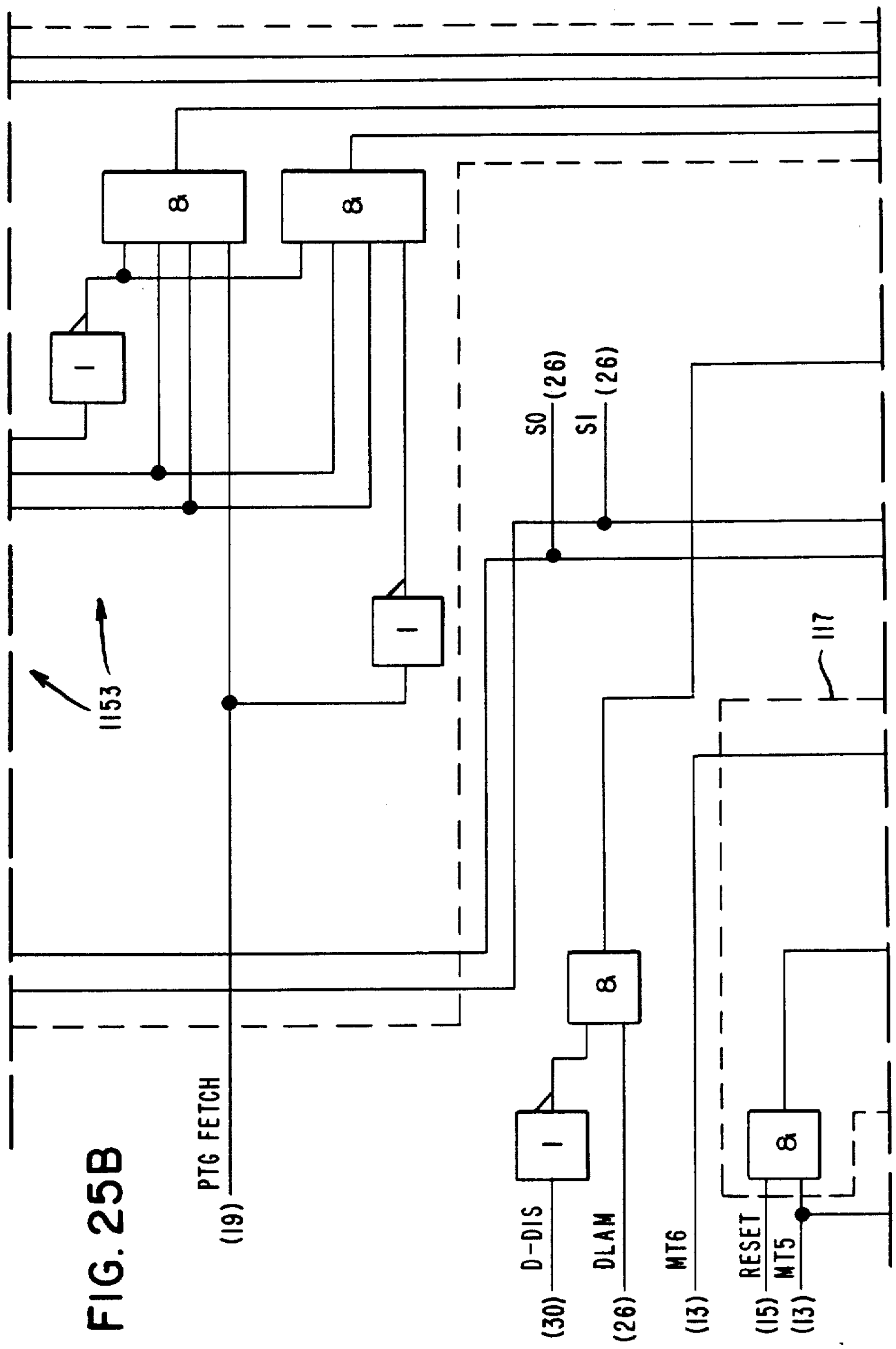
Figure 25C:
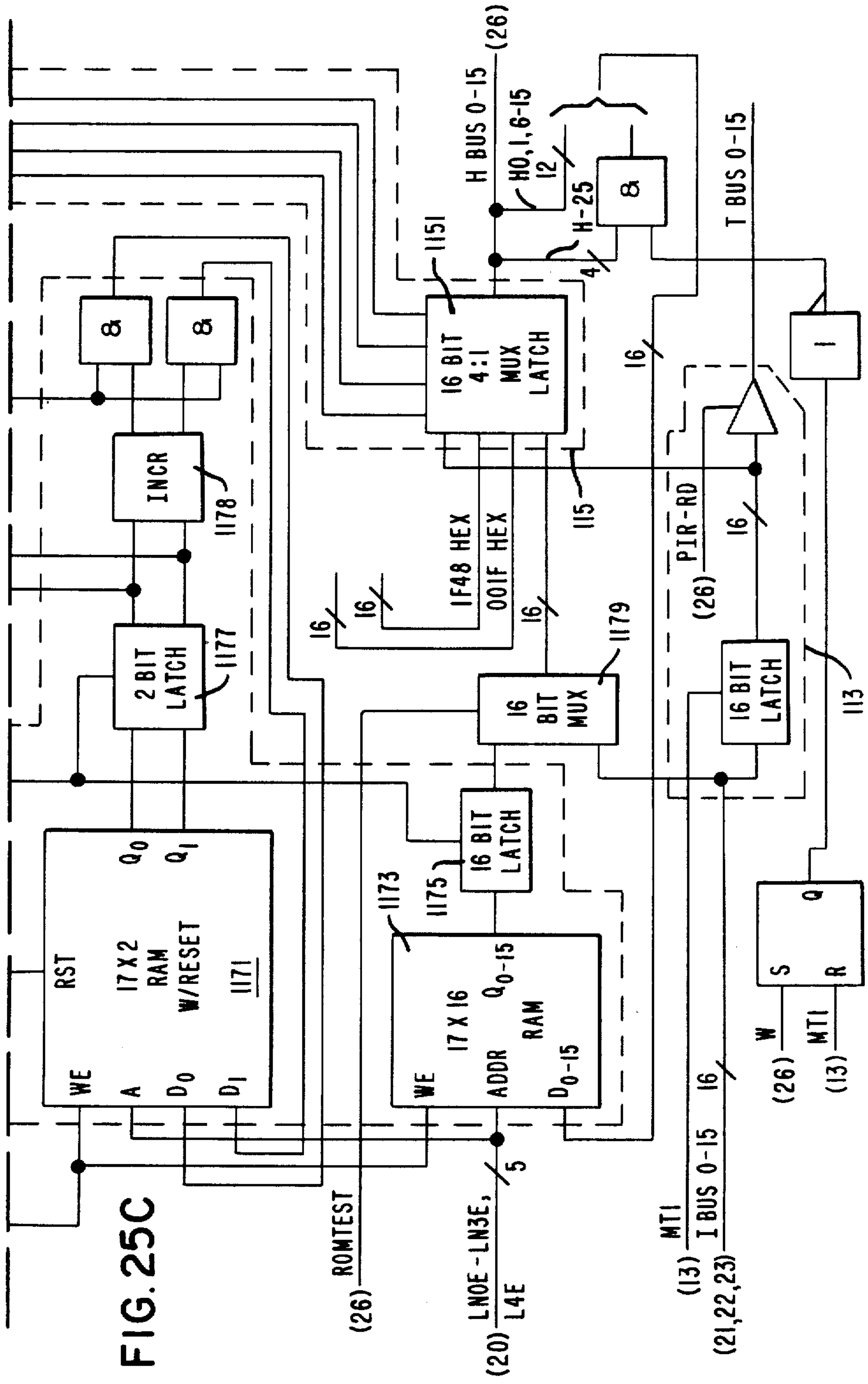

Referring to FIGS. 25A–25C assembled according to the map of FIG. 25 wherein is shown the state RAM 117, a pre-instruction register 113 and a multiplexing circuit 115. The multiplexing circuit 115 consists of logic circuitry, shown in FIGS. 25A and 25B, for providing four control inputs and, latching circuitry 113, for providing one of four selection inputs, to a 16-bit 4:1 multiplexing latch 1151. The output of the multiplexing latch 1151 is directed to the H-bus as bits 0–15. The state RAM 117 is comprised of a 17×2 RAM 1171 and a 17×16 RAM 1173, the output of which is coupled to a 16-bit latch 1175. Under latch control of the clocking signal MT6, the 16-bit latch 1175 outputs 16-bits to one input of a 16-bit multiplexer 1179. The multiplexer functions as a test selector. Upon receipt of a ROM TEST enabling signal, the multiplexer 1179 connects the I-bus 0–15 bits to its output and to one input of the multiplexing latch 1151.

A 2-bit latch 1171 receives the outputs from the Q0 and Q1 outputs of the RAM 1177 and directs those 2-bits to the inputs of an incrementer 1178. The incrementer increases the count of the bits on its input by one and outputs the count to one input of a pair of AND gates. The other input to the AND gates is the enabling signals D-DIS and DLAM. The outputs from the two AND gates are directed back to the D0 and D1 data inputs of the RAM 1171.

The RAM 1173 receives data on its data input D0-D15 from the H-bus conductors 0–15 with four of the bits being directed to an AND gate which is enabled by the signals W and MT1 latched with a flip-flop at its S and R inputs, respectively. The 16-bit latch 1175 and the 2-bit latch 1177 are each toggled to the enabling state by the clocking signal MT6.

The state RAM 117 retains the instruction opcode and status of instructions requiring more than one execution cycle for completion.

The 16-bit output of the pre-instruction latch 113 is selected by the 4:1 multiplexing latch if an instruction is to be executed. If an instruction requiring more than one execution cycle is executed, the state RAM is keeping an incrementing count corresponding to the particular instruction cycle to be executed. With the signal PIR-RD enabling the tri-state amplifier portion of the pre-instruction register 113, the 16-bit latch output is applied to the T-bus conductors 0–15. The multiplexing latch 115 has two constant values applied to its inputs, 1F48 and 001F, which are generated by strapping the appropriate input bits to either the +5 V supply or to circuit ground. The multiplexing latch input labeled, 1F48 HEX, is selected when no operation is desired as the result of a reset condition.

The multiplexing latch input labeled 001F HEX is selected when the instruction execution unit is to execute the PTG FETCH instruction. The PTG FETCH instruction is a single cycle indirect branch which is hand-wired into the instruction execution unit to effect the vector dispatch mechanism.

Instruction Decode 130

Figure 26A:
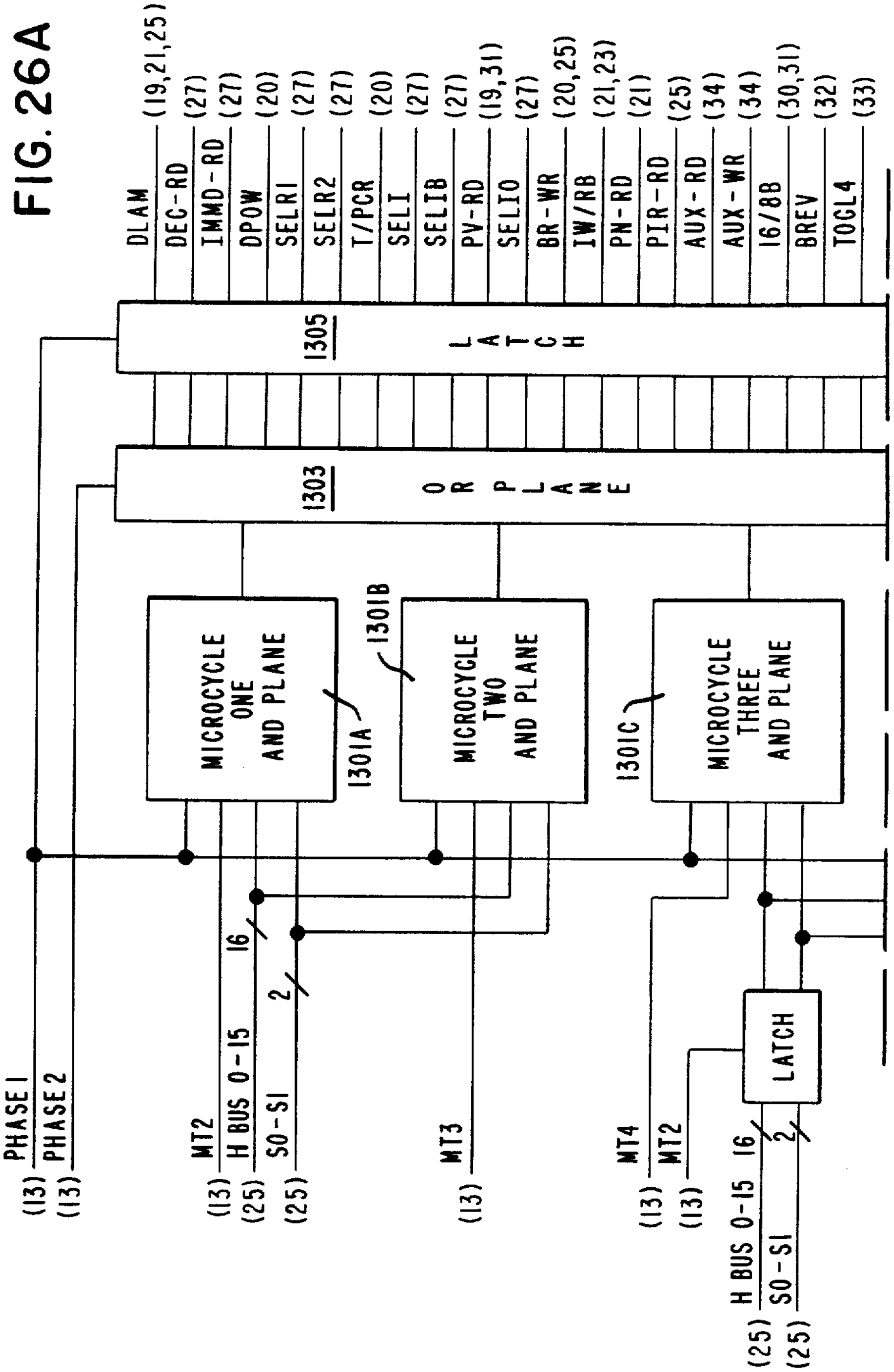
FIGS. 26A-26E, assembled in accordance with the map of FIG. 26, illustrate, in schematic form, the instruction decode and test used in the CBuC of FIGS. 12A-12C.
Figure 26B:
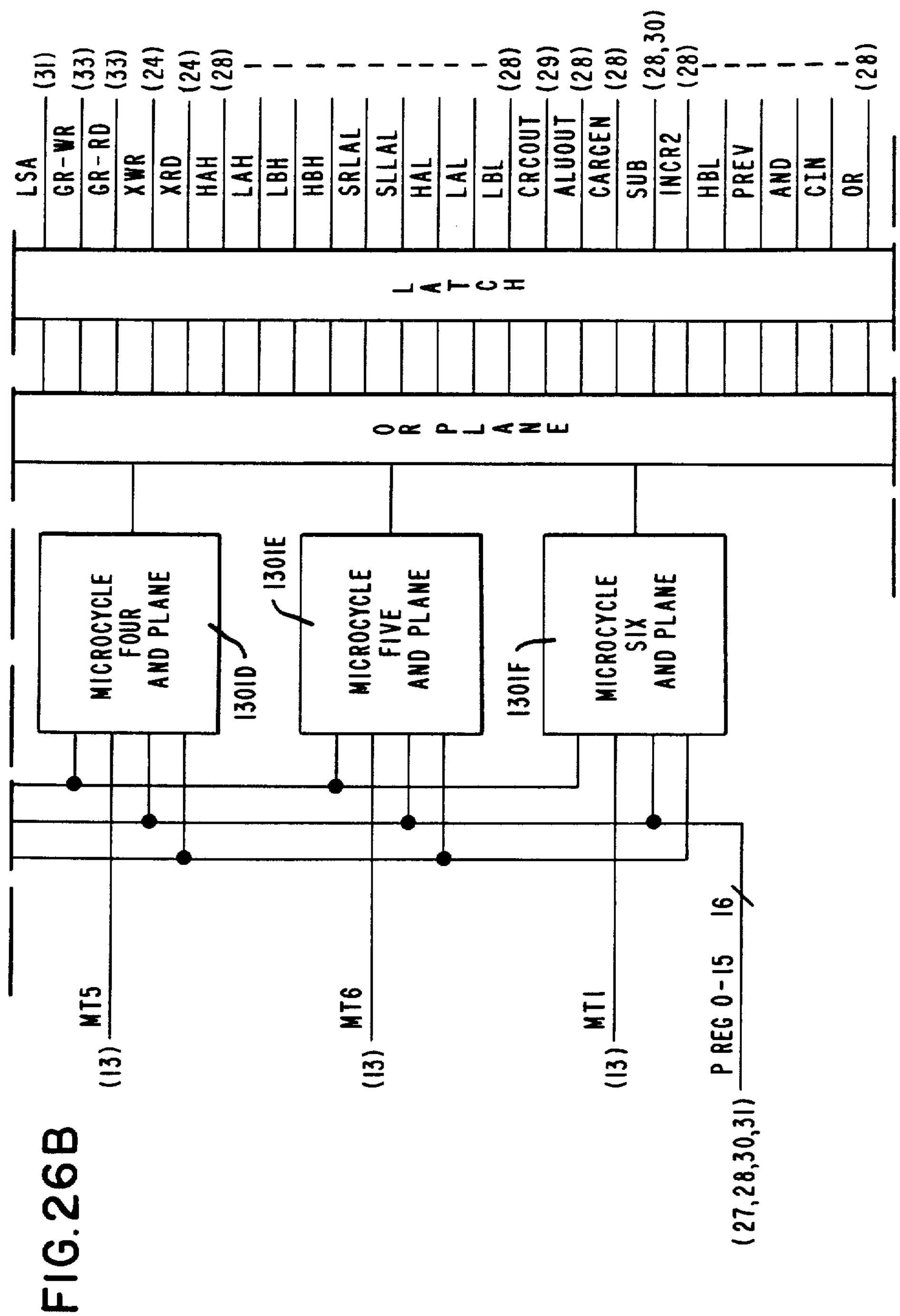
Figure 26C:
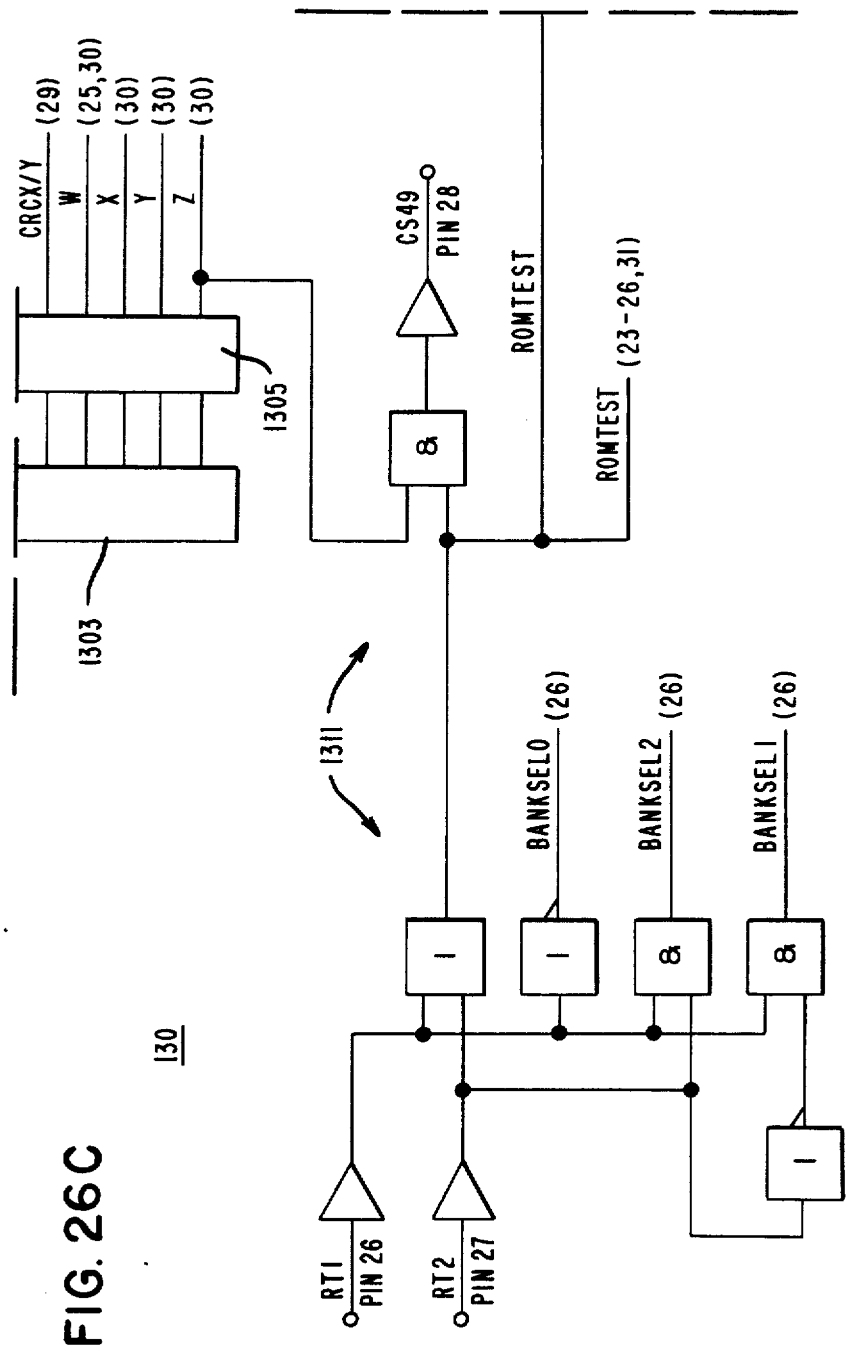
Figure 26D:
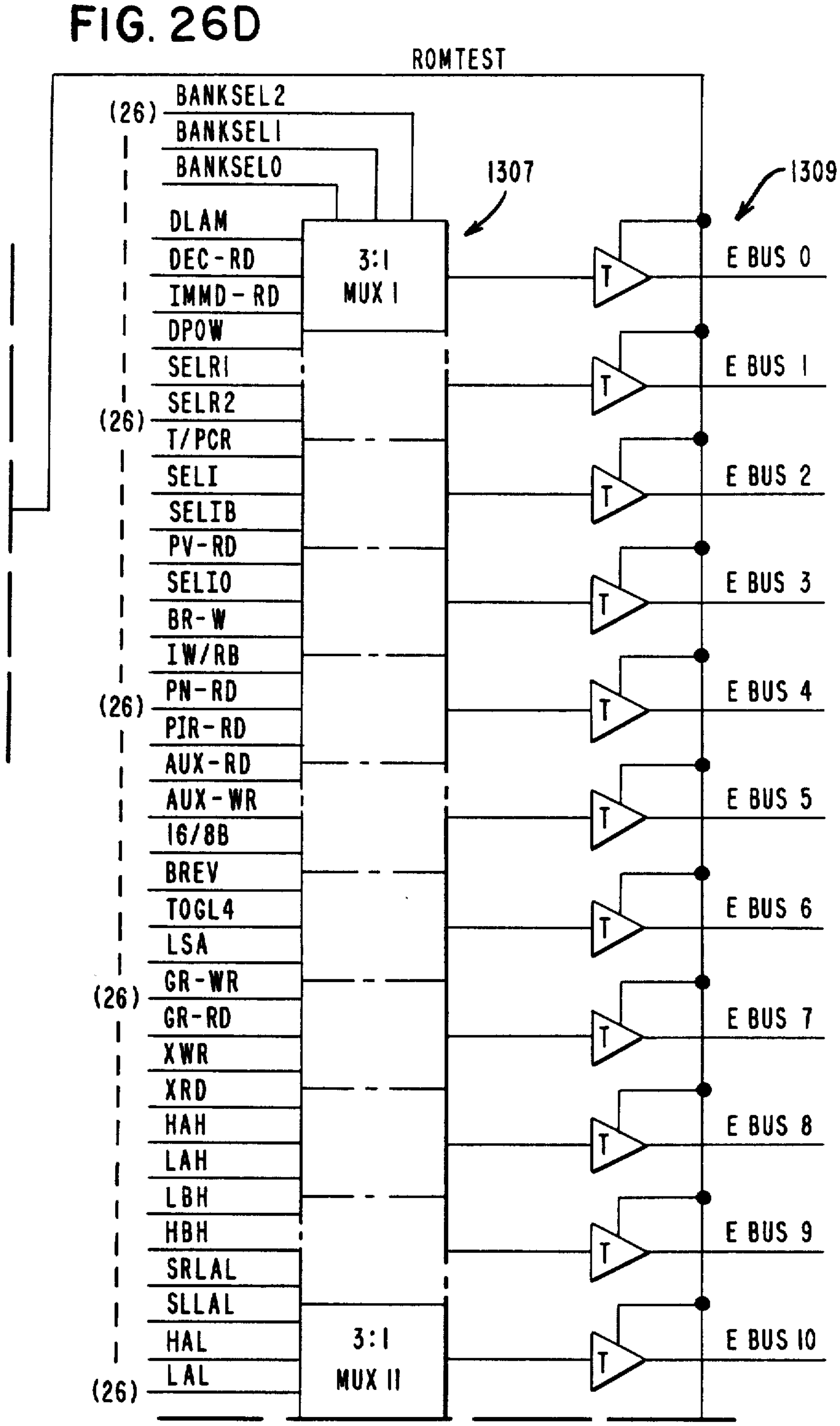
Figure 26E:
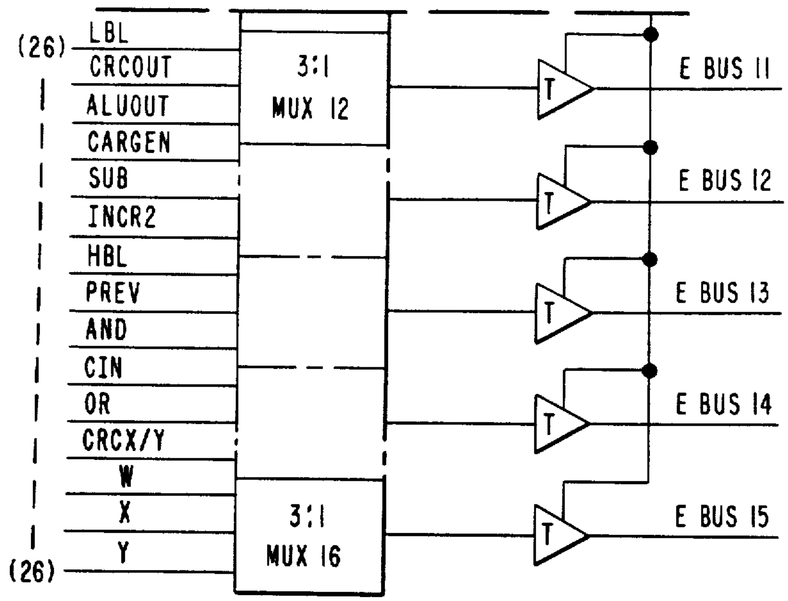
Figure 26:
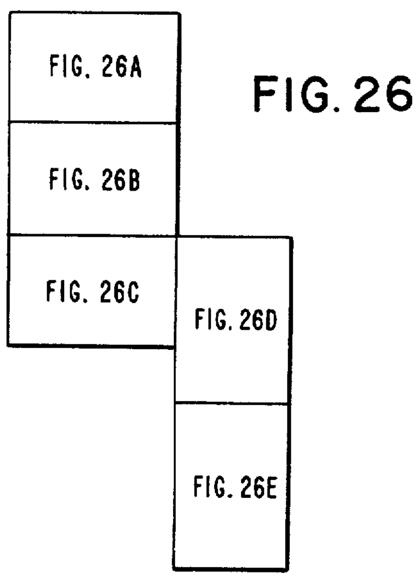

Referring to FIGS. 26A–26E assembled in accordance with the map of FIG. 26, the instruction decode logic 130 is comprised of six, microcycle AND plane devices 1301A–1301F, receiving as inputs 16-bits from the H-bus along with clocking enabling signals MT1–MT6. The output from each of the microcycle AND planes is directed to an OR plane logic device 1303. The output from the OR plane logic is directed to a latch group 1305 which latch upon receiving the signal PHASE 1 latches the signals on its input to its output.

A bank of 3:1 multiplexers 1307 receive on their inputs three of the labeled signals and upon receiving one of the group of bank select signals BANK SEL 0–2 selects one of the input signals to provide at its output. A group of tri-state devices 1309 upon receiving the signal ROM TEST connects the multiplexer outputs to the like labeled E-bus conductors 0–15. The ROM TEST signal and the BANK SEL signals are generated by a logic circuit 1311. The logic circuit 1311 receives, on its inputs, the signal RT1 and RT2.

Appendix B lists the mnemonics and opcodes for each of the instructions supported by the instruction execution unit. The instruction decode logic generates the appropriate sequence of control signals at the outputs of latch 1305 required to execute the function selected by the instruction opcode as defined in Appendix C. Appendix D contains the logic expression and coding for the instruction decode PLA comprised of AND PLANES 1301A–1301F and OR PLANE 1303.

Field Extract 135

Figure 27:
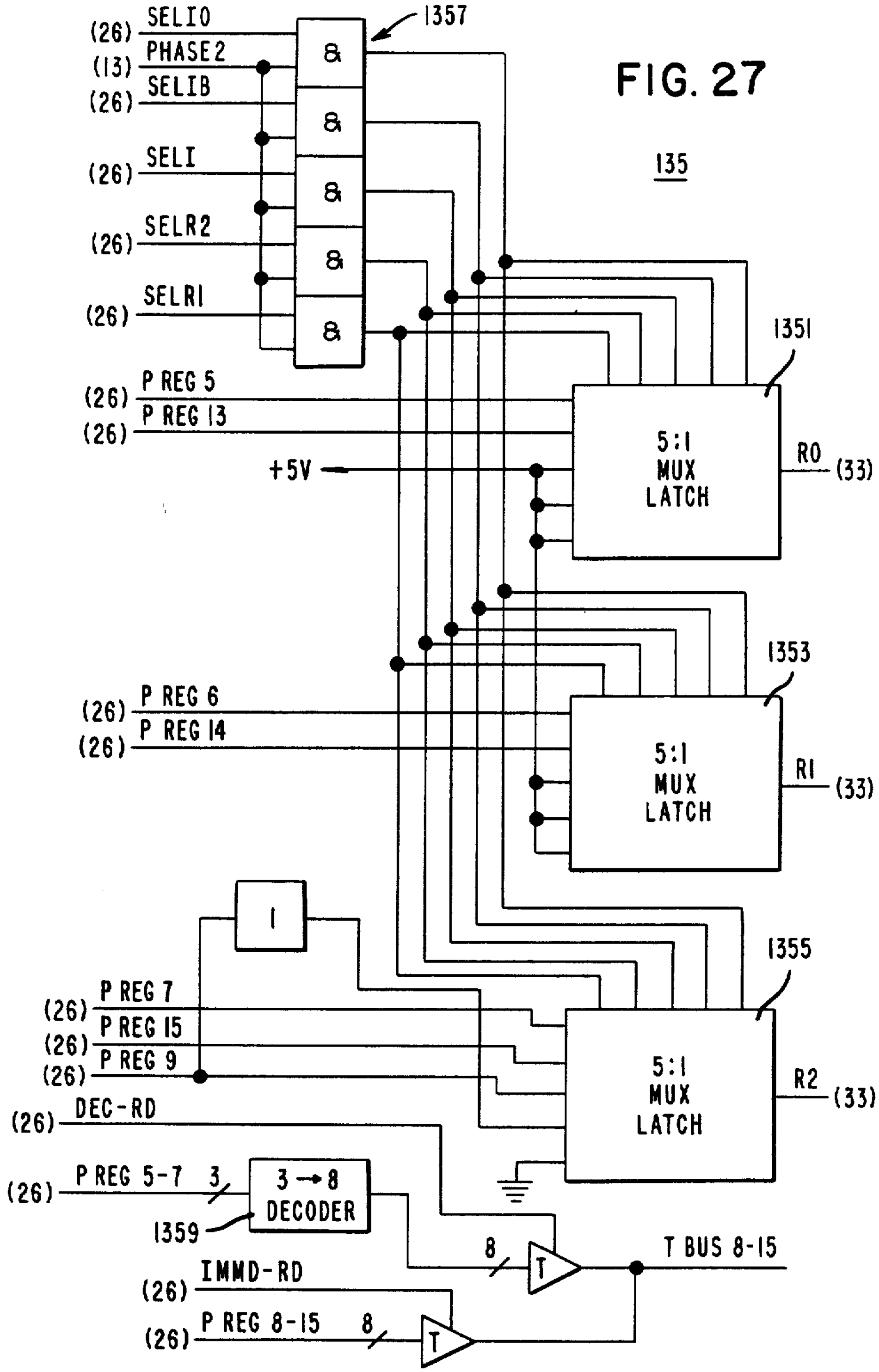
FIG. 27 illustrates, in schematic form, the field extract used in the CBuC of FIGS. 12A-12C.

Referring to FIG. 27 wherein is shown the logic block diagram for the field extract 135. The circuit is comprised of three 5:1 multiplexing latches 1351, 1353 and 1355 along with a bank of AND gates 1357; and a 3 to 8 decoder 1359 and associated tri-state amplifiers. The 5:1 latches each receive on their control inputs one of the outputs from the bank of AND gates 1357 and under their control select one of a group of P REG signals to provide at their outputs the signals designated $R_0$, $R_1$, and $R_2$, respectively. The 3 to 8 decoder 1359 receives on its input the P REG 5–7 bits and decodes those bits to 8-bits and directs them to the T-bus 8–15 under control of the enabling signal DEC-RD applied to one of the tri-state devices. Additionally, a second tri-state device, under the control of the enabling signal IMMD-RD, places the P REG 8–15 bits onto the T-bus 8–15.

Shift 136 and ALU 137

Figure 28A:
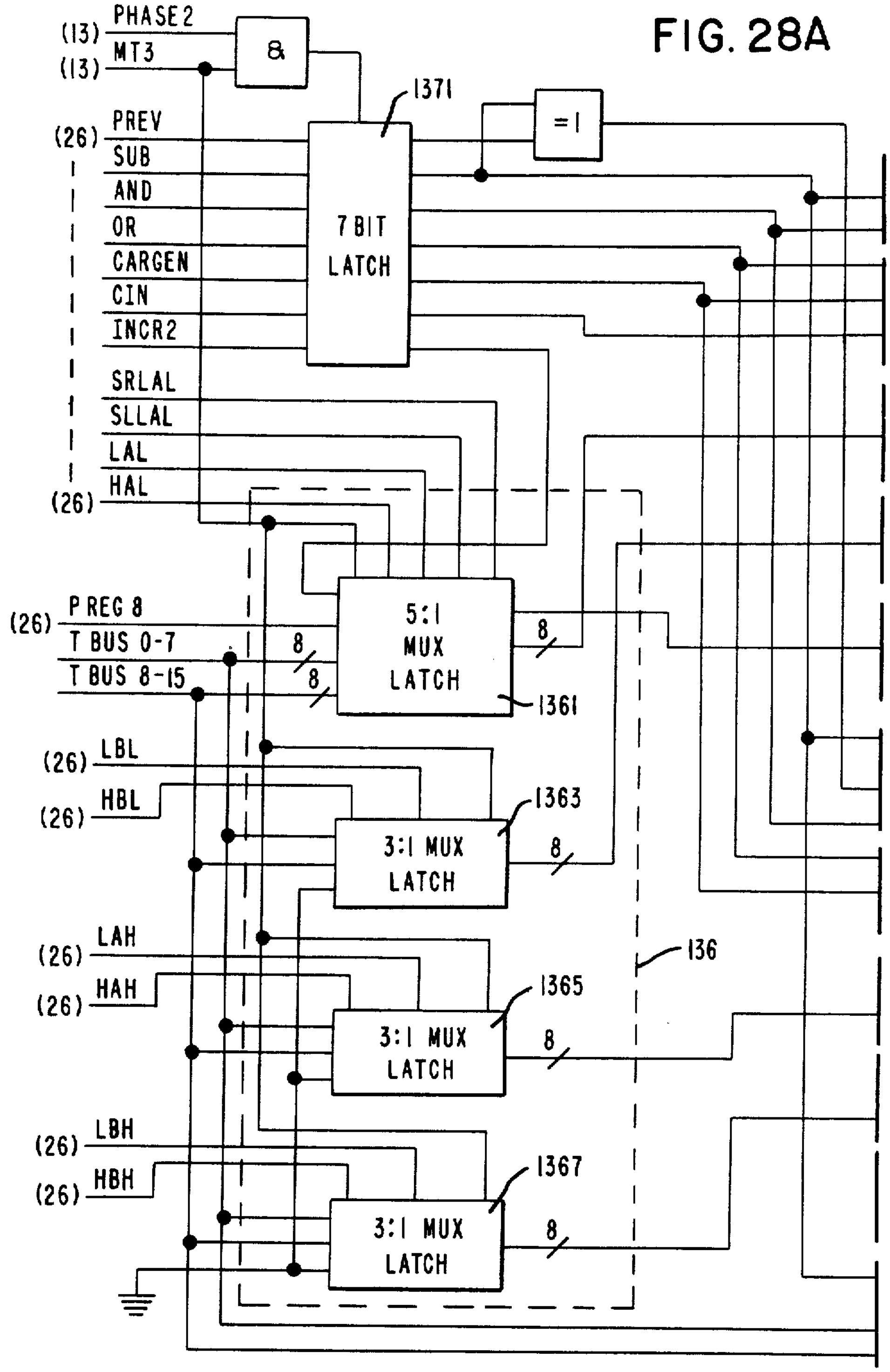
FIGS. 28A and 28B illustrate, in schematic form, the ALU and shift used in the CBuC of FIGS. 12A-12C.
Figure 28B:
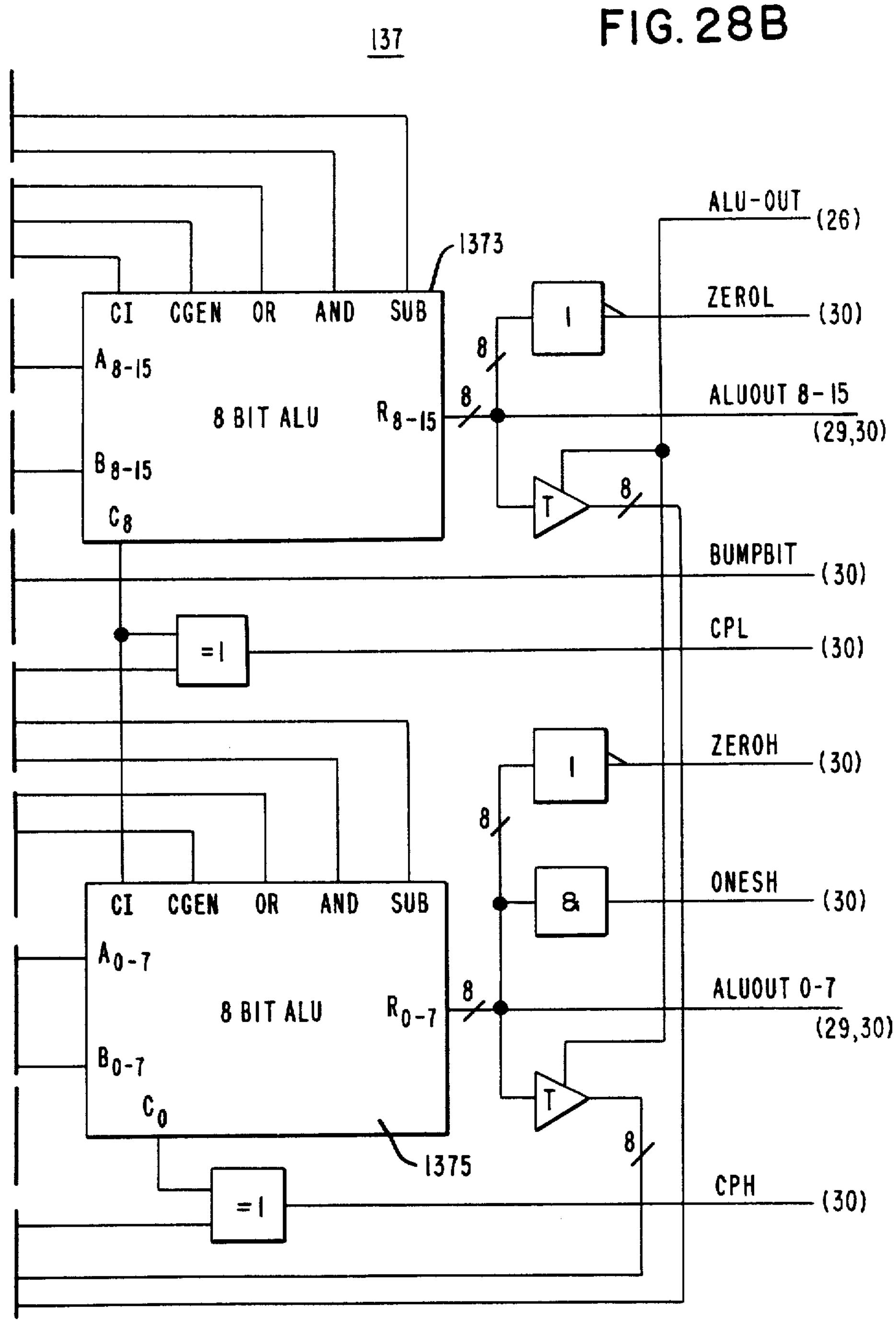

Referring to FIGS. 28A and 28B wherein is disclosed the logic for the shift circuit 136 and the arithmetic logic units (ALU) 137. The ALU 137 is comprised of a 7-bit latch 1371 and an 8-bit ALU 1373 and a like ALU unit 1375. The outputs from the ALU 1375 are available on the terminals labeled R0–7 and are directed to: a NOR gate to provide the output signal ZEROH; to an AND gate to provide the signal ONESH; and to the inputs of a tri-state amplifier to provide, under enabling control of the signal ALU-OUT, the eight output bits to the inputs of the shift circuit 136. In a like manner, the bits 8–15 are available on terminal R8–15 of the ALU 1373, directed through a NOR gate to provide the output labeled ZEROL, and directed through a tri-state device when enabled by the signal ALU-OUT.

The 7-bit latch 1371 is coupled to the control inputs CI, CGEN, OR, AND and SUB of the ALUs. The signals on the inputs to the 7-bit latch are latched into the device upon the concurrence of the signals PHASE 2 and MT3. Following is a truth table defining the ALU as a function of inputs CGEN, OR, AND, and SUB.

| CGEN | OR | AND | SUB | ALU FUNCTION |
|---|---|---|---|---|
| 0 | 1 | 0 | 0 | A logical OR B |
| 0 | 0 | 1 | 0 | A logical AND B |
| 0 | 0 | 1 | 1 | A/ logical AND B |
| 0 | 0 | 0 | 0 | A exclusive OR B |
| 1 | 0 | 0 | 0 | A plus B plus CI |
| 1 | 0 | 0 | 1 | A/ plus B plus CI |

All other combinations of the inputs CGEN, OR, AND, and SUB are not of interest.

The shift circuit 136 is comprised of one 5:1 multiplexing latch 1361 and three 3:1 multiplexing latches 1363, 1365 and 1367. The 16-bits from the T-bus are available on the inputs of each of the multiplexing latches. The 8-bit outputs from each of the latches are directed to the indicated A and B inputs to the ALU units.

The 5:1 multiplexing latch 1361 allows right shifting or left shifting, by one bit position, the A8–15 inputs of ALU 1373. The P register bit P8 fills the new bit position caused by the shift. The signal, BUMPBIT, is the bit position shifted out of the multiplexing latch 1361. The multiplexing latches 1361, 1363, 1365, and 1367 are reset by the latching of circuit ground to their respective outputs with each occurrence of the timing signal MT3. The INCR2 signal acts to set the output of multiplexing latch 1361 which is connected to the A14 input of ALU 1373.

CRC 138

Figure 29:
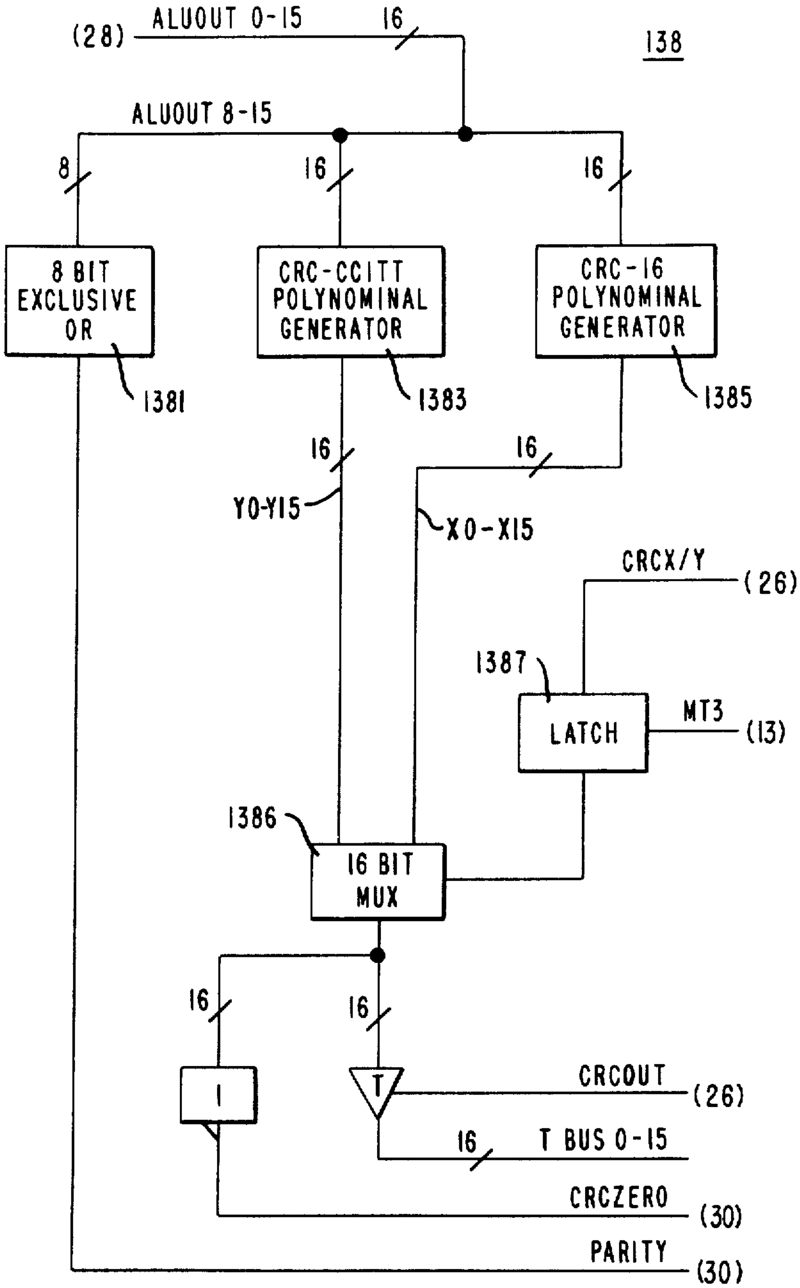
FIG. 29 illustrates, in schematic form, the CRC used in the CBuC of FIGS. 12A-12C.

Referring to the CRC circuit 138 of FIG. 29, the 16-bits of the ALUOUT signal are directed to an 8-bit Exclusive OR gate 1381, a CRC-CCITT polynomial generator 1383, and a CRC-16 polynomial generator 1385. The output of the 8-bit Exclusive OR is the signal PARITY. The output signals from the polynomial generators 1383 and 1385 are applied to the input of a 16-bit multiplexer 1386, which under control of a selection signal from a latch 1387, directs one or the other of its inputs to a NOR gate and to a tri-state device which under the control of the enabling signal CRG-OUT directs the 16-bits to the T-bus 0–15. The output of the NOR gate is the signal CRCZERO. The latch 1387 latches upon the occurrence of the clocking signal MT3 and latches the signal CRCX/Y to its output. The Boolean logic expressions for the polynomial generators 1383 and 1385 are as follows:

CRC-CCITT Polynominal Generator 138 Boolean Logic Expressions

Y0 = ALUOUT4 ⊕ ALUOUT0
Y1 = ALUOUT5 ⊕ ALUOUT1
Y2 = ALUOUT6 ⊕ ALUOUT2
Y3 = ALUOUT7 ⊕ ALUOUT3
Y4 = ALUOUT4
Y5 = ALUOUT0 ⊕ ALUOUT4 ⊕ ALUOUT5
Y6 = ALUOUT1 ⊕ ALUOUT5 ⊕ ALUOUT6
Y7 = ALUOUT2 ⊕ ALUOUT6 ⊕ ALUOUT7
Y8 = ALUOUT3 ⊕ ALUOUT7 ⊕ ALUOUT8
Y9 = ALUOUT4 ⊕ ALUOUT9
Y10 = ALUOUT5 ⊕ ALUOUT10
Y11 = ALUOUT6 ⊕ ALUOUT11
Y12 = ALUOUT0 ⊕ ALUOUT4 ⊕ ALUOUT7 ⊕ ALUOUT12
Y13 = ALUOUT1 ⊕ ALUOUT5 ⊕ ALUOUT13
Y14 = ALUOUT2 ⊕ ALUOUT6 ⊕ ALUOUT14
Y15 = ALUOUT3 ⊕ ALUOUT7 ⊕ ALUOUT15

CRC-16 Polynomial Generator 1385 Boolean Logic Expressions

X0 = P
X1 = ALUOUT0 ⊕ P
X2 = ALUOUT1 ⊕ ALUOUT0
X3 = ALUOUT2 ⊕ ALUOUT1
X4 = ALUOUT3 ⊕ ALUOUT2
X5 = ALUOUT4 ⊕ ALUOUT3
X6 = ALUOUT5 ⊕ ALUOUT4
X7 = ALUOUT6 ⊕ ALUOUT5
X8 = ALUOUT8 ⊕ ALUOUT7 ⊕ ALUOUT6
X9 = ALUOUT9 ⊕ ALUOUT7
X10 = ALUOUT10
X11 = ALUOUT11
X12 = ALUOUT12
X13 = ALUOUT13
X14 = ALUOUT14
X15 = ALUOUT15 ⊕ P

Where P is defined as follows:
P = ALUOUT0 ⊕ ALUOUT1 ⊕ ALUOUT2 ⊕ ALUOUT3 ⊕ ALUOUT4 ⊕
ALUOUT5 ⊕ ALUOUT6 ⊕ ALUOUT7

Condition Code 139

Figure 30A:
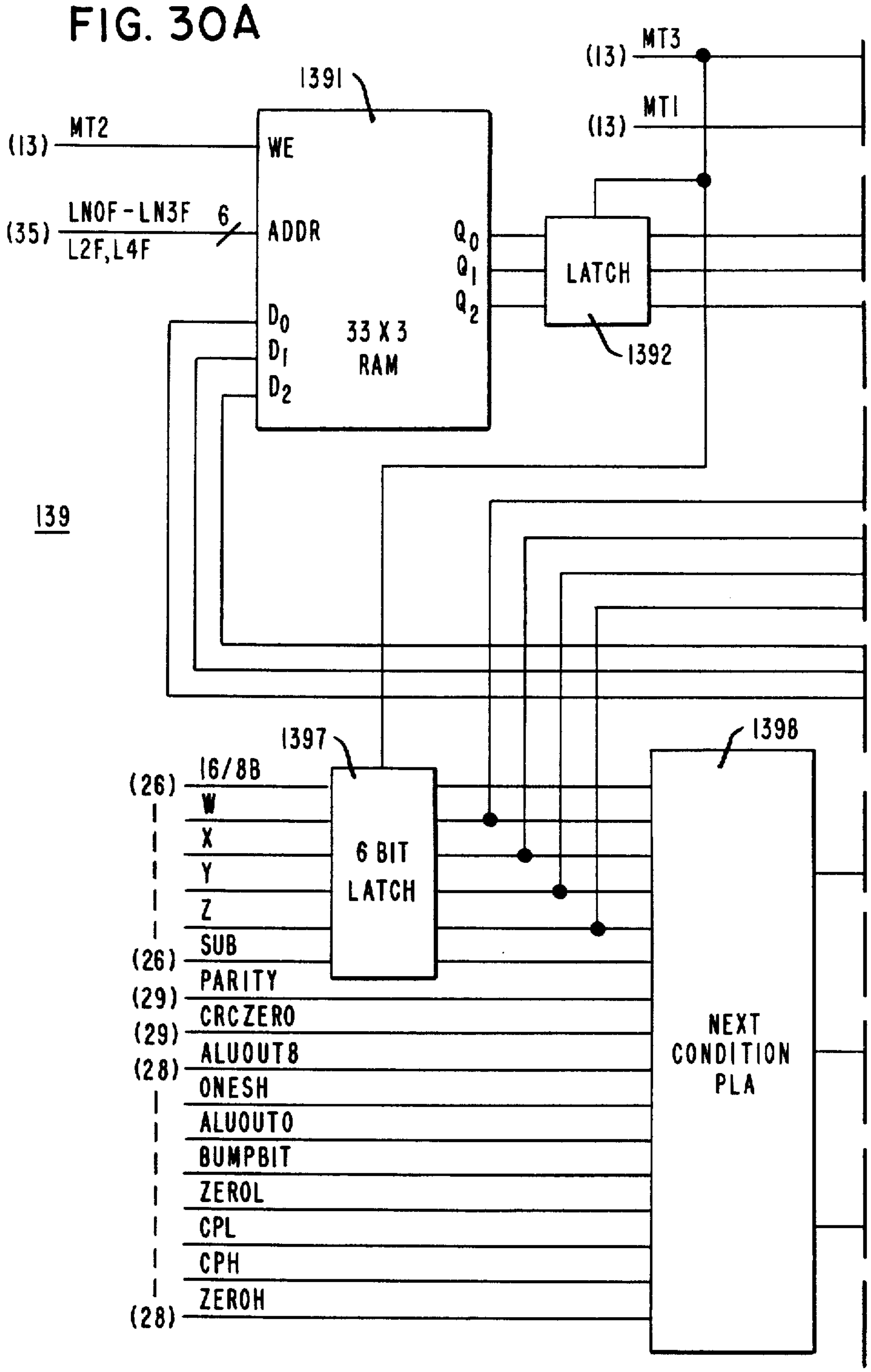
FIGS. 30A and 30B illustrate, in schematic form, the condition code used in the CBuC of FIGS. 12A-12C.
Figure 30B:
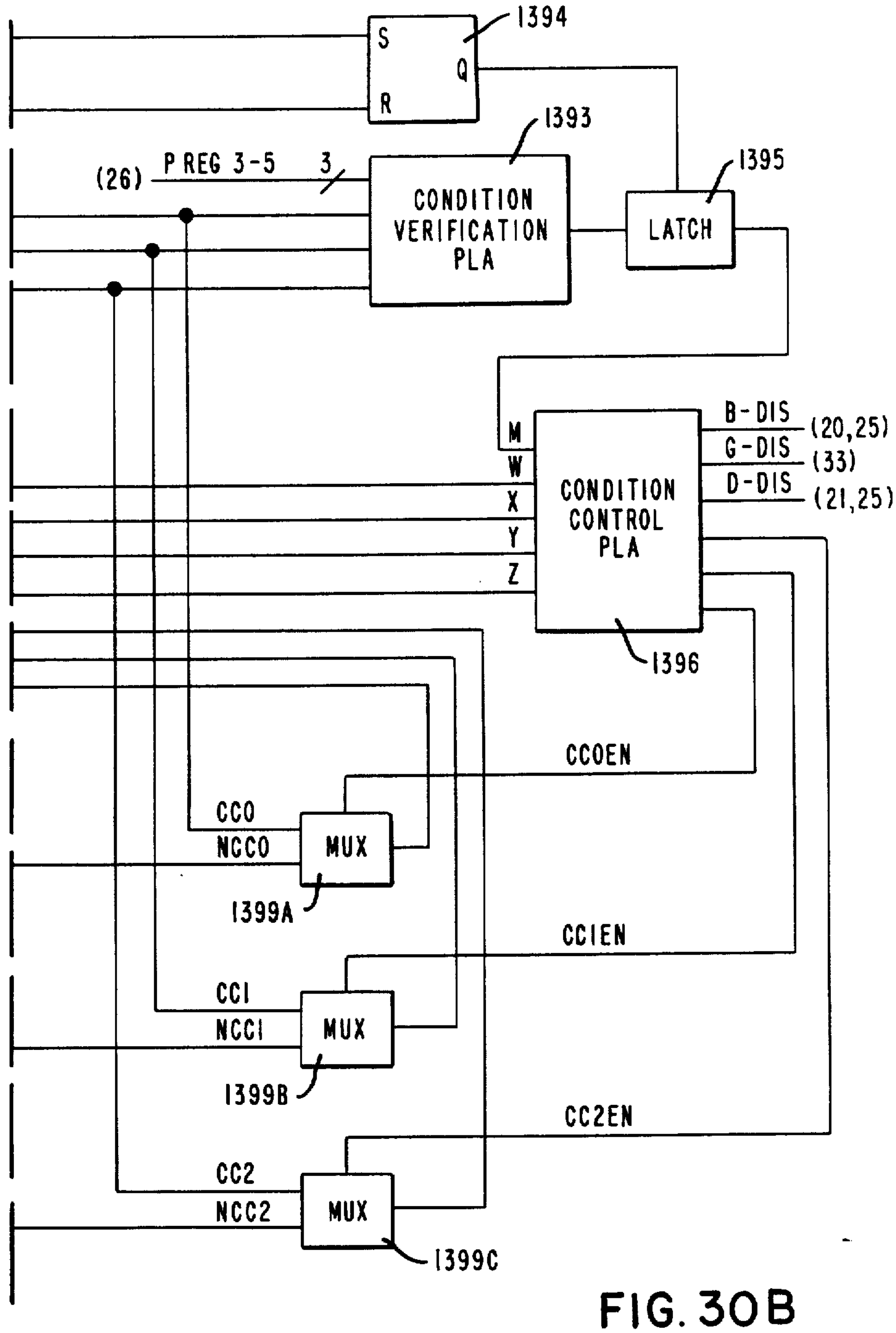

Referring now to FIGS. 30A and 30B wherein is shown the condition code unit 139. A 6-bit latch 1397 latches the indicated signals onto its output upon the occurrence of the clocking signal MT3. These outputs are then directed to the inputs of a next condition PLA 1398. The W, X, Y and Z signals are also directed to the inputs of a condition control PLA 1396.

The Boolean Expressions for the PLAs 1396 and 1398 are as follows:

Condition Control PLA 1396 Logic Expressions

B-DIS = W · X/ · Y/ · M/ + W · X/ · Y · M
D-DIS = W · X · Y/ · M/ + W · X/ · Y · M/
G-DIS = W · X/ · Z · M/
CC0EN = W/ · X/ · Y + W/ · X/ · Z + W/ · X · Y · Z
CC1EN = W/ · X/ · Y + W/ · X/ · Z + W/ · X · Y · Z
CC2EN = W/ · X/ · Y + W/ · X

Next Condition PLA 1398 Boolean Logic Expresisons

NCC0 = X/ · 16/8B/ · SUB/ · ALUOUT8 +
X/ · 16/8B · SUB/ · ALUOUT0 +
X/ · 16/8B/ · SUB · ZEROL/ · CPL +
X/ · 16/8B · SUB · ZEROH/ · CPH +
X/ · 16/8B · SUB · ZEROL/ · CPH +
X · Y · Z · ZEROL/ · ZEROH
NCC1 = X/ · 16/8B/ · ZEROL +
X/ · 16/8B · ZEROL · ZEROH +
X · Y · Z · ZEROL/ · ZEROH/
NCC2 = X/ · Y · Z · 16/8B/ · CPL +
X/ · Y · Z · 16/8B · CPH +
X · Y/ · Z/ · BUMPBIT +
X/ · Y · Z/ · PARITY +
X · Y/ · Z · ZEROH/ · SUB +
X · Y/ · Z · ONESH · SUB/ +
X · Y · Z/ · CRCZERO +
X · Y · Z · ZEROL · ZEROH/

The remaining indicated signals are applied to the inputs to the next condition PLA 1398 which unit outputs the signals NCC0–NCC2 to the inputs of a 2:1 multiplexer 1399A–1399C. The multiplexers under the control of signals CC0EN, CC1EN, and CC2EN select the NCC0–NCC2 signals or the signals CC0–CC2 to provide the signals at the outputs of the multiplexer which signals are directed to the D0–D2 inputs of a 33×3 RAM 1391. The RAM receives the signals LN0F-LN3F, L2F and L4F at its ADDR input. The output of the RAM is available at the terminals Q0–Q2 which outputs are coupled to a latch 1392 when the latch is enabled by the clocking signal MT3. The output signals from the latch 1392 are the signals CC0–CC2, which aside from being directed to the multiplexers 1399A–C, respectively, are also directed to the inputs of a condition verification PLA 1393.

Three bits, P REG 3–5, are also applied as inputs to the PLA 1393. The output signal M from the PLA 1393 is directed as an input to the latch 1395 upon being latched with the signal available at the Q output of the flip-flop 1394. The Boolean expressions for the condition verification PLA 1393 are as follows:

Condition Verification PLA 1393 Boolean Logic Expressions

M = P3/ · P4/ · P5/ · CC0/ +
P3 · P4/ · P5/ · CC0 +
P3/ · P4/ · P5 · CC1/ +
P3 · P4/ · P5 · CC1 +
P3/ · P4 · P5/ · CC2/ +
P3 · P4 · P5/ · CC2 +

-continued

| Condition Verification PLA 1393 Boolean Logic Expressions |
|---|
| P4 · P5 · CC1 |

The signal designated M is applied as an input to the condition control PLA 1396. The PLA 1396 additionally provides the output signals B-DIS, G-DIS and D-DIS.

Memory Address Register 140

Figure 31A:
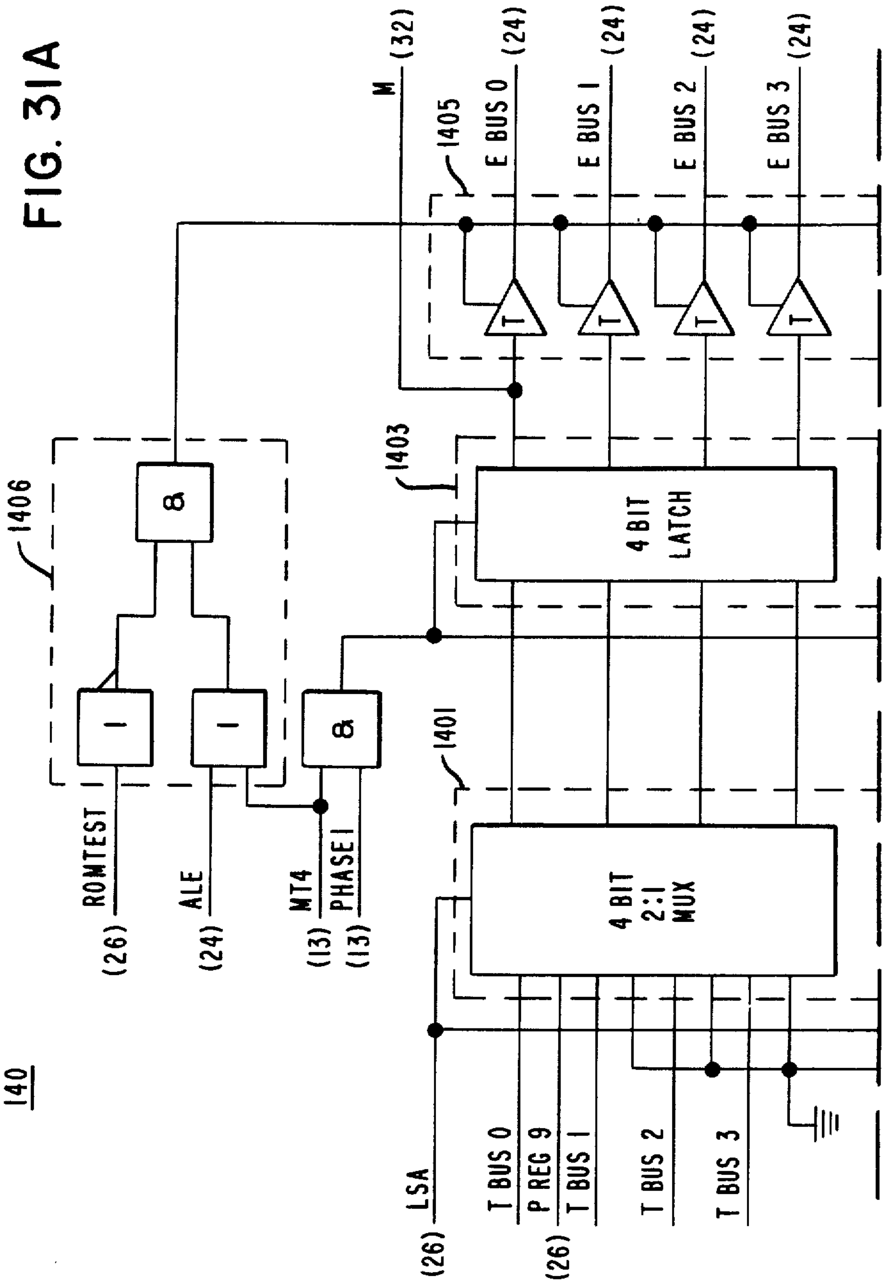
FIGS. 31A-31C, assembled in accordance with the map of FIG. 31, illustrate, in schematic form, the memory address register used in the CBuC of FIGS. 12A-12C.
Figure 31B:
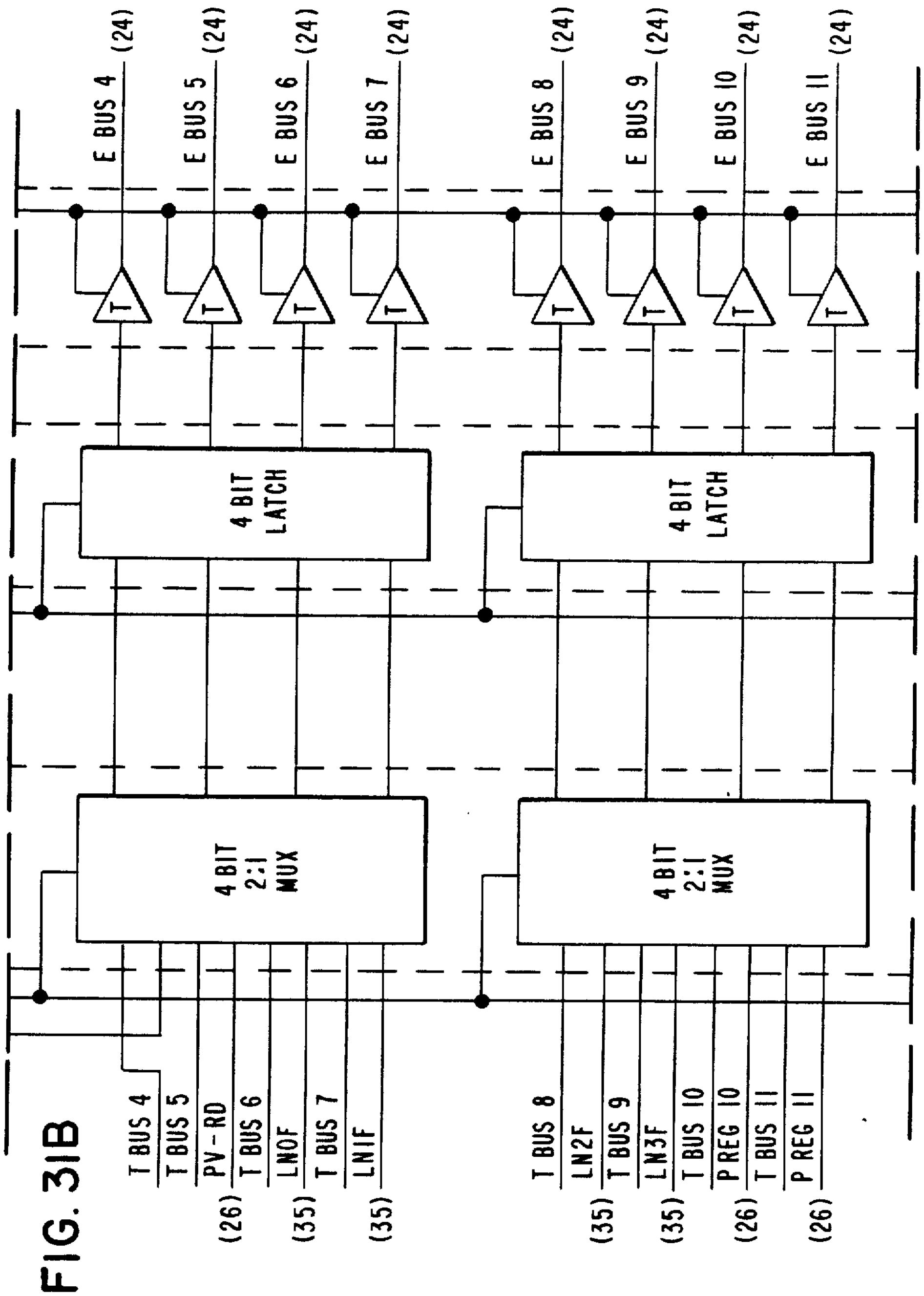
Figures 31, 31C:
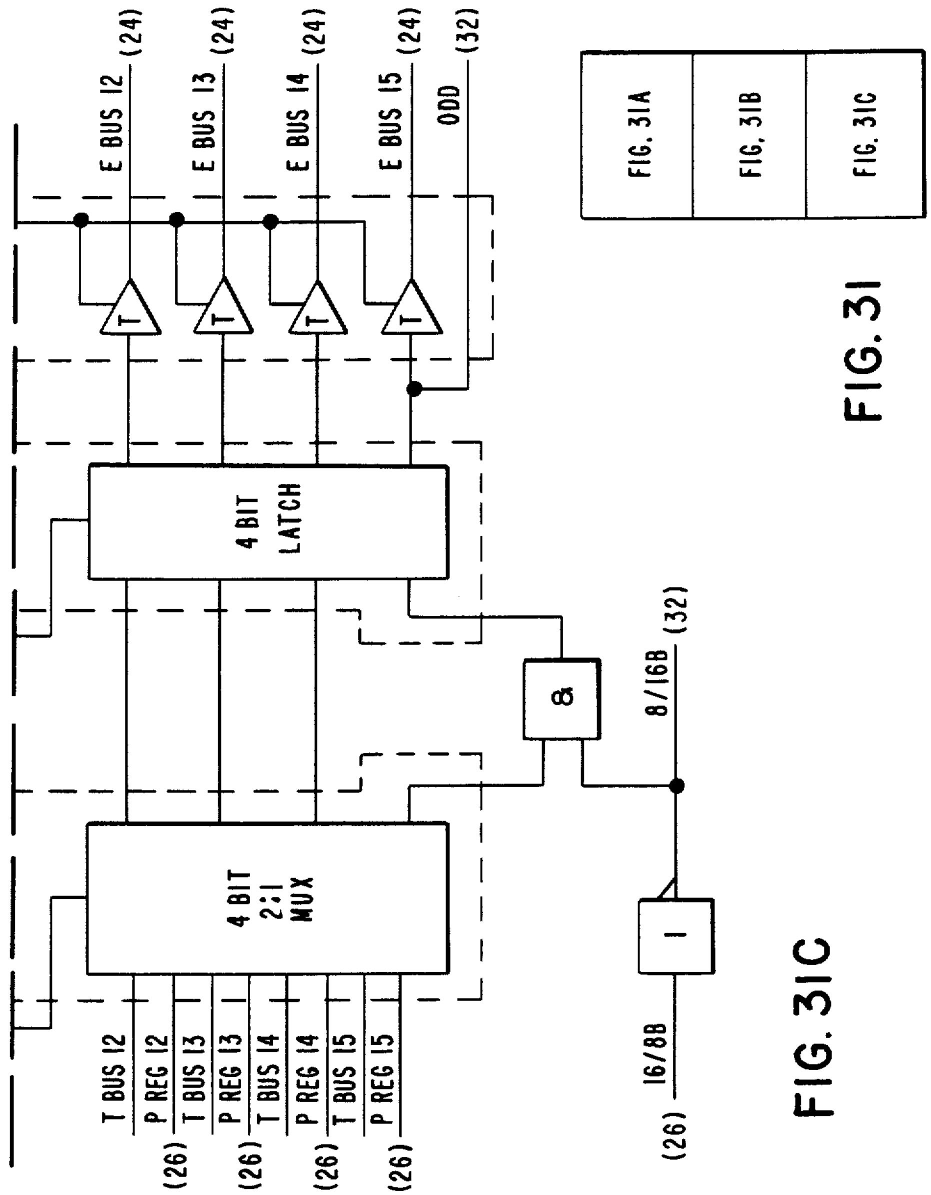

Referring now to FIGS. 31A-31C assembled in accordance with the map of FIG. 31, wherein is shown the logic circuitry for the memory address register 140. The register is comprised of 4-bit, 2:1 multiplexers formed in an array 1401. The array selects groups of 4-bits from the indicated signals upon the occurrence of the selection signal LSA. The LSA signal selects the linespace addressing mode to specify the data memory address. The linespace address consists of a concatenation of the line address with bits from the instruction opcode. The format for the linespace addresses, in binary, is M00000LLLLDDDDDD. Where M is bit 9 of the opcode, LLLL is the line address and scan direction, and DDDDDD are bits 10-15 of the instruction opcode. The selected 4-bits appearing at the output of each of the multiplexers is directed to the inputs of a corresponding array of 4-bit latches 1403 which latches perform the latching function upon receipt of the logically combined clock signal MT4 and the PHASE 1 signal. The latched signals available at the output of the latching array 1403 are directed to the indicated conductors of the E-bus upon receipt of an enabling signal, derived from the gating logic circuit 1406 by logically combining the clock signal MT4, ALE and ROM TEST.

Memory Data Register 141

Figure 32A:
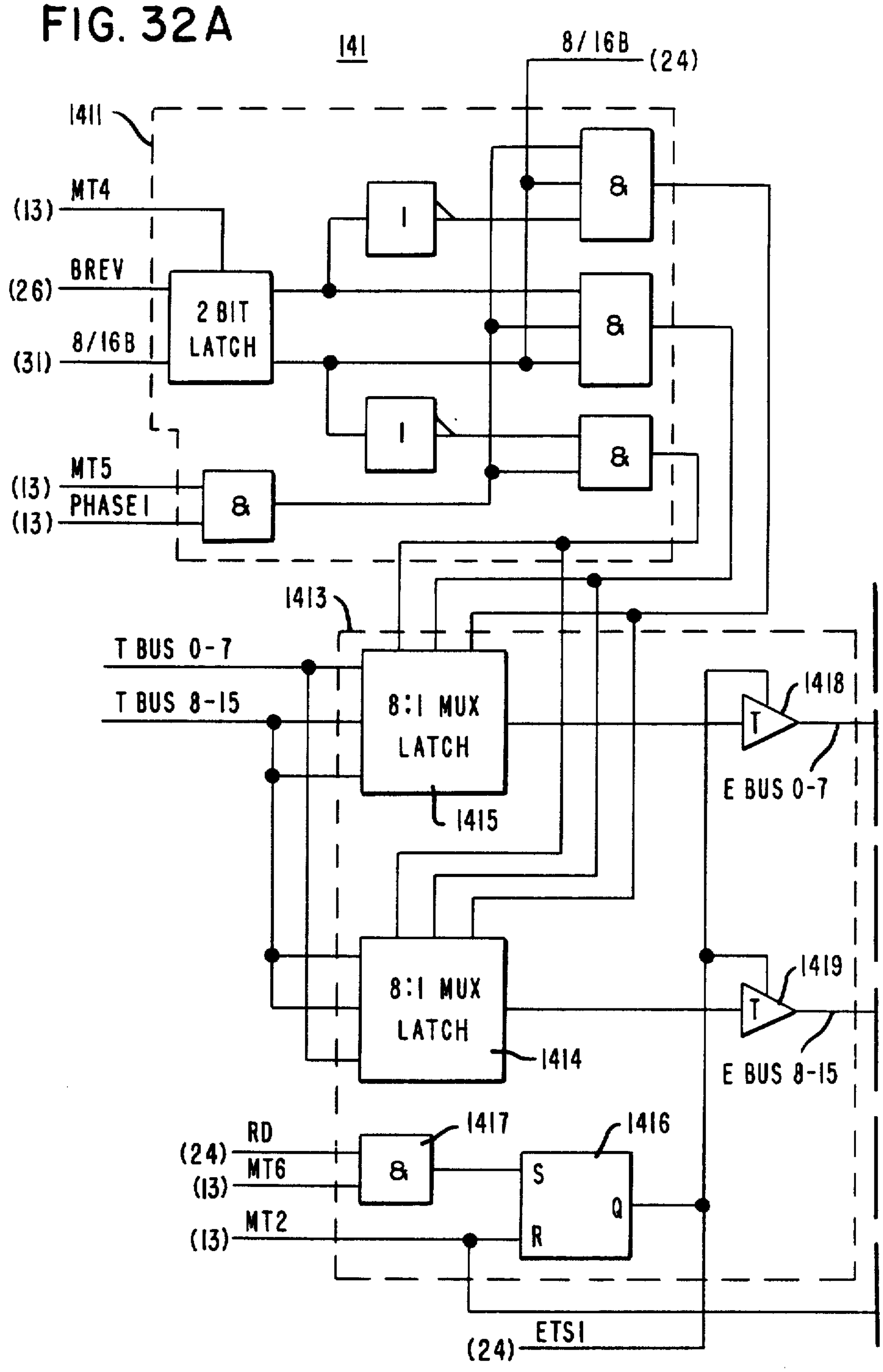
FIGS. 32A and 32B illustrate, in schematic form, the memory data register used in the CBuC of FIGS. 12A-12C.
Figure 32B:
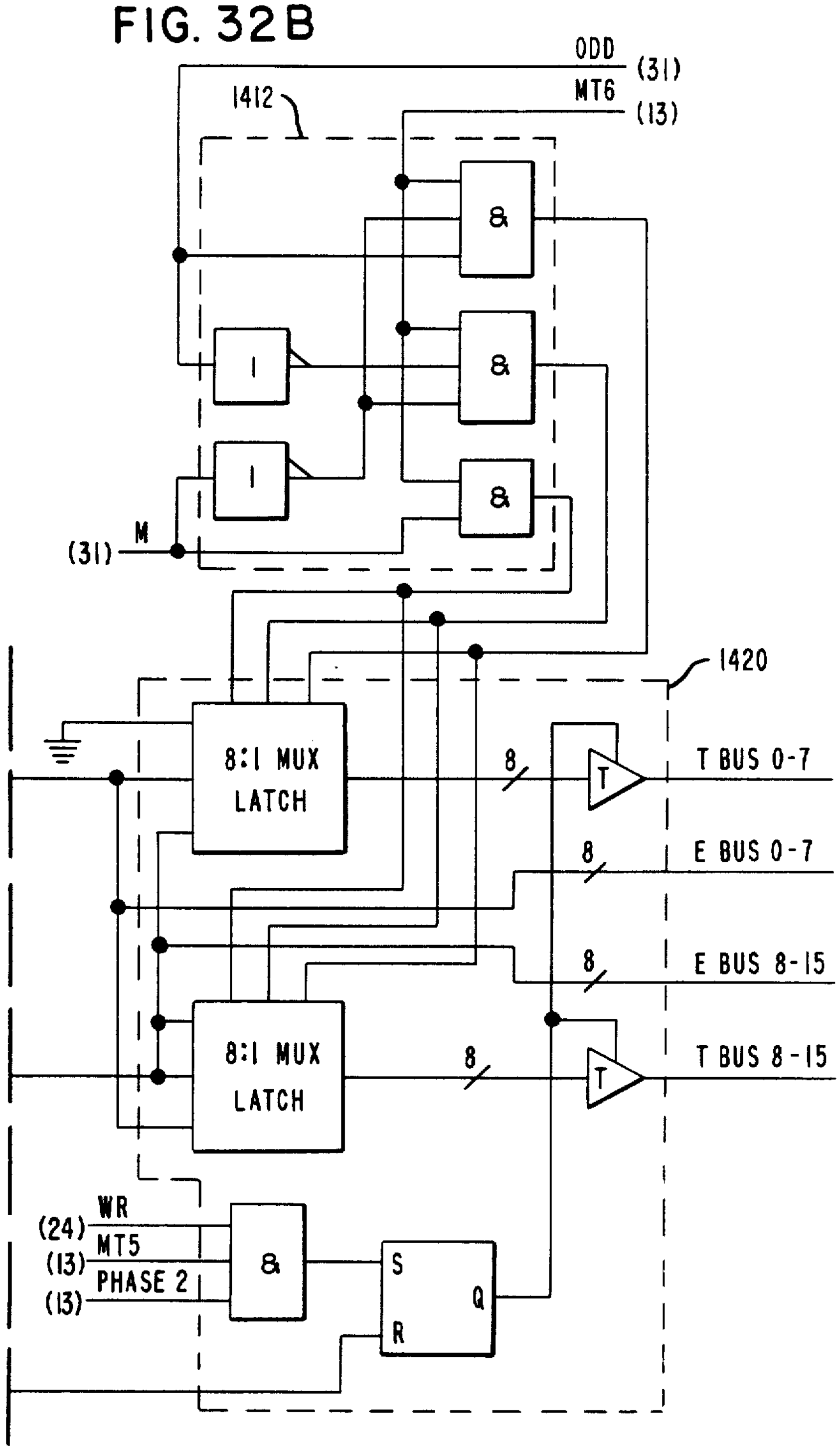

Referring to FIGS. 32A and 32B wherein is disclosed the logic circuitry for the memory data register 141. Signals from the T-bus bits 0-15 are directed to a pair of 3:1 multiplexing latches 1415 and 1414. Logic circuitry 1411 logically combines the signals indicated on its inputs to provide the selection input to the multiplexers. The multiplexers in turn provide at their outputs signals which may be directed to the E-bus conductors 0-15 by means of enabling the tri-state devices 1418 and 1419 with an enabling signal from the latch 1416. The latch 1416 receives on its S input the ANDed signals RD and MT6 from the AND gate 1417 and on its reset input, R, the clocking signal MT2. Using substantially similar circuitry, signals present on the E-bus conductors 0-15 may be directed to the T-bus conductors 0-15 by the circuit 1420 and the associated logic circuitry 1412 for providing the three selection input signals to the multiplexing latches which form part of the circuitry of 1420.

General Register RAM 143

Figure 33A:
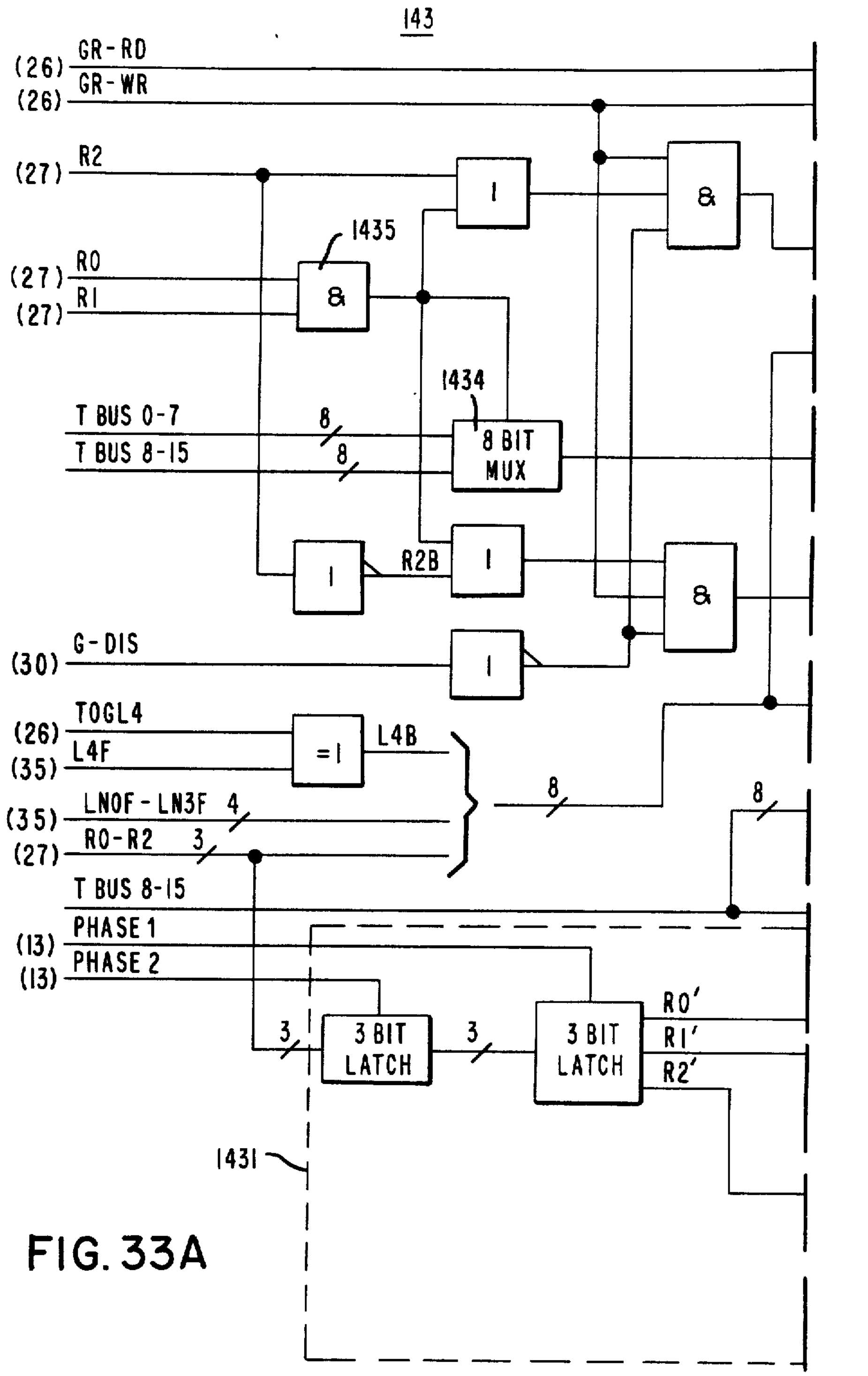
FIGS. 33A and 33B illustrate, in schematic form, the general register RAM used in the CBuC of FIGS. 12A-12C.
Figure 33B:
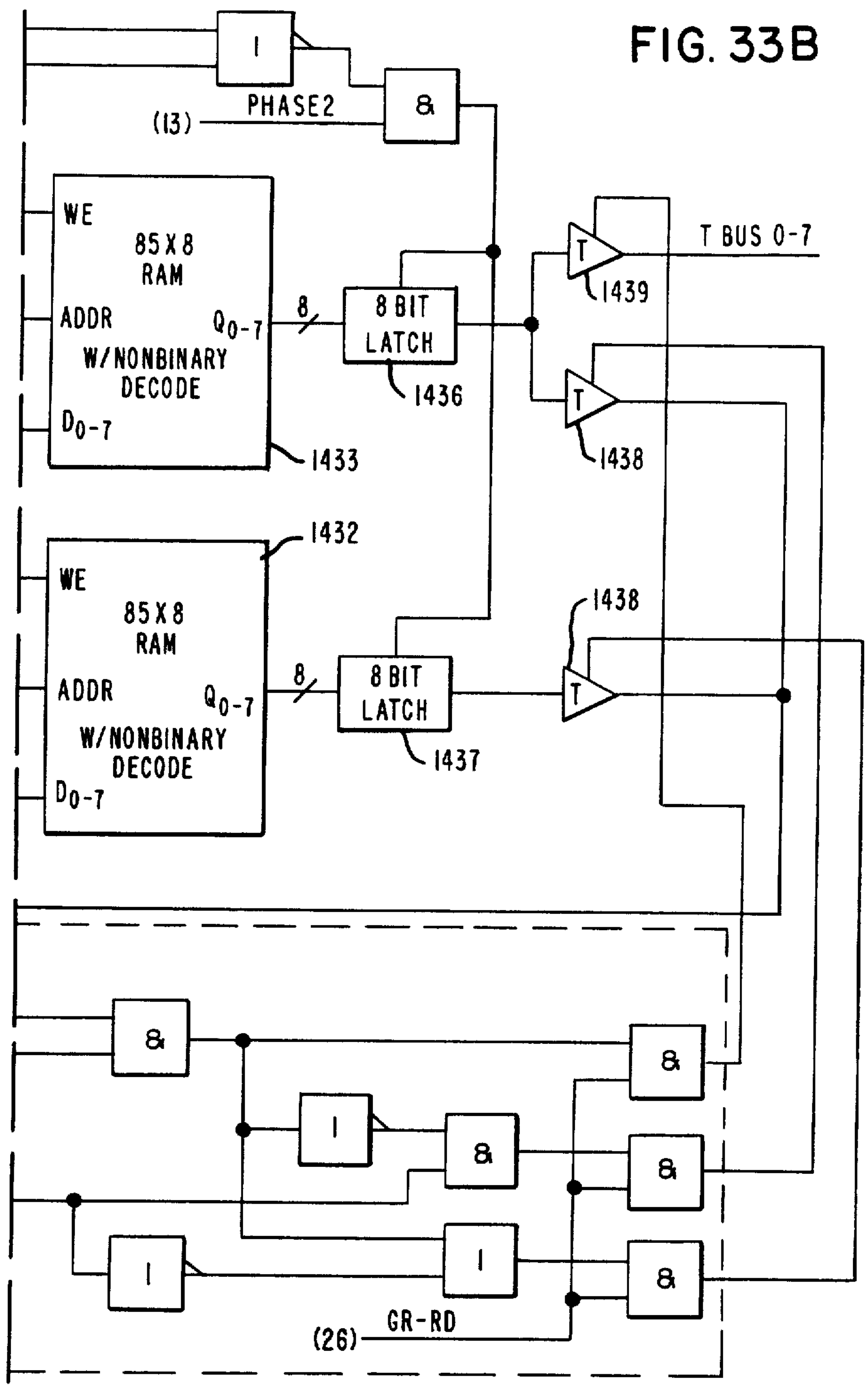

Referring to FIGS. 33A and 33B wherein is disclosed the logic circuitry for the general register RAM 143. The general register RAM contains the eight program registers allocated to the input and output programs for each of the communications lines, and the level 4 program. The program registers are selected by the R0-R2 signals generated by the field extraction logic 135. The values 0-5 on the RO-R2 signals select eight bit program registers 0-5. The values of 6 and 7 on the R0-R2 signals select 16-bit program registers 6 and 7, respectively. Two 85×8 RAMs 1432 and 1433 each provide an 8-bit output that is directed to an 8-bit latch 1437 and 1436, respectively. The output of the 8-bit latch 1436 is directed to a pair of tri-state devices 1438 and 1439 with the output of 1439 being the 8-bit signal applied to the T-bus 0-7. The output signals from the tri-state devices 1438 are directed to the D0-7 input of the RAM 1432 and to the T-bus conductors 8-15. The D0-7 inputs of the RAM 1433 are derived from an 8-bit multiplexer 1434 which multiplexer receives on its inputs the 8-bits from the T-bus 0-7 and the 8-bits from the T-bus 8-15 toggled or enabled by the signal at the output of the AND gate 1435. The address bits for the RAMs are derived from an 8-bit combination of the signals R0-R2, LN0F-LN3F and L4B. The latching action of the latches 1436 and 1437 is controlled by the signals GR-RD, GR-WR and the signal PHASE 2. Activation of the tri-state devices 1438 and 1439 is by way of enabling signals coming from a logic circuit 1431 which receives as its inputs the signals PHASE 1, PHASE 2 and R0-R2.

Auxiliary RAM 144

Figure 34:
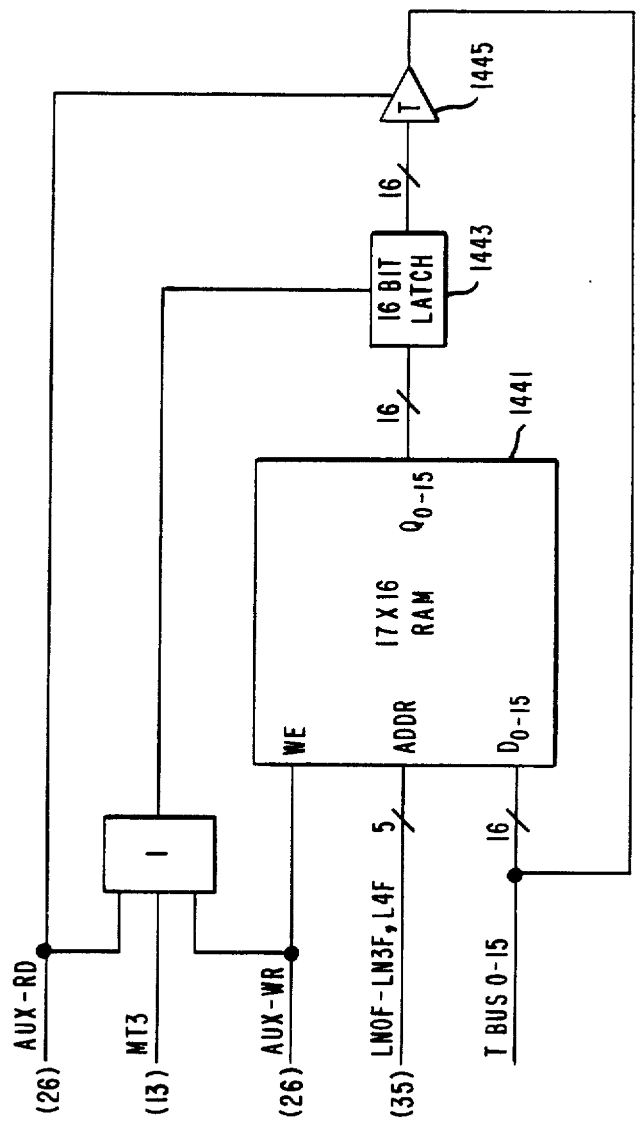
FIG. 34 illustrates, in schematic form, the auxiliary RAM used in the CBuC of FIGS. 12A-12C.

Referring now to FIG. 34 wherein is disclosed the logic circuitry for the auxiliary RAM 144. The RAM is comprised of a central memory 17×16 in size labeled 1441 for latching out a 16-bit output in response to the 5-bit signal labeled LN0F-LN3F, L4F, applied to its ADDR input. The 16-bits are latched by the latch 1443 under control of the enabling signal derived as a logical combination of the signals AUXRD, MT3 and AUXWR. Passage of the 16-bit latch signal to the T-bus 0-15 is accomplished with enablement of the tri-state device 1445 by the application of the signal AUXRD.

Default Line Number Register 145

Figure 35:
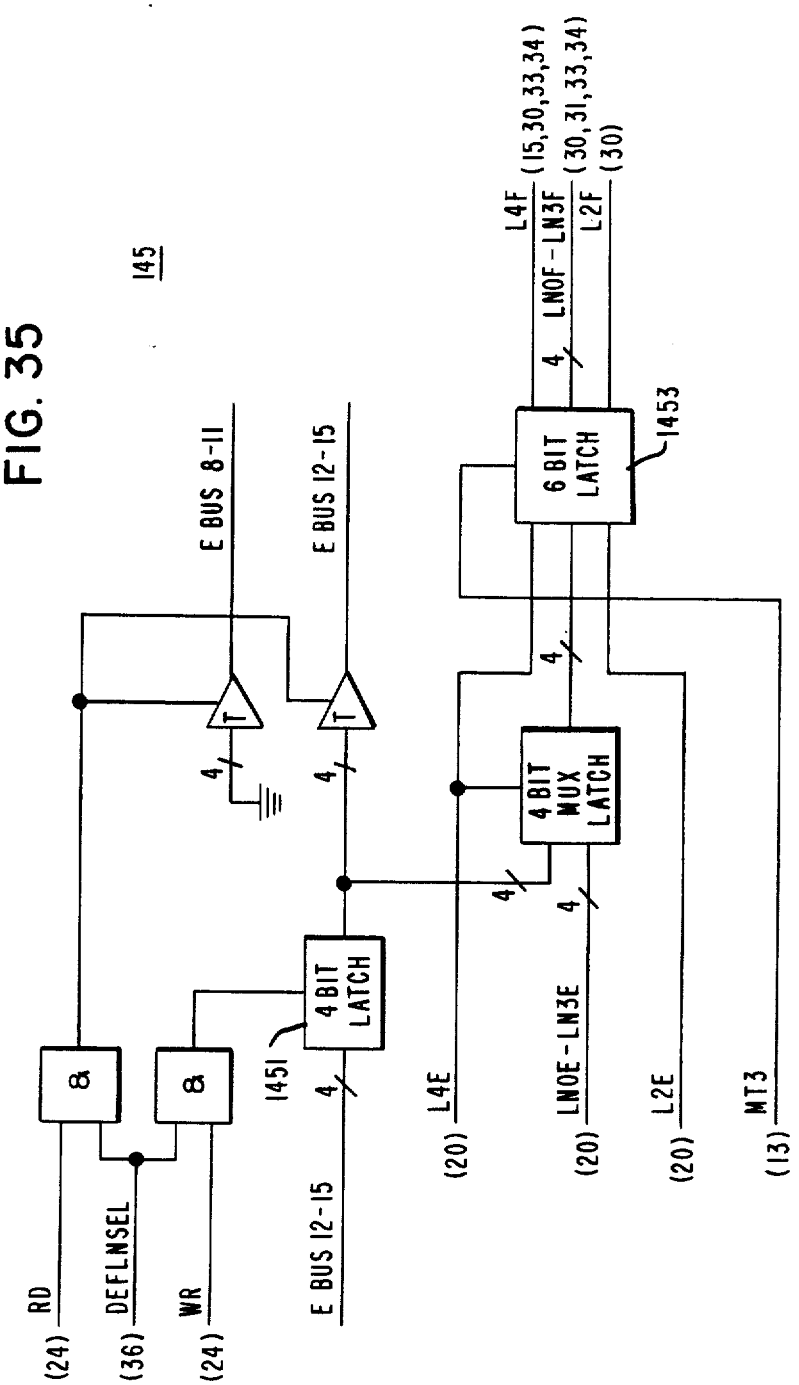
FIG. 35 illustrates, in schematic form, the default line number register used in the CBuC of FIGS. 12A-12C.

Referring to FIG. 35 wherein is disclosed the default line number register 145 comprised of two 4-bit latches 1451 and 1452 along with a 6-bit latch 1453. The primary function of the default line number register is to provide the level 4 program with a means for utilizing the linespace addressing mode. The 4-bit latch 1451 receives the E-bus signals 12-15 and latches those signals under control of the logically combined signals DEFLNSEL, RD and WR. The 4-bit latch 1451 is mapped onto the E-bus at hexadecimal data address 84FC. The output of the 4-bit latch 1451 is directed to the 4-bit multiplexer 1452 along with the signals LN0E-LN3E. An enabling signal L4E selects which of the 4-bit inputs will appear at the output with the output being directed to a 6-bit latch 1453. The 6-bit latch in response to the timing signal MT3 latches the 4-bits previously mentioned and the signals L4E and L2E to its output.

Address Detection Circuit 764

Figure 36:
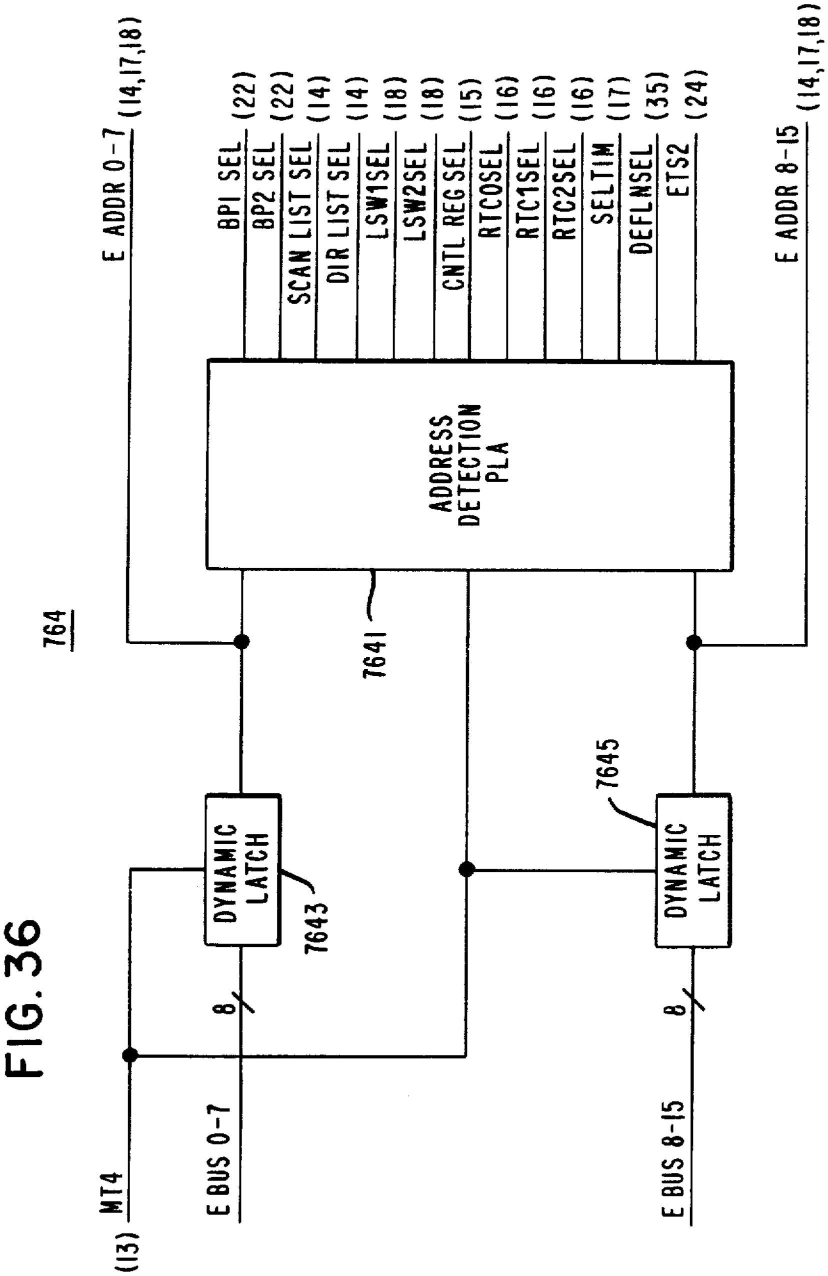
FIG. 36 illustrates, in schematic form, the address detection logic used in the CBuC of FIGS. 12A-12C.

Referring to FIG. 36 wherein is disclosed the circuitry for the address detection circuit 764. The circuit is comprised of an address detection PLA 7641 and dynamic latches 7643 and 7645. The clocking signal MT4 causes each of the latches to latch the 8-bits appearing at their inputs to the outputs and in turn to the inputs of the address detection PLA 7641. Dynamic latch 7643 receives the 8-bits from E-bus 0-7 while the dynamic latch 7645 receives the 8-bits from the E-bus 8-15. The inputs, outputs and Boolean logic equations for the address detection PLA 7641 are as follows:

| Inputs to 7641 | |
|---|---|
| Port Letter | Name |
| A | EA 0-7 |
| B | MT4 |
| C | EA 8-15 |

| Outputs From 7641 | |
|---|---|
| Pin Letter | Name |
| D | BP1SEL |
| E | BP2SEL |
| F | SCAN LIST SEL |
| G | DIR LIST SEL |
| H | LSW1SEL |
| I | LSW2SEL |
| J | CNTL REGSEL |
| K | RTC0SEL |
| L | RTC1SEL |
| M | RTC2SEL |
| N | SELTIM |
| O | DEFLNSEL |
| P | ETS2 |

Address Detection PLA 7641 Boolean Logic Expressions

BP1SEL = EA0 · EA1/ · EA2/ · EA3/ · EA4/ · EA5 · EA6/ · EA7/ · EA8 · EA9 · EA10 · EA11 · EA12 · EA13 · EA14/ · EA15

BP2SEL = EA0 · EA1/ · EA2/ · EA3/ · EA4/ · EA5 · EA6/ · EA7/ · EA8 · EA9 · EA10 · EA11 · EA12 · EA13 · EA14 · EA15/

SCAN LIST SEL = EA0 · EA1/ · EA2/ · EA3/ · EA4/ · EA5 · EA6/ · EA7/ · EA8/ · EA9/ · EA10/ · EA11/

DIR LIST SEL = EA0 · EA1/ · EA2/ · EA3/ · EA4/ · EA5/ · EA10/ · EA11/ · EA12/ · EA13/ · EA14 · EA15/

LSW1SEL = EA0 · EA1/ · EA2/ · EA3/ · EA4/ · EA5/ · EA10/ · EA11/ · EA12/ · EA14/ · EA15/

LSW2SEL = EA0 · EA1/ · EA2/ · EA3/ · EA4/ · EA5/ · EA10/ · EA11/ · EA12/ · EA14/ · EA15

CNTL REG SEL = EA0 · EA1/ · EA2/ · EA3/ · EA4/ · EA5 · EA6/ · EA7/ · EA8 · EA9 · EA10 · EA11 · EA12 · EA13 · EA14 · EA15

RTC0SEL = EA0 · EA1/ · EA2/ · EA3/ · EA4/ · EA5 · EA6/ · EA7/ · EA8/ · EA9/ · EA10/ · EA11 · EA12/ · EA13/ · EA14/ · EA15/

RTC1SEL = EA0 · EA1/ · EA2/ · EA3/ · EA4/ · EA5 · EA6/ · EA7/ · EA8/ · EA9/ · EA10/ · EA11 · EA12/ · EA13/ · EA14/ · EA15

RTC2SEL = EA0 · EA1/ · EA2/ · EA3/ · EA4/ · EA5 · EA6/ · EA7/ · EA8/ · EA9/ · EA10/ · EA11 · EA12/ · EA13/ · EA14 · EA15/

SELTIM = EA0 · EA1/ · EA2/ · EA3/ · EA4/ · EA5/ · EA10/ · EA11/ · EA12/ · EA13/ · EA14 · EA15

DEFLNSEL = EA0 · EA1/ · EA2/ · EA3/ · EA4/ · EA5 · EA6/ · EA7/ · EA8 · EA9 · EA10 · EA11 · EA12 · EA13 · EA14/ · EA15/

ETS2 = BP1SEL + BP2SEL + SCAN LIST SEL + DIR LIST SEL + LSW1SEL + LSW2SEL + CNTL REG SEL + RTC0SEL + RTC1SEL + RTC2SEL + SELTIM + DEFLNSEL

Communications Processor Interface (CPIF) 502

Figure 37B:
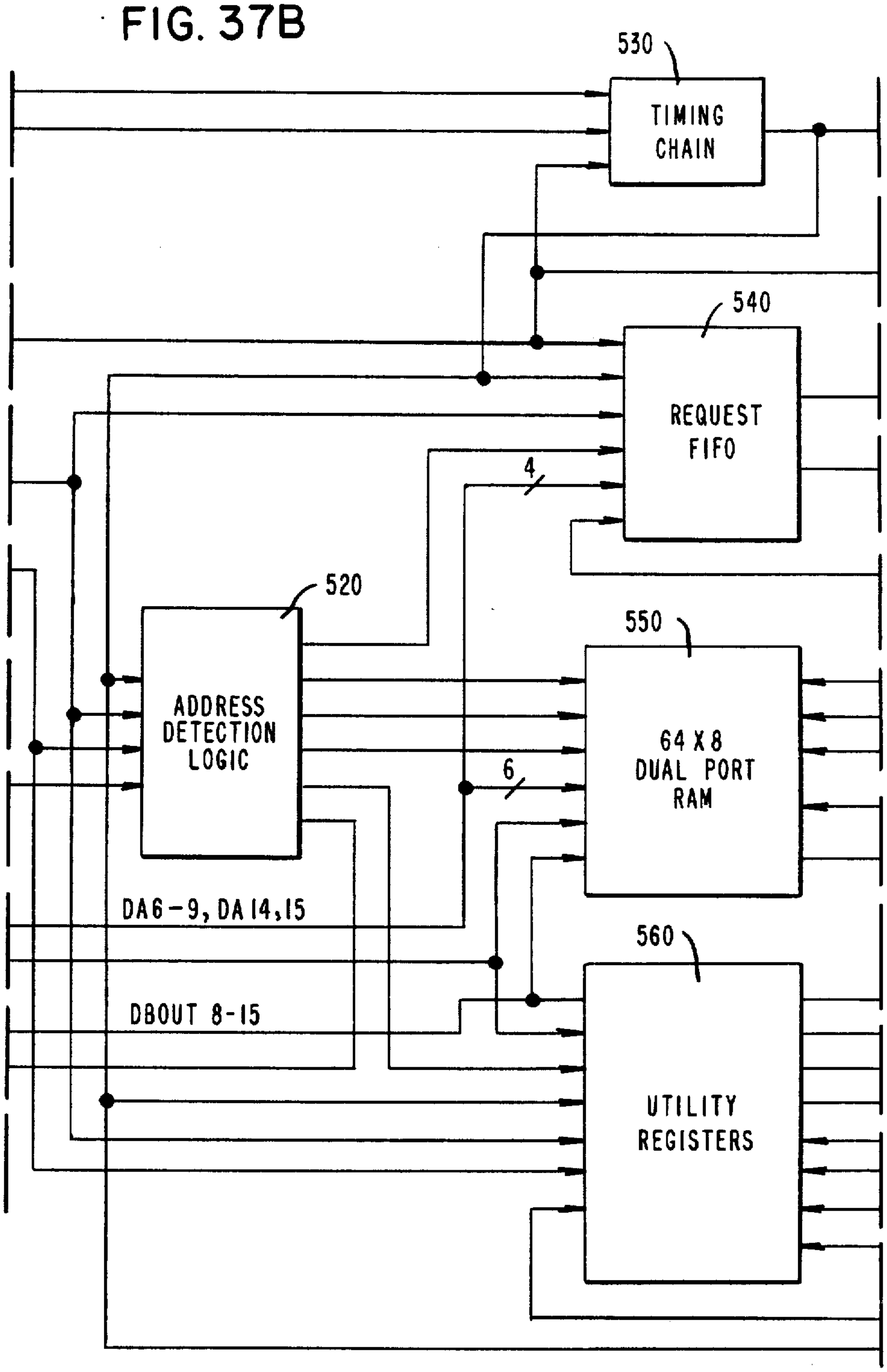
Figure 37C:
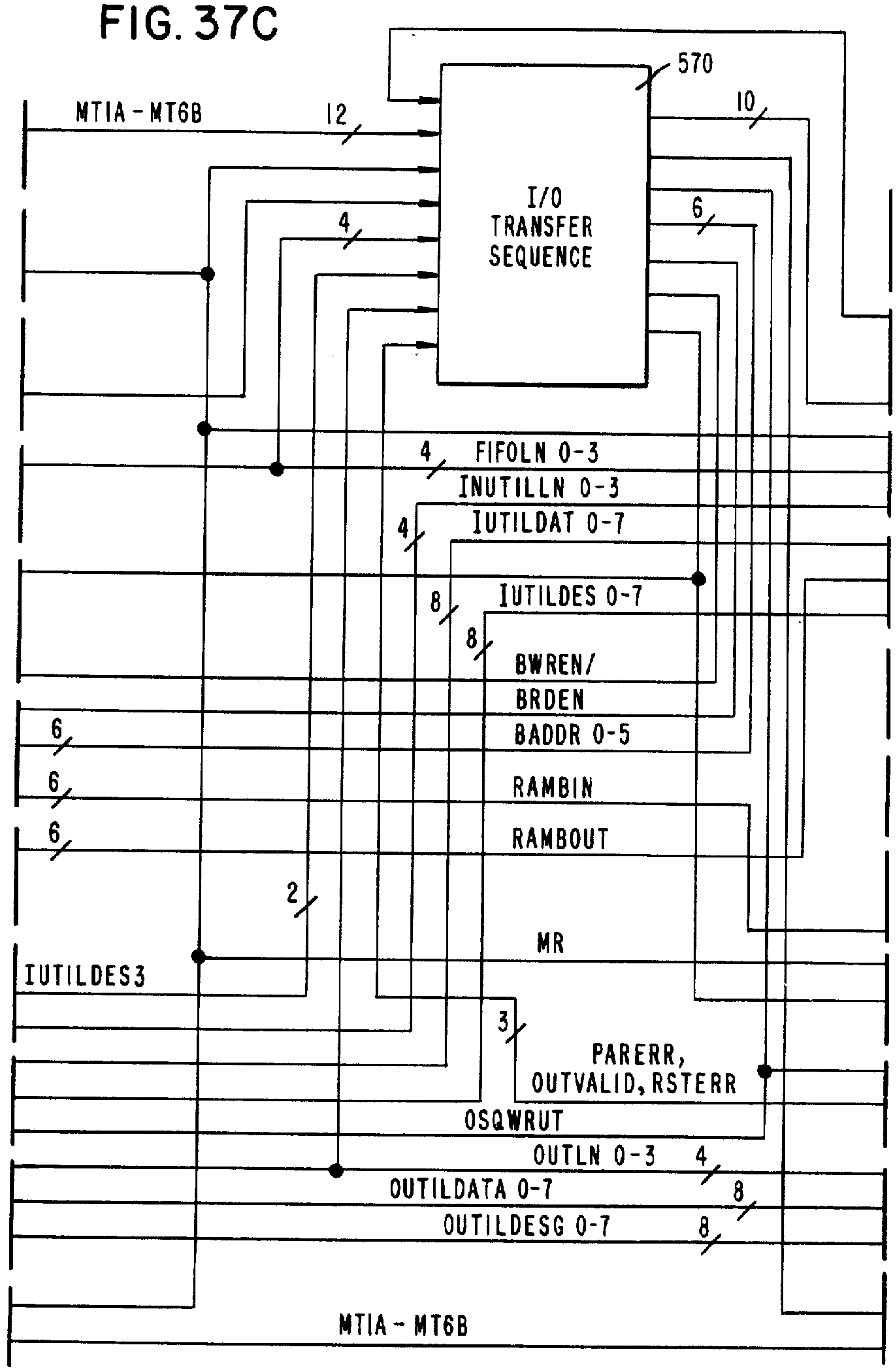
Figure 37D:
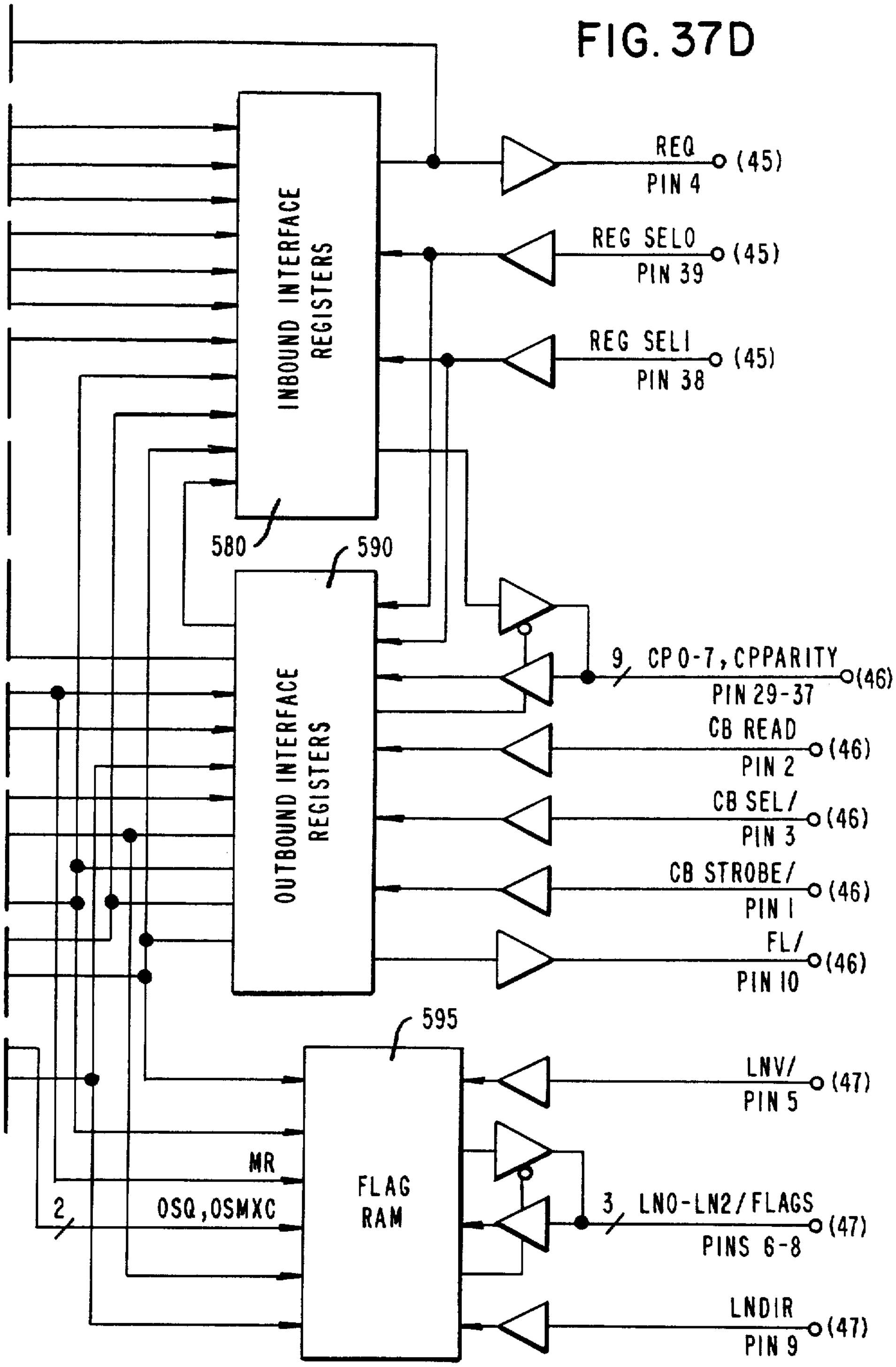

Referring to FIGS. 37A-37D, assembled in accordance with the map of FIG. 37 is a block schematic diagram of the CPIF interfacing control logic chip 502. The CPIF monitors signals from the outbound control register, service request FIFO, and the inbound interface register in order to determine if one of eight CPIF transfer sequences is to be executed. The CPIF transfer sequences are classified as inbound or outbound depending on the direction of the transfer. An outbound transfer which is from the I/O controller will be made for both input and output directions of a communications line. Likewise, an inbound transfer (to the I/O controller) will be made for both directions of the communications line.

Figure 49:
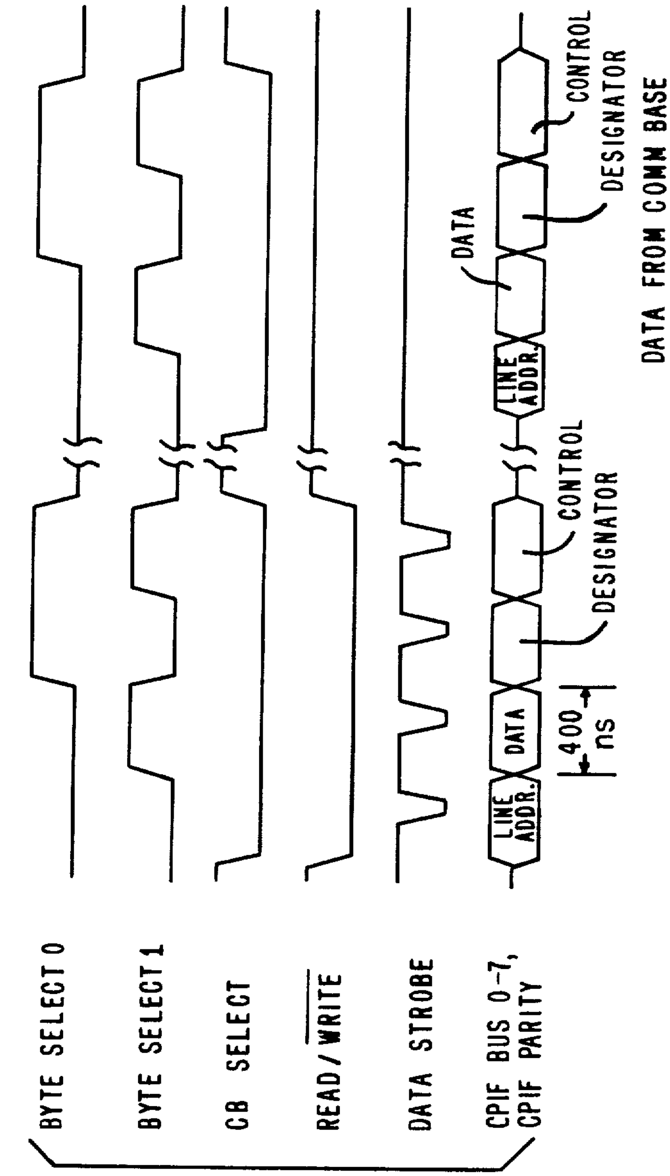
FIG. 49 illustrates processor interface timing waveforms useful for an understanding of the operation of the invention.
Figure 50:
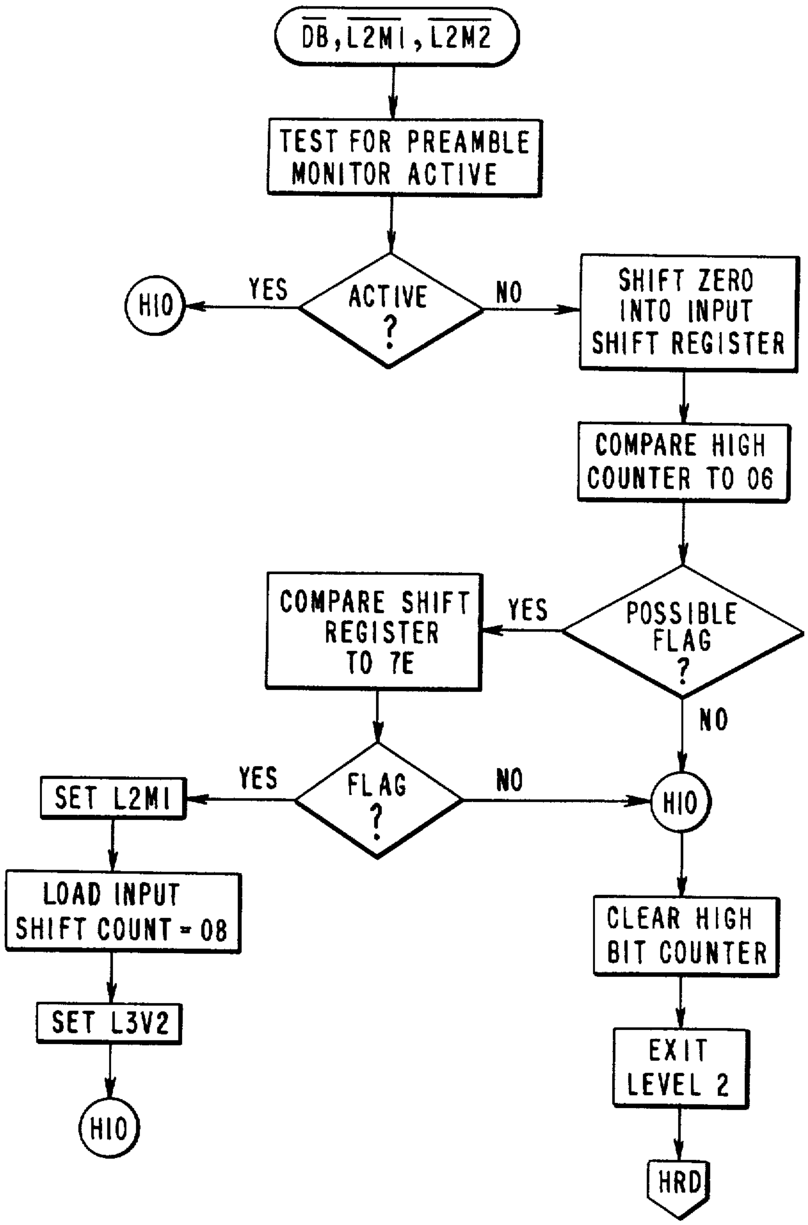
Figure 51:
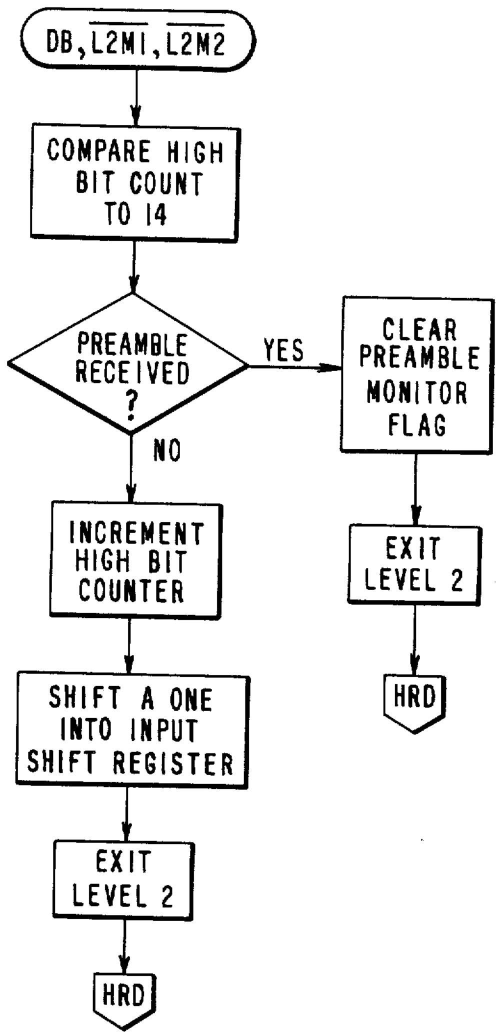
Figure 52:
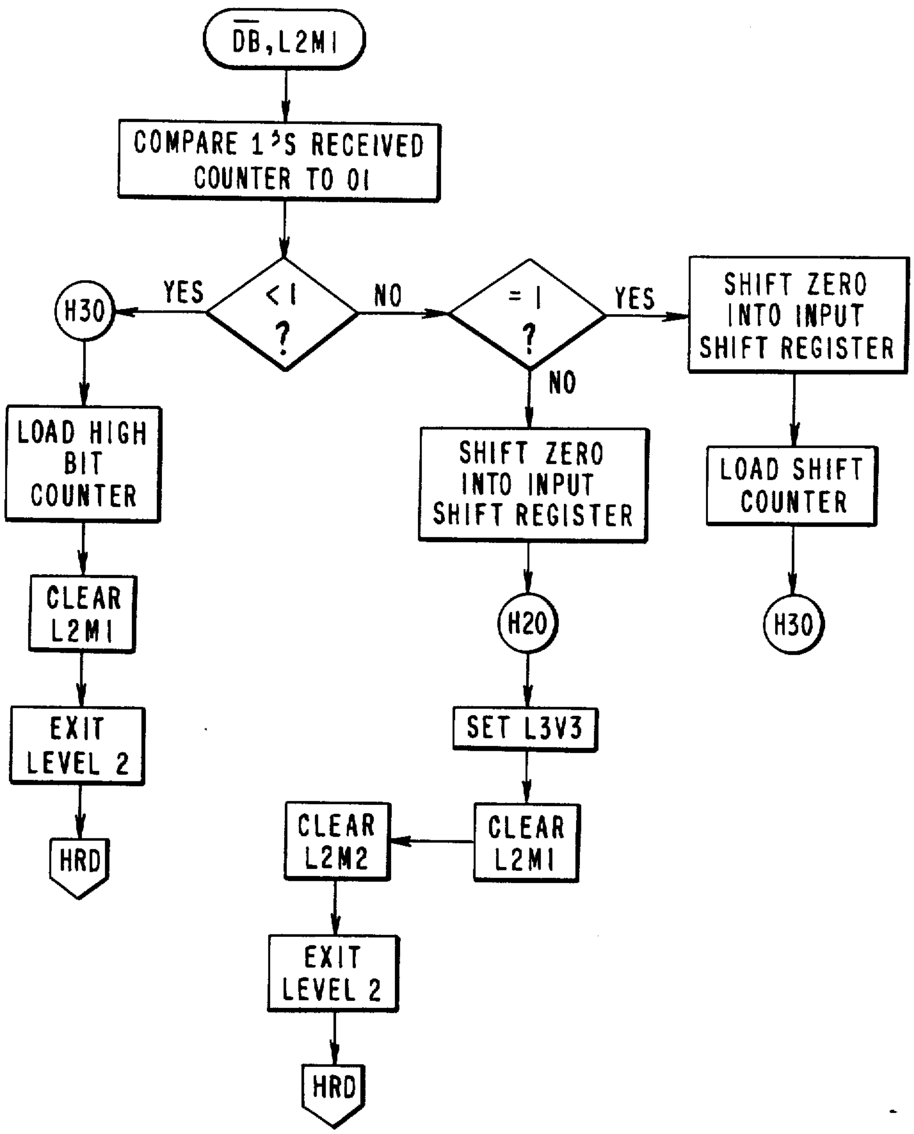
Figure 53:
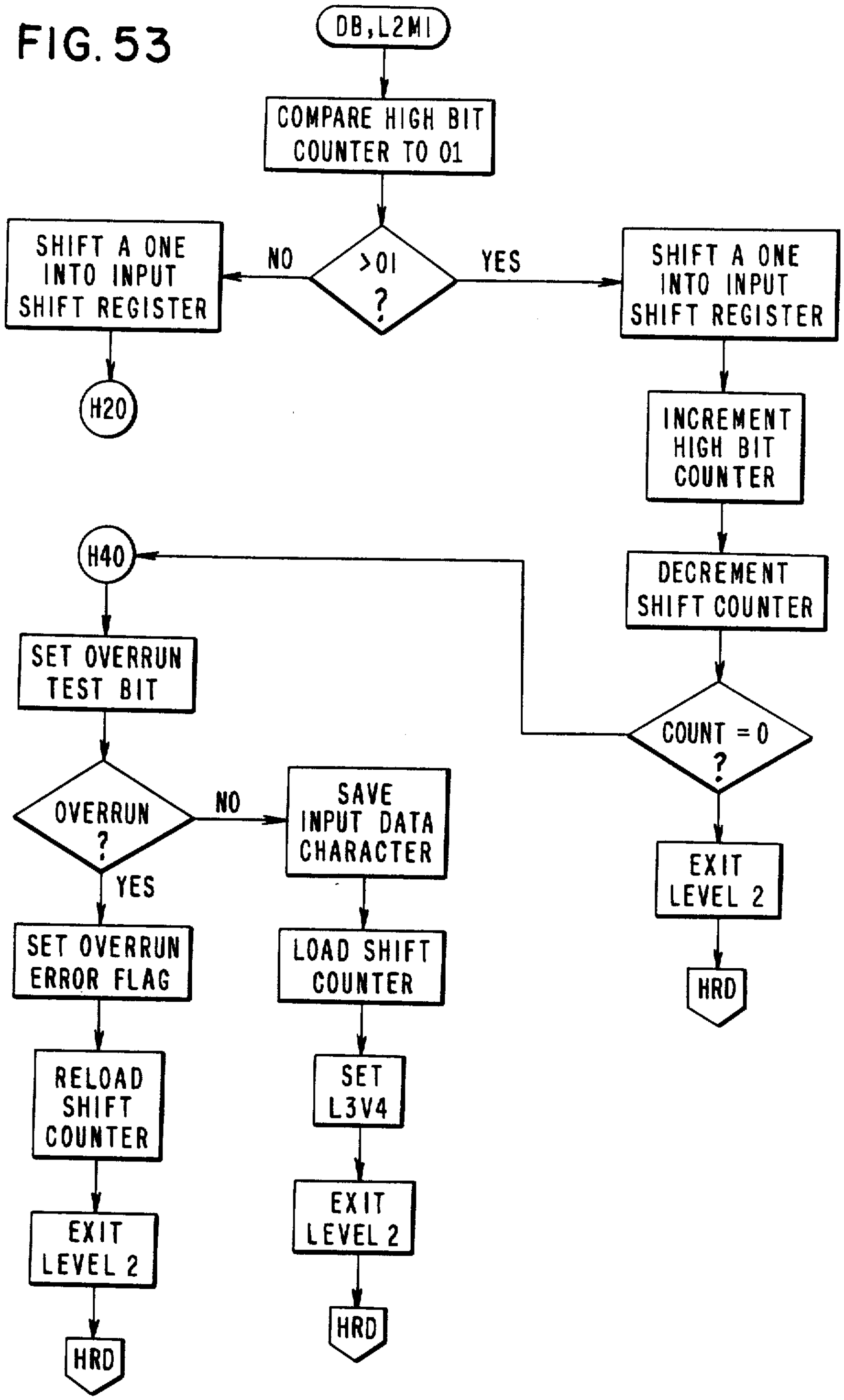
Figure 54:
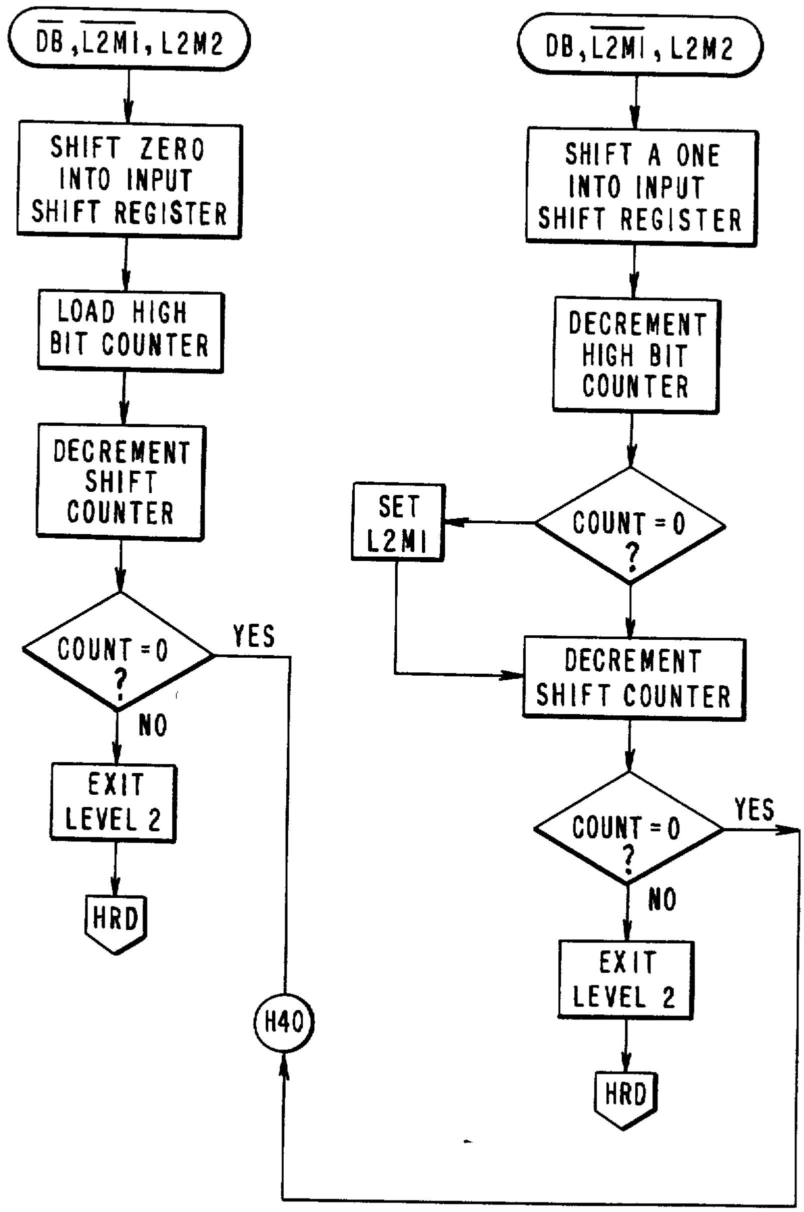
Figure 55:
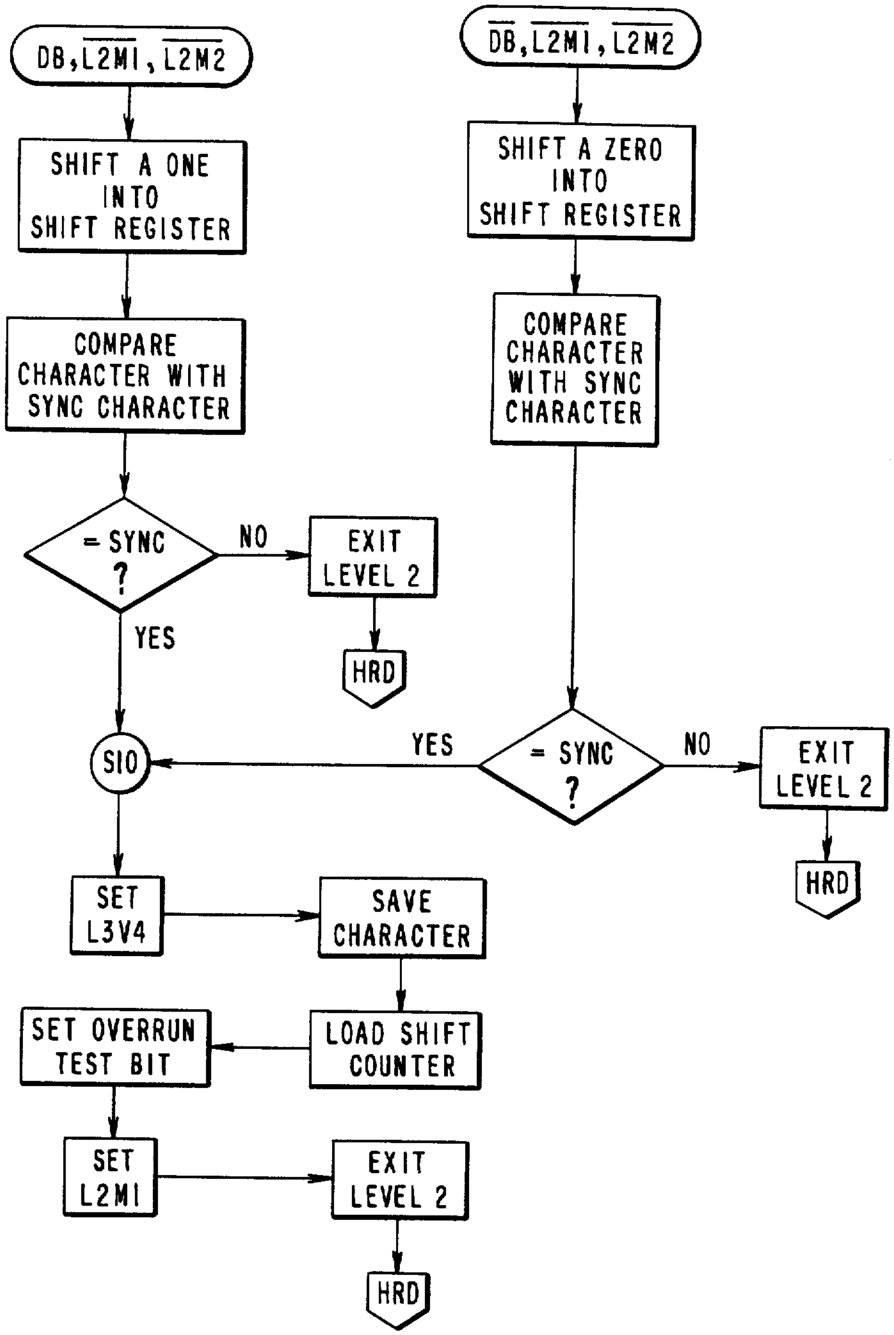
Figure 56:
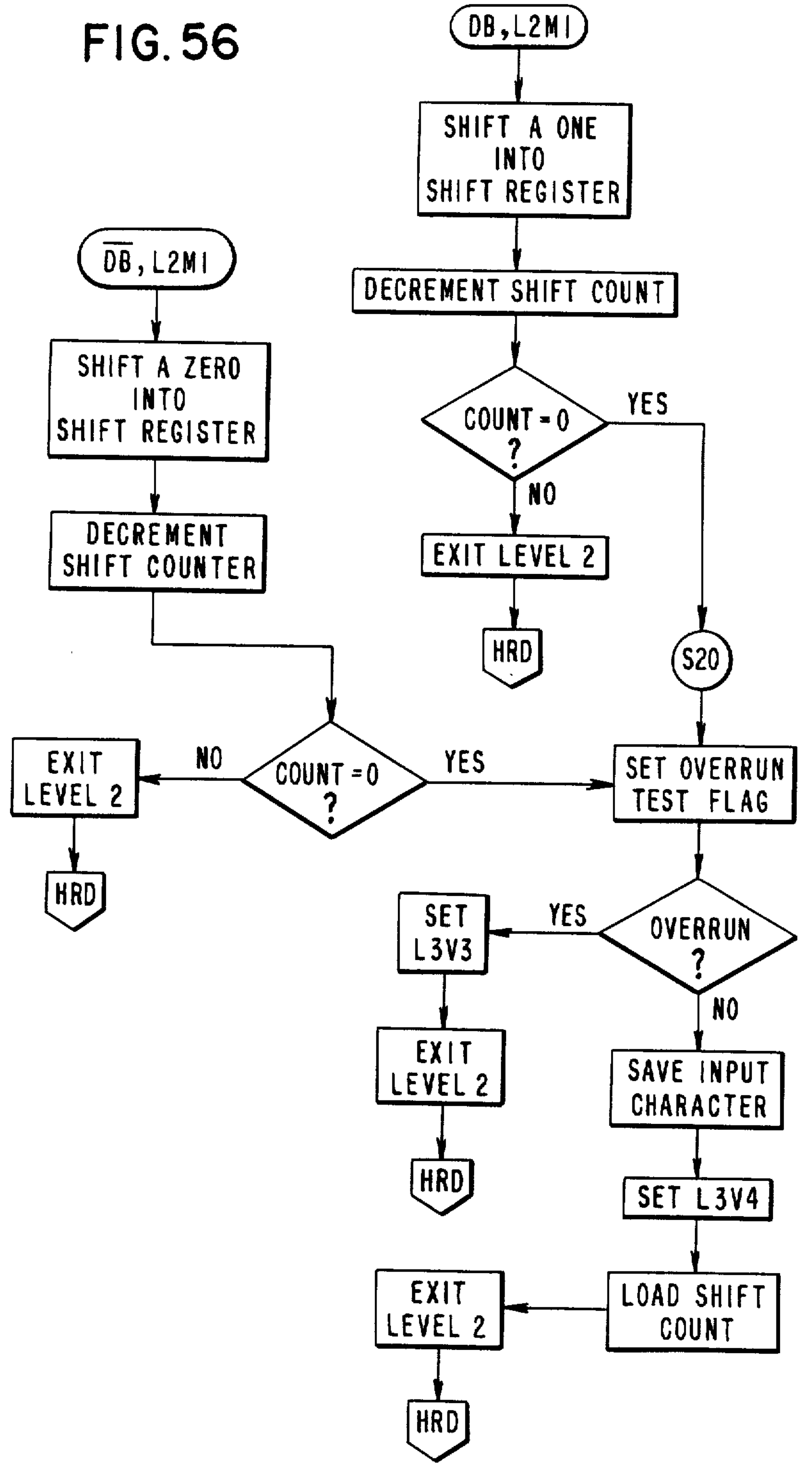
Figure 58:
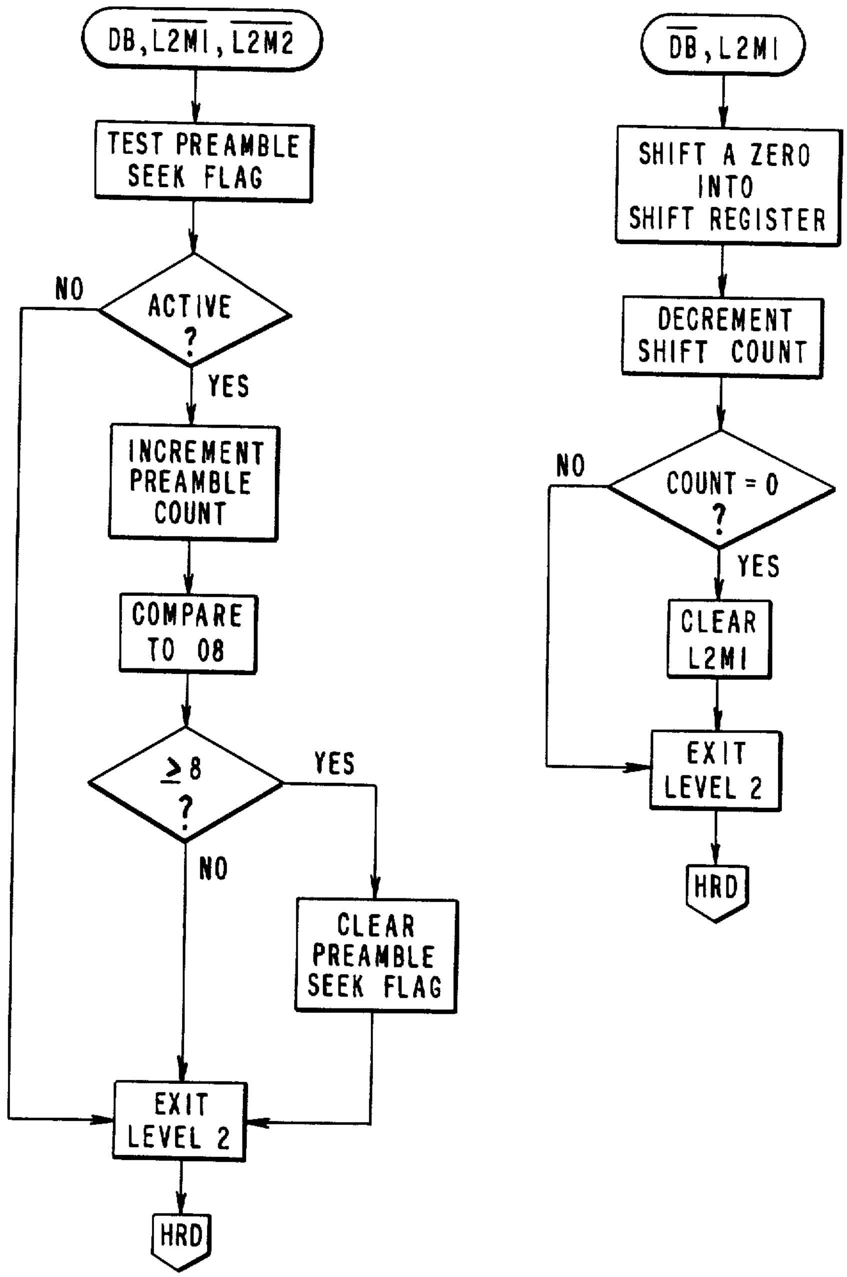
Figure 59:
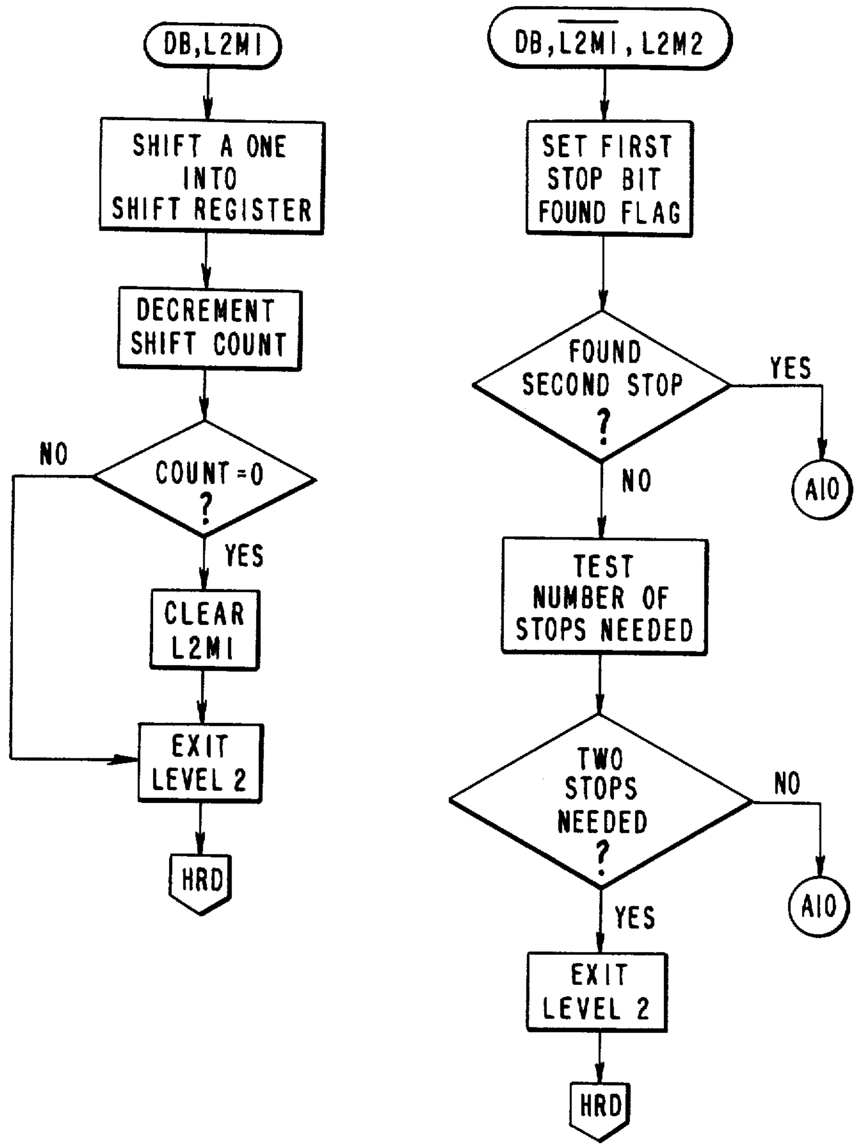
Figure 60:
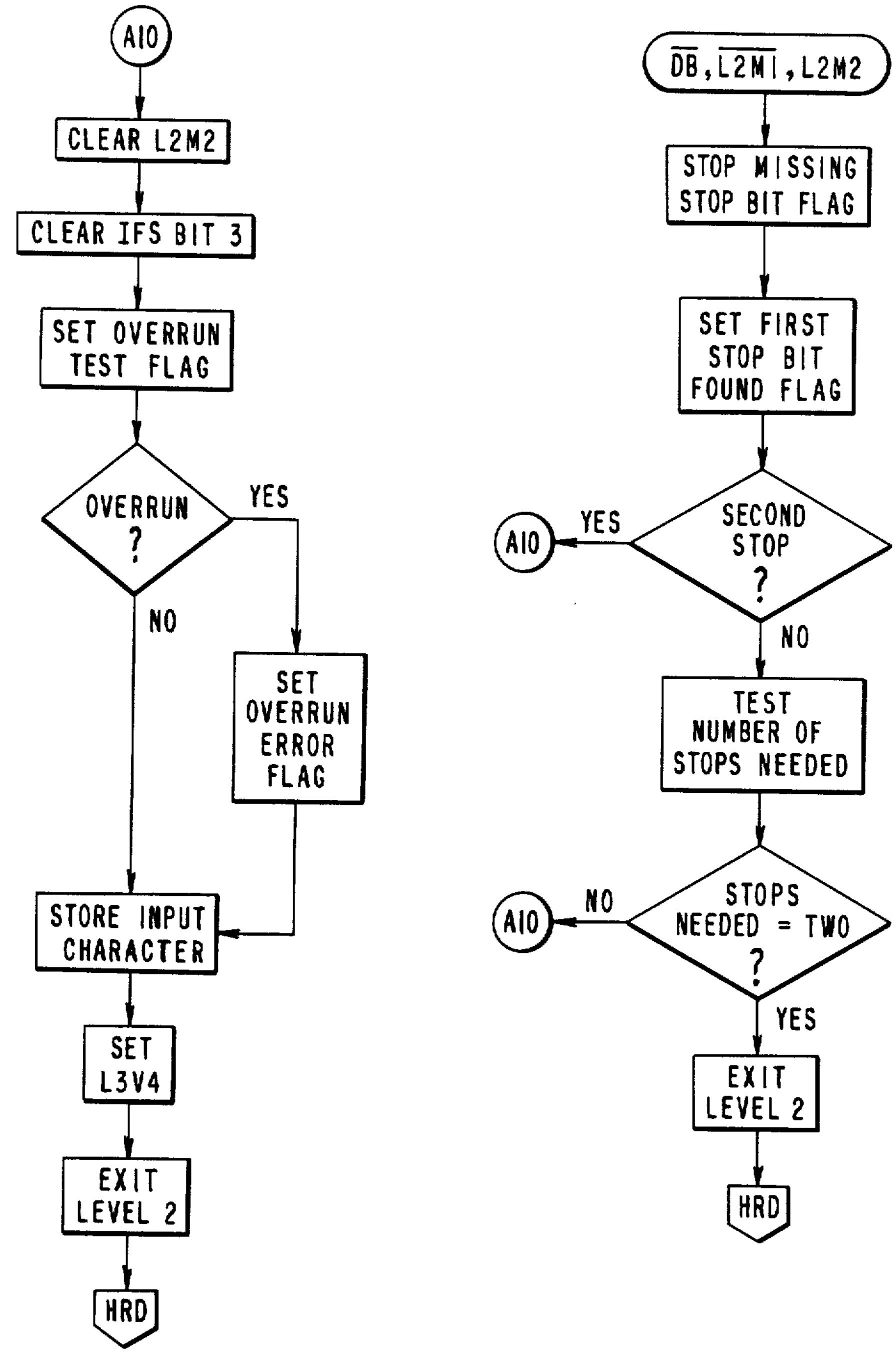
Figure 61:
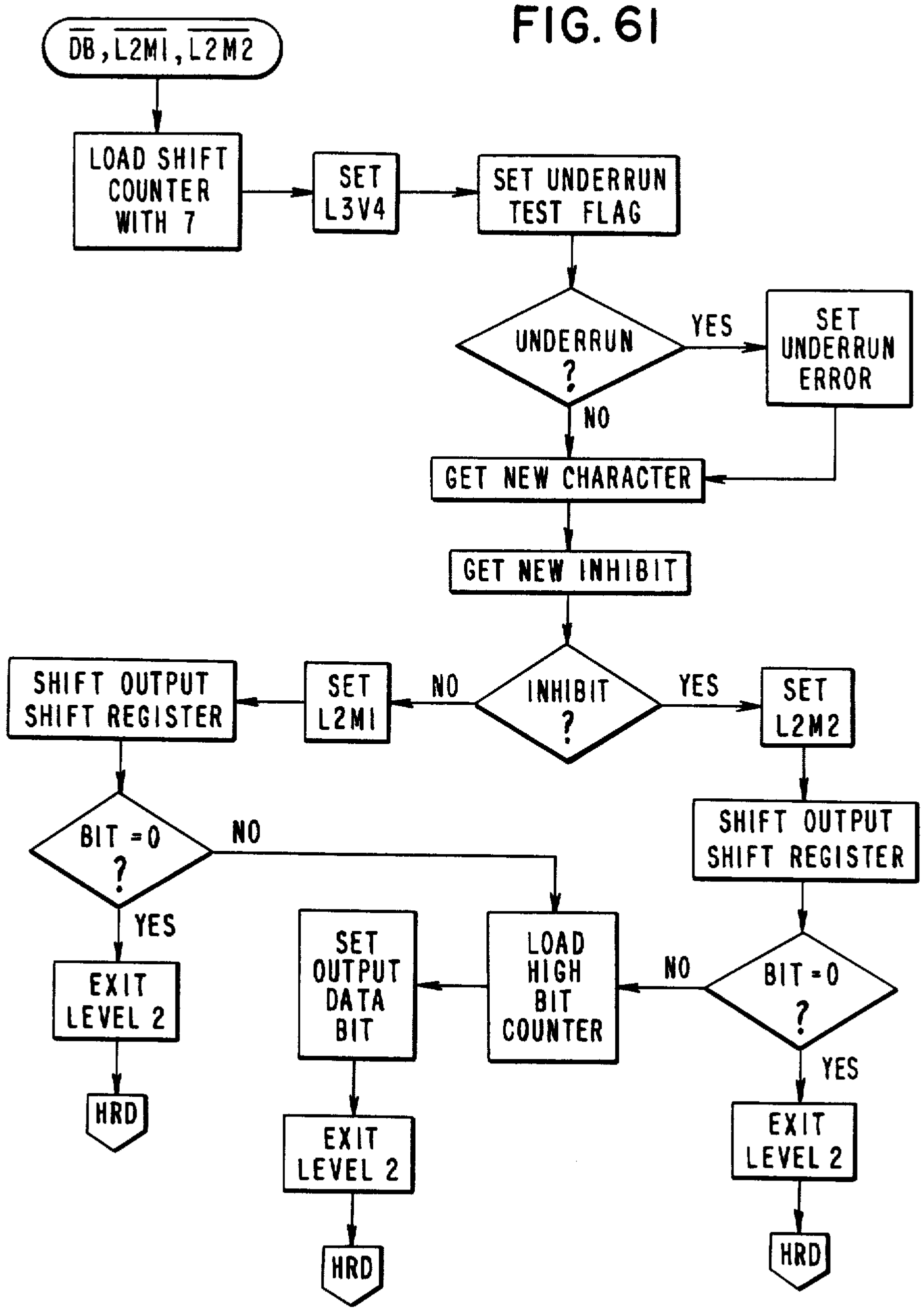
Figure 62:
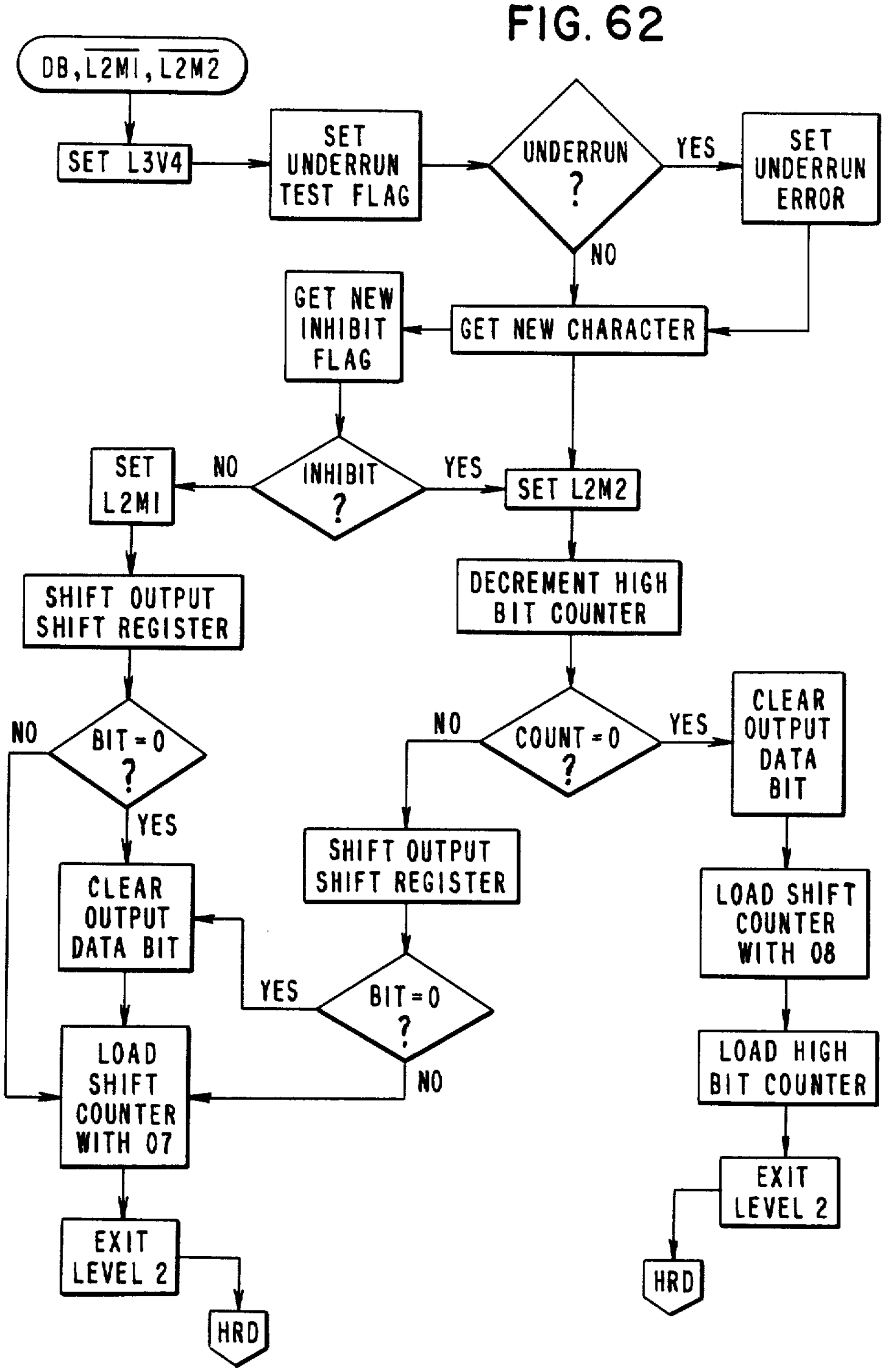
Figure 63:
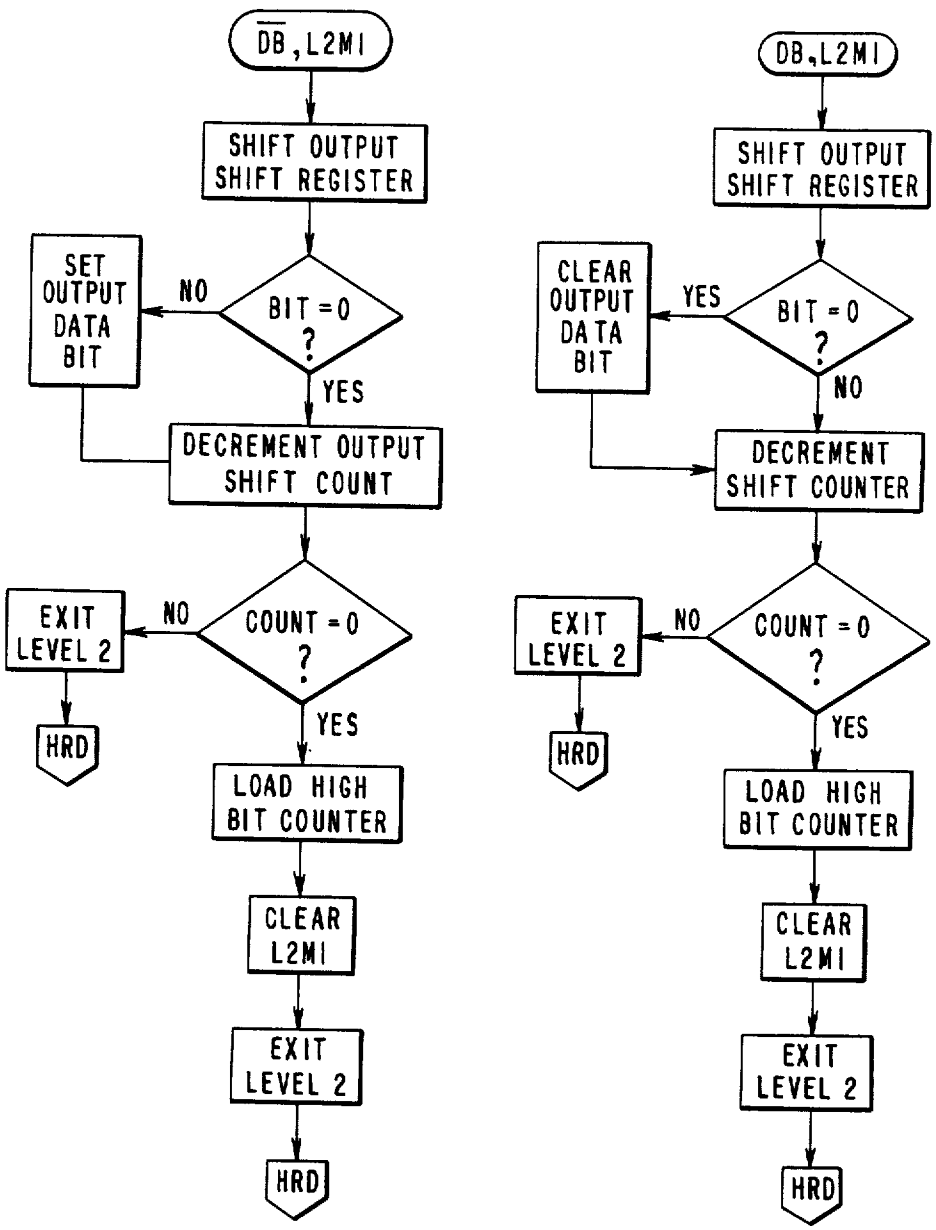
Figure 64:
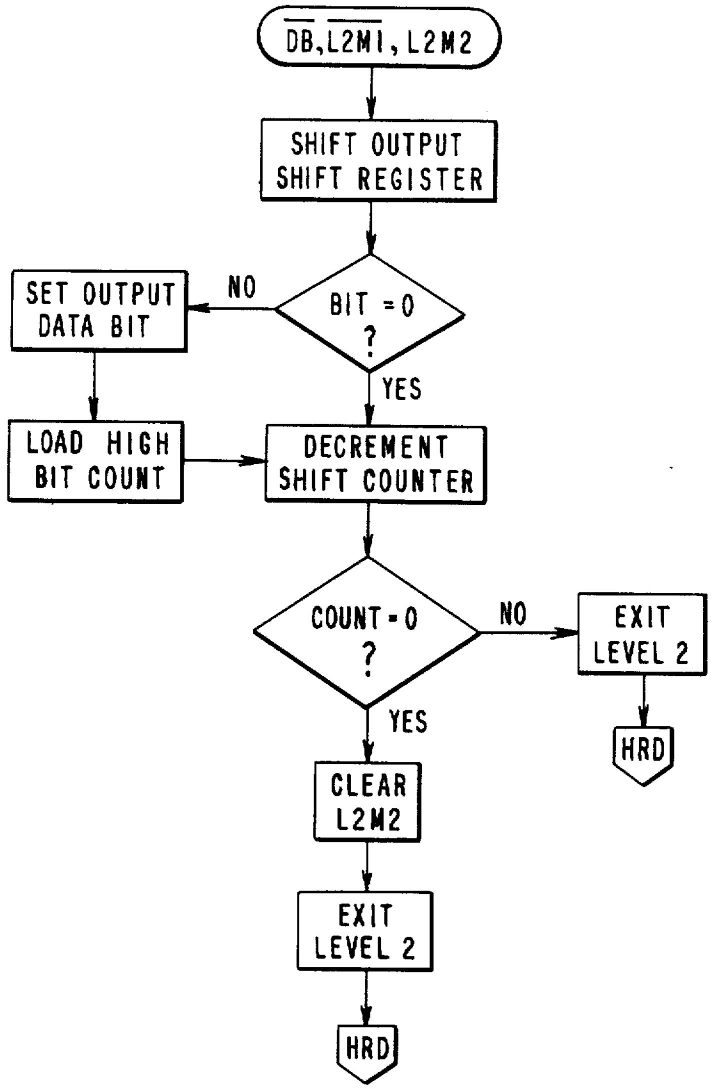
Figure 65:
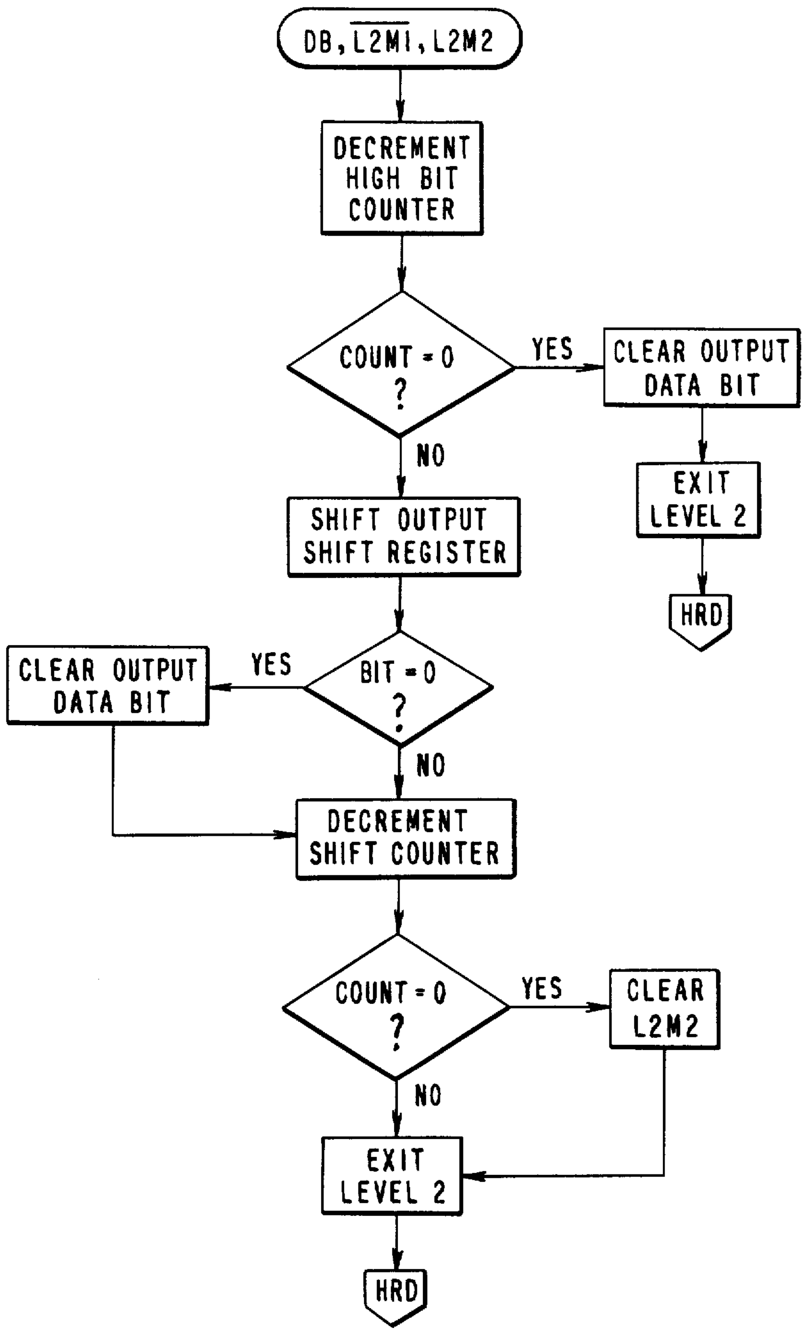
Figure 66:
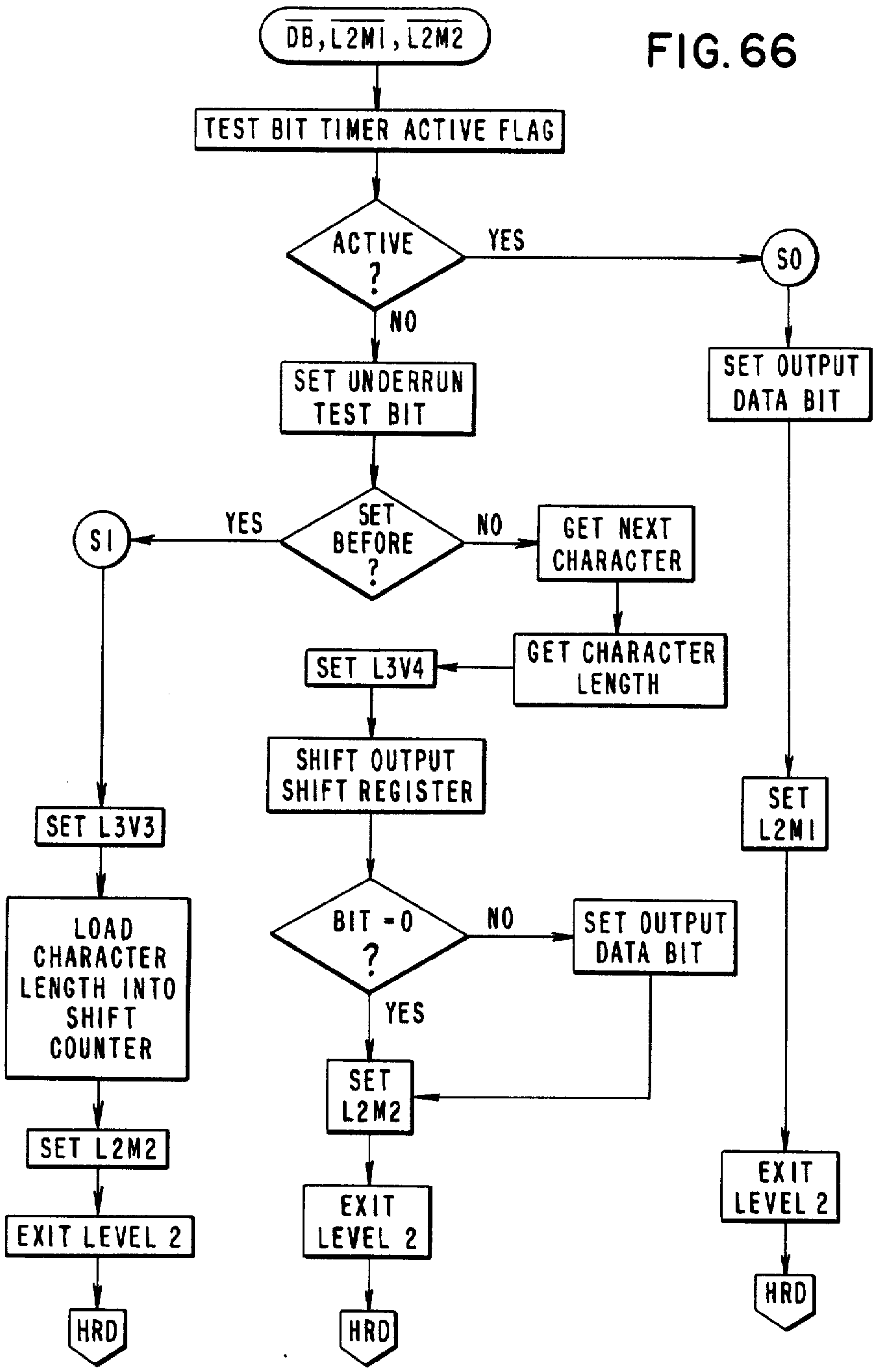
Figure 67:
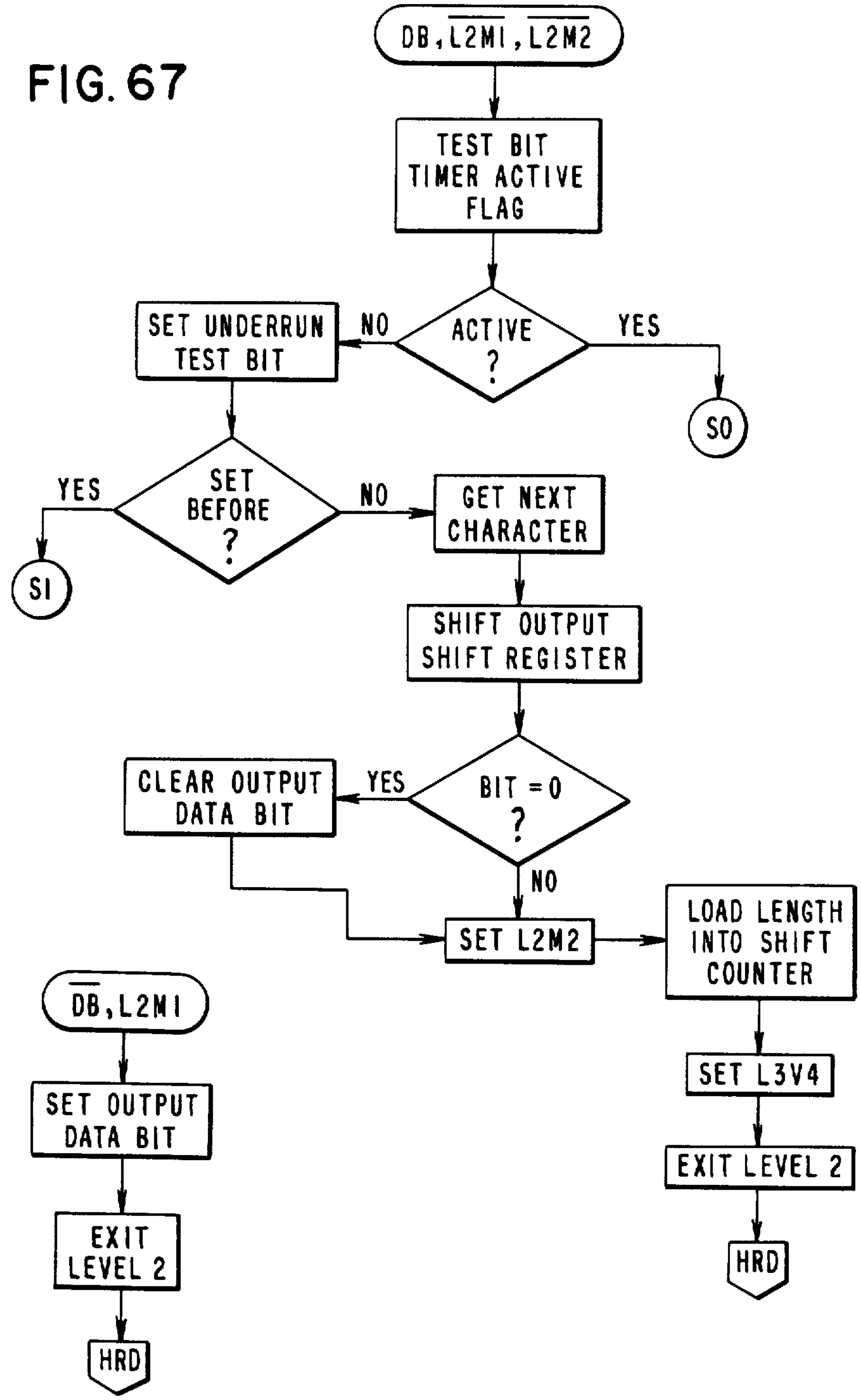
Figure 68:
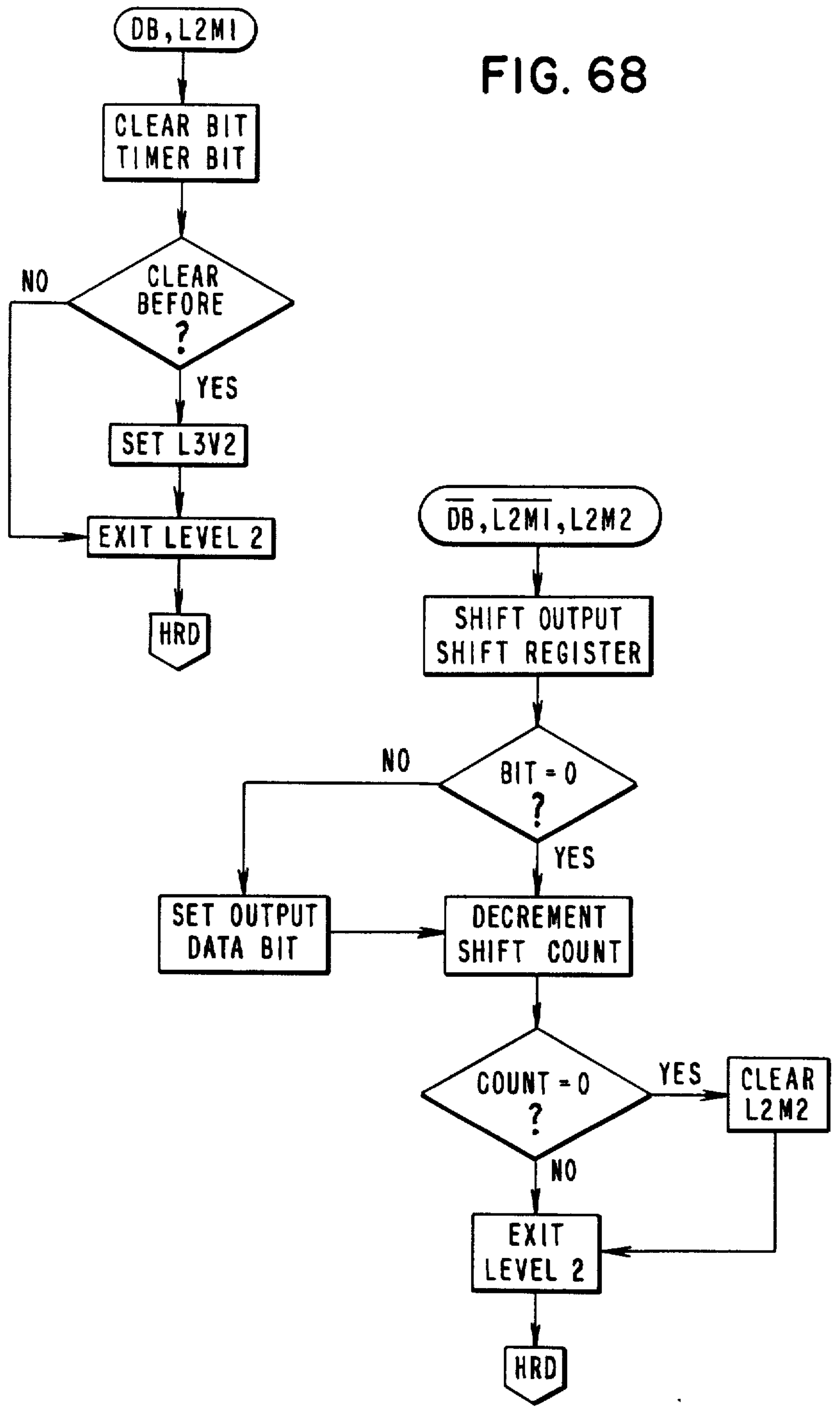
Figure 69:
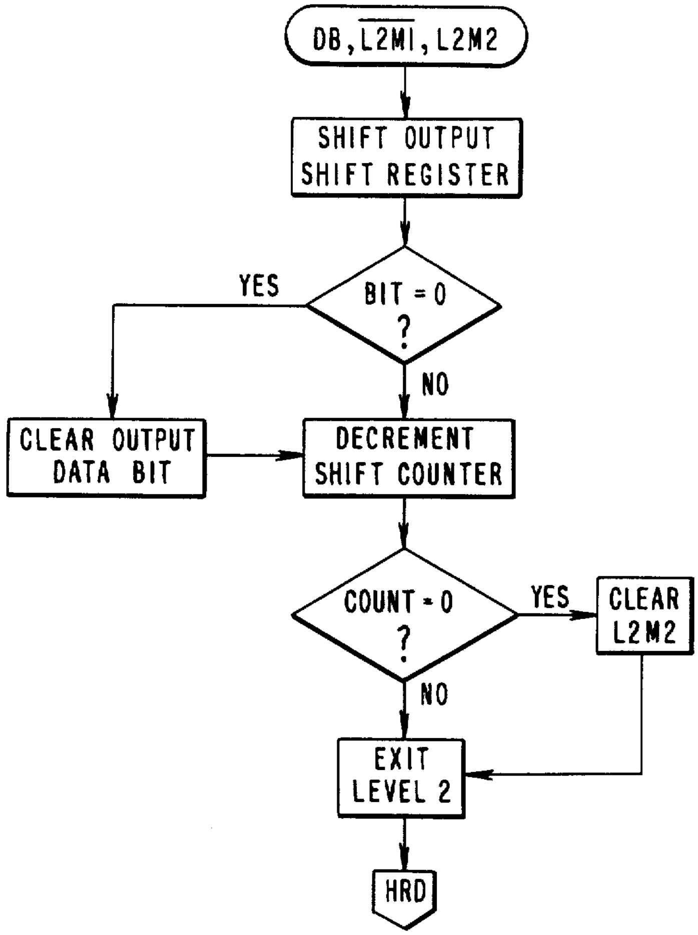
Figure 70:
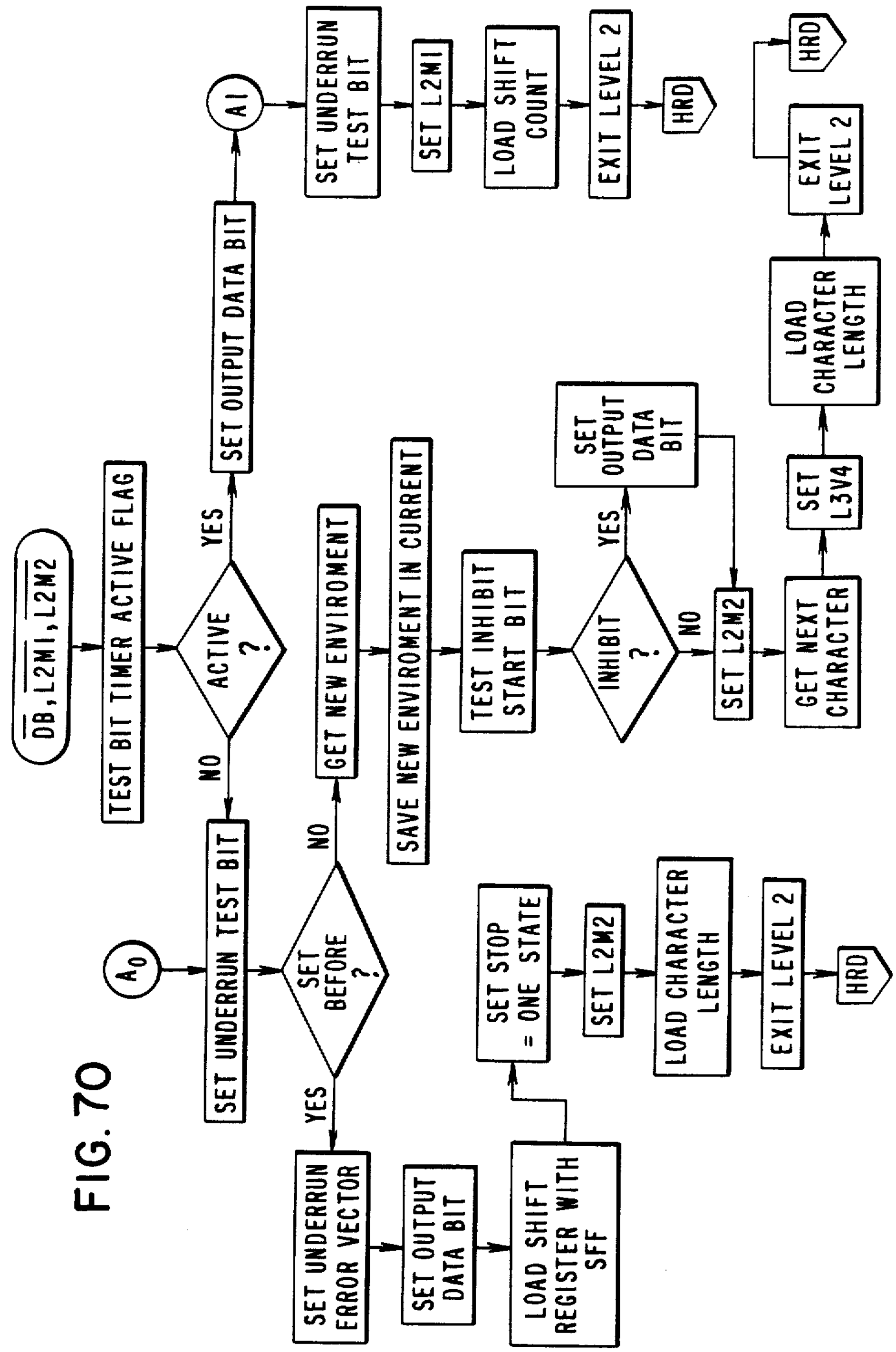
Figure 71:
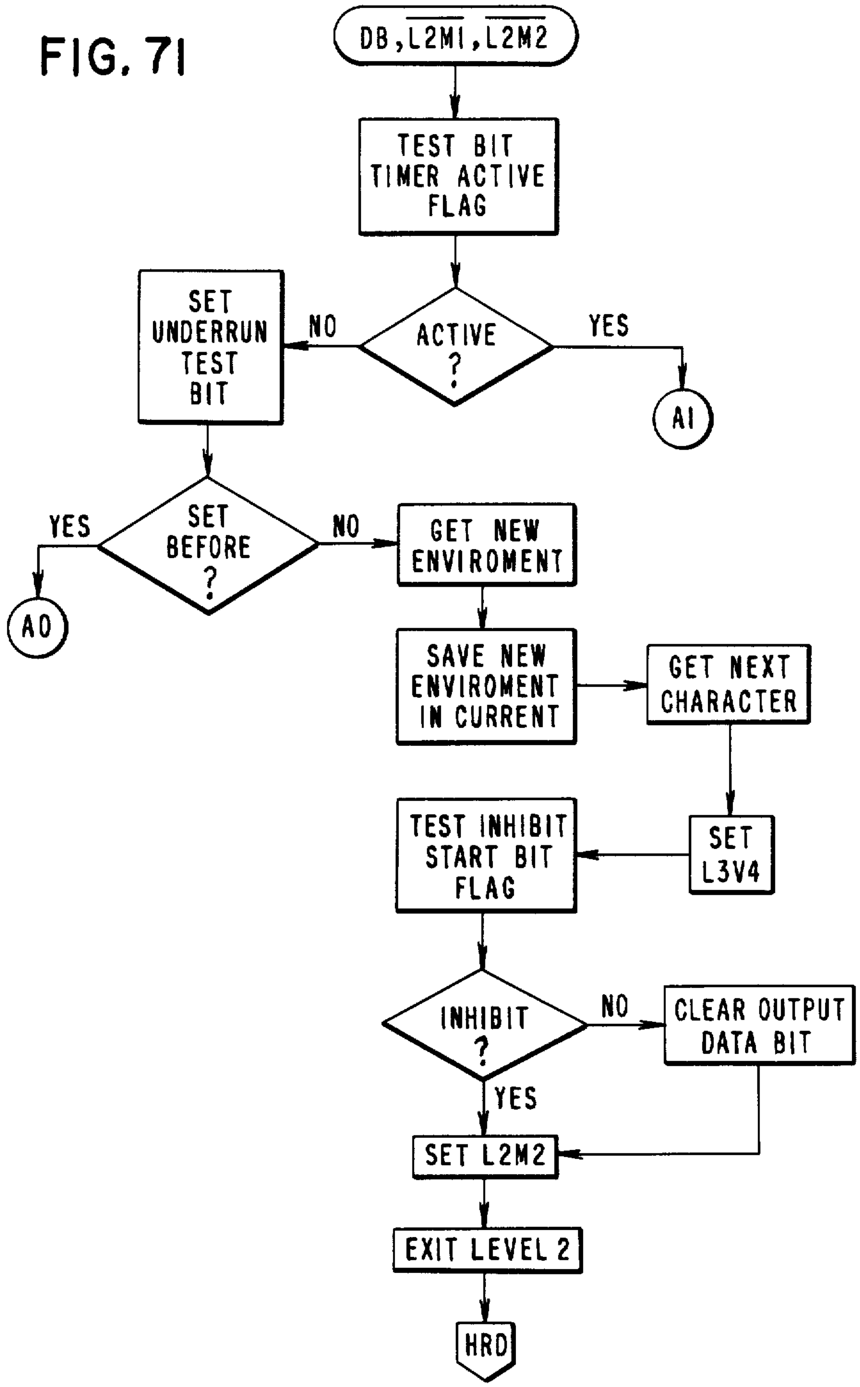
Figure 72:
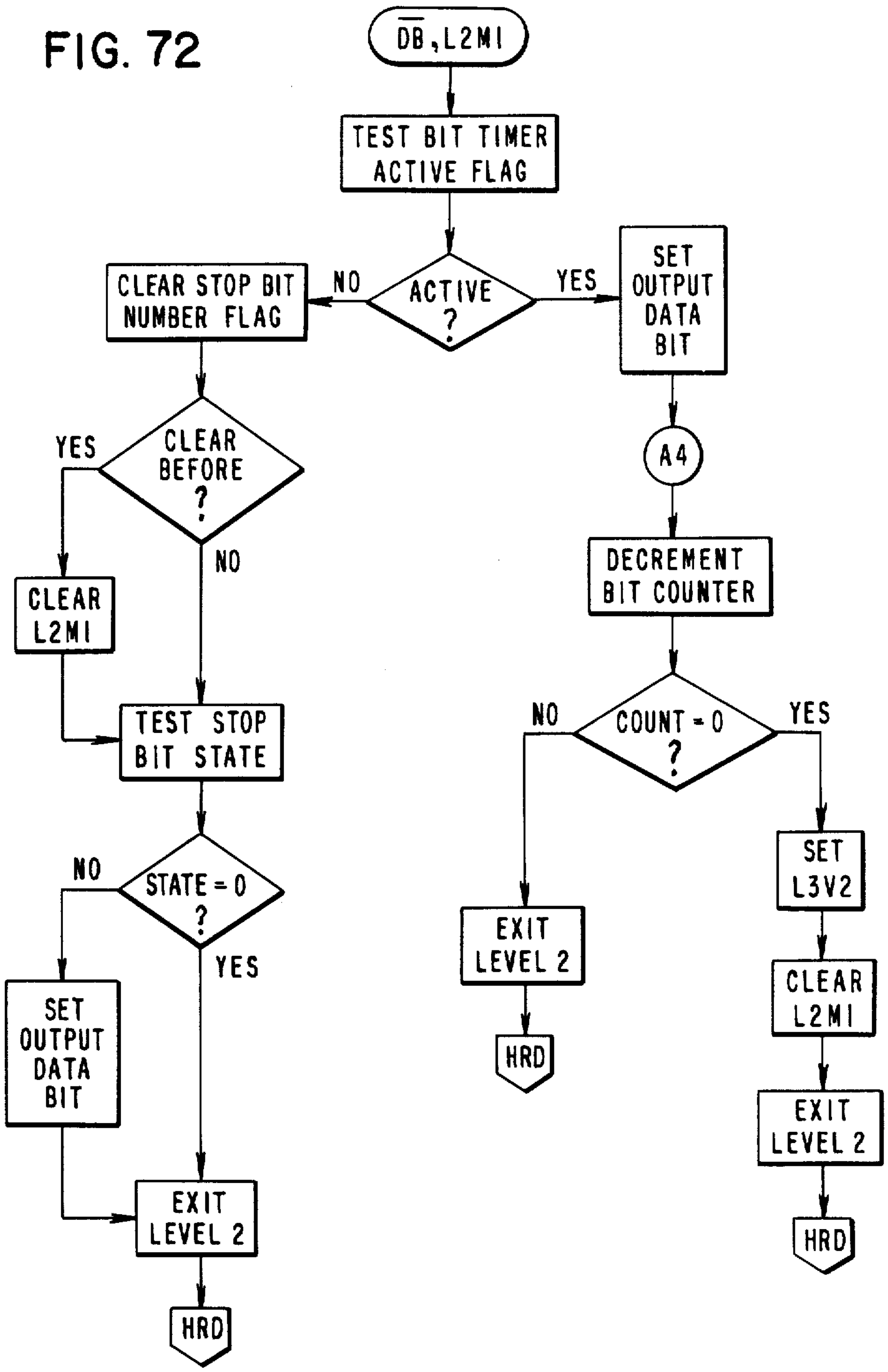
Figure 73:
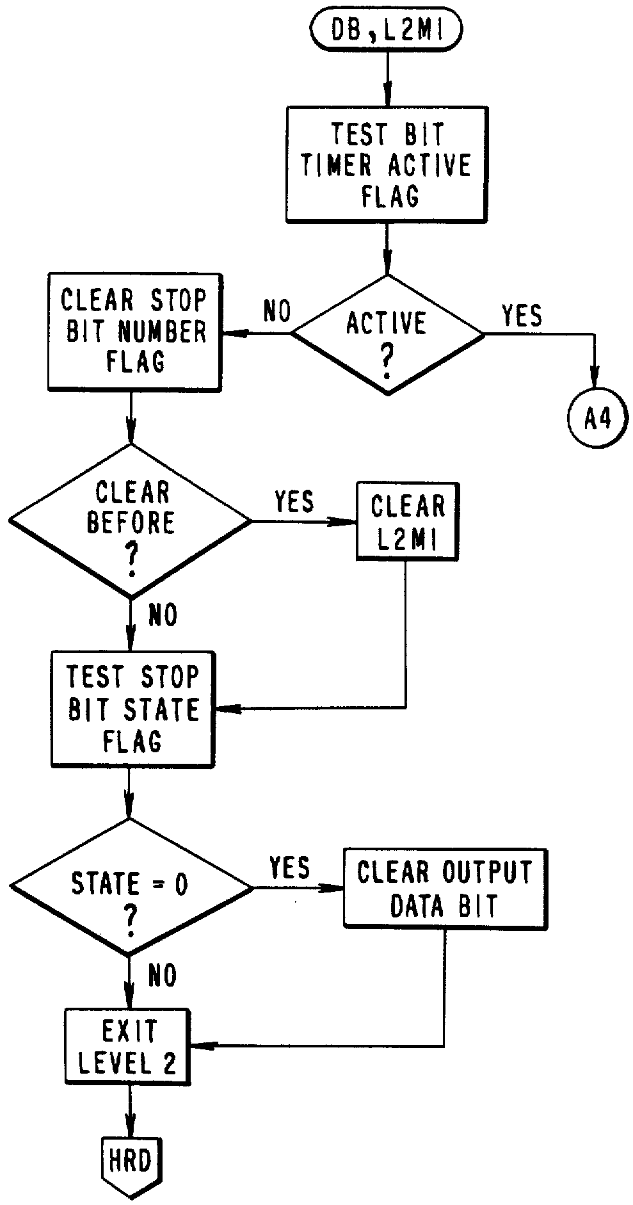
Figure 74:
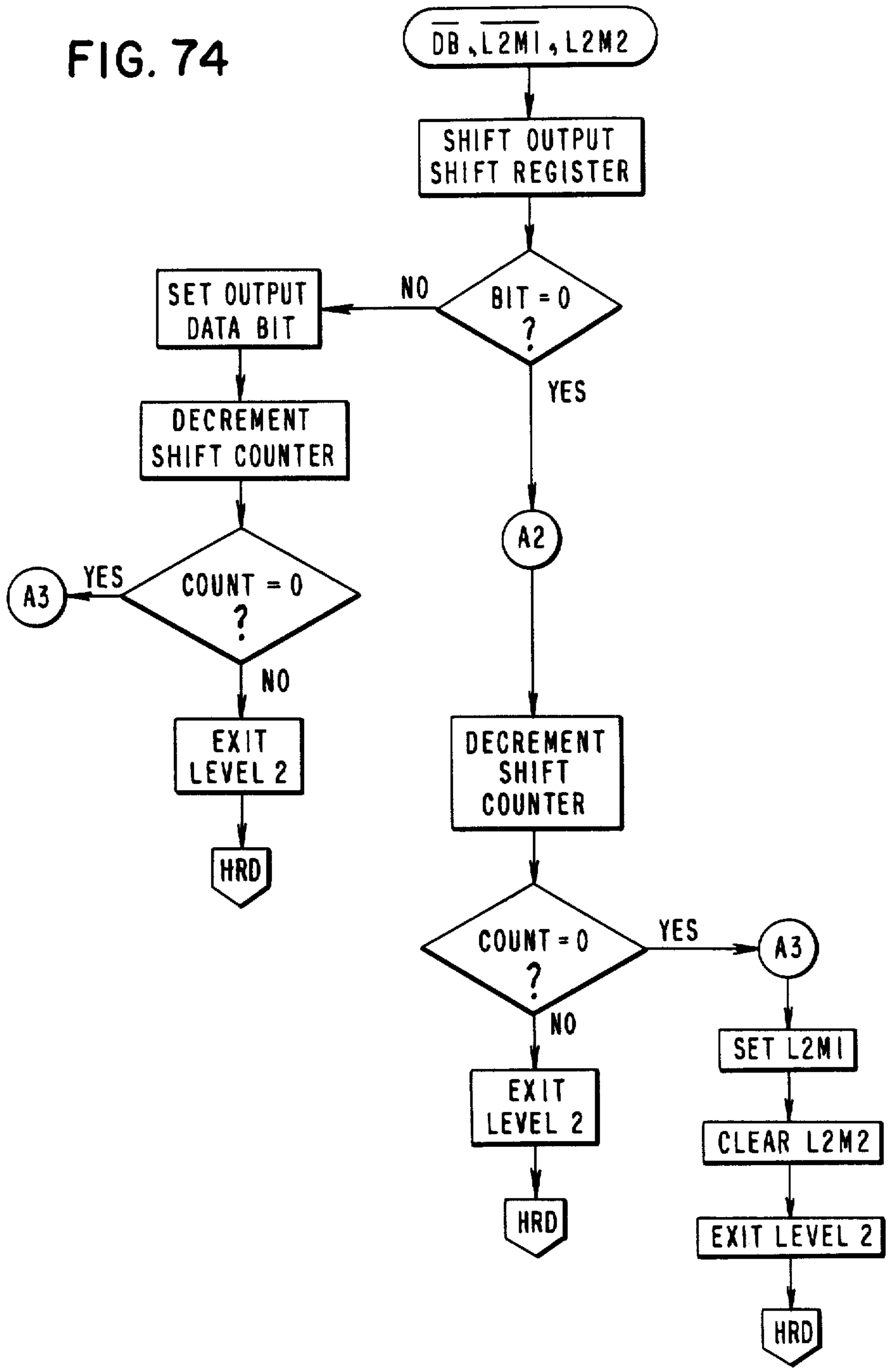
Figure 75:
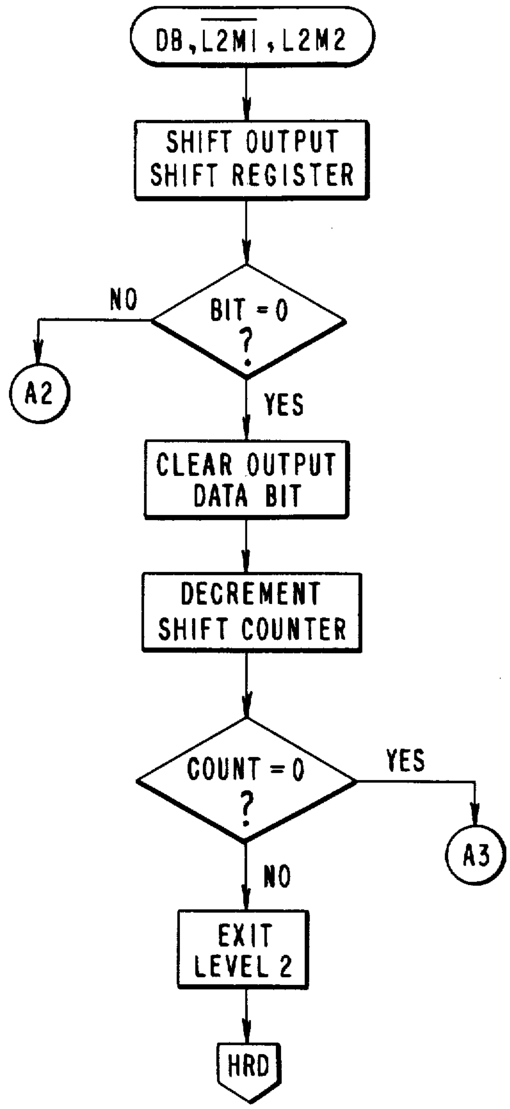

The CPIF transfers data to the front-end processor in a byte serial mode, as illustrated in the timing diagram of FIG. 49.

The CPIF chip 502 is comprised of an address latch 510, address detection logic 520, a timing chain 530, a request FIFO 540, a 64×8 dual port RAM 550, and a utility register 560. Additionally, there is provided an I/O transfer sequencer 570, an inbound interface register 580, an outbound interface register 590, and a flag RAM 595. A number of inverters and tri-state devices bring signals into the chip from the numbered pins which numbers correspond to the chip pin numbers shown in FIG. 4E. Each of the aforementioned major blocks will be described and shown in detail in the remainder of the specification.

Address Latch 510 and Address Detection Logic 520

Figure 38:
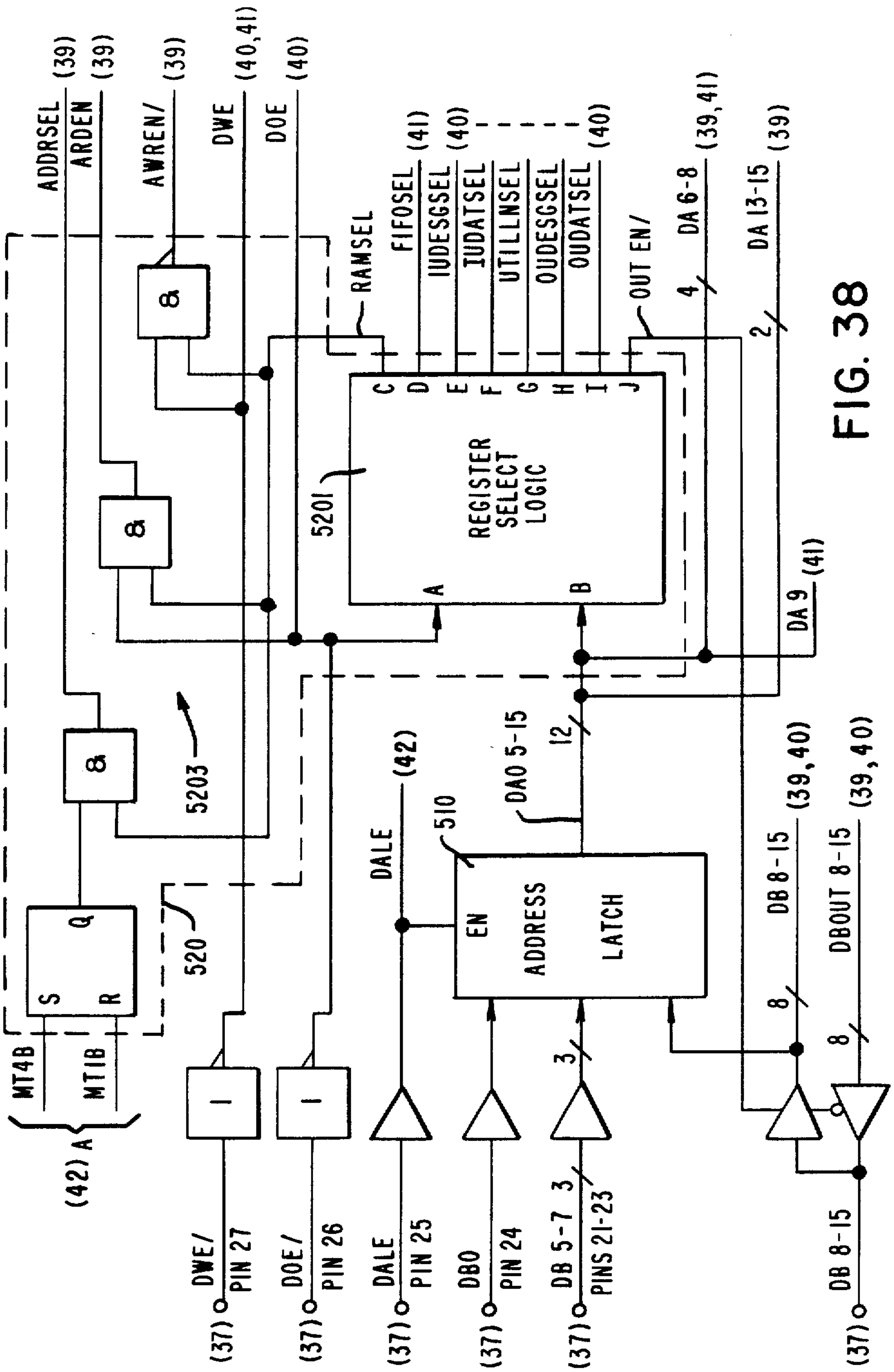
FIG. 38 illustrates, in schematic form, the address latch 510 used in the CPIF of FIGS. 37A-37D.

Referring to FIG. 38 wherein is shown the address latch 510 and the address detection logic 520. The address latch 510 receives the signal DB0 and the signals DB5-7 to comprise four of its input bits and from a tri-state device the signals DB8-15 to provide data output addresses DA0, 5-15 upon receipt of an enabling signal DALE. The data address signals are sent to a register select logic 5201 which is a component part of the address detection logic 520 outlined with dotted lines.

The input signals, and output signals in Boolean logic equation form for the register select logic 5201 are as follows:

| Inputs to 5201 | |
|---|---|
| Port Letter | Name |
| A | DOE |
| B | DA0, 5-15 |

Register Select Logic 5201 Boolean Logic Expressions

RAMSEL = DA0 · DA5/ · DA10 · DA11/ · DA12/

FIFOSEL = DA0 · DA5/ · DA10 · DA11/ · DA12 · DA13/ · DA14/ · DA15/

IUDESGSEL = DA0 · DA5 · DA6/ · DA7 · DA8/ · DA9/ · DA10/ · DA11/ · DA12/ · DA13/ · DA14/ · DA15

IUDATSEL = DA0 · DA5 · DA6/ · DA7 · DA8/ · DA9/ · DA10/ · DA11/ · DA12/ · DA13/ · DA14/ · DA15/

UTILLNSEL = DA0 · DA5 · DA6/ · DA7 · DA8/ · DA9/ · DA10/ · DA11/ · DA12/ · DA13 · DA14/ · DA15/

OUDESGSEL = DA0 · DA5 · DA6/ · DA7 · DA8/ · DA9/ · DA10/ · DA11/ · DA12/ · DA13/ · DA14 · DA15

OUDATSEL = DA0 · DA5 · DA6/ · DA7 · DA8/ · DA9/ · DA10/ · DA11/ · DA12/ · DA13/ · DA14 · DA15/

OUTEN/ = RAMSEL/ · IUDESGSEL/ · IUDATSEL/ · UTILNSEL/ · OUDESGSEL/ · OUDATSEL/ + DOE/

The register select logic 5201, in response to the data output enabling signal DOE/ and the addressbits received on its B input selects one or more of the registers by activating corresponding signals on its output. The RAM SEL signal is directed to a group of AND gates 5203 as an enabling signal. The gates operate in conjunction with a latch and clocking signals MT4B, MT1B, and the signal DWE/ to provide the output signals; ADDRSEL, ARDEN and AWREN. The output enable signal OUT EN/ from the register select logic 5201 is used to enable the tri-state devices connected to pins 12-19.

64×8 Dual Port RAM 550

Figure 39:
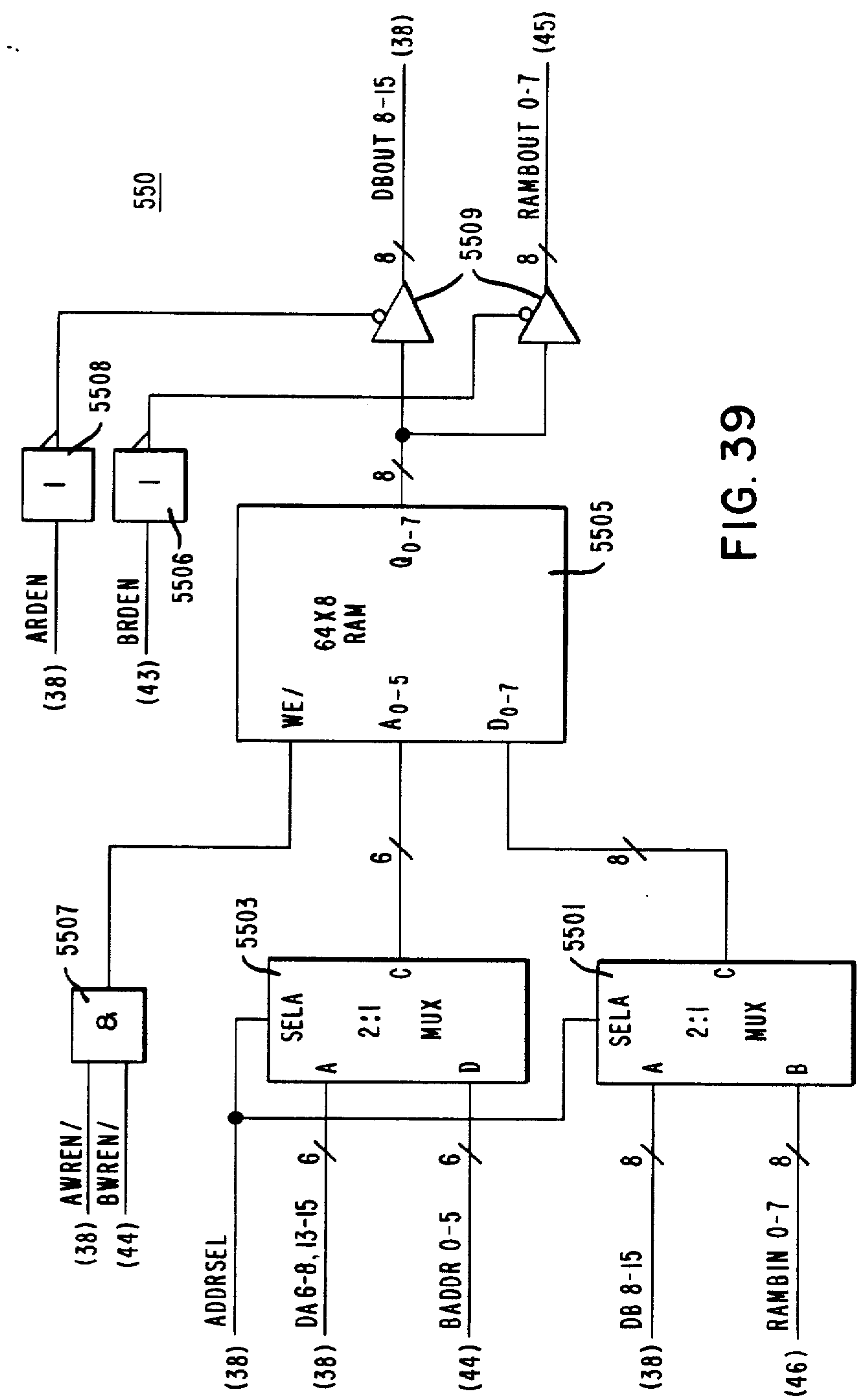
FIG. 39 illustrates, in schematic form, the $64\times 8$ dual port RAM used in the CPIF of FIGS. 37A-37D.

Referring to FIG. 39 wherein is disclosed the 64×8 dual port RAM 550. A pair of 2:1 multiplexers 5501 and 5503 receive on their A and B inputs the indicated eight and six bits, respectively. The signal ADDRSEL applied to the SEL A inputs of the multiplexers direct either the A or B signals onto the C labeled outputs and to the A0-5 addressing inputs of a 64×8 RAM 5505. The outputs of multiplexer 5501 are data bits which are directed to the D0-7 labeled inputs of the RAM 5505. The AND gate 5507 in response to the signals AWREN/ and BWREN/ provides a write enable signal to the RAM 5505. The 8-bit output signal is provided at Q0-7 and is directed to the input of a pair of tri-state devices 5509. The amplifiers are enabled by signals from AND gates 5506 and 5508 in accordance with the level of the signals indicated on their respective inputs.

Utility Registers 560

Figures 40, 40A:
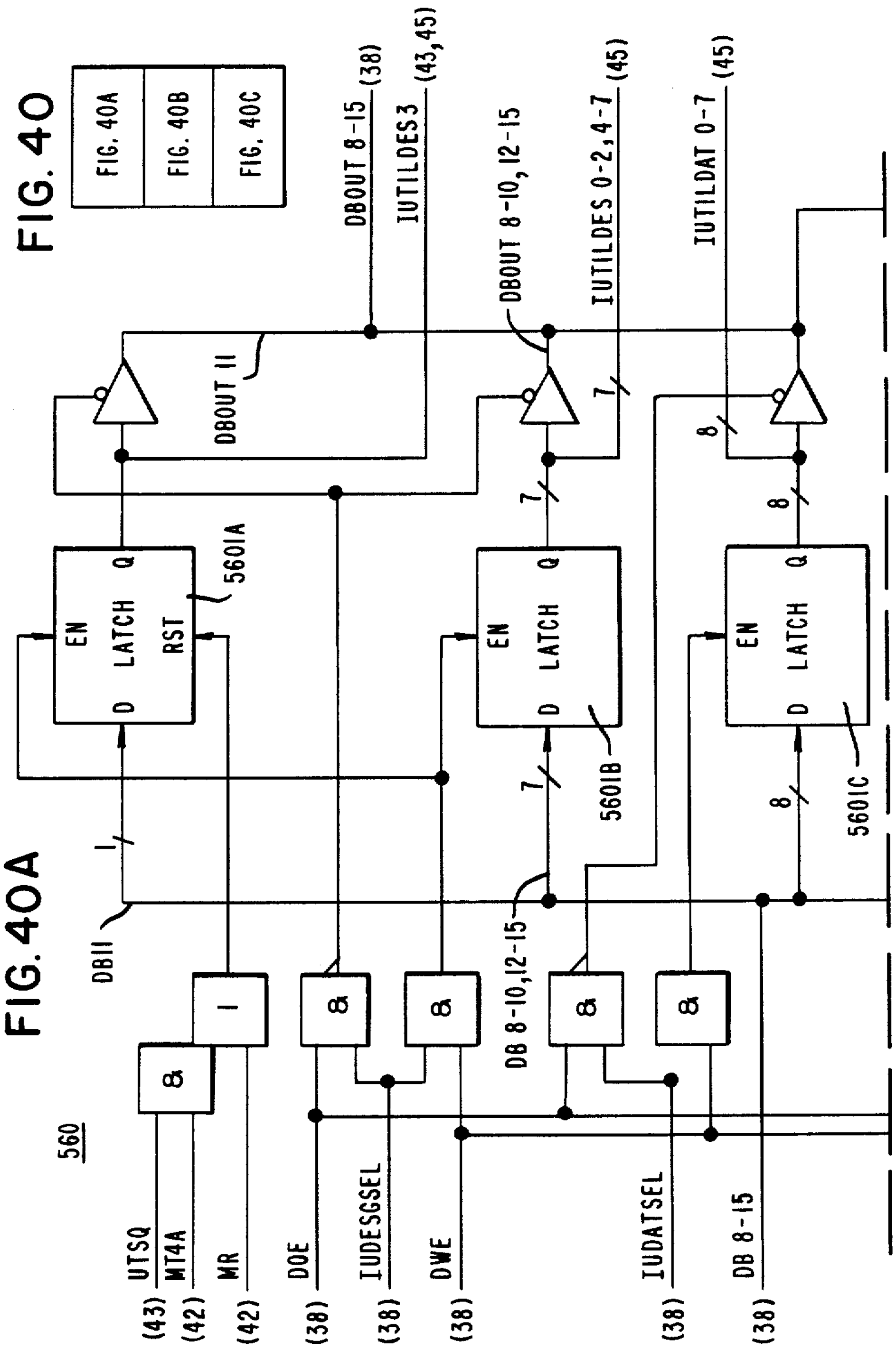
FIGS. 40A-40C, assembled in accordance with the map of FIG. 40, illustrate, in schematic form, the utility registers used in the CPIF of FIGS. 37A-37D.
Figure 40B:
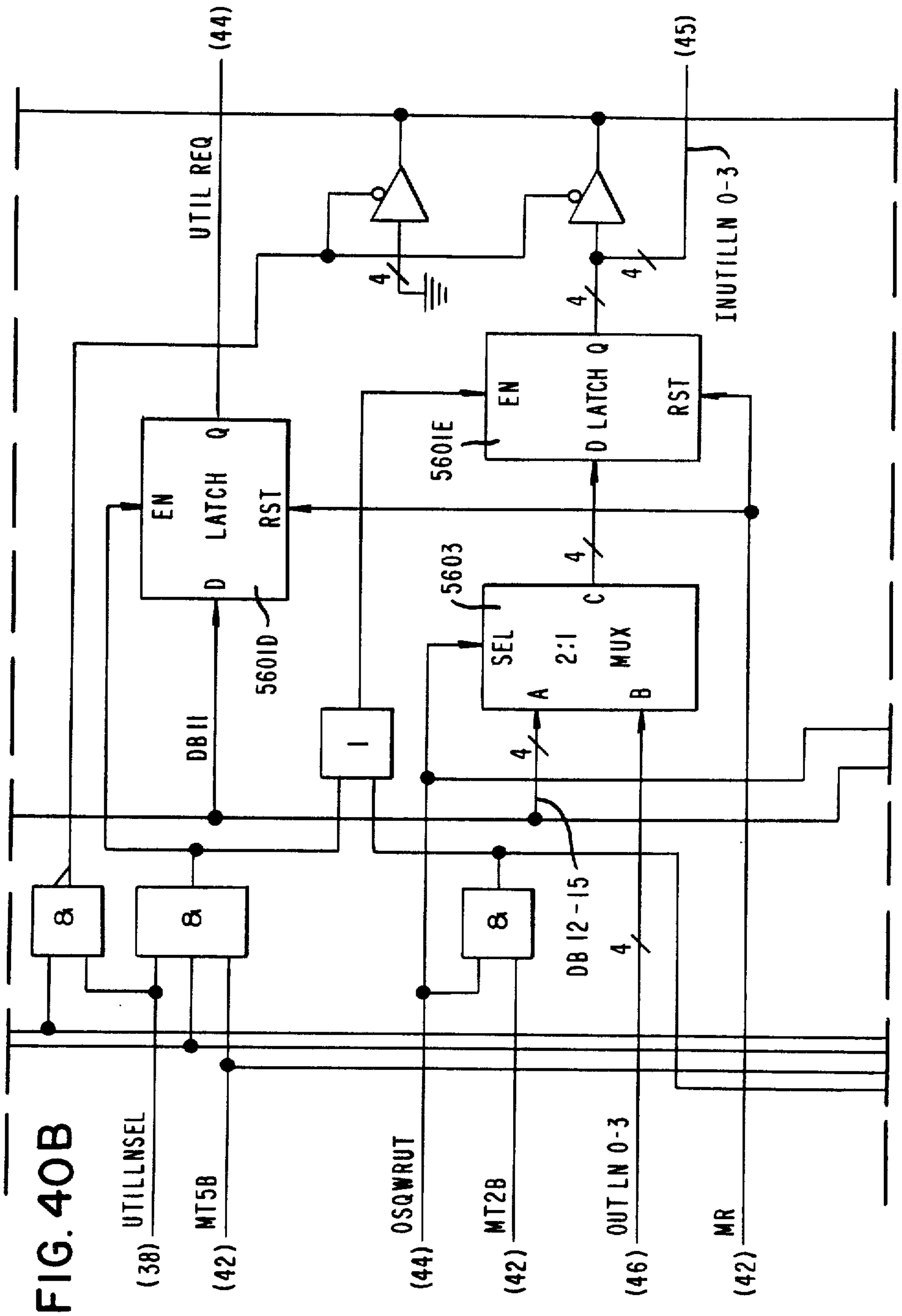
Figure 40C:
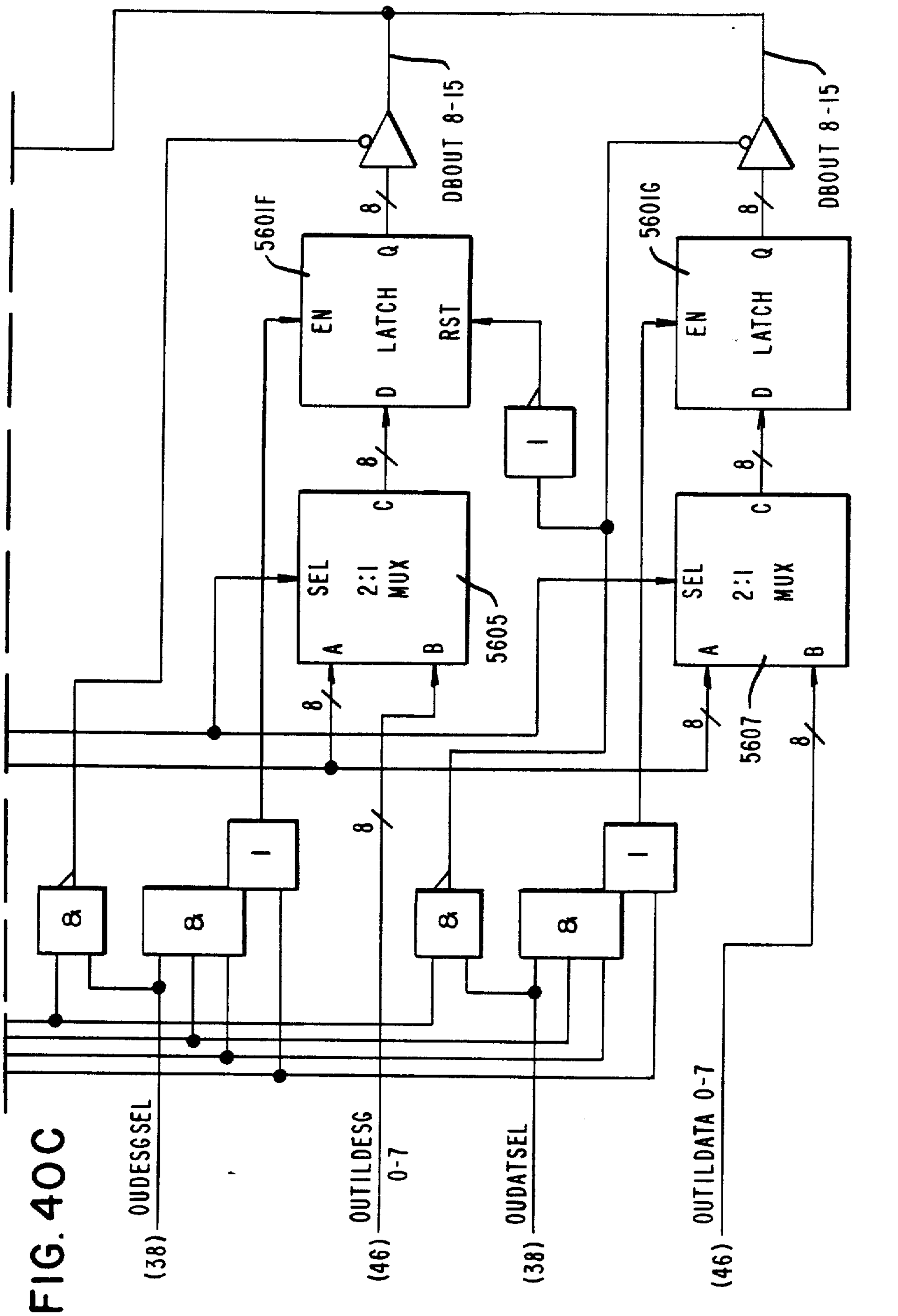

Referring to FIGS. 40A-40C assembled in accordance with the map of FIG. 40 wherein the utility registers 560 are shown comprised basically of a group of latches 5601A-5601G for receiving on their inputs the data bits 8-15, either directly or through multiplexing circuits 5603, 5605 and 5607. Various combinations of logic gates operate upon the input signals to provide the latch enabling and reset function signals EN and RST and to select the inputs to the multiplexers. The output signals of these latches are transferred to the data bus by enablement of a plurality of tri-state devices.

Request FIFO 540

Figure 41A:
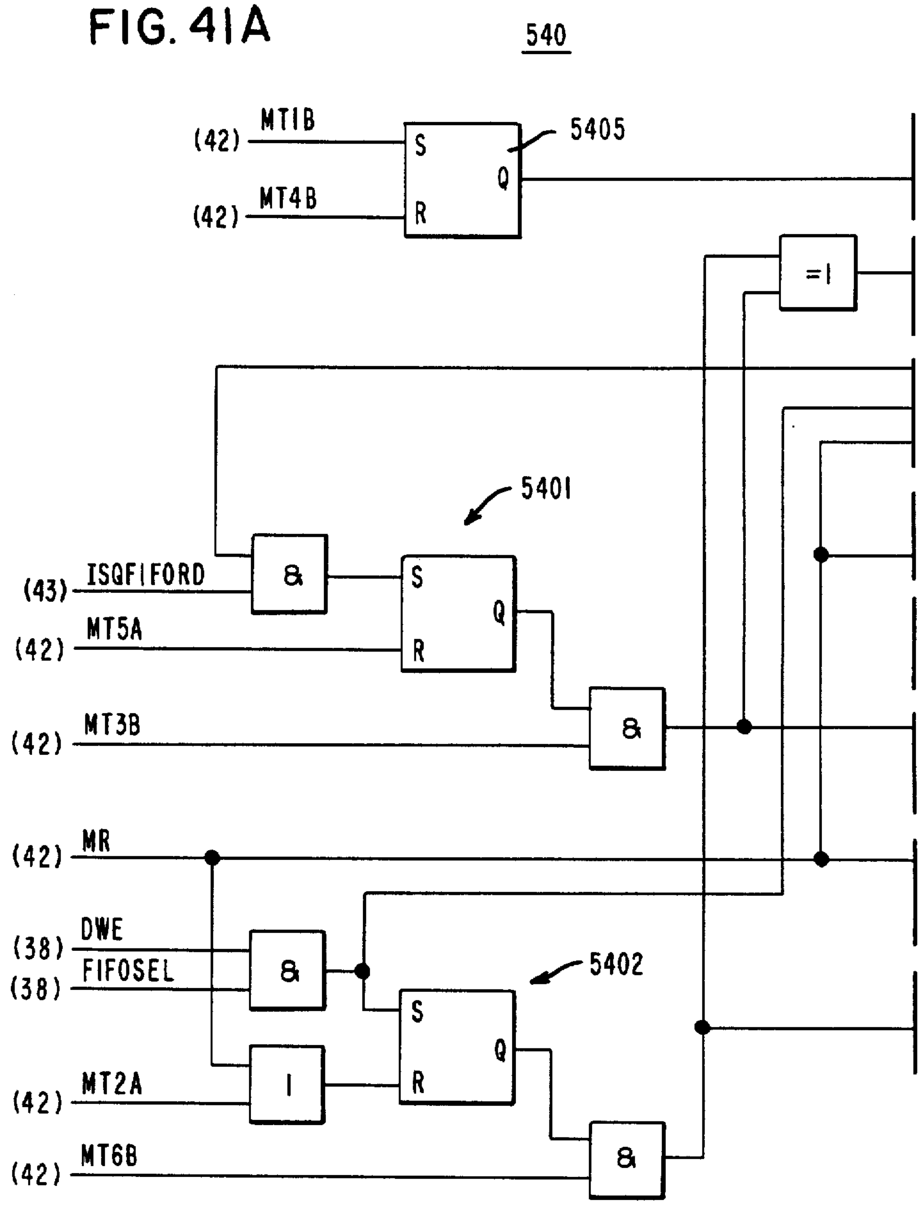
FIGS. 41A and 41B illustrate, in schematic form, the request FIFO used in the CPIF of FIGS. 37A-37D.
Figure 41B:
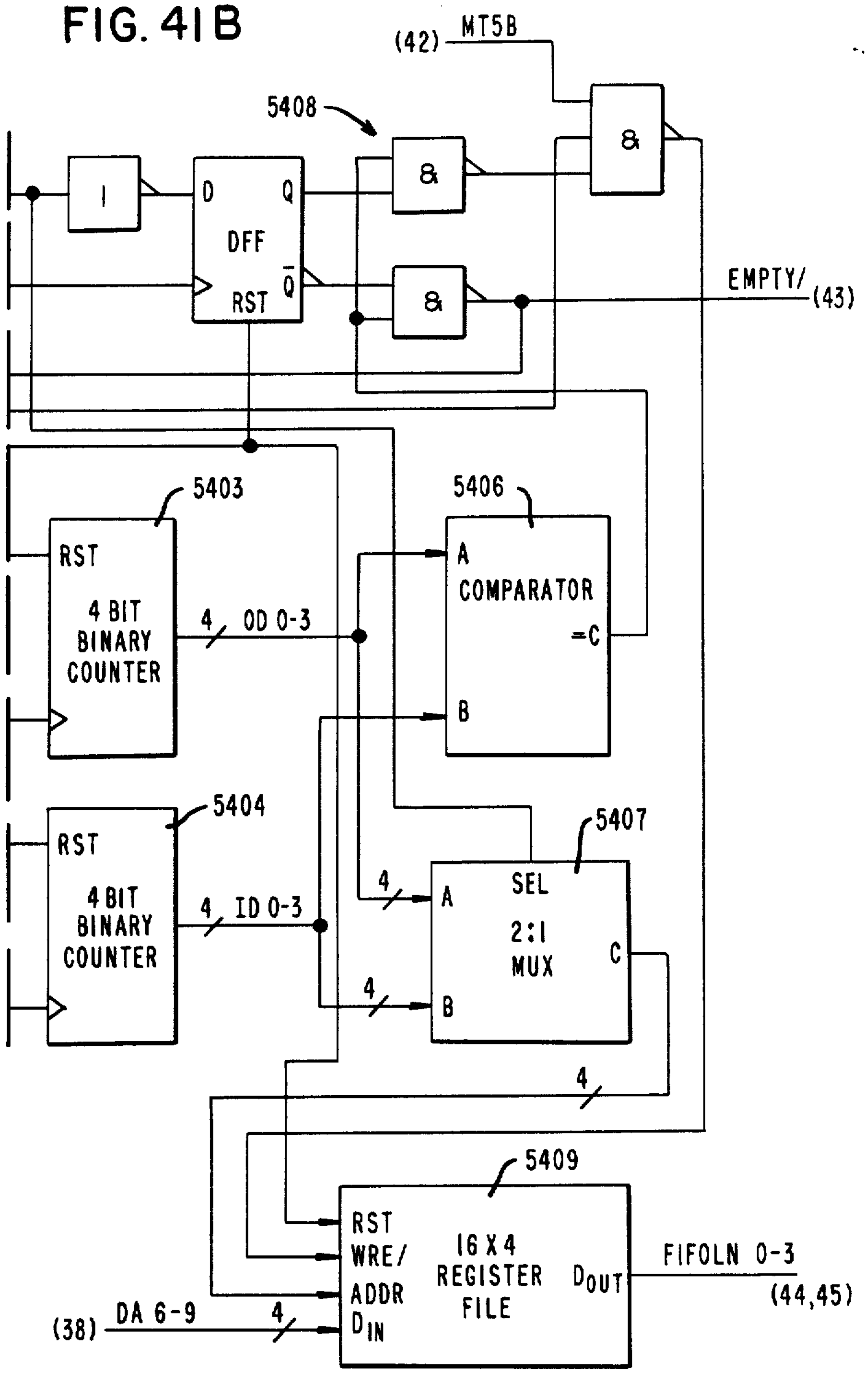

Referring now to FIGS. 41A and 41B wherein is disclosed the logic circuits for the request FIFO 540. The central component of the request FIFO is a 16×4 register file 5409 which receives on its Din input the signals DA 6-9 and under the control of signals ADDR, WRE/ and RST provide at its output, in the sequential order received, the signal FIFO LN0-3. The address signal is received from the C output of a 2:1 multiplexer 5407 which under control of the signal on its SEL input selects as addresses the bits OD0-3 or the bits ID0-3 from the 4-bit binary counters 5403 and 5404, respectively. The SEL signal is derived from the state of a latch 5405. Logic circuitry 5401 provides bits to the counter 5403 while the logic circuitry 5402 provides bits to the counter 5404. The signal MR is used to reset both counters.

A comparator 5406 receives the output signals from the 4-bit counters and upon receiving an equal count provides at its output, labeled C, an enabling signal to a group of AND gates 5408. The output signal from one of the AND gates is the signal EMPTY/ which indicates whether the register file is empty or not. The output signal from the other AND gate is directed to a NAND gate along with the signal MT5B and the ANDed signals DWE and FIFOSEL to form the signal WRE/ applied to the register file 5409.

Timing Chain 530

Figure 42:
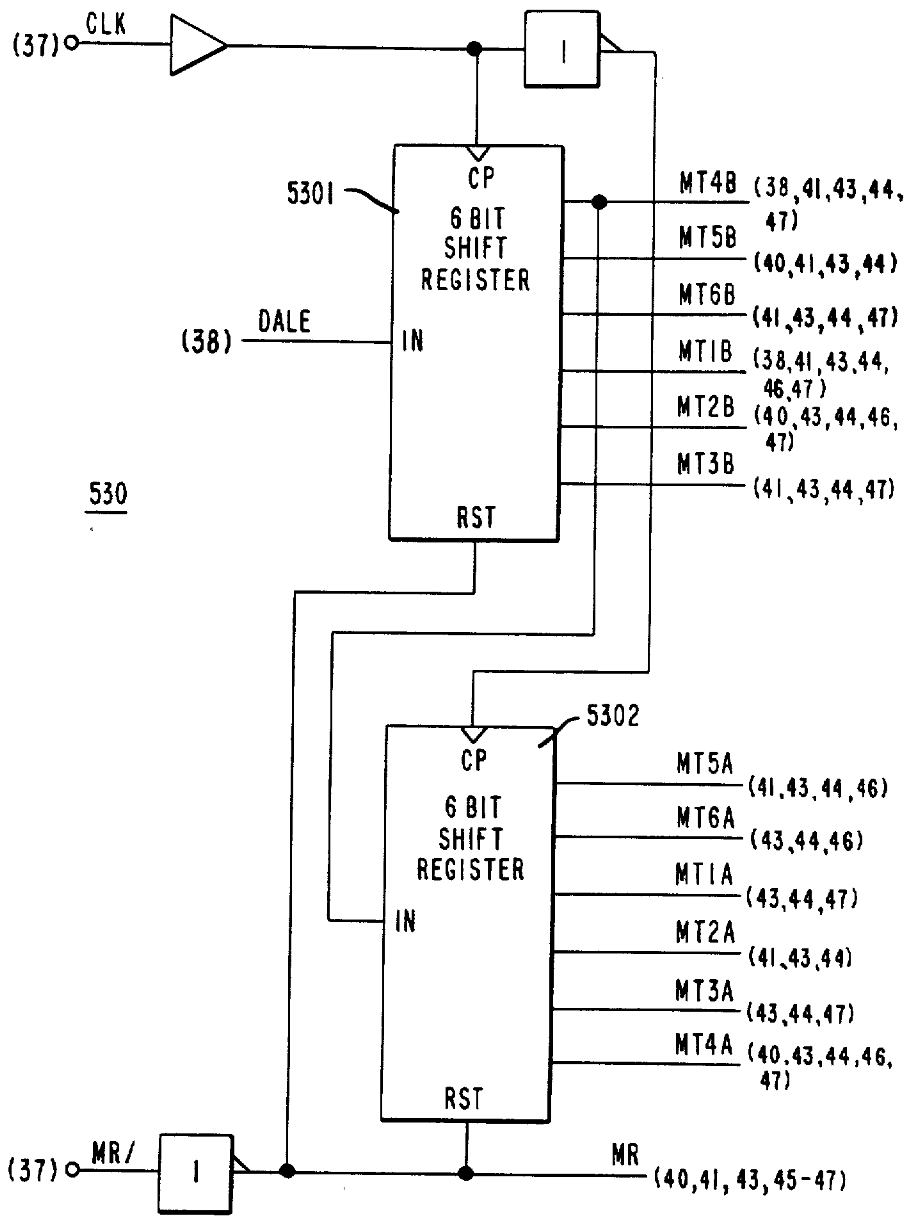
FIG. 42 illustrates, in schematic form, the timing chain used in the CPIF of FIGS. 37A-37D.

FIG. 42 is a logic block diagram of the timing chain 530 shown comprised of two 6-bit shift registers 5301 and 5302 for generating the clocking signals MT1B-MT6B and MT1A-MT6A. The basic clocking signal CLK is received on pin 11 and is directed via an amplifier to the CP inputs to the registers 5301 and 5302.

I/O Transfer Sequencer 570

Figure 43A:
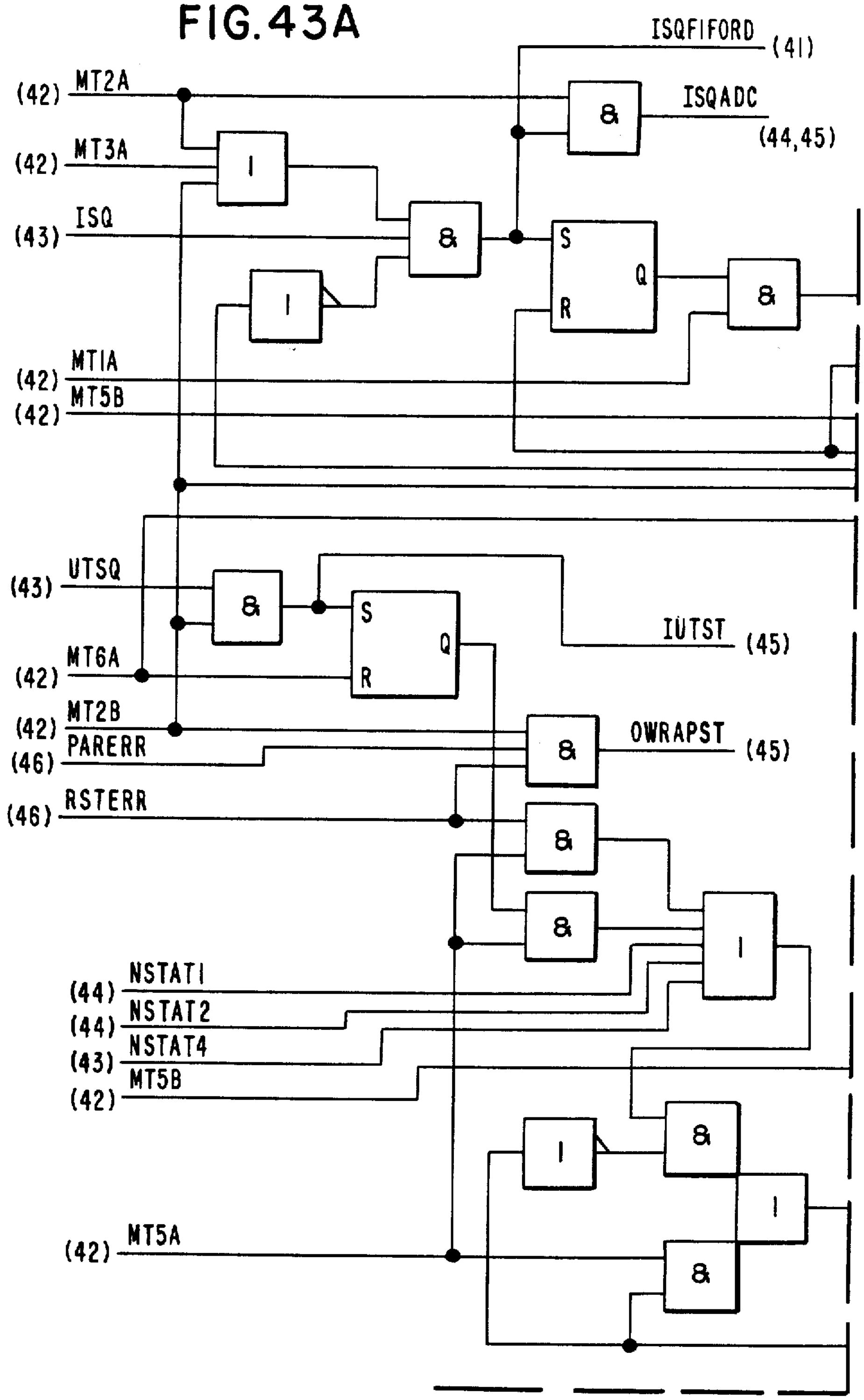
FIGS. 43A-43E, assembled in accordance with the map of FIG. 43 illustrate, in schematic form, a first portion of the I/O sequencer used in the CPIF of FIGS. 37A-37D.
Figure 43B:
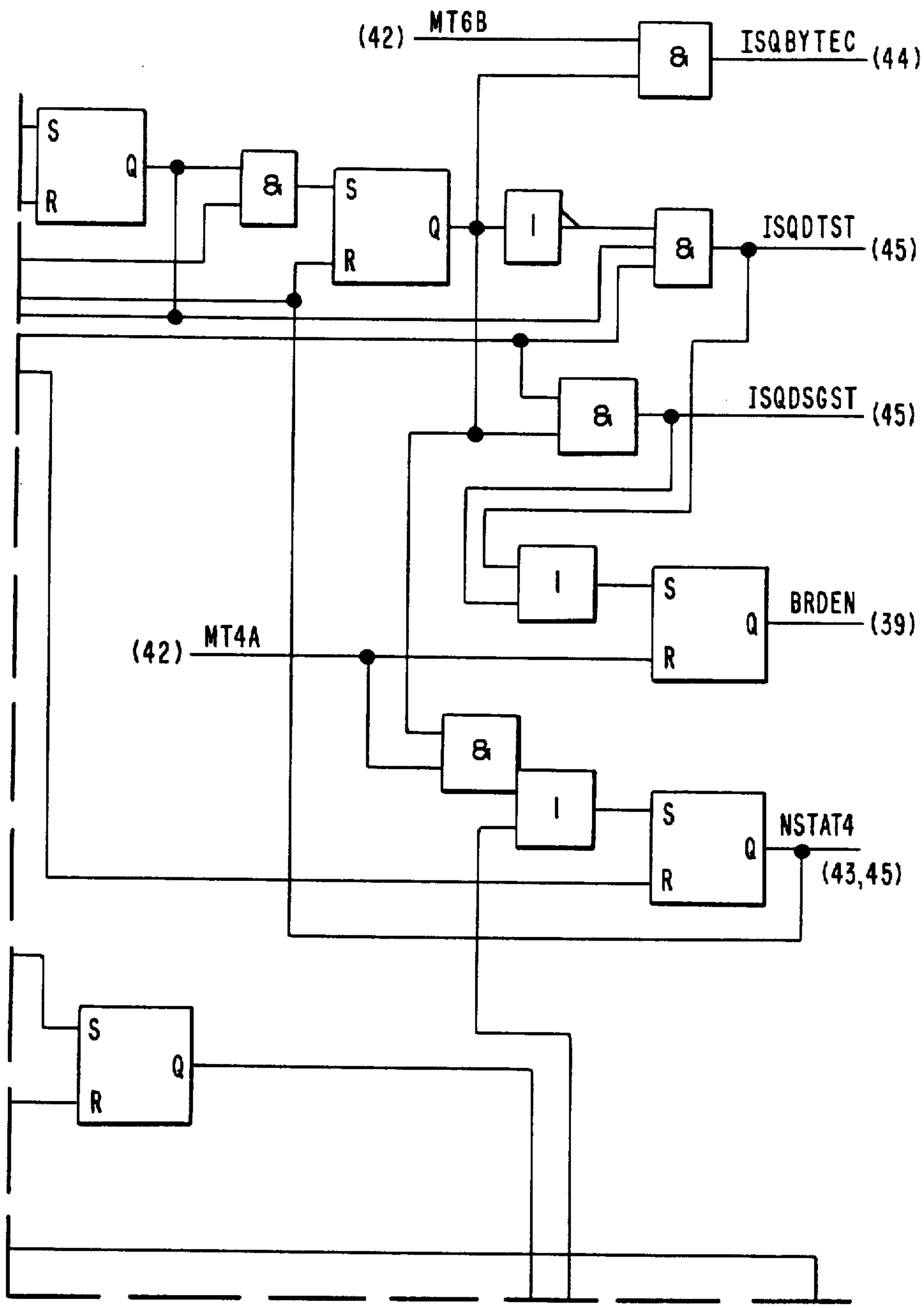
Figure 43C:
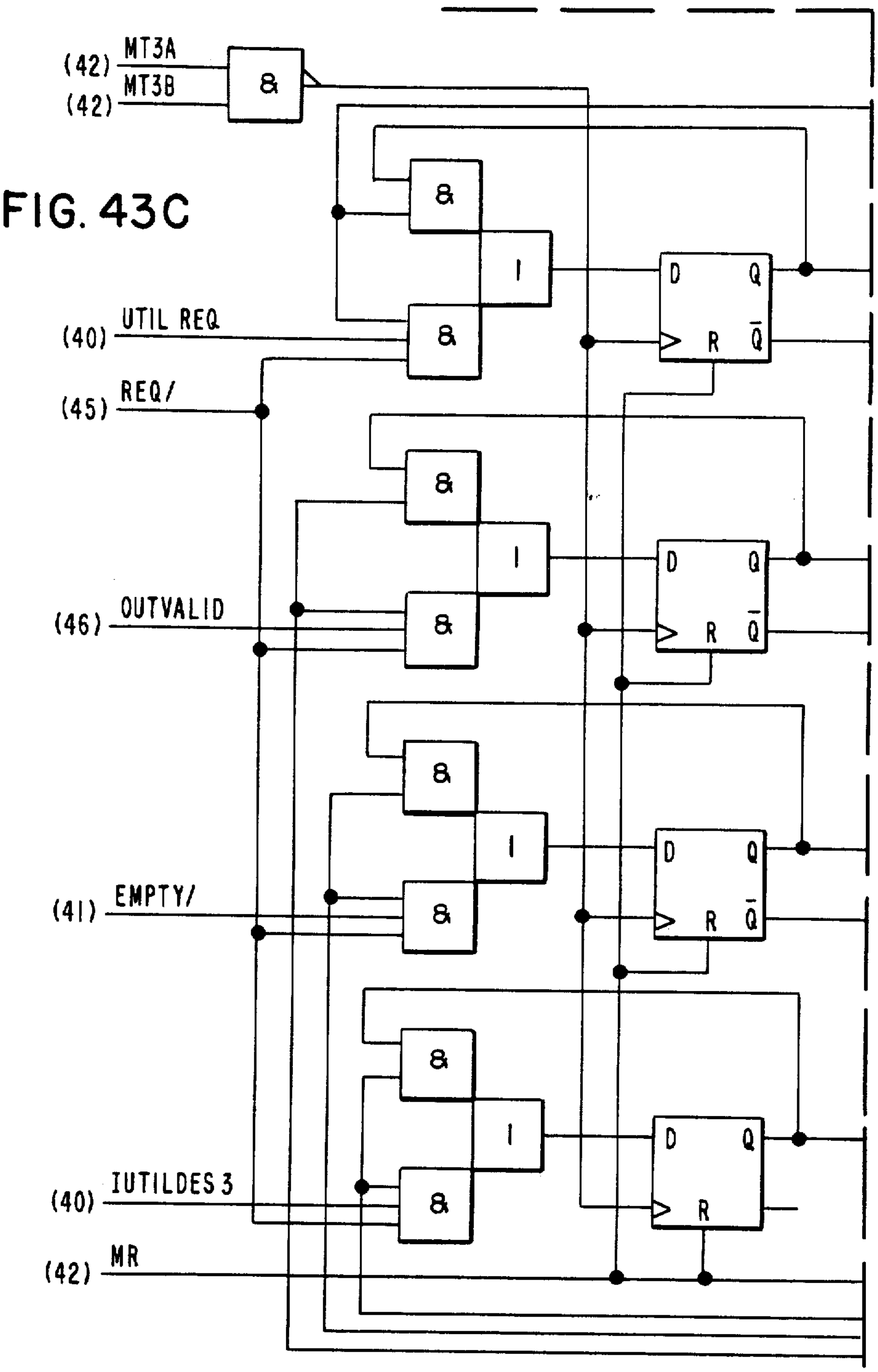
Figure 43D:
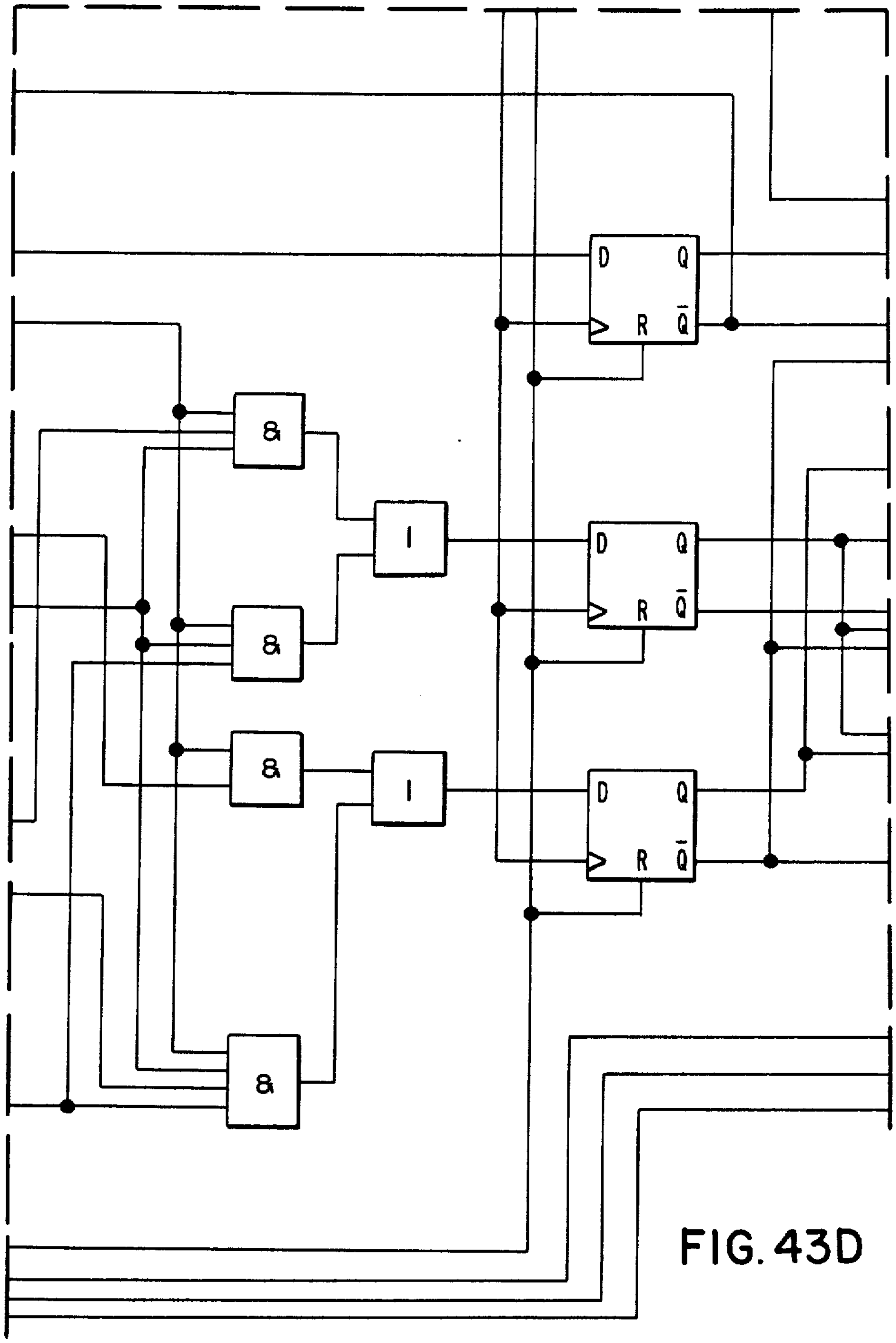
Figure 43E:
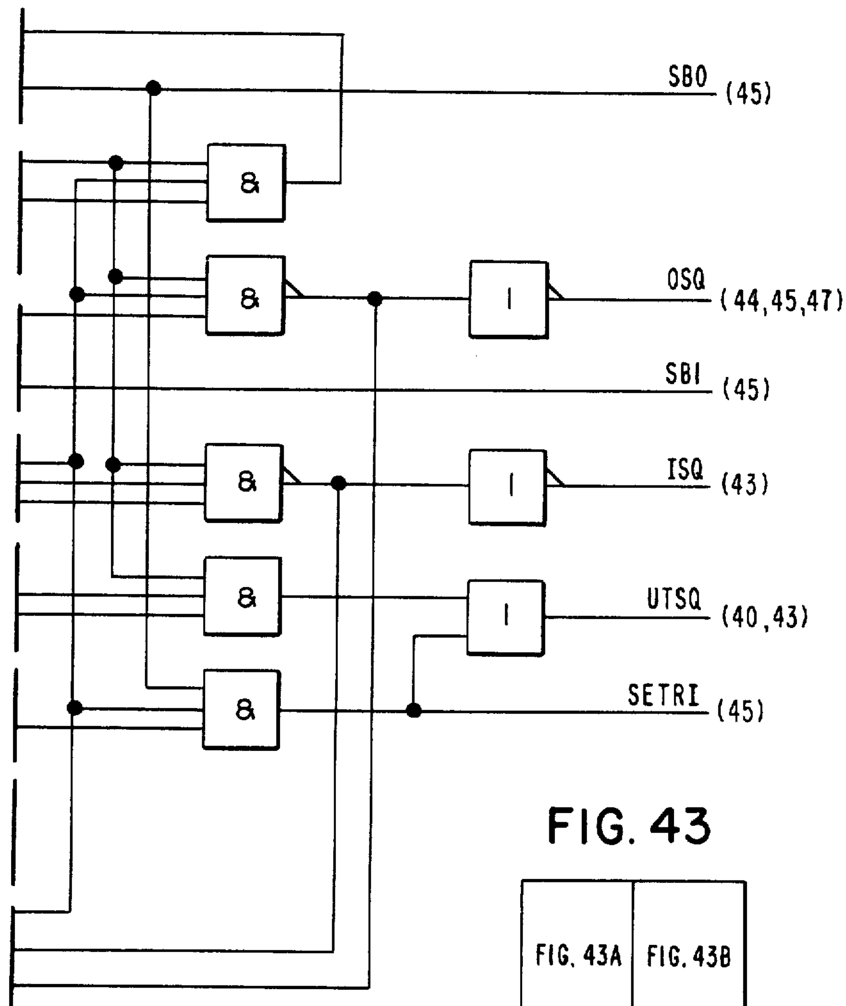
Figure 43:
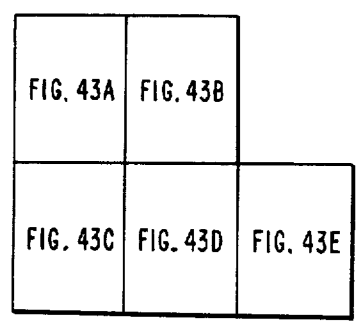
Figure 44:
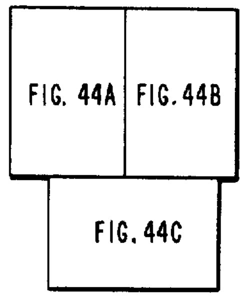
FIGS. 44A-44C, assembled in accordance with the map of FIG. 44 illustrate, in schematic form, a second portion of the I/O sequencer used in the CPIF of FIGS. 37A-37D.
Figure 44A:
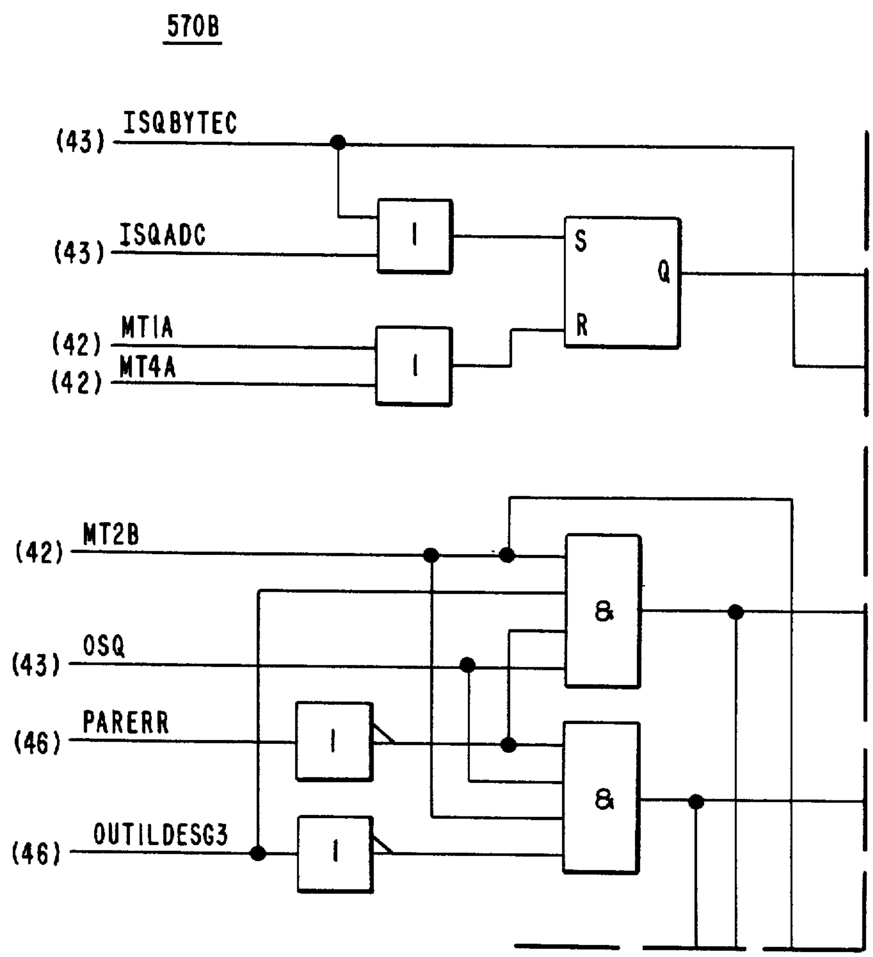
Figure 44B:
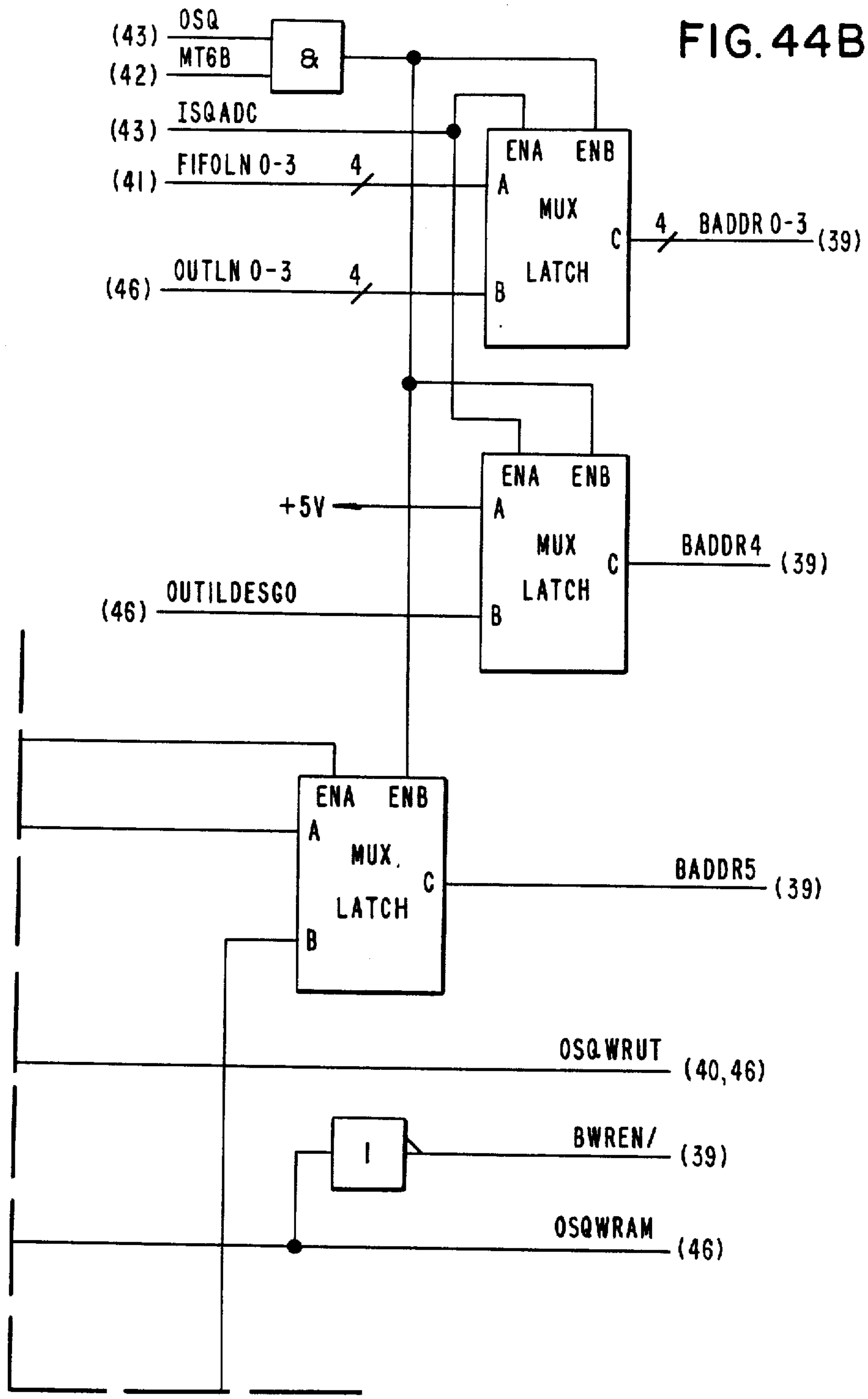
Figure 44C:
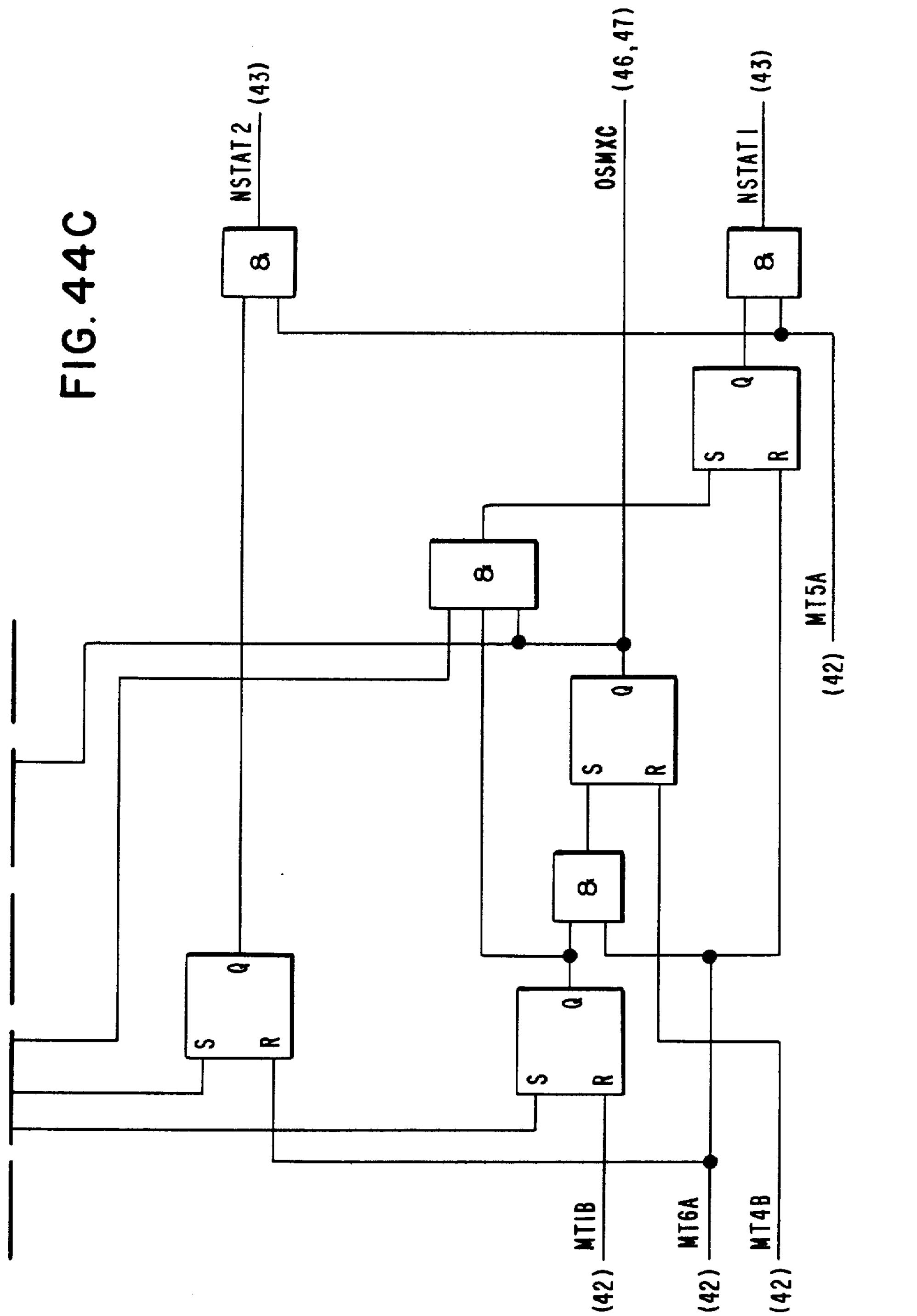

Referring now to FIGS. 43A-43D assembled in accordance with the map of FIG. 43 wherein is disclosed a portion of the I/O transfer sequencer denoted 570A. The sequencer functions to control data movement between the inbound and outbound registers 580 and 590, respectively. The logic circuitry of FIG. 570A is straight-forward and will not be described in detail as the circuitry does direct logical combination of the signals on its input to arrive at the designated signals at the outputs. In a like manner, the B portion of 570 shown in FIGS. 44A-44C performs straight logic functioning on the input signals to derive the indicated output signals. The three multiplexing latches operate with the enabling signal on their ENA input to select the signals appearing at the A labeled input and to provide those signals at the output labeled C. In a like manner, an enabling signal at their ENB input will select the signals at the B labeled input and provide those signals at the output labeled C.

Inbound Interface Registers 580

Figure 45:
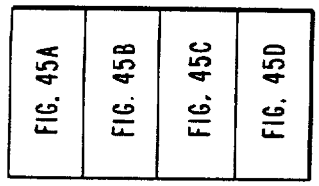
FIGS. 45A-45D, assembled in accordance with the map of FIG. 45 illustrate, in schematic form, the inbound interface registers used in the CPIF of FIGS. 37A-37D.

Referring to FIGS. 45A-45D assembled in accordance with the map of FIG. 45 wherein is shown the inbound interface registers 580. Designated input signals are applied to terminals A, B and C of 3:1 multiplexing latches 5802, 5803 and 5804. Under control of the enabling signals ENA-ENC, one of the inputs A, B or C is selected to appear at the D output of each of the multiplexers. The outputs on the D labeled terminals are directed to the terminals labeled A0-7, B0-7 and C0-7 of a 4:1 multiplexer 5805. The input terminal labeled D3-7 receives the 5-bit output signal from the logic circuitry 5808. The 5-bit signal is derived from a logical combination of the signals SB0, SB1, DSQ, SETRI, MR, CLRICNTL, NSTAT4, IUTST and OWRAPST. These signals and combinational logic form the inbound control signals INCTL 3, 4, 5, and 6, and 7.

A 2:4 decoder 5801 (FIG. 45A) receives on its M labeled input the signal REG SEL 0 and on its L labeled input the signal REG SEL 1 and provides at its output four signals which are directed to the SA, SB, SC and SD selection inputs of the 4:1 multiplexer 5805 and to the corresponding inputs of the 4:1 multiplexer 5806. The 8-bit output from multiplexer 5805 is the signal CPIN 0-7 and the output of multiplexer 5806 is the signal CPPARIN.

Outbound Interface Registers 590

Figure 45A:
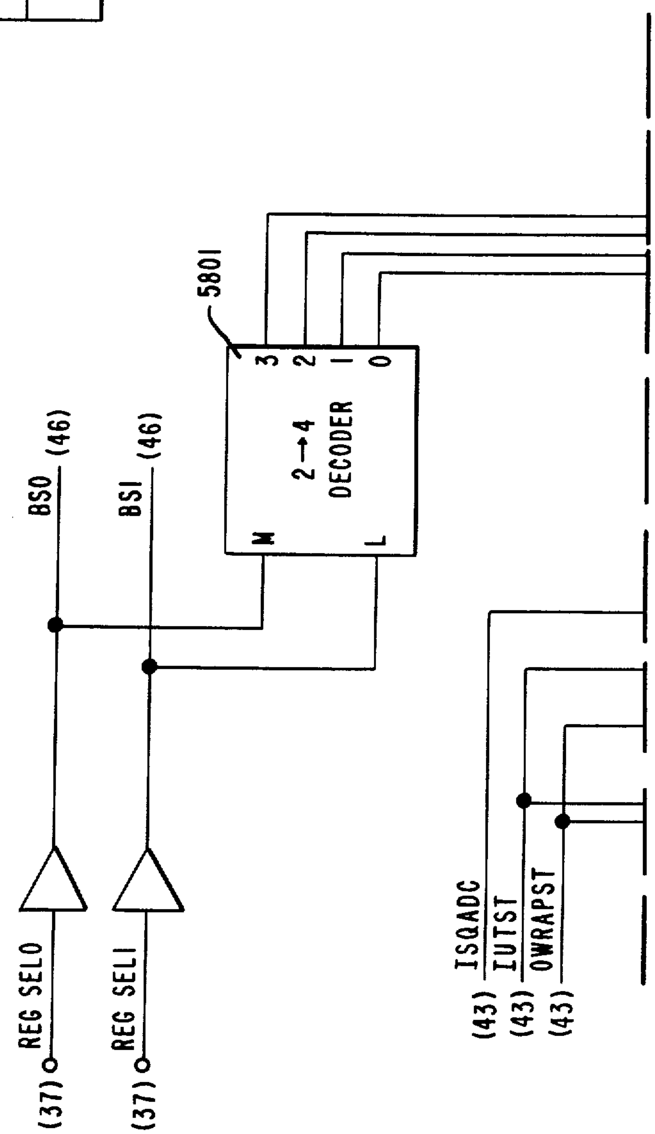
Figure 45B:
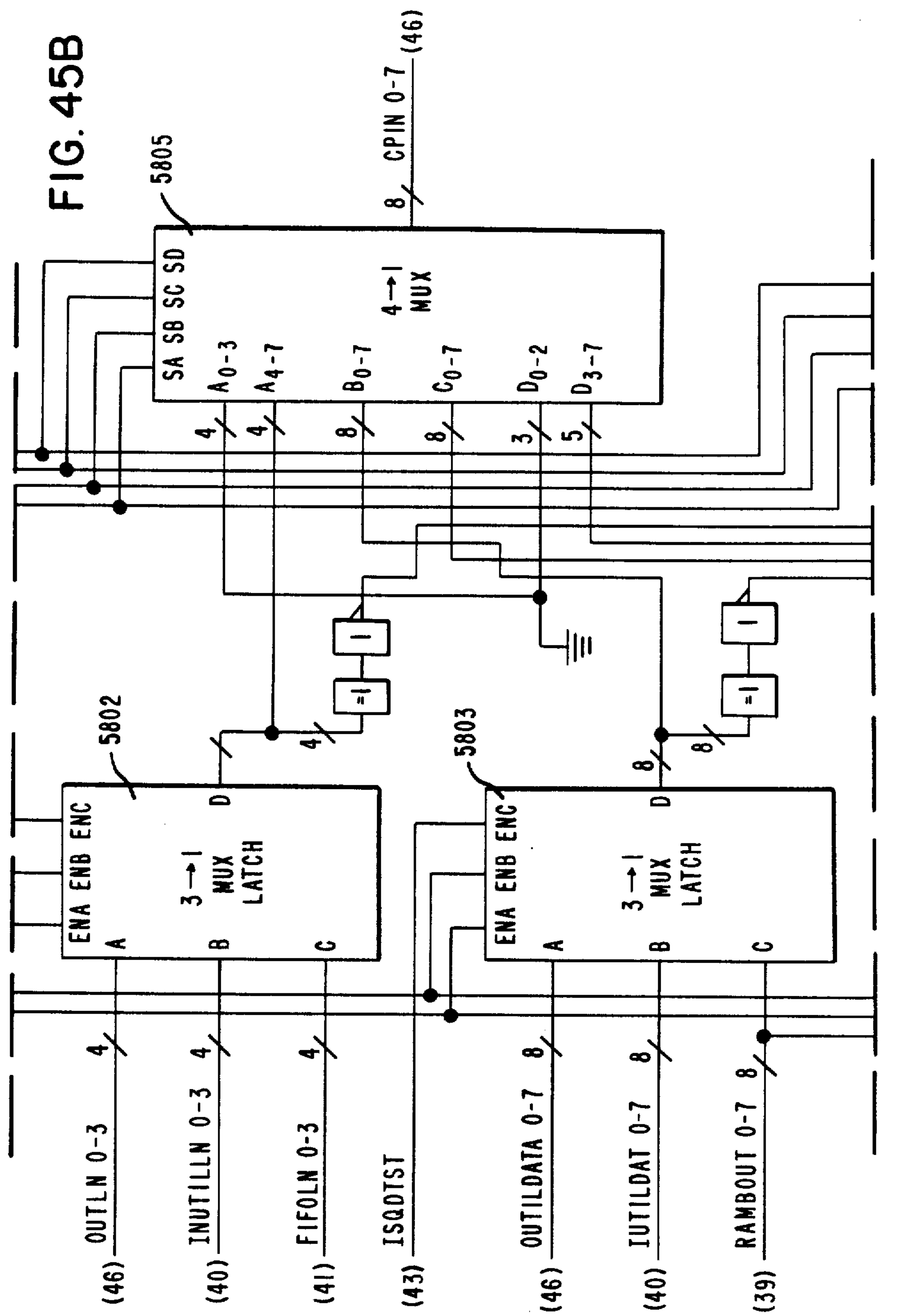
Figure 45C:
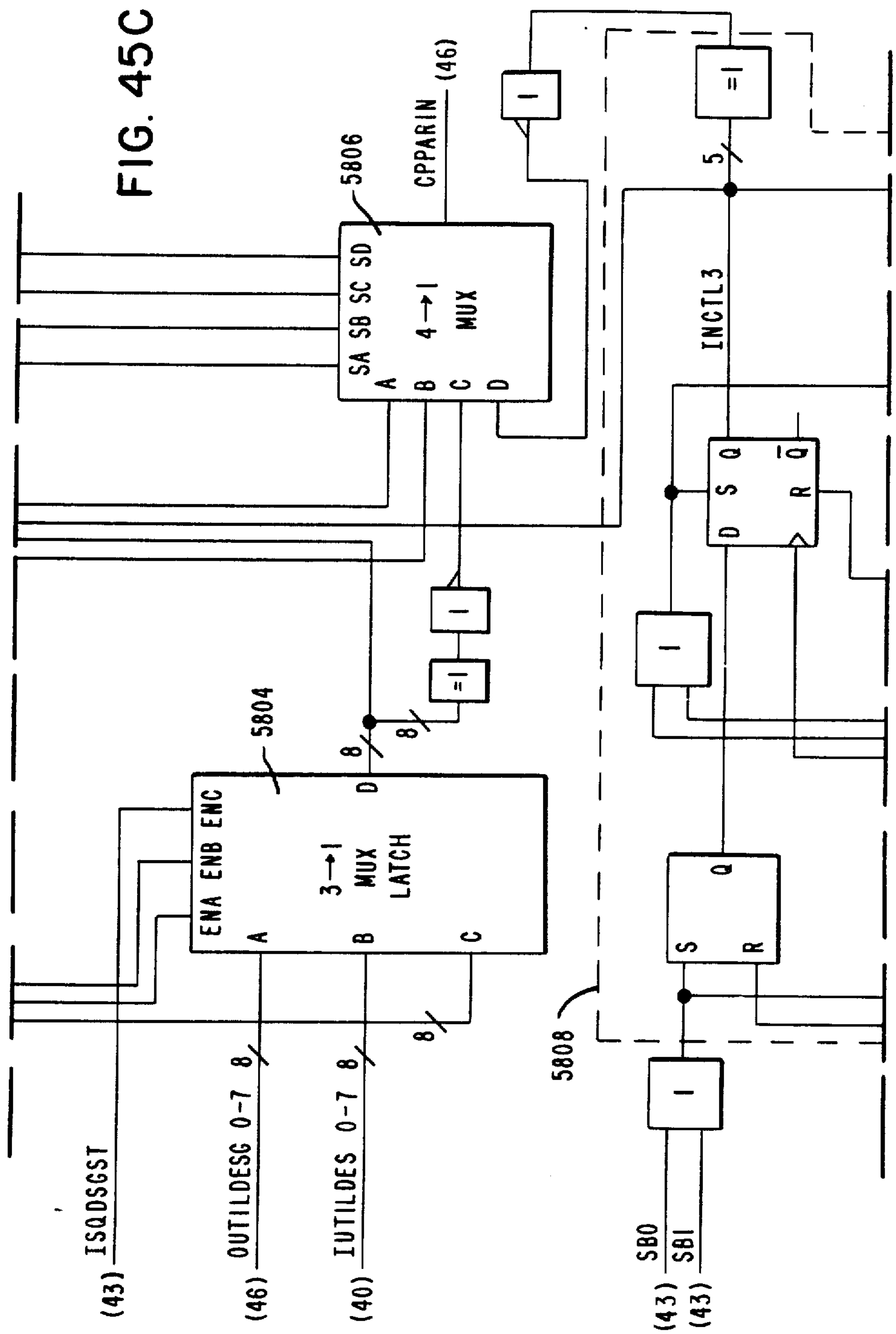
Figure 45D:
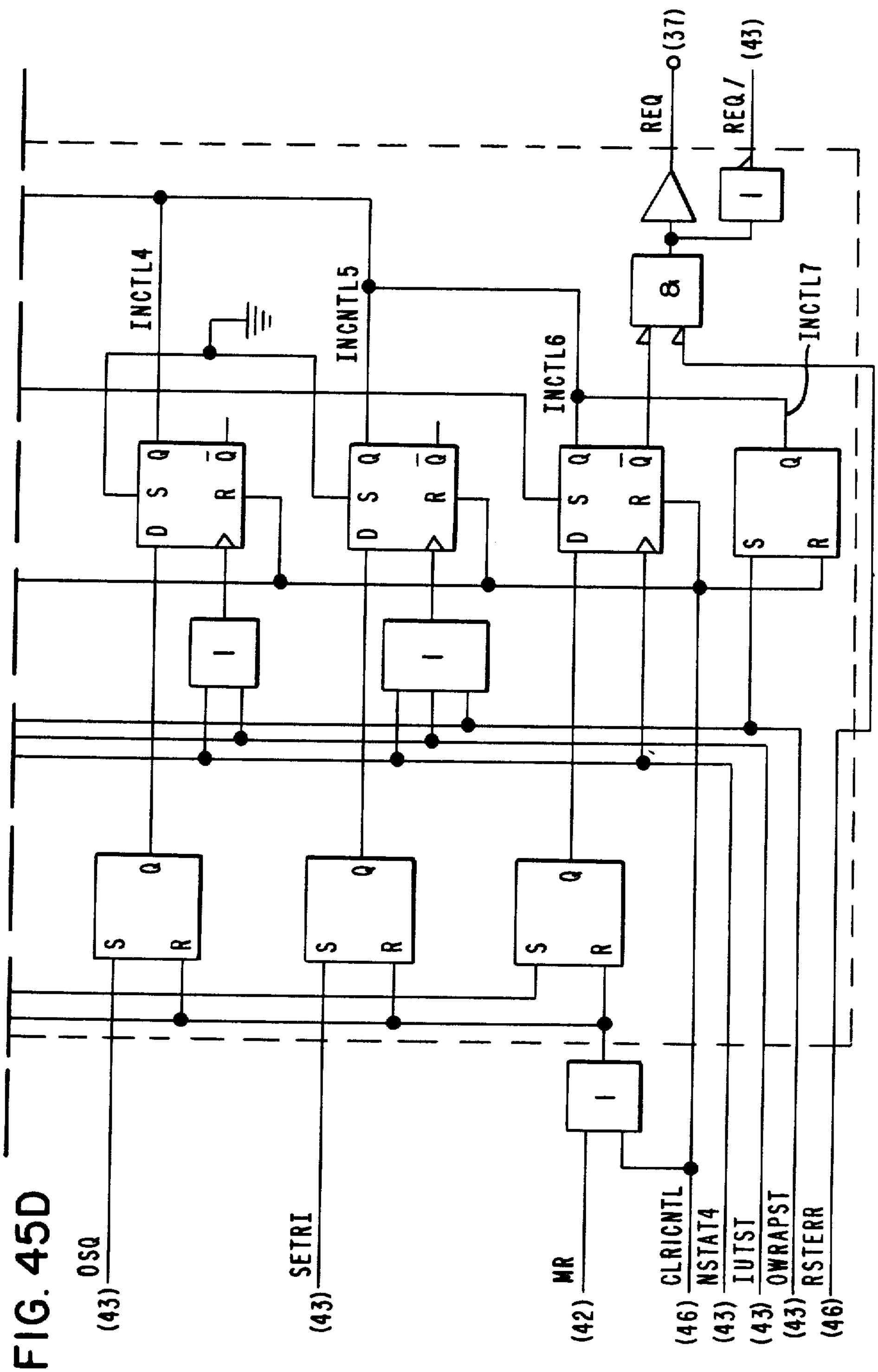
Figure 46A:
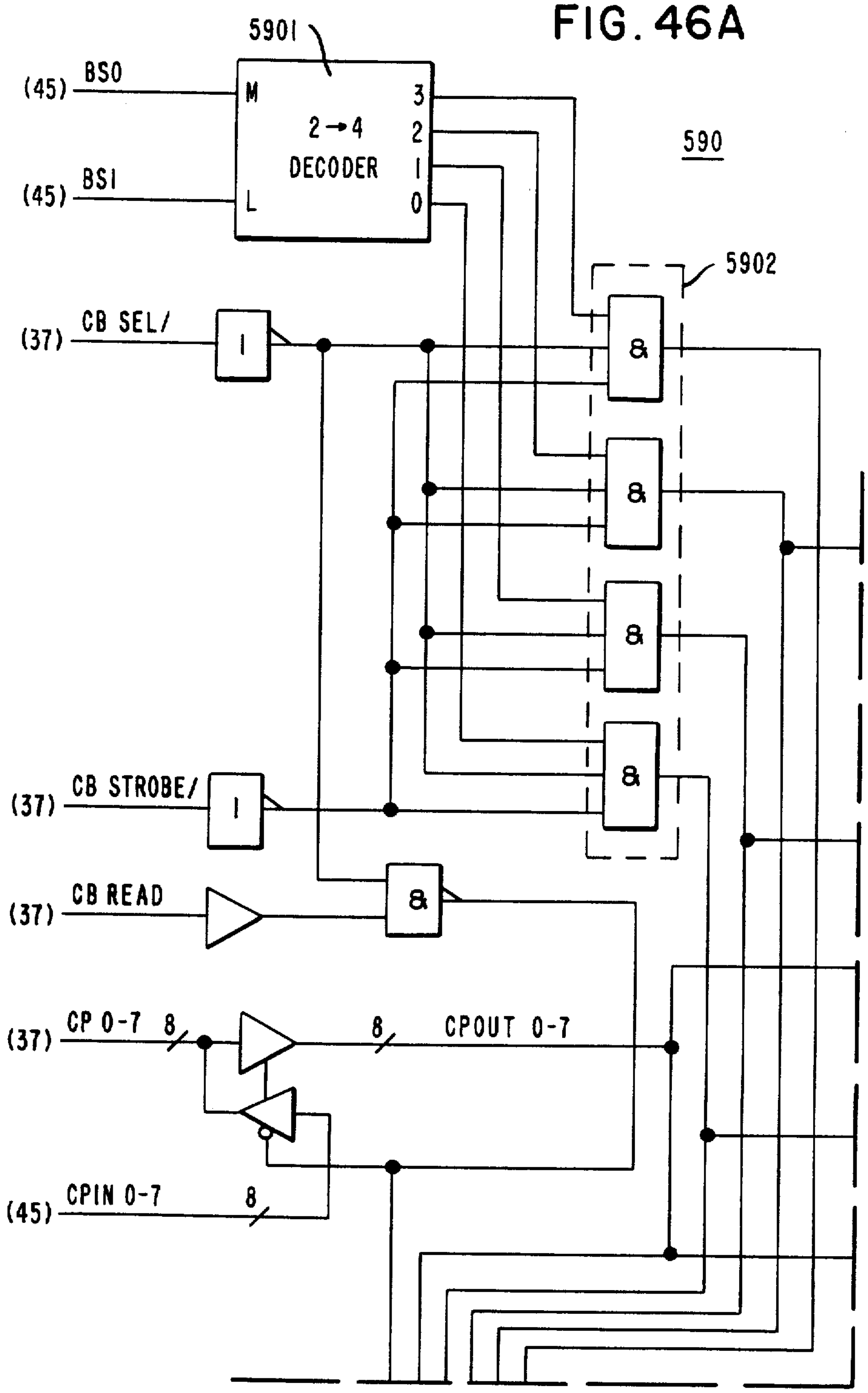
FIGS. 46A-46D, assembled in accordance with the map of FIG. 46 illustrate, in schematic form, the outbound interface registers used in the CPIF of FIGS. 37A-37D.
Figure 46B:
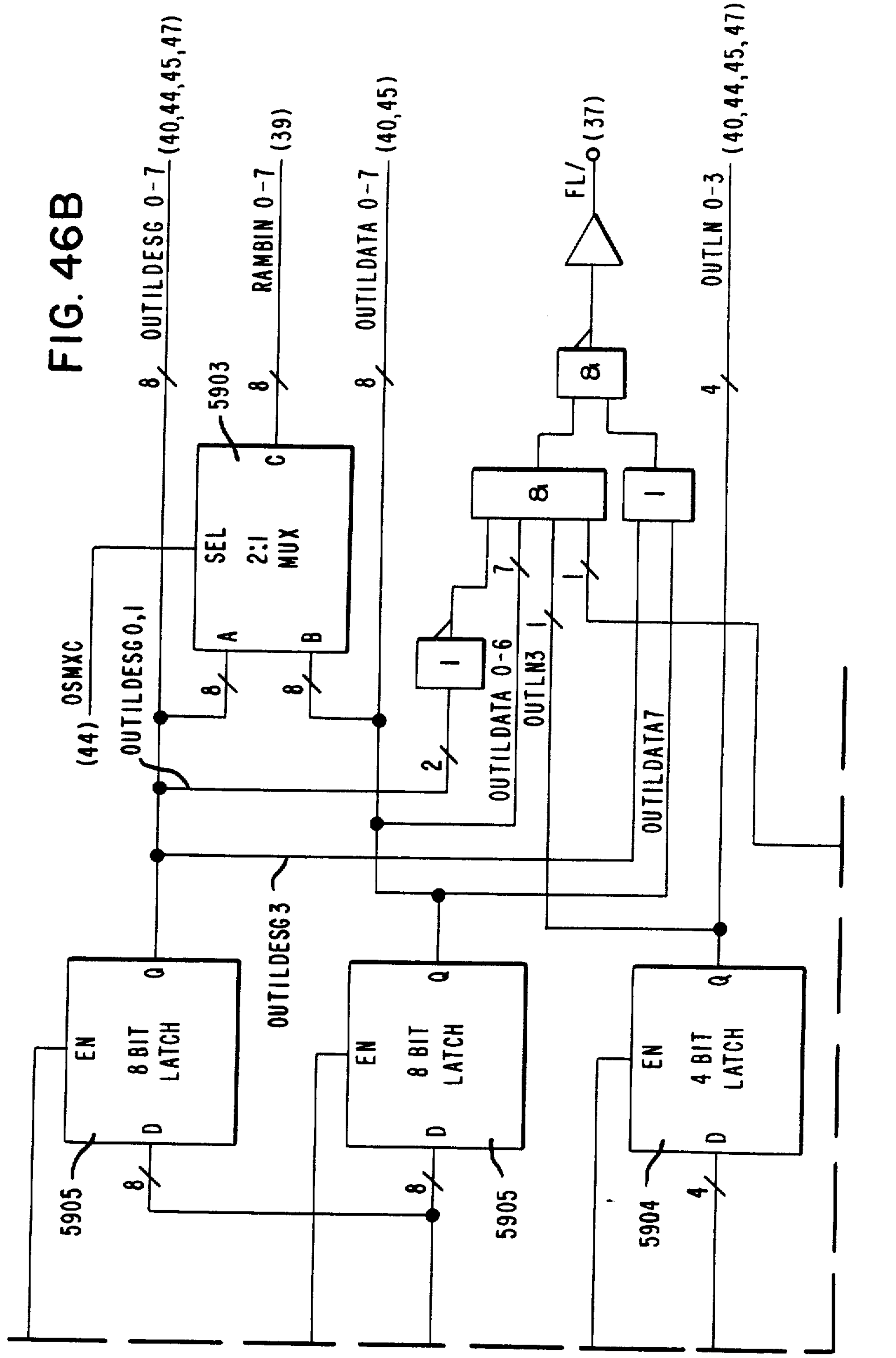
Figures 46, 46C:
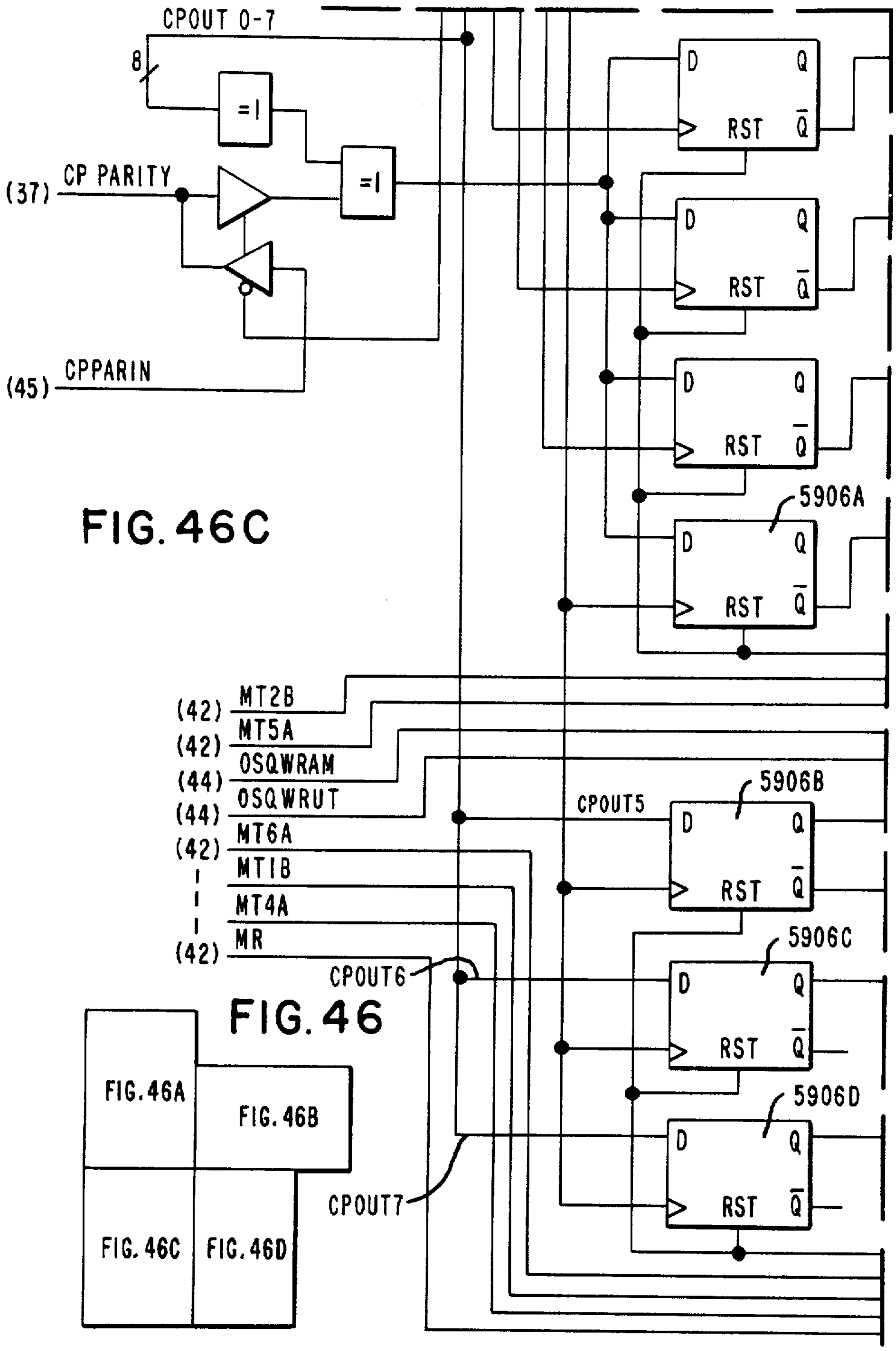
Figure 46D:
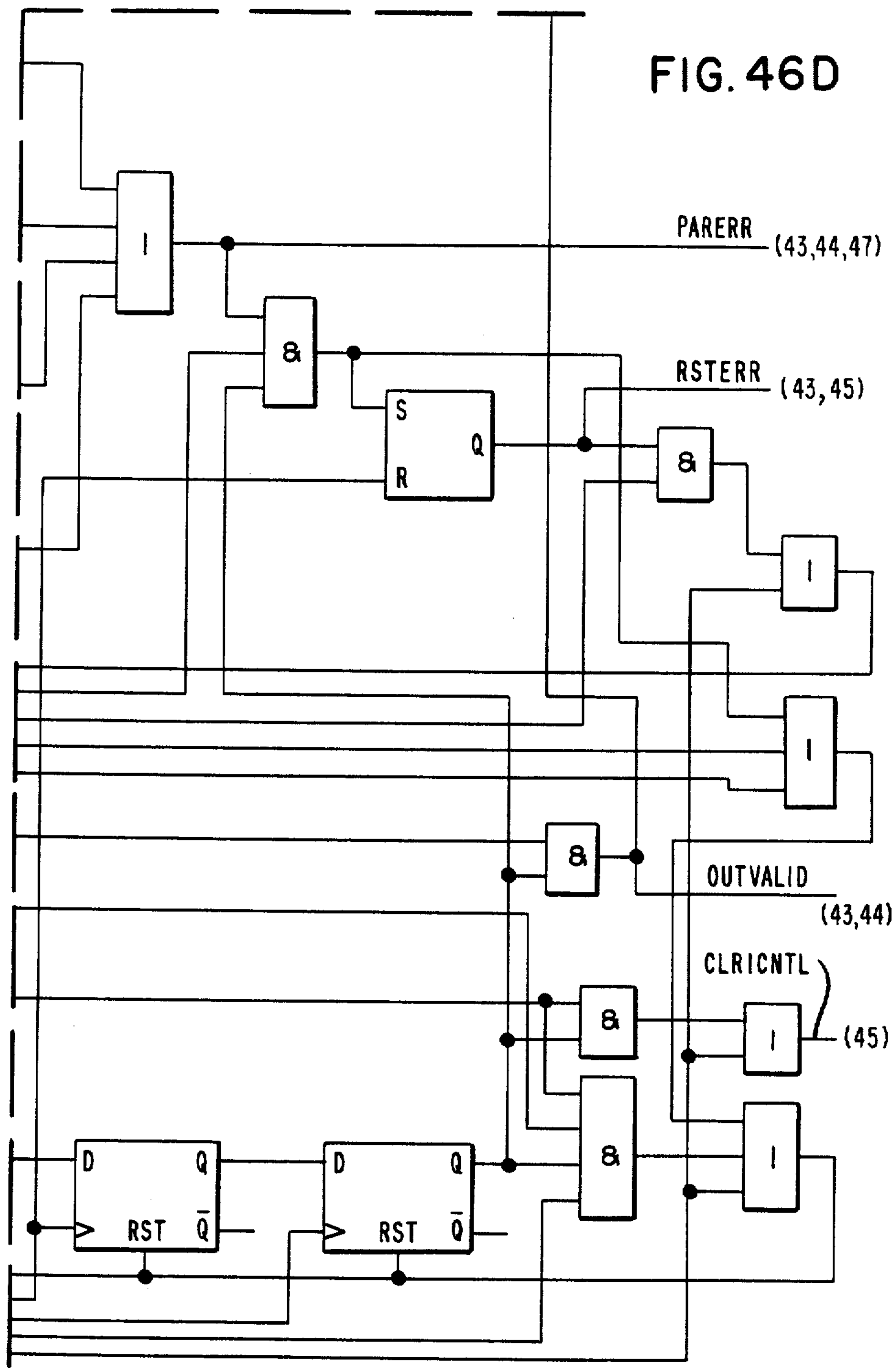

Referring to FIGS 46A-46D assembled in accordance with the map of FIG. 46. The outbound interface registers 590 are shown in logic schematic form. The logic circuitry shown in FIGS. 46A-46D is straightforward combinational logic such that the signals BS0 and BS1 from FIG. 45A are directed to a 2:4 decoder 5901 with 1-bit of each of the four outputs being used as an input to a group of AND gates 5902. The signal CB SEL/, applied to an inverter, generates another input to each of the AND gates of the group 5902. The remaining input is derived from the signal CB STROBE inverted by logic circuitry. The gated signals from the AND gates 5902 are directed to a pair of 8-bit latches 5905 as the enabling signal EN and to the enabling input of a 4-bit latch 5904 and to the clocking input of the D-type flip-flops 5906A-5906D. The signals present at the Q outputs of the 8-bit latches 5905 are selected by a 2:1 multiplexer 5903 under control of the selection signal OSMXC to provide at its C labeled output the signal RAM BIN 0-7.

Flag RAM 595

Figure 47A:
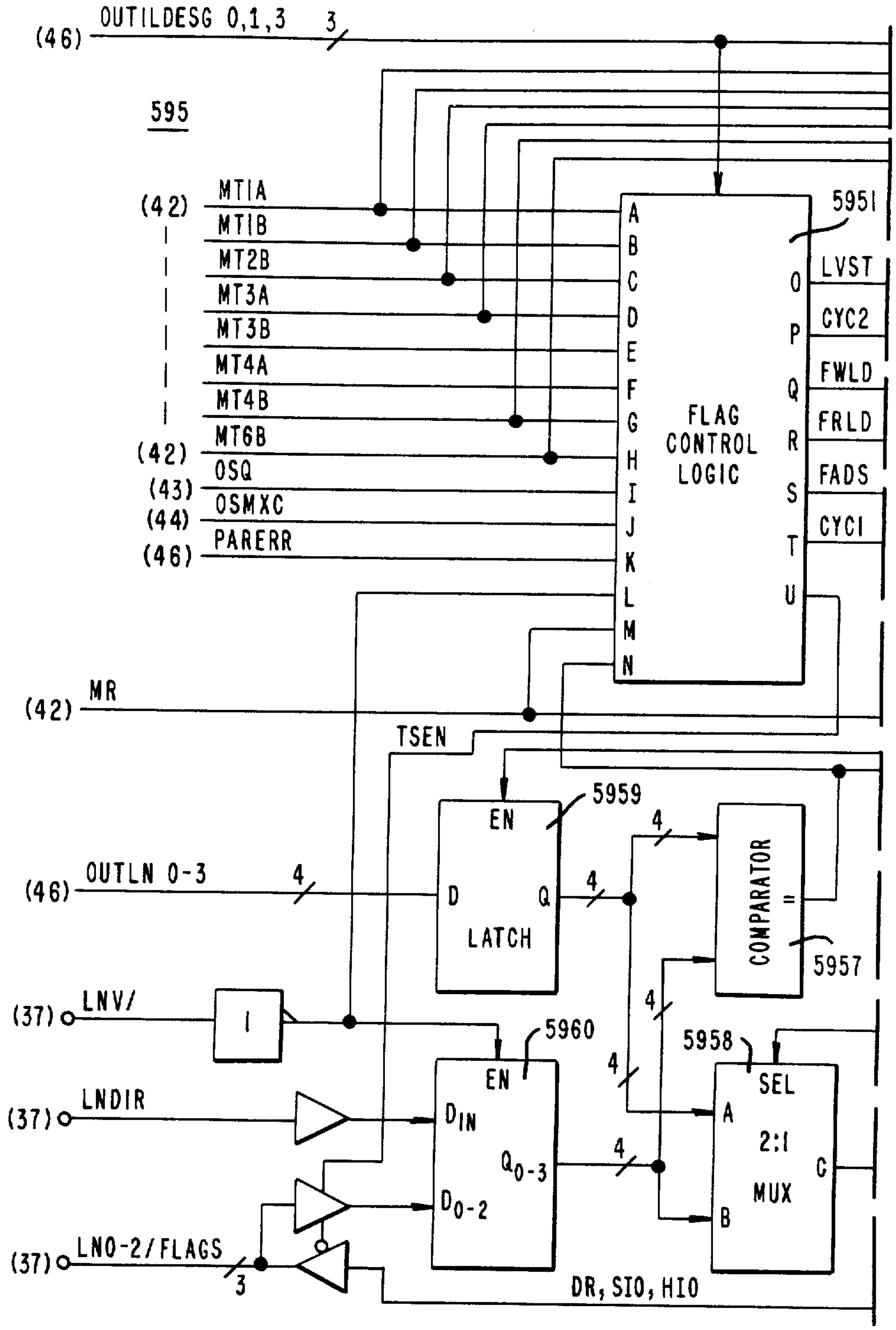
FIGS. 47A and 47B illustrate, in schematic form, the flag RAM used in the CPIF of FIGS. 37A-37D.
Figure 47B:
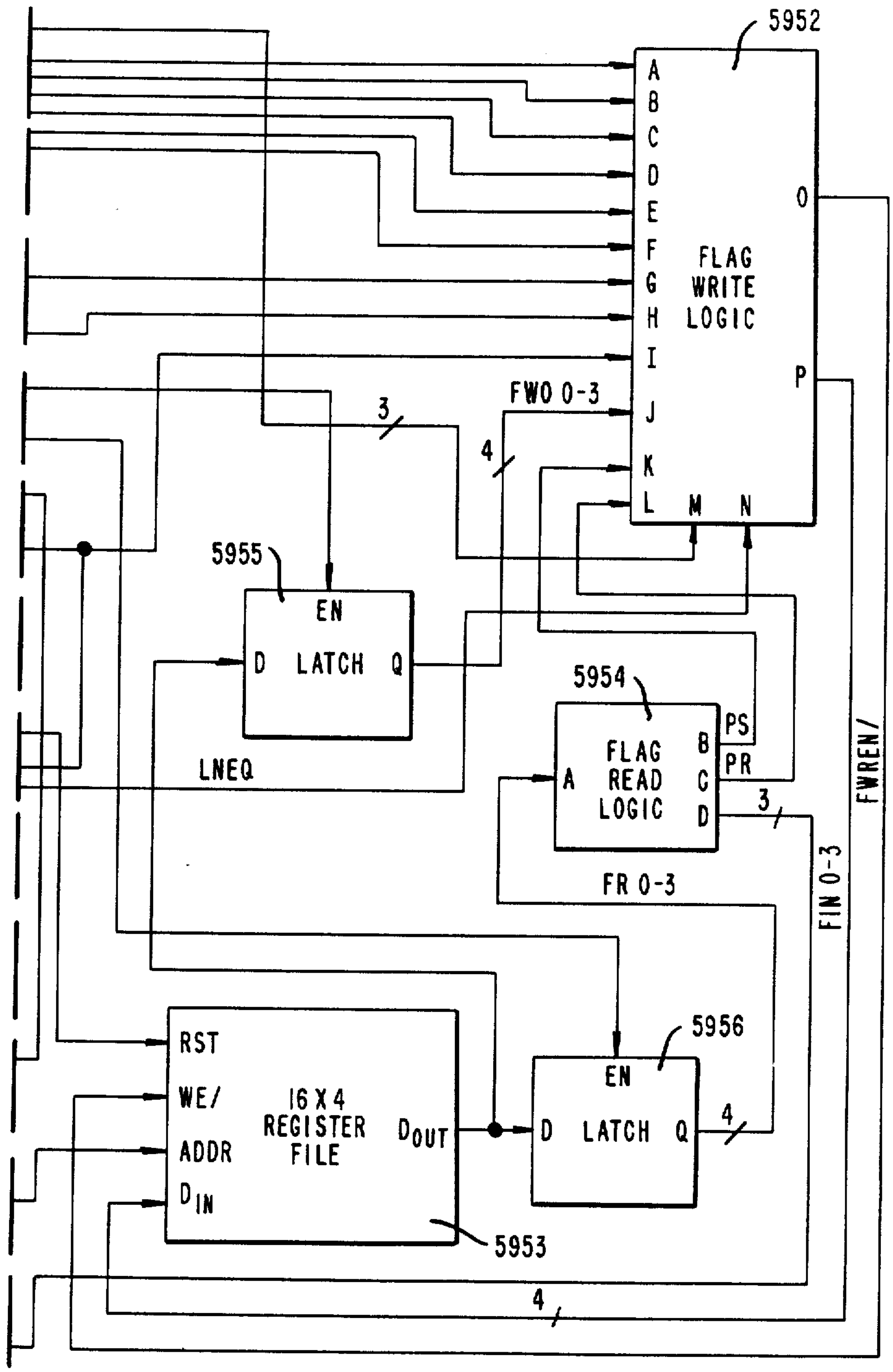

The flag RAM 595 shown in FIGS. 47A and 47B is comprised of three major logic circuits, the flag control logic 5951, the flag write logic 5952, and the flag read logic 5954. The above will be described in terms of input and output signals and Boolean logic equations.

| Pin Letter | Name |
|---|---|
| Inputs to Flag Control Logic 5951: | |
| A | MT1A |
| B | MT1B |
| C | MT2B |
| D | MT3A |
| E | MT3B |
| F | MT4A |
| G | MT4B |
| H | MT6B |
| I | OSQ |
| J | OSMXC |
| K | PARERR |
| L | LNV |
| M | MR |
| N | LNEQ |
| Outputs from Flag Control Logic 5951: | |
| O | LVST |
| P | CYC2 |
| Q | FWLD |
| R | FRLD |
| S | FADS |
| T | CYC1 |
| U | TSEN |

Flag Control Logic 5951 Boolean Logic Expressions

LVST = LNV + LVST · (MT3B · MT4A)/
CYC2 = DISCYC/ · MT4A · OSXMC · CYC1 + CYC2 · MR/ · MT3A/
FWLD = CYC1 · MT6B
FRLD = LVST · MT4B
FADS = CYC1 · MT6B + CYC1 · MT1A + CYC2 · MT6B + CYC2 · MT1A
CYC1 = OSQ · DISCYC/ · PARERR/ · CYC2/ · OUTILDESG3/ · MT4A + CYC1 · MR/ · MT4B/ + CYC1 · MR/ · CYC2/ · DISCYC/
TSEN = MT6B/ · MTA1/ · MT1B/
Where intermediate term DISCYC is as follows:
DISCYC = LNEQ · MT2B · LVST · CYC1 + DISCYC · MT5B/

| Port Letter | Name |
|---|---|
| Inputs to Flag Write Logic 5952: | |
| A | MT1A |
| B | MT1B |
| C | MT2B |
| D | MT3A |
| E | MT4B |
| F | MT6B |
| G | LVST |
| H | CYC2 |
| I | CYC1 |
| J | FW0-FW3 |
| K | PS |
| L | PR |
| M | OUTILDESG 0,1,3 |
| N | LNEQ |
| Outputs from Flag Write Logic 5952: | |
| O | FWR EN/ |
| P | FIN 0-3 |

Flag Write Logic 5952 Boolean Logic Expressions

FWREN/ = (CYC2 · MT6B · MT1A + LVST · MT2B · MT3A)/
FIN0 = ENF · HALT + ENF · FW0 · SETF
FIN1 = ENF · HALT/ · SETF · FW1 + ENF · HALT/ · SETF/ · PS + ENF · START + ENF/ · PS
FIN2 = ENF · HALT/ · SETF · FW2 + ENF · HALT/ · SETF/ · PR + ENF · RESUME + ENF/ · PR
FIN3 = ENF · SETF · FW3 + ENF · SETF/ · START · PR + ENF · SETF · START · FW2
Where intermediate terms ENF, SETF, CYC2ST, START, HALT, and RESUME are defined as follows:

-continued

ENF = LNEQ · LVST · CYC1 · MT2B + LNEQ · LVST · CYC1 · MT3A + LNEQ · LVST · CYC2ST · MT2B + LNEQ · LVST · CYC2ST · MT3A + CYC2 · MT6B + CYC2 · MT1A
SETF = CYC2 · LVST/ · MT6B + CYC2 · LVST/ · MT1A + CYC2 · LVST · LNEQ/ · MT6B + CYC2 · LVST · LNEQ/ · MT1A
CYC2ST = CYC2 · MT1B + CYC2ST · MT4B/
START = OUTILDESG0/ · OUTILDESG1/ · OUTILDESG3/
HALT = OUTILDESG0/ · OUTILDESG1 · OUTILDESG3/
RESUME = OUTILDESG0 · OUTILDESG3/

| Port Letter | Name |
|---|---|
| Inputs to Flag Read Logic 5954: | |
| A | FR0-3 |
| Outputs from Flag Read Logic 5945: | |
| B | PS |
| C | PR |
| D | DR, SIO, HIO |

Flag Read Logic 5954 Boolean Logic Expressions

HIO = FR0
DR = FR0/ · FR1/ · FR2 + FR3
SIO = FR0/ · FR1 · FR3/
PR = FR0 · FR1/ · FR2 · FR3/ + FR0/ · FR1 · FR2 · FR3/
PS = FR0/ · FR1 · FR2 · FR3 + FR0 · FR1 · FR2/ · FR3/

Additional support circuitry for deriving the signals represented by the Boolean equations is comprised of a pair of latches 5959 and 5960 along with a 2:1 multiplexer 5958 and a comparator 5957. The latch 5959 is enabled with the enabling signal CYC1 to latch the input signal OUTLN 0-3 to its Q output which output is directed to an input of the comparator 5957 and the A labeled input of the multiplexer 5958. The latch 5960 is enabled by the signal LNV to latch the signal LNDIR and LN0-2/ FLAGS to its output Q0-3. The signals latched to the output are directed to an input of the comparator 5957 and to the B labeled input of the multiplexer 5958. The selection signal for the multiplexer 5958 is the signal FADS, available at the S labeled output of the flag control logic 5951. The signal multiplexed out of 5958 is directed to the ADDR input of the 16×4 register file 5953.

The comparator 5957 provides a comparing signal when the signals on its input are equal, which signal is defined as LNEQ and which signal is directed to the N labeled inputs of the flag control logic 5951 and the flag write logic 5952. The data stored in the register file 5953 is directed to the Din input and is labeled FIN0-3 and appears at the P output of the flag write logic 5952.

Level 2 Software

The flow charts contained in FIGS. 50-54 define the program flow of the level 2 software executed to perform the character assembly function of a HDLC protocol. FIGS. 55-57A illustrate the program flow of the level 2 software used to perform character assembly for peripheral devices communicating under a IBM Bisynchronous communications protocol. The level 2 software program flow of the character assembly routine for a start-stop communications protocol is contained in FIGS. 57B-60. The flow charts contained in FIGS. 61-65 define the program flow of the level 2 software executed to perform the character disassembly function of the HDLC protocol. FIGS. 66-69 illustrate the program flow of the level 2 software used to perform the character disassembly function for peripheral devices communicating under the Bisynchronous protocol. The level 2 software program flow of the character disassembly routine for the start-stop communications protocol is contained in FIGS. 70-75. A person, skilled in the art, can implement these program flows in the instruction set defined in Appendix B.

Determination of Scan Rate

A method of using the Least Common Multiple of common bit rates; 19,200, 14,400, 9,600, 7,200, 1,800, 3,600, 2,400, 1,800, 1,200, 600, 300; was used to determine the time division interval for time division communication processing. It was assumed for this implementation that a minimum of 16 samples per bit would be adequate to recover received serial data or generate output data rates while providing enough resolution to practically preserve the chronological order of communication line control signal changes of binary state with respect to serial data transfers. An objective of connecting 8 communication lines is assumed. However, the line connectivity can be reduced to four communications if all lines are operating at a bit rate of 19,200 bits per second.

The least common multiple of 19,200, 14,400, 9,600, 7,200, 1,800, 3,600, 2,400, 1,800, 1,200, 600, and 300 is 57,600. This is 3 times the bit rate of 19,200, but less than the desired minimum of 16 samples per bit at 19,200 bits per second. The lowest integer that can be multiplied by 3 that satisfies the minimum sample rate of 16 is 6. The result is 18 samples per bit for a 19,200 bit per second communications line. The number of time divisions per second necessary to connect four 19,200 bits per second communication lines is the multiplication product of 4, 19,200, and 18 or 1,382,400. The scan list time interval becomes the reciprocal of 1,382,400 bits per second or approximately 723.3796 nanoseconds.

It was assumed that a minimum bit rate of 4,800 bits per second is adequate for any of 8 connected communication lines. Therefore, a scan list length of 16 is provided. Each scan list entry represents 18 samples per bit at 4,800 bits per second. If four lines are entered symmetrically in the scan list, each line appears four times and represents 18 samples per bit at 19,200 bits per second. Two alternating communications lines appear 8 times representing 38,400 bits per second. Eight lines symmetrically entered in the scan list each appear twice and each represent 9,600 bits per second.

Communication lines that operate at bit rates containing two prime factors of 3 (14,400, 7,200, 3,600, etc.) are given 24 time division intervals per bit by the scan list and therefore, are considered to be equivalent to 4/3 there actual bit rate with respect to scan list entries.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as fall within the true scope of the invention.

APPENDIX A

```
PROM WRITING LIST - NCR COMTEN # 6000236-000 REV. AA

        CHECKSUM = 9A19

00000...1F 08 6F 67 18 19 1A 1B 1C 1D 1E 18 84 15 F8 78 .
00010...F4 14 F8 10 F8 C1 0A 5A 1A 08 C3 00 58 18 FF C1 .
00020...01 5A 1A 08 1B 84 18 1B 84 C1 01 19 FF 12 F8 5A .
00030...1A FF 14 F8 13 F8 15 F9 00 79 F5 00 C1 01 17 E8 .
00040...5A 1A 08 58 18 84 C1 01 5A 1A 08 58 18 84 C1 01 .
00050...5A 1A 08 58 18 84 C1 01 1A 08 52 F4 5A 1A 08 58 .
00060...18 84 58 59 5A 19 6F 67 5B 1C 14 E8 64 1C 84 98 .
00070...D8 1C 1C 84 98 D8 1C 1C 84 98 9A 98 9A 99 5C 9C .
00080...5C 9D 35 9D 9C 43 53 FC 59 19 84 18 FF C1 01 5A .
00090...1A 08 5A 1A 84 5B 1B FF C1 01 1B 85 53 E4 5A 1A .
000A0...08 C3 00 C0 5A 1A 08 59 19 84 58 C3 09 C1 01 5A .
000B0...1A 08 58 18 84 18 0F 58 18 0F C1 0D 16 E8 5A 1A .
000C0...08 C0 5A 1A 08 59 19 84 C1 01 1E 08 58 59 6F 67 .
000D0...18 49 E8 6F 67 18 18 18 84 18 85 18 85 18 85 18 .
000E0...85 19 84 1B 19 84 5A 1A 84 98 98 98 98 98 98 98 .
000F0...98 98 42 52 F8 19 84 1B 19 84 6F 67 5E C6 47 6E .
00100...66 17 FC 5E 6F 67 18 46 16 F8 6F 67 1E 6F 67 18 .
00110...46 16 FC 1E 08 C1 19 85 13 F9 01 C0 10 F8 11 F8 .
00120...E8 59 19 08 19 08 19 85 58 C3 09 C1 01 19 85 19 .
00130...08 59 19 08 19 08 19 08 C0 1A 08 1F E8 1A 08 5B .
00140...1B 85 C1 01 6F 67 19 08 51 E0 6F 67 49 F9 01 C7 .
00150...19 08 04 C1 01 01 01 01 02 02 02 02 03 03 03 03 .
00160...03 04 01 01 04 06 01 07 08 08 08 09 09 09 09 09 .
00170...09 C1 01 C1 09 C1 09 C1 01 18 08 19 85 6F 67 19 .
```

PROM WRITING LIST - NCR COMTEN # 6000236-000 REV. AA CONT.

```
00180...40 18 08 50 F4 1A 85 14 F8 C3 09 C1 01 2F 08 27 .
00190...08 6E 66 17 F0 2E 08 26 08 C6 47 2F 08 27 08 18 .
001A0...85 14 F8 58 18 08 C3 09 C1 01 58 C0 58 C3 09 C1 .
001B0...01 C1 09 C1 09 C1 01 C1 09 18 85 14 F8 2F 08 27 .
001C0...08 6E 66 17 F0 6E 66 17 E4 6E 66 C0 C7 1E 08 58 .
001D0...18 08 58 18 08 47 2F 08 27 08 C1 09 58 C0 58 C3 .
001E0...09 C1 01 C1 09 C1 09 C1 01 2F 08 27 08 6E 66 17 .
001F0...FC 6E 66 17 F8 6E 66 17 FC 6E 66 17 F8 18 85 18 .
00200...47 E4 18 85 14 E8 F8 2F 08 27 08 18 85 14 F8 C3 .
00210...09 C1 01 58 C0 58 C3 09 C1 01 C1 09 C1 09 C1 02 .
00220...18 85 14 F8 2F 08 27 08 6E 66 17 FC 6E 66 17 F8 .
00230...6E 66 17 FC 6E 66 17 E4 18 47 2F 08 27 08 C3 09 .
00240...C1 01 58 C0 58 C3 09 C1 01 C1 09 C1 09 C1 02 18 .
00250...08 19 85 6F 67 19 40 18 08 18 85 14 F8 C3 09 C1 .
00260...01 18 85 19 08 05 61 29 19 84 19 08 61 04 18 08 .
00270...2E 08 26 08 6F 67 C1 18 C0 18 C0 18 C0 18 C0 18 .
00280...C0 18 C0 1E C0 1E 58 C3 09 C1 01 C1 09 C1 09 C1 .
00290...02 C1 09 18 85 14 E8 58 C3 09 C1 01 18 85 19 08 .
002A0...05 61 29 19 84 19 08 61 04 6F 67 C1 18 C0 18 C0 .
002B0...18 C0 18 C0 18 C0 18 C0 1E C0 1E 05 5A 18 08 51 .
002C0...F8 1E 08 5A 1A 08 58 18 08 C1 09 C1 09 C1 09 C1 .
002D0...02 C1 09 18 85 14 E8 58 C3 09 C1 01 6F 67 58 59 .
002E0...18 41 51 F8 18 85 05 59 28 18 84 18 85 05 19 08 .
002F0...61 28 18 84 9D 18 08 78 F8 59 9C 9B 5A 9A 9A 78 .
00300...F0 DF DF D8 C0 DF D8 C0 59 9C 9B 5A 9A 9A 78 F0 .
00310...DF DF D8 C0 DF D8 99 58 59 5A 19 84 48 50 E4 1A .
00320...84 76 C0 1E C0 B7 B6 1E 58 98 98 58 59 5A 19 84 .
00330...48 50 E4 1A 84 B7 1F 1F 08 1E 9D 18 08 78 F8 9C .
00340...9B C0 9C 9B 58 18 08 58 18 08 C1 09 C1 09 C1 09 .
00350...C1 03 58 C3 09 2E 08 26 08 C3 C1 01 C1 09 C1 03 .
00360...1B 85 1B 08 58 C3 09 C1 01 C1 09 C1 09 C1 03 18 .
00370...85 14 F9 03 6F 67 19 08 61 51 F5 03 47 C1 03 4F .
00380...19 08 18 41 19 08 C3 09 C1 01 19 08 79 F0 79 F0 .
00390...C0 1A 85 05 1C 1A 84 1B 08 9B 79 F0 C0 1A 85 05 .
003A0...1C 1A 84 1B 08 9B 58 C3 09 C1 01 C1 09 C1 09 C1 .
003B0...03 C1 03 19 08 79 F0 79 F0 C0 1A 85 05 1C 1A 84 .
003C0...5B 9B 79 F0 C0 1A 85 05 1C 1A 84 5B 9B 5D 1D 08 .
003D0...18 85 14 F9 03 6F 67 19 08 61 51 F5 03 47 C1 03 .
003E0...4F 19 08 18 41 19 08 C3 09 C1 01 58 C3 09 C1 01 .
003F0...C1 09 C1 09 C1 03 18 85 14 F9 04 6F 67 19 08 61 .
00400...51 F5 04 47 C1 04 4F 19 08 18 41 19 08 C3 09 C1 .
00410...01 58 C3 09 C1 01 C1 09 C1 09 C1 04 C1 04 1E 08 .
00420...4E 16 08 F8 19 08 18 41 19 08 1E 08 5A 1A 08 C3 .
00430...09 C1 01 1E 08 4E 1E 08 C0 18 85 14 F9 04 1E 08 .
00440...16 08 F8 19 08 18 51 F4 41 19 08 C3 09 C1 01 4E .
00450...1E 08 09 19 08 C3 09 C1 01 1F 08 4F 1F 08 C0 58 .
00460...C3 09 C1 01 C1 04 C1 04 C1 04 C1 05 C1 05 C1 05 .
00470...C1 06 C1 06 C1 06 C1 01 C1 06 19 0F 17 F8 58 18 .
00480...0F 58 18 0F 5A 1A 0F 58 18 08 C3 09 C1 01 19 0F .
00490...17 F8 6F 67 19 0F 18 85 18 41 19 0F 51 E4 58 18 .
004A0...08 6F 67 2E 26 1E 0F 5A 12 0F E4 1B 0F E4 6F 67 .
004B0...2E 26 1E 0F C0 19 0F 51 EC 6F 67 18 85 18 41 19 .
004C0...0F C0 41 19 0F 51 E4 6F 67 2E 26 1E 0F 5A 1A 08 .
004D0...1A 08 1B 0F 1F 1B 0F C3 09 C1 01 19 0F 51 F4 51 .
```

PROM WRITING LIST - NCR COMTEN # 6000236-000 REV. AA CONT.

```
004E0...F4 51 F4 51 F5 06 58 18 0F C1 01 18 0F 50 F4 50 .
004F0...E4 59 19 08 C1 05 59 19 08 C1 05 58 18 0F 58 18 .
00500...08 C1 06 1A 0F E4 59 19 08 C1 06 52 F4 52 F4 C0 .
00510...6F 67 1B 53 E4 1B 53 E4 59 19 08 C1 05 58 18 0F .
00520...58 18 08 C1 06 1A 0F 52 E4 58 18 08 C1 06 58 18 .
00530...08 5C 1C 0F C1 06 6F 67 19 0F 18 85 18 41 19 0F .
00540...1E 0F 46 1E 0F 5A 42 11 F0 1B 85 14 F8 E8 19 0F .
00550...1F 19 0F 18 0F C3 09 C1 01 1E 0F E4 1B 0F 1F 1B .
00560...0F 5C 1C 08 C1 04 C3 09 C1 01 6F 67 2E 26 1F 0F .
00570...07 0F C6 1F 0F 47 1F 0F 07 0F 1F 0F 19 85 14 E8 .
00580...18 0F C3 09 C1 01 1F 0F E4 59 19 08 C1 04 5A 1A .
00590...0F C3 09 C1 01 1F 0F 07 0F 19 85 19 1F 0F 47 1F .
005A0...0F 07 0F 1F 0F 5F 07 0F 1A 85 14 E8 18 0F C3 09 .
005B0...C1 01 5E 16 0F E4 5B 1B 08 C1 04 C3 09 C1 01 6F .
005C0...67 19 0F 1A 85 1A 41 19 0F 5E 06 0F 51 EC 1B 85 .
005D0...14 E8 1C 0F 1F 1C 0F 18 0F C3 09 C1 01 5F 17 0F .
005E0...E4 5C 1C 08 1C 0F 1F 1C 0F C1 04 C3 09 C1 01 1B .
005F0...0F 1B 0F 6F 67 1E 6F 67 5A 1B 1B 4A E8 1C 0F 54 .
00600...E4 1F 0F 1F 0F C0 1F 0F 1F 0F 59 5A 6F 67 1B 5C .
00610...17 F8 05 44 41 54 F8 4A E8 C0 6F 67 1E 0F 1E 1D .
00620...85 14 E8 18 0F C3 09 C1 01 59 19 08 C1 04 1F 0F .
00630...19 85 19 5E 06 0F 06 0F 1A 85 14 E8 18 0F C3 09 .
00640...C1 01 5E 16 0F E4 26 08 C1 04 C3 09 C1 01 6F 67 .
00650...19 0F 1A 85 1A 41 19 0F 5E 06 0F 5E 16 0F E4 6F .
00660...67 2E 26 06 0F 1F 0F 07 0F C6 47 1F 0F 59 19 08 .
00670...1A 85 14 E9 04 18 0F C3 09 C1 01 C3 09 C1 01 6F .
00680...67 19 0F 1A 85 1A 41 19 0F 5E 06 0F 5E 16 0F E4 .
00690...6F 67 2E 26 06 0F 1F 0F 1E 59 19 08 1A 85 14 E9 .
006A0...04 18 0F C3 09 C1 01 C3 09 C1 01 19 85 14 E8 18 .
006B0...0F C3 09 C1 01 C3 09 C1 01 C1 06 C1 06 C1 06 C1 .
006C0...07 C1 07 C1 07 59 19 08 58 18 0F C3 09 C1 01 19 .
006D0...85 19 0F 51 E4 1B 0F F4 1C 85 05 64 14 0F E4 5A .
006E0...C0 5A C0 51 EC 6F 67 01 1E E4 1E 0F 1E 5A 1A 08 .
006F0...C3 09 C1 01 58 C3 09 C1 01 19 85 05 61 19 84 1A .
00700...85 1B 0F E4 9A 1C 19 84 9A 43 1B 0F C0 53 F0 9A .
00710...1C 19 84 9A 43 1B 0F C3 09 C1 01 5C 1C 0F 5D 1D .
00720...08 5E 51 F4 46 49 E4 1E 0F 46 1E 0F C0 1E 0F 1F .
00730...0F 19 0F 1A 85 1A 1A 41 19 0F C0 6F 67 19 0F 01 .
00740...1F 19 0F 1A 85 1A 41 19 0F 1E 0F 46 1E 0F C0 6F .
00750...67 19 0F 1A 85 1A 41 19 0F 19 0F 1B 85 14 E8 58 .
00760...C3 09 C1 01 C3 09 C1 01 C1 07 1B 0F F4 5E 19 0F .
00770...5A 51 F4 06 49 E4 1E 0F 19 0F 6F 67 1A 1A 49 E4 .
00780...46 19 0F 1A 1A 49 E4 58 48 18 84 18 84 40 50 F4 .
00790...18 84 99 F4 51 EC 6F 67 99 49 5A C3 09 1F 0F 6F .
007A0...67 C3 09 6F 67 99 49 5A C3 09 1F 0F 6F 67 C3 09 .
007B0...C0 6F 67 99 49 5A C3 09 1F 0F 6F 67 C3 09 6F 67 .
007C0...47 99 49 5A C3 09 1F 0F 6F 67 C3 09 C0 6F 67 1F .
007D0...0F 6F 67 1F 0F 5C 1C 0F C3 09 6F 67 1F 0F 6F 67 .
007E0...1F 0F 5C 1C 0F C3 09 6F 67 59 5A 1A 41 51 F8 58 .
007F0...18 84 99 F4 99 17 F8 5A C0 5A 1A 0F 99 05 05 05 .
00800...05 9A 62 04 04 01 0F 02 0F 6F 67 19 1A 12 F0 19 .
00810...0F C0 1A 0F 5B 1B 0F 6F 67 1E 6F 67 1C 5D 25 F4 .
00820...1B 0F 03 0F 1B 0F 53 F0 FC 5D 2D 19 0F 1D 43 53 .
00830...F0 1C 49 F0 18 84 40 18 84 50 F8 5D 5E 59 5A 1F .
```

PROM WRITING LIST - NCR COMTEN # 6000236-000 REV. AA CONT.

```
00840...47 1F 1E 46 4D E4 5E 06 0F 59 21 0F 1F 0F 1F 08 .
00850...1F 08 59 58 48 E8 49 60 2F 27 1F 08 1E 1F 08 58 .
00860...18 47 16 EC 58 18 84 58 59 5A 6F 67 5B 1C 14 E8 .
00870...64 1C 84 98 98 98 98 99 9A 98 5C 9D 35 9D 9C 43 .
00880...53 FC 58 18 84 18 18 18 59 19 84 18 18 18 58 18 .
00890...84 58 C3 09 C1 01 58 C3 09 C1 01 C1 09 C1 09 C1 .
008A0...08 1A 85 05 1A 84 6F 67 99 49 5A C3 09 1F 0F 6F .
008B0...67 C3 09 6F 67 99 49 5A C3 09 1F 0F 6F 67 C3 09 .
008C0...58 C3 09 C1 01 C1 09 C1 09 C1 08 18 85 05 60 18 .
008D0...0F 18 0F 19 18 0F 58 C3 09 C1 01 C1 09 C1 09 C1 .
008E0...08 C1 08 18 85 05 18 84 1B 85 14 F9 09 58 18 08 .
008F0...98 C3 09 C1 01 18 85 05 1C 18 84 1B 85 14 F9 09 .
00900...98 C3 09 C1 01 58 C3 09 C1 01 C1 09 C1 09 C1 09 .
00910...18 85 18 84 58 C3 09 C1 01 C1 09 C1 09 C1 09 18 .
00920...85 05 60 18 84 D8 68 18 84 D8 D9 D9 58 C3 09 C1 .
00930...01 58 18 84 58 C3 09 C1 0A C1 09 C1 09 C1 09 C1 .
00940...02 6F 67 C1 09 C1 09 C1 09 C1 09 C1 02 6F 67 2F .
00950...08 27 08 58 18 08 C1 02 18 08 C3 09 C1 01 C3 09 .
00960...58 18 08 C1 01 18 08 19 85 6F 67 19 40 18 08 50 .
00970...F4 C3 09 C1 01 58 18 08 58 18 08 18 85 14 E8 58 .
00980...18 85 C1 01 C3 09 C1 01 58 18 85 58 28 85 58 18 .
00990...85 C1 1A 85 14 F8 19 08 49 6F 67 18 C3 09 19 08 .
009A0...51 E5 01 58 18 08 C1 01 58 C3 09 C1 01 18 85 58 .
009B0...18 85 58 20 85 58 18 85 C1 59 19 85 18 85 1F 29 .
009C0...85 58 18 85 1A 08 1F 1A 08 C1 51 F5 07 49 E4 C1 .
009D0...1E 0F 1B 84 63 53 F4 5C 07 4B E4 1E 0F 5D 1C 1C .
009E0...45 55 E4 C1 0F 1E 0F 58 59 1F 0F C7 40 1F 0F 2E .
009F0...11 0F F4 41 26 11 0F F4 41 1F 0F C7 40 C0 C1 0F .
00A00...01 02 01 06 01 01 01 01 01 01 01 01 01 02 04 08 .
00A10...00 04 02 06 01 05 03 07 5B 1B 84 C7 1F 2F 08 27 .
00A20...08 C7 1F 2F 08 5D 6F 67 1C 6C 64 1C 45 55 E4 5B .
00A30...1B 08 C0 32 1B 04 04 04 04 32 1B 04 04 04 32 19 .
00A40...05 05 05 05 32 05 31 C1 59 5A 19 0E 1A 0E 0F C7 .
00A50...1E 0E 1B 0E 0B 0E C3 0A 11 0E E5 0C 12 0E E5 0C .
00A60...1B 0E 0B 0E C3 0A 11 0E E5 0C 12 0E E5 0C 47 6E .
00A70...66 17 FC 1D 0E 55 E5 0C 1C 0E 54 E5 0C C3 0C 5B .
00A80...C7 1F 1A 84 7A F9 0C 5B 1B 84 5B 1B 08 66 6E 67 .
00A90...6F 1E 46 16 F8 66 6E 16 E5 0C 46 16 F8 66 6E 1D .
00AA0...07 1D 46 16 F8 66 6E 59 5A 1D 1C 07 07 15 E5 0C .
00AB0...14 E5 0C 41 E4 42 46 16 F8 C3 0C 5B 1B 08 66 6E .
00AC0...67 6F 9F 1F C6 46 96 F8 66 6E C7 17 E5 0C 46 96 .
00AD0...F8 66 6E 9E C7 C7 9F C6 46 96 F8 66 6E 9E C7 C7 .
00AE0...C7 97 E5 0C 46 96 F8 C3 0C 5B 1B 08 C0 1E 0E 1C .
00AF0...0E 1E 0E 5D 1D 84 1C 1C 1C 1C 1C 1C 1E 1E 45 55 .
00B00...E4 18 19 1A 1B 1D 1F 14 0E E4 16 0E E4 10 E4 11 .
00B10...E4 12 E4 13 E4 15 E4 17 E4 5D 1D 84 1B 14 E4 1B .
00B20...14 E4 1B 14 E4 1B 14 E4 1B 14 E4 1B 14 E4 1F 16 .
00B30...E4 1F 16 E4 45 55 E4 C1 0E C1 0C 66 6E 1E 0E C3 .
00B40...0A 66 6E 1E 0E C3 0A 5D 58 59 5A 5B 5F 1D 84 1C .
00B50...1C 44 1C 44 1C 44 1C 44 1C 44 1C 5E 06 1E 46 1E .
00B60...45 55 E4 5D 5C 5E 50 E4 51 E4 52 E4 53 E4 54 E4 .
00B70...55 E4 56 E4 57 E4 5D 1D 84 1C 1B 14 E4 44 1B 14 .
00B80...E4 44 1B 14 E4 44 1B 14 E4 44 1B 14 E4 44 1B 14 .
00B90...E4 5E 06 1F 16 E4 46 1F 16 E4 45 55 E4 5C 1C 84 .
00BA0...5A 1A 84 5B 5C 5D 9D 9C 9B 9B 9B 9B 9B 9B 9B 5D .
```

PROM WRITING LIST - NCR COMTEN # 600236-000 REV. AA CONT.

```
00BB0...9D 5D 9D 9D 9B 9B 5B 9B 6F 67 9D 5C 7D F8 6F 67 .
00BC0...19 7D F8 18 26 05 05 6D 2E 9E 5D C7 47 EF 1E 47 .
00BD0...BF 4D E4 D0 F8 D8 42 52 E4 5D C3 0B 5D C3 0B 5D .
00BE0...C3 0B 5D C3 0B C0 5A 1A 84 9D 5B 9B 42 52 E4 5A .
00BF0...6D 1A 84 95 F4 D9 42 52 E4 C1 18 84 6F 67 5A 5C .
00C00...1C 84 4F E4 5C 1C 84 5B 52 E4 5A 1A 84 D0 E8 5B .
00C10...D1 E8 5B D0 E8 5B 9C 7C FC 5B 9C 7C FC 5B D7 E8 .
00C20...42 52 E4 5B 10 84 F4 5B 1B 08 C0 5B 1A 84 7A F0 .
00C30...7A F9 5B 1B 08 C0 1A 84 7A F0 C7 1F 2F 08 27 08 .
00C40...C7 1F 2F 08 58 5A 1A 84 5B 9B 9B 5C 9C 5C 4C E4 .
00C50...D0 F8 28 08 0F 59 41 99 5C 4C E4 D6 E8 1C 05 07 .
00C60...51 E4 1F 0E 1B 0E 03 0E 19 05 6F 67 1B 05 42 52 .
00C70...E4 5B 1B 84 C1 00 DF C0 5C 5B 83 94 E4 DE C0 5C .
00C80...5B 83 94 E4 DD DE DE DE C0 5C 5B 83 94 E4 DC C0 .
00C90...5C 5B 83 94 E4 DB C0 5C 5B 83 94 E4 DA 9B C0 DF .
00CA0...5B 1B 5B 1B 84 C0 DF C0 DF C0 5C 5B 83 94 E4 DE .
00CB0...C0 5C 5B 83 94 E4 DD C0 5C 5B 83 94 E4 DC C0 5C .
00CC0...5B 83 94 E4 DB C0 5C 5B 83 94 E4 DA 9B D9 D9 D9 .
00CD0...5B 9B C0 DE F8 D8 C0 D7 E8 D5 F8 D6 F8 D7 F8 58 .
00CE0...90 E4 58 98 DF DD D9 C0 D7 E8 D5 F8 D6 F8 D7 E8 .
00CF0...58 90 F8 98 40 98 DF 50 E4 DF DA C0 D7 E8 D5 E8 .
00D00...D7 F8 58 90 E4 58 98 DF DD DE DE C0 D7 E8 D5 E8 .
00D10...D7 E8 58 90 E4 58 98 DF DC C0 D7 E8 D5 F8 D6 E8 .
00D20...D7 F8 58 90 E4 58 98 DF DD C0 D7 E8 D5 F8 D6 E8 .
00D30...D7 E8 58 90 F0 98 40 98 50 F8 E4 DE C0 DF DF 5B .
00D40...1B 5B 1B 84 C0 DE DF C0 D9 F8 D8 C0 D6 E8 D5 F8 .
00D50...D6 F8 D1 F8 58 90 E4 80 DD D9 C0 D6 E8 D5 F8 D6 .
00D60...F8 D1 E8 58 90 F8 98 DA C0 D6 E8 D5 E8 D1 F8 58 .
00D70...90 E4 58 80 DD DE DB C0 D6 E8 D5 E8 D1 E8 58 90 .
00D80...E4 58 80 DC C0 D6 E8 D5 F8 D6 E8 D1 F8 58 90 E4 .
00D90...58 80 DD C0 D6 E8 D5 F8 D6 E8 D1 E8 99 58 11 F0 .
00DA0...58 11 F8 F0 58 80 C0 DE C0 0D 0D 0D 0D 0D 0D 0D .
00DB0...0C 0C 0C 0C 0C 0C 0C 0C 0C 0C 0C 0C 0D 0D 0D 0C .
00DC0...0C 0C 0C 0C 0C 0C 0C 0C 0C C1 01 C0 C0 C0 C0 C0 .
00DD0...C0 C0 C0 C0 C0 C0 C0 C0 C0 C0 C0 C0 C0 C0 C0 C0 .
00DE0...C0 C0 C0 C0 C0 C0 C0 C0 C0 C0 C0 C0 C0 C0 C0 C0 .
00DF0...C0 C0 C0 C0 C0 C0 C0 C0 C0 C0 C0 C0 C0 C0 C0 C0 .
00E00...C0 C0 C0 C0 C0 C0 C0 C0 C0 C0 C0 C0 C0 C0 C0 C0 .
00E10...C0 C0 C0 C0 C0 C0 C0 C0 C0 C0 C0 C0 C0 C0 C0 C0 .
00E20...C0 C0 C0 C0 C0 C0 C0 C0 C0 C0 C0 C0 C0 C0 C0 C0 .
00E30...C0 C0 C0 C0 C0 C0 C0 C0 C0 C0 C0 C0 C0 C0 C0 C0 .
00E40...C0 C0 C0 C0 C0 C0 C0 C0 C0 C0 C0 C0 C0 C0 C0 C0 .
00E50...C0 C0 C0 C0 C0 C0 C0 C0 C0 C0 C0 C0 C0 C0 C0 C0 .
00E60...C0 C0 C0 C0 C0 C0 C0 C0 C0 C0 C0 C0 C0 C0 C0 C0 .
00E70...C0 C0 C0 C0 C0 C0 C0 C0 C0 C0 C0 C0 C0 C0 C0 C0 .
00E80...C0 C0 C0 C0 C0 C0 C0 C0 C0 C0 C0 C0 C0 C0 C0 C0 .
00E90...C0 C0 C0 C0 C0 C0 C0 C0 C0 C0 C0 C0 C0 C0 C0 C0 .
00EA0...C0 C0 C0 C0 C0 C0 C0 C0 C0 C0 C0 C0 C0 C0 C0 C0 .
00EB0...C0 C0 C0 C0 C0 C0 C0 C0 C0 C0 C0 C0 C0 C0 C0 C0 .
00EC0...C0 C0 C0 C0 C0 C0 C0 C0 C0 C0 C0 C0 C0 C0 C0 C0 .
00ED0...C0 C0 C0 C0 C0 C0 C0 C0 C0 C0 C0 C0 C0 C0 C0 C0 .
00EE0...C0 C0 C0 C0 C0 C0 C0 C0 C0 C0 C0 C0 C0 C0 C0 C0 .
00EF0...C0 C0 C0 C0 C0 C0 C0 C0 C0 C0 C0 C0 C0 C0 C0 C0 .
00F00...C0 C0 C0 C0 C0 C0 C0 C0 C0 C0 C0 C0 C0 C0 C0 C0 .
00F10...C0 C0 C0 C0 C0 C0 C0 C0 C0 C0 C0 C0 C0 C0 C0 C0 .
```

PROM WRITING LIST - NCR COMTEN # 6000236-000 REV . AA CONT.

```
00F20...C0 C0 C0 C0 C0 C0 C0 C0 C0 C0 C0 C0 C0 C0 C0 C0 .
00F30...C0 C0 C0 C0 C0 C0 C0 C0 C0 C0 C0 C0 C0 C0 C0 C0 .
00F40...C0 C0 C0 C0 C0 C0 C0 C0 C0 C0 C0 C0 C0 C0 C0 C0 .
00F50...C0 C0 C0 C0 C0 C0 C0 C0 C0 C0 C0 C0 C0 C0 C0 C0 .
00F60...C0 C0 C0 C0 C0 C0 C0 C0 C0 C0 C0 C0 C0 C0 C0 C0 .
00F70...C0 C0 C0 C0 C0 C0 C0 C0 C0 C0 C0 C0 C0 C0 C0 C0 .
00F80...C0 C0 C0 C0 C0 C0 C0 C0 C0 C0 C0 C0 C0 C0 C0 C0 .
00F90...C0 C0 C0 C0 C0 C0 C0 C0 C0 C0 C0 C0 C0 C0 C0 C0 .
00FA0...C0 C0 C0 C0 C0 C0 C0 C0 C0 C0 C0 C0 C0 C0 C0 C0 .
00FB0...C0 C0 C0 C0 C0 C0 C0 C0 C0 C0 C0 C0 C0 C0 C0 C0 .
00FC0...C0 C0 C0 C0 C0 C0 C0 C0 C0 C0 C0 C0 C0 C0 C0 C0 .
00FD0...C0 C0 C0 C0 C0 C0 C0 C0 C0 C0 C0 C0 C0 C0 C0 C0 .
00FE0...C0 C0 C0 C0 C0 C0 C0 C0 C0 C0 C0 C0 C0 C0 C0 C0 .
00FF0...C0 C0 C0 C0 C0 C0 C0 C0 C0 C0 C0 C0 C0 C0 C0 C0 .
01000...C0 C0 C0 C0 C0 C0 C0 C0 C0 C0 C0 C0 C0 C0 C0 C0 .
01010...C0 C0 C0 C0 C0 C0 C0 C0 C0 C0 C0 C0 C0 C0 C0 C0 .
01020...C0 C0 C0 C0 C0 C0 C0 C0 C0 C0 C0 C0 C0 C0 C0 C0 .
01030...C0 C0 C0 C0 C0 C0 C0 C0 C0 C0 C0 C0 C0 C0 C0 C0 .
01040...C0 C0 C0 C0 C0 C0 C0 C0 C0 C0 C0 C0 C0 C0 C0 C0 .
01050...C0 C0 C0 C0 C0 C0 C0 C0 C0 C0 C0 C0 C0 C0 C0 C0 .
01060...C0 C0 C0 C0 C0 C0 C0 C0 C0 C0 C0 C0 C0 C0 C0 C0 .
01070...C0 C0 C0 C0 C0 C0 C0 C0 C0 C0 C0 C0 C0 C0 C0 C0 .
01080...C0 C0 C0 C0 C0 C0 C0 C0 C0 C0 C0 C0 C0 C0 C0 C0 .
01090...C0 C0 C0 C0 C0 C0 C0 C0 C0 C0 C0 C0 C0 C0 C0 C0 .
010A0...C0 C0 C0 C0 C0 C0 C0 C0 C0 C0 C0 C0 C0 C0 C0 C0 .
010B0...C0 C0 C0 C0 C0 C0 C0 C0 C0 C0 C0 C0 C0 C0 C0 C0 .
010C0...C0 C0 C0 C0 C0 C0 C0 C0 C0 C0 C0 C0 C0 C0 C0 C0 .
010D0...C0 C0 C0 C0 C0 C0 C0 C0 C0 C0 C0 C0 C0 C0 C0 C0 .
010E0...C0 C0 C0 C0 C0 C0 C0 C0 C0 C0 C0 C0 C0 C0 C0 C0 .
010F0...C0 C0 C0 C0 C0 C0 C0 C0 C0 C0 C0 C0 C0 C0 C0 C0 .
01100...C0 C0 C0 C0 C0 C0 C0 C0 C0 C0 C0 C0 C0 C0 C0 C0 .
01110...C0 C0 C0 C0 C0 C0 C0 C0 C0 C0 C0 C0 C0 C0 C0 C0 .
01120...C0 C0 C0 C0 C0 C0 C0 C0 C0 C0 C0 C0 C0 C0 C0 C0 .
01130...C0 C0 C0 C0 C0 C0 C0 C0 C0 C0 C0 C0 C0 C0 C0 C0 .
01140...C0 C0 C0 C0 C0 C0 C0 C0 C0 C0 C0 C0 C0 C0 C0 C0 .
01150...C0 C0 C0 C0 C0 C0 C0 C0 C0 C0 C0 C0 C0 C0 C0 C0 .
01160...C0 C0 C0 C0 C0 C0 C0 C0 C0 C0 C0 C0 C0 C0 C0 C0 .
01170...C0 C0 C0 C0 C0 C0 C0 C0 C0 C0 C0 C0 C0 C0 C0 C0 .
01180...C0 C0 C0 C0 C0 C0 C0 C0 C0 C0 C0 C0 C0 C0 C0 C0 .
01190...C0 C0 C0 C0 C0 C0 C0 C0 C0 C0 C0 C0 C0 C0 C0 C0 .
011A0...C0 C0 C0 C0 C0 C0 C0 C0 C0 C0 C0 C0 C0 C0 C0 C0 .
011B0...C0 C0 C0 C0 C0 C0 C0 C0 C0 C0 C0 C0 C0 C0 C0 C0 .
011C0...C0 C0 C0 C0 C0 C0 C0 C0 C0 C0 C0 C0 C0 C0 C0 C0 .
011D0...C0 C0 C0 C0 C0 C0 C0 C0 C0 C0 C0 C0 C0 C0 C0 C0 .
011E0...C0 C0 C0 C0 C0 C0 C0 C0 C0 C0 C0 C0 C0 C0 C0 C0 .
011F0...C0 C0 C0 C0 C0 C0 C0 C0 C0 C0 C0 C0 C0 C0 C0 C0 .
01200...C0 C0 C0 C0 C0 C0 C0 C0 C0 C0 C0 C0 C0 C0 C0 C0 .
01210...C0 C0 C0 C0 C0 C0 C0 C0 C0 C0 C0 C0 C0 C0 C0 C0 .
01220...C0 C0 C0 C0 C0 C0 C0 C0 C0 C0 C0 C0 C0 C0 C0 C0 .
01230...C0 C0 C0 C0 C0 C0 C0 C0 C0 C0 C0 C0 C0 C0 C0 C0 .
01240...C0 C0 C0 C0 C0 C0 C0 C0 C0 C0 C0 C0 C0 C0 C0 C0 .
01250...C0 C0 C0 C0 C0 C0 C0 C0 C0 C0 C0 C0 C0 C0 C0 C0 .
01260...C0 C0 C0 C0 C0 C0 C0 C0 C0 C0 C0 C0 C0 C0 C0 C0 .
01270...C0 C0 C0 C0 C0 C0 C0 C0 C0 C0 C0 C0 C0 C0 C0 C0 .
01280...C0 C0 C0 C0 C0 C0 C0 C0 C0 C0 C0 C0 C0 C0 C0 C0 .
```

PROM WRITING LIST - NCR CCMTEN # 6000236-000 REV. AA CONT.

```
01290...C0 C0 C0 C0 C0 C0 C0 C0 C0 C0 C0 C0 C0 C0 C0 C0 .
012A0...C0 C0 C0 C0 C0 C0 C0 C0 C0 C0 C0 C0 C0 C0 C0 C0 .
012B0...C0 C0 C0 C0 C0 C0 C0 C0 C0 C0 C0 C0 C0 C0 C0 C0 .
012C0...C0 C0 C0 C0 C0 C0 C0 C0 C0 C0 C0 C0 C0 C0 C0 C0 .
012D0...C0 C0 C0 C0 C0 C0 C0 C0 C0 C0 C0 C0 C0 C0 C0 C0 .
012E0...C0 C0 C0 C0 C0 C0 C0 C0 C0 C0 C0 C0 C0 C0 C0 C0 .
012F0...C0 C0 C0 C0 C0 C0 C0 C0 C0 C0 C0 C0 C0 C0 C0 C0 .
01300...C0 C0 C0 C0 C0 C0 C0 C0 C0 C0 C0 C0 C0 C0 C0 C0 .
01310...C0 C0 C0 C0 C0 C0 C0 C0 C0 C0 C0 C0 C0 C0 C0 C0 .
01320...C0 C0 C0 C0 C0 C0 C0 C0 C0 C0 C0 C0 C0 C0 C0 C0 .
01330...C0 C0 C0 C0 C0 C0 C0 C0 C0 C0 C0 C0 C0 C0 C0 C0 .
01340...C0 C0 C0 C0 C0 C0 C0 C0 C0 C0 C0 C0 C0 C0 C0 C0 .
01350...C0 C0 C0 C0 C0 C0 C0 C0 C0 C0 C0 C0 C0 C0 C0 C0 .
01360...C0 C0 C0 C0 C0 C0 C0 C0 C0 C0 C0 C0 C0 C0 C0 C0 .
01370...C0 C0 C0 C0 C0 C0 C0 C0 C0 C0 C0 C0 C0 C0 C0 C0 .
01380...C0 C0 C0 C0 C0 C0 C0 C0 C0 C0 C0 C0 C0 C0 C0 C0 .
01390...C0 C0 C0 C0 C0 C0 C0 C0 C0 C0 C0 C0 C0 C0 C0 C0 .
013A0...C0 C0 C0 C0 C0 C0 C0 C0 C0 C0 C0 C0 C0 C0 C0 C0 .
013B0...C0 C0 C0 C0 C0 C0 C0 C0 C0 C0 C0 C0 C0 C0 C0 C0 .
013C0...C0 C0 C0 C0 C0 C0 C0 C0 C0 C0 C0 C0 C0 C0 C0 C0 .
013D0...C0 C0 C0 C0 C0 C0 C0 C0 C0 C0 C0 C0 C0 C0 C0 C0 .
013E0...C0 C0 C0 C0 C0 C0 C0 C0 C0 C0 C0 C0 C0 C0 C0 C0 .
013F0...C0 C0 C0 C0 C0 C0 C0 C0 C0 C0 C0 C0 C0 C0 C0 C0 .
01400...C0 C0 C0 C0 C0 C0 C0 C0 C0 C0 C0 C0 C0 C0 C0 C0 .
01410...C0 C0 C0 C0 C0 C0 C0 C0 C0 C0 C0 C0 C0 C0 C0 C0 .
01420...C0 C0 C0 C0 C0 C0 C0 C0 C0 C0 C0 C0 C0 C0 C0 C0 .
01430...C0 C0 C0 C0 C0 C0 C0 C0 C0 C0 C0 C0 C0 C0 C0 C0 .
01440...C0 C0 C0 C0 C0 C0 C0 C0 C0 C0 C0 C0 C0 C0 C0 C0 .
01450...C0 C0 C0 C0 C0 C0 C0 C0 C0 C0 C0 C0 C0 C0 C0 C0 .
01460...C0 C0 C0 C0 C0 C0 C0 C0 C0 C0 C0 C0 C0 C0 C0 C0 .
01470...C0 C0 C0 C0 C0 C0 C0 C0 C0 C0 C0 C0 C0 C0 C0 C0 .
01480...C0 C0 C0 C0 C0 C0 C0 C0 C0 C0 C0 C0 C0 C0 C0 C0 .
01490...C0 C0 C0 C0 C0 C0 C0 C0 C0 C0 C0 C0 C0 C0 C0 C0 .
014A0...C0 C0 C0 C0 C0 C0 C0 C0 C0 C0 C0 C0 C0 C0 C0 C0 .
014B0...C0 C0 C0 C0 C0 C0 C0 C0 C0 C0 C0 C0 C0 C0 C0 C0 .
014C0...C0 C0 C0 C0 C0 C0 C0 C0 C0 C0 C0 C0 C0 C0 C0 C0 .
014D0...C0 C0 C0 C0 C0 C0 C0 C0 C0 C0 C0 C0 C0 C0 C0 C0 .
014E0...C0 C0 C0 C0 C0 C0 C0 C0 C0 C0 C0 C0 C0 C0 C0 C0 .
014F0...C0 C0 C0 C0 C0 C0 C0 C0 C0 C0 C0 C0 C0 C0 C0 C0 .
01500...C0 C0 C0 C0 C0 C0 C0 C0 C0 C0 C0 C0 C0 C0 C0 C0 .
01510...C0 C0 C0 C0 C0 C0 C0 C0 C0 C0 C0 C0 C0 C0 C0 C0 .
01520...C0 C0 C0 C0 C0 C0 C0 C0 C0 C0 C0 C0 C0 C0 C0 C0 .
01530...C0 C0 C0 C0 C0 C0 C0 C0 C0 C0 C0 C0 C0 C0 C0 C0 .
01540...C0 C0 C0 C0 C0 C0 C0 C0 C0 C0 C0 C0 C0 C0 C0 C0 .
01550...C0 C0 C0 C0 C0 C0 C0 C0 C0 C0 C0 C0 C0 C0 C0 C0 .
01560...C0 C0 C0 C0 C0 C0 C0 C0 C0 C0 C0 C0 C0 C0 C0 C0 .
01570...C0 C0 C0 C0 C0 C0 C0 C0 C0 C0 C0 C0 C0 C0 C0 C0 .
01580...C0 C0 C0 C0 C0 C0 C0 C0 C0 C0 C0 C0 C0 C0 C0 C0 .
01590...C0 C0 C0 C0 C0 C0 C0 C0 C0 C0 C0 C0 C0 C0 C0 C0 .
015A0...C0 C0 C0 C0 C0 C0 C0 C0 C0 C0 C0 C0 C0 C0 C0 C0 .
015B0...C0 C0 C0 C0 C0 C0 C0 C0 C0 C0 C0 C0 C0 C0 C0 C0 .
015C0...C0 C0 C0 C0 C0 C0 C0 C0 C0 C0 C0 C0 C0 C0 C0 C0 .
015D0...C0 C0 C0 C0 C0 C0 C0 C0 C0 C0 C0 C0 C0 C0 C0 C0 .
015E0...C0 C0 C0 C0 C0 C0 C0 C0 C0 C0 C0 C0 C0 C0 C0 C0 .
015F0...C0 C0 C0 C0 C0 C0 C0 C0 C0 C0 C0 C0 C0 C0 C0 C0 .
```

PROM WRITING LIST - NCR COMTEN # 6000236-000 REV. AA CONT.

```
01600...C0 C0 C0 C0 C0 C0 C0 C0 C0 C0 C0 C0 C0 C0 C0 C0 .
01610...C0 C0 C0 C0 C0 C0 C0 C0 C0 C0 C0 C0 C0 C0 C0 C0 .
01620...C0 C0 C0 C0 C0 C0 C0 C0 C0 C0 C0 C0 C0 C0 C0 C0 .
01630...C0 C0 C0 C0 C0 C0 C0 C0 C0 C0 C0 C0 C0 C0 C0 C0 .
01640...C0 C0 C0 C0 C0 C0 C0 C0 C0 C0 C0 C0 C0 C0 C0 C0 .
01650...C0 C0 C0 C0 C0 C0 C0 C0 C0 C0 C0 C0 C0 C0 C0 C0 .
01660...C0 C0 C0 C0 C0 C0 C0 C0 C0 C0 C0 C0 C0 C0 C0 C0 .
01670...C0 C0 C0 C0 C0 C0 C0 C0 C0 C0 C0 C0 C0 C0 C0 C0 .
01680...C0 C0 C0 C0 C0 C0 C0 C0 C0 C0 C0 C0 C0 C0 C0 C0 .
01690...C0 C0 C0 C0 C0 C0 C0 C0 C0 C0 C0 C0 C0 C0 C0 C0 .
016A0...C0 C0 C0 C0 C0 C0 C0 C0 C0 C0 C0 C0 C0 C0 C0 C0 .
016B0...C0 C0 C0 C0 C0 C0 C0 C0 C0 C0 C0 C0 C0 C0 C0 C0 .
016C0...C0 C0 C0 C0 C0 C0 C0 C0 C0 C0 C0 C0 C0 C0 C0 C0 .
016D0...C0 C0 C0 C0 C0 C0 C0 C0 C0 C0 C0 C0 C0 C0 C0 C0 .
016E0...C0 C0 C0 C0 C0 C0 C0 C0 C0 C0 C0 C0 C0 C0 C0 C0 .
016F0...C0 C0 C0 C0 C0 C0 C0 C0 C0 C0 C0 C0 C0 C0 C0 C0 .
01700...C0 C0 C0 C0 C0 C0 C0 C0 C0 C0 C0 C0 C0 C0 C0 C0 .
01710...C0 C0 C0 C0 C0 C0 C0 C0 C0 C0 C0 C0 C0 C0 C0 C0 .
01720...C0 C0 C0 C0 C0 C0 C0 C0 C0 C0 C0 C0 C0 C0 C0 C0 .
01730...C0 C0 C0 C0 C0 C0 C0 C0 C0 C0 C0 C0 C0 C0 C0 C0 .
01740...C0 C0 C0 C0 C0 C0 C0 C0 C0 C0 C0 C0 C0 C0 C0 C0 .
01750...C0 C0 C0 C0 C0 C0 C0 C0 C0 C0 C0 C0 C0 C0 C0 C0 .
01760...C0 C0 C0 C0 C0 C0 C0 C0 C0 C0 C0 C0 C0 C0 C0 C0 .
01770...C0 C0 C0 C0 C0 C0 C0 C0 C0 C0 C0 C0 C0 C0 C0 C0 .
01780...C0 C0 C0 C0 C0 C0 C0 C0 C0 C0 C0 C0 C0 C0 C0 C0 .
01790...C0 C0 C0 C0 C0 C0 C0 C0 C0 C0 C0 C0 C0 C0 C0 C0 .
017A0...C0 C0 C0 C0 C0 C0 C0 C0 C0 C0 C0 C0 C0 C0 C0 C0 .
017B0...C0 C0 C0 C0 C0 C0 C0 C0 C0 C0 C0 C0 C0 C0 C0 C0 .
017C0...C0 C0 C0 C0 C0 C0 C0 C0 C0 C0 C0 C0 C0 C0 C0 C0 .
017D0...C0 C0 C0 C0 C0 C0 C0 C0 C0 C0 C0 C0 C0 C0 C0 C0 .
017E0...C0 C0 C0 C0 C0 C0 C0 C0 C0 C0 C0 C0 C0 C0 C0 C0 .
017F0...C0 C0 C0 C0 C0 C0 C0 C0 C0 C0 C0 C0 C0 C0 C0 C0 .
01800...C0 C0 C0 C0 C0 C0 C0 C0 C0 C0 C0 C0 C0 C0 C0 C0 .
01810...C0 C0 C0 C0 C0 C0 C0 C0 C0 C0 C0 C0 C0 C0 C0 C0 .
01820...C0 C0 C0 C0 C0 C0 C0 C0 C0 C0 C0 C0 C0 C0 C0 C0 .
01830...C0 C0 C0 C0 C0 C0 C0 C0 C0 C0 C0 C0 C0 C0 C0 C0 .
01840...C0 C0 C0 C0 C0 C0 C0 C0 C0 C0 C0 C0 C0 C0 C0 C0 .
01850...C0 C0 C0 C0 C0 C0 C0 C0 C0 C0 C0 C0 C0 C0 C0 C0 .
01860...C0 C0 C0 C0 C0 C0 C0 C0 C0 C0 C0 C0 C0 C0 C0 C0 .
01870...C0 C0 C0 C0 C0 C0 C0 C0 C0 C0 C0 C0 C0 C0 C0 C0 .
01880...C0 C0 C0 C0 C0 C0 C0 C0 C0 C0 C0 C0 C0 C0 C0 C0 .
01890...C0 C0 C0 C0 C0 C0 C0 C0 C0 C0 C0 C0 C0 C0 C0 C0 .
018A0...C0 C0 C0 C0 C0 C0 C0 C0 C0 C0 C0 C0 C0 C0 C0 C0 .
018B0...C0 C0 C0 C0 C0 C0 C0 C0 C0 C0 C0 C0 C0 C0 C0 C0 .
018C0...C0 C0 C0 C0 C0 C0 C0 C0 C0 C0 C0 C0 C0 C0 C0 C0 .
018D0...C0 C0 C0 C0 C0 C0 C0 C0 C0 C0 C0 C0 C0 C0 C0 C0 .
018E0...C0 C0 C0 C0 C0 C0 C0 C0 C0 C0 C0 C0 C0 C0 C0 C0 .
018F0...C0 C0 C0 C0 C0 C0 C0 C0 C0 C0 C0 C0 C0 C0 C0 C0 .
01900...C0 C0 C0 C0 C0 C0 C0 C0 C0 C0 C0 C0 C0 C0 C0 C0 .
01910...C0 C0 C0 C0 C0 C0 C0 C0 C0 C0 C0 C0 C0 C0 C0 C0 .
01920...C0 C0 C0 C0 C0 C0 C0 C0 C0 C0 C0 C0 C0 C0 C0 C0 .
01930...C0 C0 C0 C0 C0 C0 C0 C0 C0 C0 C0 C0 C0 C0 C0 C0 .
01940...C0 C0 C0 C0 C0 C0 C0 C0 C0 C0 C0 C0 C0 C0 C0 C0 .
01950...C0 C0 C0 C0 C0 C0 C0 C0 C0 C0 C0 C0 C0 C0 C0 C0 .
01960...C0 C0 C0 C0 C0 C0 C0 C0 C0 C0 C0 C0 C0 C0 C0 C0 .
```

PROM WRITING LIST - NCR COMTEN # 6000236-000 REV. AA CONT.

```
01970...C0 C0 C0 C0 C0 C0 C0 C0 C0 C0 C0 C0 C0 C0 C0 C0 .
01980...C0 C0 C0 C0 C0 C0 C0 C0 C0 C0 C0 C0 C0 C0 C0 C0 .
01990...C0 C0 C0 C0 C0 C0 C0 C0 C0 C0 C0 C0 C0 C0 C0 C0 .
019A0...C0 C0 C0 C0 C0 C0 C0 C0 C0 C0 C0 C0 C0 C0 C0 C0 .
019B0...C0 C0 C0 C0 C0 C0 C0 C0 C0 C0 C0 C0 C0 C0 C0 C0 .
019C0...C0 C0 C0 C0 C0 C0 C0 C0 C0 C0 C0 C0 C0 C0 C0 C0 .
019D0...C0 C0 C0 C0 C0 C0 C0 C0 C0 C0 C0 C0 C0 C0 C0 C0 .
019E0...C0 C0 C0 C0 C0 C0 C0 C0 C0 C0 C0 C0 C0 C0 C0 C0 .
019F0...C0 C0 C0 C0 C0 C0 C0 C0 C0 C0 C0 C0 C0 C0 C0 C0 .
01A00...C0 C0 C0 C0 C0 C0 C0 C0 C0 C0 C0 C0 C0 C0 C0 C0 .
01A10...C0 C0 C0 C0 C0 C0 C0 C0 C0 C0 C0 C0 C0 C0 C0 C0 .
01A20...C0 C0 C0 C0 C0 C0 C0 C0 C0 C0 C0 C0 C0 C0 C0 C0 .
01A30...C0 C0 C0 C0 C0 C0 C0 C0 C0 C0 C0 C0 C0 C0 C0 C0 .
01A40...C0 C0 C0 C0 C0 C0 C0 C0 C0 C0 C0 C0 C0 C0 C0 C0 .
01A50...C0 C0 C0 C0 C0 C0 C0 C0 C0 C0 C0 C0 C0 C0 C0 C0 .
01A60...C0 C0 C0 C0 C0 C0 C0 C0 C0 C0 C0 C0 C0 C0 C0 C0 .
01A70...C0 C0 C0 C0 C0 C0 C0 C0 C0 C0 C0 C0 C0 C0 C0 C0 .
01A80...C0 C0 C0 C0 C0 C0 C0 C0 C0 C0 C0 C0 C0 C0 C0 C0 .
01A90...C0 C0 C0 C0 C0 C0 C0 C0 C0 C0 C0 C0 C0 C0 C0 C0 .
01AA0...C0 C0 C0 C0 C0 C0 C0 C0 C0 C0 C0 C0 C0 C0 C0 C0 .
01AB0...C0 C0 C0 C0 C0 C0 C0 C0 C0 C0 C0 C0 C0 C0 C0 C0 .
01AC0...C0 C0 C0 C0 C0 C0 C0 C0 C0 C0 C0 C0 C0 C0 C0 C0 .
01AD0...C0 C0 C0 C0 C0 C0 C0 C0 C0 C0 C0 C0 C0 C0 C0 C0 .
01AE0...C0 C0 C0 C0 C0 C0 C0 C0 C0 C0 C0 C0 C0 C0 C0 C0 .
01AF0...C0 C0 C0 C0 C0 C0 C0 C0 C0 C0 C0 C0 C0 C0 C0 C0 .
01B00...C0 C0 C0 C0 C0 C0 C0 C0 C0 C0 C0 C0 C0 C0 C0 C0 .
01B10...C0 C0 C0 C0 C0 C0 C0 C0 C0 C0 C0 C0 C0 C0 C0 C0 .
01B20...C0 C0 C0 C0 C0 C0 C0 C0 C0 C0 C0 C0 C0 C0 C0 C0 .
01B30...C0 C0 C0 C0 C0 C0 C0 C0 C0 C0 C0 C0 C0 C0 C0 C0 .
01B40...C0 C0 C0 C0 C0 C0 C0 C0 C0 C0 C0 C0 C0 C0 C0 C0 .
01B50...C0 C0 C0 C0 C0 C0 C0 C0 C0 C0 C0 C0 C0 C0 C0 C0 .
01B60...C0 C0 C0 C0 C0 C0 C0 C0 C0 C0 C0 C0 C0 C0 C0 C0 .
01B70...C0 C0 C0 C0 C0 C0 C0 C0 C0 C0 C0 C0 C0 C0 C0 C0 .
01B80...C0 C0 C0 C0 C0 C0 C0 C0 C0 C0 C0 C0 C0 C0 C0 C0 .
01B90...C0 C0 C0 C0 C0 C0 C0 C0 C0 C0 C0 C0 C0 C0 C0 C0 .
01BA0...C0 C0 C0 C0 C0 C0 C0 C0 C0 C0 C0 C0 C0 C0 C0 C0 .
01BB0...C0 C0 C0 C0 C0 C0 C0 C0 C0 C0 C0 C0 C0 C0 C0 C0 .
01BC0...C0 C0 C0 C0 C0 C0 C0 C0 C0 C0 C0 C0 C0 C0 C0 C0 .
01BD0...C0 C0 C0 C0 C0 C0 C0 C0 C0 C0 C0 C0 C0 C0 C0 C0 .
01BE0...C0 C0 C0 C0 C0 C0 C0 C0 C0 C0 C0 C0 C0 C0 C0 C0 .
01BF0...C0 C0 C0 C0 C0 C0 C0 C0 C0 C0 C0 C0 C0 C0 C0 C0 .
01C00...C0 C0 C0 C0 C0 C0 C0 C0 C0 C0 C0 C0 C0 C0 C0 C0 .
01C10...C0 C0 C0 C0 C0 C0 C0 C0 C0 C0 C0 C0 C0 C0 C0 C0 .
01C20...C0 C0 C0 C0 C0 C0 C0 C0 C0 C0 C0 C0 C0 C0 C0 C0 .
01C30...C0 C0 C0 C0 C0 C0 C0 C0 C0 C0 C0 C0 C0 C0 C0 C0 .
01C40...C0 C0 C0 C0 C0 C0 C0 C0 C0 C0 C0 C0 C0 C0 C0 C0 .
01C50...C0 C0 C0 C0 C0 C0 C0 C0 C0 C0 C0 C0 C0 C0 C0 C0 .
01C60...C0 C0 C0 C0 C0 C0 C0 C0 C0 C0 C0 C0 C0 C0 C0 C0 .
01C70...C0 C0 C0 C0 C0 C0 C0 C0 C0 C0 C0 C0 C0 C0 C0 C0 .
01C80...C0 C0 C0 C0 C0 C0 C0 C0 C0 C0 C0 C0 C0 C0 C0 C0 .
01C90...C0 C0 C0 C0 C0 C0 C0 C0 C0 C0 C0 C0 C0 C0 C0 C0 .
01CA0...C0 C0 C0 C0 C0 C0 C0 C0 C0 C0 C0 C0 C0 C0 C0 C0 .
01CB0...C0 C0 C0 C0 C0 C0 C0 C0 C0 C0 C0 C0 C0 C0 C0 C0 .
01CC0...C0 C0 C0 C0 C0 C0 C0 C0 C0 C0 C0 C0 C0 C0 C0 C0 .
01CD0...C0 C0 C0 C0 C0 C0 C0 C0 C0 C0 C0 C0 C0 C0 C0 C0 .
```

PROM WRITING LIST - NCR COMTEN # 6000236-000 REV. AA CONT.

```
01CE0...C0 C0 C0 C0 C0 C0 C0 C0 C0 C0 C0 C0 C0 C0 C0 C0 .
01CF0...C0 C0 C0 C0 C0 C0 C0 C0 C0 C0 C0 C0 C0 C0 C0 C0 .
01D00...C0 C0 C0 C0 C0 C0 C0 C0 C0 C0 C0 C0 C0 C0 C0 C0 .
01D10...C0 C0 C0 C0 C0 C0 C0 C0 C0 C0 C0 C0 C0 C0 C0 C0 .
01D20...C0 C0 C0 C0 C0 C0 C0 C0 C0 C0 C0 C0 C0 C0 C0 C0 .
01D30...C0 C0 C0 C0 C0 C0 C0 C0 C0 C0 C0 C0 C0 C0 C0 C0 .
01D40...C0 C0 C0 C0 C0 C0 C0 C0 C0 C0 C0 C0 C0 C0 C0 C0 .
01D50...C0 C0 C0 C0 C0 C0 C0 C0 C0 C0 C0 C0 C0 C0 C0 C0 .
01D60...C0 C0 C0 C0 C0 C0 C0 C0 C0 C0 C0 C0 C0 C0 C0 C0 .
01D70...C0 C0 C0 C0 C0 C0 C0 C0 C0 C0 C0 C0 C0 C0 C0 C0 .
01D80...C0 C0 C0 C0 C0 C0 C0 C0 C0 C0 C0 C0 C0 C0 C0 C0 .
01D90...C0 C0 C0 C0 C0 C0 C0 C0 C0 C0 C0 C0 C0 C0 C0 C0 .
01DA0...C0 C0 C0 C0 C0 C0 C0 C0 C0 C0 C0 C0 C0 C0 C0 C0 .
01DB0...C0 C0 C0 C0 C0 C0 C0 C0 C0 C0 C0 C0 C0 C0 C0 C0 .
01DC0...C0 C0 C0 C0 C0 C0 C0 C0 C0 C0 C0 C0 C0 C0 C0 C0 .
01DD0...C0 C0 C0 C0 C0 C0 C0 C0 C0 C0 C0 C0 C0 C0 C0 C0 .
01DE0...C0 C0 C0 C0 C0 C0 C0 C0 C0 C0 C0 C0 C0 C0 C0 C0 .
01DF0...C0 C0 C0 C0 C0 C0 C0 C0 C0 C0 C0 C0 C0 C0 C0 C0 .
01E00...C0 C0 C0 C0 C0 C0 C0 C0 C0 C0 C0 C0 C0 C0 C0 C0 .
01E10...C0 C0 C0 C0 C0 C0 C0 C0 C0 C0 C0 C0 C0 C0 C0 C0 .
01E20...C0 C0 C0 C0 C0 C0 C0 C0 C0 C0 C0 C0 C0 C0 C0 C0 .
01E30...C0 C0 C0 C0 C0 C0 C0 C0 C0 C0 C0 C0 C0 C0 C0 C0 .
01E40...C0 C0 C0 C0 C0 C0 C0 C0 C0 C0 C0 C0 C0 C0 C0 C0 .
01E50...C0 C0 C0 C0 C0 C0 C0 C0 C0 C0 C0 C0 C0 C0 C0 C0 .
01E60...C0 C0 C0 C0 C0 C0 C0 C0 C0 C0 C0 C0 C0 C0 C0 C0 .
01E70...C0 C0 C0 C0 C0 C0 C0 C0 C0 C0 C0 C0 C0 C0 C0 C0 .
01E80...C0 C0 C0 C0 C0 C0 C0 C0 C0 C0 C0 C0 C0 C0 C0 C0 .
01E90...C0 C0 C0 C0 C0 C0 C0 C0 C0 C0 C0 C0 C0 C0 C0 C0 .
01EA0...C0 C0 C0 C0 C0 C0 C0 C0 C0 C0 C0 C0 C0 C0 C0 C0 .
01EB0...C0 C0 C0 C0 C0 C0 C0 C0 C0 C0 C0 C0 C0 C0 C0 C0 .
01EC0...C0 C0 C0 C0 C0 C0 C0 C0 C0 C0 C0 C0 C0 C0 C0 C0 .
01ED0...C0 C0 C0 C0 C0 C0 C0 C0 C0 C0 C0 C0 C0 C0 C0 C0 .
01EE0...C0 C0 C0 C0 C0 C0 C0 C0 C0 C0 C0 C0 C0 C0 C0 C0 .
01EF0...C0 C0 C0 C0 C0 C0 C0 C0 C0 C0 C0 C0 C0 C0 C0 C0 .
01F00...C0 C0 C0 C0 C0 C0 C0 C0 C0 C0 C0 C0 C0 C0 C0 C0 .
01F10...C0 C0 C0 C0 C0 C0 C0 C0 C0 C0 C0 C0 C0 C0 C0 C0 .
01F20...C0 C0 C0 C0 C0 C0 C0 C0 C0 C0 C0 C0 C0 C0 C0 C0 .
01F30...C0 C0 C0 C0 C0 C0 C0 C0 C0 C0 C0 C0 C0 C0 C0 C0 .
01F40...C0 C0 C0 C0 C0 C0 C0 C0 C0 C0 C0 C0 C0 C0 C0 C0 .
01F50...C0 C0 C0 C0 C0 C0 C0 C0 C0 C0 C0 C0 C0 C0 C0 C0 .
01F60...C0 C0 C0 C0 C0 C0 C0 C0 C0 C0 C0 C0 C0 C0 C0 C0 .
01F70...C0 C0 C0 C0 C0 C0 C0 C0 C0 C0 C0 C0 C0 C0 C0 C0 .
01F80...C0 C0 C0 C0 C0 C0 C0 C0 C0 C0 C0 C0 C0 C0 C0 C0 .
01F90...C0 C0 C0 C0 C0 C0 C0 C0 C0 C0 C0 C0 C0 C0 C0 C0 .
01FA0...C0 C0 C0 C0 C0 C0 C0 C0 C0 C0 C0 C0 C0 C0 C0 C0 .
01FB0...C0 C0 C0 C0 C0 C0 C0 C0 C0 C0 C0 C0 C0 C0 C0 C0 .
01FC0...C0 C0 C0 C0 C0 C0 C0 C0 C0 C0 C0 C0 C0 C0 C0 C0 .
01FD0...C0 C0 C0 C0 C0 C0 C0 C0 C0 C0 C0 C0 C0 C0 C0 C0 .
01FE0...C0 C0 C0 C0 C0 C0 C0 C0 C0 C0 C0 C0 C0 C0 C0 C0 .
01FF0...C0 C0 C0 C0 C0 C0 C0 C0 C0 C0 C0 01 31 00 EE FF .
```

PROM WRITING LIST - NCR COMTEN # 6000236-001 REV. AA

CHECKSUM = 6A91

```
00000...10 0A 08 02 60 61 62 63 64 65 66 98 FF 08 1D 03 .
00010...2E 08 3E 08 0D 90 18 0A 18 16 90 CA 00 18 FF 90 .
00020...16 0B 18 16 98 FF 0B 18 FF 90 16 98 FF 09 99 00 .
00030...18 FF 09 25 09 65 09 90 AF 03 90 BC 90 16 08 09 .
00040...07 18 16 00 18 FF 90 16 08 18 16 00 18 FF 90 16 .
00050...09 18 16 00 18 FF 90 16 98 16 04 34 01 18 16 10 .
00060...18 FF 00 0C 00 8A 84 00 00 F3 0C 1A 07 18 FC 3C .
00070...BC 8C 18 FC 3C BC 0C 18 FC 40 41 44 45 42 05 43 .
00080...FE D4 84 53 52 01 0F 9E 80 18 FF 18 FF 90 16 0C .
00090...18 16 80 18 FF 00 18 FF 90 16 98 02 FF 07 02 18 .
000A0...16 90 CA 04 03 18 16 00 18 FF 80 90 B9 90 16 04 .
000B0...18 16 00 18 FF 18 71 C0 18 70 90 C9 09 05 05 18 .
000C0...16 04 06 18 16 00 18 FF 90 16 10 14 00 0F 84 00 .
000D0...71 01 82 84 FD 60 61 18 FC 18 00 18 01 18 02 18 .
000E0...03 98 FF 89 18 FF 00 18 FC 40 41 42 44 45 50 51 .
000F0...52 55 01 08 8D 98 FF 09 18 FF 20 00 00 A0 01 3F .
00100...FF 86 86 00 08 02 20 01 87 83 08 17 87 0F FF 20 .
00110...01 87 83 90 14 A0 98 03 09 90 1C 85 09 1C 09 02 .
00120...0D 00 18 24 18 25 18 03 80 90 B9 90 16 98 02 18 .
00130...24 00 18 25 18 2A 18 2B 0C 98 2C 0A 08 18 2C 00 .
00140...18 03 90 16 01 54 98 24 19 06 01 [illegible] FB 90 16 B1 .
00150...98 25 09 E1 71 73 B1 E3 1A 49 8E CB 4C 5C 69 AB .
00160...F0 16 71 71 64 B9 71 68 9B C5 DB 0A 19 31 39 45 .
00170...58 90 16 90 5E 90 65 90 79 98 25 98 02 08 28 70 .
00180...01 18 2B 02 09 98 03 0A 22 90 88 90 16 90 26 90 .
00190...27 3F FF 86 18 90 28 90 29 A0 01 10 26 10 27 98 .
001A0...03 08 08 00 18 2B 90 88 90 16 80 02 12 90 B9 90 .
001B0...16 90 5E 90 65 90 B9 90 92 98 03 08 20 90 26 90 .
001C0...27 3F FF 86 1A 1F FF 86 04 FF FF 02 A0 10 28 02 .
001D0...18 2B 03 18 25 01 10 26 10 27 90 92 80 02 12 90 .
001E0...B9 90 16 90 5E 90 65 90 E9 90 26 90 27 0F FF 86 .
001F0...0D 80 00 86 21 8F FF 86 05 FF FF 86 19 98 02 60 .
00200...01 06 98 03 08 10 0D 10 26 10 27 98 03 08 05 90 .
00210...88 90 16 80 02 12 90 B9 90 16 90 5E 90 65 90 20 .
00220...98 03 08 1F 90 26 90 27 0F FF 86 0D 80 00 86 15 .
00230...8F FF 86 05 FF FF 86 0D E0 01 10 26 10 27 90 AD .
00240...90 16 80 02 12 90 B9 90 16 90 5E 90 65 90 4F 98 .
00250...2B 98 02 08 28 70 01 18 2B 98 03 08 05 90 88 90 .
00260...16 98 04 98 27 08 08 80 18 FC 98 27 07 09 98 28 .
00270...90 28 90 29 02 77 F1 40 0E 41 0C 42 0A 43 08 44 .
00280...06 45 04 46 02 47 80 90 B9 90 16 90 5E 90 65 90 .
00290...93 90 92 98 03 08 06 80 90 B9 90 16 98 04 98 27 .
002A0...08 08 80 18 FC 98 27 07 09 02 AC F1 C0 0E C1 0C .
002B0...C2 0A C3 08 C4 06 C5 04 C6 02 C7 09 01 18 28 06 .
002C0...04 10 28 02 18 2B 03 18 25 90 92 90 5E 90 65 90 .
002D0...D3 90 92 98 03 08 06 80 90 B9 90 16 84 00 00 00 .
002E0...71 01 10 83 98 04 08 08 81 18 00 98 04 08 98 27 .
002F0...08 81 18 FC C2 98 27 08 10 05 C4 C5 00 44 45 10 .
00300...05 C4 C5 C5 12 C5 C5 0F 04 C0 C1 00 40 41 10 05 .
00310...C0 C1 C1 03 C1 C1 42 05 90 10 18 FF 01 00 82 18 .
00320...FF 02 03 C8 00 8E 0E C6 00 40 44 05 80 10 18 FF .
00330...01 00 82 18 FF 0E C6 10 28 46 42 98 27 08 04 44 .
00340...45 03 40 41 02 18 2B 03 18 25 90 92 90 5E 90 65 .
```

PROM WRITING LIST - NCR COMTEN # 6000236-001 REV. AA CONT.

```
00350...90 52 80 90 B9 90 26 90 27 A0 90 16 90 5E 90 60 .
00360...98 02 18 17 80 90 B9 90 16 90 5E 90 65 90 6F 98 .
00370...03 08 90 8A 08 1E 98 2B 01 01 90 7F 01 90 80 01 .
00380...98 2B F1 01 18 2B 90 AD 90 16 98 27 10 04 08 0E .
00390...01 98 04 0A 0A 18 FC 98 17 3D 10 02 0A 98 04 0A .
003A0...8A 18 FC 98 17 3D 80 90 B9 90 16 90 5E 90 65 90 .
003B0...B3 90 D0 98 27 10 04 08 0D 01 98 04 0A 0A 18 FC .
003C0...00 3D 10 02 09 98 04 0A 8A 18 FC 00 3D 03 18 25 .
003D0...98 03 08 90 EB 08 1E 98 2B 01 01 90 E0 01 90 E1 .
003E0...01 98 2B F1 01 18 2B 90 AD 90 16 80 90 B9 90 16 .
003F0...90 5E 90 65 90 F6 98 03 08 90 11 08 1E 98 2B 01 .
00400...01 90 06 01 90 07 01 98 2B F1 01 18 2B 90 AD 90 .
00410...16 80 90 B9 90 16 90 5E 90 65 90 1E 90 39 90 20 .
00420...04 10 1E 10 98 2B B1 01 18 2B 10 28 03 18 25 90 .
00430...AD 90 16 90 22 04 10 28 94 98 03 08 90 5F 90 28 .
00440...10 1E 17 98 2B B1 03 08 01 18 2B 90 AD 90 16 04 .
00450...10 28 81 18 2B 90 AD 90 16 90 22 04 10 28 A5 80 .
00460...90 B9 90 16 90 7A 90 8E 90 DB 90 36 90 95 90 BF .
00470...90 2E 90 4E 90 7F 90 16 90 AB 98 5B 09 04 00 18 .
00480...5A 00 18 66 80 18 68 01 18 25 90 88 90 16 98 5E .
00490...09 24 0F 50 98 5A 98 02 71 01 18 5A 06 3A 02 18 .
004A0...25 0F 50 E0 E1 10 50 01 18 52 04 98 53 2A 0F 54 .
004B0...E0 E1 10 54 23 98 66 03 0A 0F 50 98 02 71 01 18 .
004C0...66 16 01 18 66 06 11 0F 50 E0 E1 10 50 02 18 25 .
004D0...18 2A 98 5B 0B 18 5B 90 88 90 16 98 52 00 0D 01 .
004E0...23 04 43 05 90 7F 11 18 68 90 16 98 67 0F 08 03 .
004F0...0B 04 18 25 90 95 03 18 25 90 36 13 18 68 0A 18 .
00500...25 90 AB 98 53 06 06 18 25 90 2E 03 04 0F 02 0E .
00510...0F 54 E0 FF 09 E1 FC 06 05 18 25 90 BF 13 18 68 .
00520...0A 18 25 90 AB 98 67 0F 06 07 18 25 90 4E 0A 18 .
00530...25 13 18 68 90 AB 0F 50 98 5A 98 02 71 01 18 5A .
00540...90 50 01 10 50 06 01 82 22 98 03 0B 02 0C 98 5B .
00550...89 18 5B 98 68 90 B9 90 16 90 50 0B 98 5B 8B 18 .
00560...5B 00 18 25 90 7A 90 88 90 16 0F 56 E0 E1 90 54 .
00570...90 5C A0 90 54 01 10 54 90 5C 10 5E 98 03 09 07 .
00580...98 68 90 B9 90 16 90 50 06 00 18 25 90 7A 06 18 .
00590...5A 90 88 90 16 90 54 90 5C 98 02 60 90 54 01 10 .
005A0...54 90 5C 10 60 01 10 50 98 03 0A 07 98 68 90 B9 .
005B0...90 16 00 10 50 06 00 18 25 90 7A 90 88 90 16 0F .
005C0...50 98 5A 98 02 71 01 18 5A 01 10 50 0A 22 98 03 .
005D0...0B 0C 98 5B 8C 18 5B 98 68 90 B9 90 16 00 10 50 .
005E0...0B 00 18 25 98 5B 8C 18 5B 90 7A 90 88 90 16 98 .
005F0...53 18 67 0F 62 87 0F 56 03 F2 32 01 83 98 67 03 .
00600...06 90 60 10 5C 05 90 5E 10 5C 00 03 0F 62 F2 00 .
00610...0B 09 0B 01 02 08 86 01 8A 06 08 2E 90 5C 71 98 .
00620...03 0D 07 98 68 90 B9 90 16 00 18 25 90 7A 90 54 .
00630...98 02 60 01 10 54 10 50 98 03 0A 07 98 68 90 B9 .
00640...90 16 00 10 50 05 10 25 90 7A 90 88 90 16 0F 50 .
00650...98 5A 98 02 71 01 18 5A 01 10 50 00 10 50 1D 0F .
00660...56 E0 E1 90 5C 90 54 90 5C A0 01 10 5E 00 18 25 .
00670...98 03 0A 90 7A 98 68 90 B9 90 16 90 88 90 16 0F .
00680...50 98 5A 98 02 71 01 18 5A 01 10 50 00 10 50 18 .
00690...0F 56 E0 E1 90 5C 90 54 60 00 18 25 98 03 0A 90 .
006A0...7A 98 68 90 B9 90 16 90 88 90 16 98 03 09 07 98 .
006B0...68 90 B9 90 16 90 88 90 16 90 C5 90 CF 90 F9 90 .
```

PROM WRITING LIST - NCR COMTEN # 6000236-001 REV. AA CONT.

```
006C0...2D 90 3B 90 4F 01 18 25 00 18 69 90 88 90 16 98 .
006D0...02 18 6A 01 0F 98 70 0A 98 04 0C 07 18 71 03 05 .
006E0...0E 02 0C 14 10 08 6E 81 F1 04 90 60 71 04 18 25 .
006F0...90 88 90 16 14 90 B9 90 16 98 04 09 07 18 FC 98 .
00700...02 98 69 0A 50 89 18 FC 50 01 18 69 0B 01 0D 51 .
00710...89 18 FC 51 01 18 69 90 88 90 16 00 18 69 03 18 .
00720...25 00 00 04 80 01 82 10 6C 40 10 6E 01 90 6C 90 .
00730...6E 98 69 98 02 31 71 01 18 69 21 08 6E 98 6A 81 .
00740...F1 98 69 98 02 71 01 18 69 90 60 01 10 60 0D 0F .
00750...76 98 69 98 02 71 01 18 69 18 72 98 03 0B 06 80 .
00760...90 B9 90 16 90 88 90 16 90 6A 98 70 1B 00 98 71
00770...80 00 04 82 01 82 10 74 98 72 0F 76 F1 31 01 83 .
00780...40 98 72 F1 31 01 83 00 01 18 FC 98 FC 01 08 3E .
00790...18 FC 86 88 09 1C 04 20 86 01 80 90 CA 10 9E 04 .
007A0...00 90 D0 04 60 86 01 80 90 CA 10 9E 04 40 90 D0 .
007B0...A5 0E 50 86 09 40 90 CA 10 9E 04 00 90 D0 0E 50 .
007C0...20 86 09 40 90 CA 10 9E 04 40 90 D0 C1 0A 00 10 .
007D0...A4 0F AC 10 A6 1F 18 A8 90 E5 0A 10 10 A4 0F CC .
007E0...10 A6 0F 18 A8 90 E5 84 00 00 00 71 01 10 83 00 .
007F0...18 FC 86 41 87 09 03 01 02 00 18 A9 D1 09 09 09 .
00800...09 D1 0F 09 0A 98 A9 98 A9 0F AC F1 F2 81 04 18 .
00810...AA 03 18 AA 00 18 AB 0F CC 87 84 00 B3 08 F4 0A .
00820...98 AB 98 AA 18 AB 0F 06 8C 08 80 98 AA 74 01 10 .
00830...66 B3 01 86 98 FC 01 18 FC 08 C8 08 00 3E 7E 86 .
00840...40 31 32 80 01 86 03 10 60 FC 18 60 90 60 10 1E .
00850...10 20 0F FF 03 02 01 FC 81 80 10 22 87 90 1E 00 .
00860...60 01 87 83 10 18 FF 00 0C 05 84 00 00 F3 0C 10 .
00870...07 18 FC 40 41 44 45 42 43 55 FE D4 84 53 52 01 .
00880...0F 94 00 18 FC 40 41 42 08 18 FC 40 41 42 80 18 .
00890...FF 80 90 B9 90 16 15 90 B9 90 16 90 5E 90 65 90 .
008A0...A1 98 04 0A 18 FC 04 20 86 01 80 90 CA 10 9E 04 .
008B0...00 90 D0 04 60 86 01 80 90 CA 10 9E 04 40 90 D0 .
008C0...80 90 B9 90 16 90 5E 90 65 90 CE 98 04 08 07 18 .
008D0...71 98 70 88 18 70 80 90 B9 90 16 90 5E 90 65 90 .
008E0...E3 90 F5 98 04 08 18 FC 98 03 0B 90 05 03 18 25 .
008F0...D4 90 AD 90 16 98 04 08 08 18 FC 98 03 0B 90 05 .
00900...D5 90 AD 90 16 80 90 B9 90 16 90 5E 90 65 90 10 .
00910...98 02 18 FF 80 90 B9 90 16 90 5E 90 65 90 1F 98 .
00920...04 08 07 18 FC BC 08 18 FC BC C1 C5 80 90 B9 90 .
00930...16 00 18 FF 80 90 B9 90 18 90 5E 90 65 90 41 90 .
00940...20 08 10 90 4F 90 5E 90 65 90 4D 90 20 08 0C 10 .
00950...26 10 27 03 18 25 90 20 98 0F 90 B9 90 16 90 88 .
00960...01 18 25 90 16 98 2A 98 02 08 26 70 01 18 2A 02 .
00970...05 90 88 90 16 02 18 25 00 18 2A 98 03 08 06 00 .
00980...18 03 90 39 90 88 90 16 00 18 03 01 18 04 10 18 .
00990...01 A0 98 03 0A 13 98 2B 01 08 28 F1 90 AD 18 2B .
009A0...00 90 16 02 18 25 90 16 80 90 B9 90 16 18 00 00 .
009B0...18 03 FE 18 04 10 18 01 A0 00 18 03 18 00 89 18 .
009C0...04 12 18 01 98 2C 8A 18 2C A0 00 A0 82 01 82 A0 .
009D0...10 A0 98 FC 07 00 05 80 84 01 82 90 9E 00 B5 75 .
009E0...01 20 84 80 A0 10 A2 00 00 90 A4 B0 01 90 A6 71 .
009F0...18 A8 0C 01 71 18 A8 07 01 90 A4 B0 01 90 80 A2 .
00A00...01 03 02 0C 01 01 01 01 01 01 01 01 02 04 08 10 .
00A10...08 0C 0A 0E 09 0D 0B 0F 20 18 FF C0 FC 10 0C 10 .
00A20...0D C0 FD 10 0E 00 84 00 85 08 0F 75 01 10 86 20 .
```

PROM WRITING LIST - NCR COMTEN # 6000236-001 REV. AA CONT.

```
00A30...18 0F 16 83 82 0B 0B 0B 0B 83 82 0A 0A 0A 81 83 .
00A40...0B 0B 0B 0B 83 0B 83 A0 FF FF 18 53 18 52 87 A0 .
00A50...10 50 98 50 10 52 90 33 18 53 90 36 18 52 90 36 .
00A60...98 51 10 52 90 33 18 53 90 36 18 52 90 36 01 1F .
00A70...FE 86 A3 98 53 F0 90 36 98 52 B8 90 36 90 2B 80 .
00A80...80 FF 98 FF 01 90 33 20 18 FF 30 18 0F 00 00 00 .
00A90...10 20 02 87 83 00 00 A0 90 33 02 87 85 00 00 A0 .
00AA0...0D 20 01 87 85 00 00 00 00 81 82 0D 0C A0 90 33 .
00AB0...A1 90 33 02 02 01 02 87 8F 90 2B 30 18 0F 00 20 .
00AC0...00 40 24 86 E0 01 24 84 00 20 E0 86 90 3A 01 24 .
00AD0...86 00 20 26 26 27 A6 E0 01 24 87 00 20 26 26 27 .
00AE0...E0 26 90 3A 01 24 89 90 2B 40 18 0F 4F 10 50 98 .
00AF0...53 90 52 00 18 FC 40 41 42 43 44 45 46 47 01 10 .
00B00...8C 84 84 84 84 84 86 18 53 30 10 52 2D 84 2B 84 .
00B10...29 84 27 84 25 84 23 86 21 00 18 FC C0 83 1B C1 .
00B20...83 18 C2 83 15 C3 83 12 C4 83 0F C5 83 0C C6 87 .
00B30...09 C7 87 06 01 10 9C 80 50 90 3A 55 55 10 52 90 .
00B40...ED AA AA 10 52 90 ED 00 08 09 0A 0B 0F 18 FC 85 .
00B50...40 10 41 10 42 10 43 10 44 10 45 60 85 46 10 47 .
00B60...01 10 95 0D 0C 0E 08 AE 09 B0 0A B2 0B B4 0C B6 .
00B70...0D B8 0E BA 0F BC 00 18 FC 85 C0 83 C3 10 C1 83 .
00B80...C7 10 C2 83 CB 10 C3 83 CF 10 C4 83 D3 10 C5 83 .
00B90...D7 60 85 C6 87 DC 10 C7 87 E0 01 10 A5 10 18 FF .
00BA0...00 18 FC 00 E8 02 42 50 52 53 55 40 44 02 03 CC .
00BB0...51 F8 41 45 43 01 40 00 0D A9 F0 00 01 04 0D B9 .
00BC0...8C 02 02 8C 84 0D 0D 04 85 04 10 A0 01 04 60 02 .
00BD0...04 01 87 54 02 80 01 10 B7 AA 90 E6 55 90 E6 00 .
00BE0...90 E6 FF 90 E6 15 00 18 FC 55 8C 50 01 10 87 00 .
00BF0...01 18 FC 54 02 00 01 10 87 A0 98 11 36 00 00 80 .
00C00...18 FF 01 81 00 18 FF D0 00 2A 00 18 FC 00 12 50 .
00C10...00 22 B0 01 1F 60 80 3E 1B 70 81 7E 17 C0 00 14 .
00C20...01 10 97 A0 18 11 0D 10 18 0F 10 80 98 FF 01 04 .
00C30...02 A0 90 18 0F 05 98 FF 02 87 C0 FC 10 0C 10 0D .
00C40...C0 FD 10 0E 08 00 18 FC 00 52 55 E8 50 08 01 81 .
00C50...54 17 18 0F 87 00 02 55 08 01 81 54 04 81 0C 84 .
00C60...3E 8B 10 52 98 52 98 53 82 09 08 10 71 06 02 08 .
00C70...AA 00 18 FF 90 17 80 28 05 01 02 02 02 80 21 04 .
00C80...01 02 02 02 80 53 D2 55 17 03 01 02 02 02 80 10 .
00C90...02 01 02 02 02 80 09 01 01 02 02 02 80 43 01 45 .
00CA0...FF 42 00 18 FF 00 41 87 80 83 05 01 02 02 02 80 .
00CB0...8A 04 01 02 02 02 80 91 03 01 02 02 02 80 98 02 .
00CC0...01 02 02 02 80 9F 01 01 02 02 02 80 43 53 D2 55 .
00CD0...8F 50 AC 52 6A 81 68 50 65 45 63 45 61 55 5F 03 .
00CE0...03 5C 04 03 D5 C5 81 57 50 54 45 52 45 50 55 4E .
00CF0...02 03 4B 83 01 03 D5 03 03 55 81 43 50 40 45 3E .
00D00...55 3C 05 03 39 06 03 55 45 C5 81 33 50 30 45 2E .
00D10...55 2C 04 03 29 05 03 55 81 25 50 22 45 20 45 1E .
00D20...55 1C 06 03 19 07 03 D5 81 15 50 12 45 10 45 0E .
00D30...55 0C 07 03 09 83 01 03 09 05 03 81 01 50 44 FF .
00D40...42 00 18 FF 00 50 40 88 52 83 81 85 50 88 41 8A .
00D50...41 8C 40 8E 01 03 91 03 C1 81 94 50 97 41 99 41 .
00D60...9B 40 9D 01 03 A0 03 81 A2 50 A5 41 A7 40 A9 03 .
00D70...03 AC 01 03 41 C1 81 E1 50 B4 41 B6 40 B8 02 03 .
00D80...EB 01 03 81 BE 50 C1 41 C3 41 C5 40 C7 04 03 CA .
00D90...01 03 81 CD 50 D0 41 D2 41 D4 40 D6 83 06 80 DA .
```

PROM WRITING LIST - NCR COMTEN # 6000236-001 REV. AA CONT.

```
00DA0...05 80 DD 04 01 03 E0 81 E3 4C 5B 69 78 85 94 48 .
00DB0...C6 BF B8 B1 AA A8 A6 A6 A6 D7 E8 FC 0C 1A 2A D3 .
00DC0...97 90 89 7F 78 76 9F 9F 9F 90 16 00 00 00 00 00 .
00DD0...00 00 00 00 00 00 00 00 00 00 00 00 00 00 00 00 .
00DE0...00 00 00 00 00 00 00 00 00 00 00 00 00 00 00 00 .
00DF0...00 00 00 00 00 00 00 00 00 00 00 00 00 00 00 00 .
00E00...00 00 00 00 00 00 00 00 00 00 00 00 00 00 00 00 .
00E10...00 00 00 00 00 00 00 00 00 00 00 00 00 00 00 00 .
00E20...00 00 00 00 00 00 00 00 00 00 00 00 00 00 00 00 .
00E30...00 00 00 00 00 00 00 00 00 00 00 00 00 00 00 00 .
00E40...00 00 00 00 00 00 00 00 00 00 00 00 00 00 00 00 .
00E50...00 00 00 00 00 00 00 00 00 00 00 00 00 00 00 00 .
00E60...00 00 00 00 00 00 00 00 00 00 00 00 00 00 00 00 .
00E70...00 00 00 00 00 00 00 00 00 00 00 00 00 00 00 00 .
00E80...00 00 00 00 00 00 00 00 00 00 00 00 00 00 00 00 .
00E90...00 00 00 00 00 00 00 00 00 00 00 00 00 00 00 00 .
00EA0...00 00 00 00 00 00 00 00 00 00 00 00 00 00 00 00 .
00EB0...00 00 00 00 00 00 00 00 00 00 00 00 00 00 00 00 .
00EC0...00 00 00 00 00 00 00 00 00 00 00 00 00 00 00 00 .
00ED0...00 00 00 00 00 00 00 00 00 00 00 00 00 00 00 00 .
00EE0...00 00 00 00 00 00 00 00 00 00 00 00 00 00 00 00 .
00EF0...00 00 00 00 00 00 00 00 00 00 00 00 00 00 00 00 .
00F00...00 00 00 00 00 00 00 00 00 00 00 00 00 00 00 00 .
00F10...00 00 00 00 00 00 00 00 00 00 00 00 00 00 00 00 .
00F20...00 00 00 00 00 00 00 00 00 00 00 00 00 00 00 00 .
00F30...00 00 00 00 00 00 00 00 00 00 00 00 00 00 00 00 .
00F40...00 00 00 00 00 00 00 00 00 00 00 00 00 00 00 00 .
00F50...00 00 00 00 00 00 00 00 00 00 00 00 00 00 00 00 .
00F60...00 00 00 00 00 00 00 00 00 00 00 00 00 00 00 00 .
00F70...00 00 00 00 00 00 00 00 00 00 00 00 00 00 00 00 .
00F80...00 00 00 00 00 00 00 00 00 00 00 00 00 00 00 00 .
00F90...00 00 00 00 00 00 00 00 00 00 00 00 00 00 00 00 .
00FA0...00 00 00 00 00 00 00 00 00 00 00 00 00 00 00 00 .
00FB0...00 00 00 00 00 00 00 00 00 00 00 00 00 00 00 00 .
00FC0...00 00 00 00 00 00 00 00 00 00 00 00 00 00 00 00 .
00FD0...00 00 00 00 00 00 00 00 00 00 00 00 00 00 00 00 .
00FE0...00 00 00 00 00 00 00 00 00 00 00 00 00 00 00 00 .
00FF0...00 00 00 00 00 00 00 00 00 00 00 00 00 00 00 00 .
01000...00 00 00 00 00 00 00 00 00 00 00 00 00 00 00 00 .
01010...00 00 00 00 00 00 00 00 00 00 00 00 00 00 00 00 .
01020...00 00 00 00 00 00 00 00 00 00 00 00 00 00 00 00 .
01030...00 00 00 00 00 00 00 00 00 00 00 00 00 00 00 00 .
01040...00 00 00 00 00 00 00 00 00 00 00 00 00 00 00 00 .
01050...00 00 00 00 00 00 00 00 00 00 00 00 00 00 00 00 .
01060...00 00 00 00 00 00 00 00 00 00 00 00 00 00 00 00 .
01070...00 00 00 00 00 00 00 00 00 00 00 00 00 00 00 00 .
01080...00 00 00 00 00 00 00 00 00 00 00 00 00 00 00 00 .
01090...00 00 00 00 00 00 00 00 00 00 00 00 00 00 00 00 .
010A0...00 00 00 00 00 00 00 00 00 00 00 00 00 00 00 00 .
010B0...00 00 00 00 00 00 00 00 00 00 00 00 00 00 00 00 .
010C0...00 00 00 00 00 00 00 00 00 00 00 00 00 00 00 00 .
010D0...00 00 00 00 00 00 00 00 00 00 00 00 00 00 00 00 .
010E0...00 00 00 00 00 00 00 00 00 00 00 00 00 00 00 00 .
010F0...00 00 00 00 00 00 00 00 00 00 00 00 00 00 00 00 .
01100...00 00 00 00 00 00 00 00 00 00 00 00 00 00 00 00 .
```

PROM WRITING LIST - NCR COMTEN # 6000236-001 REV. AA CONT.

```
01110...00 00 00 00 00 00 00 00 00 00 00 00 00 00 00 00 .
01120...00 00 00 00 00 00 00 00 00 00 00 00 00 00 00 00 .
01130...00 00 00 00 00 00 00 00 00 00 00 00 00 00 00 00 .
01140...00 00 00 00 00 00 00 00 00 00 00 00 00 00 00 00 .
01150...00 00 00 00 00 00 00 00 00 00 00 00 00 00 00 00 .
01160...00 00 00 00 00 00 00 00 00 00 00 00 00 00 00 00 .
01170...00 00 00 00 00 00 00 00 00 00 00 00 00 00 00 00 .
01180...00 00 00 00 00 00 00 00 00 00 00 00 00 00 00 00 .
01190...00 00 00 00 00 00 00 00 00 00 00 00 00 00 00 00 .
011A0...00 00 00 00 00 00 00 00 00 00 00 00 00 00 00 00 .
011B0...00 00 00 00 00 00 00 00 00 00 00 00 00 00 00 00 .
011C0...00 00 00 00 00 00 00 00 00 00 00 00 00 00 00 00 .
011D0...00 00 00 00 00 00 00 00 00 00 00 00 00 00 00 00 .
011E0...00 00 00 00 00 00 00 00 00 00 00 00 00 00 00 00 .
011F0...00 00 00 00 00 00 00 00 00 00 00 00 00 00 00 00 .
01200...00 00 00 00 00 00 00 00 00 00 00 00 00 00 00 00 .
01210...00 00 00 00 00 00 00 00 00 00 00 00 00 00 00 00 .
01220...00 00 00 00 00 00 00 00 00 00 00 00 00 00 00 00 .
01230...00 00 00 00 00 00 00 00 00 00 00 00 00 00 00 00 .
01240...00 00 00 00 00 00 00 00 00 00 00 00 00 00 00 00 .
01250...00 00 00 00 00 00 00 00 00 00 00 00 00 00 00 00 .
01260...00 00 00 00 00 00 00 00 00 00 00 00 00 00 00 00 .
01270...00 00 00 00 00 00 00 00 00 00 00 00 00 00 00 00 .
01280...00 00 00 00 00 00 00 00 00 00 00 00 00 00 00 00 .
01290...00 00 00 00 00 00 00 00 00 00 00 00 00 00 00 00 .
012A0...00 00 00 00 00 00 00 00 00 00 00 00 00 00 00 00 .
012B0...00 00 00 00 00 00 00 00 00 00 00 00 00 00 00 00 .
012C0...00 00 00 00 00 00 00 00 00 00 00 00 00 00 00 00 .
012D0...00 00 00 00 00 00 00 00 00 00 00 00 00 00 00 00 .
012E0...00 00 00 00 00 00 00 00 00 00 00 00 00 00 00 00 .
012F0...00 00 00 00 00 00 00 00 00 00 00 00 00 00 00 00 .
01300...00 00 00 00 00 00 00 00 00 00 00 00 00 00 00 00 .
01310...00 00 00 00 00 00 00 00 00 00 00 00 00 00 00 00 .
01320...00 00 00 00 00 00 00 00 00 00 00 00 00 00 00 00 .
01330...00 00 00 00 00 00 00 00 00 00 00 00 00 00 00 00 .
01340...00 00 00 00 00 00 00 00 00 00 00 00 00 00 00 00 .
01350...00 00 00 00 00 00 00 00 00 00 00 00 00 00 00 00 .
01360...00 00 00 00 00 00 00 00 00 00 00 00 00 00 00 00 .
01370...00 00 00 00 00 00 00 00 00 00 00 00 00 00 00 00 .
01380...00 00 00 00 00 00 00 00 00 00 00 00 00 00 00 00 .
01390...00 00 00 00 00 00 00 00 00 00 00 00 00 00 00 00 .
013A0...00 00 00 00 00 00 00 00 00 00 00 00 00 00 00 00 .
013B0...00 00 00 00 00 00 00 00 00 00 00 00 00 00 00 00 .
013C0...00 00 00 00 00 00 00 00 00 00 00 00 00 00 00 00 .
013D0...00 00 00 00 00 00 00 00 00 00 00 00 00 00 00 00 .
013E0...00 00 00 00 00 00 00 00 00 00 00 00 00 00 00 00 .
013F0...00 00 00 00 00 00 00 00 00 00 00 00 00 00 00 00 .
01400...00 00 00 00 00 00 00 00 00 00 00 00 00 00 00 00 .
01410...00 00 00 00 00 00 00 00 00 00 00 00 00 00 00 00 .
01420...00 00 00 00 00 00 00 00 00 00 00 00 00 00 00 00 .
01430...00 00 00 00 00 00 00 00 00 00 00 00 00 00 00 00 .
01440...00 00 00 00 00 00 00 00 00 00 00 00 00 00 00 00 .
01450...00 00 00 00 00 00 00 00 00 00 00 00 00 00 00 00 .
01460...00 00 00 00 00 00 00 00 00 00 00 00 00 00 00 00 .
01470...00 00 00 00 00 00 00 00 00 00 00 00 00 00 00 00 .
```

PROM WRITING LIST - NCR COMTEN # 6000236-001 REV. AA CONT.

```
01480...00 00 00 00 00 00 00 00 00 00 00 00 00 00 00 00 .
01490...00 00 00 00 00 00 00 00 00 00 00 00 00 00 00 00 .
014A0...00 00 00 00 00 00 00 00 00 00 00 00 00 00 00 00 .
014B0...00 00 00 00 00 00 00 00 00 00 00 00 00 00 00 00 .
014C0...00 00 00 00 00 00 00 00 00 00 00 00 00 00 00 00 .
014D0...00 00 00 00 00 00 00 00 00 00 00 00 00 00 00 00 .
014E0...00 00 00 00 00 00 00 00 00 00 00 00 00 00 00 00 .
014F0...00 00 00 00 00 00 00 00 00 00 00 00 00 00 00 00 .
01500...00 00 00 00 00 00 00 00 00 00 00 00 00 00 00 00 .
01510...00 00 00 00 00 00 00 00 00 00 00 00 00 00 00 00 .
01520...00 00 00 00 00 00 00 00 00 00 00 00 00 00 00 00 .
01530...00 00 00 00 00 00 00 00 00 00 00 00 00 00 00 00 .
01540...00 00 00 00 00 00 00 00 00 00 00 00 00 00 00 00 .
01550...00 00 00 00 00 00 00 00 00 00 00 00 00 00 00 00 .
01560...00 00 00 00 00 00 00 00 00 00 00 00 00 00 00 00 .
01570...00 00 00 00 00 00 00 00 00 00 00 00 00 00 00 00 .
01580...00 00 00 00 00 00 00 00 00 00 00 00 00 00 00 00 .
01590...00 00 00 00 00 00 00 00 00 00 00 00 00 00 00 00 .
015A0...00 00 00 00 00 00 00 00 00 00 00 00 00 00 00 00 .
015B0...00 00 00 00 00 00 00 00 00 00 00 00 00 00 00 00 .
015C0...00 00 00 00 00 00 00 00 00 00 00 00 00 00 00 00 .
015D0...00 00 00 00 00 00 00 00 00 00 00 00 00 00 00 00 .
015E0...00 00 00 00 00 00 00 00 00 00 00 00 00 00 00 00 .
015F0...00 00 00 00 00 00 00 00 00 00 00 00 00 00 00 00 .
01600...00 00 00 00 00 00 00 00 00 00 00 00 00 00 00 00 .
01610...00 00 00 00 00 00 00 00 00 00 00 00 00 00 00 00 .
01620...00 00 00 00 00 00 00 00 00 00 00 00 00 00 00 00 .
01630...00 00 00 00 00 00 00 00 00 00 00 00 00 00 00 00 .
01640...00 00 00 00 00 00 00 00 00 00 00 00 00 00 00 00 .
01650...00 00 00 00 00 00 00 00 00 00 00 00 00 00 00 00 .
01660...00 00 00 00 00 00 00 00 00 00 00 00 00 00 00 00 .
01670...00 00 00 00 00 00 00 00 00 00 00 00 00 00 00 00 .
01680...00 00 00 00 00 00 00 00 00 00 00 00 00 00 00 00 .
01690...00 00 00 00 00 00 00 00 00 00 00 00 00 00 00 00 .
016A0...00 00 00 00 00 00 00 00 00 00 00 00 00 00 00 00 .
016B0...00 00 00 00 00 00 00 00 00 00 00 00 00 00 00 00 .
016C0...00 00 00 00 00 00 00 00 00 00 00 00 00 00 00 00 .
016D0...00 00 00 00 00 00 00 00 00 00 00 00 00 00 00 00 .
016E0...00 00 00 00 00 00 00 00 00 00 00 00 00 00 00 00 .
016F0...00 00 00 00 00 00 00 00 00 00 00 00 00 00 00 00 .
01700...00 00 00 00 00 00 00 00 00 00 00 00 00 00 00 00 .
01710...00 00 00 00 00 00 00 00 00 00 00 00 00 00 00 00 .
01720...00 00 00 00 00 00 00 00 00 00 00 00 00 00 00 00 .
01730...00 00 00 00 00 00 00 00 00 00 00 00 00 00 00 00 .
01740...00 00 00 00 00 00 00 00 00 00 00 00 00 00 00 00 .
01750...00 00 00 00 00 00 00 00 00 00 00 00 00 00 00 00 .
01760...00 00 00 00 00 00 00 00 00 00 00 00 00 00 00 00 .
01770...00 00 00 00 00 00 00 00 00 00 00 00 00 00 00 00 .
01780...00 00 00 00 00 00 00 00 00 00 00 00 00 00 00 00 .
01790...00 00 00 00 00 00 00 00 00 00 00 00 00 00 00 00 .
017A0...00 00 00 00 00 00 00 00 00 00 00 00 00 00 00 00 .
017B0...00 00 00 00 00 00 00 00 00 00 00 00 00 00 00 00 .
017C0...00 00 00 00 00 00 00 00 00 00 00 00 00 00 00 00 .
017D0...00 00 00 00 00 00 00 00 00 00 00 00 00 00 00 00 .
017E0...00 00 00 00 00 00 00 00 00 00 00 00 00 00 00 00 .
```

PROM WRITING LIST - NCR COMTEN # 6000236-001 REV. AA CONT.

```
017F0...00 00 00 00 00 00 00 00 00 00 00 00 00 00 00 00 .
01800...00 00 00 00 00 00 00 00 00 00 00 00 00 00 00 00 .
01810...00 00 00 00 00 00 00 00 00 00 00 00 00 00 00 00 .
01820...00 00 00 00 00 00 00 00 00 00 00 00 00 00 00 00 .
01830...00 00 00 00 00 00 00 00 00 00 00 00 00 00 00 00 .
01840...00 00 00 00 00 00 00 00 00 00 00 00 00 00 00 00 .
01850...00 00 00 00 00 00 00 00 00 00 00 00 00 00 00 00 .
01860...00 00 00 00 00 00 00 00 00 00 00 00 00 00 00 00 .
01870...00 00 00 00 00 00 00 00 00 00 00 00 00 00 00 00 .
01880...00 00 00 00 00 00 00 00 00 00 00 00 00 00 00 00 .
01890...00 00 00 00 00 00 00 00 00 00 00 00 00 00 00 00 .
018A0...00 00 00 00 00 00 00 00 00 00 00 00 00 00 00 00 .
018B0...00 00 00 00 00 00 00 00 00 00 00 00 00 00 00 00 .
018C0...00 00 00 00 00 00 00 00 00 00 00 00 00 00 00 00 .
018D0...00 00 00 00 00 00 00 00 00 00 00 00 00 00 00 00 .
018E0...00 00 00 00 00 00 00 00 00 00 00 00 00 00 00 00 .
018F0...00 00 00 00 00 00 00 00 00 00 00 00 00 00 00 00 .
01900...00 00 00 00 00 00 00 00 00 00 00 00 00 00 00 00 .
01910...00 00 00 00 00 00 00 00 00 00 00 00 00 00 00 00 .
01920...00 00 00 00 00 00 00 00 00 00 00 00 00 00 00 00 .
01930...00 00 00 00 00 00 00 00 00 00 00 00 00 00 00 00 .
01940...00 00 00 00 00 00 00 00 00 00 00 00 00 00 00 00 .
01950...00 00 00 00 00 00 00 00 00 00 00 00 00 00 00 00 .
01960...00 00 00 00 00 00 00 00 00 00 00 00 00 00 00 00 .
01970...00 00 00 00 00 00 00 00 00 00 00 00 00 00 00 00 .
01980...00 00 00 00 00 00 00 00 00 00 00 00 00 00 00 00 .
01990...00 00 00 00 00 00 00 00 00 00 00 00 00 00 00 00 .
019A0...00 00 00 00 00 00 00 00 00 00 00 00 00 00 00 00 .
019B0...00 00 00 00 00 00 00 00 00 00 00 00 00 00 00 00 .
019C0...00 00 00 00 00 00 00 00 00 00 00 00 00 00 00 00 .
019D0...00 00 00 00 00 00 00 00 00 00 00 00 00 00 00 00 .
019E0...00 00 00 00 00 00 00 00 00 00 00 00 00 00 00 00 .
019F0...00 00 00 00 00 00 00 00 00 00 00 00 00 00 00 00 .
01A00...00 00 00 00 00 00 00 00 00 00 00 00 00 00 00 00 .
01A10...00 00 00 00 00 00 00 00 00 00 00 00 00 00 00 00 .
01A20...00 00 00 00 00 00 00 00 00 00 00 00 00 00 00 00 .
01A30...00 00 00 00 00 00 00 00 00 00 00 00 00 00 00 00 .
01A40...00 00 00 00 00 00 00 00 00 00 00 00 00 00 00 00 .
01A50...00 00 00 00 00 00 00 00 00 00 00 00 00 00 00 00 .
01A60...00 00 00 00 00 00 00 00 00 00 00 00 00 00 00 00 .
01A70...00 00 00 00 00 00 00 00 00 00 00 00 00 00 00 00 .
01A80...00 00 00 00 00 00 00 00 00 00 00 00 00 00 00 00 .
01A90...00 00 00 00 00 00 00 00 00 00 00 00 00 00 00 00 .
01AA0...00 00 00 00 00 00 00 00 00 00 00 00 00 00 00 00 .
01AB0...00 00 00 00 00 00 00 00 00 00 00 00 00 00 00 00 .
01AC0...00 00 00 00 00 00 00 00 00 00 00 00 00 00 00 00 .
01AD0...00 00 00 00 00 00 00 00 00 00 00 00 00 00 00 00 .
01AE0...00 00 00 00 00 00 00 00 00 00 00 00 00 00 00 00 .
01AF0...00 00 00 00 00 00 00 00 00 00 00 00 00 00 00 00 .
01B00...00 00 00 00 00 00 00 00 00 00 00 00 00 00 00 00 .
01B10...00 00 00 00 00 00 00 00 00 00 00 00 00 00 00 00 .
01B20...00 00 00 00 00 00 00 00 00 00 00 00 00 00 00 00 .
01B30...00 00 00 00 00 00 00 00 00 00 00 00 00 00 00 00 .
01B40...00 00 00 00 00 00 00 00 00 00 00 00 00 00 00 00 .
01B50...00 00 00 00 00 00 00 00 00 00 00 00 00 00 00 00 .
```

PROM WRITING LIST - NCR COMTEN # 6000236-001 REV. AA CONT.

```
01B60...00 00 00 00 00 00 00 00 00 00 00 00 00 00 00 00 .
01B70...00 00 00 00 00 00 00 00 00 00 00 00 00 00 00 00 .
01B80...00 00 00 00 00 00 00 00 00 00 00 00 00 00 00 00 .
01B90...00 00 00 00 00 00 00 00 00 00 00 00 00 00 00 00 .
01BA0...00 00 00 00 00 00 00 00 00 00 00 00 00 00 00 00 .
01BB0...00 00 00 00 00 00 00 00 00 00 00 00 00 00 00 00 .
01BC0...00 00 00 00 00 00 00 00 00 00 00 00 00 00 00 00 .
01BD0...00 00 00 00 00 00 00 00 00 00 00 00 00 00 00 00 .
01BE0...00 00 00 00 00 00 00 00 00 00 00 00 00 00 00 00 .
01BF0...00 00 00 00 00 00 00 00 00 00 00 00 00 00 00 00 .
01C00...00 00 00 00 00 00 00 00 00 00 00 00 00 00 00 00 .
01C10...00 00 00 00 00 00 00 00 00 00 00 00 00 00 00 00 .
01C20...00 00 00 00 00 00 00 00 00 00 00 00 00 00 00 00 .
01C30...00 00 00 00 00 00 00 00 00 00 00 00 00 00 00 00 .
01C40...00 00 00 00 00 00 00 00 00 00 00 00 00 00 00 00 .
01C50...00 00 00 00 00 00 00 00 00 00 00 00 00 00 00 00 .
01C60...00 00 00 00 00 00 00 00 00 00 00 00 00 00 00 00 .
01C70...00 00 00 00 00 00 00 00 00 00 00 00 00 00 00 00 .
01C80...00 00 00 00 00 00 00 00 00 00 00 00 00 00 00 00 .
01C90...00 00 00 00 00 00 00 00 00 00 00 00 00 00 00 00 .
01CA0...00 00 00 00 00 00 00 00 00 00 00 00 00 00 00 00 .
01CB0...00 00 00 00 00 00 00 00 00 00 00 00 00 00 00 00 .
01CC0...00 00 00 00 00 00 00 00 00 00 00 00 00 00 00 00 .
01CD0...00 00 00 00 00 00 00 00 00 00 00 00 00 00 00 00 .
01CE0...00 00 00 00 00 00 00 00 00 00 00 00 00 00 00 00 .
01CF0...00 00 00 00 00 00 00 00 00 00 00 00 00 00 00 00 .
01D00...00 00 00 00 00 00 00 00 00 00 00 00 00 00 00 00 .
01D10...00 00 00 00 00 00 00 00 00 00 00 00 00 00 00 00 .
01D20...00 00 00 00 00 00 00 00 00 00 00 00 00 00 00 00 .
01D30...00 00 00 00 00 00 00 00 00 00 00 00 00 00 00 00 .
01D40...00 00 00 00 00 00 00 00 00 00 00 00 00 00 00 00 .
01D50...00 00 00 00 00 00 00 00 00 00 00 00 00 00 00 00 .
01D60...00 00 00 00 00 00 00 00 00 00 00 00 00 00 00 00 .
01D70...00 00 00 00 00 00 00 00 00 00 00 00 00 00 00 00 .
01D80...00 00 00 00 00 00 00 00 00 00 00 00 00 00 00 00 .
01D90...00 00 00 00 00 00 00 00 00 00 00 00 00 00 00 00 .
01DA0...00 00 00 00 00 00 00 00 00 00 00 00 00 00 00 00 .
01DB0...00 00 00 00 00 00 00 00 00 00 00 00 00 00 00 00 .
01DC0...00 00 00 00 00 00 00 00 00 00 00 00 00 00 00 00 .
01DD0...00 00 00 00 00 00 00 00 00 00 00 00 00 00 00 00 .
01DE0...00 00 00 00 00 00 00 00 00 00 00 00 00 00 00 00 .
01DF0...00 00 00 00 00 00 00 00 00 00 00 00 00 00 00 00 .
01E00...00 00 00 00 00 00 00 00 00 00 00 00 00 00 00 00 .
01E10...00 00 00 00 00 00 00 00 00 00 00 00 00 00 00 00 .
01E20...00 00 00 00 00 00 00 00 00 00 00 00 00 00 00 00 .
01E30...00 00 00 00 00 00 00 00 00 00 00 00 00 00 00 00 .
01E40...00 00 00 00 00 00 00 00 00 00 00 00 00 00 00 00 .
01E50...00 00 00 00 00 00 00 00 00 00 00 00 00 00 00 00 .
01E60...00 00 00 00 00 00 00 00 00 00 00 00 00 00 00 00 .
01E70...00 00 00 00 00 00 00 00 00 00 00 00 00 00 00 00 .
01E80...00 00 00 00 00 00 00 00 00 00 00 00 00 00 00 00 .
01E90...00 00 00 00 00 00 00 00 00 00 00 00 00 00 00 00 .
01EA0...00 00 00 00 00 00 00 00 00 00 00 00 00 00 00 00 .
01EB0...00 00 00 00 00 00 00 00 00 00 00 00 00 00 00 00 .
01EC0...00 00 00 00 00 00 00 00 00 00 00 00 00 00 00 00 .
```

PROM WRITING LIST - NCR COMTEN # 6000236-001 REV. AA CONT.

```
01ED0...00 00 00 00 00 00 00 00 00 00 00 00 00 00 00 00 .
01EE0...00 00 00 00 00 00 00 00 00 00 00 00 00 00 00 00 .
01EF0...00 00 00 00 00 00 00 00 00 00 00 00 00 00 00 00 .
01F00...00 00 00 00 00 00 00 00 00 00 00 00 00 00 00 00 .
01F10...00 00 00 00 00 00 00 00 00 00 00 00 00 00 00 00 .
01F20...00 00 00 00 00 00 00 00 00 00 00 00 00 00 00 00 .
01F30...00 00 00 00 00 00 00 00 00 00 00 00 00 00 00 00 .
01F40...00 00 00 00 00 00 00 00 00 00 00 00 00 00 00 00 .
01F50...00 00 00 00 00 00 00 00 00 00 00 00 00 00 00 00
01F60...00 00 00 00 00 00 00 00 00 00 00 00 00 00 00 00
01F70...00 00 00 00 00 00 00 00 00 00 00 00 00 00 00 00 .
01F80...00 00 00 00 00 00 00 00 00 00 00 00 00 00 00 00 .
01F90...00 00 00 00 00 00 00 00 00 00 00 00 00 00 00 00 .
01FA0...00 00 00 00 00 00 00 00 00 00 00 00 00 00 00 00 .
01FB0...00 00 00 00 00 00 00 00 00 00 00 00 00 00 00 00 .
01FC0...00 00 00 00 00 00 00 00 00 00 00 00 00 00 00 00 .
01FD0...00 00 00 00 00 00 00 00 00 00 00 00 00 00 00 00 .
01FE0...00 00 00 00 00 00 00 00 00 00 00 00 00 00 00 00 .
01FF0...00 00 00 00 00 00 00 00 00 00 00 16 00 00 FB FF .
```

PROM WRITING LIST - NCR COMTEN # 6000236-002 REV. AA

CHECKSUM = 93C0

```
00000...FF FD FE FF FC FF FF FC FF FC FC FE FC FF FD FC .
00010...FD FE FF FF FF FD FC FC FD FF FC FC FD FC FC FD .
00020...FF FE FD FF FE FC FE FC FC FD FF FF FC FC FD FC .
00030...FD FC FC FF FD FD FD FC FC FD FC FE FD FF FE FC .
00040...FE FD FF FD FC FC FD FF FE FD FF FD FC FC FD FF .
00050...FC FD FF FD FC FC FD FF FF FF FF FF FE FD FF FF .
00060...FC FC FD FC FC FF FC FD FD FD FC FE FF FD FC FD .
00070...FE FF FD FC FD FE FD FD FC FF FC FD FE FC FC FE .
00080...FE FD FC FD FE FF FC FE FE FD FC FC FC FD FF FC .
00090...FD FF FE FD FC FD FC FC FD FF FE FF FC FE FE FD .
000A0...FF FC FC FE FC FD FF FC FD FC FF FC FE FD FF FE .
000B0...FD FF FD FC FC FC FC FD FC FE FD FD FD FC FC FD .
000C0...FF FE FC FD FF FC FD FC FD FF FE FD FD FC FC FD .
000D0...FC FF FC FC FF FC FE FC FC FC FD FC FF FC FF FC .
000E0...FD FF FC FE FD FC FC FD FC FF FD FD FD FF FD FF .
000F0...FF FD FE FF FD FF FC FC FD FC FE FD FD FC FE FD .
00100...FC FE FE FD FE FF FE FF FD FF FE FD FC FC FD FE .
00110...FF FD FE FC FD FD FF FD FD FC FF FE FD FF FC FF .
00120...FE FC FD FD FD FF FD FD FF FC FE FD FF FF FF FD .
00130...FD FC FD FF FD FF FD FD FC FF FF FD FE FD FF FD .
00140...FC FD FD FF FE FF FF FD FF FD FE FF FF FC FF FD .
00150...FF FF FD FD FD FF FD FF FF FF FD FF FE FC FC FE .
00160...FC FF FD FD FF FE FD FF FF FD FD FC FE FE FC FE .
00170...FE FD FF FD FE FD FC FD FF FE FD FF FF FE FD FF .
00180...FF FC FD FE FD FF FD FC FD FC FC FD FF FD FF FC .
00190...FD FD FC FE FC FC FD FD FF FC FE FF FF FE FD FE .
001A0...FD FE FF FD FC FD FC FC FD FF FF FE FD FC FE FD .
001B0...FF FD FE FD FC FD FF FD FE FE FD FE FF FD FF FC .
001C0...FD FD FC FE FE FF FC FE FE FD FC FE FD FE FD FF .
001D0...FC FD FD FC FF FE FF FF FE FD FD FE FF FE FD FC .
```

PROM WRITING LIST - NCR COMTEN # 6000236-002 REV. AA CONT.

```
001E0...FE FD FF FD FE FD FC FD FF FD FF FC FD FD FC FE .
001F0...FE FF FC FE FD FF FC FE FC FD FC FE FF FE FF FC .
00200...FE FC FE FD FE FE FF FF FF FE FD FE FD FE FD FC .
00210...FC FD FF FF FE FD FC FE FD FF FD FE FD FC FD FF .
00220...FE FD FE FF FD FF FC FD FD FC FE FE FF FC FE FF .
00230...FF FC FE FC FD FC FE FE FE FE FF FF FE FD FC FE .
00240...FD FF FF FE FD FC FE FD FF FD FE FD FC FD FF FE .
00250...FD FF FF FE FD FF FF FC FD FE FD FE FD FC FC FD .
00260...FF FE FF FF FD FE FF FF FD FC FF FD FF FD FE FD .
00270...FC FD FD FF FE FD FF FE FE FC FC FC FC FE FE FC .
00280...FC FE FE FE FE FC FF FC FE FD FF FD FE FD FC FD .
00290...FD FD FE FE FD FE FC FF FC FE FD FF FE FF FF FD .
002A0...FE FF FF FD FC FF FD FF FD FE FD FF FC FE FE FC .
002B0...FE FC FC FE FE FC FC FE FC FE FE FC FE FC FD FD .
002C0...FF FE FD FE FD FD FD FC FF FD FE FD FE FD FC FD .
002D0...FF FD FE FE FD FE FC FF FC FE FD FF FC FD FD FC .
002E0...FC FE FF FF FE FF FE FE FC FC FC FE FF FE FF FD .
002F0...FF FC FC FC FF FE FD FE FF FC FE FD FC FC FE FE .
00300...FC FF FD FC FC FD FC FC FE FC FF FC FE FC FE FC .
00310...FD FF FE FC FF FE FC FD FC FE FD FC FE FC FC FD .
00320...FC FF FC FE FC FC FF FC FD FF FD FD FE FE FD FC .
00330...FE FC FC FD FC FE FD FF FD FE FD FE FD FE FF FC .
00340...FF FC FE FD FF FC FD FD FC FF FD FE FD FE FD FC .
00350...FD FE FF FC FE FC FF FD FD FC FD FF FD FE FD FC .
00360...FE FF FC FD FF FC FE FD FF FD FE FD FC FD FC FE .
00370...FD FE FC FE FE FD FF FD FF FF FC FE FE FD FE FF .
00380...FF FD FE FE FD FD FC FE FD FF FF FD FF FE FF FE .
00390...FE FF FF FC FD FD FC FE FD FF FF FE FC FF FF FC .
003A0...FF FD FC FE FD FF FF FC FE FD FF FD FE FD FC FD .
003B0...FE FD FE FF FD FF FE FF FE FE FF FF FC FD FD FC .
003C0...FD FF FF FE FC FF FF FC FF FD FC FD FF FD FC FF .
003D0...FE FD FE FC FC FE FD FF FD FF FF FC FE FE FD FC .
003E0...FF FF FD FE FE FD FD FC FE FD FF FF FC FE FD FF .
003F0...FD FE FD FC FD FC FE FD FE FC FD FE FD FF FD FF .
00400...FF FC FD FE FD FF FF FF FD FE FE FD FD FC FE FD .
00410...FF FF FC FE FD FF FD FE FD FC FD FD FD FD FC FF .
00420...FE FF FD FF FF FD FC FE FD FD FE FD FC FD FF FC .
00430...FE FD FF FC FD FE FE FD FE FE FD FE FC FD FC FD .
00440...FF FD FD FF FD FC FD FF FE FD FD FC FE FD FF FE .
00450...FE FD FC FD FD FC FE FD FF FD FD FF FF FD FC FF .
00460...FC FE FD FF FD FF FD FD FD FD FD FC FD FC FD FE .
00470...FD FC FD FC FD FE FD FF FD FE FF FE FC FF FD FC .
00480...FC FD FC FC FE FD FE FF FC FF FC FC FD FF FF FE .
00490...FC FD FC FD FF FC FE FF FC FE FD FC FD FC FF FC .
004A0...FF FC FD FE FD FE FC FE FC FE FE FE FC FE FC FF .
004B0...FE FD FE FE FE FF FC FD FD FC FD FE FF FC FE FD .
004C0...FC FE FE FD FC FD FC FC FD FE FD FE FC FE FD FF .
004D0...FD FF FE FE FF FC FE FC FC FD FF FF FE FD FF FF .
004E0...FF FF FF FD FC FE FD FC FE FD FF FE FE FC FF FC .
004F0...FE FE FD FF FD FC FC FD FF FD FC FF FC FE FD FC .
00500...FF FD FE FF FC FC FC FD FF FD FC FD FF FD FF FE .
00510...FC FF FE FC FC FC FC FC FC FD FF FD FE FF FC FE .
00520...FD FC FF FD FE FF FE FD FC FF FC FF FD FC FD FC .
00530...FF FE FD FE FD FE FC FD FF FC FE FF FC FE FD FC .
00540...FC FC FF FE FC FC FE FC FC FE FD FE FF FC FF FE .
```

PROM WRITING LIST - NCR COMTEN # 6000236-002 REV. AA CONT.

```
00550...FF FD FE FE FE FC FE FD FF FC FC FE FE FE FD FC .
00560...FE FC FD FF FD FF FC FC FD FF FC FD FE FD FD FE .
00570...FD FC FC FD FE FE FF FE FD FC FF FE FF FD FC FE .
00580...FE FE FC FE FD FF FD FC FC FC FD FF FD FF FC FD .
00590...FC FC FC FD FF FD FE FD FC FF FF FD FD FE FE FF .
005A0...FE FD FC FF FC FE FF FC FF FD FC FE FE FE FC FE .
005B0...FD FF FD FF FC FC FD FC FF FD FF FC FC FD FF FC .
005C0...FD FF FC FF FF FD FE FD FC FF FE FC FD FD FE FD .
005D0...FE FC FF FE FF FD FE FE FE FC FE FD FF FC FE FC .
005E0...FE FC FD FF FF FE FF FD FE FD FF FC FC FD FF FE .
005F0...FC FC FE FC FF FC FC FD FC FE FE FF FE FF FE FD .
00600...FC FD FC FF FC FC FD FE FF FC FC FC FC FF FE FC .
00610...FE FD FE FE FE FF FF FF FE FC FE FD FC FC FC FE .
00620...FD FE FE FE FE FC FE FD FF FC FD FF FD FF FD FE .
00630...FF FF FD FF FE FE FE FC FF FD FC FE FE FE FC FE .
00640...FD FF FD FF FC FC FF FF FD FF FC FC FD FF FC FD .
00650...FF FC FF FF FD FE FD FC FF FE FC FD FF FC FC FC .
00660...FD FE FD FC FC FD FE FD FC FC FE FF FE FC FD FF .
00670...FF FD FC FD FF FE FE FC FE FD FF FC FC FD FF FC .
00680...FD FF FC FF FF FD FE FD FC FF FE FC FD FF FC FC .
00690...FC FD FE FD FC FC FD FE FC FC FD FF FF FD FC FD .
006A0...FF FE FE FC FE FD FF FC FC FD FF FF FD FC FE FE .
006B0...FE FC FE FD FF FC FC FD FF FD FC FD FC FD FC FD .
006C0...FD FD FF FD FF FE FD FF FD FC FC FC FC FD FF FF .
006D0...FF FD FC FF FC FE FE FD FF FF FC FF FC FC FC FC .
006E0...FE FE FC FD FF FE FF FD FE FE FC FC FC FE FD FF .
006F0...FC FC FD FF FD FC FE FD FF FF FF FC FF FD FC FF .
00700...FF FE FC FC FC FF FD FC FC FF FC FC FE FE FE FE .
00710...FF FD FC FE FF FC FC FC FC FD FF FC FD FC FD FC .
00720...FF FD FD FF FF FF FC FE FC FF FE FE FE FC FC FD .
00730...FE FF FC FF FF FF FD FE FD FC FC FE FF FF FC FD .
00740...FF FF FC FF FF FD FE FD FC FC FC FF FE FC FE FC .
00750...FF FF FC FF FF FD FE FD FC FD FC FE FD FE FC FF .
00760...FC FE FD FF FC FC FD FF FD FD FE FE FD FD FF FC .
00770...FE FD FF FC FF FC FE FC FF FC FC FF FF FF FF FE .
00780...FF FF FC FF FF FF FE FD FE FC FC FE FC FF FE FF .
00790...FC FC FE FD FD FF FE FF FE FF FE FC FC FF FE FE .
007A0...FD FC FE FE FD FE FF FE FC FC FF FE FE FF FC FE .
007B0...FC FE FD FE FD FE FC FC FF FE FE FD FC FE FE FD .
007C0...FE FE FD FE FC FC FF FE FE FF FC FE FE FC FD FF .
007D0...FE FC FD FF FC FE FD FE FC FE FC FF FF FE FC FD .
007E0...FF FC FC FD FE FC FE FC FD FC FC FD FE FF FF FD .
007F0...FC FC FE FD FC FC FD FE FE FC FD FC FC FC FC FC .
00800...FC FC FD FD FD FF FC FF FC FC FD FF FF FC FE FD .
00810...FC FC FD FC FD FC FE FC FD FC FC FD FF FF FF FD .
00820...FE FE FE FC FC FE FC FC FE FF FE FF FC FC FF FE .
00830...FC FF FF FE FE FC FF FC FC FE FF FF FD FE FC FF .
00840...FE FF FE FF FE FE FD FE FC FC FC FC FD FC FF FD .
00850...FF FF FC FD FC FE FF FC FD FE FF FD FC FD FD FD .
00860...FC FE FD FF FF FC FC FD FC FC FC FD FD FD FC FE .
00870...FF FD FC FF FD FD FF FC FE FD FE FD FC FD FE FF .
00880...FC FE FD FC FC FE FC FC FE FD FC FE FC FC FF FC .
00890...FC FF FC FE FD FF FF FC FE FD FF FD FE FD FC FD .
008A0...FF FF FF FC FD FC FE FF FE FF FE FC FC FF FE FE .
008B0...FD FC FE FE FD FE FF FE FC FC FF FE FE FF FC FE .
```

PROM WRITING LIST - NCR COMTEN # 6000236-002 REV. AA CONT.

```
008C0...FF FC FE FD FF FD FE FD FC FD FF FE FF FE FE FC .
008D0...FC FE FE FD FC FE FF FC FE FD FF FD FE FD FC FD .
008E0...FF FD FD FE FF FE FC FC FE FD FE FC FC FD FC FF .
008F0...FD FC FE FD FF FE FF FE FF FC FC FE FD FE FC FC .
00900...FF FC FE FD FF FF FC FE FD FF FD FE FD FC FD FE .
00910...FE FF FC FC FF FC FE FD FF FD FE FD FC FD FE FE .
00920...FF FE FE FC FC FE FF FC FC FE FF FD FF FC FE FD .
00930...FF FD FC FC FF FC FE FD FC FD FE FD FC FD FC FD .
00940...FF FE FF FD FE FD FE FD FC FD FC FD FF FE FD FF .
00950...FF FE FD FD FC FF FD FF FE FD FC FE FD FF FC FC .
00960...FF FC FF FD FF FE FF FF FF FE FF FF FF FC FF FE .
00970...FD FC FC FD FF FF FC FF FD FC FF FE FD FE FC FD .
00980...FC FD FD FD FC FC FD FF FD FC FD FF FC FF FF FC .
00990...FF FD FF FD FC FF FF FD FF FE FD FE FC FE FD FD .
009A0...FD FD FF FF FC FF FD FF FF FC FE FD FF FC FD FD .
009B0...FC FD FF FD FF FF FC FF FD FC FD FD FC FD FF FD .
009C0...FF FD FC FF FF FF FF FD FF FD FD FC FD FF FC FD .
009D0...FE FC FE FC FE FC FD FE FD FE FC FC FE FD FF FF .
009E0...FF FE FC FF FC FE FE FD FC FD FE FF FF FD FC FC .
009F0...FC FE FD FE FD FC FE FF FE FD FE FF FF FC FF FE .
00A00...FF FD FF FC FF FF FF FF FF FF FF FF FF FF FF FF .
00A10...FE FD FD FE FD FE FE FD FF FC FC FD FD FF FD FE .
00A20...FF FD FF FF FF FD FC FD FF FE FD FF FF FE FE FF .
00A30...FC FD FE FF FC FF FF FF FF FF FC FD FD FD FD FF .
00A40...FE FE FE FE FF FE FF FD FC FC FD FD FD FF FC FD .
00A50...FE FD FE FD FF FF FC FC FC FD FD FC FC FF FD FC .
00A60...FE FF FF FF FC FC FC FD FD FC FC FF FD FC FE FF .
00A70...FE FE FC FE FD FC FD FC FF FF FD FD FC FC FC FF .
00A80...FF FD FF FC FF FC FC FF FC FC FD FC FD FC FD FD .
00A90...FE FE FF FD FF FC FD FD FD FC FF FD FF FC FD FC .
00AA0...FF FE FF FD FF FC FD FC FC FC FD FF FD FD FD FC .
00AB0...FE FD FC FE FE FE FF FD FF FC FC FD FC FD FC FF .
00AC0...FD FE FC FF FE FF FC FD FC FF FF FE FD FC FF FC .
00AD0...FF FC FF FF FF FD FC FE FF FC FD FC FF FF FF FD .
00AE0...FF FF FD FC FF FC FF FC FC FF FC FD FE FE FD FF .
00AF0...FD FC FF FD FC FC FF FD FD FF FD FF FE FC FF FE .
00B00...FE FC FD FD FC FC FF FC FD FC FF FF FC FD FC FC .
00B10...FE FC FC FD FE FD FE FE FC FD FC FC FC FE FC FE .
00B20...FE FC FE FE FE FC FE FC FE FE FC FC FE FC FD FD .
00B30...FC FF FD FC FF FE FC FF FD FD FC FC FD FE FF FC .
00B40...FC FC FD FE FF FC FC FD FF FC FC FF FC FC FC FF .
00B50...FF FE FD FE FD FE FF FE FD FE FF FD FE FE FF FC .
00B60...FF FE FC FF FC FF FE FE FD FE FD FC FE FC FD FE .
00B70...FE FC FE FE FD FE FD FC FC FF FC FE FC FE FE FE .
00B80...FE FE FE FE FE FE FC FE FC FE FE FE FE FE FC FE .
00B90...FC FD FE FD FD FE FF FF FD FE FF FE FC FE FD FC .
00BA0...FC FD FC FD FC FF FD FC FF FD FD FF FD FF FD FD .
00BB0...FF FF FD FF FF FF FF FD FE FD FD FC FE FF FE FF .
00BC0...FF FE FF FE FD FE FE FF FE FF FF FD FE FF FC FE .
00BD0...FF FE FC FF FF FE FE FF FC FD FC FF FD FC FF FD .
00BE0...FC FF FD FC FF FE FC FD FC FD FF FD FE FF FC FC .
00BF0...FF FD FC FE FF FD FE FF FC FD FE FC FC FD FC FE .
00C00...FD FC FF FC FC FD FC FF FD FE FC FD FC FD FC FD .
00C10...FC FC FF FF FE FD FE FF FC FF FC FD FC FD FC FC .
00C20...FE FF FE FD FD FC FF FF FC FD FE FF FF FC FF FE .
```

PROM WRITING LIST - NCR COMTEN # 6000236-002 REV. AA CONT.

```
00C30...FF FC FD FC FD FC FF FC FF FC FD FD FF FD FE FF .
00C40...FD FF FF FF FF FC FD FC FD FF FD FC FC FE FF FC .
00C50...FF FD FC FD FC FC FE FC FE FF FC FF FE FD FC FD .
00C60...FF FC FF FF FE FF FE FD FD FC FE FF FC FE FE FF .
00C70...FC FD FC FC FD FC FF FC FC FF FF FF FE FE FC FE .
00C80...FF FF FF FE FE FC FC FC FC FC FF FF FF FE FF FE .
00C90...FE FF FF FF FE FE FC FE FF FF FF FE FF FF FE FF .
00CA0...FD FC FD FC FC FC FD FC FF FE FC FF FF FF FE FE .
00CB0...FE FE FF FF FF FE FE FE FC FF FF FF FE FF FE FE .
00CC0...FF FF FF FE FE FC FE FF FF FF FE FF FF FD FD FD .
00CD0...FF FD FC FE FD FC FE FC FC FF FD FF FF FC FD FD .
00CE0...FC FC FF FD FF FC FD FE FC FE FF FF FF FD FC FC .
00CF0...FF FC FD FF FF FD FF FC FC FD FD FE FC FE FF FE .
00D00...FC FD FD FC FC FD FD FD FE FC FC FC FC FC FF FC .
00D10...FC FE FF FC FE FD FD FD FD FE FC FC FF FF FF FC .
00D20...FC FF FD FC FE FF FD FF FC FE FC FC FF FF FF FE .
00D30...FC FC FF FC FC FF FF FD FC FD FC FC FE FD FD FD .
00D40...FC FD FC FC FC FC FF FC FF FF FC FE FD FC FD FF .
00D50...FD FF FE FD FF FC FE FD FE FD FE FD FE FD FD FD .
00D60...FF FE FE FF FC FD FD FD FE FD FC FD FE FE FD FD .
00D70...FC FC FF FD FC FE FC FC FD FC FD FE FE FC FF FC .
00D80...FC FF FD FD FC FD FE FD FD FD FC FE FF FF FC FC .
00D90...FF FD FC FE FD FE FD FD FD FC FE FE FE FD FE FE .
00DA0...FD FE FD FE FF FD FE FC FE FF FF FD FD FF FF FD .
00DB0...FC FE FC FC FC FE FC FC FC FC FC FC FD FF FF FE .
00DC0...FE FC FE FE FC FE FC FC FC FD FF FC FC FC FC FC .
00DD0...FC FC FC FC FC FC FC FC FC FC FC FC FC FC FC FC .
00DE0...FC FC FC FC FC FC FC FC FC FC FC FC FC FC FC FC .
00DF0...FC FC FC FC FC FC FC FC FC FC FC FC FC FC FC FC .
00E00...FC FC FC FC FC FC FC FC FC FC FC FC FC FC FC FC .
00E10...FC FC FC FC FC FC FC FC FC FC FC FC FC FC FC FC .
00E20...FC FC FC FC FC FC FC FC FC FC FC FC FC FC FC FC .
00E30...FC FC FC FC FC FC FC FC FC FC FC FC FC FC FC FC .
00E40...FC FC FC FC FC FC FC FC FC FC FC FC FC FC FC FC .
00E50...FC FC FC FC FC FC FC FC FC FC FC FC FC FC FC FC .
00E60...FC FC FC FC FC FC FC FC FC FC FC FC FC FC FC FC .
00E70...FC FC FC FC FC FC FC FC FC FC FC FC FC FC FC FC .
00E80...FC FC FC FC FC FC FC FC FC FC FC FC FC FC FC FC .
00E90...FC FC FC FC FC FC FC FC FC FC FC FC FC FC FC FC .
00EA0...FC FC FC FC FC FC FC FC FC FC FC FC FC FC FC FC .
00EB0...FC FC FC FC FC FC FC FC FC FC FC FC FC FC FC FC .
00EC0...FC FC FC FC FC FC FC FC FC FC FC FC FC FC FC FC .
00ED0...FC FC FC FC FC FC FC FC FC FC FC FC FC FC FC FC .
00EE0...FC FC FC FC FC FC FC FC FC FC FC FC FC FC FC FC .
00EF0...FC FC FC FC FC FC FC FC FC FC FC FC FC FC FC FC .
00F00...FC FC FC FC FC FC FC FC FC FC FC FC FC FC FC FC .
00F10...FC FC FC FC FC FC FC FC FC FC FC FC FC FC FC FC .
00F20...FC FC FC FC FC FC FC FC FC FC FC FC FC FC FC FC .
00F30...FC FC FC FC FC FC FC FC FC FC FC FC FC FC FC FC .
00F40...FC FC FC FC FC FC FC FC FC FC FC FC FC FC FC FC .
00F50...FC FC FC FC FC FC FC FC FC FC FC FC FC FC FC FC .
00F60...FC FC FC FC FC FC FC FC FC FC FC FC FC FC FC FC .
00F70...FC FC FC FC FC FC FC FC FC FC FC FC FC FC FC FC .
00F80...FC FC FC FC FC FC FC FC FC FC FC FC FC FC FC FC .
00F90...FC FC FC FC FC FC FC FC FC FC FC FC FC FC FC FC .
```

PROM WRITING LIST - NCR COMTEN # 6000236-002 REV. AA CONT.

```
00FA0...FC FC FC FC FC FC FC FC FC FC FC FC FC FC FC FC .
00FB0...FC FC FC FC FC FC FC FC FC FC FC FC FC FC FC FC .
00FC0...FC FC FC FC FC FC FC FC FC FC FC FC FC FC FC FC .
00FD0...FC FC FC FC FC FC FC FC FC FC FC FC FC FC FC FC .
00FE0...FC FC FC FC FC FC FC FC FC FC FC FC FC FC FC FC .
00FF0...FC FC FC FC FC FC FC FC FC FC FC FC FC FC FC FC .
01000...FC FC FC FC FC FC FC FC FC FC FC FC FC FC FC FC .
01010...FC FC FC FC FC FC FC FC FC FC FC FC FC FC FC FC .
01020...FC FC FC FC FC FC FC FC FC FC FC FC FC FC FC FC .
01030...FC FC FC FC FC FC FC FC FC FC FC FC FC FC FC FC .
01040...FC FC FC FC FC FC FC FC FC FC FC FC FC FC FC FC .
01050...FC FC FC FC FC FC FC FC FC FC FC FC FC FC FC FC .
01060...FC FC FC FC FC FC FC FC FC FC FC FC FC FC FC FC .
01070...FC FC FC FC FC FC FC FC FC FC FC FC FC FC FC FC .
01080...FC FC FC FC FC FC FC FC FC FC FC FC FC FC FC FC .
01090...FC FC FC FC FC FC FC FC FC FC FC FC FC FC FC FC .
010A0...FC FC FC FC FC FC FC FC FC FC FC FC FC FC FC FC .
010B0...FC FC FC FC FC FC FC FC FC FC FC FC FC FC FC FC .
010C0...FC FC FC FC FC FC FC FC FC FC FC FC FC FC FC FC .
010D0...FC FC FC FC FC FC FC FC FC FC FC FC FC FC FC FC .
010E0...FC FC FC FC FC FC FC FC FC FC FC FC FC FC FC FC .
010F0...FC FC FC FC FC FC FC FC FC FC FC FC FC FC FC FC .
01100...FC FC FC FC FC FC FC FC FC FC FC FC FC FC FC FC .
01110...FC FC FC FC FC FC FC FC FC FC FC FC FC FC FC FC .
01120...FC FC FC FC FC FC FC FC FC FC FC FC FC FC FC FC .
01130...FC FC FC FC FC FC FC FC FC FC FC FC FC FC FC FC .
01140...FC FC FC FC FC FC FC FC FC FC FC FC FC FC FC FC .
01150...FC FC FC FC FC FC FC FC FC FC FC FC FC FC FC FC .
01160...FC FC FC FC FC FC FC FC FC FC FC FC FC FC FC FC .
01170...FC FC FC FC FC FC FC FC FC FC FC FC FC FC FC FC .
01180...FC FC FC FC FC FC FC FC FC FC FC FC FC FC FC FC .
01190...FC FC FC FC FC FC FC FC FC FC FC FC FC FC FC FC .
011A0...FC FC FC FC FC FC FC FC FC FC FC FC FC FC FC FC .
011B0...FC FC FC FC FC FC FC FC FC FC FC FC FC FC FC FC .
011C0...FC FC FC FC FC FC FC FC FC FC FC FC FC FC FC FC .
011D0...FC FC FC FC FC FC FC FC FC FC FC FC FC FC FC FC .
011E0...FC FC FC FC FC FC FC FC FC FC FC FC FC FC FC FC .
011F0...FC FC FC FC FC FC FC FC FC FC FC FC FC FC FC FC .
01200...FC FC FC FC FC FC FC FC FC FC FC FC FC FC FC FC .
01210...FC FC FC FC FC FC FC FC FC FC FC FC FC FC FC FC .
01220...FC FC FC FC FC FC FC FC FC FC FC FC FC FC FC FC .
01230...FC FC FC FC FC FC FC FC FC FC FC FC FC FC FC FC .
01240...FC FC FC FC FC FC FC FC FC FC FC FC FC FC FC FC .
01250...FC FC FC FC FC FC FC FC FC FC FC FC FC FC FC FC .
01260...FC FC FC FC FC FC FC FC FC FC FC FC FC FC FC FC .
01270...FC FC FC FC FC FC FC FC FC FC FC FC FC FC FC FC .
01280...FC FC FC FC FC FC FC FC FC FC FC FC FC FC FC FC .
01290...FC FC FC FC FC FC FC FC FC FC FC FC FC FC FC FC .
012A0...FC FC FC FC FC FC FC FC FC FC FC FC FC FC FC FC .
012B0...FC FC FC FC FC FC FC FC FC FC FC FC FC FC FC FC .
012C0...FC FC FC FC FC FC FC FC FC FC FC FC FC FC FC FC .
012D0...FC FC FC FC FC FC FC FC FC FC FC FC FC FC FC FC .
012E0...FC FC FC FC FC FC FC FC FC FC FC FC FC FC FC FC .
012F0...FC FC FC FC FC FC FC FC FC FC FC FC FC FC FC FC .
01300...FC FC FC FC FC FC FC FC FC FC FC FC FC FC FC FC .
```

PROM WRITING LIST - NCR COMTEN # 6000236-002 REV. AA CONT.

```
01310...FC FC FC FC FC FC FC FC FC FC FC FC FC FC FC FC .
01320...FC FC FC FC FC FC FC FC FC FC FC FC FC FC FC FC .
01330...FC FC FC FC FC FC FC FC FC FC FC FC FC FC FC FC .
01340...FC FC FC FC FC FC FC FC FC FC FC FC FC FC FC FC .
01350...FC FC FC FC FC FC FC FC FC FC FC FC FC FC FC FC .
01360...FC FC FC FC FC FC FC FC FC FC FC FC FC FC FC FC .
01370...FC FC FC FC FC FC FC FC FC FC FC FC FC FC FC FC .
01380...FC FC FC FC FC FC FC FC FC FC FC FC FC FC FC FC .
01390...FC FC FC FC FC FC FC FC FC FC FC FC FC FC FC FC .
013A0...FC FC FC FC FC FC FC FC FC FC FC FC FC FC FC FC .
013B0...FC FC FC FC FC FC FC FC FC FC FC FC FC FC FC FC .
013C0...FC FC FC FC FC FC FC FC FC FC FC FC FC FC FC FC .
013D0...FC FC FC FC FC FC FC FC FC FC FC FC FC FC FC FC .
013E0...FC FC FC FC FC FC FC FC FC FC FC FC FC FC FC FC .
013F0...FC FC FC FC FC FC FC FC FC FC FC FC FC FC FC FC .
01400...FC FC FC FC FC FC FC FC FC FC FC FC FC FC FC FC .
01410...FC FC FC FC FC FC FC FC FC FC FC FC FC FC FC FC .
01420...FC FC FC FC FC FC FC FC FC FC FC FC FC*FC FC FC .
01430...FC FC FC FC FC FC FC FC FC FC FC FC FC FC FC FC .
01440...FC FC FC FC FC FC FC FC FC FC FC FC FC FC FC FC .
01450...FC FC FC FC FC FC FC FC FC FC FC FC FC FC FC FC .
01460...FC FC FC FC FC FC FC FC FC FC FC FC FC FC FC FC .
01470...FC FC FC FC FC FC FC FC FC FC FC FC FC FC FC FC .
01480...FC FC FC FC FC FC FC FC FC FC FC FC FC FC FC FC .
01490...FC FC FC FC FC FC FC FC FC FC FC FC FC FC FC FC .
014A0...FC FC FC FC FC FC FC FC FC FC FC FC FC FC FC FC .
014B0...FC FC FC FC FC FC FC FC FC FC FC FC FC FC FC FC .
014C0...FC FC FC FC FC FC FC FC FC FC FC FC FC FC FC FC .
014D0...FC FC FC FC FC FC FC FC FC FC FC FC FC FC FC FC .
014E0...FC FC FC FC FC FC FC FC FC FC FC FC FC FC FC FC .
014F0...FC FC FC FC FC FC FC FC FC FC FC FC FC FC FC FC .
01500...FC FC FC FC FC FC FC FC FC FC FC FC FC FC FC FC .
01510...FC FC FC FC FC FC FC FC FC FC FC FC FC FC FC FC .
01520...FC FC FC FC FC FC FC FC FC FC FC FC FC FC FC FC .
01530...FC FC FC FC FC FC FC FC FC FC FC FC FC FC FC FC .
01540...FC FC FC FC FC FC FC FC FC FC FC FC FC FC FC FC .
01550...FC FC FC FC FC FC FC FC FC FC FC FC FC FC FC FC .
01560...FC FC FC FC FC FC FC FC FC FC FC FC FC FC FC FC .
01570...FC FC FC FC FC FC FC FC FC FC FC FC FC FC FC FC .
01580...FC FC FC FC FC FC FC FC FC FC FC FC FC FC FC FC .
01590...FC FC FC FC FC FC FC FC FC FC FC FC FC FC FC FC .
015A0...FC FC FC FC FC FC FC FC FC FC FC FC FC FC FC FC .
015B0...FC FC FC FC FC FC FC FC FC FC FC FC FC FC FC FC .
015C0...FC FC FC FC FC FC FC FC FC FC FC FC FC FC FC FC .
015D0...FC FC FC FC FC FC FC FC FC FC FC FC FC FC FC FC .
015E0...FC FC FC FC FC FC FC FC FC FC FC FC FC FC FC FC .
015F0...FC FC FC FC FC FC FC FC FC FC FC FC FC FC FC FC .
01600...FC FC FC FC FC FC FC FC FC FC FC FC FC FC FC FC .
01610...FC FC FC FC FC FC FC FC FC FC FC FC FC FC FC FC .
01620...FC FC FC FC FC FC FC FC FC FC FC FC FC FC FC FC .
01630...FC FC FC FC FC FC FC FC FC FC FC FC FC FC FC FC .
01640...FC FC FC FC FC FC FC FC FC FC FC FC FC FC FC FC .
01650...FC FC FC FC FC FC FC FC FC FC FC FC FC FC FC FC .
01660...FC FC FC FC FC FC FC FC FC FC FC FC FC FC FC FC .
01670...FC FC FC FC FC FC FC FC FC FC FC FC FC FC FC FC .
```

PROM WRITING LIST - NCR COMTEN # 6000236-002 REV. AA CONT.

```
01680...FC FC FC FC FC FC FC FC FC FC FC FC FC FC FC FC .
01690...FC FC FC FC FC FC FC FC FC FC FC FC FC FC FC FC .
016A0...FC FC FC FC FC FC FC FC FC FC FC FC FC FC FC FC .
016B0...FC FC FC FC FC FC FC FC FC FC FC FC FC FC FC FC .
016C0...FC FC FC FC FC FC FC FC FC FC FC FC FC FC FC FC .
016D0...FC FC FC FC FC FC FC FC FC FC FC FC FC FC FC FC .
016E0...FC FC FC FC FC FC FC FC FC FC FC FC FC FC FC FC .
016F0...FC FC FC FC FC FC FC FC FC FC FC FC FC FC FC FC .
01700...FC FC FC FC FC FC FC FC FC FC FC FC FC FC FC FC .
01710...FC FC FC FC FC FC FC FC FC FC FC FC FC FC FC FC .
01720...FC FC FC FC FC FC FC FC FC FC FC FC FC FC FC FC .
01730...FC FC FC FC FC FC FC FC FC FC FC FC FC FC FC FC .
01740...FC FC FC FC FC FC FC FC FC FC FC FC FC FC FC FC .
01750...FC FC FC FC FC FC FC FC FC FC FC FC FC FC FC FC .
01760...FC FC FC FC FC FC FC FC FC FC FC FC FC FC FC FC .
01770...FC FC FC FC FC FC FC FC FC FC FC FC FC FC FC FC .
01780...FC FC FC FC FC FC FC FC FC FC FC FC FC FC FC FC .
01790...FC FC FC FC FC FC FC FC FC FC FC FC FC FC FC FC .
017A0...FC FC FC FC FC FC FC FC FC FC FC FC FC FC FC FC .
017B0...FC FC FC FC FC FC FC FC FC FC FC FC FC FC FC FC .
017C0...FC FC FC FC FC FC FC FC FC FC FC FC FC FC FC FC .
017D0...FC FC FC FC FC FC FC FC FC FC FC FC FC FC FC FC .
017E0...FC FC FC FC FC FC FC FC FC FC FC FC FC FC FC FC .
017F0...FC FC FC FC FC FC FC FC FC FC FC FC FC FC FC FC .
01800...FC FC FC FC FC FC FC FC FC FC FC FC FC FC FC FC .
01810...FC FC FC FC FC FC FC FC FC FC FC FC FC FC FC FC .
01820...FC FC FC FC FC FC FC FC FC FC FC FC FC FC FC FC .
01830...FC FC FC FC FC FC FC FC FC FC FC FC FC FC FC FC .
01840...FC FC FC FC FC FC FC FC FC FC FC FC FC FC FC FC .
01850...FC FC FC FC FC FC FC FC FC FC FC FC FC FC FC FC .
01860...FC FC FC FC FC FC FC FC FC FC FC FC FC FC FC FC .
01870...FC FC FC FC FC FC FC FC FC FC FC FC FC FC FC FC .
01880...FC FC FC FC FC FC FC FC FC FC FC FC FC FC FC FC .
01890...FC FC FC FC FC FC FC FC FC FC FC FC FC FC FC FC .
018A0...FC FC FC FC FC FC FC FC FC FC FC FC FC FC FC FC .
018B0...FC FC FC FC FC FC FC FC FC FC FC FC FC FC FC FC .
018C0...FC FC FC FC FC FC FC FC FC FC FC FC FC FC FC FC .
018D0...FC FC FC FC FC FC FC FC FC FC FC FC FC FC FC FC .
018E0...FC FC FC FC FC FC FC FC FC FC FC FC FC FC FC FC .
018F0...FC FC FC FC FC FC FC FC FC FC FC FC FC FC FC FC .
01900...FC FC FC FC FC FC FC FC FC FC FC FC FC FC FC FC .
01910...FC FC FC FC FC FC FC FC FC FC FC FC FC FC FC FC .
01920...FC FC FC FC FC FC FC FC FC FC FC FC FC FC FC FC .
01930...FC FC FC FC FC FC FC FC FC FC FC FC FC FC FC FC .
01940...FC FC FC FC FC FC FC FC FC FC FC FC FC FC FC FC .
01950...FC FC FC FC FC FC FC FC FC FC FC FC FC FC FC FC .
01960...FC FC FC FC FC FC FC FC FC FC FC FC FC FC FC FC .
01970...FC FC FC FC FC FC FC FC FC FC FC FC FC FC FC FC .
01980...FC FC FC FC FC FC FC FC FC FC FC FC FC FC FC FC .
01990...FC FC FC FC FC FC FC FC FC FC FC FC FC FC FC FC .
019A0...FC FC FC FC FC FC FC FC FC FC FC FC FC FC FC FC .
019B0...FC FC FC FC FC FC FC FC FC FC FC FC FC FC FC FC .
019C0...FC FC FC FC FC FC FC FC FC FC FC FC FC FC FC FC .
019D0...FC FC FC FC FC FC FC FC FC FC FC FC FC FC FC FC .
019E0...FC FC FC FC FC FC FC FC FC FC FC FC FC FC FC FC .
```

PROM WRITING LIST - NCR COMTEN # 6000236-002 REV. AA CONT.

```
019F0...FC FC FC FC FC FC FC FC FC FC FC FC FC FC FC FC .
01A00...FC FC FC FC FC FC FC FC FC FC FC FC FC FC FC FC .
01A10...FC FC FC FC FC FC FC FC FC FC FC FC FC FC FC FC .
01A20...FC FC FC FC FC FC FC FC FC FC FC FC FC FC FC FC .
01A30...FC FC FC FC FC FC FC FC FC FC FC FC FC FC FC FC .
01A40...FC FC FC FC FC FC FC FC FC FC FC FC FC FC FC FC .
01A50...FC FC FC FC FC FC FC FC FC FC FC FC FC FC FC FC .
01A60...FC FC FC FC FC FC FC FC FC FC FC FC FC FC FC FC .
01A70...FC FC FC FC FC FC FC FC FC FC FC FC FC FC FC FC .
01A80...FC FC FC FC FC FC FC FC FC FC FC FC FC FC FC FC .
01A90...FC FC FC FC FC FC FC FC FC FC FC FC FC FC FC FC .
01AA0...FC FC FC FC FC FC FC FC FC FC FC FC FC FC FC FC .
01AB0...FC FC FC FC FC FC FC FC FC FC FC FC FC FC FC FC .
01AC0...FC FC FC FG FC FC FC FC FC FC FC FC FC FC FC FC .
01AD0...FC FC FC FC FC FC FC FC FC FC FC FC FC FC FC FC .
01AE0...FC FC FC FC FC FC FC FC FC FC FC FC FC FC FC FC .
01AF0...FC FC FC FC FC FC FC FC FC FC FC FC FC FC FC FC .
01B00...FC FC FC FC FC FC FC FC FC FC FC FC FC FC FC FC .
01B10...FC FC FC FC FC FC FC FC FC FC FC FC FC FC FC FC .
01B20...FC FC FC FC FC FC FC FC FC FC FC FC FC FC FC FC .
01B30...FC FC FC FC FC FC FC FC FC FC FC FC FC FC FC FC .
01B40...FC FC FC FC FC FC FC FC FC FC FC FC FC FC FC FC .
01B50...FC FC FC FC FC FC FC FC FC FC FC FC FC FC FC FC .
01B60...FC FC FC FC FC FC FC FC FC FC FC FC FC FC FC FC .
01B70...FC FC FC FC FC FC FC FC FC FC FC FC FC FC FC FC .
01B80...FC FC FC FC FC FC FC FC FC FC FC FC FC FC FC FC .
01B90...FC FC FC FC FC FC FC FC FC FC FC FC FC FC FC FC .
01BA0...FC FC FC FC FC FC FC FC FC FC FC FC FC FC FC FC .
01BB0...FC FC FC FC FC FC FC FC FC FC FC FC FC FC FC FC .
01BC0...FC FC FC FC FC FC FC FC FC FC FC FC FC FC FC FC .
01BD0...FC FC FC FC FC FC FC FC FC FC FC FC FC FC FC FC .
01BE0...FC FC FC FC FC FC FC FC FC FC FC FC FC FC FC FC .
01BF0...FC FC FC FC FC FC FC FC FC FC FC FC FC FC FC FC .
01C00...FC FC FC FC FC FC FC FC FC FC FC FC FC FC FC FC .
01C10...FC FC FC FC FC FC FC FC FC FC FC FC FC FC FC FC .
01C20...FC FC FC FC FC FC FC FC FC FC FC FC FC FC FC FC .
01C30...FC FC FC FC FC FC FC FC FC FC FC FC FC FC FC FC .
01C40...FC FC FC FC FC FC FC FC FC FC FC FC FC FC FC FC .
01C50...FC FC FC FC FC FC FC FC FC FC FC FC FC FC FC FC .
01C60...FC FC FC FC FC FC FC FC FC FC FC FC FC FC FC FC .
01C70...FC FC FC FC FC FC FC FC FC FC FC FC FC FC FC FC .
01C80...FC FC FC FC FC FC FC FC FC FC FC FC FC FC FC FC .
01C90...FC FC FC FC FC FC FC FC FC FC FC FC FC FC FC FC .
01CA0...FC FC FC FC FC FC FC FC FC FC FC FC FC FC FC FC .
01CB0...FC FC FC FC FC FC FC FC FC FC FC FC FC FC FC FC .
01CC0...FC FC FC FC FC FC FC FC FC FC FC FC FC FC FC FC .
01CD0...FC FC FC FC FC FC FC FC FC FC FC FC FC FC FC FC .
01CE0...FC FC FC FC FC FC FC FC FC FC FC FC FC FC FC FC .
01CF0...FC FC FC FC FC FC FC FC FC FC FC FC FC FC FC FC .
01D00...FC FC FC FC FC FC FC FC FC FC FC FC FC FC FC FC .
01D10...FC FC FC FC FC FC FC FC FC FC FC FC FC FC FC FC .
01D20...FC FC FC FC FC FC FC FC FC FC FC FC FC FC FC FC .
01D30...FC FC FC FC FC FC FC FC FC FC FC FC FC FC FC FC .
01D40...FC FC FC FC FC FC FC FC FC FC FC FC FC FC FC FC .
01D50...FC FC FC FC FC FC FC FC FC FC FC FC FC FC FC FC .
```

PROM WRITING LIST - NCR COMTEN # 6000236-002 REV. AA CONT.

```
01D60...FC FC FC FC FC FC FC FC FC FC FC FC FC FC FC FC .
01D70...FC FC FC FC FC FC FC FC FC FC FC FC FC FC FC FC .
01D80...FC FC FC FC FC FC FC FC FC FC FC FC FC FC FC FC .
01D90...FC FC FC FC FC FC FC FC FC FC FC FC FC FC FC FC .
01DA0...FC FC FC FC FC FC FC FC FC FC FC FC FC FC FC FC .
01DB0...FC FC FC FC FC FC FC FC FC FC FC FC FC FC FC FC .
01DC0...FC FC FC FC FC FC FC FC FC FC FC FC FC FC FC FC .
01DD0...FC FC FC FC FC FC FC FC FC FC FC FC FC FC FC FC .
01DE0...FC FC FC FC FC FC FC FC FC FC FC FC FC FC FC FC .
01DF0...FC FC FC FC FC FC FC FC FC FC FC FC FC FC FC FC .
01E00...FC FC FC FC FC FC FC FC FC FC FC FC FC FC FC FC .
01E10...FC FC FC FC FC FC FC FC FC FC FC FC FC FC FC FC .
01E20...FC FC FC FC FC FC FC FC FC FC FC FC FC FC FC FC .
01E30...FC FC FC FC FC FC FC FC FC FC FC FC FC FC FC FC .
01E40...FC FC FC FC FC FC FC FC FC FC FC FC FC FC FC FC .
01E50...FC FC FC FC FC FC FC FC FC FC FC FC FC FC FC FC .
01E60...FC FC FC FC FC FC FC FC FC FC FC FC FC FC FC FC .
01E70...FC FC FC FC FC FC FC FC FC FC FC FC FC FC FC FC .
01E80...FC FC FC FC FC FC FC FC FC FC FC FC FC FC FC FC .
01E90...FC FC FC FC FC FC FC FC FC FC FC FC FC FC FC FC .
01EA0...FC FC FC FC FC FC FC FC FC FC FC FC FC FC FC FC .
01EB0...FC FC FC FC FC FC FC FC FC FC FC FC FC FC FC FC .
01EC0...FC FC FC FC FC FC FC FC FC FC FC FC FC FC FC FC .
01ED0...FC FC FC FC FC FC FC FC FC FC FC FC FC FC FC FC .
01EE0...FC FC FC FC FC FC FC FC FC FC FC FC FC FC FC FC .
01EF0...FC FC FC FC FC FC FC FC FC FC FC FC FC FC FC FC .
01F00...FC FC FC FC FC FC FC FC FC FC FC FC FC FC FC FC .
01F10...FC FC FC FC FC FC FC FC FC FC FC FC FC FC FC FC .
01F20...FC FC FC FC FC FC FC FC FC FC FC FC FC FC FC FC .
01F30...FC FC FC FC FC FC FC FC FC FC FC FC FC FC FC FC .
01F40...FC FC FC FC FC FC FC FC FC FC FC FC FC FC FC FC .
01F50...FC FC FC FC FC FC FC FC FC FC FC FC FC FC FC FC .
01F60...FC FC FC FC FC FC FC FC FC FC FC FC FC FC FC FC .
01F70...FC FC FC FC FC FC FC FC FC FC FC FC FC FC FC FC .
01F80...FC FC FC FC FC FC FC FC FC FC FC FC FC FC FC FC .
01F90...FC FC FC FC FC FC FC FC FC FC FC FC FC FC FC FC .
01FA0...FC FC FC FC FC FC FC FC FC FC FC FC FC FC FC FC .
01FB0...FC FC FC FC FC FC FC FC FC FC FC FC FC FC FC FC .
01FC0...FC FC FC FC FC FC FC FC FC FC FC FC FC FC FC FC .
01FD0...FC FC FC FC FC FC FC FC FC FC FC FC FC FC FC FC .
01FE0...FC FC FC FC FC FC FC FC FC FC FC FC FC FC FC FC .
01FF0...FC FC FC FC FC FC FC FC FC FC FC FF FD FC FE FF .
```

APPENDIX B

[ COMMUNICATIONS BASE MICROCONTROLLER INSTRUCTION SET ]

| *IIIIIIIIIIIIIII | MNEMONIC | | FUNCTION | OPERANDS |
|---|---|---|---|---|
| *123456789ABCDEF | *************** | | *************** | *************** |
| 01000RRRDDDDDDDD | ADD | I,Rx,Dx | ADD | REG-IMMED |
| 01001RRRDDDDDDDD | SUB | I,Rx,Dx | SUBTRACT | REG-IMMED |
| 01010RRRDDDDDDDD | CMPR | I,Rx,Dx | COMPARE | REG-IMMED |
| 01011RRRDDDDDDDD | LOAD | I,Rx,Dx | LOAD | REG-IMMED |
| 01100RRRDDDDDDDD | AND | I,Rx,Dx | LOGICAL AND | REG-IMMED |
| 01101RRRDDDDDDDD | LOR | I,Rx,Dx | LOGICAL OR | REG-IMMED |
| 01110RRRDDDDDDDD | XOR | I,Rx,Dx | EXCLUSIVE OR | REG-IMMED |
| 01111RRRDDDDDDDD | TWM | I,Rx,Dx | TEST WITH MASK | REG-IMMED |
| 00000RRR10000rrr | ADD | R,Rx,rx | ADD | REG-REG => REG |
| 00001RRR10000rrr | SUB | R,Rx,rx | SUBTRACT | REG-REG => REG |
| 00010RRR10000rrr | CMPR | R,Rx,rx | COMPARE | REG-REG |
| 00011RRR10000rrr | LOAD | R,Rx,rx | LOAD | REG-REG => REG |
| 00100RRR10000rrr | AND | R,Rx,rx | LOGICAL AND | REG-REG => REG |
| 00101RRR10000rrr | LOR | R,Rx,rx | LOGICAL OR | REG-REG => REG |
| 00110RRR10000rrr | XOR | R,Rx,rx | EXCLUSIVE OR | REG-REG => REG |
| 00111RRR10000rrr | TWM | R,Rx,rx | TEST WITH MASK | REG-REG |
| 10000RRR0MAAAAAA | ADD | L,Rx,Ax,0 | ADD | REG-LS => LS |
| 10001RRR0MAAAAAA | SUB | L,Rx,Ax,0 | SUBTRACT | REG-LS => LS |
| 10010RRR0MAAAAAA | CMPR | L,Rx,Ax,0 | COMPARE | REG-LS |
| 10011RRR0MAAAAAA | STOR | L,Rx,Ax,0 | STORE | REG-LS => LS |
| 10100RRR0MAAAAAA | AND | L,Rx,Ax,0 | LOGICAL AND | REG-LS => LS |
| 10101RRR0MAAAAAA | LOR | L,Rx,Ax,0 | LOGICAL OR | REG-LS => LS |
| 10110RRR0MAAAAAA | XOR | L,Rx,Ax,0 | EXCLUSIVE OR | REG-LS => LS |
| 10111RRR0MAAAAAA | TWM | L,Rx,Ax,0 | TEST WITH MASK | REG-LS |
| 10000RRR1MAAAAAA | ADD | L,Rx,Ax | ADD | REG-LS => REG |
| 10001RRR1MAAAAAA | SUB | L,Rx,Ax | SUBTRACT | REG-LS => REG |
| 10011RRR1MAAAAAA | LOAD | L,Rx,Ax | LOAD | REG-LS => REG |
| 10100RRR1MAAAAAA | AND | L,Rx,Ax | LOGICAL AND | REG-LS => REG |
| 10101RRR1MAAAAAA | LOR | L,Rx,Ax | LOGICAL OR | REG-LS => REG |
| 10110RRR1MAAAAAA | XOR | L,Rx,Ax | EXCLUSIVE OR | REG-LS => REG |
| 00000RRR1ii0NNNN | ADD | X,Rx,Nx,ix | ADD | INDEX+4BIT DISP |
| 00001RRR1ii0NNNN | SUB | X,Rx,Nx,ix | SUBTRACT | INDEX+4BIT DISP |
| 00010RRRXii0NNNN | CMPR | X,Rx,Nx,ix | COMPARE | INDEX+4BIT DISP |
| 00011RRR1ii0NNNN | LOAD | X,Rx,Nx,ix | LOAD | INDEX+4BIT DISP |
| 00011RRR0ii0NNNN | STOR | X,Rx,Nx,ix | STORE | INDEX+4BIT DISP |
| 00100RRR1ii0NNNN | AND | X,Rx,Nx,ix | LOGICAL AND | INDEX+4BIT DISP |
| 00101RRR1ii0NNNN | LOR | X,Rx,Nx,ix | LOGICAL OR | INDEX+4BIT DISP |
| 00110RRR1ii0NNNN | XOR | X,Rx,Nx,ix | EXCLUSIVE OR | INDEX+4BIT DISP |
| 00111RRRXii0NNNN | TWM | X,Rx,Nx,ix | TEST WITH MASK | INDEX+4BIT DISP |
| 00000RRR1ii1Xrrr | ADD | X,Rx,rx,ix | ADD | INDEX+ REG DISP |
| 00001RRR1ii1Xrrr | SUB | X,Rx,rx,ix | SUBTRACT | INDEX+ REG DISP |
| 00010RRRXii1Xrrr | CMPR | X,Rx,rx,ix | COMPARE | INDEX+ REG DISP |
| 00011RRR1ii1Xrrr | LOAD | X,Rx,rx,ix | LOAD | INDEX+ REG DISP |
| 00011RRR0ii1Xrrr | STOR | X,Rx,rx,ix | STORE | INDEX+ REG DISP |
| 00100RRR1ii1Xrrr | AND | X,Rx,rx,ix | LOGICAL AND | INDEX+ REG DISP |
| 00101RRR1ii1Xrrr | LOR | X,Rx,rx,ix | LOGICAL OR | INDEX+ REG DISP |
| 00110RRR1ii1Xrrr | XOR | X,Rx,rx,ix | EXCLUSIVE OR | INDEX+ REG DISP |
| 00111RRRXii1Xrrr | TWM | X,Rx,rx,ix | TEST WITH MASK | INDEX+ REG DISP |
| 00000RRR00011000 | ADD | D,Rx,Mx,0 | ADD | REG-DIR => DIR |
| 00001RRR00011000 | SUB | D,Rx,Mx,0 | SUBTRACT | REG-DIR => DIR |
| 00011RRR00011000 | STOR | D,Rx,Mx,0 | STORE | REG-DIR => DIR |
| 00100RRR00011000 | AND | D,Rx,Mx,0 | LOGICAL AND | REG-DIR => DIR |

```
00101RRR00011000 LOR   D,Rx,Mx,0   LOGICAL OR        REG-DIR => DIR
00110RRR00011000 XOR   D,Rx,Mx,0   EXCLUSIVE OR      REG-DIR => DIR

00000RRR10011000 ADD   D,Rx,Mx     ADD               REG-DIR => REG
00001RRR10011000 SUB   D,Rx,Mx     SUBTRACT          REG-DIR => REG
00010RRR10011000 CMPR  D,Rx,Mx     COMPARE           REG-DIR
00011RRR10011000 LOAD  D,Rx,Mx     LOAD              REG-DIR => REG
00100RRR10011000 AND   D,Rx,Mx     LOGICAL AND       REG-DIR => REG
00101RRR10011000 LOR   D,Rx,Mx     LOGICAL OR        REG-DIR => REG
00110RRR10011000 XOR   D,Rx,Mx     EXCLUSIVE OR      REG-DIR => REG
00111RRR10011000 TWM   D,Rx,Mx     TEST WITH MASK    REG-DIR

0100011IDDDDDDDD ADDD  I,Ix,Dx    ADD               IREG-IMMED
0100111IDDDDDDDD SUBD  I,Ix,Dx    SUBTRACT          IREG-IMMED
0101011IDDDDDDDD CMPRD I,Ix,Dx    COMPARE           IREG-IMMED
0101111IDDDDDDDD LOADD I,Ix,Dx    LOAD              IREG-IMMED
0110011IDDDDDDDD LOADL I,Ix,Dx    LOAD LOW BYTE     IREG-IMMED
0110111IDDDDDDDD LOADU I,Ix,Dx    LOAD HIGH BYTE    IREG-IMMED

0000011I10000rrr ADDD  R,Ix,rx    ADD               IREG-REG => REG
0000111I10000rrr SUBD  R,Ix,rx    SUBTRACT          IREG-REG => REG
0001011I10000rrr CMPRD R,Ix,rx    COMPARE           IREG-REG
0001111I10000rrr LOADD R,Ix,rx    LOAD              IREG-REG => REG
0010011I10000rrr LOADL R,Ix,rx    LOAD LOW BYTE     IREG-REG => REG
0010111I10000rrr LOADU R,Ix,rx    LOAD HIGH BYTE    IREG-REG => REG

1000011I0MAAAAAA ADDD  L,Ix,Ax,0  ADD               IREG-LS => LS
1000111I0MAAAAAA SUBD  L,Ix,Ax,0  SUBTRACT          IREG-LS => LS
1001011I0MAAAAAA CMPRD L,Ix,Ax,0  COMPARE           IREG-LS
1001111I0MAAAAAA STORD L,Ix,Ax,0  STORE             IREG-LS => LS
1010011I0MAAAAAA STORL L,Ix,Ax,0  STORE LOW BYTE    IREG-LS => LS
1010111I0MAAAAAA STORU L,Ix,Ax,0  STORE HIGH BYTE   IREG-LS => LS
1011111I0MAAAAAA SWAPD L,Ix,Ax,0  SWAP              IREG-LS

1000011I1MAAAAAA ADDD  L,Ix,Ax    ADD               IREG-LS => IREG
1000111I1MAAAAAA SUBD  L,Ix,Ax    SUBTRACT          IREG-LS => IREG
1001111I1MAAAAAA LOADD L,Ix,Ax    LOAD              IREG-LS => IREG
1010011I1MAAAAAA LOADL L,Ix,Ax    LOAD LOW BYTE     IREG-LS => IREG
1010111I1MAAAAAA LOADU L,Ix,Ax    LOAD HIGH BYTE    IREG-LS => IREG
*
0000011I1i10NNNNADDD  X,Ix,Nx,ix ADD               INDEX+4BIT DISP
0000111I1i10NNNNSUBD  X,Ix,Nx,ix SUBTRACT          INDEX+4BIT DISP
0001011IXi10NNNNCMPRD X,Ix,Nx,ix COMPARE           INDEX+4BIT DISP
0001111I1i10NNNNLOADD X,Ix,Nx,ix LOAD              INDEX+4BIT DISP
0010011I1i10NNNNLOADL X,Ix,Nx,ix LOAD LOW BYTE     INDEX+4BIT DISP
0010111I1i10NNNNLOADU X,Ix,Nx,ix LOAD HIGH BYTE    INDEX+4BIT DISP
0001111I0i10NNNNSTORD X,Ix,Nx,ix STORE             INDEX+4BIT DISP
0010011I0i10NNNNSTORL X,Ix,Nx,ix STORE LOW BYTE    INDEX+4BIT DISP
0010111I0i10NNNNSTORU X,Ix,Nx,ix STORE HIGH BYTE   INDEX+4BIT DISP

0000011I1i11XrrrADDD  X,Ix,rx,ix ADD               INDEX+ REG DISP
0000111I1i11XrrrSUBD  X,Ix,rx,ix SUBTRACT          INDEX+ REG DISP
0001011IXi11XrrrCMPRD X,Ix,rx,ix COMPARE           INDEX+ REG DISP
0001111I1i11XrrrLOADD X,Ix,rx,ix LOAD              INDEX+ REG DISP
0010011I1i11XrrrLOADL X,Ix,rx,ix LOAD LOW BYTE     INDEX+ REG DISP
0010111I1i11XrrrLOADU X,Ix,rx,ix LOAD HIGH BYTE    INDEX+ REG DISP
0001111I0i11XrrrSTORD X,Ix,rx,ix STORE             INDEX+ REG DISP
0010011I0i11XrrrSTORL X,Ix,rx,ix STORE LOW BYTE    INDEX+ REG DISP
0010111I0i11XrrrSTORU X,Ix,rx,ix STORE HIGH BYTE   INDEX+ REG DISP

0000011I00010000 ADDD  D,Ix,Mx,0 ADD               IREG-DIR => DIR
0000111I00010000 SUBD  D,Ix,Mx,0 SUBTRACT          IREG-DIR => DIR
0001111I00010000 STORD D,Ix,Mx,0 STORE             IREG-DIR => DIR
0010011I00010000 STORL D,Ix,Mx,0 STORE LOW  BYTE   IREG-DIR => DIR
0010111I00010000 STORU D,Ix,Mx,0 STORE HIGH BYTE   IREG-DIR => DIR
```

```
0000011I10010000 ADDD   D,Ix,Mx   ADD                  IREG-DIR =>IREG
0000111I10010000 SUBD   D,Ix,Mx   SUBTRACT             IREG-DIR =>IREG
0001011I10010000 CMPRD  D,Ix,Mx   COMPARE              IREG-DIR
0001111I10010000 LOADD  D,Ix,Mx   LOAD                 IREG-DIR =>IREG
0010011I10010000 LOADL  D,Ix,Mx   LOAD LOW BYTE        IREG-DIR =>IREG
0010111I10010000 LOADU  D,Ix,Mx   LOAD HIGH BYTE       IREG-DIR =>IREG
0011111I00010000 SWAPD  D,Ix,Mx   SWAP                 IREG-DIR

11001RRR10AAAAAA BCC L,Rx,Ax      BLOCK CHECK CHR REG-LS => LS
11001RRR00AAAAAA FCS L,Rx,Ax      FRAME CHECK SEQ REG-LS => LS

00001RRR10010000 BCC D,Rx,Mx      BLOCK CHECK CHR REG-DIR => DIR
00001RRR00010000 FCS D,Rx,Mx      FRAME CHECK SEQ REG-DIR => DIR

00011###10001rrr SETB  R,#x,rx    SET   BIT        REG
00011###00001rrr CLRB  R,#x,rx    CLEAR BIT        REG
00010###00001rrr TESTB R,#x,rx    TEST  BIT        REG

11011###1MAAAAAA SETB  L,#x,rx    SET   BIT        LS
11011###0MAAAAAA CLRB  L,#x,rx    CLEAR BIT        LS
11010###0MAAAAAA TESTB L,#x,rx    TEST  BIT        LS

000001010000lrrr SR0 R,rx         SHIFT RT FILL 0 REG
000001000000lrrr SL0 R,rx         SHIFT LT FILL 0 REG

110001010MAAAAAA SR0 L,Ax         SHIFT RT FILL 0 LS
110001000MAAAAAA SL0 L,Ax         SHIFT LT FILL 0 LS

000001011000lrrr SR1 R,rx         SHIFT RT FILL 1 REG
000001001000lrrr SL1 R,rx         SHIFT LT FILL 1 REG

110001011MAAAAAA SR1 L,Ax         SHIFT RT FILL 1 LS
110001001MAAAAAA SL1 L,Ax         SHIFT LT FILL 1 LS

000001110000lrrr INV R,rx         1'S COMPLEMENT  REG

110001110MAAAAAA INV L,Ax         1'S COMPLEMENT  LS

00011BBB01000bbb STL4 Bx,bx       SUPERVISOR STOR REG/IREG
00011BBB11000bbb LDL4 Bx,bx       SUPERVISOR LOAD REG/IREG
0001111101001000 STOR AUX,PN      PN -> AUX
0001111I11001000 STOR Ix,AUX      AUX -> IX
0000000000011111 LOAD PTG         PTG FETCH

0111011IDDDDDDDD LOADPC IX,D      LOAD PC + DISP  PC+D => IREG
1011011I1MAAAAAA GETPTG IX,Ax     VECTOR LS LOAD  IREG-LS => IREG
1011011I0MAAAAAA PUTPTG IX,Ax     VECTOR LS STORE IREG-LS => LS

110001111i10NNNN RDIM X,ix,Nx      READ INSTR MEM INDEX+4BIT DISP
110001101i10NNNN WRIM X,ix,Nx     WRITE INSTR MEM INDEX+4BIT DISP

110001111i11Xrrr RDIM X,ix,Rx      READ INSTR MEM INDEX+REG  DISP
110001101i11Xrrr WRIM X,ix,Rx     WRITE INSTR MEM INDEX+REG  DISP

110001111i000000 RDIM D,ix,Mx      READ INSTR MEM DIR
110001101i000000 WRIM D,ix,Mx     WRITE INSTR MEM DIR

111XXX000DDDDDDD JXXX [R,] LABEL   COND BRANCH    PC+DISP
110000000DDDDDDD JUNC [R,] LABEL UNCOND BRANCH    PC+DISP

111XXX001DDDDDDD JXXX [R,] LABEL   COND BRANCH    PC-DISP
110000001DDDDDDD JUNC [R,] LABEL UNCOND BRANCH    PC-DISP

111XXX010MAAAAAA JXXX L,Ax         COND BRANCH    LS
110000010MAAAAAA JUNC L,Ax       UNCOND BRANCH    LS
```

```
111XXX110MAAAAAA CXXX [L,]Ax      COND CALL       LS                     LINK IO
110000110MAAAAAA CUNC [L,]Ax    UNCOND CALL       LS                     LINK IO

111XXX011i10NNNN JXXX ix,Nx       COND BRANCH     INDEX+4BIT DISP
110000011i10NNNN JUNC ix,Nx     UNCOND BRANCH     INDEX+4BIT DISP
111XXX111i10NNNN CXXX ix,Nx       COND CALL       INDEX+4BIT DISP LINK IO
110000111i10NNNN CUNC ix,Nx     UNCOND CALL       INDEX+4BIT DISP LINK IO

111XXX011i11Xrrr JXXX ix,rx       COND BRANCH     INDEX+ REG DISP
110000011i11Xrrr JUNC ix,rx     UNCOND BRANCH     INDEX+ REG DISP
111XXX111i11Xrrr CXXX ix,rx       COND CALL       INDEX+ REG DISP LINK IO
110000111i11Xrrr CUNC ix,rx     UNCOND CALL       INDEX+ REG DISP LINK IO

111XXX0110010000 JXXX D,LABEL     COND BRANCH     DIR
1100000110010000 JUNC D,LABEL   UNCOND BRANCH     DIR
111XXX1110010000 CXXX D,LABEL     COND CALL       DIR                    LINK IO
1100001110010000 CUNC D,LABEL   UNCOND CALL       DIR                    LINK IO

111XXX0110000000 JXXX ID,LABEL    COND BRANCH     INDIR
1100000110000000 JUNC ID,LABEL  UNCOND BRANCH     INDIR
111XXX1110000000 CXXX ID,LABEL    COND CALL       INDIR                  LINK IO
1100001110000000 CUNC ID,LABEL  UNCOND CALL       INDIR                  LINK IO
```

APPENDIX C

```
                                                                            0.
PPPPPPPPPPPPPPPP SS C  DDIDSSTSSPSBIPPAA1BTLGGXXHLLHSSHLLCACSIHPACOCNXYZ    #
0123456789111111 01 Y  LEMPEE/EEVERWNIUUG.OSRRWRAABBRLAABRLAUNB.NIRR       D
          012345    C  ACDOLLPLL.L./.RXX/RGA..RDHHHHLLLLLCURBCLRDN C       E
                    L  M..W..C..R.WRR...8E. WR      AA   OOG R E   X       C
                    E   RR RRRIIDIRBDRRW VL RD      LL   UUE - V   /       S
                        DD 12  B 0   DDR  4              TTN 2     Y

01000RRRDDDDDDDD 00 1  ....1............................................   1
 ADD  I,Rx,Dx    00 2  ......................1.....1....1...............   1
 ADD             00 3  .................................................   0
 REG-IMMED       00 4  ..1.............................1................   1
                 00 5  ....................................1............   1
                 00 6  .....................1.............1.............   1

01001RRRDDDDDDDD 00 1  ....1................................1....1......   2
 SUB  I,Rx,Dx    00 2  ......................1.....1....1...............   2
 SUBTRACT        00 3  .................................................   0
 REG-IMMED       00 4  ..1.............................1................   1
                 00 5  ....................................1............   1
                 00 6  .....................1.............1.............   1

01010RRRDDDDDDDD 00 1  ....1................................1....1......   2
 CMPR I,Rx,Dx    00 2  ......................1.....1....1...............   1
 COMPARE         00 3  .................................................   0
 REG-IMMED       00 4  ..1.............................1................   1
                 00 5  ....................................1............   1
                 00 6  .................................................   0

01011RRRDDDDDDDD 00 1  ....1..........................................1.   3
 LOAD I,Rx,Dx    00 2  ......................1..........................   1
 LOAD            00 3  .................................................   0
 REG-IMMED       00 4  ..1........................1....1................   3
                 00 5  .................................................   0
                 00 6  .....................1.............1.............   1

01100RRRDDDDDDDD 00 1  ....1....................................11.....1   4
 AND  I,Rx,Dx    00 2  ......................1..........1...............   2
 LOGICAL AND     00 3  .................................................   0
 REG-IMMED       00 4  ..1.............................1................   1
                 00 5  ....................................1............   2
                 00 6  .....................1.............1.............   1
```

```
01101RRRDDDDDDDD 00 1  ....1..................................1....1  3
 LOR  I,Rx,Dx    00 2  ......................1..........1...........  2
 LOGICAL OR      00 3  ............................................  0
 REG-IMMED       00 4  ..1............................1............  2
                 00 5  ............................................  0
                 00 6  .....................1.............1.........  1

01110RRRDDDDDDDD 00 1  ....1.......................................1  2
 XOR  I,Rx,Dx    00 2  ......................1..........1...........  2
 EXCLUSIVE OR    00 3  ............................................  0
 REG-IMMED       00 4  ..1............................1............  1
                 00 5  ............................................  0
                 00 6  .....................1.............1.........  1

                                                                       1.
PPPPPPPPPPPPPPPP SS C  DDIDSSTSSPSBIPPAA1BTLGGXXHLLHSSHLLCACSIHPACOCWXYZ  #
0123456789111111 01 Y  LEMPEE/EEVERWNIUUG.OSRRWRAABBRLAABRLAUNB.NIRR       D
          012345    C  ACDOLLPLL.L./.RXX/RGA..RDHHHHLLLLLCURECLRDN C       E
                    L  M..W..C..R.WRR...8E. WR       AA   OOG R E    X     C
                    E   RR RRRIIDIRBDRRW VL RD       LL   UUE - V    /     S
                        DD 12  B 0.  DDR  4                TTN 2      Y

01111RRRDDDDDDDD 00 1  ....1.................................111...111  5
 TWM  I,Rx,Dx    00 2  ......................1...1.....1.............  2
 TEST WITH MASK  00 3  ............................................  0
 REG-IMMED       00 4  ..1..........................1.....1..........  1
                 00 5  ....................................1.........  1
                 00 6  ............................................  0

00000RRR10000rrr 00 1  .....1......................................  1
 ADD  R,Rx,rx    00 2  ....1.................1.........1...........  1
 ADD             00 3  ............................................  0
 REG-REG => REG  00 4  ......................1.....1....1..........  1
                 00 5  ....................................1.........  1
                 00 6  .....................1.............1.........  1

00001RRR10000rrr 00 1  .....1..............................1....1.....  2
 SUB  R,Rx,rx    00 2  ....1.................1.........1...........  1
 SUBTRACT        00 3  ............................................  0
 REG-REG => REG  00 4  ......................1.....1....1..........  1
                 00 5  ....................................1.........  1
                 00 6  .....................1.............1.........  1

00010RRR10000rrr 00 1  .....1......  ......................1....1.....  2
 CMPR R,Rx,rx    00 2  ....1.................1.........1...........  1
 COMPARE         00 3  ............................................  0
 REG-REG         00 4  ......................1.....1....1..........  1
                 00 5  ....................................1.........  1
                 00 6  ............................................  0

00011RRR10000rrr 00 1  .....1.....................................1.  3
 LOAD R,Rx,rx    00 2  ....1.................1...1.....1...........  3
 LOAD            00 3  ............................................  0
 REG-REG => REG  00 4  ............................................  0
                 00 5  ............................................  0
                 00 6  .....................1.............1.........  1

00100RRR10000rrr 00 1  .....1.................................11.....1  5
 AND  R,Rx,rx    00 2  ....1.................1.........1...........  1
 LOGICAL AND     00 3  ............................................  0
 REG-REG => REG  00 4  ......................1..........1..........  2
                 00 5  ....................................1.........  2
                 00 6  .....................1.............1.........  1

00101RRR10000rrr 00 1  .....1..................................1....1  4
 LOR  R,Rx,rx    00 2  ....1.................1.........1...........  1
 LOGICAL OR      00 3  ............................................  0
 REG-REG => REG  00 4  ......................1..........1..........  2
                 00 5  ............................................  0
                 00 6  .....................1.............1.........  1
```

```
                                                                            2.
PPPPPPPPPPPPPPPP SS C  DDIDSSTSSPSBIPPAA1BTLGGXXHLLHSSHLLCACSIHPACOCWXYZ   #
0123456789111111 01 Y  LEMPEE/EEVERWNIUUG.0SRRWRAABBRLAABRLAUNB.NIRR
          012345    C  ACDOLLPLL.L./.RXX/RGA..RDHHHHLLLLLCURBCLRDN C
                    L  M..W..C..R.WRR...8E. WR         AA   OOG R E   X
                    E   RR RRRIIDIRBDRRW VL RD         LL   UUE - V   /
                        DD 12  B 0.  DDR  4                 TTN 2     Y

00110RRR10000rrr 00 1  .....1...........................................1  3
 XOR  R.Rx.rx    00 2  ....1..................1.........1................  1
 EXCLUSIVE OR    00 3  ..................................................  0
 REG-REG => REG  00 4  .......................1..........1...............  1
                 00 5  ..................................................  0
                 00 6  ......................1.............1.............  1

00111RRR10000rrr 00 1  .....1...................................111...111  7
 TWM  R.Rx.rx    00 2  ....1..................1...1...11.................  2
 TEST WITH MASK  00 3  ..................................................  0
 REG-REG         00 4  .......................1...1....1.................  1
                 00 5  .....................................1............  1
                 00 6  ..................................................  0

10000RRR0MAAAAAA 00 1  ....1................1............................  2
 ADD  L.Rx.Ax.0  00 2  .....................1.1.1...1...1................  1
 ADD             00 3  1..1..............................................  1
 REG-LS => LS    00 4  .................................1................  1
                 00 5  .....................................1............  1
                 00 6  ................1...................1.............  2

                 01 1  .....................1..........................11  2
                 01 2  .....................1..1.........................  1
                 01 3  ...............1..................................  1
                 01 4  ..................................................  0
                 01 5  ..................................................  0
                 01 6  ..................................................  0

10001RRR0MAAAAAA 00 1  ....1................1................1....1......  4
 SUB  L.Rx.Ax.0  00 2  .....................1.1.1...1...1................  1
 SUBTRACT        00 3  1..1..............................................  1
 REG-LS => LS    00 4  .................................1................  1
                 00 5  .....................................1............  1
                 00 6  ................1...................1.............  2

                 01 1  .....................1..........................11  2
                 01 2  .....................1..1.........................  1
                 01 3  ...............1..................................  1
                 01 4  ..................................................  0
                 01 5  ..................................................  0
                 01 6  ..................................................  0

10010RRR0MAAAAAA 00 1  ....1................1................1....1......  5
 CMPR L.Rx.Ax.0  00 2  .....................1.1.1...1...1................  1
 COMPARE         00 3  ..................................................  0
 REG-LS          00 4  .................................1................  1
                 00 5  .....................................1............  1
                 00 6  ................1...................1.............  2

                                                                            3.
PPPPPPPPPPPPPPPP SS C  DDIDSSTSSPSBIPPAA1BTLGGXXHLLHSSHLLCACSIHPACOCWXYZ   #
0123456789111111 01 Y  LEMPEE/EEVERWNIUUG.0SRRWRAABBRLAABRLAUNB.NIRR
          012345    C  ACDOLLPLL.L./.RXX/RGA..RDHHHHLLLLLCURBCLRDN C
                    L  M..W..C..R.WRR...8E. WR         AA   OOG R E   X
                    E   RR RRRIIDIRBDRRW VL RD         LL   UUE - V   /
                        DD 12  B 0.  DDR  4                 TTN 2     Y

10011RRR0MAAAAAA 00 1  ....1................1..........................11  9
 STOR L.Rx.Ax.0  00 2  .....................1..1.........................  1
 STORE           00 3  ......................1...........................  1
 REG-LS => LS    00 4  ..................................................  0
```

```
                  00 5  ...................................................  0
                  00 6  ................1...................1..............  2

10100RRR0MAAAAAA  00 1  ....1...............1....................11.....1   7
 AND  L,Rx,Ax,0   00 2  ....................1.1.1.........1................  2
 LOGICAL AND      00 3  1..1...............................................  2
 REG-LS => LS     00 4  .................................1.................  2
                  00 5  .....................................1.............  2
                  00 6  ................1...................1..............  2

                  01 1  ....................1............................11  2
                  01 2  ....................1..1...........................  1
                  01 3  ...............1...................................  1
                  01 4  ...................................................  0
                  01 5  ...................................................  0
                  01 6  ...................................................  0

10101RRR0MAAAAAA  00 1  ....1...............1....................1.....1    5
 LOR  L,Rx,Ax,0   00 2  ....................1.1.1.........1................  2
 LOGICAL OR       00 3  1..1...............................................  2
 REG-LS => LS     00 4  .................................1.................  2
                  00 5  ...................................................  0
                  00 6  ................1...................1..............  2

                  01 1  ....................1............................11  2
                  01 2  ....................1..1...........................  1
                  01 3  ...............1...................................  1
                  01 4  ...................................................  0
                  01 5  ...................................................  0
                  01 6  ...................................................  0

10110RRR0MAAAAAA  00 1  ....1...............1............................1  3
 XOR  L,Rx,Ax,0   00 2  ....................1.1.1.........1................  2
 EXCLUSIVE OR     00 3  1..1...............................................  2
 REG-LS => LS     00 4  .................................1.................  1
                  00 5  ...................................................  0
                  00 6  ................1...................1..............  2

                  01 1  ....................1............................11  2
                  01 2  ....................1..1...........................  1
                  01 3  ...............1...................................  1
                  01 4  ...................................................  0
                  01 5  ...................................................  0
                  01 6  ...................................................  0

                                                                             4.
PPPPPPPPPPPPPPPP  SS C  DDIDSSTSSPSBIPPAA1BTLGGXXHLLHSSHLLCACSIHPACOCWKYZ  #
0123456789111111  01 Y  LEMPEE/EEVERWNIUUG.OSRRWRAABBRLAABRLAUNB.NIRR      D
          012345     C  ACDCLLPLL.L./.RXX/RGA..RDHHHHLLLLLCURBCLRDN C        E
                     L  M..W..C..R.WRR...8E. WR      AA     COG R E     X    C
                     E   RR RRRIIDIREDRRW VL RD      LL     UUE - V     /    S
                         DD 12  B 0'  DDR  4                TTN 2       Y

10111RRR0MAAAAAA  00 1  ....1...............1...................111...111  11
 TWM  L,Rx,Ax,0   00 2  ....................1.1.1.1.....1.................  2
 TEST WITH MASK   00 3  ..................................................  0
 REG-LS           00 4  ...........................1.....1................  2
                  00 5  .....................................1............  2
                  00 6  ................1...................1.............  2

10000RRR1MAAAAAA  00 1  ....1...............1.............................  1
 ADD  L,Rx,Ax     00 2  ....................1.1.1...1....1................  1
  ADD             00 3  ..................................................  0
 REG-LS => REG    00 4  ................................1.................  1
                  00 5  ....................................1.............  1
                  00 6  .....................1.............1..............  1
```

```
10001RRR1MAAAAAA 00 1  ....1...............1................1...1......  3
 SUB  L,Rx,Ax    00 2  ....................1.1.1...1....1..............  1
  SUBTRACT       00 3  ................................................  0
 REG-LS => REG   00 4  ...............................1................  1
                 00 5  ....................................1...........  1
                 00 6  .....................1.............1............  1

10011RRR1MAAAAAA 00 1  ....1...............1.........................1.  6
 LOAD L,Rx,Ax    00 2  ....................1...1.......................  1
  LOAD           00 3  ................................................  0
 REG-LS => REG   00 4  ...........................1.....1..............  2
                 00 5  ................................................  0
                 00 6  .....................1.............1............  1

10100RRR1MAAAAAA 00 1  ....1...............1....................11....1  6
 AND  L,Rx,Ax    00 2  ....................1.1.1........1..............  2
  LOGICAL AND    00 3  ................................................  0
 REG-LS => REG   00 4  ...............................1................  2
                 00 5  ....................................1...........  2
                 00 6  .....................1.............1............  1

10101RRR1MAAAAAA 00 1  ....1...............1......................1...1  4
 LOR  L,Rx,Ax    00 2  ....................1.1.1........1..............  2
  LOGICAL OR     00 3  ................................................  0
 REG-LS => REG   00 4  ...............................1................  2
                 00 5  ................................................  0
                 00 6  .....................1.............1............  1

10110RRR1MAAAAAA 00 1  ....1...............1..........................1  2
 XOR  L,Rx,Ax    00 2  ....................1.1.1........1..............  2
  EXCLUSIVE OR   00 3  ................................................  0
 REG-LS => REG   00 4  ...............................1................  1
                 00 5  ................................................  0
                 00 6  .....................1.............1............  1

                                                                           5.
PPPPPPPPPPPPPPPP SS C  DDIDSSTSSPSBIPPAA1BTLGGXXHLLHSSHLLCACSIHPACOCNKYZ  #
0123456789111111 01 Y  LEMPEE/EEVERWNIUUG.OSRRWRAABBRLAABRLAUNB.NIRR     D
          012345    C  ACDOLLPLL.L./.RXX/RGA..RDHHHHLLLLLCURECLRDN C     E
                    L  M..W..C..R.WRR...8E. WR      AA   OOG R E   X    C
                    E   RR RRRIIDIREDRRW VL RD      LL   UUE - V   /    S
                        DD 12  B 0.  DDR  4              TTN 2     Y

00000RRR1110NNNN 00 1  .......1......................................11  1
 ADD  X,Rx,Nx,ix 00 2  .....1................1....1....1...............  1
  ADD            00 3  1..1............................................  1
 INDEX+4BIT DISP 00 4  ..1............................1................  1
                 00 5  ....................................1...........  1
                 00 6  ................1..................1............  1

                 01 1  ....1..........1................................  1
                 01 2  ...............1........1.......................  2
                 01 3  ......................1....1....1...............  1
                 01 4  ...............................1................  1
                 01 5  ....................................1...........  1
                 01 6  .....................1.............1............  1

00001RRR1110NNNN 00 1  .......1......................................11  1
 SUB  X,Rx,Nx,ix 00 2  .....1................1....1....1...............  1
  SUBTRACT       00 3  1..1............................................  1
 INDEX+4BIT DISP 00 4  ..1............................1................  1
                 00 5  ....................................1...........  1
                 00 6  ................1..................1............  1

                 01 1  ....1..........1.....................1...1......  3
                 01 2  ...............1........1.......................  2
                 01 3  ......................1....1....1...............  1
                 01 4  ...............................1................  1
                 01 5  ....................................1...........  1
                 01 6  .....................1.............1............  1
```

```
00010RRRXi10NNNN 00 1   ......1.....................................11  1
 CMPR X.Rx,Nx,ix 00 2   .....1.................1.....1....1...........  1
  COMPARE        00 3   1..1..........................................  1
 INDEX+4BIT DISP 00 4   ..1.............................1.............  1
                 00 5   ....................................1.........  1
                 00 6   ...............1.................1............  1

                 01 1   ....1..........1.....................1....1...  2
                 01 2   ...............1........1.....................  2
                 01 3   .......................1.....1....1...........  1
                 01 4   ................................1.............  1
                 01 5   ....................................1.........  1
                 01 6   ..............................................  0

00011RRR1i10NNNN 00 1   ......1.....................................11  3
 LOAD X.Rx,Nx,ix 00 2   .....1.................1.....1....1...........  1
  LOAD           00 3   1..1..........................................  1
 INDEX+4BIT DISP 00 4   ..1.............................1.............  1
                 00 5   ....................................1.........  1
                 00 6   ...............1.................1............  1

                                                                        6.
PPPPPPPPPPPPPPPP SS C  DDIDSSTSSPSBIPPAA1BTLGGXXHLLHSSHLLCACSIHPACOCWXYZ  #
0123456789111111 01 Y  LEMPEE/EEVERWNIUUG.OSRRWRAABBRLAABRLAUNB.NIRR     I
          012345    C  ACDOLLPLL.L./.RXX/RGA..RDHHHHLLLLLCURBCLRDN C     E
                    L  M..W..C..R.WRR...8E. WR      AA   OOG R E   X     C
                    E   RR RRRIIDIRBDRRW VL RD      LL   UUE - V   /     E
                        DD 12  B 0   DDR  4              TTN 2     Y

                 01 1   ....1..........1.............................1.  3
                 01 2   ...............1........1.....................  2
                 01 3   ..............................................  0
                 01 4   ..........................1....1..............  5
                 01 5   ..............................................  0
                 01 6   ....................1.............1...........  1

00011RRR0i10NNNN 00 1   ......1.....................................11  3
 STOR X.Rx,Nx,ix 00 2   .....1.................1.....1....1...........  1
  STORE          00 3   1..1..........................................  1
 INDEX+4BIT DISP 00 4   ..1.............................1.............  1
                 00 5   ....................................1.........  1
                 00 6   ...............1.................1............  1

                 01 1   ....1..........1............................11  4
                 01 2   ...............1.......1......................  2
                 01 3   ......................1.......................  1
                 01 4   ................................1.............  1
                 01 5   ..............................................  0
                 01 6   ..............................................  0

00100RRR1i10NNNN 00 1   ......1.....................................11  3
 AND  X.Rx,Nx,ix 00 2   .....1.................1.....1....1...........  1
  LOGICAL AND    00 3   1..1..........................................  1
 INDEX+4BIT DISP 00 4   ..1.............................1.............  1
                 00 5   ....................................1.........  1
                 00 6   ...............1.................1............  1

                 01 1   ....1..........1.........................11.....1  4
                 01 2   ...............1........1.....................  3
                 01 3   .......................1.....1....1...........  1
                 01 4   ................................1.............  2
                 01 5   ....................................1.........  2
                 01 6   ....................1.............1...........  1

00101RRR1i10NNNN 00 1   ......1.....................................11  3
 LOR  X.Rx,Nx,ix 00 2   .....1.................1.....1....1...........  1
  LOGICAL OR     00 3   1..1..........................................  1
 INDEX+4BIT DISP 00 4   ..1.............................1.............  1
                 00 5   ....................................1.........  1
                 00 6   ...............1.................1............  1
```

```
                  01 1  ....1..........1............................1....1   3
                  01 2  ...............1........1.........................   3
                  01 3  ......................1......1....1...............   1
                  01 4  .................................1................   2
                  01 5  ..................................................   0
                  01 6  .....................1..............1.............   1

                                                                            7.
PPPPPPPPPPPPPPPP SS C  DDIDSSTSSPSBIPPAA1BTLGGXXHLLHSSHLLCACSIHPACOCWXYZ  #
0123456789111111 01 Y  LEMPEE/EEVERWNIUUG.OSRRWRAABBRLAABRLAUNB.NIRR      D
          012345    C  ACDOLLPLL.L./.RXX/RGA..RDHHHLLLLLCURBCLRDN C       E
                    L  M..W..C..R.WRR...8E. WR       AA   OOG R E   X     C
                    E   RR RRRIIDIRBDRRW VL RD       LL   UUE - V   /     S
                        DD 12  B 0   DDR  4               TTN 2     Y

00110RRR1110NNNN  00 1  .......1........................................11   3
 XOR  X,Rx,Nx,ix  00 2  .....1................1.....1....1................   1
  EXCLUSIVE OR    00 3  1..1..............................................   1
 INDEX+4BIT DISP  00 4  ..1.............................1.................   1
                  00 5  .....................................1............   1
                  00 6  ................1..................1..............   1

                  01 1  ....1..........1.................................1   2
                  01 2  ...............1........1.........................   3
                  01 3  ......................1......1....1...............   1
                  01 4  .................................1................   1
                  01 5  ..................................................   0
                  01 6  .....................1..............1.............   1

00111RRRX110NNNN  00 1  .......1........................................11   5
 TWM  X,Rx,Nx,ix  00 2  .....1................1.....1....1................   1
  TEST WITH MASK  00 3  1..1..............................................   1
 INDEX+4BIT DISP  00 4  ..1.............................1.................   1
                  00 5  .....................................1............   1
                  00 6  ................1..................1..............   1

                  01 1  ....1..........1.........................111...111   4
                  01 2  ...............1........1.........................   3
                  01 3  .......................1..1.....1.................   1
                  01 4  ...........................1.....1................   2
                  01 5  .....................................1............   2
                  01 6  ..................................................   0

00000RRR1111Xrrr  00 1  .......1........................................11   2
 ADD  X,Rx,rx,ix  00 2  .....1................1.....1....1................   1
  ADD             00 3  1..1..............................................   1
 INDEX+ REG DISP  00 4  ......................1..........1................   1
                  00 5  .....................................1............   1
                  00 6  ................1...................1.............   1

                  01 1  ....1..........1..................................   1
                  01 2  ...............1........1.........................   2
                  01 3  ......................1.....1....1................   1
                  01 4  ................................1.................   1
                  01 5  .....................................1............   1
                  01 6  .....................1..............1.............   1

00001RRR1111Xrrr  00 1  .......1........................................11   2
 SUB  X,Rx,rx,ix  00 2  .....1................1.....1....1................   1
  SUBTRACT        00 3  1..1..............................................   1
 INDEX+ REG DISP  00 4  ......................1.........1.................   1
                  00 5  .....................................1............   1
                  00 6  ................1..................1..............   1
```

```
                                                                                8.
PPPPPPPPPPPPPPPP SS C  DDIDSSTSSPSBIPPAA1BTLGGXXHLLHSSHLLCACSIHPACOCWXYZ   #
0123456789111111 01 Y  LEMPEE/EEVERWNIUUG.OSRRWRAABBRLAABRLAUNB.NIRR       D
          012345    C  ACDOLLPLL.L./.RXX/RGA..RDHHHHLLLLLCURBCLRDN C       E
                    L  M..W..C..R.WRR...8E. WR       AA    OOG R E   X     C
                    E   RR RRRIIDIRBDRRW VL RD       LL    UUE - V   /     S
                         DD 12  B 0   DDR  4              TTN 2     Y

                 01 1  ....1..........1.....................1....1......   3
                 01 2  ...............1........1........................   2
                 01 3  ......................1.....1....1...............   1
                 01 4  ................................1................   1
                 01 5  ....................................1............   1
                 01 6  .....................1.............1.............   1

00010RRRXiiiXrrr 00 1  .......1.......................................11   2
 CMPR X,Rx,rx,ix 00 2  .....1................1.....1....1...............   1
  COMPARE        00 3  1..1.............................................   1
 INDEX+ REG DISP 00 4  ......................1.........1................   1
                 00 5  ....................................1............   1
                 00 6  ................1..................1.............   1

                 01 1  ....1..........1.....................1....1......   2
                 01 2  ...............1........1........................   2
                 01 3  ......................1.....1....1...............   1
                 01 4  ................................1................   1
                 01 5  ....................................1............   1
                 01 6  .................................................   0

00011RRR1iiiXrrr 00 1  .......1.......................................11   4
 LOAD X,Rx,rx,ix 00 2  .....1................1.....1....1...............   1
  LOAD           00 3  1..1.............................................   1
 INDEX+ REG DISP 00 4  ......................1.........1................   1
                 00 5  ....................................1............   1
                 00 6  ................1..................1.............   1

                 01 1  ....1..........1...............................1.   3
                 01 2  ...............1........1........................   2
                 01 3  .................................................   0
                 01 4  ...........................1....1................   5
                 01 5  .................................................   0
                 01 6  .....................1.............1.............   1

00011RRR0iiiXrrr 00 1  .......1.......................................11   4
 STOR X,Rx,rx,ix 00 2  .....1................1.....1....1...............   1
  STORE          00 3  1..1.............................................   1
 INDEX+ REG DISP 00 4  ......................1.........1................   1
                 00 5  ....................................1............   1
                 00 6  ................1..................1.............   1

                 01 1  ....1..........1...............................11   4
                 01 2  ...............1.......1.........................   2
                 01 3  ......................1..........................   1
                 01 4  ................................1................   1
                 01 5  .................................................   0
                 01 6  .................................................   0

                                                                                9.
PPPPPPPPPPPPPPPP SS C  DDIDSSTSSPSBIPPAA1BTLGGXXHLLHSSHLLCACSIHPACOCWXYZ   #
0123456789111111 01 Y  LEMPEE/EEVERWNIUUG.OSRRWRAABBRLAABRLAUNB.NIRR       D
          012345    C  ACDOLLPLL.L./.RXX/RGA..RDHHHHLLLLLCURBCLRDN C       E
                    L  M..W..C..R.WRR...8E. WR       AA    OOG R E   X     C
                    E   RR RRRIIDIRBDRRW VL RD       LL    UUE - V   /     S
                         DD 12  B 0   DDR  4              TTN 2     Y

00100RRR1iiiXrrr 00 1  .......1.......................................11   4
 AND  X,Rx,rx,ix 00 2  .....1................1.....1....1...............   1
  LOGICAL AND    00 3  1..1.............................................   1
 INDEX+ REG DISP 00 4  ......................1.........1................   1
```

```
                  00 5  ....................................1............   1
                  00 6  ................1..................1.............   1

                  01 1  ....1..........1.........................11.....1   4
                  01 2  ...............1........1........................   3
                  01 3  ......................1.....1....1...............   1
                  01 4  ................................1................   2
                  01 5  ....................................1............   2
                  01 6  .....................1.............1.............   1

00101RRR1i11Xrrr  00 1  .......1.......................................11   4
LOR  X,Rx,rx,ix   00 2  .....1................1.....1....1...............   1
 LOGICAL OR       00 3  1..1.............................................   1
INDEX+ REG DISP   00 4  ......................1.........1................   1
                  00 5  ....................................1............   1
                  00 6  ................1..................1.............   1

                  01 1  ....1..........1...........................1....1   3
                  01 2  ...............1........1........................   3
                  01 3  ......................1.....1....1...............   1
                  01 4  ................................1................   2
                  01 5  .................................................   0
                  01 6  .....................1.............1.............   1

00110RRR1i11Xrrr  00 1  .......1.......................................11   4
XOR  X,Rx,rx,ix   00 2  .....1................1.....1....1...............   1
 EXCLUSIVE OR     00 3  1..1.............................................   1
INDEX+ REG DISP   00 4  ......................1.........1................   1
                  00 5  ....................................1............   1
                  00 6  ................1..................1.............   1

                  01 1  ....1..........1................................1   2
                  01 2  ...............1........1........................   3
                  01 3  ......................1.....1....1...............   1
                  01 4  ................................1................   1
                  01 5  .................................................   0
                  01 6  .....................1.............1.............   1

00111RRRXi11Xrrr  00 1  .......1.......................................11   6
TWM  X,Rx,rx,ix   00 2  .....1................1.....1....1...............   1
 TEST WITH MASK   00 3  1..1.............................................   1
INDEX+ REG DISP   00 4  ......................1.........1................   1
                  00 5  ....................................1............   1
                  00 6  ................1..................1.............   1


PPPPPPPPPPPPPPPP SS C  DDIDSSTSSPSBIPPAA1BTLGGXXHLLHSSHLLCACSIHPACOCWXYZ  #
0123456789111111 01 Y  LEMPEE/EEVERWNIUUG.OSRRWRAABBRLAABRLAUNB.NIRR      D
          012345    C  ACDOLLPLL.L./.RXX/RGA..RDHHHHLLLLLCURBCLPDN C      E
                    L  M..W..C..R.WRR...8E. WR       AA   OOG R E   X     C
                    E   RR RRRIIDIRBDRRW VL RD       LL   UUE - V   /     S
                        DD 12  B 0.  DDR  4               TTN 2     Y

                  01 1  ....1..........1........................111...111   4
                  01 2  ...............1........1........................   3
                  01 3  ......................1...1.....1................   1
                  01 4  ...........................1.....1...............   2
                  01 5  ....................................1............   2
                  01 6  .................................................   0

00000RRR00011000  00 1  ...............................................11   1
 ADD  D,Rx,Mx,0   00 2  ..............1..................................   1
  ADD             00 3  1..1.............................................   2
 REG-DIR => DIR   00 4  .................................................   0
                  00 5  .................................................   0
                  00 6  .................................................   0
```

```
                  01 1  ....1.........1..................................  1
                  01 2  ..............1.........1........................  2
                  01 3  1.....................1.....1....1...............  2
                  01 4  ................................1................  1
                  01 5  ....................................1............  1
                  01 6  ................1..................1.............  1

                  10 1  ..............1................................11  3
                  10 2  ..............1........1.........................  1
                  10 3  ...............1.................................  1
                  10 4  .................................................  0
                  10 5  .................................................  0
                  10 6  .................................................  0

00001RRR00011000  00 1  ...............................................11  1
SUB  D.Rx.Mx.0    00 2  ..............1..................................  1
 SUBTRACT         00 3  1..1.............................................  2
REG-DIR => DIR    00 4  .................................................  0
                  00 5  .................................................  0
                  00 6  .................................................  0

                  01 1  ....1.........1......................1....1......  2
                  01 2  ..............1.........1........................  2
                  01 3  1.....................1.....1....1...............  2
                  01 4  ................................1................  1
                  01 5  ....................................1............  1
                  01 6  ................1..................1.............  1

                  10 1  ..............1................................11  3
                  10 2  ..............1........1.........................  1
                  10 3  ...............1.................................  1
                  10 4  .................................................  0
                  10 5  .................................................  0
                  10 6  .................................................  0

                                                                        11.
PPPPPPPPPPPPPPPP  SS C  DDIDSSTSSPSBIPPAA1BTLGGXXHLLHSSHLLCACSIHPACOCWXYZ  #
0123456789111111  01 Y  LEMPEE/EEVERWNIUUG.0SRRWRAABBRLAABRLAUNB.NIRR      D
          012345     C  ACDOLLPLL.L./.RXX/RGA..RDHHHHLLLLLCURBCLRDN C      E
                     L  M..W..C..R.WRR...8E. WR     AA    OOG R E   X      C
                     E   RR RRRIIDIREDRRW VL RD     LL    UUE - V   /      S
                         DD 12  B 0   DDR  4              TTN 2     Y

00011RRR00011000  00 1  ...............................................11  1
STOR D.Rx.Mx.0    00 2  ..............1..................................  1
 STORE            00 3  1................................................  1
REG-DIR => DIR    00 4  .................................................  0
                  00 5  .................................................  0
                  00 6  .................................................  0

                  01 1  ....1.........1................................11  4
                  01 2  ..............1........1.........................  2
                  01 3  ......................1..........................  1
                  01 4  ................................1................  1
                  01 5  .................................................  0
                  01 6  ................1..................1.............  1

00100RRR00011000  00 1  ...............................................11  3
AND  D.Rx.Mx.0    00 2  ..............1..................................  1
 LOGICAL AND      00 3  1..1.............................................  2
REG-DIR => DIR    00 4  .................................................  0
                  00 5  .................................................  0
                  00 6  .................................................  0

                  01 1  ....1.........1..........................11.....1  4
                  01 2  ..............1.........1........................  3
                  01 3  1.....................1.....1....1...............  2
                  01 4  ................................1................  2
```

```
                  01 5  ....................................1............   2
                  01 6  ................1..................1.............   1

                  10 1  ..............1................................11   5
                  10 2  ..............1........1.........................   1
                  10 3  ...............1.................................   1
                  10 4  .................................................   0
                  10 5  .................................................   0
                  10 6  .................................................   0

00101RRR00011000  00 1  ...............................................11   3
 LOR  D,Rx,Mx,0   00 2  ..............1..................................   1
  LOGICAL OR      00 3  1..1.............................................   2
 REG-DIR => DIR   00 4  .................................................   0
                  00 5  .................................................   0
                  00 6  .................................................   0

                  01 1  ....1.........1............................1....1   3
                  01 2  ..............1.........1........................   3
                  01 3  1.....................1.....1....1...............   2
                  01 4  ................................1................   2
                  01 5  .................................................   0
                  01 6  ................1..................1.............   1

                                                                          12.
PPPPPPPPPPPPPPPP  SS C  DDIDSSTSSPSBIPPAA1BTLGGXXHLLHSSHLLCACSIHPACOCWXYZ  =
0123456789111111  01 Y  LEMPEE/EEVERWNIUUG.OSRRWRAABERLAABRLAUNB.NIRR      D
          012345     C  ACDOLLPLL.L./.RXX/RGA..RDHHHHLLLLLCURBCLRDN C      E
                     L  M..W..C..R.WRR...6E. WR      AA   OOG R E   X      C
                     E   RR RRRIIDIRBDRRW VL RD      LL   UUE - V   /      S
                         DD 12  B 0   DDR  4              TTN 2     Y

                  10 1  ..............1................................11   5
                  10 2  ..............1........1.........................   1
                  10 3  ...............1.................................   1
                  10 4  .................................................   0
                  10 5  .................................................   0
                  10 6  .................................................   0

00110RRR00011000  00 1  ...............................................11   3
 XOR  D,Rx,Mx,0   00 2  ..............1..................................   1
  EXCLUSIVE OR    00 3  1..1.............................................   2
 REG-DIR => DIR   00 4  .................................................   0
                  00 5  .................................................   0
                  00 6  .................................................   0

                  01 1  ....1.........1.................................1   2
                  01 2  ..............1.........1........................   3
                  01 3  1.....................1.....1....1...............   2
                  01 4  ................................1................   1
                  01 5  .................................................   0
                  01 6  ................1..................1.............   1

                  10 1  ..............1................................11   5
                  10 2  ..............1........1.........................   1
                  10 3  ...............1.................................   1
                  10 4  .................................................   0
                  10 5  .................................................   0
                  10 6  .................................................   0

00000RRR10011000  00 1  ...............................................11   1
 ADD  D,Rx,Mx     00 2  ..............1..................................   1
  ADD             00 3  1................................................   1
 REG-DIR => REG   00 4  .................................................   0
                  00 5  .................................................   0
                  00 6  .................................................   0

                  01 1  ....1.........1..................................   1
                  01 2  ..............1.........1........................   2
```

```
                  01 3  ......................1.....1....1...............  1
                  01 4  ................................1................  1
                  01 5  ....................................1............  1
                  01 6  .....................1.............1.............  1

00001RRR10011000  00 1  ...............................................11  1
 SUB  D,Rx,Mx     00 2  ..............1..................................  1
  SUBTRACT        00 3  1................................................  1
 REG-DIR => REG   00 4  .................................................  0
                  00 5  .................................................  0
                  00 6  .................................................  0

                                                                          13.
PPPPPPPPPPPPPPPP SS C  DDIDSSTSSPSBIPPAA1BTLGGXXHLLHSSHLLCACSIHPACOCWXYZ   #
0123456789111111 01 Y  LEMPEE/EEVERWNIUUG.OSRRWRAABBRLAABRLAUNE.NIRR       D
          012345    C  ACDOLLPLL.L./.RXX/RGA..RDHHHLLLLLLCURBCLRDN C       E
                    L  M..W..C..R.WRR...8E. WR       AA    OOG R E   X     C
                    E   RR RRRIIDIRBDRRW VL RD       LL    UUE - V   /     S
                        DD 12  B 0   DDR  4                TTI 2     Y

                  01 1  ....1.........1......................1....1......  2
                  01 2  ..............1.........1........................  2
                  01 3  ......................1.....1....1...............  1
                  01 4  ................................1................  1
                  01 5  ....................................1............  1
                  01 6  .....................1.............1.............  1

00010RRR10011000  00 1  ...............................................11  1
 CMPR D,Rx,Mx     00 2  ..............1..................................  1
  COMPARE         00 3  1................................................  1
 REG-DIR          00 4  .................................................  0
                  00 5  .................................................  0
                  00 6  .................................................  0

                  01 1  ....1.........1......................1....1......  2
                  01 2  ..............1.........1........................  2
                  01 3  ......................1.....1....1...............  1
                  01 4  ................................1................  1
                  01 5  ....................................1............  1
                  01 6  .................................................  0

00011RRR10011000  00 1  ...............................................11  1
 LOAD D,Rx,Mx     00 2  ..............1..................................  1
  LOAD            00 3  1................................................  1
 REG-DIR => REG   00 4  .................................................  0
                  00 5  .................................................  0
                  00 6  .................................................  0

                  01 1  ....1.........1................................1.  3
                  01 2  ..............1.........1........................  2
                  01 3  .................................................  0
                  01 4  ...........................1....1................  5
                  01 5  .................................................  0
                  01 6  .....................1.............1.............  1

00100RRR10011000  00 1  ...............................................11  3
 AND  D,Rx,Mx     00 2  ..............1..................................  1
  LOGICAL AND     00 3  1................................................  1
 REG-DIR => REG   00 4  .................................................  0
                  00 5  .................................................  0
                  00 6  .................................................  0

                  01 1  ....1.........1..........................11.....1  4
                  01 2  ..............1.........1........................  3
                  01 3  ......................1.....1....1...............  [illegible]
                  01 4  ................................1................  [illegible]
                  01 5  ....................................1............  [illegible]
                  01 6  .....................1.............1.............  [illegible]
```

```
                                                                                14.
PPPPPPPPPPPPPPPP SS C  DDIDSSTSSPSBIPPAA1BTLGGXXHLLHSSHLLCACSIHPACOCWXYZ  #
0123456789111111 01 Y  LEMPEE/EEVERWNIUUG.OSRRWRAABBRLAABRLAUNB.NIRR      D
          012345    C  ACDOLLPLL.L./.RXX/RGA..RDHHHHLLLLLCURBCLRDN C      E
                    L  M..W..C..R.WRR...8E. WR      AA   OOG R E   X      E
                    E   RR RRRIIDIRBDRRW VL RD      LL   UUE - V   /      C
                        DD 12  B 0   DDR  4              TTN 2     Y      S

00101RRR10011000 00 1  ...............................................11  3
 LOR  D.Rx.Mx    00 2  ..............1..................................  1
  LOGICAL OR     00 3  1................................................  1
 REG-DIR => REG  00 4  .................................................  0
                 00 5  .................................................  0
                 00 6  .................................................  0

                 01 1  ....1.........1............................1....1  3
                 01 2  ..............1.........1........................  3
                 01 3  ......................1.....1....1...............  1
                 01 4  ................................1................  2
                 01 5  .................................................  0
                 01 6  .....................1.............1.............  1

00110RRR10011000 00 1  ...............................................11  3
 XOR  D.Rx.Mx    00 2  ..............1..................................  1
  EXCLUSIVE OR   00 3  1................................................  1
 REG-DIR => REG  00 4  .................................................  0
                 00 5  .................................................  0
                 00 6  .................................................  0

                 01 1  ....1.........1.................................1  2
                 01 2  ..............1.........1........................  3
                 01 3  ......................1.....1....1...............  1
                 01 4  ................................1................  1
                 01 5  .................................................  0
                 01 6  .....................1.............1.............  1

00111RRR10011000 00 1  ...............................................11  3
 TWM  D.Rx.Mx    00 2  ..............1..................................  1
  TEST WITH MASK 00 3  1................................................  1
 REG-DIR         00 4  .................................................  0
                 00 5  .................................................  0
                 00 6  .................................................  0

                 01 1  ....1.........1.........................111...111  4
                 01 2  ..............1.........1........................  3
                 01 3  ......................1...1.....1................  1
                 01 4  ...........................1.....1...............  2
                 01 5  ....................................1............  2
                 01 6  .................................................  0

0100011IDDDDDDDD 00 1  ....1............1...............................  2
 ADDD   I.Ix.Dx  00 2  ......................1.....1....1...............  1
 ADD             00 3  .................................................  0
 IREG-IMMED      00 4  ..1.............................1................  1
                 00 5  ....................................1............  1
                 00 6  .....................1.............1.............  1
                                                                                15.
PPPPPPPPPPPPPPPP SS C  DDIDSSTSSPSBIPPAA1BTLGGXXHLLHSSHLLCACSIHPACOCWXYZ  #
0123456789111111 01 Y  LEMPEE/EEVERWNIUUG.OSRRWRAABBRLAABRLAUNB.NIRR      D
          012345    C  ACDOLLPLL.L./.RXX/RGA..RDHHHHLLLLLCURBCLRDN C      E
                    L  M..W..C..R.WRR...8E. WR      AA   OOG R E   X      E
                    E   RR RRRIIDIRBDRRW VL RD      LL   UUE - V   /      C
                        DD 12  B 0   DDR  4              TTN 2     Y      S

0100111IDDDDDDDD 00 1  ....1............1..................1....1.......  3
 SUBD   I.Ix.Dx  00 2  ......................1.....1....1...............  2
 SUBTRACT        00 3  .................................................  0
 IREG-IMMED      00 4  ..1.............................1................  1
```

```
                    00 5  ....................................1............  1
                    00 6  .....................1.............1.............  1

0101011IDDDDDDDD    00 1  ....1............1...................1....1......  3
 CMPRD I,Ix,Dx      00 2  ......................1.....1....1...............  1
 COMPARE            00 3  .................................................  0
 IREG-IMMED         00 4  ..1.............................1................  1
                    00 5  ....................................1............  1
                    00 6  .................................................  0

0101111IDDDDDDDD    00 1  ....1............1..............................1  3
 LOADD I,Ix,Dx      00 2  ......................1..........................  1
 LOAD               00 3  .................................................  0
 IREG-IMMED         00 4  ..1.............................1................  1
                    00 5  .................................................  0
                    00 6  .....................1.............1.............  1

0110011IDDDDDDDD    00 1  ....1............1..............................1  3
 LOADL I,Ix,Dx      00 2  ......................1.....1....................  1
 LOAD LOW BYTE      00 3  .................................................  0
 IREG-IMMED         00 4  ..1.............................1................  1
                    00 5  .................................................  0
                    00 6  .....................1.............1.............  1

0110111IDDDDDDDD    00 1  ....1............1..........................1...1  4
 LOADU I,Ix,Dx      00 2  ......................1..........1...............  2
 LOAD HIGH BYTE     00 3  .................................................  0
 IREG-IMMED         00 4  ..1.......................1......................  1
                    00 5  .................................................  0
                    00 6  .....................1.............1.............  1

0000011I10000rrr    00 1  .....1...........1...............................  2
 ADDD  R,Ix,rx      00 2  ....1.................1..1......1................  2
 ADD                00 3  .................................................  0
 IREG-REG => REG    00 4  ......................1.....1....1...............  1
                    00 5  ....................................1............  1
                    00 6  .....................1.............1.............  1

0000111I10000rrr    00 1  .....1...........1...................1....1......  3
 SUBD  R,Ix,rx      00 2  ....1.................1..1......1................  2
 SUBTRACT           00 3  .................................................  0
 IREG-REG => REG    00 4  ......................1.....1....1...............  1
                    00 5  ....................................1............  1
                    00 6  .....................1.............1.............  1

                                                                            16.
PPPPPPPPPPPPPPPP    SS C  DDIDSSTSSPSBIPPAA1BTLGGXXHLLHSSHLLCACSIHPACOCWXYZ  #
0123456789111111    01 Y  LEMPEE/EEVERWNIUUG.OSRRWRAABBRLAABRLAUNB.NIRR     D
          012345       C  ACDOLLPLL.L./.RXX/RGA..RDHHHHLLLLLCURBCLRDN C     E
                       L  M..W..C..R.WRR...8E. WR       AA    COG R E   X    C
                       E   RR RRRIIDIRBDRRW VL RD       LL    UUE - V   /    S
                            DD 12   B Q    DDR  4              TTN 2     Y

0001011I10000rrr    00 1  .....1...........1...................1....1......  3
 CMPRD R,Ix,rx      00 2  ....1.................1..1......1................  2
 COMPARE            00 3  .................................................  0
 IREG-REG           00 4  ......................1.....1....1...............  1
                    00 5  ....................................1............  1
                    00 6  .................................................  0

0001111I10000rrr    00 1  .....1...........1..............................1  3
 LOADD R,Ix,rx      00 2  ....1.................1..1......1................  2
 LOAD               00 3  .................................................  0
 IREG-REG => REG    00 4  .................................................  0
                    00 5  .................................................  0
                    00 6  .....................1.............1.............  1
```

```
0010011I10000rrr 00 1  .....1...........1..............................1  4
 LOADL R,Ix,rx   00 2  ....1.................1.........1................  1
 LOAD LOW BYTE   00 3  .................................................  0
 IREG-REG => REG 00 4  ......................1.....1....................  1
                 00 5  .................................................  0
                 00 6  .....................1..............1............  1

0010111I10000rrr 00 1  .....1...........1.........................1....1  5
 LOADU R,Ix,rx   00 2  ....1.................1...1.....1................  2
 LOAD HIGH BYTE  00 3  .................................................  0
 IREG-REG => REG 00 4  ......................1.........1................  1
                 00 5  .................................................  0
                 00 6  .....................1..............1............  1

1000011I0MAAAAAA 00 1  ....1............1..1............................  5
 ADDD  L,Ix,Ax,0 00 2  .................1..1.1.1...1....1...............  2
 ADD             00 3  1..1.............................................  1
 IREG-LS => LS   00 4  ..........................1......1...............  2
                 00 5  .....................................1...........  1
                 00 6  ................1...................1............  1

                 01 1  .................1..1..........................11  3
                 01 2  .................1..1..1.........................  2
                 01 3  ...............1.................................  1
                 01 4  .................................................  0
                 01 5  .................................................  0
                 01 6  .................................................  0

1000111I0MAAAAAA 00 1  ....1............1..1.................1....1.....  7
 SUBD  L,Ix,Ax,0 00 2  .................1..1.1.1...1....1...............  2
 SUBTRACT        00 3  1..1.............................................  1
 IREG-LS => LS   00 4  ..........................1......1...............  2
                 00 5  .....................................1...........  1
                 00 6  ................1...................1............  1

                                                                          17.
PPPPPPPPPPPPPPPP SS C  DDIDSSTSSPSBIPPAA1BTLGGXXHLLHSSHLLCACSIHPACOCWXYZ  #
0123456789111111 01 Y  LEMPEE/EEVERWNIUUG.OSRRWRAABBRLAABRLAUNB.NIRR      I
          012345    C  ACDOLLPLL.L./.RXX/RGA..RDHHHLLLLLCURBCLRDN C        E
                    L  M..W..C..R.WRR...8E. WR        AA    OOG R E   X    C
                    E   RR RRRIIDIR2DRRW VL FD        LL    UUE - V   /    S
                        DD 12  B 0   DDR  4                 TTN 2     Y

                 01 1  .................1..1..........................11  3
                 01 2  .................1..1..1.........................  2
                 01 3  ...............1.................................  1
                 01 4  .................................................  0
                 01 5  .................................................  0
                 01 6  .................................................  0

1001011I0MAAAAAA 00 1  ....1............1..1.................1....1.....  8
 CMPRD L,Ix,Ax,0 00 2  .................1..1.1.1...1....1...............  2
 COMPARE         00 3  .................................................  0
 IREG-LS         00 4  ..........................1......1...............  2
                 00 5  .....................................1...........  1
                 00 6  .................................................  0

1001111I0MAAAAAA 00 1  ....1............1..1..........................11  9
 STORD L,Ix,Ax,0 00 2  .................1..1..1.........................  2
 STORE           00 3  ......................1..........................  1
 IREG-LS => LS   00 4  .............................1....1..............  1
                 00 5  .................................................  0
                 00 6  .................................................  0

1010011I0MAAAAAA 00 1  ....1............1..1..........................11  8
 STORL L,Ix,Ax,0 00 2  ....................1..1.........................  1
 STORE LOW BYTE  00 3  ......................1..........................  1
 IREG-LS => LS   00 4  .................................................  0
```

```
                  00 5  ..................................................  0
                  00 6  ..................................................  0

1010111I0MAAAAAA  00 1  ....1............1..1.......................1...11  9
 STORU L.Ix,Ax,0  00 2  ..................1.1..1..........................  2
 STORE HIGH BYTE  00 3  ......................1...........................  1
 IREG-LS => LS    00 4  ..................................................  0
                  00 5  ..................................................  0
                  00 6  ..................................................  0

1011111I0MAAAAAA  00 1  ....1............1..1............................1  6
 SWAPD L.Ix,Ax,0  00 2  ................11..1.1.1.........................  1
 SWAP             00 3  1..1..............................................  1
 IREG-LS          00 4  ............................1....1................  1
                  00 5  ..................................................  0
                  00 6  .....................1.............1..............  1

                  01 1  .................1..1...........................11  3
                  01 2  .................1..1..1..........................  2
                  01 3  ...............1..................................  1
                  01 4  ..................................................  0
                  01 5  ..................................................  0
                  01 6  ..................................................  0

                                                                        18.
PPPPPPPPPPPPPPPP  SS C  DDIDSSTSSPSBIPPAA1BTLGGXXHLLHSSHLLCACSIHPACOCWXYZ  #
0123456789111111  01 Y  LEMPEE/EEVERWNIUUG.0SRRWRAABBRLAABRLAUNB.NIPR      D
          012345     C  ACDOLLPLL.L./.RXX/RGA..RDHHHHLLLLLCURBCIRDN C      E
                     L  M..W..C..R.WRR...8E. WR       AA   00G R E   X      C
                     E   RR RRRIIDIRBDRRW VL RD       LL   UUE - V   /      S
                         DD 12  B 0   DDR  4               TTN 2     Y

1000011I1MAAAAAA  00 1  ....1............1..1.............................  3
 ADDD  L.Ix,Ax    00 2  .................1..1.1.1...1....1................  2
 ADD              00 3  ..................................................  0
 IREG-LS => IREG  00 4  .........................1......1.................  2
                  00 5  ....................................1.............  1
                  00 6  .....................1.............1..............  1

1000111I1MAAAAAA  00 1  ....1............1..1................1....1.......  5
 SUBD  L.Ix,Ax    00 2  .................1..1.1.1...1....1................  2
 SUBTRACT         00 3  ..................................................  0
 IREG-LS => IREG  00 4  .........................1......1.................  2
                  00 5  ....................................1.............  1
                  00 6  .....................1.............1..............  1

1001111I1MAAAAAA  00 1  ....1............1..1............................1  5
 LOADD L.Ix,Ax    00 2  .................1..1...1.........................  2
 LOAD             00 3  ..................................................  0
 IREG-LS => IREG  00 4  ............................1....1................  1
                  00 5  ..................................................  0
                  00 6  .....................1.............1..............  1

1010011I1MAAAAAA  00 1  ....1...............1............................1  4
 LOADL L.Ix,Ax    00 2  ....................1.1.1...1....1................  1
 LOAD LOW BYTE    00 3  ..................................................  0
 IREG-LS => IREG  00 4  .................................1................  1
                  00 5  ..................................................  0
                  00 6  .....................1.............1..............  1

1010111I1MAAAAAA  00 1  ....1............1..1.......................1....1  6
 LOADU L.Ix,Ax    00 2  ....................1.1.1...1....1................  1
 LOAD HIGH BYTE   00 3  ..................................................  0
 IREG-LS => IREG  00 4  ...........................1......................  1
                  00 5  ..................................................  0
                  00 6  .....................1.............1..............  1
```

```
0000011IIi10NNNN 00 1  .......1................................11  1
ADDD  X,Ix,Nx,ix 00 2  .....1...............1.....1....1.........  1
 ADD             00 3  1..1......................................  1
 INDEX+4BIT DISP 00 4  ..1.......................1...............  1
                 00 5  .................................1.........  1
                 00 6  ..............1................1..........  1

                 01 1  ....1..........1.1........................  2
                 01 2  ...............1.1......1.................  3
                 01 3  .....................1.....1....1.........  1
                 01 4  ........................1......1..........  2
                 01 5  .................................1.........  1
                 01 6  ...................1...........1..........  1
                                                                19.
PPPPPPPPPPPPPPPP SS C  DDIDSSTSSPSBIPPAA1BTLGGXXHLLHSSHLLCACSIHPACOCXXYZ  #
0123456789111111 01 Y  LEMPEE/EEVERWNIUUG.OSRRWRAABBRLAABRLAUNB.NIRR      D
          012345    C  ACDOLLPLL.L./.RXX/RGA..RDHHHHLLLLLCURBCLRDN C      E
                    L  M..W..C..R.WRR...SE. WR      AA    OOG R E   X     C
                    E   RR RRRIIDIRBDRRW VL RD      LL    UUE - V   /     S
                        DD 12  B 0   DDR   4              TTN 2     Y

0000111IIi10NNNN 00 1  .......1................................11  1
SUBD  X,Ix,Nx,ix 00 2  .....1...............1.....1....1.........  1
 SUBTRACT        00 3  1..1......................................  1
 INDEX+4BIT DISP 00 4  ..1.......................1...............  1
                 00 5  .................................1.........  1
                 00 6  ..............1................1..........  1

                 01 1  ....1..........1.1...............1....1...  5
                 01 2  ...............1.1......1.................  3
                 01 3  .....................1.....1....1.........  1
                 01 4  ........................1......1..........  2
                 01 5  .................................1.........  1
                 01 6  ...................1...........1..........  1

0001011IXi10NNNN 00 1  .......1................................11  1
CMPRD X,Ix,Nx,ix 00 2  .....1...............1.....1....1.........  1
 COMPARE         00 3  1..1......................................  1
 INDEX+4BIT DISP 00 4  ..1.......................1...............  1
                 00 5  .................................1.........  1
                 00 6  ..............1................1..........  1

                 01 1  ....1..........1.1...............1....1...  3
                 01 2  ...............1.1......1.................  3
                 01 3  .....................1.....1....1.........  1
                 01 4  ........................1......1..........  2
                 01 5  .................................1.........  1
                 01 6  ..........................................  0

0001111IIi10NNNN 00 1  .......1................................11  2
LOADD X,Ix,Nx,ix 00 2  .....1...............1.....1....1.........  1
 LOAD            00 3  1..1......................................  1
 INDEX+4BIT DISP 00 4  ..1.......................1...............  1
                 00 5  .................................1.........  1
                 00 6  ..............1................1..........  1

                 01 1  ....1..........1.1.......................1  3
                 01 2  ...............1.1......1.................  3
                 01 3  ..........................................  0
                 01 4  ........................1......1..........  2
                 01 5  ..........................................  0
                 01 6  ...................1...........1..........  1

0010011IIi10NNNN 00 1  .......1................................11  3
LOADL X,Ix,Nx,ix 00 2  .....1...............1.....1....1.........  1
 LOAD LOW BYTE   00 3  1..1......................................  1
 INDEX+4BIT DISP 00 4  ..1.......................1...............  1
                 00 5  .................................1.........  1
                 00 6  ..............1................1..........  1
```

```
                                                                              20.
PPPPPPPPPPPPPPPP SS C  DDIDSSTSSPSBIPPAA1BTLGGXXHLLHSSHLLCACSIHPACOCWXYZ   #
0123456789111111 01 Y  LEMPEE/EEVERWNIUUG.OSRRWRAABBRLAABRLAUNB.NIRR      D
          012345    C  ACDOLLPLL.L./.RXX/RGA..RDHHHHLLLLLCURBCLRDN C      E
                    L  M..W..C..R.WRR...BE. WR      AA   OOG R E   X      C
                    E   RR RRRIIDIRBDRRW VL RD      LL   UUE - V   /      S
                        DD 12  B 0   DDR  4              TTN 2     Y

                 01 1  ....1..........1.1..............................1   3
                 01 2  ...............1........1........................   2
                 01 3  ......................1.....1....1...............   1
                 01 4  .................................1...............   1
                 01 5  .................................................   0
                 01 6  .....................1.............1.............   1

0010111I1i10NNNN 00 1  .......1.......................................11   3
LOADU X,Ix,Nx,ix 00 2  .....1................1.....1....1...............   1
 LOAD HIGH BYTE  00 3  1..1.............................................   1
 INDEX+4BIT DISP 00 4  ..1.............................1................   1
                 00 5  ....................................1............   1
                 00 6  ................1..................1.............   1

                 01 1  ....1..........1.1.........................1....1   4
                 01 2  ...............1........1........................   2
                 01 3  ......................1.....1....1...............   1
                 01 4  ...........................1.....................   1
                 01 5  .................................................   0
                 01 6  .....................1.............1.............   1

0001111I0i10NNNN 00 1  .......1.......................................11   2
STORD X,Ix,Nx,ix 00 2  .....1................1.....1....1...............   1
 STORE           00 3  1..1.............................................   1
 INDEX+4BIT DISP 00 4  ..1.............................1................   1
                 00 5  ....................................1............   1
                 00 6  ................1..................1.............   1

                 01 1  ....1..........1.1.............................11   4
                 01 2  ...............1.1.....1.........................   3
                 01 3  ......................1..........................   1
                 01 4  .........................1......1................   2
                 01 5  .................................................   0
                 01 6  .................................................   0

0010011I0i10NNNN 00 1  .......1.......................................11   5
STORL X,Ix,Nx,ix 00 2  .....1................1.....1....1...............   1
 STORE LOW BYTE  00 3  1..1.............................................   1
 INDEX+4BIT DISP 00 4  ..1.............................1................   1
                 00 5  ....................................1............   1
                 00 6  ................1..................1.............   1

                 01 1  ....1..........1.1.............................11   5
                 01 2  ...............1.......1.........................   2
                 01 3  ......................1.....1....1...............   2
                 01 4  .................................................   0
                 01 5  .................................................   0
                 01 6  .................................................   0

                                                                              21.
PPPPPPPPPPPPPPPP SS C  DDIDSSTSSPSBIPPAA1BTLGGXXHLLHSSHLLCACSIHPACOCWXYZ   #
0123456789111111 01 Y  LEMPEE/EEVERWNIUUG.OSRRWRAABBRLAABRLAUNB.NIRR      D
          012345    C  ACDOLLPLL.L./.RXX/RGA..RDHHHHLLLLLCURBCLRDN C      E
                    L  M..W..C..R.WRR...BE. WR      AA   OOG R E   X      C
                    E   RR RRRIIDIRBDRRW VL RD      LL   UUE - V   /      S
                        DD 12  B 0   DDR  4              TTN 2     Y

0010111I0i10NNNN 00 1  .......1.......................................11   4
STORU X,Ix,Nx,ix 00 2  .....1................1.....1....1...............   1
 STORE HIGH BYTE 00 3  1..1.............................................   1
 INDEX+4BIT DISP 00 4  ..1.............................1................   1
```

```
                     00 5  .....................................1............  1
                     00 6  ...............1..................1..............  1

                     01 1  ....1..........1.1......................1...11     5
                     01 2  ...............1..1....1.........................  3
                     01 3  .......................1.....1....1..............  2
                     01 4  .................................................  0
                     01 5  .................................................  0
                     01 6  .................................................  0

0000011I1i11Xrrr     00 1  ......1....................................11      2
ADDD  X,Ix,rx,ix     00 2  .....1..................1.....1....1.............  1
 ADD                 00 3  1..1.............................................  1
 INDEX+ REG DISP     00 4  .......................1..........1..............  1
                     00 5  ......................................1..........  1
                     00 6  ...............1...................1.............  1

                     01 1  ... 1..........1.1...............................  2
                     01 2  ...............1.1......1........................  3
                     01 3  .......................1.....1....1..............  1
                     01 4  ..........................1.......1..............  2
                     01 5  ......................................1..........  1
                     01 6  ......................1............1.............  1

0000111I1i11Xrrr     00 1  ......1....................................11      2
SUBD  X,Ix,rx,ix     00 2  .....1..................1.....1....1.............  1
 SUBTRACT            00 3  1..1.............................................  1
 INDEX+ REG DISP     00 4  .......................1..........1..............  1
                     00 5  ......................................1..........  1
                     00 6  ...............1...................1.............  1

                     01 1  ....1..........1.1...................1....1......  5
                     01 2  ...............1.1......1........................  3
                     01 3  .......................1.....1....1..............  1
                     01 4  ..........................1.......1..............  2
                     01 5  ......................................1..........  1
                     01 6  ......................1............1.............  1

0001011IXi11Xrrr     00 1  ......1....................................11      2
CMPRD X,Ix,rx,ix     00 2  .....1..................1.....1....1.............  1
 COMPARE             00 3  1..1.............................................  1
 INDEX+ REG DISP     00 4  .......................1..........1..............  1
                     00 5  ......................................1..........  1
                     00 6  ...............1...................1.............  1
                                                                         22.
PPPPPPPPPPPPPPPP SS C  DDIDSSTSSPSBIPPAA1BTLGGXXHLLHSSHLLCACSIHPACOCWXYZ  #
0123456789111111 01 Y  LEMPEE/EEVERWNIUUG.OSRRWRAABBRLAABRLAUNB.NIRR     E
          012345    C  ACDOLLPLL.L./.RXX/RGA..RDHHHHLLLLLCURBCLRDN C     E
                    L  M..W..C..R.WRR...8E. WR      AA   OOG R E   X     C
                    E   RR RRRIIDIRBDRRW VL RD      LL   UUE - V   /     S
                        DD 12  B Q   DDR  4              TTN 2     Y

                     01 1  ....1..........1.1...................1....1......  3
                     01 2  ...............1.1......1........................  3
                     01 3  .......................1.....1....1..............  1
                     01 4  ..........................1.......1..............  2
                     01 5  ......................................1..........  1
                     01 6  .................................................  0

0001111I1i11Xrrr     00 1  ......1....................................11      3
LOADD X,Ix,rx,ix     00 2  .....1..................1.....1....1.............  1
 LOAD                00 3  1..1.............................................  1
 INDEX+ REG DISP     00 4  .......................1..........1..............  1
                     00 5  ......................................1..........  1
                     00 6  ...............1...................1.............  1

                     01 1  ....1..........1.1..............................1  3
                     01 2  ...............1.1......1........................  3
```

```
                     01 3  .................................................  0
                     01 4  .........................1......1................  2
                     01 5  .................................................  0
                     01 6  .....................1.............1.............  1

0010011I1ill1Xrrr    00 1  .......1.......................................11  4
LOADL X,Ix,rx,ix     00 2  .....1................1.....1....1...............  1
 LOAD LOW BYTE       00 3  1..1.............................................  1
 INDEX+ REG DISP     00 4  ......................1.........1................  1
                     00 5  ....................................1............  1
                     00 6  ................1..................1.............  1

                     01 1  ....1..........1.1..............................1  3
                     01 2  ...............1........1........................  2
                     01 3  ......................1.....1....1...............  1
                     01 4  .................................1...............  1
                     01 5  .................................................  0
                     01 6  .....................1.............1.............  1

0010111I1ill1Xrrr    00 1  .......1.......................................11  4
LOADU X,Ix,rx,ix     00 2  .....1................1.....1....1...............  1
 LOAD HIGH BYTE      00 3  1..1.............................................  1
 INDEX+ REG DISP     00 4  ......................1.........1................  1
                     00 5  ....................................1............  1
                     00 6  ................1..................1.............  1

                     01 1  ....1..........1.1..........................1...1  4
                     01 2  ...............1........1........................  2
                     01 3  ......................1.....1....1...............  1
                     01 4  ............................1....................  1
                     01 5  .................................................  0
                     01 6  .....................1.............1.............  1

                                                                           23.
PPPPPPPPPPPPPPPP     SS C  DDIDSSTSSPSBIPPAA1BTLGGXXHLLHSSHLLCACSIHPACOCWXYZ  #
0123456789111111     01 Y  LEMPEE/EEVERWNIUUG.OSRRWRAABBRLAABRLAUNB.NIRR      D
          012345        C  ACDOLLPLL.L./.RXX/RGA..RDHHHHLLLLLCURSCLRDN C      E
                        L  M..W..C..R.WRR...8E. WR      AA    OOG R E   X     C
                        E   RR RRRIIDIRBDRRW VL RD      LL    UUE - V   /     S
                            DD 12  B 0.  DDR  4               TTN 2     T

0001111I0ill1Xrrr    00 1  .......1.......................................11  3
STORD X,Ix,rx,ix     00 2  .....1................1.....1....1...............  1
 STORE               00 3  1..1.............................................  1
 INDEX+ REG DISP     00 4  ......................1.........1................  1
                     00 5  ....................................1............  1
                     00 6  ................1..................1.............  1

                     01 1  ....1..........1.1.............................11  4
                     01 2  ...............1.1.....1.........................  3
                     01 3  ......................1..........................  1
                     01 4  .........................1......1................  2
                     01 5  .................................................  0
                     01 6  .................................................  0

0010011I0ill1Xrrr    00 1  .......1.......................................11  6
STORL X,Ix,rx,ix     00 2  .....1................1.....1....1...............  1
 STORE LOW BYTE      00 3  1..1.............................................  1
 INDEX+ REG DISP     00 4  ......................1.........1................  1
                     00 5  ....................................1............  1
                     00 6  ................1..................1.............  1

                     01 1  ....1..........1.1.............................11  5
                     01 2  ...............1.......1.........................  2
                     01 3  ......................1.....1....1...............  2
                     01 4  .................................................  0
                     01 5  .................................................  0
                     01 6  .................................................  0
```

```
0010111I0i11Xrrr 00 1  .......1......................................11  5
STORU X,Ix,rx,ix 00 2  .....1................1.....1....1..............  1
 STORE HIGH BYTE 00 3  1..1............................................  1
 INDEX+ REG DISP 00 4  ......................1.........1...............  1
                 00 5  ....................................1...........  1
                 00 6  ................1..................1............  1

                 01 1  ....1..........1.1.........................1..11  5
                 01 2  ...............1..1....1........................  3
                 01 3  ......................1.....1....1..............  2
                 01 4  ................................................  0
                 01 5  ................................................  0
                 01 6  ................................................  0

0000011I00010000 00 1  ..............................................11  1
 ADDD  D,Ix,Mx,0 00 2  ..............1.................................  1
 ADD             00 3  1..1............................................  2
 IREG-DIR => DIR 00 4  ................................................  0
                 00 5  ................................................  0
                 00 6  ................................................  0
                                                                        24.
PPPPPPPPPPPPPPPP SS C  DDIDSSTSSPSBIPPAA1BTLGGXXHLLHSSHLLCACSIHPACOCWXYE
0123456789111111 01 Y  LEMPEE/EEVERWNIUUG.OSRRWRAABBRLAABRLAUNB.NIRR
          012345    C  ACDOLLPLL.L./.RXX/RGA..RDHHHHLLLLLCURBCLRDN C
                    L  M..W..C..R.WRR...SE. WR       AA   OOG R E    X
                    E   RR RRRIIDIRBDRRW VL RD       LL   UUE - V    .
                        DD 12  B Q   DDR  4               TTN 2      Y

                 01 1  ....1.........1..1..............................  2
                 01 2  ..............1..1......1.......................  3
                 01 3  1.....................1.....1....1..............  2
                 01 4  .........................1......1...............  2
                 01 5  ....................................1...........  1
                 01 6  ................1..................1............  1

                 10 1  ..............1..1............................11  4
                 10 2  ..............1..1.....1........................  2
                 10 3  ...............1................................  1
                 10 4  ................................................  0
                 10 5  ................................................  0
                 10 6  ................................................  0

0000111I00010000 00 1  ..............................................11  1
 SUBD  D,Ix,Mx,0 00 2  ..............1.................................  1
 SUBTRACT        00 3  1..1............................................  2
 IREG-DIR => DIR 00 4  ................................................  0
                 00 5  ................................................  0
                 00 6  ................................................  0

                 01 1  ....1.........1..1...................1....1.....  3
                 01 2  ..............1..1......1.......................  3
                 01 3  1.....................1.....1....1..............  2
                 01 4  .........................1......1...............  2
                 01 5  ....................................1...........  1
                 01 6  ................1..................1............  1

                 10 1  ..............1..1............................11  4
                 10 2  ..............1..1.....1........................  2
                 10 3  ...............1................................  1
                 10 4  ................................................  0
                 10 5  ................................................  0
                 10 6  ................................................  0

0001111I00010000 00 1  ..............................................11  2
 STORD D,Ix,Mx,0 00 2  ..............1.................................  1
 STORE           00 3  1...............................................  1
 IREG-DIR => DIR 00 4  ................................................  0
                 00 5  ................................................  0
                 00 6  ................................................  0
```

```
                   01 1  ....1.........1..1............................11  4
                   01 2  ..............1..1.....1.......................  2
                   01 3  ......................1........................  1
                   01 4  .........................1......1..............  2
                   01 5  ...............................................  C
                   01 6  ...............................................  C

                                                                        25.
PPPPPPPPPPPPPPPP SS C    DDIDSSTSSPSBIPPAA1BTLGGXXHLLHSSHLLCACSIHPACOCWXYZ  #
0123456789111111 01 Y    LEMPEE/EEVERWNIUUG.OSRRWRAABBRLAABRLAUNB.NIRR      D
          012345    C    ACDOLLPLL.L./.RXX/RGA..RDHHHHLLLLLCURBCLRDN C      E
                    L    M..W..C..R.WRR...8E. WR       AA    OOG R E   X    C
                    E     RR RRRIIDIRBDRRW VL RD       LL    UUE - V   /    S
                          DD 12  B Q   DDR  4              TTN 2     Y

0010011I00010000 00 1    ............................................11     E
 STORL D.Ix,Mx,0 00 2    ..............1..............................      1
 STORE LOW  BYTE 00 3    1............................................      1
 IREG-DIR => DIR 00 4    .............................................      C
                 00 5    .............................................      C
                 00 6    .............................................      C

                 01 1    ....1.........1..1..........................11     E
                 01 2    ..............1........1.....................      2
                 01 3    ......................1.....1....1...........      2
                 01 4    .............................................      C
                 01 5    .............................................      C
                 01 6    .............................................      C

0010111I00010000 00 1    ............................................11     4
 STORU D.Ix,Mx,0 00 2    ..............1..............................      1
 STORE HIGH BYTE 00 3    1............................................      1
 IREG-DIR => DIR 00 4    .............................................      C
                 00 5    .............................................      C
                 00 6    .............................................      C

                 01 1    ....1.........1..1......................1...11     E
                 01 2    ..............1...1....1.....................      3
                 01 3    ......................1.....1....1...........      2
                 01 4    .............................................      C
                 01 5    .............................................      C
                 01 6    .............................................      C

0000011I10010000 00 1    ............................................11     1
 ADDD  D.Ix,Mx   00 2    ..............1..............................      1
 ADD             00 3    1............................................      1
 IREG-DIR =>IREG 00 4    .............................................      C
                 00 5    .............................................      C
                 00 6    .............................................      C

                 01 1    ....1.........1..1...........................      2
                 01 2    ..............1..1......1....................      3
                 01 3    ......................1.....1....1...........      1
                 01 4    .........................1......1............      2
                 01 5    ...................................1.........      1
                 01 6    ......................1............1.........      1

0000111I10010000 00 1    ............................................11     1
 SUBD  D.Ix,Mx   00 2    ..............1..............................      1
 SUBTRACT        00 3    1............................................      1
 IREG-DIR =>IREG 00 4    .............................................      C
                 00 5    .............................................      C
                 00 6    .............................................      C

                                                                        26.
PPPPPPPPPPPPPPPP SS C    DDIDSSTSSPSBIPPAA1BTLGGXXHLLHSSHLLCACSIHPACOCWXYZ  #
0123456789111111 01 Y    LEMPEE/EEVERWNIUUG.OSRRWRAABBRLAABRLAUNB.NIRR      D
          012345    C    ACDOLLPLL.L./.RXX/RGA..RDHHHHLLLLLCURBCLRDN C      E
                    L    M..W..C..R.WRR...8E. WR       AA    OOG R E   X    C
```

```
                     E    RR RRRIIDIREDRRW VL RD        LL   UUE - V    /     S
                          DD 12  B 0.  DDR  4                TTN 2      Y

                 01 1  ....1.........1..1..................1....1.1....   4
                 01 2  ..............1..1......1.......................   3
                 01 3  ......................1.....1....1..............   1
                 01 4  .........................1......1...............   2
                 01 5  ...................................1............   1
                 01 6  .....................1.............1............   1

0001011I10010000 00 1  ..............................................11   1
 CMPRD D.Ix,Mx   00 2  ..............1.................................   1
 COMPARE         00 3  1...............................................   1
 IREG-DIR        00 4  ................................................   0
                 00 5  ................................................   0
                 00 6  ................................................   0

                 01 1  ....1.........1..1..................1....1......   3
                 01 2  ..............1..1......1.......................   3
                 01 3  ......................1.....1....1..............   1
                 01 4  .........................1......1...............   2
                 01 5  ...................................1............   1
                 01 6  ................................................   0

0001111I10010000 00 1  .....    ......................................11   2
 LOADD D.Ix,Mx   00 2  ..............1.................................   1
 LOAD            00 3  1...............................................   1
 IREG-DIR =>IREG 00 4  ................................................   0
                 00 5  ................................................   0
                 00 6  ................................................   0

                 01 1  ....1.........1..1.............................1   3
                 01 2  ..............1..1......1.......................   3
                 01 3  ................................................   0
                 01 4  .........................1......1...............   2
                 01 5  ................................................   0
                 01 6  .....................1.............1............   1

0010011I10010000 00 1  ..............................................11   3
 LOADL D.Ix,Mx   00 2  ..............1.................................   1
 LOAD LOW BYTE   00 3  1...............................................   1
 IREG-DIR =>IREG 00 4  ................................................   0
                 00 5  ................................................   0
                 00 6  ................................................   0

                 01 1  ....1.........1..1.............................1   3
                 01 2  ..............1.........1.......................   2
                 01 3  ......................1.....1....1..............   1
                 01 4  .................................1..............   1
                 01 5  ................................................   0
                 01 6  .....................1.............1............   1
                                                                        27.
PPPPPPPPPPPPPPPP SS C  DDIDSSTSSPSBIPPAA1BTLGGXXHLLHSSHLLCACSIHPACOCWXYZ   #
0123456789111111 01 Y  LEMPEE/EEVERWNIUUG.OSRRWRAABBRLAABRLAUNB.NIRR      D
          012345    C  ACDOLLPLL.L./.RXX/RGA..RDHHHHLLLLLCURBCLRDN C      E
                    L  M..W..C..R.WRR...8E. WR        AA   OOG R E   X    C
                    E   RR RRRIIDIRBDRRW VL RD        LL   UUE - V   /    S
                        DD 12  B Q   DDR  4                TTN 2     Y

0010111I10010000 00 1  ..............................................11   3
 LOADU D.Ix,Mx   00 2  ..............1.................................   1
 LOAD HIGH BYTE  00 3  1...............................................   1
 IREG-DIR =>IREG 00 4  ................................................   0
                 00 5  ................................................   0
                 00 6  ................................................   0

                 01 1  ....1.........1..1..........................1....1   4
                 01 2  ..............1.........1.......................   2
```

```
                 01 3  ......................1.....1....1................  1
                 01 4  ...........................1......................  1
                 01 5  ..................................................  0
                 01 6  .....................1.............1..............  1

0011111I00010000 00 1  ................................................11  4
 SWAPD D.Ix.Mx   00 2  ..............1...................................  1
 SWAP            00 3  1..1..............................................  2
 IREG-DIR        00 4  ..................................................  0
                 00 5  ..................................................  0
                 00 6  ..................................................  0

                 01 1  ....1.........1..1...............................1  3
                 01 2  ..............1..1......1.........................  2
                 01 3  1...............1.....1...1.....1.................  2
                 01 4  .........................1......1.................  1
                 01 5  ..................................................  0
                 01 6  .....................1.............1..............  1

                 10 1  ..............1..1..............................11  7
                 10 2  ..............1..1.....1..........................  2
                 10 3  ...............1..................................  1
                 10 4  ..................................................  0
                 10 5  ..................................................  0
                 10 6  ..................................................  0

11001RRR10AAAAAA 00 1  ....1............1..1........................1.11.  4
 BCC L.Rx.Ax     00 2  .................1..1..1..........................  1
 BLOCK CHECK CHR 00 3  1..1..................1...1.......................  1
 REG-LS => LS    00 4  ...........................1............1.........  1
                 00 5  ..................................................  0
                 00 6  ................1.................1...............  1

                 01 1  .................1..1...........................11  4
                 01 2  .................1..1..1..........................  1
                 01 3  ...............1..................................  1
                 01 4  ..................................................  0
                 01 5  ..................................................  0
                 01 6  ..................................................  0

PPPPPPPPPPPPPPPP SS C  DDIDSSTSSPSBIPPAA1BTLGGXXHLLHSSHLLCACSIHPACOCWXYZ  #
0123456789111111 01 Y  LEMPEE/EEVERWNIUUG.OSRRWRAABBRLAABRLAUNB.NIRR     D
          012345    C  ACDOLLPLL.L./.RXX/RGA..RDHHHHLLLLLCURBCLRDN C     E
                    L  M..W..C..R.WRR...8E. WR      AA   OOG R E   X     C
                    E   RR RRRIIDIRBDRRW VL RD      LL   UUE - V   /     S
                        DD 12  B 0   DDR  4              TTN 2     Y

11001RRR00AAAAAA 00 1  ....1............1..1..........................11.  4
 FCS L.Rx.Ax     00 2  .................1..1..1..........................  1
 FRAME CHECK SEQ 00 3  1..1..................1...1.......................  1
 REG-LS => LS    00 4  ...........................1............1.........  1
                 00 5  ..................................................  0
                 00 6  ................1.................1...............  1

                 01 1  .................1..1...........................11  6
                 01 2  .................1..1..1..........................  1
                 01 3  ...............1..................................  1
                 01 4  ..................................................  0
                 01 5  ..................................................  0
                 01 6  ..................................................  0

00001RRR10010000 00 1  .................1..............................11  3
 BCC D.Rx.Mx     00 2  ..............1..1................................  3
 BLOCK CHECK CHR 00 3  1..1..............................................  3
 REG-DIR => DIR  00 4  ..................................................  0
                 00 5  ..................................................  0
                 00 6  ..................................................  0

                 01 1  ....1.........1..1...........................1.11.  6
```

```
                  01 2  ..............1..1.......1........................  4
                  01 3  1......................1...1.1....1...............  3
                  01 4  ............................1...........1.........  2
                  01 5  ..................................................  0
                  01 6  ................1..................1..............  2

                  10 1  ..............1..1..............................11  5
                  10 2  ..............1..1......1.........................  3
                  10 3  ...............1..................................  1
                  10 4  ..................................................  0
                  10 5  ..................................................  0
                  10 6  ..................................................  0

00001RRR00010000  00 1  .................1..............................11  3
 FCS D,Rx,Mx      00 2  ..............1..1................................  3
 FRAME CHECK SEQ  00 3  1..1..............................................  4
 REG-DIR => DIR   00 4  ..................................................  0
                  00 5  ..................................................  0
                  00 6  ..................................................  0

                  01 1  ....1.........1..1.............................11.  5
                  01 2  ..............1..1.......1........................  4
                  01 3  1......................1...1.1....1...............  4
                  01 4  ............................1...........1.........  2
                  01 5  ..................................................  0
                  01 6  ................1..................1..............  2

PPPPPPPPPPPPPPPP  SS C  DDIDSSTSSPSBIPPAA1BTLGGXXHLLHSSHLLCACSIHPACCCXXYZ  #
0123456789111111  01 Y  LEMPEE/EEVERWNIUUG.OSRRWRAABBRLAABRLAUNB.NIRR      D
          012345     C  ACDOLLPLL.L./.RXX/RGA..RDHHHHLLLLLCURBCLRDN C      E
                     L  M..W..C..R.WRR...8E. WR       AA    CCG R E   X     C
                     E   RR RRRIIDIREDRRW VL RD       LL    UUE - V   /     S
                         DD 12  B 0   DDR  4                TTN 2     Y

                  10 1  ..............1..1..............................11  6
                  10 2  ..............1..1......1.........................  3
                  10 3  ...............1..................................  1
                  10 4  ..................................................  0
                  10 5  ..................................................  0
                  10 6  ..................................................  0

00011###10001rrr  00 1  .....1...................................1..1..1.1  1
 SETB  R,#x,rx    00 2  .1...................1.....1.....1................  1
 SET   BIT        00 3  ..................................................  0
 REG              00 4  .......................1....1.....1...............  1
                  00 5  ..................................................  0
                  00 6  ......................1.............1.............  1

00011###00001rrr  00 1  .....1................................1..111...1.1  1
 CLRB  R,#x,rx    00 2  .1...................1.....1.....1................  1
 CLEAR BIT        00 3  ..................................................  0
 REG              00 4  .......................1....1.....1...............  1
                  00 5  ......................................1...........  1
                  00 6  ......................1.............1.............  1

00010###00001rrr  00 1  .....1................................1..111...1.1  1
 TESTB R,#x,rx    00 2  .1...................1.....1.....1................  1
 TEST  BIT        00 3  ..................................................  0
 REG              00 4  .......................1....1.....1...............  1
                  00 5  ......................................1...........  1
                  00 6  ..................................................  0

11011###1MAAAAAA  00 1  .....................1...................1..1..1.1  2
 SETB  L,#x,rx    00 2  .1...................1..1.1......1................  1
 SET   BIT        00 3  1..1..............................................  1
 LS               00 4  ............................1.....1...............  1
                  00 5  ..................................................  0
                  00 6  .................1...................1............  1
```

```
                  01 1  .....................1..........................11  2
                  01 2  .....................1..1.........................  1
                  01 3  ................1.................................  1
                  01 4  ..................................................  0
                  01 5  ..................................................  0
                  01 6  ..................................................  0

11011###0MAAAAAA  00 1  .....................1................1..111...1.1  2
 CLRB  L.#x,rx    00 2  .1...................1...1.1.....1................  1
 CLEAR BIT        00 3  1..1..............................................  1
 LS               00 4  ............................1.....1...............  1
                  00 5  .....................................1............  1
                  00 6  .................1..................1.............  1

PPPPPPPPPPPPPPPP  SS C  DDIDSSTSSPSBIPPAA1BTLGGXXHLLHSSHLLCACSIHPACOCXXYZ  #
0123456789111111  01 Y  LEMPEE/EEVERWNIUUG.0SRRWRAABBRLAABRLAUNB.NIRR      D
          012345     C  ACDOLLPLL.L./.RXX/RGA..RDHHHLLLLLCURBCLRDN C        E
                     L  M..W..C..R.WRR...8E. WR      AA   00G R E    Y      C
                     E   RR RRRIIDIRBDRRW VL RD      LL   UUE - V    /      S
                         DD 12  B 0   DDR  4              TTN 2      Y

                  01 1  .....................1..........................11  4
                  01 2  .....................1..1.........................  1
                  01 3  ................1.................................  1
                  01 4  ..................................................  0
                  01 5  ..................................................  0
                  01 6  ..................................................  0

11010###0MAAAAAA  00 1  .....................1................1..111...1.1  2
 TESTB L.#x,rx    00 2  .1...................1...1.1.....1................  1
 TEST  BIT        00 3  ..................................................  0
 LS               00 4  ............................1.....1...............  1
                  00 5  .....................................1............  1
                  00 6  ..................................................  0

0000010100001rrr  00 1  .....1.........................................1..  1
 SR0 R,rx         00 2  ..............1...................................  1
 SHIFT RT FILL 0  00 3  ..................................................  0
 REG              00 4  ......................1.......1...................  2
                  00 5  ..................................................  0
                  00 6  ......................1..... .......1.............  1

0000010000001rrr  00 1  .....1.........................................1..  1
 SL0 R,rx         00 2  ..............1...................................  1
 SHIFT LT FILL 0  00 3  ..................................................  0
 REG              00 4  ......................1........1..................  2
                  00 5  ..................................................  0
                  00 6  .....................1..............1.............  1

110001010MAAAAAA  00 1  .....................1.........................1..  2
 SR0 L,Ax         00 2  .....................1...1........................  1
 SHIFT RT FILL 0  00 3  1..1..............................................  1
 LS               00 4  ..............................1...................  1
                  00 5  ..................................................  0
                  00 6  ................1...................1.............  1

                  01 1  .....................1..........................11  4
                  01 2  .....................1..1.........................  1
                  01 3  ................1.................................  1
                  01 4  ..................................................  0
                  01 5  ..................................................  0
                  01 6  ..................................................  0

110001000MAAAAAA  00 1  .....................1.........................1..  1
 SL0 L,Ax         00 2  .....................1...1........................  1
 SHIFT LT FILL 0  00 3  1..1..............................................  1
 LS               00 4  ...............................1..................  1
                  00 5  ..................................................  0
                  00 6  ................1...................1.............  1
```

```
PPPPPPPPPPPPPPPP SS C  DDIDSSTSSPSBIPPAA1BTLGGXXHLLHSSHLLCACSIHPACOCWXYZ   #
0123456789111111 01 Y  LEMPEE/EEVERWNIUUG.OSRRWRAABBRLAABRLAUNB.NIRR       I
          012345    C  ACDOLLPLL.L./.RXX/RGA..RDHHHHLLLLLCURBCLRDN C       E
                    L  M..W..C..R.WRR...8E. WR       AA    OOG R E    X    C
                    E   RR RRRIIDIRBDRRW VL RD       LL    UUE - V    /    S
                        DD 12   B 0    DDR   4             TTN 2      Y

                 01 1  ....................1..........................11   2
                 01 2  ....................1..1.........................   1
                 01 3  ...............1.................................   1
                 01 4  .................................................   0
                 01 5  .................................................   0
                 01 6  .................................................   0

000001011000lrrr 00 1  .....1........................................1..   1
 SR1 R.rx        00 2  ..............1..................................   1
 SHIFT RT FILL 1 00 3  .................................................   0
 REG             00 4  ......................1......1...................   2
                 00 5  .................................................   0
                 00 6  .....................1.............1.............   1

000001001000lrrr 00 1  .....1........................................1..   1
 SL1 R.rx        00 2  ..............1..................................   1
 SHIFT LT FILL 1 00 3  .................................................   0
 REG             00 4  ......................1.......1..................   2
                 00 5  .................................................   0
                 00 6  .....................1.............1.............   1

110001011MAAAAAA 00 1  ....................1.........................1..   1
 SR1 L.Ax        00 2  ....................1...1........................   1
 SHIFT RT FILL 1 00 3  1..1.............................................   1
 LS              00 4  .............................1...................   1
                 00 5  .................................................   0
                 00 6  ................1..................1.............   2

                 01 1  ....................1..........................11   2
                 01 2  ....................1..1.........................   1
                 01 3  ...............1.................................   1
                 01 4  .................................................   0
                 01 5  .................................................   0
                 01 6  .................................................   0

110001001MAAAAAA 00 1  ....................1.........................1..   1
 SL1 L.Ax        00 2  ....................1...1........................   1
 SHIFT LT FILL 1 00 3  1..1.............................................   1
 LS              00 4  ..............................1..................   1
                 00 5  .................................................   0
                 00 6  ................1..................1.............   2

                 01 1  ....................1..........................11   2
                 01 2  ....................1..1.........................   1
                 01 3  ...............1.................................   1
                 01 4  .................................................   0
                 01 5  .................................................   0
                 01 6  .................................................   0

PPPPPPPPPPPPPPPP SS C  DDIDSSTSSPSBIPPAA1BTLGGXXHLLHSSHLLCACSIHPACOCWXYZ   #
0123456789111111 01 Y  LEMPEE/EEVERWNIUUG.OSRRWRAABBRLAABRLAUNB.NIRR       I
          012345    C  ACDOLLPLL.L./.RXX/RGA..RDHHHHLLLLLCURBCLRDN C       E
                    L  M..W..C..R.WRR...8E. WR       AA    OOG R E    X    C
                    E   RR RRRIIDIRBDRRW VL RD       LL    UUE - V    /    S
                        DD 12   B 0    DDR   4             TTN 2      Y

000001110000lrrr 00 1  .....1...............................1..........1   1
 INV R.rx        00 2  ..............1..................................   1
 1'S COMPLEMENT  00 3  .................................................   0
 REG             00 4  ......................1.........1................   1
                 00 5  .................................................   0
                 00 6  .....................1.............1.............   1
```

```
110001110MAAAAAA 00 1  ....................1................1..........1  2
 INV L.Ax        00 2  ....................1...1........................  1
 1'S COMPLEMENT  00 3  1..1.............................................  1
 LS              00 4  ................................1................  1
                 00 5  .................................................  0
                 00 6  ................1..................1.............  1

                 01 1  ....................1..........................11  3
                 01 2  ....................1..1.........................  1
                 01 3  ...............1.................................  1
                 01 4  .................................................  0
                 01 5  .................................................  0
                 01 6  .................................................  0

00011BBB01000bbb 00 1  ....1............1.............................11  6
 STL4 Bx.bx      00 2  .....1................1..1......1................  2
 SUPERVISOR STOR 00 3  .................................................  0
 REG/IREG        00 4  .................................................  0
                 00 5  .................................................  0
                 00 6  ...................1.1.............1.............  2

00011BBB11000bbb 00 1  .....1...........1.1...........................11  5
 LDL4 Bx.bx      00 2  ....1.................1..1......1................  2
 SUPERVISOR LOAD 00 3  .................................................  0
 REG/IREG        00 4  .................................................  0
                 00 5  .................................................  0
                 00 6  .....................1.............1.............  1

0001111101001000 00 1  ...............................................11  2
 STOR AUX.PN     00 2  .............1..1................................  1
 PN -> AUX       00 3  .................................................  0
                 00 4  .................................................  0
 **PSEUDO NOP**  00 5  .................................................  0
                 00 6  .................................................  0

0001111I11001000 00 1  ....1..........................................11  2
 STOR Ix,AUX     00 2  ...............1.....1...........................  1
 AUX -> IX       00 3  .................................................  0
                 00 4  .................................................  0
                 00 5  .................................................  0
                 00 6  .................................................  0

PPPPPPPPPPPPPPPP SS C  DDIDSSTSSPSBIPPAA1BTLGGXXHLLHSSHLLCACSIHPACOCWXYZ  #
0123456789111111 01 Y  LEMPEE/EEVERWNIUUG.OSRRWRAABBRLAABRLAUNB.NIRR     D
          012345    C  ACDOLLPLL.L./.RXX/RGA..RDHHHHLLLLLCURBCLRDN C      E
                    L  M..W..C..R.WRR...8E. WR      AA    OOG R E   X    C
                    E   RR RRRIIDIREDRRW VL RD      LL    UUE - V   /    S
                        DD 12  B 0   DDR  4             TTN 2      Y

0000000000011111 00 1  .........1.......1.............................11  2
 LOAD PTG        00 2  .........1.......1......1........................  1
 PTG FETCH       00 3  .................................................  0
                 00 4  .................................................  0
 ** RESERVED **  00 5  ...........1.....................................  1
                 00 6  .................................................  0

0111011IDDDDDDDD 00 1  ....1............1.............................11  4
 LOADPC IX.D     00 2  .............1.............1....1................  1
 LOAD PC + DISP  00 3  .................................................  0
 PC+D => IREG    00 4  ..1.............................1................  1
                 00 5  ....................................1............  1
                 00 6  .....................1.............1.............  1

1011011I1MAAAAAA 00 1  ....1....1.......1..1...........................1  5
 GETPTG IX.Ax    00 2  .........1.......1..1...1........................  1
 VECTOR LS LOAD  00 3  .................................................  0
 IREG-LS => IREG 00 4  .........................1......1................  2
                 00 5  .................................................  0
                 00 6  .....................1.............1.............  1
```

```
1011011I0MAAAAAA 00 1  ....1....1.......1..1..........................11  8
 PUTPTG IX.Ax    00 2  .........1.......1..1..1.........................  1
 VECTOR LS STORE 00 3  .......................1.........................  1
 IREG-LS => LS   00 4  .............................1.......1...........  2
                 00 5  ..................................................  0
                 00 6  ..................................................  0

110001111110NNNN 00 1  ........1........1.............................11  1
 RDIM X.ix.Nx    00 2  .....1.................1.....1....1..............  1
  READ INSTR MEM 00 3  1..1..............................................  1
 INDEX+4BIT DISP 00 4  ..1..................................1............  1
                 00 5  .........................................1........  1
                 00 6  ................1...................1.............  1

                 01 1  ......11.......................................11  2
                 01 2  ...............1..................................  1
                 01 3  1.................................................  1
                 01 4  ..................................................  0
                 01 5  ..................................................  0
                 01 6  ..............1......1............................  1

                 10 1  ...............................................11  1
                 10 2  .....1.................1.....1....1..............  1
                 10 3  ..................................................  0
                 10 4  ..................................................  0
                 10 5  ..................................................  0
                 10 6  ..................................................  0

PPPPPPPPPPPPPPPP SS C  DDIDSSTSSPSBIPPAA1BTLGGXXHLLHSSHLLCACSIHPACCCWXYZ  #
0123456789111111 01 Y  LEMPEE/EEVERWNIUUG.OSRRWRAABBRLAABRLAUNB.NIRR     I
          012345    C  ACDOLLPLL.L./.RXX/RGA..RDHHHHLLLLLCURBCLRDN C      T
                    L  M..W..C..R.WRR...8E. WR      AA    OOG R E   X    E
                    E   RR RRRIIDIRBDRRW VL RD      LL    UUE - V   /    M
                        DD 12  B 0   DDR  4               TTN 2     Y    S

110001101110NNNN 00 1  ........1........1.............................11  1
 WRIM X.ix.Nx    00 2  .....1.................1.....1....1..............  1
 WRITE INSTR MEM 00 3  1..1..............................................  1
 INDEX+4BIT DISP 00 4  ..1..................................1............  1
                 00 5  .........................................1........  1
                 00 6  ................1...................1.............  1

                 01 1  ......11.......................................11  2
                 01 2  ...............1..................................  1
                 01 3  1...........1.........1...........................  1
                 01 4  ..................................................  0
                 01 5  ..................................................  0
                 01 6  ..................................................  0

                 10 1  ...............................................11  1
                 10 2  .....1.................1.....1....1..............  1
                 10 3  ..................................................  0
                 10 4  ..................................................  0
                 10 5  ..................................................  0
                 10 6  ..................................................  0

11000?111111Xrrr 00 1  ........1........1.............................11  1
 RDIM X.ix.Rx    00 2  .....1.................1.....1....1..............  1
  READ INSTR MEM 00 3  1..1..............................................  1
 INDEX+REG  DISP 00 4  .......................1.........1...............  1
                 00 5  .........................................1........  1
                 00 6  ................1...................1.............  1

                 01 1  ......11.......................................11  2
                 01 2  ...............1..................................  1
                 01 3  1.................................................  1
                 01 4  ..................................................  0
                 01 5  ..................................................  0
                 01 6  ..............1......1............................  1
```

```
                 10 1  ................................................11  1
                 10 2  .....1................1.....1....1................  1
                 10 3  ..................................................  C
                 10 4  ..................................................  C
                 10 5  ..................................................  C
                 10 6  ..................................................  C

110001101111Xrrr 00 1  ........1........1..............................11  1
 WRIM X.ix,Rx    00 2  .....1................1.....1....1................  -
 WRITE INSTR MEM 00 3  1..1..............................................  -
 INDEX+REG  DISP 00 4  ......................1.........1.................  -
                 00 5  .....................................1............  -
                 00 6  ................1...................1.............  -

PPPPPPPPPPPPPPPP SS C  DDIDSSTSSPSBIPPAA1BTLGGXXHLLHSSHLLCACSIHPACOCXXYZ  #
0123456789111111 01 Y  LEMPEE/EEVERWNIUUG.OSRRWRAABBRLAABRLAUNE.NIRR      D
          012345    C  ACDOLLPLL.L./.RXX/RGA..RDHHHHLLLLLCURECLRDN C      E
                    L  M..W..C..R.WRR...8E. WR      AA    OOG R E  X      C
                    E   RR RRRIIDIRBDRRW VL RD      LL    UUE - V  /      E
                        DD 12  B 0   DDR  4               TTN 2    Y

                 01 1  ......11........................................11  2
                 01 2  ...............1..................................  1
                 01 3  1...........1.........1...........................  1
                 01 4  ..................................................  0
                 01 5  ..................................................  0
                 01 6  ..................................................  0

                 10 1  ................................................11  1
                 10 2  .....1................1.....1....1................  1
                 10 3  ..................................................  0
                 10 4  ..................................................  0
                 10 5  ..................................................  0
                 10 6  ..................................................  0

1100011111000000 00 1  ........1........1..............................11  1
 RDIM D.ix,Mx    00 2  ..............1...................................  1
  READ INSTR MEM 00 3  1.................................................  1
 DIR             00 4  ..................................................  0
                 00 5  ..................................................  0
                 00 6  ..................................................  0

                 01 1  ......11........................................11  2
                 01 2  ..............1...................................  1
                 01 3  1.................................................  1
                 01 4  ..................................................  0
                 01 5  ..................................................  0
                 01 6  ..............1......1............................  1

                 10 1  ................................................11  1
                 10 2  ..............1...................................  1
                 10 3  ..................................................  0
                 10 4  ..................................................  0
                 10 5  ..................................................  0
                 10 6  ..................................................  0

1100011011000000 00 1  ........1........1..............................11  1
 WRIM D.ix,Mx    00 2  ..............1...................................  1
 WRITE INSTR MEM 00 3  1.................................................  1
 DIR             00 4  ..................................................  0
                 00 5  ..................................................  0
                 00 6  ..................................................  0

                 01 1  ......11........................................11  2
                 01 2  ..............1...................................  1
                 01 3  1...........1.........1...........................  1
                 01 4  ..................................................  0
                 01 5  ..................................................  0
                 01 6  ..................................................  0
```

```
PPPPPPPPPPPPPPPP SS C  DDIDSSTSSPSBIPPAA1BTLGGXXHLLHSSHLLCACSIHPACOCWXYZ  #
0123456789111111 01 Y  LEMPEE/EEVERWNIUUG.OSRRWRAABBRLAABRLAUNB.NIRR     I
          012345    C  ACDOLLPLL.L./.RXX/RGA..RDHHHHLLLLLCURBCLRDN C      E
                    L  M..W..C..R.WRR...8E. WR       AA   OOG R E   X     C
                    E   RR RRRIIDIRBDRRW VL RD       LL   UUE - V   /     S
                        DD 12  B 0   DDR  4               TTN 2     Y

                 10 1  ...............................................11  1
                 10 2  ..............1..................................  1
                 10 3  .................................................  0
                 10 4  .................................................  0
                 10 5  .................................................  0
                 10 6  .................................................  0

111XXX000DDDDDDD 00 1  .................1...........................1...  1
 JXXX [R.] LABEL 00 2  .............1..............1....1...............  1
   COND BRANCH   00 3  ..1.............................1................  1
 PC+DISP         00 4  ....................................1............  1
                 00 5  ...........1.......................11............  2
                 00 6  .................................................  0

110000000DDDDDDD 00 1  .................1.............................11  1
 JUNC [R.] LABEL 00 2  .............1..............1....1...............  1
 UNCOND BRANCH   00 3  ..1.............................1................  1
 PC+DISP         00 4  ....................................1............  1
                 00 5  ...........1.......................11............  2
                 00 6  .................................................  0

111XXX001DDDDDDD 00 1  .................1...................1....1..1...  3
 JXXX [R.] LABEL 00 2  .............1..............1....1...............  1
   COND BRANCH   00 3  ..1.............................1................  1
 PC-DISP         00 4  ....................................1............  1
                 00 5  ...........1.......................11............  2
                 00 6  .................................................  0

110000001DDDDDDD 00 1  .................1...................1....1....11  2
 JUNC [R.] LABEL 00 2  .............1..............1....1...............  1
 UNCOND BRANCH   00 3  ..1.............................1................  1
 PC-DISP         00 4  ....................................1............  1
                 00 5  ...........1.......................11............  2
                 00 6  ................1..................1.............  1

111XXX010MAAAAAA 00 1  .................1..1........................1...  2
 JXXX L.Ax       00 2  .............1...1..1...1...1....1...............  1
   COND BRANCH   00 3  .................................................  0
 LS              00 4  .................................................  0
                 00 5  ...........1........................1............  2
                 00 6  .................................................  0

110000010MAAAAAA 00 1  ..........1......1..1.....................1.....11  2
 JUNC L.Ax       00 2  .............1...1..1...1...1....1...............  1
 UNCOND BRANCH   00 3  .................................................  0
 LS              00 4  .................................................  0
                 00 5  ...........1........................1............  2
                 00 6  .................................................  0

PPPPPPPPPPPPPPPP SS C  DDIDSSTSSPSBIPPAA1BTLGGXXHLLHSSHLLCACSIHPACOCWXYZ  #
0123456789111111 01 Y  LEMPEE/EEVERWNIUUG.OSRRWRAABBRLAABRLAUNB.NIRR     I
          012345    C  ACDOLLPLL.L./.RXX/RGA..RDHHHHLLLLLCURBCLRDN C      E
                    L  M..W..C..R.WRR...8E. WR       AA   OOG R E   X     C
                    E   RR RRRIIDIRBDRRW VL RD       LL   UUE - V   /     S
                        DD 12  B 0   DDR  4               TTN 2     Y

111XXX110MAAAAAA 00 1  ..........1......1..1.....................1..1..1  4
 CXXX [L.]Ax     00 2  .............1...1..1...1...1....1...............  1
   COND CALL     00 3  .................................................  0
 LS              00 4  .................................................  0
 LINK I0         00 5  ...........1........................1............  2
                 00 6  .....................1.............1.............  1
```

```
110000110MAAAAAA 00 1  ..........1......1..1.....................1....11  2
 CUNC [L.]Ax     00 2  .............1...1..1...1...1....1...............  1
 UNCOND CALL     00 3  .................................................  0
 LS              00 4  .................................................  0
 LINK IO         00 5  ...........1........................1............  2
                 00 6  .....................1.............1.............  1

111XXX011110NNNN 00 1  .......1.........1...........................1...  2
 JXXX ix.Nx      00 2  .....1................1.....1....1...............  1
  COND BRANCH    00 3  ..1.............................1................  1
 INDEX+4BIT DISP 00 4  ....................................1............  1
                 00 5  ...........1.......................11............  2
                 00 6  ................1..................1.............  1

110000011110NNNN 00 1  .......1.........1.............................11  1
 JUNC ix.Nx      00 2  .....1................1.....1....1...............  1
 UNCOND BRANCH   00 3  ..1.............................1................  1
 INDEX+4BIT DISP 00 4  ....................................1............  1
                 00 5  ...........1.......................11............  2
                 00 6  ................1..................1.............  1

111XXX111110NNNN 00 1  .......1.........1...........................11..  3
 CXXX ix.Nx      00 2  .....1................1.....1....1...............  1
  COND CALL      00 3  1................................................  1
 INDEX+4BIT DISP 00 4  ..1.............................1................  1
 LINK IO         00 5  ....................................1............  1
                 00 6  ................1..................1.............  1

                 01 1  ...............................................11  1
                 01 2  .................................................  0
                 01 3  .................................................  0
                 01 4  .................................................  0
                 01 5  .................................................  0
                 01 6  .................................................  0

110000111110NNNN 00 1  .......1.........1.............................11  1
 CUNC ix.Nx      00 2  .....1................1.....1....1...............  1
 UNCOND CALL     00 3  1................................................  1
 INDEX+4BIT DISP 00 4  ..1.............................1................  1
 LINK IO         00 5  ....................................1............  1
                 00 6  ................1..................1.............  1

PPPPPPPPPPPPPPPP SS C  DDIDSSTSSPSBIPPAA1BTLGGXXHLLHSSHLLCACSIHPACOCWXYZ  #
0123456789111111 01 Y  LEMPEE/EEVERWNIUUG.OSRRWRAABBRLAABRLAUNB.NIRR      I
           012345   C  ACDOLLPLL.L./.RXX/RGA..RDHHHHLLLLLCURBCLRDN C      E
                    L  M..W..C..R.WRR...8E. WR      AA   OOG R E   X      C
                    E   RR RRRIIDIRBDRRW VL RD      LL   UUE - V   /      S
                        DD 12  B 0   DDR  4              TTN 2     Y

                 01 1  ..........1....................................11  2
                 01 2  ..............1..................................  1
                 01 3  .............1.......1...........................  1
                 01 4  .................................................  0
                 01 5  ...........1...1.................................  1
                 01 6  .................................................  0

111XXX011111Xrrr 00 1  .......1.........1...........................11..  3
 JXXX ix.rx      00 2  .....1................1.....1....1...............  1
  COND BRANCH    00 3  1................................................  1
 INDEX+ REG DISP 00 4  ......................1.........1................  1
                 00 5  ....................................1............  1
                 00 6  ................1..................1.............  1

                 01 1  ...............................................11  1
                 01 2  .................................................  0
                 01 3  .................................................  0
                 01 4  .................................................  0
                 01 5  .................................................  0
                 01 6  .................................................  0
```

```
110000011i11Xrrr 00 1  .......1.........1...........................11  1
 JUNC ix.rx      00 2  .....1...............1.....1....1..............  1
 UNCOND BRANCH   00 3  1..............................................  1
 INDEX+ REG DISP 00 4  .....................1.........1...............  1
                 00 5  ...................................1...........  1
                 00 6  ...............1..................1............  1

                 01 1  .............................................11  1
                 01 2  .............1.................................  1
                 01 3  ...............................................  0
                 01 4  ...............................................  0
                 01 5  ..........1...1................................  1
                 01 6  ...............................................  0

111XXX111i11Xrrr 00 1  .......1.........1.........................11..  4
 CXXX ix.rx      00 2  .....1...............1.....1....1..............  1
   COND CALL     00 3  1..............................................  1
 INDEX+ REG DISP 00 4  .....................1.........1...............  1
 LINK I0         00 5  ...................................1...........  1
                 00 6  ...............1..................1............  1

                 01 1  .............................................11  1
                 01 2  ...............................................  0
                 01 3  ...............................................  0
                 01 4  ...............................................  0
                 01 5  ...............................................  0
                 01 6  ...............................................  0

PPPPPPPPPPPPPPPP SS C  DDIDSSTSSPSBIPPAA1BTLGGXXHLLHSSHLLCACSIHPACOCWXYZ  #
0123456789111111 01 Y  LEMPEE/EEVERWNIUUG.OSRRWRAABBRLAABRLAUNB.NIRR     I
          012345    C  ACDOLLPLL.L./.RXX/RGA..RDHHHHLLLLLCURBCLRDN C      T
                    L  M..W..C..R.WRR...8E. WR      AA    OOG R E   X     C
                    E   RR RRRIIDIRBDRRW VL RD      LL    UUE - V   /     S
                        DD 12  B 0   DDR  4               TTN 2     Y

110000111i11Xrrr 00 1  .......1.........1...........................11  1
 CUNC ix.rx      00 2  .....1...............1.....1....1..............  1
 UNCOND CALL     00 3  1..............................................  1
 INDEX+ REG DISP 00 4  .....................1.........1...............  1
 LINK I0         00 5  ...................................1...........  1
                 00 6  ...............1..................1............  1

                 01 1  ..........1..................................11  2
                 01 2  .............1.................................  1
                 01 3  ............1.......1..........................  1
                 01 4  ...............................................  0
                 01 5  ..........1...1................................  1
                 01 6  ...............................................  0

111XXX0110010000 00 1  ................1...................1......1.1.  2
 JXXX D.LABEL    00 2  .............1.............1....1..............  1
   COND BRANCH   00 3  1..............................................  1
 DIR             00 4  ...................................1...........  1
                 00 5  ...........1......................11...........  2
                 00 6  ...............................................  0

                 01 1  .............................................11  1
                 01 2  ...............................................  0
                 01 3  ...............................................  0
                 01 4  ...............................................  0
                 01 5  ...............................................  0
                 01 6  ...............................................  0

1100000110010000 00 1  ...............................................  0
 JUNC D.LABEL    00 2  .............1.............1....1..............  1
 UNCOND BRANCH   00 3  1..............................................  1
 DIR             00 4  ...............................................  0
                 00 5  ...................................1...........  1
                 00 6  ...............................................  0
```

```
                  01 1  ...............................................11  1
                  01 2  ..............1.1................................  1
                  01 3  .................................................  0
                  01 4  .................................................  0
                  01 5  ...........1...1.................................  1
                  01 6  .................................................  0

111XXX1110010000  00 1  ..........1......1....................1......1.11  4
 CXXX D.LABEL     00 2  .............1..............1....1...............  1
   COND CALL      00 3  1................................................  1
 DIR              00 4  ....................................1............  1
 LINK I0          00 5  ...........1.........1.............11............  3
                  00 6  .................................................  0

PPPPPPPPPPPPPPPP  SS C  DDIDSSTSSPSBIPPAALBTLGGXXHLLHSSHLLCACSIHPAC??NXYZ  =
0123456789111111  01 Y  LEMPEE/EEVERWNIUUG.OSRRWRAABBRLAABRLAUNB.NIRR     I
          012345     C  ACDOLLPLL.L./.RXX/RGA..RDHHHHLLLLLURECLRIN ?      I
                     L  M..W..C..R.WRR...8E. WR       AA   OOC R E   X    I
                     E   RR RRRIIDIREDRRW VL RD       LL   UUE - T        E
                         DD 12  B 0   DDR  4               TTN 2     T

                  01 1  ...............................................11  1
                  01 2  .................................................  0
                  01 3  .................................................  0
                  01 4  .................................................  0
                  01 5  .................................................  0
                  01 6  .................................................  0

1100001110010000  00 1  ..........1......1....................1........11  1
 CUNC D.LABEL     00 2  .............1..............1....1...............  1
 UNCOND CALL      00 3  1................................................  1
 DIR              00 4  ....................................1............  1
 LINK I0          00 5  .....................1.............11............  2
                  00 6  .................................................  0

                  01 1  ...............................................11  1
                  01 2  ..............1.1................................  1
                  01 3  .................................................  0
                  01 4  .................................................  0
                  01 5  ...........1...1.................................  1
                  01 6  .................................................  0

111XXX0110000000  00 1  .................1....................1......1.1.  2
 JXXX ID.LABEL    00 2  .............1..............1....1...............  1
   COND BRANCH    00 3  1................................................  1
 -INDIR           00 4  ....................................1............  1
                  00 5  ...........1.......................11............  2
                  00 6  .................................................  0

                  01 1  ...............................................11  1
                  01 2  .................................................  0
                  01 3  .................................................  0
                  01 4  .................................................  0
                  01 5  .................................................  0
                  01 6  .................................................  0

1100000110000000  00 1  .................................................  0
 JUNC ID.LABEL    00 2  .............1..............1....1...............  1
 UNCOND BRANCH    00 3  1................................................  1
 INDIR            00 4  .................................................  0
                  00 5  ....................................1............  1
                  00 6  .................................................  0

                  01 1  ..............1..1.............................11  2
                  01 2  ..............1..1......1........................  1
                  01 3  .................................................  0
                  01 4  .................................................  0
                  01 5  ...........1.....................................  1
                  01 6  .................................................  0
```

```
PPPPPPPPPPPPPPPP SS C  IDIDSSTSSPSSIFFAAISTLGGXGHLLHSSHLLCACSIHPACCCWXYI
0123456789111111 01 Y  LEMPEE/EEVERWNIUUG.GSRRWRAABBRLAABRLAUNE.NIRR
          012345    C  ACEOLLPLL.L./.RXX/RGA..RDHHHHLLLLCURBCLRDN C
                    L  M..W..C..R.WRR...SE. WR       AA   DOG R E   X
                    E   RR RRRIIDIRSDRRW VL RD       II   UUE - Y
                        DD 11  B 0   DDR  4               TTN 1     Y

111XXX1110000000 00 1  ..........1......1....................1.......1.11
  CXXX ID.LABEL  00 2  .............1..............1....1................
    COND CALL    00 3  1.................................................
  INDIR          00 4  ....................................1.............
  LINK I0        00 5  ...........1.........1.............11.............
                 00 6  ..................................................

                 01 1  ................................................11
                 01 2  ..................................................
                 01 3  ..................................................
                 01 4  ..................................................
                 01 5  ..................................................
                 01 6  ..................................................

1100001110000000 00 1  ..........1......1....................1.........11
  CUNC ID.LABEL  00 2  .............1..............1....1................
  UNCOND CALL    00 3  1.................................................
  INDIR          00 4  ....................................1.............
  LINK I0        00 5  .....................1.............11.............
                 00 6  ..................................................

                 01 1  ..............1..1..............................11
                 01 2  ..............1..1......1.........................
                 01 3  ..................................................
                 01 4  ..................................................
                 01 5  ...........1......................................
                 01 6  ..................................................
```

APPENDIX D

*INSTRUCTION DECODE FOR MICROCYCLE 1

| SIGNAL | PPPPPPPPPPPPPPPPSS<br>0123456789ABCDEF01 | EQU # | COMMENTS |
|---|---|---|---|
| SEL.R1 = | 01XXXXXXXXXXXXXX00 | 001 | REG-IMMEDIATE, LOAD PC+D |
| | 10XXXXXXXXXXXXXX00 | 002 | REG-LINESPACE, PTG LS |
| | 00011XXX01000XXX00 | 003 | SUPR STORE |
| | 0001111X11001XXX00 | 004 | AUX-INDEX |
| | 11001XXXXXXXXXXX00 | 005 | CRC-LS |
| | 00XXXXXXXXXXXXXX01 | 006 | CYCLE 2,NON-BRANCH,NON-LS |
| SEL.R2 = | 00XXXXXX10000XXX00 | 007 | REG/I-REG/I |
| | 00011XXX11000XXX00 | 008 | SUPR LOAD |
| | #033 | | CLEAR/TEST BIT-REG |
| | #061 | | SET BIT-REG |
| | 0000010XX0001XXX00 | 009 | SHIFT REG |
| | #035 | | COMP REG |
| SEL.I = | 00XXXXXXXX1XXXXX00 | 010 | REG/I-INDEXED |
| | 110000X11X1XXXXX00 | 011 | UNCOND BR/CALL-INDEXED |
| | 111XXXX11X1XXXXX00 | 012 | COND BR/CALL-INDEXED |
| | 1100011X1XXXXXXX01 | 013 | INSTR R/W-INDEXED/DIR |
| SEL.IB = | 1100011X1XXXXXXXX0 | 014 | INSTR R/W-INDEXED/DIR |
| SEL.I0 = | 110000X10XXXXXXX00 | 015 | UNCOND BR/CALL-LS |
| | 111XXX110XXXXXXX00 | 016 | COND CALL-LS |

| | | | | |
|---|---|---|---|---|
| | | 110000X1100X0XXX00 | 017 | UNCOND BR/CALL DIR/INDIR |
| | | 111XXX11100X0XXX00 | 018 | COND CALL DIR/INDIR |
| | | 110000111X1XXXXX01 | 019 | UNCOND CALL INDEXED |
| TOG.L4 | = | #008 | | SUPR LOAD |
| T/PCR | = | #013 | | INSTR R/W-INDEXED/DIR |
| 16/8B | = | 01XXX11XXXXXXXXX00 | 020 | I-IMMD |
| | | 00XXX11X10000XXX00 | 021 | I-REG/I |
| | | 10XXX11XXXXXXXXX00 | 022 | I-LINESPACE |
| | | #003 | | SUPR STORE |
| | | #008 | | SUPR LOAD |
| | | #014 | | INSTR R/W-INDEXED/DIR |
| | | 11000000XXXXXXXX00 | 023 | UNCOND BR PC+/-D |
| | | 111XXX00XXXXXXXX00 | 024 | COND BR PC+/-D |
| | | #011 | | UNCOND BR/CALL-INDEXED |
| | | #012 | | COND BR/CALL-INDEXED |
| | | 111XXX01100X0XXX00 | 025 | COND BR-DIR/INDIR |
| 16/8B | + | #015 | | UNCOND BR/CALL-LS |
| | | #016 | | COND CALL-LS |
| | | #017 | | UNCOND BR/CALL-DIR/INDIR |
| | | #018 | | COND CALL-DIR/INDIR |
| | | 00XXX11XXXXXXXXX01 | 026 | I-INDEXED/DIR |
| | | 100XX11XXXXXXXXX00 | 105 | I-LS OP 0-3 |
| | | 1011111XXXXXXXXX00 | 106 | I-LS SWAP |
| | | #092 | | FTG-LS STORE |
| | | 1011011X1XXXXXXX00 | 107 | FTG-LS LOAD |
| | | 00000000000111XX00 | 108 | FTG FETCH |
| | | 11001XXXXXXXXXXX00 | 109 | CRC-LS |
| | | 110000X10XXXXXXX00 | 110 | UNCOND BR/CALL-LS |
| | | 111XXX10XXXXXXXX00 | 111 | COND BR/CALL-LS |
| | | 10XXX11X0XXXXXXX01 | 112 | I-LS MEM DEST |
| | | 000XX11XXXXXXXXX01 | 113 | I-IX/DIR OP 0-3 |
| | | 0011111X00010XXX01 | 114 | I-DIR SWAP |
| | | 11001XXXXXXXXXXX01 | 115 | CRC-LS |
| | | 000010XXX0010XXXXX | 116 | CRC-DIR |
| | | 00001X0XX0010XXXXX | 117 | CRC-DIR |
| | | 110000X110000XXX01 | 118 | UNCOND/COND BR/CALL INDIR |
| | | 00XXX11X00010XXX10 | 119 | I-DIR MEM DEST |
| SUB | = | 01001XXXXXXXXXXX00 | 027 | REG/I-IMMD SUB |
| | | 01010XXXXXXXXXXX00 | 028 | REG/I-IMMD COMP |
| | | 10001XXXXXXXXXXX00 | 029 | REG/I-LS SUB |
| | | 10010XXXXXXXXXXX00 | 030 | REG/I-LS COMP |
| | | 00001XXX10000XXX00 | 031 | REG/I-REG/I SUB |
| | | 00010XXX10000XXX00 | 032 | REG/I-REG/I COMP |
| | | 0001XXXX00001XXX00 | 033 | CLEAR/TEST BIT-REG |
| | | 1101XXXX0XXXXXXX00 | 034 | CLEAR/TEST BIT-LS |
| | | 000001110000 1XXX00 | 035 | 1'S COMP-REG |
| | | 110001110XXXXXXX00 | 036 | 1'S COMP-LS |
| | | 110000001XXXXXXX00 | 037 | UNCOND BR PC-D |
| | | 111XXX001XXXXXXX00 | 038 | COND BR PC-D |
| | | 00001XXXXX1XXXXX01 | 039 | R/I-INDEXED SUB |
| | | 00010XXXXXXXXXXX01 | 040 | R/I-INDEXED/DIR COMP |
| | | 00001XXXX0011XXX01 | 041 | R-DIR SUB |
| | | 0000111XX001XXXX01 | 103 | I-DIR SUB |
| AND | = | 011000XXXXXXXXXX00 | 042 | AND REG-IMMD |
| | | 01100X0XXXXXXXXX00 | 043 | AND REG-IMMD |
| | | 011110XXXXXXXXXX00 | 044 | TUM REG-IMMD |
| | | 01111X0XXXXXXXXX00 | 045 | TUM REG-IMMD |
| | | 001000XX10000XXX00 | 046 | AND REG-REG |
| | | 00100X0X10000XXX00 | 047 | AND REG-REG |

```
                001110XX10000XXX00   048   TUM REG-REG
                00111X0X10000XXX00   049   TUM REG-REG
                101000XXXXXXXXXX00   050   AND REG-LS

AND      -      10100X0XXXXXXXXX00   051   AND REG-LS
                101110XXXXXXXXXX00   052   TUM REG-LS
                10111X0XXXXXXXXX00   053   TUM REG-LS
                #033                       CLEAR/TEST BIT-REG
                #034                       CLEAR/TEST BIT-LS
                001000XXXXXXXXXX01   054   AND REG-IX/DIR
                00100X0XXXXXXXXX01   055   AND REG-IX/DIR
                001110XXXXXXXXXX01   056   TUM REG-IX/DIR
                00111X0XXXXXXXXX01   057   TUM REG-IX/DIR

OR       =      01101XXXXXXXXXXX00   058   OR REG/I-IMMD
                00101XXX10000XXX00   059   OR REG/I-REG/I
                10101XXXXXXXXXXX00   060   OR REG-LS
                00011XXX10001XXX00   061   SET BIT-REG
                11011XXX1XXXXXXX00   062   SET BIT-LS
                00101XXXXXXXXXXX01   063   OR REG-IX/DIR, MOVE MSB

CIN      =      #027                       REG/I-IMMD SUB
                #028                       REG/I-IMMD COMP
                #029                       REG/I-LS SUB
                #030                       REG/I-LS COMP
                #031                       REG/I-REG/I SUB
                #032                       REG/I-REG/I COMP
                #033                       CLEAR/TEST BIT-REG
                #034                       CLEAR/TEST BIT-LS
                #037                       UNCOND BR PC-D
                #038                       COND BR PC-D
                #039                       R/I-INDEXED SUB
                #040                       R/I-INDEXED/DIR COMP
                #041                       R-DIR SUB
                #103                       I-DIR SUB
                AND
                #015                       UNCOND CALL LS
                #016                       COND CALL LS

INCR-2   =      #025                       COND BR DIR/INDIR
                #017                       UNCOND BR/CALL DIR/INDIR
                #018                       COND CALL DIR/INDIR

P.REV    =      #044                       TUM REG-IMMD
                #045                       TUM REG-IMMD
                #048                       TUM REG-REG
                #049                       TUM REG-REG
                #052                       TUM REG-LS
                #053                       TUM REG-LS
                #033                       CLR/TEST BIT-REG
                #034                       CLR/TEST BIT-LS
                #061                       SET BIT-REG

P.REV    +      #062                       SET BIT-LS
                #056                       TUM REG-IX/DIR
                #057                       TUM REG-IX/DIR

CRCX/Y   =      11001XXX10XXXXXX00   064   CRC16-LS
                00001XXX10010XXX01   065   CRC16-DIR

W        =      111XXXXXXXXXXXXX00   066   BRANCH/CALL COND

X        =      1100010XXXXXXXXX00   067   SHIFT-LS
                111XXX011X11XXXX00   068   COND BR INDEX-REG DISPL
                111XXX111X1XXXXX00   069   COND CALL INDEXED
```

```
        000010XXX0010XXX01    070    CRC-DIRECT
        00001X0XX0010XXX01    104    CRC-DIRECT
        #044                         TUM REG-IMMD
        #045                         TUM REG-IMMD
        #048                         TUM REG-REG
        #049                         TUM REG-REG
        #052                         TUM REG-LS
        #053                         TUM REG-LS
        #005                         CRC-LS
        #033                         CLR/TEST BIT-REG
        #061                         SET BIT-REG
        #034                         CLR/TEST BIT-LS
        #062                         SET BIT-LS
        #009                         SHIFT REG
        #056                         TUM REG-INDEXED/DIR
        #057                         TUM REG-INDEXED/DIR

Y    =  010110XXXXXXXXXX00    071    REG-IMMD MOVE
        01011X0XXXXXXXXX00    072    REG-IMMD MOVE
        000110XX10000XXX00    073    REG-REG  MOVE
        00011X0X10000XXX00    074    REG-REG  MOVE
        10011XXX0XXXXXXX00    075    I/REG-LS STORE
        100110XX1XXXXXXX00    076    REG-LS LOAD
        10011X0X1XXXXXXX00    077    REG-LS LOAD
        00XXXXXXX001XXXX00    078    REG/I-DIR.CRC-DIR.PTG FETCH
        0111011XXXXXXXXX00    079    LOAD PC+DISPL
        000111110100 1XXX00   080    PN TO AUX
        #017                         UNCOND BR/CALL-DIR/INDIR
        10XXXXXX0XXXXXXX01    083    REG/I-LS
        00011XXX0XXXXXXX01    084    REG/I-IX/DIR STORE
        000110XXXXXXXXXX01    086    REG-IX/DIR MOVE
        00011X0XXXXXXXXX01    087    REG-IX/DIR MOVE
        0010X11X0XXXXXXX01    088    I-STORE BYTE DIR/IX
        11XXXXXXXXXXXXXX01    089    MISC-LS. BR/CALL-ALL
        XXXXXXXXXXXXXXXX10    090    ALL CYCLE 3
        #044                         TUM REG-IMMD

Y    +  #045                         TUM REG-IMMD
        #048                         TUM REG-REG
        #049                         TUM REG-REG
        #052                         TUM REG-LS
        #053                         TUM REG-LS
        #010                         REG/I-IX
        #003                         SUPR STORE
        #008                         SUPR LOAD
        #004                         AUX - INDEX
        #005                         CRC-LS
        #014                         INSTR R/W-IX/DIR
        #023                         UNCOND BR PC-/-DISPL
        #011                         UNCOND BR/CALL-IX
        #015                         UNCOND BR/CALL-LS
        #056                         TUM REG-IX/DIR
        #057                         TUM REG-IX/DIR
        #025                         COND BR-DIR/INDIR
        #018                         COND CALL DIR/INDIR
        1010X11X0XXXXXXX00    091    I-LS STORE BYTE
        1011011X0XXXXXXX00    092    PTG-LS STORE
        #070                         CRC-DIR
        #104                         CRC-DIR

Z    =  01110XXXXXXXXXXX00    093    REG-IMMD XOR. LOAD PC-DISPL
        00110XXXXXXXXXXXXX    094    REG-REG/IX/DIR XOR
        10110XXXXXXXXXXX00    095    REG-LS XOR. I-PTG LS MOVE
        0101111XXXXXXXXX00    096    I-IMMD MOVE 3
        0110011XXXXXXXXX00    097    I-IMMD MOVE 4
```

```
                0001111X10000XXX00   098   I-REG LOAD 3
                10X1111XXXXXXXXX00   099   I-LS MOVE 3, SWAP
                0001111XXXXXXXXX01   100   I-IX/DIR LOAD 3
                001XX11XXXXXXXXX01   101   I-IX/DIR MOVES 4-7
                #042                       AND REG-IMMD
                #043                       AND REG-IMMD
                #058                       I/REG-IMMD OP 5
                #044                       TUM REG-IMMD
                #045                       TUM REG-IMMD
                #046                       AND REG-REG
                #047                       AND REG-REG
                #059                       REG/I-REG OP 5
                #048                       TUM REG-REG
                #049                       TUM REG-REG
                #050                       AND REG-LS
                #051                       AND REG-LS
                #060                       OR REG-LS
                #052                       TUM REG-LS
                #053                       TUM REG-LS
                #010                       REG/I-IX

Y       +  #078                            REG/I-DIR,CRC-DIR,PTG FETCH
           #017                            UNC BR/CALL-DIR/INDIR
           #003                            SUPR STORE
           #008                            SUPR LOAD
           #080                            PN-AUX
           #033                            CLR/TEST BIT-REG

Z       =  #034                            CLR/TEST BIT-LS
           #061                            SET BIT-REG
           #062                            SET BIT-LS
           #035                            1'S COMP-REG
           #036                            1'S COMP-LS
           #014                            INSTR R/W-IX/DIR
           #023                            UNCOND BR PC+/-DISPL
           #015                            UNCOND BR/CALL-LS
           #011                            UNCOND BR/CALL-IX
           #083                            REG/I-LS
           #084                            REG/I-IX/DIR STORE
           #054                            AND REG-IX/DIR
           #055                            AND REG-IX/DIR
           #063                            OR REG-IX/DIR
           #056                            TUM REG-IX/DIR
           #057                            TUM REG-IX/DIR
           #088                            I-DIR/IX STORE BYTE
           #089                            MISC LS, BR/CALL-ALL
           #090                            ALL CYCLE 3
           #075                            REG/I-LS STORE
           #004                            AUX - INDEX
           #016                            COND CALL-LS
           #018                            COND CALL-DIR/INDIR
           X010011XXXXXXXXX00   102        I-REG/IX/DIR/LS MOVE LSB
           #091                            I-LS STORE BYTE

AUX.RD  =  00XXXXXXXX1XXXXX01   120        REG/I-INDEXED

PIR.RD  =  00XXXXXXX001X0XX0X   121        REG/I-DIR,CRC-DIR
           110000X110000XXX01   122        UNCOND/COND BR/CALL-INDIR
           00XXXXXXXXXXXXXX10   123        ALL CYCLE 3

PV.RD   =  #092                            PTG LS STORE
           #107                            PTG LS LOAD
           #108                            PTG FETCH

LSA     =  1000XXXXXXXXXXXX00   124        REG/I-LS ADD SUB
```

```
                 10010XXXXXXXXXXX00   125   REG/I-LS COMP
                 10011XXX0XXXXXXX00   126   REG/I-LS STORE
                 10011XXX1XXXXXXX00   127   REG/I-LS LOAD
                 1010X0XXXXXXXXXX00   128   REG-LS OP AND.OR

LSA      -  1010XX0XXXXXXXXX00   129   REG-LS OP AND.OR
            101100XXXXXXXXXX00   130   REG-LS XOR
            10110X0XXXXXXXXX00   131   REG-LS XOR
            101110XXXXXXXXXX00   132   REG-LS TUM
            10111X0XXXXXXXXX00   133   REG-LS TUM
            1011111XXXXXXXXX00   134   I-LS SWAP
            #092                       PTC LS STORE
            #107                       PTC LS LOAD
            11001XXXXXXXXXXX00   135   CRC-LS
            0001XXXXX0001XXX00   136   BIT OP.- REG
            1101XXXXXXXXXXXX00   137   BIT OP-LS
            1100010XXXXXXXXX00   138   SHIFT-LS
            110001110XXXXXXX00   139   1'S COMP-LS
            110000X10XXXXXXX00   140   UNCOND BR/CALL LS
            111XXXX10XXXXXXX00   141   COND BR/CALL LS
            10XXXXX0XXXXXXXX01   142   REG/I-LS MEM DEST
            11001XXXXXXXXXXX01   143   CRC-LS CYCLE 2
            11011XXXXXXXXXXX01   144   BIT OP-LS CYCLE 2
            110001110XXXXXXX01   145   1'S COMP-LS
            1100010XXXXXXXXX01   146   SHIFT-LS
            1010X11X1XXXXXXX00   147   I-LS LOAD BYTE
            1010X11X0XXXXXXX00   148   I-LS STORE BYTE

*INSTRUCTION DECODE FOR MICROCYCLE 2

========    ==================   =====   ==================================
            PPPPPPPPPPPPPPPPSS    EQU               COMMENTS
 SIGNAL     0123456789ABCDEF01     #
========    ==================   =====   ==================================
SEL.R1 =    00XXXXXX1X000XXX00    001    REG/I-REG/I V=1 SUPR LOAD

SEL.R2 =    00XXXXXXXX1XXXXX00    002    REG/I-INDEXED
            00011XXX01000XXX00    003    SUPR STORE
            1100011X1X1XXXXXX0    004    INSTR R/W INDEXED
            110000X11X1XXXXX00    005    UNCOND BR/CALL-INDEXED
            111XXXX11X1XXXXX00    006    COND BR/CALL-INDEXED

GR.RD  =    0100XXXXXXXXXXXX00    007    REG/I-IMMD ADD.SUB
            01010XXXXXXXXXXX00    008    REG/I-IMMD COMP
            1000XXXXXXXXXXXX00    009    REG/I-LS ADD.SUB
            10010XXXXXXXXXXX00    010    REG/I-LS COMP
            1010X0XXXXXXXXXX00    011    REG-LS AND.OR
            1010XX0XXXXXXXXX00    012    REG-LS AND.OR
            101100XXXXXXXXXX00    013    REG-LS XOR
            10110X0XXXXXXXXX00    014    REG-LS XOR
            101110XXXXXXXXXX00    015    REG-LS TUM
            10111X0XXXXXXXXX00    016    REG-LS TUM
            0110011XXXXXXXXX00    017    I-IMMD MOVE BYTE
            01XX1XXXXXXXXXXX00    018    R/I-IMMD OP1.OP3.OP5.OP7
            1011111XXXXXXXXX00    019    I-LS SWAP
            #003                         SUPR STORE
            #001                         REG/I-REG/I V=1 SUPR LOAD
            #002                         REG/I-INDEXED
            #004                         INSTR R/W-INDEXED
            #005                         UNCOND BR/CALL-INDEXED
            #006                         COND BR/CALL-INDEXED
            #070                         REG-IMMD AND/XOR
            #071                         REG-IMMD AND/XOR
            #069                         REG-IMMD TUM
            #051                         I-LS LOAD BYTE
```

```
GR.WR   =  0001111X11001XXX00   020   AUX - I

AUX.RD  =  #020                       AUX - I
           00XXXXXXXX1XXXXX01   021   REG/I-INDEXED
           1100011X1X1XXXXX01   022   INSTR R/W-INDEXED

AUX.WR  =  #019                       I-LS SWAP
           000111110100 1XXX00  023   PN - AUX
           #036                       BR/CALL DIR

DEC.RD  =  0001XXXXX0001XXX00   024   BIT OP-REG
           1101XXXXXXXXXXXX00   025   BIT OP-LS

PN.RD   =  0111011XXXXXXXXX00   026   LOAD PC-DISPL
           11000000XXXXXXXX00   027   UNCOND BR PC+/-DISPL
           111XXX00XXXXXXXX00   028   COND BR PC+/-DISPL
           111XXXX1100X0XXX00   029   COND BR/CALL-DIR/INDIR
           110000X1100X0XXX00   030   UNCOND CALL-DIR/INDIR
           110000X10XXXXXXX00   031   UNCOND BR/CALL-LS
           111XXXX10XXXXXXX00   032   COND BR/CALL-LS
           #023                       PN - AUX

PIR.RD  =  00XXXXXXX001X0XX0X   033   REG/I-DIR.CRC-DIR
           1100011X1X000XXXXX   034   INSTR R/W DIR
           110000X110000XXX01   035   UNCOND/COND BR/CALL-INDIR
           110000X110010XXX01   036   UNCOND/COND BR/CALL-DIR
           00XXXXXXXXXXXXXX10   037   ALL CYCLE 3
           000001XXX0001XXX00   080   SHIFT/INV - REG
           110000X11X1XXXXX01   081   UNCOND CALL - IX

PV.RD   =  1011011X0XXXXXXX00   038   PTG LS STORE
           1011011X1XXXXXXX00   039   PTG LS LOAD
           0000000000111XX00    040   PTG FETCH

XRD     =  #009                       REG/I-LS ADD SUB
           #010                       REG/I-LS COMP
           10011XXX1XXXXXXX00   041   REG/I-LS LOAD
           #011                       REG-LS AND OR
           #012                       REG-LS AND OR
           #013                       REG-LS XOR
           #014                       REG-LS XOR
           #015                       REG-LS TUM
           #016                       REG-LS TUM
           #019                       I-LS SWAP
           #039                       PTG-LS LOAD
           #040                       PTG FETCH
           11001XXXXXXXXXXX00   042   CRC-LS
           #025                       BIT OP-LS
           1100010XXXXXXXXX00   043   SHIFT-LS.
           110001110XXXXXXX00   044   1'S COMP-LS
           #031                       UNCOND BR/CALL-LS
           #032                       COND BR/CALL-LS
           0000XXXXXXXXXXXX01   045   I/REG-IX/DIR ADD.SUB.CRC
           00011XXX1XXXXXXX01   046   I/REG-IX/DIR LOAD
           001XXX0XXXXXXXXX01   047   REG-IX/DIR 4-7
           001XXX0XXXXXXXXX01   048   REG-IX/DIR 4-7
           0010X11X1XXXXXXX01   049   I-IX/DIR LOAD 4-5
           0011111X00010XXX01   050   I-DIR SWAP

XRD     -  #035                       UNCOND BR/CALL-INDIR
           1010X11X1XXXXXXX00   051   I-LS LOAD BYTE
           00010XXXXXXXXXXX01   052   REG/I-IX/DIR COMP

XWR     =  10011XXX0XXXXXXX00   053   I/REG-LS STORE
           #038                       PTG LS STORE
```

```
                10XXXXX0XXXXXX01    054   REG/I-LS MEM DEST
                00011XXX0XXXXX01    055   REG/I-IX/DIR STORE 03
                0010X11X0XXXXX01    056   I-IX/DIR STORE 04-05
                11001XXXXXXXXX01    057   CRC-LS
                11011XXXXXXXXX01    058   BIT-LS
                110001110XXXXX01    059   1'S COMP LS
                #037                      ALL CYCLE 3
                1100010XXXXXXX01    060   SHIFT-LS
                1010X11X0XXXXX00    061   I-LS STORE BYTE

16/8B    =      100XX11XXXXXXX00    062   I-LS OP 0-3
                #019                      I-LS SWAP
                #038                      PTG LS STORE
                #039                      PTG LS LOAD
                #040                      PTG FETCH
                #042                      CRC-LS
                #031                      UNCOND BR/CALL-LS
                #032                      COND BR/CALL-LS
                10XXX11X0XXXXX01    063   I-LS MEM DEST
                000XX11XXXXXXX01    064   I-IX/DIR OP 0-3
                #050                      I-DIR SWAP
                #057                      CRC-LS
16/8B           000010XXX0010XXX    065   CRC-DIR
                00001X0XX0010XXX    079   CRC-DIR
                #035                      UNCOND/COND BR/CALL INDIR
                00XXX11X00010XX10   066   I-DIR MEM DEST

LSA      =      #009                      REG/I-LS ADD SUB
                #010                      REG/I-LS COMP
                #053                      REG/I-LS STORE
                #041                      REG/I-LS LOAD
                #011                      REG-LS OP AND,OR
                #012                      REG-LS OP AND,OR
                #013                      REG-LS XOR
                #014                      REG-LS XOR
                #015                      REG-LS TUM
                #016                      REG-LS TUM
                #019                      I-LS SWAP
                #038                      PTG LS STORE
                #039                      PTG LS LOAD
                #042                      CRC-LS
                #024                      BIT OP - REG

LSA      +      #025                      BIT OP-LS
                #043                      SHIFT-LS
                #044                      1'S COMP-LS
                #031                      UNCOND BR/CALL LS
                #032                      COND BR/CALL LS
                #054                      REG/I-LS MEM DEST
                #057                      CRC-LS CYCLE 2
                #058                      BIT OP-LS CYCLE 2
                #059                      1'S COMP -LS
                #060                      SHIFT-LS
                #051                      I-LS LOAD BYTE
                #061                      I-LS STORE BYTE

B.REV    =      0010111X0XXXXX01    067   I-IX/DIR STORE BYTE
                1010111X0XXXXX00    068   I-LS STORE MSB

LAL      =      01111XXXXXXXXX00    069   REG-IMMD TUM
                #001                      REG/I-REG/I V=1
                #015                      REG-LS TUM
                #016                      REG-LS TUM
                #003                      SUPR STORE
                #024                      BIT OP-REG
```

```
         #025                                    BIT OP-LS

LBL   =  #007                                    REG-IMMD ADD. SUB
         #008                                    REG-IMMD COMP
         011X00XXXXXXXXXX00          070         REG-IMMD AND/XOR
         011X0X0XXXXXXXXX00          071         REG-IMMD AND/XOR
         01101XXXXXXXXXXX00          072         REG/I-IMMD OP 5
         #026                                    LOAD PC+D
         00111XXX10000XXX00          074         REG-REG TUM
         #009                                    REG/I-LS ADD.SUB
         #010                                    REG/I-LS COMP
         #011                                    REG-LS OP 4-5
         #012                                    REG-LS OP 4-5
         #026                                    LOAD PC+DISPL
         #013                                    REG-LS XOR
         #014                                    REG-LS XOR
         #002                                    REG/I-IX
         #004                                    INSTR R/W-INDEXED
         #027                                    UNCOND BR PC+DISPL
         #028                                    COND BR PC+DISPL
         #031                                    UNCOND BR/CALL LS
         #032                                    COND BR/CALL LS
         #005                                    UNCOND BR/CALL-IX
         #006                                    COND BR/CALL-IX
         #029                                    COND BR/CALL DIR/INDIR
         #030                                    UNCOND CALL DIR/INDIR

LBL   -  #051                                    I-LS LOAD BYTE

LAH   =  #069                                    REG-IMMD TUM
         #015                                    REG-LS TUM
         #016                                    REG-LS TUM
         0010111X10000XXX00          075         I-REG/I LOAD MSB
         #024                                    BIT OP REG
         #025                                    BIT OP-LS
         000110XX10000XXX00          077         REG-REG/I LOAD
         00011X0X10000XXX00          078         REG-REG/I LOAD

HAH   =  000XX11XXX000XXX00          076         I-REG/I OP 0-3 SUPR MOVE

LBH   =  #074                                    REG-REG TUM

HBH   =  #007                                    REG/I-IMMD ADD.SUB
         #008                                    REG/I-IMMD COMP
         #002                                    REG/I-IX
         #017                                    I-IMMD MOVE BYTE
         #009                                    REG/I-LS ADD.SUB
         #010                                    REG/I-LS COMP
         #026                                    LOAD PC+DISPL
         #004                                    INSTR R/W INDEXED
         #027                                    UNCOND BR PC+DISPL
         #028                                    COND BR PC+DISPL
         #031                                    UNCOND BR/CALL-LS
         #032                                    COND BR/CALL-LS
         #005                                    UNCOND BR/CALL-IX
         #006                                    COND BR/CALL-IX
         #029                                    COND BR/CALL-DIR/INDIR
         #030                                    UNCOND CALL-DIR/INDIR
         #051                                    I-LS LOAD BYTE

 -INSTRUCTION DECODE FOR MICROCYCLE [illegible]

========  ==================  =====  ==================================
          PPPPPPPPPPPPPPPPSS   EQU              COMMENTS
 SIGNAL   0123456789ABCDEF01    =
```

```
========  ==================  =====  ================================
GR.RD   =  10011XXX0XXXXXXX00  001   REG/I-LS STORE
           1011011X0XXXXXXX00  002   FTC LS STORE
           11001XXXXXXXXXXX00  003   CRC-LS
           0000XXXXXXXXXXXX01  004   REG/I-IX/DIR OP0-1,CRC-DIR, FTC FETC
           00X10XXXXXXXXXXX01  005   REG/I-IX/DIR OP 2,6
           00011XXX0XXXXXXX01  006   REG/I-IX/DIR STORE
           0010XXXXXXXXXXXX01  007   I/REG-IX/DIR OP 4,5
           0010X11X0XXXXXXX01  009   I-IX/DIR STORE BYTE
           110001101XXXXXXX01  010   INSTR W-IX/DIR
           00111XXXXXXXXXXX01  011   REG/I-IX/DIR OP7
           1010X11X0XXXXXXX00  012   I-LS STORE BYTE

GR.WR   =  110000111X1XXXXX01  013   CALL-IX

AUX.RD  =  10XXXXXX0XXXXXXX01  014   REG/I-LS
           110X1XXXXXXXXXXX01  015   CRC.BIT-LS
           1100010XXXXXXXXX01  016   SHIFT-LS
           110001110XXXXXXX01  017   1'S COMP-LS
           00XXXXXXXXXXXXXX10  018   DIR-CYCLE 3 EX/ INSTR R/W

AUX.WR  =  0011111X00010XXX01  019   SWAP-DIR

IMD.RD  =  1100000XXXXXXXXX00  020   UNC BR PC+/- DISPL
           111XXX00XXXXXXXX00  021   COND BR PC+/-DISPL
           110000011X10XXXX00  022   UNCOND BR I-DISPL
           111XXX011X10XXXX00  023   COND BR I-DISPL

PN.RD   =  #013                      CALL- INDEXED

IW/RB   =  #010                      INSTR W-IX/DIR

LAL     =  #020                      UNCOND BR PC+/-DISPL
           #021                      COND BR PC+/-DISPL
           #022                      UNCOND BR I+DISPL
           #023                      COND BR I+DISPL
           #011                      REG/I-DIR OP7

LBL     =  #004                      REG/I-IX/DIR OP 0-1,CRC-DIR
           #005                      REG/I-IX/DIR OP 2,6
           #007                      I/ REG-IX/DIR OP 4,5

LAH     =  #003                      CRC-LS
           #011                      REG/I-IX/DIR OP 7
           000010XXX0010XXX01  025   CRC-DIR
           00001X0XX0010XXX01  056   CRC-DIR

HBH     =  #004                      REG/I-IX/DIR OP 0-1,CRC-DIR
           #005                      REG/I-IX/DIR OP 2,6
           #007                      REG/I-IX/DIR OP 4,5

DLAM    =  1000XXX0XXXXXXXX00  027   REG/I-LS ADD,SUB V=0
           1010X0XX0XXXXXXX00  028   REG-LS AND,OR V=0
           1010XX0X0XXXXXXX00  029   REG-LS AND,OR V=0
           101100XX0XXXXXXX00  030   REG-LS XOR V=0
           10110X0X0XXXXXXX00  031   REG-LS XOR V=0
           00XXXXXXX1XXXXXX00  032   REG/I-IX
           000010XXX0010XXX00  033   CRC-DIR
           00001X0XX0010XXX00  057   CRC-DIR
           #003                      CRC-LS
           11011XXXXXXXXXXX00  034   SET/CLR BIT-LS
           1100010XXXXXXXXX00  035   SHIFT LS
           110001110XXXXXXX00  036   1'S COMP LS
           1100011X1X1XXXXX00  037   INSTR R/W-IX
           1100011X1X000XXX00  038   INSTR R/W-DIR
```

```
              110000011X11XXXX00    039   UNCOND BR-I-R
              111XXX011X11XXXX00    040   COND BR-I+R
              1100000l100X0XXX00    041   UNCOND BR-DIR/INDIR
              111XXX01100X0XXX00    042   COND BR-DIR/INDIR
              110000111XXXXXXX00    043   UNCOND CALL-IX/DIR/INDIR
              111XXX111XXXXXXX00    044   COND CALL-IX/DIR/INDIR
              0000XXXX0001X0XX01    045   REG/I-DIR ADD.SUB. CRCX-DIR
              0010XXXX00011XXX01    046   REG-DIR AND.OR V=0
              00110XXX00011XXX01    048   REG-DIR XOR V=0
              #019                        SWAP DIR
              #025                        CRC-DIR
              #056                        CRC-DIR
              110001111XXXXXXX01    049   I R-IX/DIR
              #010                        I W-IX/DIR
              1011111X0XXXXXXX00    050   SWAP-LS
              00XXXXXXX001X0XX00    051   R/I-DIR. CRC-DIR

DPOW     =    #027                        REG/I-LS ADD.SUB V=0
              #028                        REG-LS AND.OR V=0
              #029                        REG-LS AND.OR V=0
              #030                        REG-LS XOR V=0
              #031                        REG-LS XOR V=0
              #032                        REG/I-IX
              #033                        CRC-DIR
              #057                        CRC-DIR

DPOW     +    #050                        SWAP-LS
              #003                        CRC-LS
              #034                        SET/CLEAR BIT-LS
              #035                        SHIFT LS
              #036                        1'S COMP-LS
              #037                        INSTR R/W-IX
              0000XXXX0001X0XX00    052   R/I-DIR ADD.SUB. CRC16-DIR
              0011111X00010XXX00    053   I-SWAP DIR
              0010XXXX00011XXX00    054   R-DIR AND.OR
              00110XXX00011XXX00    055   R-DIR XOR


*INSTRUCTION DECODE FOR MICROCYCLE 4

========   ==================   =====   ==================================
           PPPPPPPPPPPPPPPPSS    EQU                 COMMENTS
 SIGNAL    0123456789ABCDEF01     #
========   ==================   =====   ==================================
GR.RD  =   0000XXXX10000XXX00    001    REG/I-REG/I ADD.SUB
           00010XXX10000XXX00    002    REG/I-REG/I COMP
           0010X0XX10000XXX00    003    REG-REG AND.OR
           0010XX0X10000XXX00    004    REG-REG AND.OR
           00110XXX10000XXX00    005    REG-REG XOR
           00111XXX10000XXX00    006    REG-REG TUM
           00XXXXXXX11XXXXX00    007    REG/I-IX+R
           0010011X10000XXX00    008    I-REG LOADL BYTE
           0010111X10000XXX00    009    I-REG LOADU BYTE
           0001XXXX0001XXXX00    010    BIT OP-R
           00000100X0001XXX00    011    SHIFT L-REG
           00000101X0001XXX00    012    SHIFT R-REG
           000001110000lXXX00    013    1'S COMP-REG
           1100011X1X11XXXX00    014    INSTR R/W-IX-R
           110000X11X11XXXX00    015    UNCOND BR/CALL-IX+R
           111XXXX11X11XXXX00    016    COND BR/CALL-IX+R

 IMD.RD =  010XXXXXXXXXXXXX00    017    REG/I-IMMD OP 0-3
           011X0XXXXXXXXXXX00    018    REG/I-IMMD OP 4.6
           011010XXXXXXXXXX00    019    REG-IMMD OP 5
           01101X0XXXXXXXXX00    020    REG-IMMD OP 5
```

| | | | | |
|---|---|---|---|---|
| | | 01111XXXXXXXXXXX00 | 021 | REG-IMMD TUM |
| | | 00XXXXXXXX10XXXX00 | 022 | REG/I-IX+D |
| | | 1100011X1X10XXXX00 | 023 | INSTR R/W-IX+D |
| | | 110000111X10XXXX00 | 024 | UNC CALL-IX+D |
| | | 111XXX111X10XXXX00 | 025 | COND CALL-IX+D |
| | | #046 | | I-IMMD LOAD MSB |
| LAL | = | #017 | | REG/I-IMMD OP 0-3 |
| | | #018 | | REG/I-IMMD OP 4.6 |
| | | #019 | | REG-IMMD OP 5 |
| | | #020 | | REG-IMMD OP 5 |
| | | #006 | | REG-REC TUM |
| | | 1000XXXXXXXXXXXX00 | 026 | REG/I-LS ADD.SUB |
| | | 10010XXXXXXXXXXX00 | 027 | REC/I-LS COMP |
| | | 1010X0XXXXXXXXXX00 | 028 | REC-LS AND.OR |
| | | 1010XX0XXXXXXXXX00 | 029 | REG-LS AND.OR |
| | | 10110XXXXXXXXXXX00 | 030 | REC/I-LS OP 6 |
| | | #007 | | REG/I-IX+R |
| | | #022 | | REG/I-IX+D |
| | | #013 | | 1'S COMP-REC |
| LAL | + | #014 | | INSTR R/W-IX+R |
| | | #023 | | INSTR R/W-IX+D |
| | | 110001110XXXXXXX00 | 031 | 1'S COMP-LS |
| | | #015 | | UNCOND BR/CALL-IX+R |
| | | #016 | | COND BR/CALL-IX+R |
| | | #024 | | UNCOND CALL-IX+D |
| | | #025 | | COND CALL-IX+D |
| | | 000XXXXXXX1XXXXX01 | 032 | REG/I-IX OP 0-3 |
| | | 000XXXXXXX0110XX01 | 033 | REG-DIR OP 0-3 |
| | | 000XX11XXX010XXX01 | 072 | I-DIR OP 0-3 |
| | | 0010X0XXXXXXXXXX01 | 034 | REG-IX/DIR AND.OR |
| | | 00110XXXXXXXXXXX01 | 073 | REC-IX/DIR XOR |
| | | 0010XX0XXXXXXXXX01 | 035 | REG-IX/DIR AND.OR |
| | | 0011111X00010XXX01 | 037 | SWAP-DIR |
| | | #009 | | I-REG LOADU BYTE |
| LBL | = | 0010011X1XXXXXXX01 | 036 | I-IX/DIR LOAD LSB |
| | | 1010011X1XXXXXXX00 | 038 | I-LS LOAD LSB |
| | | #005 | | REG-REC XOR |
| | | #021 | | REG-IMMD TUM |
| | | #001 | | REG/I-REG/I ADD SUB |
| | | #002 | | REC/I-REG/I COMP |
| | | #003 | | REG-REC AND.OR |
| | | #004 | | REG-REG AND.OR |
| | | 101110XX0XXXXXXX00 | 039 | REG-LS TUM |
| | | 10111X0X0XXXXXXX00 | 040 | REC-LS TUM |
| | | #010 | | BIT OP-REC |
| | | 1101XXXXXXXXXXXX00 | 041 | BIT OP-LS |
| | | 001110XXXXXXXXXX01 | 042 | R-IX/DIR TUM |
| | | 00111X0XXXXXXXXX01 | 074 | R-IX/DIR TUM |
| | | 10X1111XXXXXXXXX00 | 043 | I-LS OP 3.7 |
| | | #052 | | LOAD REG-LS |
| | | #053 | | LOAD REC-LS |
| HBL | = | 11001XXX0XXXXXXX00 | 044 | CRC-LS |
| | | 000010XXX0010XXX01 | 045 | CRC-DIR |
| | | 00001X0XX0010XXX01 | 075 | CRC-DIR |
| LAH | = | #006 | | REG-REG TUM |
| | | 0110111XXXXXXXXX00 | 046 | LOAD BYTE I-IMMD |
| HAH | = | 1000X11XXXXXXXXX00 | 049 | I-LS ADD.SUB |
| | | 10X1011XXXXXXXXX00 | 050 | I-LS OP 2.6 |
| | | 000XXX1XXXXXXXXX01 | 051 | I-IX/DIR OP 0-3 |

```
         #037                                 SWAP-DIR

LBH    = 100110XX1XXXXXXX00   052    LOAD REG-LS
         10011X0X1XXXXXXX00   053    LOAD REG-LS

LBH    + 010110XXXXXXXXXX00   054    LOAD REG-IMMD (B: P8=ITOX)
         01011X0XXXXXXXXX00   055    LOAD REG-IMMD (B: P8=ITOX)
         000110XX1XXXXXXX01   056    LOAD REG-IX/DIR
         00011X0X1XXXXXXX01   057    LOAD REG-IX/DIR
         0010111X1XXXXXXX01   047    I-IX/DIR LOAD BYTE'
         1010111X1XXXXXXX00   048    I-LS LOAD BYTE
         #021                        REG-IMMD TUM
         #039                        REG-LS OP 7
         #040                        REG-LS OP 7
         #044                        CRC-LS
         #045                        CRC-DIR
         #075                        CRC-DIR
         #010                        BIT OP-REG
         #041                        BIT OP-LS
         #042                        REG-IX/DIR TUM
         000110XX1XXXXXXX01   058    REG-IX/DIR LOAD
         00011X0X1XXXXXXX01   059    REC-IX/DIR LOAD

HBH    = #001                        R/I-R/I ADD.SUB
         #002                        R/I-R/I COMP
         #043                        I-LS OP 3.7
         #008                        I-REG LOADL

SRLAL  = 00000101Y0001XXX00   062    SHIFT R-REG
         11000101XXXXXXXX00   063    SHIFT R-LS

SLLAL  = 00000100X0001XXX00   064    SHIFT L-REG
         11000100XXXXXXXX00   065    SHIFT L-LS

CARGEN = 11000000XXXXXXXX00   066    UNC BR PC+DISPL
         111XXX00XXXXXXXX00   067    COND BR PC+DISPL
         110000011X10XXXX00   068    UNC BR IX+DISPL
         111XXX011X10XXXX00   069    COND BR IX+DISPL
         111XXXX1100X0XXX00   070    COND BR/CALL-DIR/INDIR
         11000011100X0XXX00   071    UNC CALL-DIR/INDIR

*INSTRUCTION DECODE FOR MICROCYCLE 5

========  ==================  =====  ==================================
          PPPPPPPPPPPPPPPPSS   EQU              COMMENTS
 SIGNAL   0123456789ABCDEF01    #
========  ==================  =====  ==================================
GR.WR  =  11000011100X0XXX00   001   UNC CALL-DIR/INDIR
          111XXXX1100X0XXX00   002   COND CALL-DIR/INDIR

AUX.RD =  110000011X11XXXX01   003   UNCOND BR-IX-R
          110000X11001000001   004   UNCOND/COND BR/CALL-DIR
          110000111X1XXXXX01   005   UNC CALL-IX

BR.WR  =  00000000000111XX00   006   PTG FETCH
          11000000XXXXXXXX00   007   UNCOND BR PC+/-DISPL
          111XXX00XXXXXXXX00   008   COND BR PC+/-DISPL
          110000X10XXXXXXX00   009   UNCOND BR/CALL-LS
          111XXXX10XXXXXXX00   010   COND BR/CALL-LS
          110000011X10XXXX00   011   UNCOND BR IX+D
          111XXX011X10XXXX00   012   COND BR IX+D
          111XXXX1100X0XXX00   013   COND BR/CALL-DIR/INDIR
          #003                       UNCOND BR-IX+R
          #004                       UNCOND/COND BR/CALL-DIR
          #005                       UNCOND CALL-IX
```

```
           110000X110000XXX01   014   BR/CALL-INDIR

CARGEN =   0100XXXXXXXXXXXX00   015   REG/I-IMMD ADD.SUB
           01010XXXXXXXXXXX00   016   REG/I-IMMD COMP
           011000XXXXXXXXXX00   017   REG-IMMD AND
           01100X0XXXXXXXXX00   018   REG-IMMD AND
           01111XXXXXXXXXXX00   019   REG-IMMD TUM
           0000XXXX10000XXX00   020   REG/I-REG/I ADD.SUB
           00010XXX10000XXX00   021   REG/I-REG/I COMP
           001000XX10000XXX00   022   REG-REG/I AND
           00100X0X10000XXX00   023   REG-REG/I AND
           00111XXX10000XXX00   024   REG-REG/I TUM
           1000XXXXXXXXXXXX00   025   REG/I-LS ADD.SUB
           10010XXXXXXXXXXX00   026   REG/I-LS COMP
           101000XXXXXXXXXX00   027   REG-LS AND
           10100X0XXXXXXXXX00   028   REG-LS AND
           101110XXXXXXXXXX00   029   REG-LS TUM
           10111X0XXXXXXXXX00   030   REG-LS TUM
           0111011XXXXXXXXX00   031   LOAD PC+DISPL
           0001XXXX00001XXX00   032   CLEAR/TEST BIT-REG
           1101XXXX0XXXXXXX00   033   CLEAR/TEST BIT-LS
           110011X1X1XXXXXX00   034   INSTR R/W-IX
           110000XXXXXXXXXX00   035   UNCOND BR/CALL-ALL

CARGEN +   111XXXXXXXXXXXXX00   036   COND BR/CALL-ALL
           0000XXXXXX1XXXXX01   037   REG/I-IX ADD.SUB
           00010XXXXXXXXXXX01   038   REG/I-IX/DIR COMP
           001000XXXXXXXXXX01   039   REG/I-IX/DIR AND
           00100X0XXXXXXXXX01   040   REG/I-IX/DIR AND
           001110XXXXXXXXXX01   041   REG/I-IX/DIR TUM
           00111X0XXXXXXXXX01   042   REG/I-IX/DIR TUM
           0000XXXXX0011XXX01   043   REG-DIR ADD.SUB
           0000X11XX0010XXX01   045   I-DIR ADD.SUB
           00XXXXXXXX1XXXXX00   044   R/I-IX

ALUOUT =   #007                       UNCOND BR PC+/DISPL
           #008                       COND BR PC+/-DISPL
           #011                       UNCOND BR IX+D
           #012                       COND BR IX+D
           #013                       COND BR/CALL-DIR/INDIR
           #001                       UNCOND CALL-DIR/INDIR

*INSTRUCTION DECODE FOR MICROCYCLE 6

========   ==================   =====   ==================================
           PPPPPPPPPPPPPPPPSS    EQU                 COMMENTS
 SIGNAL    0123456789ABCDEF01     #
========   ==================   =====   ==================================
TOG.L4 =   00011XXX01000XXX00    041    SUPR STORE

GR.WR  =   01X0XXXXXXXXXXXX00    001    REG/I-IMMD ADD.SUB.OP 4,5
           01011XXXXXXXXXXX00    002    REG/I-IMMD LOAD 03
           01110XXXXXXXXXXX00    004    REG/I-IMMD OP 6
           0000XXXX10000XXX00    005    REG/I-REG/I ADD.SUB
           00011XXX10000XXX00    006    REG/I-REG/I LOAD 03
           0010XXXX10000XXX00    007    REG/I-REG/I OP 4,5
           00110XXX10000XXX00    008    REG-REG/I XOR
           10XXXXXX1XXXXXXX00    009    REG/I-LS V=1
           1011111XXXXXXXXX00    013    I-LS SWAP
           00011XXXX1000XXX00    014    SUPR MOVE
           00011XXXX0001XXX00    015    SET/CLEAR BIT-R
           000001XXX0001XXX00    016    SHIFT/1'S COMP-REG
           110000110XXXXXXX00    017    UNCOND CALL-LS
           111XXX110XXXXXXX00    018    COND CALL-LS
```

```
            0000XXXXXX1XXXXX01    019   REG/I-IX ADD.SUB
            00011XXX1X1XXXXX01    020   REG/I-IX LOAD
            0010XXXX1X1XXXXX01    021   I/REG-IX OP 4.5
            00110XXXXX1XXXXX01    023   REG-IX XOR
            0000XXXX10011XXX01    024   REG-DIR ADD.SUB V=1
            0000X11X10010XXX01    042   I-DIR ADD.SUB V=1
            00011XXX1001XXXX01    025   REG/I-DIR LOAD
            0010XXXX1001XXXX01    026   REG/I-DIR OP4.5 V=1
            00110XXX10011XXX01    027   REG-DIR XOR
            0011111X00010XXX01    029   SWAP DIR
            11000111XXXXXXXX01    030   INSTR R-IX/DIR

AUX.WR =    10XXX0XX0XXXXXXX00    031   REG-LS V=0
            10XXXX0X0XXXXXXX00    043   REG-LS V=0
            00XXXXXXXX1XXXXX00    032   REG/I-IX
            11001XXXXXXXXXXX00    033   CRC-LS
            11011XXXXXXXXXXX00    034   SET/CLR BIT-LS
            110010XXXXXXXXXX00    035   SHIFT-LS
            110001110XXXXXXX00    036   1'S COMP LS
            11000XXX1X1XXXXX00    046   INSTR R/W-IX.UNCOND BR/CALL-IX
            111XXXX11X1XXXXX00    047   COND BR/CALL-IX
            00XXXXXX00011XXX01    038   REG-DIR
            0000X11X00010XXX01    044   I-DIR ADD.SUB
            000010XXX0010XXX01    039   CRC-DIR
            00001X0XX0010XXX01    045   CRC-DIR

AUX.WR -    1000X11X0XXXXXXX00    040   I-LS ADD.SUB V=0

PIR.RD =    #030                        INSTR R-IX/DIR

ALUOUT =    #001                        REG/I-IMMD ADD.SUB
            #002                        REG/I-IMMD LOAD
            #003                        REG/I-IMMD OP 4.5
            #004                        REG/I-IMMD XOR
            #005                        REG/I-REG/I ADD.SUB
            #006                        REG/I-REG/I LOAD
            #007                        REG/I-REG/I OP 4.5
            #008                        REG/I-REG/I XOR
            #009                        REG/I-LS V=1
            #013                        SWAP-LS
            #014                        SUPR MOVE
            #015                        SET/CLR BIT-REG
            #016                        SHIFT/1'S COMP-R
            #017                        UNCOND CALL-LS
            #018                        COND CALL-LS
            #019                        REG/I-IX ADD.SUB
            #020                        REG/I-IX LOAD
            #021                        I/REG-IX OP 4.5
            #023                        REG-IX XOR
            #024                        REG-DIR ADD.SUB V=1
            #042                        I-DIR ADD.SUB V=1
            #025                        REG/I-DIR LOAD
            #026                        REG/I-DIR OP4.5 V=1
            #027                        REG-DIR XOR
            #029                        SWAP-DIR
            #031                        REG-LS V=0
            #043                        REG-LS V=0
            #032                        REG/I-IX
            #034                        SET/CLR BIT-LS
            #035                        SHIFT-LS
            #036                        1'S COMP-LS
            #046                        INSTR R/W-IX.UNCOND BR/CALL-IX
            #047                        COND BR/CALL-IX
            #038                        REG-DIR
            #044                        I-DIR ADD.SUB
```

```
          #040                                I-LS ADD.SUB V=0

CRCOUT =  #033                                CRC-LS
          #039                                CRC-DIR
          #045                                CRC-DIR

*  CB-3 MICROCYCLE 1
*  #   FFFFFFFFFFFFFFFFSS  CDIDSSTSSPSEIPPLALSTIDCXXHILHSSHLLCACSIHPADIDWXTI
*      0123456789111111 01 LEMPEE/EEVEPWNITW#.CSRPWRAAEBRLAAEPLAUNE.NIRF
*                          ACDOILPIL.I./.RXX/ROA..RDHHHHLLLLOUREOLRIV T
*                          M..W..C..R.WRR...SE. WR          AA  OOO R E   T
*                           RR RRRIIDIREDRSWEVL RD          II  UUE - T
*                           DD 12  3 0   DDP  4                 TTN 1     T
*
   1   10XXXXXXXXXXXXXX00  ....1..............1...........................
   2   X01XXXXXXXXXXXXXX1  ..............................................1
   3   XX011X0XXXXXXXXXX1  .............................................1.
   4   XX0110XXXXXXXXXXX1  .............................................1.
   5   X011011XXXXXXXXXXX  ....1....1......1..1..........................1
   6   X01X011X0XXXXXXXXX  .............................................11
   7   10XXX11XXXXXXXXX00  ................1..............................
   8   10XXX11X0XXXXXXXXX  ................1..1...........................
   9   X01000XXXX0X0XXXX0  .......................................11......
  10   X0100X0XXX0X0XXXX0  .......................................11......
  11   X01110XXXX0X0XXX00  ......................................111....1.
  12   X0111X0XXX0X0XXX00  ......................................111....1.
  13   X0X110XXXXXX0XXXX0  .............................................1.
  14   X0X11X0XXXXX0XXXX0  .............................................1.
  15   11011XXX1XXXXXXXX0  ...................1..................1..1...11
  16   1X01XXXXXXXXXXXX00  ...................1...........................
  17   111XXXX11X11XXXXX0  ............................................1..
  18   111XXX1X1X1XXXXXX0  .......1....................................1..
  19   111XXXX11X0XXXXXX0  ....................................1........1.
  20   111XXX1XXX0XXXXXX0  ..........1...................................1
  21   00XXX0XXXX010XXXXX  ................1............................1.
  22   00XXXX0XXX010XXXXX  ................1............................1.
  23   11X000X01XXXXXXXXX  ................1..................1....1......
  24   110000XXXXXXXXXXXX  ................1............................11
  25   011000XXXXXXXXXXXX  .......................................11......
  26   01100X0XXXXXXXXXXX  .......................................11......
  27   101000XXXXXXXXXXX0  ....1..............1...................11......
  28   10100X0XXXXXXXXXX0  ....1..............1...................11......
  29   101110XXXXXXXXXX00  ......................................111...1..
  30   10111X0XXXXXXXXX00  ......................................111...1..
  31   0X1000XXXXXXXXXXX1  ....1..................................11......
  32   0X100X0XXXXXXXXXX1  ....1..................................11......
  33   0X1110XXXXXXXXXXX1  ....1.................................11....11.
  34   0X111X0XXXXXXXXXX1  ....1.................................111...11.
  35   0XXXX0XXXX0X0XXXX1  ....1.........1.1...........................11.
  36   0XXXXX0XXX0X0XXXX1  ....1.........1.1...........................11.
  37   01X110XXXXXXXXXXXX  ............................................11.
  38   01X11X0XXXXXXXXXXX  .............................................1.
  39   10X110XXXXXXXXXXX0  .............................................1.
  40   10X11X0XXXXXXXXXX0  .............................................1.
*
*
  41   11001XXXXXXXXXXX00  ....1.......................................1..
  42   11001XXXXXXXXXXX0X  ................1..1.........................1.
  43   111XXXX11X1XXXXXX0  .......1.....................................1.
  44   1101XXXX0XXXXXXXX0  ...................1...............1..111....1.
  45   X0011XXX01XXXXXXXX  .............................................11
  46   XX011XXX0XXXXXXXX1  .............................................11
  47   X1XXXXXXXXXXXXXXX1  .............................................11
  48   X10X1XXXXXXXXXXXX1  ...................1.........................11
  49   X0001XXX1X1XXXXXX1  ....1.........1....................1....1......
```

```
50   X100X10XXXXXXXXXX1   ..............................1.................................
51   XX01111XXXXXXXXXXX   ..........................................................1
52   X010X11X0XXXXXXXXX   ..........................................................1
53   X100001XXXX1XXXXX1   ..........1...............................................
54   X100011X1XXXXXXXX1   .....11...................................................
55   XXXXXXXXXXXXXXXX1X   ..........................................................1
56   XX0000XX1X00XXXXX1   ...............1..1.......................................1
57   X0101XXXXX00XXXXX0   ..................................................1.......
58   X0001XXXXX00XXXXX0   ..........................................1.....1.........
59   X0XXX11XXX000XXX00   ..................1.......................................
60   X0XXXXXX0XXX0XXX1X   ...............1..1.......................................
61   X0010XXXXX000XXX00   ..........................................1.....1.........
62   X0001XXX1X0X0XXXX1   ....1.........1..1..........................1.............
63   01XXXXXXXXXXXXXXXX   ....1.....................................................
64   00XXXXXX0X000XXXXX   ....1............1........................................1
65   00XXXXXX110X1XXXXX   ....1.....................................................1
66   00XXXXXXX0000XXXXX   .....1....................................................
67   00XXXXXX110X0XXXXX   .....1...........1.1......................................11
68   00X0XX0XXX001XXXXX   .....1....................................................1
69   00XXXXXXXX1XXXXXX0   .......1..................................................1
70   110000X11X1XXXXXX0   .......1.........1........................................1
71   1100011X1XXXXXXXX0   ........1........1........................................1
72   11X0001X1X0XXXXXX0   ..........1......1..........................1.............1
73   01XXX11XXXXXXXXXXX   .................1........................................
74   01001XXXXXXXXXXXXX   ..........................................1.....1.........
75   01010XXXXXXXXXXXXX   ..........................................1.....1.........
76   10001XXXXXXXXXXXX0   ....1...............1.....................1.....1.........
77   10010XXXXXXXXXXX00   ..........................................1.....1.........
78   00X1XXXX0000XXXXXX   .....1....................................1...111.......1.1
79   00XXXX1X0000XXXXXX   .....1....................................1...............
80   110X011X0XXXXXXXX0   .....................1....................1...............1
81   111XXXX01XXXXXXXXX   ..................1.......................1.....1...1.....
82   0X010XXXXXXXXXXXX1   ....1.....................................1.....1.........
83   0X001XXXXXXXXXXXX1   ....1.....................................1.....1.........
84   0X00111XXXXXXXXXX1   ..........................................1.....1.........
85   01111XXXXXXXXXXXXX   ..............................................111......11.
86   01101XXXXXXXXXXXXX   ..................................................1.......
87   10101XXXXXXXXXXXX0   ....1................1............................1.......
```

```
88   00XX1XXX1000XXXXXX   .....1..........................................1..1...1.1
89   0X101XXXXXXXXXXXX1   ....1.............................................1.......
90   11001XXX10XXXXXX00   ..................................................1.......
91   1100X10XXXXXXXXX00   .....................1....................................
92   10011XXX0XXXXXXXXX   ....1................1....................................
93   00XXXXXXXXX1XXXXX0   .........................................................1
94   0X11X11XXXXXXXXXX0   .........................................................1
95   0X1XXXXXXXXXXXXXXX   .........................................................1
96   0XXXXXXXXX01XXXXX1   ....1...........1.........................................
97   0XXXXXXXXXXXXXXX1X   ..........1.....1..1..1.........................1.......1
98   110000X10XXXXXXXXX   ..........1........1..1...................................1
99   1XXXXXXX0XXXXXXXX1   ...................1......................................1
100  111XXXXXXXXXXXXXX0   ..........................................................
101  0XXXXXXXXXX1XXXXX1   ....1..........1..........................................
102  0XXXX11XXXXXXXXXX1   ....1..............1......................................
103  1XXXXXX10XXXXXXX0X   .......................1..................................
104  111XXX1X0XXXXXXXXX   ..........1........1...1........................1...1...1
105  00XXXXXXXX01XXX1XX   .........1.........1......................................1
105  00XXXXXXXX01XXX1XX   .........1.........1......................................1
*
*
*  CB-3 MICROCYCLE 2
-- *  #  PPPPPPPPPPPPPPPPSS   DDIDSSTSSPSEIPPAA1STLGGXXHLLHSSHLLCACSTHPACJCXXXI
*     012345678911111101   LEMPEE/EEVERMNIUU6.OSRRWRAABERLAABRLAUNE.NIRR
                           ACDOLLPLL.L./.RXX/RGA..RDHHHHLLLLCUREOLREN C
*
```

```
*                              M..W..C..R.WRR...SE. WR      AA   000 R E   X
*                               RR RRRIIDIRBDRRWBVL RD      II   UUE - V   
*                               DD 12  B 0   DDR  4              TTN 2     Y
*
  1  00XXXXXX1X000XXX00   ....1.................1.........1..............
  2  00XXXXXXXX1XXXXX00   .....1................1.....1....1.............
  3  00011XXX01000XXX00   .....1................1.........1..............
  4  1100011X1X1XXXXXX0   .....1................1.....1....1.............
  5  110000X11X1XXXXX00   .....1................1.....1....1.............
  6  111XXX11X1XXXXXX00   .....1................1.....1....1.............
  7  0100XXXXXXXXXXXX00   ......................1.....1....1.............
  8  01010XXXXXXXXXXX00   ......................1.....1....1.............
  9  1000XXXXXXXXXXXX00   ....................1.1.1...1....1.............
 10  10010XXXXXXXXXXX00   ....................1.1.1...1....1.............
 11  1010X0XXXXXXXXXX00   ....................1.1.1........1.............
 12  1010XX0XXXXXXXXX00   ....................1.1.1........1.............
 13  101100XXXXXXXXXX00   ....................1.1.1........1.............
 14  10110X0XXXXXXXXX00   ....................1.1.1........1.............
 15  101110XXXXXXXXXX00   ....................1.1.1.1.....1..............
 16  10111X0XXXXXXXXX00   ....................1.1.1.1.....1..............
 17  0110011XXXXXXXXX00   ......................1.....1..................
 18  01XX1XXXXXXXXXXX00   ......................1........................
 19  1011111XXXXXXXXX00   ................11..1.1.1......................
 20  0001111X11001XXX00   ...............1.....1.........................
 21  00XXXXXXXX1XXXXX01   ...............1...............................
 22  1100011X1X1XXXXX01   ...............1...............................
 23  0001111101001XXX00   .............1..1..............................
 24  0001XXXXX0001XXX00   .1..................1.....1.....1..............
 25  1101XXXXXXXXXXXX00   .1..................1...1.1.....1..............
 26  0111011XXXXXXXXX00   .............1..............1....1.............
 27  1100000XXXXXXXXX00   .............1..............1....1.............
 28  111XXX00XXXXXXXX00   .............1..............1....1.............
 29  111XXXX1100X0XXX00   .............1..............1....1.............
 30  110000X1100X0XXX00   .............1..............1....1.............
 31  110000X10XXXXXXX00   .............1...1..1...1...1....1.............
 32  111XXXX10XXXXXXX00   .............1...1..1...1...1....1.............
 33  00XXXXXXX001X0XX0X   ..............1................................
 34  1100011X1X000XXXXX   ..............1................................
 35  110000X110000XXX01   ..............1..1......1......................
 36  110000X110010XXX01   ..............1.1..............................
 37  00XXXXXXXXXXXXXX10   ..............1........1.......................
 38  000001XXX0001XXX00   ..............1................................
 39  110000X11X1XXXXX01   ..............1................................
*
*
 40  1011011X0XXXXXXX00   .........1.......1..1..1.......................
 41  1011011X1XXXXXXX00   .........1.......1..1...1......................
 42  00000000000111XX00   .........1.......1......1......................
 43  10011XXX1XXXXXXX00   ....................1...1......................
 44  11001XXXXXXXXXXX00   .................1..1...1......................
 45  1100010XXXXXXXXX00   ....................1...1......................
 46  110001110XXXXXXX00   ....................1...1......................
 47  0000XXXXXXXXXXXX01   ........................1......................
 48  00011XXX1XXXXXXX01   ........................1......................
 49  001XX0XXXXXXXXXX01   ........................1......................
 50  001XXX0XXXXXXXXX01   ........................1......................
 51  0010X11X1XXXXXXX01   ........................1......................
 52  0011111X00010XXX01   .................1......1......................
 53  1010X11X1XXXXXXX00   ....................1.1.1...1....1.............
 54  00010XXXXXXXXXXX01   ........................1......................
 55  10011XXX0XXXXXXX00   ....................1..1.......................
 56  10XXXXXX0XXXXXXX01   ....................1..1.......................
 57  00011XXX0XXXXXXX01   .......................1.......................
 58  0010X11X0XXXXXXX01   .......................1.......................
```

```
 59 11001XXXXXXXXXXX01  .................1..1..1........................
 60 11011XXXXXXXXXXX01  ....................1..1........................
 61 110001110XXXXXXX01  ....................1..1........................
 62 1100010XXXXXXXXX01  ....................1..1........................
 63 1010X11X0XXXXXXX00  ....................1..1........................
 64 100XX11XXXXXXXXX00  .................1..............................
 65 10XXX11X0XXXXXXX01  .................1..............................
 66 000XX11XXXXXXXXX01  .................1..............................
 67 000010XXX0010XXXXX  .................1..............................
 68 00001X0XX0010XXXXX  .................1..............................
 69 00XXX11X00010XXX10  .................1..............................
 70 0010111X0XXXXXXX01  ..................1.............................
 71 1010111X0XXXXXXX00  ..................1.............................
 72 01111XXXXXXXXXXX00  ......................1...1.....1...............
 73 011X00XXXXXXXXXX00  ......................1..........1..............
 74 011X0X0XXXXXXXXX00  ......................1..........1..............
 75 01101XXXXXXXXXXX00  .................................1..............
 76 00111XXX10000XXX00  ...........................1.....1..............
 77 0010111X10000XXX00  ..........................1.....................
 78 000110XX10000XXX00  ..........................1.....................
 79 00011X0X10000XXX00  ..........................1.....................
 80 000XX11XXX000XXX00  .........................1......................
*
*
*  CB-3 MICROCYCLE 3
*  #  PPPPPPPPPPPPPPPPSS  DDIDSSTSSPSEIPFAALETLGGXGHLLHSSHLLCACSIHPACCCWXYZ
*     0123456789111111O1  LEMPEE/EEVERWNIUU6.CSRRWRAABBRLAABRLAUNE.NIRR
*                         ACDOLLPLL.L./.RXX/RCA..RDHHHHLLLLLCURECLRDN C
*                         M..W..C..R.WRR...SE. WR       AA   DCC R E   Y
*                          RR RRRIIDIREDRRWEVL RD       LL   UUE - V
*                         DD 12  3 0   DDR  1                TTN 2      Y
*
  1 10011XXX0XXXXXXX00  ......................1.........................
  2 1011011X0XXXXXXX00  ......................1.........................
  3 11001XXXXXXXXXXX00  1..1..................1...1.....................
  4 0000XXXXXXXXXXXX01  ......................1.....1....1..............
  5 00X10XXXXXXXXXXX01  ......................1.....1....1..............
  6 00011XXX0XXXXXXX01  ......................1.........................
  7 0010XXXXXXXXXXXX01  ......................1.....1....1..............
  8 0010X11X0XXXXXXX01  ......................1.........................
  9 110001101XXXXXXX01  1...........1.........1.........................
 10 00111XXXXXXXXXXX01  ......................1...1.....1...............
 11 1010X11X0XXXXXXX00  ......................1.........................
 12 110000111X1XXXXX01  .............1.......1..........................
 13 10XXXXXX0XXXXXXX01  ...............1................................
 14 110X1XXXXXXXXXXX01  ...............1................................
 15 1100010XXXXXXXXX01  ...............1................................
 16 110001110XXXXXXX01  ...............1................................
 17 00XXXXXXXXXXXXXX10  ...............1................................
 18 0011111X00010XXX01  1...............1...............................
 19 11000000XXXXXXXX00  ..1.............................1...............
 20 111XXX00XXXXXXXX00  ..1.............................1...............
 21 11000011X10XXXXX00  ..1.............................1...............
 22 111XXX011X10XXXX00  ..1.............................1...............
 23 000010XXX0010XXX01  1.........................1.....................
 24 00001X0XX0010XXX01  1.........................1.....................
 25 1000XXXX0XXXXXXX00  1..1............................................
 26 1010X0XX0XXXXXXX00  1..1............................................
 27 1010XX0X0XXXXXXX00  1..1............................................
 28 101100XX0XXXXXXX00  1..1............................................
 29 10110X0X0XXXXXXX00  1..1............................................
 30 00XXXXXXXX1XXXXX00  1..1............................................
 31 000010XXX0010XXX00  1..1............................................
 32 00001X0XX0010XXX00  1..1............................................
```

```
33  11011XXXXXXXXXXX00   1..1..........................................
34  1100010XXXXXXXXX00   1..1..........................................
35  110001110XXXXXXX00   1..1..........................................
36  1100011X1X1XXXXX00   1..1..........................................
37  1100011X1X000XXX00   1.............................................
38  110000011X11XXXX00   1.............................................
39  111XXX011X11XXXX00   1.............................................
*
*
40  11000001100X0XXX00   1.............................................
41  111XXX01100X0XXX00   1.............................................
42  110000111XXXXXXX00   1.............................................
43  111XXX111XXXXXXX00   1.............................................
44  0000XXXX0001X0XX01   1.............................................
45  0010XXXX00011XXX01   1.............................................
46  00110XXX00011XXX01   1.............................................
47  110001111XXXXXXX01   1.............................................
48  1011111X0XXXXXXX00   1..1..........................................
49  00XXXXXX001X0XXX00   1.............................................
50  0000XXXX0001X0XX00   ...1..........................................
51  0011111X00010XXX00   ...1..........................................
52  0010XXXX00011XXX00   ...1..........................................
53  00110XXX00011XXX00   ...1..........................................

CB-3 MICROCYCLE 4
#   PPPPPPPPPPPPPPPPSS   DDIDSSTSSPSBIFPAA1ETLOGXXHLLHSSHLLCACSIHPACOCWXYZ
    0123456789111111C1   LEMPEE/EEVERWNIUU6.OSRRWRAABBBLAAERLAUNB.NIRR
                         ACDOLLPLL.L./.RXX/RGA..RDHHHHLLLLLCURBCLRDN C
                         M..W..C..R.WRR...SE. WR        AA   CCC R E   X
                          RR RRRIIDIREDRRWBVL RD        LL   UUE - V
                          DD 12  B 0   DDR  4                TTN 2     Y

 1  0000XXXX10000XXX00   .....................1....1...1...............
 2  00010XXX10000XXX00   .....................1....1...1...............
 3  0010X0XX10000XXX00   .....................1........1...............
 4  0010XX0X10000XXX00   .....................1........1...............
 5  00110XXX10000XXX00   .....................1........1...............
 6  00111XXX10000XXX00   .....................1..1.....1...............
 7  00XXXXXXX11XXXXX00   .....................1........1...............
 8  0010011X10000XXX00   .....................1....1...................
 9  0010111X10000XXX00   .....................1........1...............
10  0001XXXX0001XXXX00   .....................1...1....1...............
11  00000100X0001XXX00   .....................1........................
12  00000101X0001XXX00   .....................1........................
13  0000011100001XXX00   .....................1........1...............
14  1100011X1X11XXXX00   .....................1........1...............
15  110000X11X11XXXX00   .....................1........1...............
16  111XXX11X11XXXXX00   .....................1........1...............
17  010XXXXXXXXXXXXX00   ..1...........................1...............
18  011X0XXXXXXXXXXX00   ..1...........................1...............
19  011010XXXXXXXXXX00   ..1...........................1...............
20  01101X0XXXXXXXXX00   ..1...........................1...............
21  01111XXXXXXXXXXX00   ..1......................1.....1..............
22  00XXXXXXXX10XXXX00   ..1...........................1...............
23  1100011X1X10XXXX00   ..1...........................1...............
24  110000111X10XXXX00   ..1...........................1...............
25  111XXX111X10XXXX00   ..1...........................1...............
26  1000XXXXXXXXXXXX00   ..............................1...............
27  10010XXXXXXXXXXX00   ..............................1...............
28  1010X0XXXXXXXXXX00   ..............................1...............
29  1010XX0XXXXXXXXX00   ..............................1...............
30  10110XXXXXXXXXXX00   ..............................1...............
31  110001110XXXXXXX00   ..............................1...............
```

```
32  000XXXXXXX1XXXXX01  ..................................1.................
33  000XXXXXXX0110XX01  ..................................1.................
34  000XX11XXX010XXX01  ..................................1.................
35  0010X0XXXXXXXXXX01  ..................................1.................
36  00110XXXXXXXXXXX01  ..................................1.................
37  0010XX0XXXXXXXXX01  ..................................1.................
38  0011111X00010XXX01  ..........................1.......1.................
39  0010011X1XXXXXXX01  ...................................1................
*
*

40  1010011X1XXXXXXX00  ...................................1................
41  101110XX0XXXXXXX00  .............................1.....1................
42  10111X0X0XXXXXXX00  .............................1.....1................
43  1101XXXXXXXXXXXX00  .............................1.....1................
44  001110XXXXXXXXXX01  .............................1.....1................
45  00111X0XXXXXXXXX01  ..............................1....1................
46  10X1111XXXXXXXXX00  ..............................1....1................
47  11001XXXX0XXXXXX00  .............................1............1.........
48  000010XXX0010XXX01  .............................1............1.........
49  00001X0XX0010XXX01  .............................1............1.........
50  0110111XXXXXXXXX00  ..1.........................1.......................
51  1000X11XXXXXXXXX00  ...........................1........................
52  10X1011XXXXXXXXX00  ...........................1........................
53  000XX11XXXXXXXXX01  ...........................1........................
54  100110XX1XXXXXXX00  .............................1.....1................
55  10011X0X1XXXXXXX00  .............................1.....1................
56  010110XXXXXXXXXX00  .............................1......................
57  01011X0XXXXXXXXX00  .............................1......................
58  000110XX1XXXXXXX01  .............................1......................
59  00011X0X1XXXXXXX01  .............................1......................
60  0010111X1XXXXXXX01  .............................1......................
61  1010111X1XXXXXXX00  .............................1......................
62  000110XX1XXXXXXX01  .............................1......................
63  00011X0X1XXXXXXX01  .............................1......................
64  00000101X0001XXX00  ...............................1....................
65  11000101XXXXXXXX00  ...............................1....................
66  00000100X0001XXX00  ................................1...................
67  11000100XXXXXXXX00  ................................1...................
68  11000000XXXXXXXX00  ......................................1.............
69  111XXX00XXXXXXXX00  ......................................1.............
70  110000011X10XXXX00  ......................................1.............
71  111XXX011X10XXXX00  ......................................1.............
72  111XXX11100X0XXX00  ......................................1.............
73  11000011100X0XXX00  ......................................1.............
*
*
*   *  CB-3 MICROCYCLE 5
*   *  #  PPPPPPPPPPPPPPPPSS  DDIDSSTSSPSBIPPAAIBTLGGKKHLLHSSHLLCACSIHPACSCWXTI
*   *     0123456789111111 01  LEMPEE/EEVERWNIUU6.0SRRWRAABBRLAABRLAUNB.NIRR
*   *                          ACDOLLPLL.L./.RKK/RCA..RDHHHHLLLLCURBCLRDN C
*   *                          M..W..C..R.WRR...SE. WR        AA   OOG R E   X
*   *                           RR RRRIIDIRBDRRWBVL RD        LL   UUE - V   /
*   *                           DD 12  B 0   DDR  4                TIN 2     Y
*   *
*
*      1  11000011100X0XXX00  ......................1..............1..............
       2  111XXX11100X0XXX00  ......................1.............................
       3  110000011X11XXXX01  ............1...1...................................
       4  110000X11001000001  ............1...1...................................
       5  110000111X1XXXXX01  ............1...1...................................
       6  00000000000111XX00  ............1.......................................
       7  11000000XXXXXXXX00  ............1........................1..............
       8  111XXX00XXXXXXXX00  ............1........................1..............
       9  110000X10XXXXXXX00  ............1.......................................
      10  111XXXX10XXXXXXX00  ............1.......................................
      11  110000011X10XXXX00  ............1........................1..............
```

```
12   111XXX011X10XXXX00   ..............1.............................1.................
13   111XXX1100X0XXXX00   ..............1.............................1.................
14   110000X110000XXX01   ..............1...............................................
15   0100XXXXXXXXXXXX00   ..............................................1...............
16   01010XXXXXXXXXXX00   ..............................................1...............
17   011000XXXXXXXXXX00   ..............................................1...............
18   01100X0XXXXXXXXX00   ..............................................1...............
19   01111XXXXXXXXXXX00   ..............................................1...............
20   0000XXXX10000XXX00   ..............................................1...............
21   00010XXX10000XXX00   ..............................................1...............
22   001000XX10000XXX00   ..............................................1...............
23   00100X0X10000XXX00   ..............................................1...............
24   00111XXX10000XXX00   ..............................................1...............
25   1000XXXXXXXXXXXX00   ..............................................1...............
26   10010XXXXXXXXXXX00   ..............................................1...............
27   101000XXXXXXXXXX00   ..............................................1...............
28   10100X0XXXXXXXXX00   ..............................................1...............
29   101110XXXXXXXXXX00   ..............................................1...............
30   10111X0XXXXXXXXX00   ..............................................1...............
31   0111011XXXXXXXXX00   ..............................................1...............
32   0001XXXX00001XXX00   ..............................................1...............
33   1101XXXX0XXXXXXX00   ..............................................1...............
34   1100011X1X1XXXXX00   ..............................................1...............
35   110000XXXXXXXXXX00   ..............................................1...............
36   111XXXXXXXXXXXXX00   ..............................................1...............
37   0000XXXXXX1XXXXX01   ..............................................1...............
38   00010XXXXXXXXXXX01   ..............................................1...............
39   001000XXXXXXXXXX01   ..............................................1...............
*
*
40   00100X0XXXXXXXXX01   ..............................................1...............
41   001110XXXXXXXXXX01   ..............................................1...............
42   00111X0XXXXXXXXX01   ..............................................1...............
43   0000XXXX0011XXX01    ..............................................1...............
44   0000X11XX0010XXX01   ..............................................1...............
45   00XXXXXXXX1XXXXX00   ..............................................1...............

*
*
*   CB-3 MICROCYCLE 6
*   #  PPPPPPPPPPPPPPPPSS   DDIDSSTSSPSBI?PAAIBTLGCXXHLLHSSHLLCACSIHPACOCXXXI
*      0123456789111111 01  LEMPEE/EEVERWNIUU6.OSRRWRAABERLAABRLAUNB.NIRR
*                           ACDOLLPLL.L./.RXX/RCA..RDHHHHLLLLLCURBCLRDN C
*                           M..W..C..R.WRR...SE. WR        AA   OOC R E   X
*                            RR RRRIIDIRBDRRWEVL RD        II   UUE - V   /
*                            DD 12  B 0   DDR  4                TTN I     Y
*

 1   00011XXX01000XXX00   ........................1.....................................
 2   01X0XXXXXXXXXXXX00   ...........................1................1.................
 3   01011XXXXXXXXXXX00   ...........................1................1.................
 4   01110XXXXXXXXXXX00   ...........................1................1.................
 5   0000XXXX10000XXX00   ...........................1................1.................
 6   00011XXX10000XXX00   ...........................1................1.................
 7   0010XXXX10000XXX00   ...........................1................1.................
 8   00110XXX10000XXX00   ...........................1................1.................
 9   10XXXXXX1XXXXXXX00   ...........................1................1.................
10   1011111XXXXXXXXX00   ...........................1................1.................
11   00011XXXX1000XXX00   ...........................1................1.................
12   00011XXXX0001XXX00   ...........................1................1.................
13   000001XXX0001XXX00   ...........................1................1.................
14   110000110XXXXXXX00   ...........................1................1.................
15   111XXX110XXXXXXX00   ...........................1................1.................
16   0000XXXXXX1XXXXX01   ...........................1................1.................
17   00011XXX1X1XXXXX01   ...........................1................1.................
18   0010XXXX1X1XXXXX01   ...........................1................1.................
```

```
                                        1                  -.................
19  00110XXXXX1XXXXXXX01  ..........................1.................1.................
20  0000XXXX10011XXXXX01  ..........................1.................1.................
21  0000X11X10010XXXXX01  ..........................1.................1.................
22  00011XXX1001XXXXXX01  ..........................1.................1.................
23  0010XXXX1001XXXXXX01  ..........................1.................1.................
24  00110XXX1001XXXXXX01  ..........................1.................1.................
25  0011111X00010XXXXX01  ..................1.......1...................................
26  110001111XXXXXXXXX01  .....................1......................1.................
27  10XXX0XX0XXXXXXXXX00  .....................1......................1.................
28  10XXXX0X0XXXXXXXXX00  .....................1......................1.................
29  00XXXXXXXX1XXXXXXX00  .....................1.....................1..................
30  11001XXXXXXXXXXXXX00  .....................1......................1.................
31  11011XXXXXXXXXXXXX00  .....................1......................1.................
32  1100010XXXXXXXXXXX00  .....................1......................1.................
33  110001110XXXXXXXXX00  .....................1......................1.................
34  11000XXX1X1XXXXXXX00  .....................1......................1.................
35  111XXXX11X1XXXXXXX00  .....................1......................1.................
36  00XXXXXX00011XXXXX01  .....................1......................1.................
37  0000X11X00010XXXXX01  .....................1.....................1..................
38  000010XXX0010XXXXX01  .....................1.....................1..................
39  00001X0XX0010XXXXX01  .....................1......................1.................
40  1000X11X0XXXXXXXXX00  .....................1.................................
```

We claim:

1. A data bit synchronizer for use with a controller in a multiplexing character processor of the type that provides the interchange of information between a central process and a plurality of peripheral devices, each having at least one of a plurality of protocols and at least one of a plurality of interfaces, comprising:

RAM means having a plurality of memory address locations for storing a respective control/status word having a plurality of bytes for each of said plurality of peripheral devices;

addressing means for uniquely accessing each of the bytes of each control/status words as a function of the respective peripheral device under control of the controller;

timing chain means for generating a first sequence of timing pulse signals in response to a falling edge of a controller clock and at substantially the same time generating a second sequence of timing pulse signals in response to a rising edge of the controller clock;

said timing chain means is connected to said addressing means to time sequence the accessing of each of said control/status words and said respective bytes thereof;

selectable clock divider means connected to said RAM means and said timing chain means for providing a respective timing rate which a selectable division of said controller clock for each of said plurality of peripheral devices;

bit clock generating means connected to said RAM means and said selectable clock divider means for logically generating a respective output bit clock signal for each of said plurality of peripheral devices;

input data control means connected to said RAM means and multiplexed to a respective receive data signal of each of said plurality of peripheral devices for logically demultiplexing and outputting each respective data bit received from each respective peripheral device to said controller for transfer to said central processor;

output data control means connected to said RAM means and to said bit clock synchronizing means for synchronizing each output data bit multiplexed to each respective peripheral device with each respective output bit clock signal;

interface control means connected to said RAM means and multiplexed to a respective receive control signal according to the respective interface and protocol of each of said plurality of peripheral devices for logically comparing a current state of each control signal with a previous state thereof and recording each respective change in each respective receive control signal from each respective peripheral device in the respective control/-status word therefor; and multiplexer means connected to said addressing means, said output data control means, and said input data control means for multiplexing during a cycle:

an output address of one of the plurality of peripheral devices and an input address of one of the plurality of said peripheral devices, at least one output control signal and the output data signal to the peripheral device associated with said output address, and at least one input control signal and the input data signal to the peripheral device associated with said input address.

2. A date bit synchronizer as set forth in claim 1, wherein said multiplexer means multiplexes each of said plurality of peripheral devices a plurality of times for each data bit therefrom.

3. A data bit synchronizer as set forth in claim 1, further comprising a common parallel bus connecting said multiplexer means to said plurality of peripheral devices.

4. A data bit synchronizer as set forth in claim 3, wherein each said control/status words stored in said RAM means includes nine bytes of eight bits per byte.

5. A data bit synchronizer as set forth in claim 1, wherein said RAM means, said addressing means, said bit clock generating means, said input data control means, said output data control means, said interface control means, and said multiplexer means are all parts of the same integrated circuit chip.

6. A data bit synchronizer for use with a controller in a multiplexing character processor of the type for interfacing a central process with a plurality of peripheral devices each having at least one of a plurality of protocols, comprising:

first RAM means for storing a bit of a character from the central processor which has been disassembled by the controller into a sequence of bits;

address means for selecting the respective peripheral device to which the stored bit is to be multiplexed;

second RAM means for storing control signals according to the respective protocol for interfacing the stored bit to the respective peripheral device;

a timing means for synchronizing the multiplexing of the stored bit to the respective peripheral device at a rate which is an integer multiple of the baud rate of the respective stored bit; and output logic means responsive to the first RAM means, the second RAM means, and the timing means, for multiplexing and interleaving the stored bit to be transmitted to the respective peripheral device synchronously with a similarly multiplexed and interleaved received data bit from the respective peripheral device, and according to the respective protocol thereof.

7. A data bit synchronizer, according to claim 6, wherein the first RAM means, the second RAM means, the address means, the timing means, and the output logic means are all portions of an integrated circuit.

8. A data bit synchronizer, according to claim 7, further comprising a common bus connected from the output logic means to the multiplexed plurality of peripheral devices.

9. A data bit synchronizer, according to claim 8, further comprising line set means connected to the common bus for demultiplexing the multiplexed bit and control signals from the output logic means into control and status signals to the respective peripheral device.

10. A data bit synchronizer according to claim 6, wherein the plurality of protocols includes HDLC, Bisync, and start-stop protocols.

* * * * *